United States Patent [19]

Kocol et al.

[11] 4,387,441

[45] Jun. 7, 1983

[54] DATA PROCESSING SYSTEM WHEREIN AT LEAST ONE SUBSYSTEM HAS A LOCAL MEMORY AND A MAILBOX MEMORY WITHIN THE LOCAL MEMORY FOR STORING HEADER INFORMATION

[75] Inventors: James E. Kocol, Escondido; Robert O. Gunderson, Poway; David B. Schuck, Escondido; Daniel J. Marro, San Diego, all of Calif.

[73] Assignee: NCR Corporation, Dayton, Ohio

[21] Appl. No.: 255,061

[22] Filed: Apr. 16, 1981

[51] Int. Cl.[3] .............................................. G06F 13/00

[52] U.S. Cl. ....................................... 364/200; 370/85

[58] Field of Search ... 364/200 MS File, 900 MS File; 340/825.5, 825.51; 370/85

[56] References Cited

U.S. PATENT DOCUMENTS

| | | | |
|---|---|---|---|
| 4,063,220 | 12/1977 | Metcalfe et al. | 340/825.5 |
| 4,210,780 | 7/1980 | Hopkins et al. | 370/80 |
| 4,236,203 | 11/1980 | Curley et al. | 364/200 |
| 4,253,147 | 2/1981 | MacDougall et al. | 364/200 |

OTHER PUBLICATIONS

Metcalfe and Boggs, "Ethernet: Distributed Packet Searching for Local Computer Networks", *Comm. of the ACM*, vol. 19, No. 7, Jul. 1976, pp. 395-404.

Rawson and Metcalfe, "Fibernet: Multimode Optical Fibers for Local Computer Network", *IEEE Trans. on Comm.*, vol. 26, No. 7, Jul. 1978, pp. 983-990.

*Primary Examiner*—Raulfe B. Zache

*Attorney, Agent, or Firm*—J. T. Cavender; Edward Dugas; Stephen F. Jewett

[57] ABSTRACT

A data processing system employing broadcast packet switching and having a plurality of subsystems and a system bus for linking the subsystems. The subsystems are grouped within stations that are each enclosed by a computer cabinet. The system bus includes a star coupler, first and second external transmission lines connecting each station to the star coupler, and first and second internal transmission lines within each station that are coupled to the first and second external transmission lines. The subsystems within each station are each coupled to the first and second internal transmission lines by a system bus interface. The system bus interface monitors the system bus for an idle condition, and passes a message from its subsystem to the system bus only when it detects an idle condition on the system bus. Each message on the system bus includes a postamble that is garbled by any system bus interface that detects an error in any message on the system bus. Each subsystem has a local memory that includes a mailbox for storing header information of messages that are to be copied by that subsystem. DMA circuitry in each system bus interface manages the operation of the mailbox in its subsystem. In alternate embodiments, the star coupler may be a magnetic star coupler or an electrical star coupler, and the system bus may be comprised of two channels, each channel including a star coupler and pairs of transmission lines connecting each station to the star coupler.

19 Claims, 287 Drawing Figures

FIG. 1
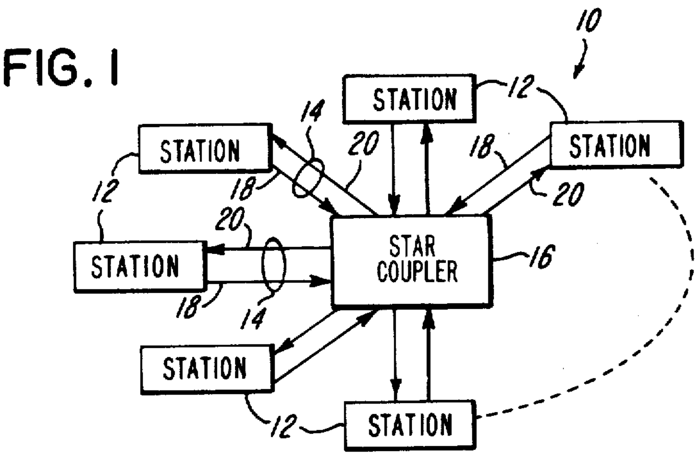
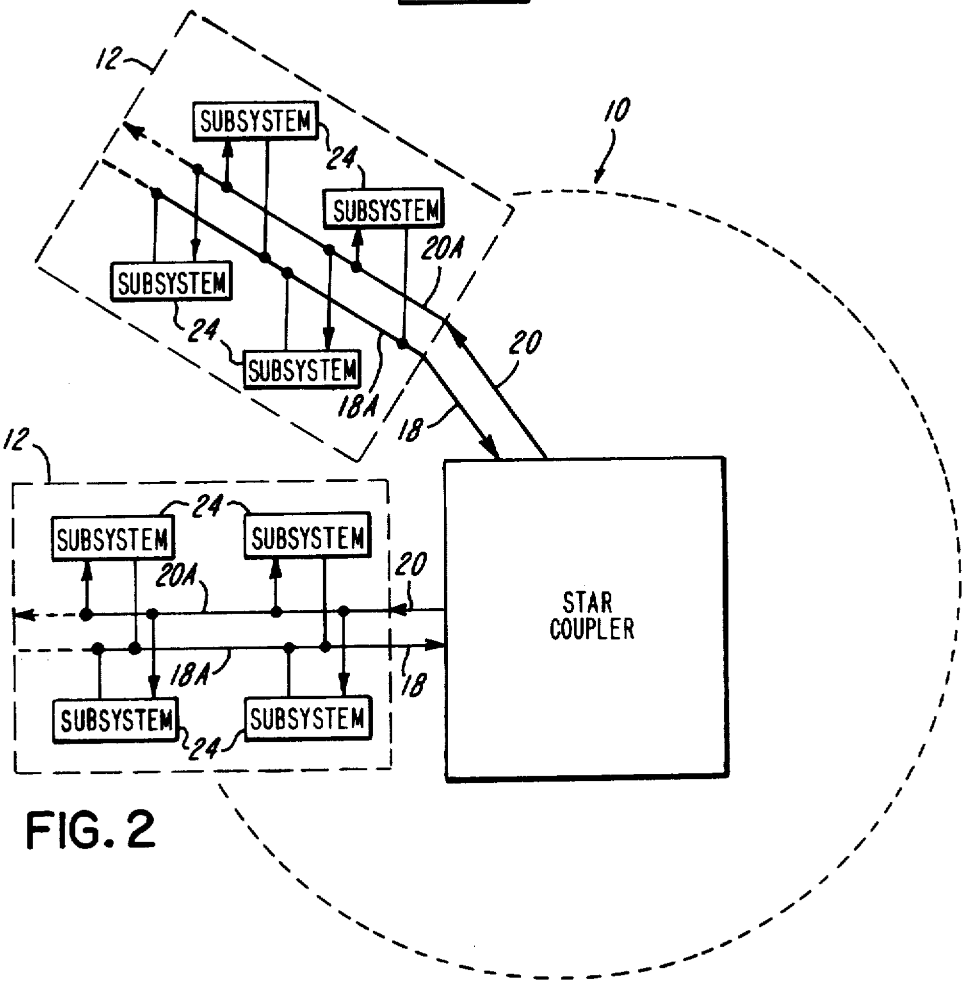
FIG. 2

FIG. 3
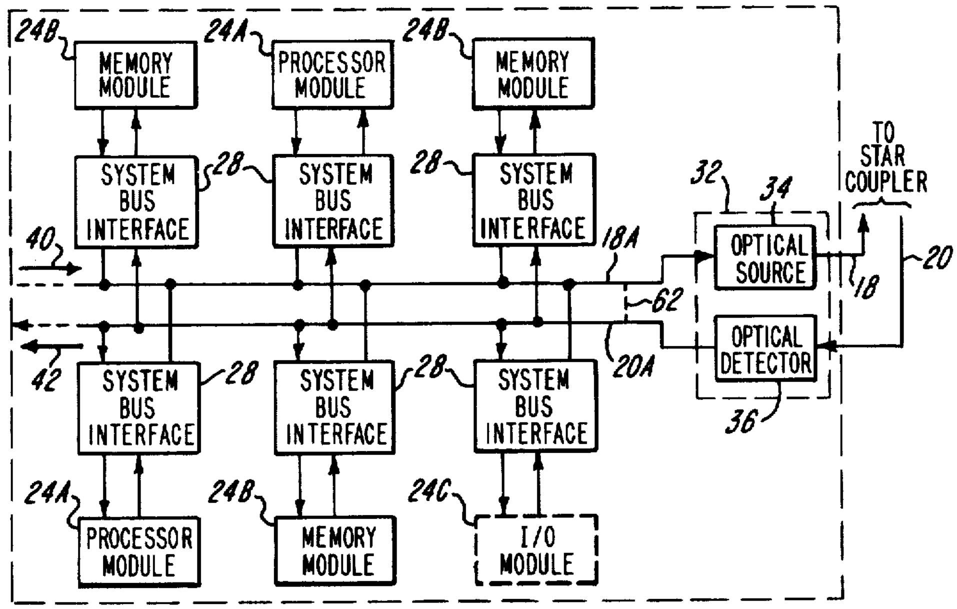
FIG. 4
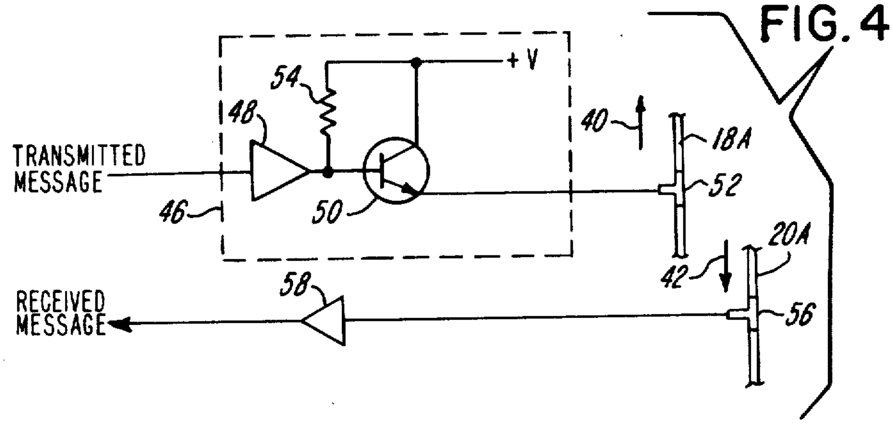
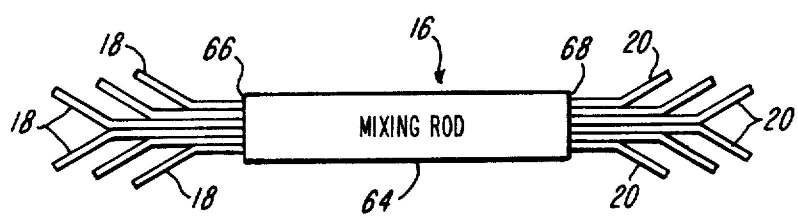
FIG. 5

FIG. 37C
| PART | SYMBOL | EQUIVALENT |
| --- | --- | --- |
RESISTOR FLIP FLOP WITH SET INPUT
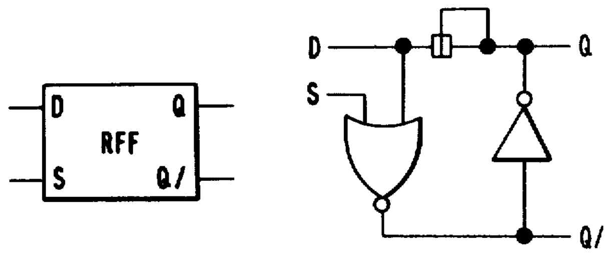
SET-RESET FLIP FLOP
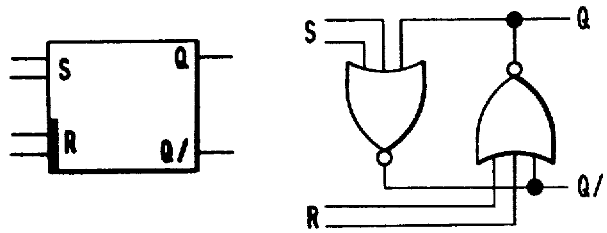
INHIBITOR
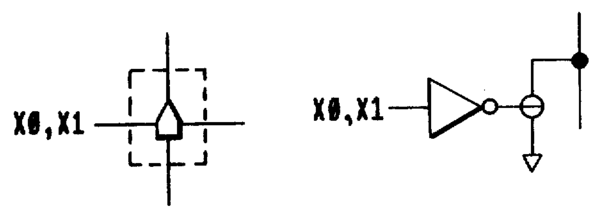
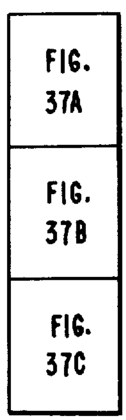
FIG. 37

FIG. 42

| | |
|---|---|
| FIG. 42A | FIG. 42B |
| FIG. 42C | FIG. 42D |
| FIG. 42E | FIG. 42F |
| FIG. 42G | FIG. 42H |
| FIG. 42I | FIG. 42J |
| FIG. 42K | FIG. 42L |
| FIG. 42M | FIG. 42N |
| FIG. 42O | FIG. 42P |
| FIG. 42Q | FIG. 42R |
| FIG. 42S | FIG. 42T |

FIG. 38

| | | |
|---|---|---|
| FIG. 38A | FIG. 38B | FIG. 38C |
| FIG. 38D | FIG. 38E | FIG. 38F |
| FIG. 38G | FIG. 38H | FIG. 38I |
| FIG. 38J | FIG. 38K | FIG. 38L |

FIG. 39

| | | |
|---|---|---|
| FIG. 39A | FIG. 39B | FIG. 39C |
| FIG. 39D | FIG. 39E | FIG. 39F |
| FIG. 39G | FIG. 39H | FIG. 39I |
| FIG. 39J | FIG. 39K | FIG. 39L |
| FIG. 39M | FIG. 39N | FIG. 39O |
| | FIG. 39P | FIG. 39Q |

RWB (DECODERS)

XWB (DECODERS)

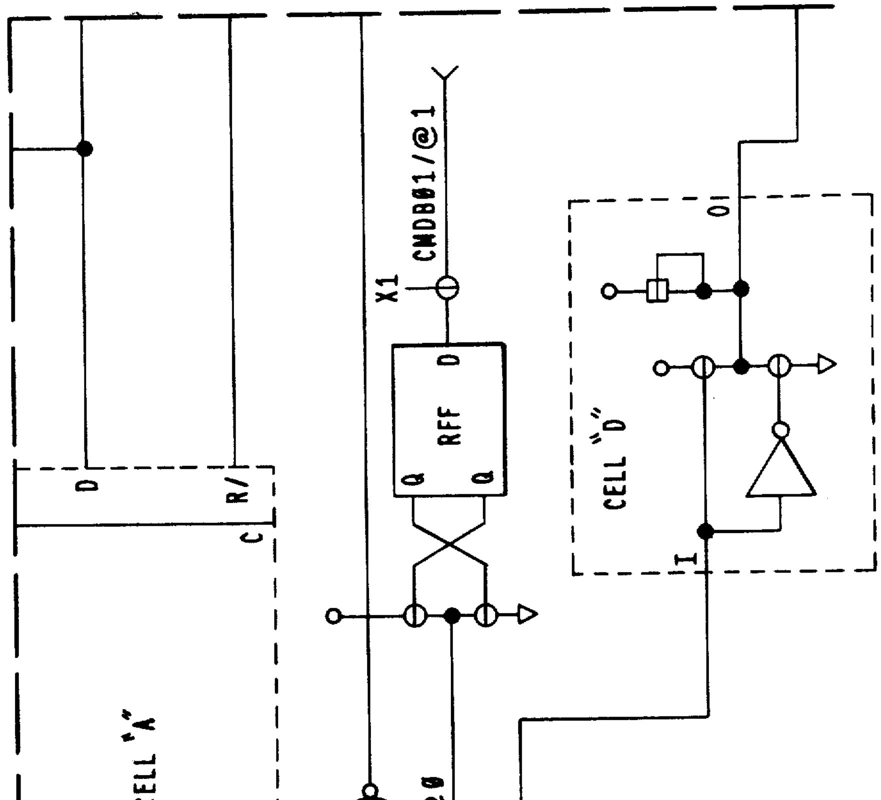
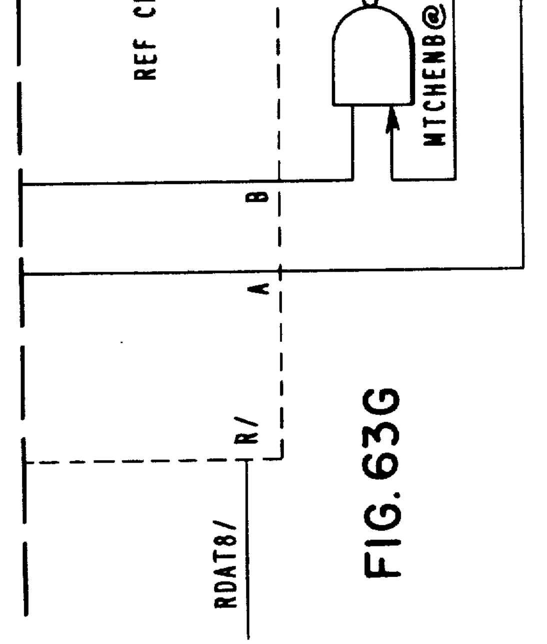
FIG. 63G
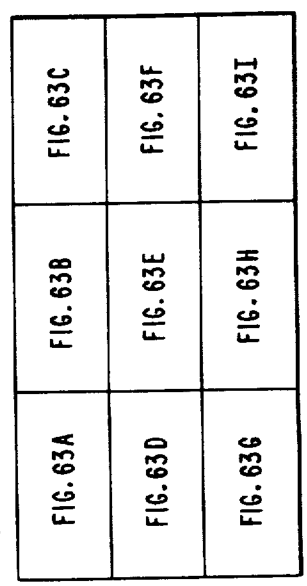
FIG. 63

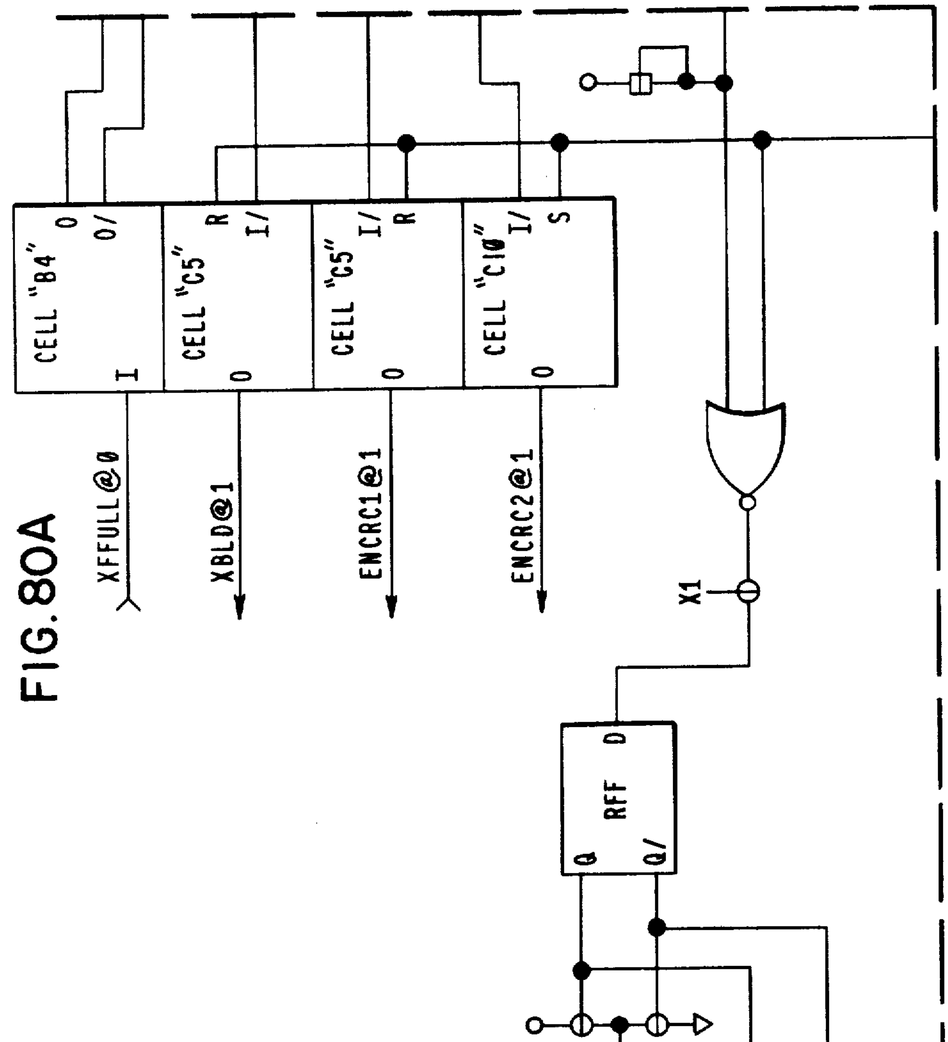
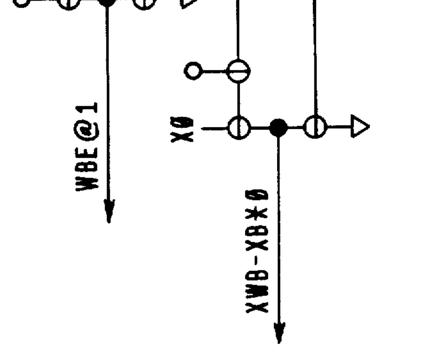
FIG. 80A
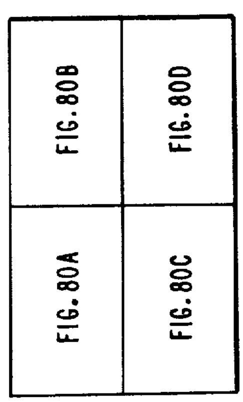
FIG. 80

FIG. 81
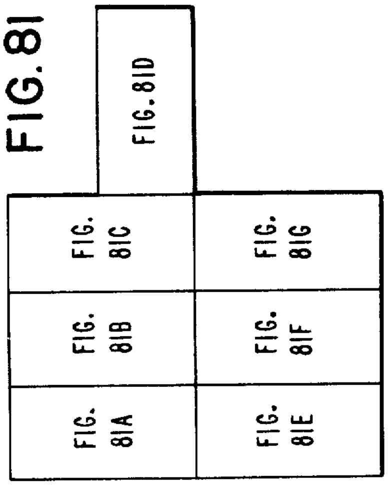
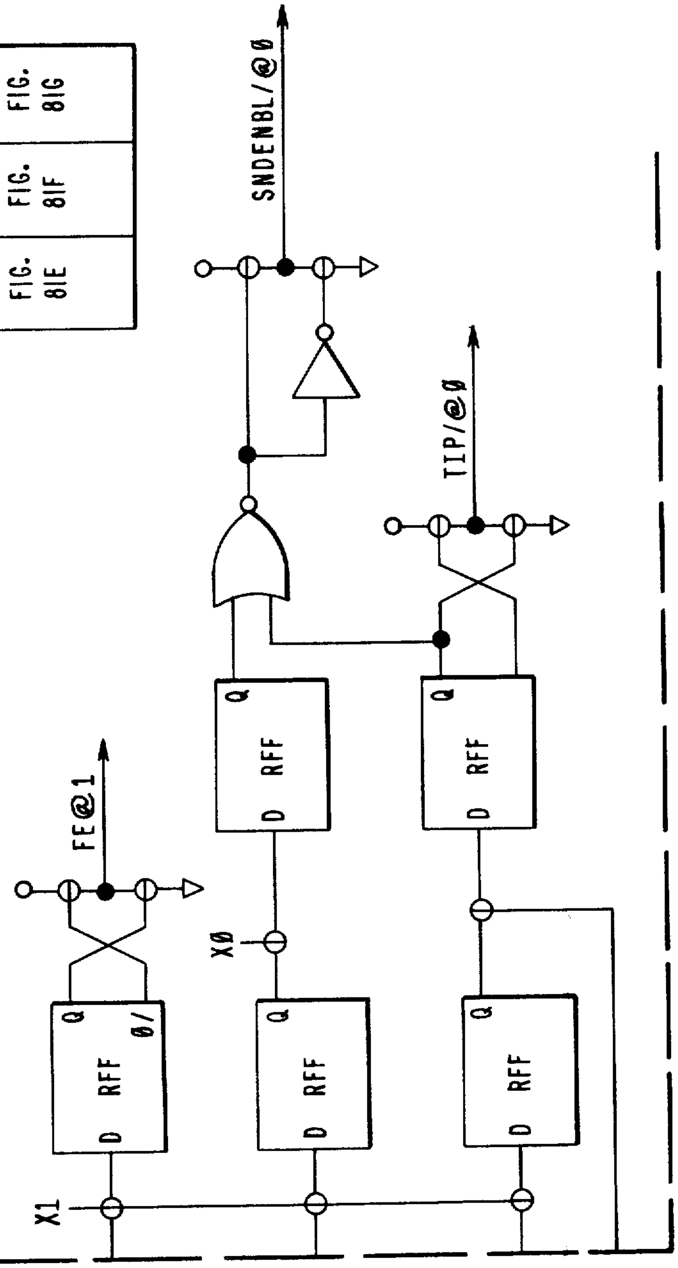
FIG.81D

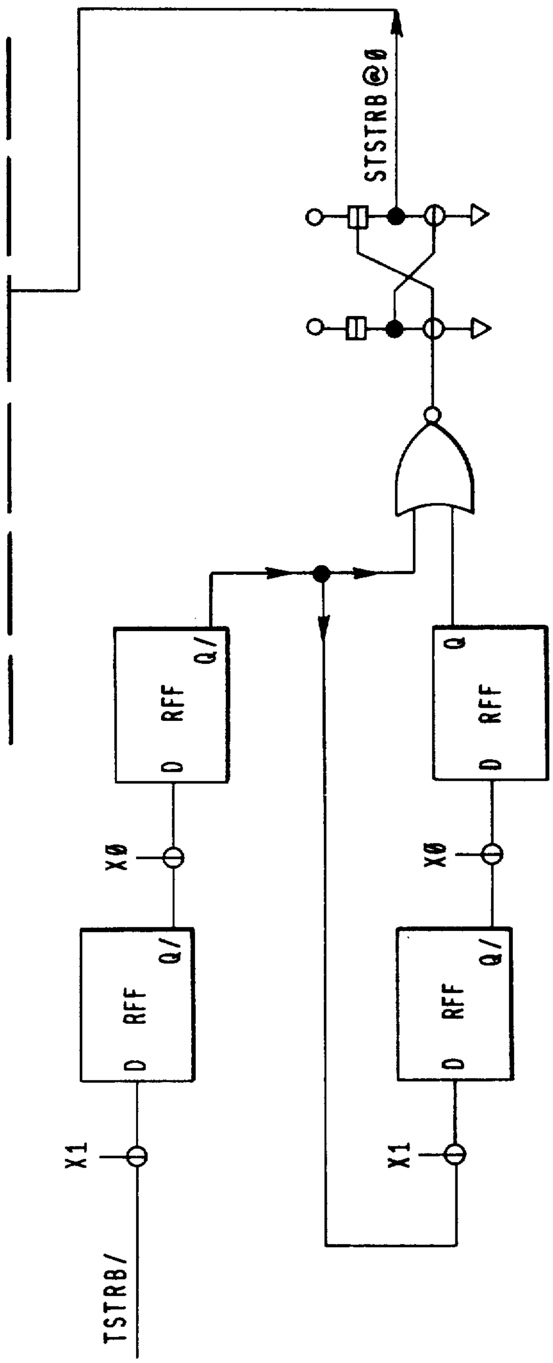
FIG. 82C
FIG. 82
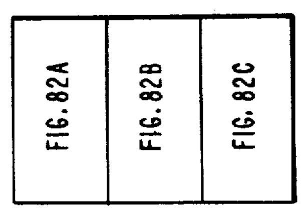

FIG. 83C

C6-AREC

| | | | | | | | | | | | | | | | | | | | | |
|---|---|---|---|---|---|---|---|---|---|---|---|---|---|---|---|---|---|---|---|---|
| 79 | | | | | | | | | | | | | | | | | | | | |
| 78 | | | S | S | S | S | S | S | S | | | | | | | | | | | |
| 77<br>76 | 0 | 1 | 1 | 1 | 0 | 0 | 1 | 1 | 1 | 1 | 1 | 1 | 0 | 0 | 0 | 0 | 0 | 0 | 0 | 1 |
| 75 | | | S | | | | | | S | S | S | S | | | | | | | | S |
| 74 | S | | | | | S | | | | | | | | | | | | | S | |
| 73 | | | 1 | | | | | | | | | | 1 | | | | | | | |
| G | | | | | | | | | | | | | | | | | | | | |
| 71 | | | | 1 | | | | | 1 | | | 1 | | | | | | | | |
| 70 | | | | | S | | | | | | | | | | | S | | | | |
| 69 | | S | | | | | S | | | | | | | | | | S | S | | S |
| 68<br>67 | 0 | 0 | 1 | 1 | 1 | 0 | 0 | 1 | 1 | 1 | 1 | 1 | 1 | 1 | 1 | 1 | 0 | 0 | | |
| 66 | | | | | | | | | S | | | | | | | | | | | |
| 65 | | | | | | | | | | S | S | S | | | S | | | | | |
| G | | | | | | | | | | | | | | | | | | | | |
| 63 | | | | S | | | S | | | | | | | | | | | | | |
| 62 | | S | | | | | | | | S | S | S | S | S | S | | S | S | | S |
| 61<br>60 | 0 | 0 | 1 | 1 | 1 | 1 | 1 | 0 | 0 | 0 | 0 | 0 | 0 | 0 | 0 | 0 | 0 | 0 | 0 | 0 |
| 59 | | S | | | | | | | | | | | | | | | | | | |
| 58 | | | | | | | | | | S | S | S | S | S | S | | S | S | | S |
| 57 | 1 | 1 | | | | | | | | | | | | | | | | | | |
| G | | | | | | | | | | | | | | | | | | | | |
| 55 | | | 1 | 1 | 1 | 1 | 1 | 1 | 1 | 1 | 1 | 1 | 1 | 1 | 1 | 1 | 1 | 1 | 1 | 1 |
| 54 | S | S | S | S | S | S | S | S | | | | | | | | | | | | |
| 53<br>52 | | | | | | | | | | | | | 1 | | | 0 | 1 | | 0 | 1 |
| 51 | | | | | | | | | | | | | | | | | | | | |
| 50<br>49 | 0 | | | | | | | | | | | | | | | | | | | |
| G | | | | | | | | | | | | | | | | | | | | |
| 47 | | | | | | | | | | | | | | | | | | | | |
| 46 | | | | | | | | | | | | | | | | | | | | |
| 45 | | | | S | | | | | | | | | | | | | | | | |

FIG. 83D

C6-AREC

| | | | | | | | | | | | | | | | | | | | | |
|---|---|---|---|---|---|---|---|---|---|---|---|---|---|---|---|---|---|---|---|---|
| 79 | | | | | | | S | | | | S | | | | | | | | | |
| 78 | | | | | | | | | | | | | | | | | | | | |
| 77/76 | 1 | 1 | 1 | 0 | 1 | 1 | 0 | 0 | 0 | 0 | 0 | 0 | 0 | 0 | 0 | 1 | 1 | 1 | 1 | 1 |
| 75 | S | S | S | | | S | | | | | | | | | | | S | S | S | S |
| 74 | | | | S | | | | | | | | S | | | | | | | | |
| 73 | | 1 | | | | | | | | | | | | | 1 | | | | | 1 |
| G | | | | | | | | | | | | | | | | | | | | |
| 71 | 1 | | 1 | | | | | 1 | | | 1 | | | | | | | | | |
| 70 | | | | | S | | | | | | | | | | | | | | | |
| 69 | S | S | S | | | | | S | S | S | | | S | S | S | | S | S | S | S |
| 68/67 | | 0 | 0 | 1 | 1 | 0 | 0 | 0 | 0 | 0 | 0 | 0 | 0 | 0 | 0 | 0 | 0 | 0 | | |
| 66 | | | | | | | | | | | S | | | | | | | | | |
| 65 | | | | | | | | S | S | S | | | S | | | | | | | |
| G | | | | | | | | | | | | | | | | | | | | |
| 63 | | | | | | | | | | | S | | | | | | | | | |
| 62 | S | S | S | | | | | | | | | | S | S | S | | S | S | S | S |
| 61/60 | | | | 1 | 1 | 1 | 1 | 1 | 1 | 1 | 1 | 0 | 0 | 0 | 0 | 0 | 0 | 0 | 0 | 0 |
| 59 | | | | | | | | | | | | | | | | S | | | | |
| 58 | S | S | S | | | | | | | | | | | | | | | | S | S |
| 57 | | | | 1 | 1 | 1 | 1 | 1 | 1 | 1 | 1 | 1 | 1 | 1 | 1 | 1 | 1 | 1 | | |
| G | | | | | | | | | | | | | | | | | | | | |
| 55 | 1 | 1 | 1 | | | | | | | | | | | | | | | | 1 | 1 |
| 54 | | | | S | S | S | S | | | | | | | | | | | | | |
| 53/52 | | | | | | | | | | | | 0 | | 1 | | 0 | 1 | | 1 | |
| 51 | S | | | | | | | | | | | | | | | | | | | |
| 50 | | | | | | | | | | | | | | | | | | | | |
| 49 | | | | | | | | | | | | | | | | | | | | |
| G | | | | | | | | | | | | | | | | | | | | |
| 47/46 | 0 | | 1 | | | | | | | | | | | | | | | | | |
| 45 | | | | | | | | | | | | | | | | | | | | |

FIG. 83E

C6-AREC

| | | | | | | | | | | | | | | | | | | | | |
|---|---|---|---|---|---|---|---|---|---|---|---|---|---|---|---|---|---|---|---|---|
| 79 | | | | | | | | | | | | | | | | | | | | |
| 78 | | | | | | | | | | | | | | S | | | | S | | |
| 77 / 76 | 1 | | | 0 | 0 | 0 | 0 | 1 | 1 | 1 | 1 | 0 | 0 | 0 | 0 | 0 | 0 | 0 | 0 | |
| 75 | S | S | S | | | | | | S | S | S | | | | | | | | | |
| 74 | | | | | S | | S | | | | | | | | | | | | | |
| 73 | | 1 | 1 | | | 1 | | | | | | | | | | | | | 1 | |
| G | | | | | | | | | | | | | | | | | | | | |
| 71 | 1 | | | 1 | | | | | | | | | | | | | 1 | 1 | | |
| 70 | | | | | | | S | S | | | | | | | | | | | | |
| 69 | S | S | S | | | | | | | | S | | S | | S | S | S | S | S | |
| 68 / 67 | | | | 1 | 1 | 1 | 1 | 1 | 1 | 0 | 0 | 0 | 0 | 0 | 0 | 0 | 0 | 0 | 0 | |
| 66 | | | | | | | | | | | | | | | | | | S | | |
| 65 | | S | S | | | | | | | | | | | | | | | | | |
| G | | | | | | | | | | | | | | | | | | | | |
| 63 | | | | | | | | | | | | S | | | | | | | | |
| 62 | S | S | S | | | | | | | | | | | | S | S | S | S | S | |
| 61 / 60 | 0 | | | 1 | 1 | 1 | 1 | 1 | 1 | 1 | 1 | 1 | 1 | 0 | 0 | 0 | 0 | 0 | 0 | |
| 59 | | | | S | | | | | | | | | | | | | | | | |
| 58 | S | S | S | | | S | | | S | | S | | S | | S | S | S | S | S | |
| 57 | | | | 1 | | | | | | | | | | | | | | | | |
| G | | | | | | | | | | | | | | | | | | | | |
| 55 | 1 | | | | 1 | 1 | 1 | 1 | 1 | 1 | 1 | 1 | 1 | 1 | 1 | 1 | 1 | 1 | 1 | |
| 54 | | | | | | | | | | | | | | | | | | | | |
| 53 / 52 | | | | | | | | | | | | | | | | | | | | |
| 51 | S | | | | | | | | | | | | | | | | | S | | |
| 50 / 49 | | | | | 0 | | 1 | | | | | | | | | | | | | |
| G | | | | | | | | | | | | | | | | | | | | |
| 47 / 46 | | | | | | | | | | | | | | | | | | | | |
| 45 | | | | | | | S | | | | | | | | | | | | | |

FIG. 83I

| | | | | | | | | | | | | | | | | | | | | |
|---|---|---|---|---|---|---|---|---|---|---|---|---|---|---|---|---|---|---|---|---|
| 41 | | | S | | | | | | | | | | | | | | | | | |
| G | | | | | | | | | | | | | | | | | | | | |
| 39<br>38 | 0 | 0 | 0 | 0 | 0 | 0 | 0 | 0 | 1 | | | 1 | 0 | 1 | | 0 | 0 | 1 | 0 | 0 |
| 37 | | | | | | | | | | S | S | S | S | S | S | | S | S | | S |
| 36 | | | | | | | | | | | | | | | | | | | | |
| 35 | | | | | | | | | | | | | | | | | | | | |
| G | | | | | | | | | | | | | | | | | | | | |
| 33 | | | | | | | | | | | | | | | | | | | | |
| G | | | | | | | | | | | | | | | | | | | | |
| 31 | | | | S | | | S | | | | | | | | | | | | | |
| 30 | | | | | | | | | | | | | | | | | | | | |
| 29<br>28 | 0 | | | | | | | | | | | | | | | | | | | |
| 27 | | | | | | | | | | | | | | | | | | | | |
| 26<br>25 | | | | | | | | 1 | 1 | 0 | | | | | | | | | | |
| G | | | | | | | | | | | | | | | | | | | | |
| 23<br>22 | | | | | | | | 1 | 1 | | 0 | | | | 0 | 1 | | | | |
| G | | | | | | | | | | | | | | | | | | | | |
| 20 | | | | | | | | | | | | | | | | | | | | |
| 19 | | | | | | | | | | | | | | | | | | | | |
| G | | | | | | | | | | | | | | | | | | | | |
| 17 | 1 | | | | | | | | | | | | | | | | | | | |
| G | | | | | | | | | | | | | | | | | | | | |
| 15 | | | | | | | | | | | | | | | | | | | | |
| G | | | | | | | | | | | | | | | | | | | | |
| 13 | | | | | | | | | | | | | | | | | | | | |
| 12 | | | | | | | | | | | | | | | | | | | | |
| 11 | | | | | | | | | S | S | S | S | | | | | | | | |
| 10 | | | | | | | | | | | | | | | | | | | | |
| 9<br>8 | 0 | 0 | 0 | 0 | 0 | 0 | 0 | 0 | 0 | 0 | 0 | 0 | | | | | 0 | 0 | 0 | 0 |

FIG. 83J

| | | | | | | | | | | | | | | | | | | | | |
|---|---|---|---|---|---|---|---|---|---|---|---|---|---|---|---|---|---|---|---|---|
| 41 | | | | | | | | | | | | | | | | | | | | |
| G | | | | | | | | | | | | | | | | | | | | |
| 39 / 38 | 1 | 1 | 1 | 0 | 0 | 0 | 0 | 1 | | | 1 | 0 | | 0 | 1 | 0 | 0 | 1 | 0 | 1 |
| 37 | | S | | | | | | S | S | S | | | S | S | S | | S | S | S | S |
| 36 | | | | | | | | | | | | | | | | | | | | |
| 35 | | | | | | | | | | | | | | | | | | | | |
| G | | | | | | | | | | | | | | | | | | | | |
| 33 | | | | | | | | | | | | | | | | | | | | |
| G | | | | | | | | | | | | | | | | | | | | |
| 31 | | | | | | S | | | | | | | | | | | | | | |
| 30 | | | S | | | | | | | | | | | | | | | | | |
| 29 | | | | | | | | | | | | | | | | | | | | |
| 28 | | | | | | | | | | | | | | | | | | | | |
| 27 | | | | | | | | | | | | | | | | | | | | |
| 26 / 25 | | | | | | | | 1 | | | 0 | 1 | | | | | | | | |
| G | | | | | | | | | | | | | | | | | | | | |
| 23 / 22 | | | | | | | | 1 | | 0 | | 1 | 1 | 0 | | | | | | |
| G | | | | | | | | | | | | | | | | | | | | |
| 20 | | | | | | | | | | | | | | | | | | | | |
| 19 | | | | | | | | | | | | | | | | | | | | |
| G | | | | | | | | | | | | | | | | | | | | |
| 17 | | | | | | | | | | | | | | | | | | | | |
| G | | | | | | | | | | | | | | | | | | | | |
| 15 | | | | | | | | | | | | | | | | | | | | |
| G | | | | | | | | | | | | | | | | | | | | |
| 13 | | | | | | | | | | | | | | | | | | | | |
| 12 | | | | | | | | | | | | | | | | | | | | |
| 11 | | | | | | | | S | S | S | S | | | | | | | | | |
| 10 | | | S | | | | | | | | | | | | | | | | | |
| 9 / 8 | 0 | 0 | 0 | 1 | 1 | 1 | 1 | 1 | 1 | 1 | 1 | 1 | 1 | 1 | 1 | 1 | 1 | 1 | 1 | 1 |

FIG. 83K

| | | | | | | | | | | | | | | | | | | | | |
|---|---|---|---|---|---|---|---|---|---|---|---|---|---|---|---|---|---|---|---|---|
| 41 | | | | | S | | | | | | | | | | | | | | | |
| G | | | | | | | | | | | | | | | | | | | | |
| 39/38 | 1 | 1 | 1 | 1 | 0 | 1 | 0 | 0 | 1 | 0 | 1 | 0 | 1 | 0 | | | 1 | 1 | 1 | |
| 37 | | S | S | | | | | | | | | | | | S | S | S | | S | |
| 36/35 | | | | 1 | | | | | | | | | | | | | | | | |
| G | | | | | | | | | | | | | | | | | | | | |
| 33 | | | 1 | | | | | | | | | | | | | | | | | |
| G | | | | | | | | | | | | | | | | | | | | |
| 31 | | S | S | | | | | | | | | | | | | | | | | |
| 30 | | | | | | | | | | | | | | | | | | | | |
| 29 | | | | | | | | | | | | | | | | | | | | |
| 28 | | | | | | | | | | | | | | | | | | | | |
| 27 | | | | | | | | | | | | S | | | | | | | | |
| 26/25 | | | | | | | | | | | | | | | 1 | | 1 | 1 | 1 | |
| G | | | | | | | | | | | | | | | | | | | | |
| 23/22 | | | | | | | | | | | | | | 1 | | 0 | 1 | 1 | 1 | |
| G | | | | | | | | | | | | | | | | | | | | |
| 20 | | | | | | | | | | | | | | | | | | | | |
| 19 | | | | | | | | | | | | | | | | | | | | |
| G | | | | | | | | | | | | | | | | | | | | |
| 17 | | | | | | | | | | | | | | | | | | | | |
| G | | | | | | | | | | | | | | | | | | | | |
| 15 | | | | | | | | | | | | | | | | | | | | |
| G | | | | | | | | | | | | | | | | | | | | |
| 13 | | 1 | | | | | | | | | | | | | | | | | | |
| 12 | | | | | | | | | | | | | | | | | | | | |
| 11 | | S | S | | | | | | | | | | | | | | | | | |
| 10 | | | | | | | | | | | | | | | | | | | | |
| 9/8 | 1 | | | 0 | 1 | 1 | 1 | 1 | 1 | 1 | 1 | 1 | 1 | 1 | 1 | 1 | 1 | 1 | 1 | |

| | | | | | | | | | | | | | | | | | | | | |
|---|---|---|---|---|---|---|---|---|---|---|---|---|---|---|---|---|---|---|---|---|
| G | | | | | | | | | | | | | | | | | | | | |
| 6 | | | | | | | | | | | | | | | | | | | | |
| 5 | | | | | | | | | | | | | | | | | | | | |
| 4 | S | S | S | | | S | | | S | | S | | S | | S | S | S | S | S | |
| 3 | | | | S | | | | | | | | | | | | | | | | |
| 2 | | | | | | | | | | | | | | | | | | | | |
| 1 | | | | | | | | | | | | | | | | | | | | |

FIG. 83P

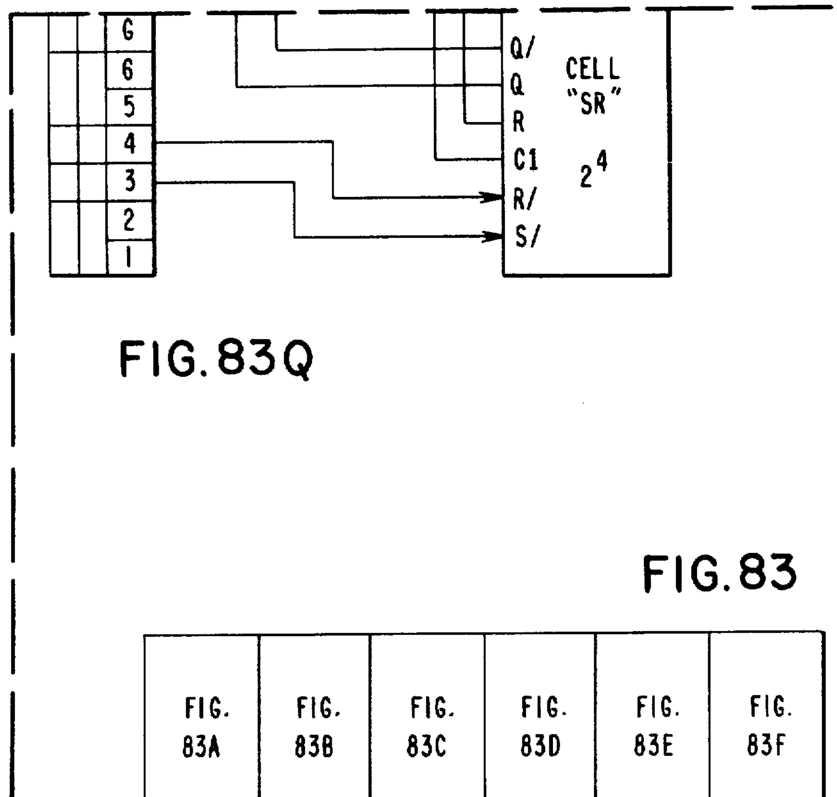
FIG. 83Q
FIG. 83
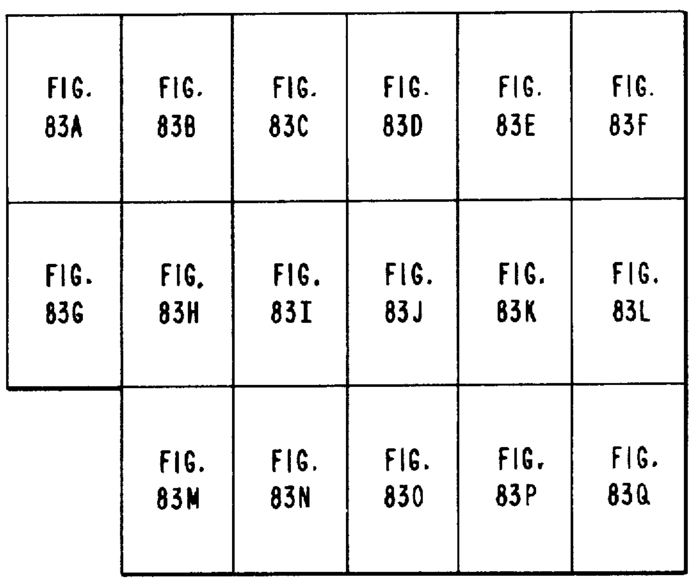

FIG. 84
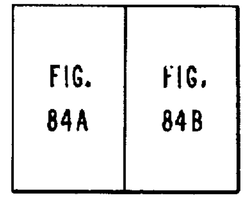
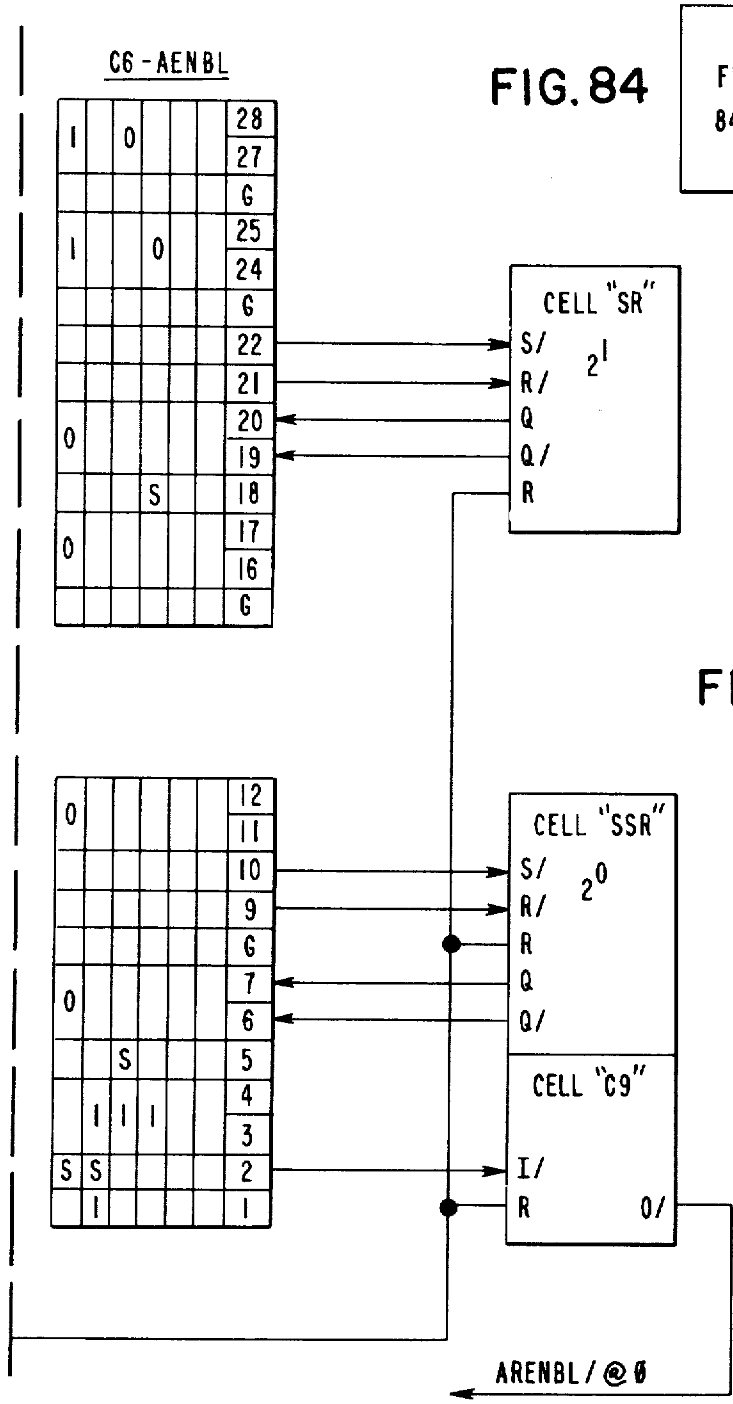
FIG. 84B

C7-BREC

FIG.87C

| | | | | | | | | | | | | | | | | | | | | |
|---|---|---|---|---|---|---|---|---|---|---|---|---|---|---|---|---|---|---|---|---|
| 76 | S | S | S | S | S | S | S | | | | | | | | | | | | | |
| G | | | | | | | | | | | | | | | | | | | | |
| 74 / 73 | 1 | 1 | 0 | 0 | 1 | 1 | 1 | 1 | 1 | 1 | 0 | 0 | 0 | 0 | 0 | 0 | 0 | 1 | 1 | 1 |
| 72 | S | | | | | | S | S | S | S | | | | | | | | S | S | S |
| 71 | | | | | | | | | | | | | | | | | S | | | |
| 70 | 1 | | | | | | | | | | | 1 | | | | | | | | |
| G | | | | | | | | | | | | | | | | | | | | |
| 68 | | 1 | | | | | 1 | | | 1 | | | | | | | | | | |
| 67 | | S | | | S | | | | | | | | | | | | | | | |
| 66 | | | | | | | | S | S | S | S | S | S | | S | S | | | S | S |
| 65 / 64 | 1 | 1 | 1 | 0 | 0 | 1 | 1 | 1 | 1 | 1 | 1 | 1 | 1 | 1 | 0 | 0 | 0 | 0 | 0 | 0 |
| 63 | | | | | | | S | | | | | | | | | | | | | |
| 62 | | | | | | | | S | S | S | | | S | | | | | S | | |
| G | | | | | | | | | | | | | | | | | | | | |
| 60 | | S | | | S | | | | | | | | | | | | | | | |
| 59 | | | | | | | | S | S | S | S | S | S | | S | S | | | S | S |
| 58 / 57 | 1 | 1 | 1 | 1 | 1 | 0 | 0 | 0 | 0 | 0 | 0 | 0 | 0 | 0 | 0 | 0 | 0 | 1 | 0 | 0 |
| 56 | | | | | | | | | | | | | | | | | | | | |
| 55 | | | | | | | | S | S | S | S | S | S | | S | S | | | S | S |
| 54 | | | | | | | | | | | | | | | | | | 1 | | |
| G | | | | | | | | | | | | | | | | | | | | |
| 52 | 1 | 1 | 1 | 1 | 1 | 1 | 1 | 1 | 1 | 1 | 1 | 1 | 1 | 1 | 1 | 1 | 1 | | 1 | 1 |
| 51 | S | S | S | S | S | S | | | | | | | | | | | | | | |
| 50 | | | | | | | | | | | | | | | | | | | | |
| 49 | | | | | | | | | | | | | | | | | | | | |
| G | | | | | | | | | | | | | | | | | | | | |
| G | | | | | | | | | | | | | | | | | | | | |
| 46 | | | | | | | | | | | | | | | | | | | | S |
| G | | | | | | | | | | | | | | | | | | | | |
| 44 | | | | | | | | | | | | | | | | | | | | 0 |
| 43 | | | | | | | | | | | | | | | | | | | | |
| 42 | | S | | | | | | | | | | | | | | | | | | |

C7-BREC

FIG. 87H

| | | | | | | | | | | | | | | | | | | | | |
|---|---|---|---|---|---|---|---|---|---|---|---|---|---|---|---|---|---|---|---|---|
| 38 | S | | | | | | | | | | | | | | | | | | | |
| G | | | | | | | | | | | | | | | | | | | | |
| 36 / 35 | 0 | 0 | 0 | 0 | 0 | 0 | 1 | | | 1 | 0 | 1 | | 0 | 0 | 1 | 0 | 0 | 0 | 1 |
| 34 | | | | | | | | S | S | S | S | S | S | | S | S | | S | S | |
| 33 / 32 | | | | | | | | | | | 1 | | | 0 | 1 | | 0 | | 1 | |
| G | | | | | | | | | | | | | | | | | | | | |
| 30 | | | | | | | | | | | | | | | | | | | | |
| G | | | | | | | | | | | | | | | | | | | | |
| 28 | | S | | | S | | | | | | | | | | | | | | | |
| 27 | | | | | | | | | | | | | | | | | | | | |
| 26 / 25 | | | | | | | | | | | | | | | | | | | | |
| 24 | | | | | | | | | | | | | | | | | | | | |
| 23 / 22 | | | | | | 1 | 1 | 0 | | | | | | | | | | | | |
| G | | | | | | | | | | | | | | | | | | | | |
| 20 / 19 | | | | | | | | | 0 | | | | 0 | 1 | | | | | | |
| G | | | | | | | | | | | | | | | | | | | | |
| 17 / 16 | | | | | | | | | | | | | | | | | | | | |
| G | | | | | | | | | | | | | | | | | | | | |
| G | | | | | | | | | | | | | | | | | | | | |
| 13 / 12 | | | | | | | | | | | | | | | | | | | | |
| G | | | | | | | | | | | | | | | | | | | | |
| 10 | | | | | | | | | | | | | | | | | | | | |
| 9 | | | | | | | S | S | S | S | | | | | | | | S | | |
| 8 | | | | | | | | | | | | | | | | | | | | |
| 7 / 6 | 0 | 0 | 0 | 0 | 0 | 0 | | | | | | | | | | | | 0 | 0 | 0 |
| 5 | | | | | | | S | S | S | S | S | S | S | S | S | S | S | | | |
| 4 | | | | | | | | | | | | | | | | | | | | |
| G | | | | | | | | | | | | | | | | | | | | |
| 2 / 1 | | | | | | | 0 | | | 1 | | | | | | | | | | |

| | | | |
|---|---|---|---|
| FIG. 88A | FIG. 88B | FIG. 88C | FIG. 88D |
| | FIG. 88E | FIG. 88F | FIG. 88G |

DATA PROCESSING SYSTEM WHEREIN AT LEAST ONE SUBSYSTEM HAS A LOCAL MEMORY AND A MAILBOX MEMORY WITHIN THE LOCAL MEMORY FOR STORING HEADER INFORMATION

TABLE OF CONTENTS

Cross References to Related Applications
Background of the Invention
Summary of the Invention
Brief Description of the Drawings
Detailed Description of the Preferred Embodiments
- Data Processing System 10 (General)
- Bus Driver Circuit 46 and Bus Receiver 58
- Star Couplers 16, 16A, 16B and 16C
- Modules 24A, 24B and 24C
  - Processor Module 24A
  - Memory Module 24B
  - I/O Module 24C
- Message Formats
- System Bus Interface 28
- Three Exemplary Cases
- DMA 140 (General)
  - Mailbox 350
  - DMA 140 (Detail)
  - Command and Status Registers 142
- Swamp Circuit 160 and Idle Detection Circuit 162
- Dual-Channel Data Processing System 410
- System Bus Interface 428
- Retry Circuit 604
- System Interface Chip 536 (Detail)

CROSS REFERENCES TO RELATED APPLICATIONS

The present application is related to the following:

U.S. Ser. No. 254,850, entitled "Data Processing System Employing Broadcast Packet Switching", filed Apr. 16, 1981, by Robert O. Gunderson, James E. Kocol and David B. Schuck U.S. Ser. No. 254,792, entitled "Data Processing System Having a Dual-Channel System Bus", filed Apr. 16, 1981, by Robert O. Gunderson, James E. Kocol and David B. Schuck; and U.S. Ser. No. 255,062, entitled "Data Processing System Wherein All Subsystems Check for Message Errors", filed Apr. 16, 1981, by Robert O. Gunderson, James E. Kocol and David B. Schuck.

BACKGROUND OF THE INVENTION

The present invention relates to data processing systems or networks and, more particularly, to data processing systems employing broadcast packet switching.

In traditional data processing systems, several subsystems are linked to each other along a system bus and share the bus for the transfer of data. The control of the bus is typically given to one subsystem. Accordingly, when a message is to be sent from one subsystem to another subsystem, either the message has to be sent through the controlling subsystem or the controlling subsystem has to at least occasionally operatively connect each subsystem to the bus in order to pass its message.

As advancements in semiconductor technology have permitted increased amounts of circuitry to be fabricated on a single integrated circuit chip, there has been increasing interest in developing data processing systems that do not rely on a single subsystem to control the transmission of messages among plural subsystems in the data processing systems. It is widely believed that future data processing systems will be comprised of subsystem modules. Each module provides either processing or memory capability. No single module or subsystem in the system will have control over the system bus but, rather, each module shares with the other modules the control of the communication lines that link the modules. When the user of the system desires to increase the capability of his system, he simply adds modules. Ideally, little or no software or hardware modifications would be needed in an existing system in order to add modules.

Recently proposed data processing systems that eliminate central control of the system bus use a feature referred to in the art as "broadcast packet switching". Broadcast packet switching means that when each subsystem desires to transmit a message, it transmits the message on the bus so that all subsystems "hear" or receive the message. The message, or "packet", includes a destination address so that only the addressed subsystem will act on the message.

One example of a system or network employing broadcast packet switching is the ETHERNET System, described in U.S. Pat. No. 4,063,220, issued to Robert M. Metcalfe et al., and in Metcalfe & Boggs, Ethernet: Distributed Packet Switching for Local Computer Networks, 7 Comm. of The ACM 395 (1976). In the ETHERNET System, a plurality of subsystems or stations are connected by taps along a coaxial cable bus, so that the message generated by any station is broadcasted in both directions along the coaxial cable to all of the stations. In order to prevent message interference resulting from simultaneous transmission from two stations, the stations are operated so that they will not transmit if they detect a message already being transmitted on the bus. Also, each station compares the message that it is transmitting with the message being carried on the bus, in order to detect interference resulting from two stations beginning their transmission simultaneously.

Another example of a system employing broadcast packet switching is the FIBERNET System, described in Rawson and Metcalfe, Fibernet: Multimode Optical Fibers For Local Computer Networks, 26 IEEE Trans. on Comm. 93 (1978). In the FIBERNET System, a plurality of stations or subsystems are each connected to an optical star coupler by a pair of optical transmission lines. One of each pair of transmission lines carries optical signals from the star coupler to a station, and the other of each pair of transmission lines carry signals from the station to the star coupler. When a signal is generated by any station, the signal is passed through the star coupler to all of the stations, including the station from which it came.

The use of a star coupler, such as contemplated in the FIBERNET System, does provide some advantages over the use of a single coaxial cable bus, such as that proposed for use in the ETHERNET System. For example, in the FIBERNET System, all messages pass through the star coupler before being received by any of the subsystems. Consequently, if two subsystems should transmit simultaneously, the two messages are combined at the star coupler and all subsystems receive the same combined and garbled message. In contrast, two interfering messages in the single bus ETHERNET System can combine differently at all points along the bus, and perhaps "look" like a valid message to one subsystem and an invalid message to another subsystem.

Furthermore, all messages in a system employing a centrally located star coupler, such as the FIBERNET System, are of the same strength or intensity, since all subsystems are located at approximately equal distances from the star coupler. In the FIBERNET System, in contrast to the ETHERNET System, there is little likelihood of the circumstances occurring where two messages interfere and are each invalid, but the messages are not sensed as invalid because of one message being much stronger than the other.

There are some problems, however, also associated with the FIBERNET System. For example, the FIBERNET System is not as readily expandable as, for example, the ETHERNET System, since a star coupler typically has a limited number of ports which receive the optical transmission lines leading to each subsystem. As the system is expanded, the star coupler must be replaced by a star coupler having a larger number of ports.

A further problem associated with both the ETHERNET System and the FIBERNET System results from the lack of central control over the use of the communication lines linking the subsystems. In both systems, it is absolutely essential that every subsystem, whether it is an intended destination of each message or not, receive every message in order to determine if it is being addressed by the message. The reliability of the entire system is jeopardized if but a single subsystem is unable to receive a message, and the transmitting subsystem is unaware of this circumstance.

As a result, there has arisen the need for a reliable and readily expandable data processing system that employs broadcast packet switching.

SUMMARY OF THE INVENTION

There is provided, in accordance with the present invention, a data processing system that has a plurality of subsystems, a bus for carrying messages between the subsystems, and a processor within at least one of the subsystems. The subsystem having the processor also has a mailbox memory for storing header or control information of each message received by the subsystem as an entry in the mailbox memory, and mailbox addressing means or circuitry for sequentially accessing the mailbox memory to store each entry. The mailbox addressing circuitry includes means for pointing to the next entry following the entry of the last received message, so that each entry of control information of each received message can be stored without interrupting the processor.

The mailbox memory may be a portion or section of a larger local memory of the subsystem, and the mailbox addressing circuitry may be part of DMA (direct memory access) circuitry that also sequentially accesses memory locations in the local memory in order to store blocks of data that may accompany the control information in a received message.

By storing the header information in the mailbox memory, and separately storing the blocks of data elsewhere in the local memory, the blocks of data may be stored at memory locations where they may be directly accessed by the processor during the execution of a task.

In a disclosed preferred embodiment, the data processing system includes a plurality of subsystems and a system bus linking the subsystems, with broadcast packet switching used for delivering messages over the system bus between the subsystems. The system bus includes an optical star coupler and pairs of optical transmission lines, each pair of transmission lines having plural ones of the subsystems coupled thereto and carrying signals to and from the star coupler. Each message carried over the system bus is either a header-only message or a header and data message, with the header-only message having only header or control information, and with the header and data message having both header information and blocks of data. When data is requested by one of the subsystems from another of the subsystems, the requesting subsystem sends a header-only message that includes the address at which the requested data is to be stored in the local memory of the requesting subsystem. This address, referred to as a data starting (DSA) address, is included in a header and data message that is returned with the requested data. The DSA address is included in the header information of the returning header and data message, and, after the header information has been stored as an entry in the mailbox, the DSA address is used by the DMA to begin storing the requested blocks of data at the memory location in the local memory specified by the DSA address.

A system bus interface couples each subsystem to the system bus and includes the DMA circuitry for storing both the blocks of data and the header information directly into the local memory. The DMA circuitry includes mailbox addressing circuitry that stores the parameters or limits of the mailbox, including an address defining the beginning memory location of the mailbox, an address defining the ending memory location of the mailbox, as well as the address of the first entry available in the mailbox to be accessed by the processor and the address following the last entry in the mailbox at which the next entry received is stored.

Also disclosed are a data processing system having a system bus that includes an electrical star coupler and a data processing system having a system bus that includes a magnetic star coupler.

For purposes of describing the broader aspects of the present invention, a star coupler can be thought of as a common point or device that receives signals from a plurality of stations, mixes or logically OR's the signals and then passes the resulting signal back to all of the stations. In particular, a star coupler is linked to each of a plurality of stations by pairs of transmission lines, one of the lines for carrying to the star coupler signals transmitted at the station and the other of the lines for carrying any signals received by the star coupler back to all of the stations, including the station transmitting the signals.

Since all of the subsystems in the data processing system of the present invention are linked by a star coupler, all subsystems will receive the same signal that has been transmitted by any one or more of the subsystems. Since the subsystems at any station can be increased in number by coupling additional subsystems to the electrical transmission lines within the cabinet at the station, the processing and memory capability of the disclosed data processing system is readily expandable.

It is, therefore, an object of the present invention to provide an improved data processing system.

It is another object of the present invention to provide a data processing system having a plurality of subsystems and employing broadcast packet switching.

Still another object of the present invention is to provide DMA circuitry in a data processing system employing broadcast packet switching.

Still a further object of the present invention is to provide a data processing system employing broadcast packet switching and having a high degree of reliability.

Still another object of the present invention is to provide a data processing system where messages containing requested data can be received by subsystems, with the requested data stored directly at the local memory of the requesting subsystem where it can be used by the processor of the subsystem for executing a task.

Other objects of the present invention will be apparent from the following description and the attached drawings, wherein like reference numbers indicate like parts.

BRIEF DESCRIPTION OF THE DRAWINGS

FIG. 1 is a simplified block diagram of a data processing system in accordance with the present invention, including a star coupler and a plurality of stations, each station linked by a pair of transmission lines to the star coupler.

FIG. 2 is a simplified block diagram of the data processing system of FIG. 1, illustrating a plurality of subsystems at each station.

FIG. 3 is a simplified block diagram showing in greater detail a plurality of subsystems at one station in the data processing system of FIGS. 1 and 2, the subsystems including processor modules, memory modules and an I/O module each coupled to the pair of transmission lines from the star coupler.

FIG. 4 is a circuit diagram showing the bus driver circuit and bus receiver circuit connecting each system bus interface to the system bus.

FIG. 5 is a block diagram of a passive optical star coupler that could be employed in the data processing system of FIGS. 1 and 2.

In FIGS. 37 through 89L the positional relationship of Figures identified by the same number, but followed by a different letter, is shown in the Figure identified by the same number not followed by a letter.

DETAILED DESCRIPTION OF THE PREFERRED EMBODIMENTS

Data Processing System 10 (General)

Figure 6:
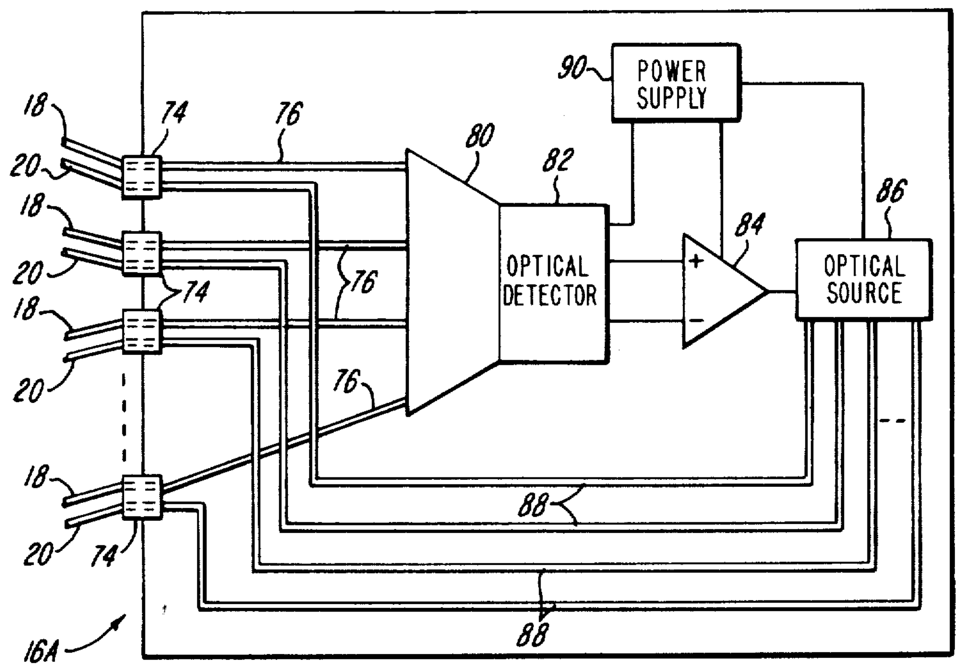
FIG. 6 is a simplified block diagram of an active optical star coupler that could be employed in the data processing system of FIGS. 1 and 2.

Referring now to FIG. 1, there is shown in general and simplified form a data processing system 10 in accordance with the present invention. The data processing system 10 is comprised of a plurality of stations 12, each of which is linked by an associated cable 14 to a central star coupler 16. Each cable 14 comprises a first transmission line 18 and a second transmission line 20. As is conventional in systems employing star couplers, the star coupler 16 receives a signal generated or transmitted at any one of the stations from the first transmission line 18 associated with that one of the stations. The star coupler then directs that signal to all of the second transmission lines 20 for transmission to all of the stations, including the station that generated the signal.

As will be more fully described later, it is contemplated that in the actual practice of the present invention each of the stations 12 includes data processing equipment located within a single cabinet. Therefore, if the data processing system 10 were viewed in its actual physical form, one would see a plurality of cabinets, each for housing data processing equipment, and a centrally located cabinet for housing the star coupler 16, with the star coupler 16 connected to each of the cabinets by the cables 14.

It should be noted that, for reasons which will become apparent later, the data processing system 10 in its preferred form is a local network, i.e., the stations 12 are not separated by long distances. Accordingly, each of the cables 14 is no longer than, say, 300 feet (approximately 91 meters), with all of the stations probably located within a single building and considered, for all practical purposes, a single "computer system".

It should be further noted that the star coupler 16, in its preferred form, is an optical star coupler. Accordingly, optical signals are generated at each of the stations 12 and are carried along the first transmission lines 18 to the star coupler 16. The star coupler 16, in turn, directs those optical signals back to all of the stations 12 along the second transmission lines 20. The first and second transmission lines 18 and 20 could each comprise a single optical fiber, suitably wrapped and packaged together to form the cable 14.

Referring now to FIG. 2, there is shown in greater detail the data processing system 10 in accordance with one aspect of the present invention. As seen in FIG. 2, each of the stations 12 include a plurality of subsystems 24, with the subsystems 24 at each station enclosed by broken lines in the drawings to indicate their physical enclosure within a cabinet. Each first transmission line 18 has an associated internal transmission line 18A within the cabinet or station 12, and each second transmission line 20 has an associated internal transmission line 20A within the cabinet or station 12. Each of the subsystems 24 is connected to the internal transmission lines 18A and 20A so that each subsystem transmits messages along the internal transmission line 18A and receives messages along the internal transmission line 20A.

In a preferred form of the present invention, the transmission lines 18A and 20A are each formed by a coaxial electrical line or cable and carry electrical signals, which are converted into or from optical signals at the transmission lines 18 and 20 by an optical interface (not shown in FIG. 2). In addition, each of the subsystems 24, as will be more fully described later, is coupled or tapped into the internal electrical transmission lines 18A and 20A without disrupting the connection of any other subsystem to the transmission lines 18A and 20A. The data processing system 10 can thus be seen as providing both the advantages of an optical star coupler-based system, such as the previously mentioned Fibernet System, since the star coupler 16 is centrally located and directs optical signals from any one of the stations 12 back to all of the stations 12, and advantages of a readily expandable electrical system, such as the previously mentioned ETHERNET System, since subsystems within each station 12 may be added along the internal transmission lines 18A and 20A.

Since the message or information packet sent by any one of the subsystems 24 is broadcasted to all of the subsystems 24, there is no selection or control of paths to route a message packet from one subsystem 24 to another subsystem 24. Accordingly, for purposes of transmitting or receiving message packets, the subsystems 24 operate as if all the pairs of first and second internal transmission lines 18A and 20A, all the first and second transmission lines 18 and 20, and the star coupler 16 were, collectively, a single bus. This ostensible single bus, for purposes of describing the present invention, is hereinafter referred to as the "System Bus".

In FIG. 3, there is shown in greater detail the subsystems within the cabinet of one of the stations 12. As can be seen, the subsystems are shown as processor modules 24A, memory modules 24B, and an I/O module 24C. Each of the processor modules 24A, memory modules 24B and I/O module 24C is connected to the internal transmission lines 18A and 20A through a system bus interface 28. Each system bus interface 28, as will be described in greater detail later in conjunction with FIGS. 13 through 17C, includes circuitry for encoding messages transmitted on the System Bus, for adding preambles, postambles, flags and CRC bits to messages transmitted on the System Bus, for decoding messages received from the System Bus, for checking received messages for errors, for monitoring the System Bus for an idle condition before its associated subsystem 24 can transmit, for comparing any message transmitted by its associated subsystem with the messages received to determine if a message from another module is interfering with its transmitted message, and for performing DMA (direct memory access) functions so that data can be read from or written into the local memory of the associated subsystem without repeated processor commands.

The system bus interface 28 associated with each processor module 24A, memory module 24B and I/O module 24C is connected to each of the internal transmission lines 18A and 20A by circuitry and T-couplers that will be described in detail later in connection with FIG. 4. The internal transmission lines 18A and 20A are in turn coupled or connected to the external optical transmission lines 18 and 20 by an optical interface circuit 32 which, as seen in FIG. 3, includes an optical source 34 and an optical detector 36.

Still referring to FIG. 3, the internal transmission line 18A is connected to each of the processor, memory and I/O modules for carrying messages in one direction, which is illustrated by an arrow 40 that is pointing toward the right as viewed in FIG. 3. The internal transmission line 20A, on the other hand, is connected to each of the processor, memory and I/O modules for carrying signals in an opposite direction, which is illustrated by an arrow 42 that is pointing toward the left as viewed in FIG. 3. The messages carried on internal transmission line 18A are in the form of electrical signals and are converted by the optical source 34 to optical signals and are passed to the optical transmission line 18, which in turn carries the optical signals to the optical star coupler 16. The optical star coupler 16, in turn, directs the optical signals received from any one of the optical transmission lines 18 to every optical transmission line 20, including the one returning to the cabinet or station 12 that generated the message. As seen in FIG. 3, the optical signals on the transmission line 20 are received at the optical detector 36 at each cabinet or station 12 and are converted into electrical signals that are passed to the internal transmission line 20A. All of the processor, memory and I/O modules receive the message or signals that are passed along the internal transmission line 20A, including any one of the modules that may at that very moment be transmitting the same message.

In an alternate form of the present invention the internal transmission lines 18A and 20A could be connected directly to, or even formed integrally with, the external lines 18 and 20, respectively. That is, for example, the internal transmission line 18A could be an optical line and an integral end section of the external optical transmission line 18, and the internal transmission line 20A could be an optical line and an integral end section of the external optical transmission line 20. In such a case, there would be no optical interface 32 and each system bus interface 28 would be connected to the internal transmission lines 18A and 20A by a suitable optical T-coupler.

However, the use of the electrical lines 18A and 20A in the system 10 as shown in FIGS. 1 through 3 is preferred because they may be implemented with low-cost electrical coaxial cables and T-connectors. The electrical conductors are adequately shielded within the cabinet or station 12 from radio frequency interference (RFI) and electromagnetic interference (EMI). Away from each of the stations 12, the optical transmission lines 18 and 20 are preferred since they will not be subjected to RFI and EMI by virtue of their being optical fibers.

BUS DRIVER CIRCUIT 46 & BUS RECEIVER 58

In FIG. 4 there is illustrated the circuitry within each system bus interface 28 that physically and electrically connects the system bus interface to the internal transmission lines 18A and 20A. As shown, the message transmitted by any one of the modules or subsystems 24 is passed within the system bus interface 28 to a bus driver circuit 46. The bus driver circuit 46 includes a Schottky TTL driver 48 that has its output connected to the transmission line 18A by way of a transistor 50. The emitter of the transistor 50 is physically connected to the line 18A by a suitable conventional coaxial T-coupler 52. The collector of transistor 50 is connected to a voltage source +V, and a resistor 54 is connected between the voltage source +V and the base of transistor 50. Although signals placed on the transmission line 18A will tend to propagate in both directions, only those signals traveling in the direction of arrow 40 (FIGS. 3 and 4) will be converted into optical signals at the optical interface 32 (FIG. 3) and be passed to the star coupler 16.

Referring still to FIG. 4, signals traveling in the direction of arrow 42 from the optical detector 36 (FIG. 3) along the transmission line 20A are passed, by way of a coaxial T-coupler 56, to a bus receiver circuit that includes a TTL line receiver 58. The message received by the receiver 58, after passing through the system bus interface 28, is provided to its associated module 24A, 24B or 24C.

STAR COUPLERS 16, 16A, 6B & 16C

It should be apparent from the description thus far that the data processing system 10 is readily expandable even though the stations 12 are linked by the star coupler 16. The internal transmission lines 18A and 20A within the cabinets at each station 12 may be nondestructively tapped into by the T-couplers 52 and 56. Accordingly, the number of processor modules 24A, memory modules 24B, or I/O modules 24C that may be added is theoretically unlimited (providing there is unlimited bus capacity), as long as sufficient volume is provided within each cabinet for positioning the modules.

Since it is contemplated that the data processing system 10 can be expanded as processing or memory requirements increase, it could well be that the system 10 comprises, for a user initially needing only small computer capability, a single one of the cabinets or stations 12. In such a case, as processing and memory needs increase, the user would first add additional subsystems 24 at a single station. Then, as needs further increase, the user would employ the star coupler 16 in order to link plural stations or cabinets. In the case where only one station or cabinet is needed initially, the return path of the System Bus to that station formed by external transmission line 18, star coupler 16, and external transmission line 20 could be replaced by a single connecting transmission line 62, seen as a broken line in FIG. 3. The connecting transmission line 62 would comprise a coaxial electrical line and would provide an electrical path between the internal transmission line 18A and the internal transmission line 20A. When the connecting line 62 is in place, and if any one of the modules 24A, 24B or 24C within the station 12 of FIG. 3 transmits a message, the message is carried down line 18A, across connecting line 62, and then back along line 20A to each of the modules. The optical interface 32 is, of course, not needed when the connecting line 62 is used.

Referring now to FIG. 5 there is shown in greater detail the star coupler 16 in one preferred form. The star coupler 16 is a passive star coupler, meaning that it does not amplify or regenerate any of the optical signals it receives. As seen in FIG. 5, the star coupler 16 includes a mixing element or rod 64 comprising a cylindrical glass core, with the fibers that each make up one of the external transmission lines 18 (FIGS. 1, 2 and 3) having ends terminating at one end face 66 of the mixing rod. The optical fibers that each make up one of the external transmission lines 20 (FIGS. 1, 2 and 3) have ends terminating at an opposite end face 68 of the mixing rod 64. As conventional, the star coupler 16 is constructed so that the fibers of the transmission lines 18 and 20 are optically matched with the mixing rod 64 at the end faces 66 and 68.

When an optical signal is passed from any one of the transmission lines 18 to the mixing rod 64 at the end face 66, it is distributed uniformly across the opposite end face 68 of the mixing rod, and is then passed to each one of the transmission lines 20.

A commercially available passive star coupler that performs the functions of the star coupler 16 as shown in FIG. 5 could, for example, be the sixteen-port star coupler, product No. SPX3720, sold by Spectronics Incorporated, Richardson, Tex.

In circumstances where the data processing system 10 might use optical transmission lines of sufficient length to warrent the use of an active star coupler, an alternate star coupler 16A shown in FIG. 6 would be more suitable. The active star coupler 16A amplifies the optical signals received from any one of the stations 12 by way of one of the transmission lines 18, and then passes the amplified optical signals back to all of the stations 12 by way of the transmission lines 20. As seen in FIG. 6, each pair of the transmission lines 18 and 20 that is associated with each station 12 is connected to the star coupler 16A by an optical coupler 74. The signals received from any one of the transmission lines 18 is passed through the coupler 74 to an optical fiber 76. The signals on each fiber 76 are in turn passed to a tapered waveguide 80, which directs the optical signals to an optical detector 82. The optical detector 82 converts the optical signals to electrical signals, which are then amplified by an electrical amplifier 84. The amplified electrical signals are presented to an optical source 86, which includes suitable source driver circuitry and an optical interface, in order to provide amplified optical signals to a plurality of optical fibers 88. Each of the fibers 88 is coupled to one of the tranmission lines 20 at the couplers 74, in order to return the amplified optical signals to each of the stations 12. A power supply 90 provides sufficient operating voltages to the optical detector 82, amplifier 84, and optical source 86. For a more detailed description of an active optical star coupler, such as the star coupler 16A in FIG. 6, reference can be had to U.S. Pat. No. 4,234,968, issued to Amar J. Singh.

Figure 7:
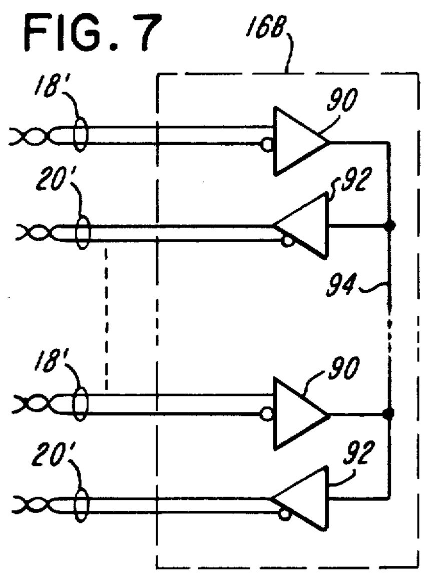
FIG. 7 is a simplified block diagram of an electrical star coupler that could be employed in the data processing system of FIGS. 1 and 2.

While in the preferred embodiment the star coupler 16 in the data processing 10 is an optical star coupler, and the transmission lines 18 and 20 connecting each of the stations 12 to the star coupler are optical fibers or lines, it should be appreciated that other forms of star couplers may be used within the scope of the present invention. In FIG. 7, there is shown an electrical star coupler 16B that includes circuitry for receiving and passing electrical signals at the star coupler and that could alternatively be used in the data processing system 10.

As illustrated in FIG. 7, pairs of external transmission lines 18′ and 20′ link the stations 12 and the star coupler 16B, with each of the lines 18′ and 20′ comprising a twisted pair of electrical conductors rather than an optical fiber as used in the previously described preferred embodiments. The conductors of each transmission line 18′ carry electrical signals from one of the stations 12 and are connected to the input terminals of a single output line receiver 90. The conductors of each transmission line 20′ carry electrical signals from the star coupler 16B back to one of the stations 12 and are connected to the output terminals of a single input line driver 92. The output of each receiver 90 and the input of each driver 92 are connected to a common electrical line 94. Accordingly, when a signal is received by one of the receivers 90 from any one of the transmission lines 18′, the signal is provided, by way of the common line 94, to each of the drivers 92. The drivers 92 supply the signal from the common line 94 to each of the transmission lines 20′, which then return the signal to all of the stations 12. The receivers 90 may each be implemented by a Line Receiver Circuit No. 10115 and the drivers 92 may each be implemented by an OR-NOR Circuit No. 10101, both available from Signetics, Inc., Sunnyvale, Calif. The star coupler 16B may also include a conventional power supply (not shown), for supplying suitable operating voltages to each of the receivers 90 and drivers 92.

Figure 8:
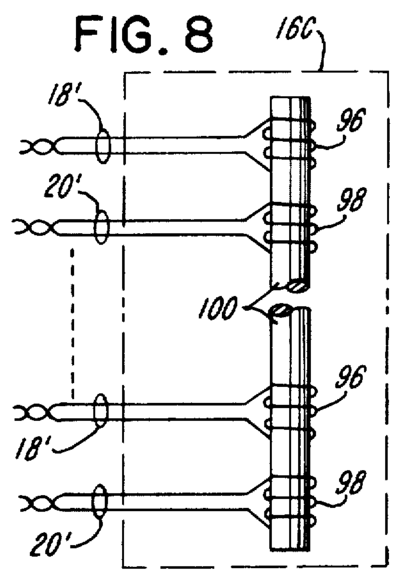
FIG. 8 is a simplified block diagram of a magnetic star coupler that could be employed in the data processing system of FIGS. 1 and 2.

In FIG. 8, there is shown a magnetic star coupler 16C that could also be alternatively used in the data processing system 10. The external transmission lines 18′ and 20′ can again each comprise a pair of twisted electrical conductors, with each of the transmission lines 18′ and 20′ formed into coils 96 and 98, respectively, along a core or rod 100. The coils 96 are wound oppositely relative to the coils 98. The rod 100 is made of a suitable ferromagnetic material, such as ferrite, so that when an electrical signal is received from any one of the transmission lines 18′, a change in magnetic flux is induced in the rod 100 and a corresponding signal is provided to each of the transmission lines 20′. The star coupler 16C could be located within a suitably shielded cabinet but, unlike the electrical star coupler 16B in FIG. 7, it is passive and requires no power supply.

MODULES 24A, 24B & 24C

Referring again briefly to FIG. 3, it has earlier been noted that the ability to add the memory modules 24A and the processor modules 24B along the internal transmission lines 18A and 20A within each station 12 permits the system 10 to have either its memory capacity or processing capacity increased at will. It is envisioned that the processor modules 24A, memory modules 24B and I/O modules 24C are self-contained, with much of the circuitry of each fabricated on one or a few VLSI (very large-scale integration) chips. Each of the modules has its own processor and a local memory storing data to be processed by its processor. In contrast to traditional systems, however, the data processing system 10 of FIG. 1 has no single processor that both performs normal processing tasks and also controls the operation of the memories or peripheral devices. Rather, each memory module 24B has sufficient processing capability to manage the memory operations in its own module, and manage those memory operations independently of any one of the processing modules 24A. In addition, each of the processor modules 24A contains a sufficient amount of memory that is not shared with any other module, so that the processor module will not need to frequently access any of the memory modules.

Of course, the data processing system 10 requires suitable data entry and data output points, which are provided by each of the I/O modules 24C. Each I/O module 24C, as will be described in greater detail below, is connected to a peripheral device and includes the necessary processing and memory capability to manage the transfer of data between the peripheral device and one of the processor modules 24A or memory modules 24B.

Figure 9:
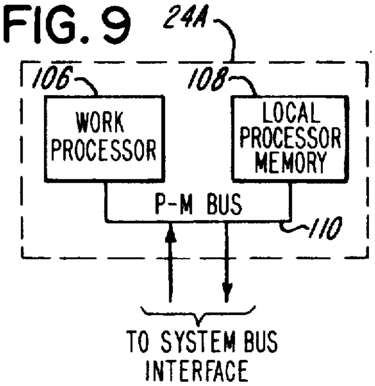
FIG. 9 is a simplified block diagram illustrating one of the processor modules shown in FIG. 3.
Figure 10:
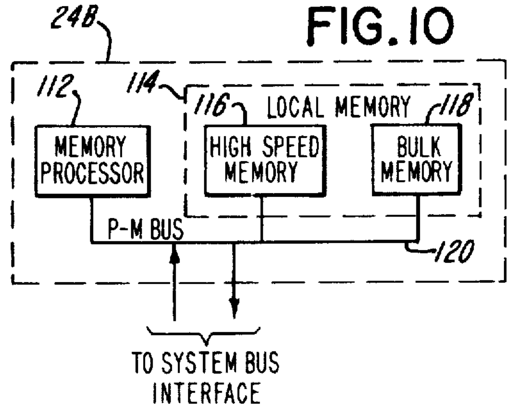
FIG. 10 is a simplified block diagram illustrating one of the memory modules shown in FIG. 3.
Figure 11:
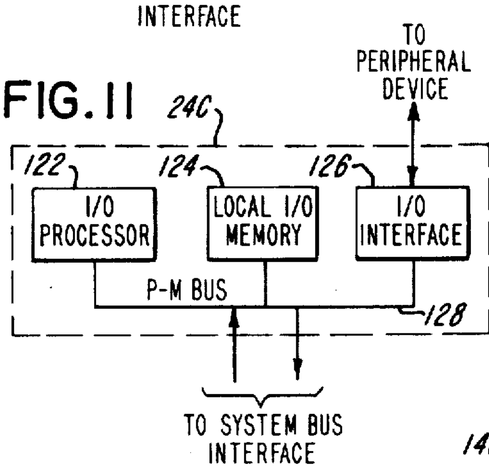
FIG. 11 is a simplified block diagram illustrating the I/O module shown in FIG. 3.

FIGS. 9, 10 and 11 show in greater detail the structure of each processor module 24A, memory module 24B, and I/O module 24C, respectively.

PROCESSOR MODULE 24A

Referring first to FIG. 9, it can be seen that the processor module 24A includes a work processor 106 and a local processor memory 108. The work processor 106 and the local memory 108 are connected by an internal processor-memory (P-M) bus 110 so that, as conventional, the work processor may read software instructions from addressable memory locations in the local memory 108 and read data from or write data into the addressable memory locations in the local memory 108. The term "work processor" is used to refer to the processor 106 because the processor 106 performs the actual execution of software programs and steps to complete jobs or tasks provided to the data processing system 10. While the work processor 106 does perform some memory management operations relating to its associated local memory 108, it does not control the memory operations performed within any of the memory modules 24B, other than merely to request or provide data to the memory modules 24B.

The local memory 108 may be a suitable high access-speed memory, such as commonly found in processor cache memories, so that software and data in the local memory may be quickly provided when needed for use by the work processor 106. However, the local memory 108 is also sufficiently large, in fact, larger than traditional cache memories, so that data normally needed by the work processor to complete any given job or task resides largely in the local memory 108. Only when the processor module 24A needs a large block of data, must the work processor 106 send a request to one of the memory modules 24B or to one of the I/O modules 24C for data. As a result, the System Bus which interconnects all of the processor modules 24A and memory modules 24B is not crowded with excessive numbers of data requests. Rather, each work processor will frequently be able to find the data it needs in order to complete a task within its own local memory 108. When the work processor 106 does need a block of data that is only stored in one of the memory modules 24B or must come from a peripheral device through one of the I/O modules 24C, it broadcasts the request. The request is placed on the System Bus in the form of a message that includes the address or identification of the module that has the needed data (as well as the module that is requesting the data), so that the addressed module can receive and act on the request.

MEMORY MODULE 24B

In FIG. 10 the memory module 24B is shown as including a memory processor 112 and a local memory 114, with the local memory 114 including a high speed memory 116 and a large-capacity bulk memory 118. The memory processor 112 is connected to the high speed memory 116 and to the bulk memory 118 by an internal processor-memory (P-M) bus 120 so that, in response to requests from any one of the processor modules 24A, the memory processor 112 can access data stored in either the high speed memory 116 or the bulk memory 118. The high-speed memory and bulk memory are arranged in a conventional, hierarchial configuration, with the high speed memory 116 being a fast access RAM and the bulk memory 118 being, for example, a magnetic disk having slower-access speed but a considerably larger storage capacity than the high-speed memory 116. The memory processor 112, as will be described below, performs a number of memory management operations, one of which includes the transfer of data between the high speed memory 116 and the bulk memory 118.

The memory processor 112 is microprogrammed to perform many memory operations that in more traditional data processing systems would be performed by a central work processor. By performing these operations in the memory processor 112, the need for requests or commands between the processor modules 24A and the memory modules 24B is vastly reduced, thereby making the processor modules 24A and memory modules 24B less dependent on communications with each other and, in turn, making the data processing system 10 readily expandable with minimal effect on the software in accordance with which the work processors 106 are operating.

The types of memory operations performed by the memory processor 112 can include the following:

(1) receiving and operating on read requests, write requests, and other memory access operations;

(2) exercising ownership control, so that if data is accessed by one processor module 24A, that data can be made inaccessable to any other processor module 24A;

(3) performing global claim management functions, to avoid two processor modules 24A being placed in deadlock because each desires data that only the other has access to;

(4) performing queue management functions, by maintaining lists or queues of messages that are stored in the memory module and that are being sent to and from programs executing in the various processor modules 24A, so that as each program is free to take a message, it takes or acts on the message at the top of the queue containing messages directed to it;

(5) performing time-of-day services to permit start and end times to be given to each job acted on by one of the processor modules 24A;

(6) duplicating certain files of data using independent memory modules so that if damage is done to a file or block of data or to a memory module, and the data is critical, the duplicate files may then be accessed by the processor modules;

(7) transferring data between the high-speed memory 116 and the low access-speed bulk memory 118 within the memory modules; and (8) managing and allocating space within the bulk memory such that the processor modules need know nothing about the physical placement of related data.

I/O MODULE 24C

In FIG. 11, the I/O module 24C is shown in ggreater detail. The illustrated I/O module 24C includes an I/O processor 122, a local I/O memory 124, and I/O interface circuitry 126. The I/O processor 122 is connected to the local I/O memory 124 and the I/O interface circuitry 126 by an internal processor-memory (P-M) bus 128. The I/O interface circuitry 126 is connected to a peripheral device, such as a keyboard, CRT display, printer, magnetic tape unit, or the like.

Data may either be transferred into or out of the system 10 at the I/O module 24C. If either a processor module 24A or a memory module 24B needs data from a peripheral device, a message, having the destination address of the I/O module 24C connected to the peripheral device, is transmitted over the System Bus and is stored in the local I/O memory 124. The I/O processor 122 will use the message stored in the local I/O memory 124 to generate specific commands for obtaining data, such commands passing through the I/O interface circuitry 126 to the peripheral device. Data is returned by the peripheral device and is stored in the local I/O memory until the I/O processor 122 formulates a message that will include the data. The message is transmitted or broadcasted on the System Bus and has the destination address of the module that requested the data.

Of course, in other circumstances the peripheral device itself may initiate the transfer of data. In such circumstances, the peripheral device loads the local I/O memory 124 with the data and, in response, the I/O processor 122 will send a message, including the data, to a selected memory or processor module.

While not shown in the drawings, any one of the modules 24A, 24B or 24C could be connected to more than one System Bus by, for example, connecting a completely independent second System Bus to the P-M bus of the module by way of a separate second system bus interface (not shown). Furthermore, any one of the modules could be connected, by way of an additional system bus interface (not shown), to an additional single bus that could be used solely for transferring messages between that module and one other module. While not part of the present invention, such a connection might be useful when two subsystems or modules have a disproportionate need for communicating with each other and would otherwise require the use of the System Bus.

MESSAGE FORMATS

Figure 12A:
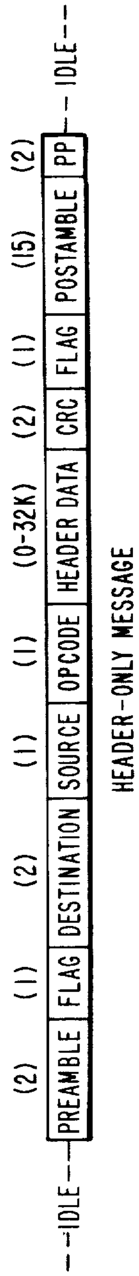
FIGS. 12A and 12B illustrate the format of messages transmitted by subsystems in the data processing system of FIGS. 1 and 2.
Figure 12B:
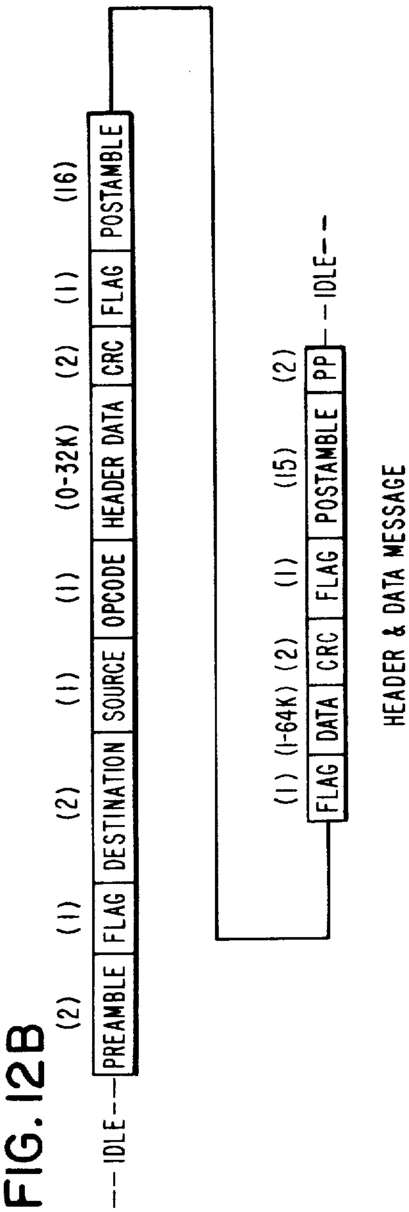

In FIGS. 12A and 12B there is shown the format of messages that are transmitted from any one of the modules or subsystems 24 along the System Bus to another one of the subsystems 24. Each message is shown in the drawings as having a number of fields, with the number of bytes in each field shown in parentheses above the field. As can be seen in FIGS. 12A and 12B, the message can be one of two types:

(1) a header-only message; or (2) a header and data message. For reasons which will become apparent later, each message is always preceded and followed by an idle condition of the System Bus.

A header-only message is a message sent from one subsystem to another when the message only contains control information, such as a data or service request, information relating to status, or a limited amount of data information. On the other hand, a header and data message is a message sent from one subsystem to another which includes header control information and accompanying blocks of data to be stored in the local memory of the destination subsystem. Messages that are generally of the type referred to herein as "header-only" or "header and data" type are well known to those skilled in the art, and the general manner in which such messages cause the individual subsystems 24 to ultimately operate forms no part of the present invention and will not be described in detail herein.

Referring now in particular to FIG. 12A, it can be seen that the header-only message has ten fields in the following order:

(1) preamble
(2) first single flag
(3) destination address
(4) source address
(5) op code
(6) optional header data
(7) cyclical redundancy code (CRC)
(8) second single flag
(9) postamble
(10) post-postamble (PP).

The preamble in the header-only message indicates to all receiving subsystems that a message is beginning. The preamble only occurs after the transmitting subsystem detects an idle condition on the System Bus. The preamble consists, for example, of two flag characters. In the preferred form of the present invention, it is contemplated that each flag character consists of one byte (eight bits) as follows:

01111110

After the generation of the preamble, a single flag character is generated and then two one-byte destination addresses that indicate to each of the subsystems the address or addresses of the intended destination of the message. As will be more fully described later, the system bus interface 28 associated with each subsystem 24 includes circuitry for recognizing the unique address of its associated subsystem or the group address of a group of subsystems that includes its associated subsystem.

In a preferred form of the present invention, it is contemplated that, in addition to a unique one-byte address associated with each of the subsystems 24, there are several one-byte group addresses that include the following:

(1) memory module group address;
(2) application or work processor module group address;
(3) I/O processor module group address; and
(4) data base processor module group address.

Other available group addresses can be assigned as needed.

When the destination address field has an address representing the memory module group address, all memory modules within the data processing system 10 are destination subsystems, and all will receive and act on the transmitted message if the message is successfully transmitted. Similarly, if the destination field contains the work processor module group address, all processor modules within the system 10 that perform user or application tasks will receive and act on the message. If the destination field contains the I/O processor module group address, all processors within the system that perform input/output functions will receive and act on the message. Finally, if the destination field contains the data base processor module group address, all processor modules within the data processing system 10 that perfom data base functions will copy and act on the transmitted message. A data base processor module is similar to the memory module, but may include the necessary programming to perform some processing functions on its stored data, such as merge, sort, or the like.

Since the destination address field is two bytes wide, it can include two unique subsystem addresses, two group addresses, or one subsystem address and one group address. In addition, there is no reason why the address cannot be the address associated with the very subsystem that is transmitting the message.

Also seen in FIG. 12A is the source address field of the header-only message, which follows the destination address field and which comprises one byte (8 bits) of information. The source address informs the destination subsystem of the source of the message, that is, the subsystem generating the message over the System Bus. An op code field, comprising one byte, follows the source address and indicates to the destination subsystem the type of message that is being transmitted. It is contemplated that the op code indicates, at its highest order bit, whether the message is a header-only message, as seen in FIG. 12A, or a header and data message, as seen in FIG. 12B. In addition, the remaining bits of the op code indicate to the destination subsystem the type of command which the message represents. These commands, and the specific operation of any destination subsystem in response to the commands, form no part of the present invention and are not described in any greater detail herein. Depending, of course, upon the type of tasks that the subsystems will be performing, suitable commands to be represented by the bits in the op code field can be found in the command sets of many conventional data processing systems.

Following the op code field is an optional data field of variable length (from zero to 32K bytes) that contains, e.g., operands or other header data necessary for execution of the command represented by the op code in the header. In accordance with one aspect of the present invention to be described more fully later, the data field includes a data starting (DSA) address in the local memory of the sending or source subsystem if the header-only message is a request for data. Following the optional header data field is a two byte (sixteen bit) cyclical redundancy code (CRC) field. The CRC check bits in the CRC field permit each subsystem in the data processing system 10 to check the validity of all the bits preceding the CRC check bits.

Following the CRC field is another flag character which prepares the system bus interface 28 associated with each of the subsystems for receipt of a postamble field in the message. The postamble field consists of 15 bytes, and includes eight flag characters, followed by a series of six bytes of binary zeroes, and then ending with a flag character. The postamble field would thus appear as follows:

FFFFFFFF000000F where each "F" represents a flag character and each "0" represents a byte of zeroes. The postamble is followed by a post-postamble (PP), which consists of two flags. The post-postamble simply continues the self-clocking features of the message long enough to fully clock or strobe the postamble into the system bus interface.

The significance of the postamble in the practice of one aspect of the present invention will be described later in connection with the description of FIG. 15. However, briefly, the postamble is a critical portion of each message transmitted over the System Bus because it permits any subsystem that detects an error to cause the message to be aborted. The subsystem receiving the erroneous message aborts the message by superimposing binary 1's (or some other non-zero signal) on the postamble, so that every subsystem in the data processing system senses a "garbled" postamble and will reject the message.

In FIG. 12B, there is illustrated the format of a header and data message. Each header and data message is used to transfer blocks of data from one subsystem to another subsystem. Other than not having a post-postamble, the header portion of the message in FIG. 12B has the same format as the header-only message in FIG. 12A. The high order bit of the op code field in the header portion indicates to the destination subsystem that the message includes the data portion, which immediately follows the postamble of the header portion. If the header and data message is returning data requested by another subsystem, the header data field of the header portion includes, in its first three bytes, the starting address in the local memory at which the data is to be stored.

The data portion of the header and data message includes a beginning single flag character, a data field which contains blocks of data information of variable length (zero to 64K bytes), followed by sixteen CRC bits, followed in turn by a single flag character, then followed by a postamble field of the same format as the postamble in the header portion, and ending with a post-postamble field (two flag characters). If any subsystem in the data processing system 10 detects an error in the data portion of the message, it garbles the postamble field associated with the data portion of the data and header message. After the post-postamble, the System Bus again goes into an idle condition before any subsequent message is transmitted on the System Bus.

F. SYSTEM BUS INTERFACE 28

Figure 13:
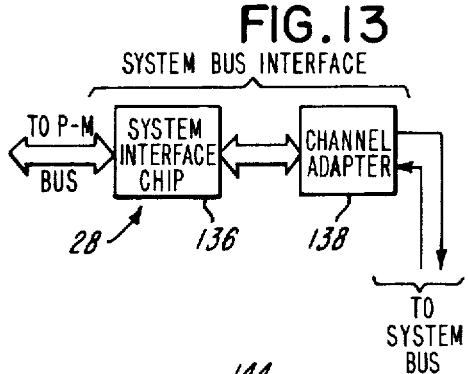
FIG. 13 is a simplified block diagram of the system bus interface shown connecting each subsystem or module to the system bus in FIG. 3.

Turning now to FIG. 13, there is shown in simplified form the major circuit blocks within each system bus interface 28. The system bus interface 28 includes a system interface circuit or chip 136 that, in the preferred embodiment, is fabricated entirely on a single integrated circuit chip. The system interface chip 136 receives and provides data or message information to the P-M bus of its associated subsystem 24. The system interface chip 136 is connected to a channel adapter 138 that, in turn, is connected to the System Bus. The channel adapter 138 both provides messages from its associated subsystem 24 to the System Bus, and receives all messages that are on the System Bus.

Figure 14:
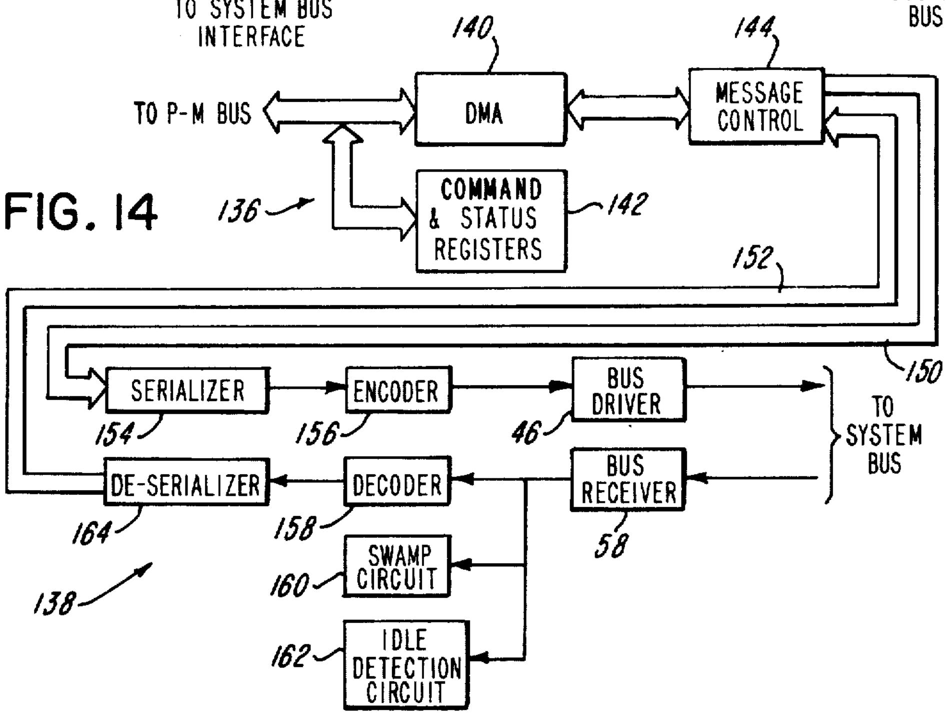
FIG. 14 is a block diagram illustrating in greater detail the circuitry within the system bus interface shown in FIG. 13.

The system interface chip 136 and the channel adapter 138 are shown simplified, but in somewhat greater detail, in FIG. 14. As seen in FIG. 14, the system interface chip 136 includes a DMA (direct memory access) circuit 140, command and status registers 142, and a message control circuit 144. The DMA 140 and command and status registers 142 will be described in greater detail later in conjunction with the FIGS. 21 through 25. However, briefly, in addition to novel features forming certain aspects of the present invention that will be described later, the DMA performs conventional functions, such as buffering messages that are being generated by its associated subsystem or that have been received from the System Bus. The DMA 140 permits blocks of data to be transferred between the local memory of its associated subsystem and the System Bus, by accessing sequential memory locations in the local memory. Since access to the local memory is accomplished by the DMA, independently of the processor in the associated subsystem, the processor is free to perform other operations. The command and status registers 142 simply receive control and status bits from the processor of the associated subsystem or the control circuitry of the system bus interface, and in response provide such bits to the DMA 140 and message control circuit 144 in order to cause the system bus interface to accomplish designated operations.

The message control circuit 144 performs a number of functions that are critical to the operation of the system bus interface and the transmission and receipt of messages on the System Bus. These functions include:

(1) monitoring the System Bus and permitting its associated subsystem to transmit a message only when the System Bus is idle;

(2) receiving data or message information to be transmitted from the associated subsystem and inserting flags, preambles, postambles, and CRC bits;

(3) comparing each byte of information being transmitted by its associated subsystem with each corresponding byte of information received from the System Bus, in order to detect any interference or collision of message (contention garble);

(4) checking the destination address of any received message in order to determine whether its associated subsystem should copy or act on that message;

(5) performing a CRC check on information received on the System Bus, and causing the message to be aborted if an error is detected, regardless of whether the associated subsystem is an addressed destination;

(6) checking the postamble of each message received from the System Bus, and indicating that the message should be disregarded if garble is detected in the postamble;

(7) indicating that the message should be disregarded if other errors (such as swamp or idle errors) are detected;

(8) indicating to its associated subsystem if its message has been successfully transmitted; and (9) generating the necessary control signals to cause the DMA to access successive memory locations in the local memory of its associated subsystem.

The channel adapter 138 is shown in FIG. 14 as connected to the message control circuit 144 by a pair of buses 150 and 152. Messages to be provided to the System Bus are passed, one byte at a time, along the bus 150 to the channel adapter 138. Messages that are received from the System Bus after passing through the channel adapter 138 are passed, one byte at a time, along the bus 152 to the message control circuit 144.

The channel adapter 138 includes a serializer 154 that serializes the message from the bus 150, i.e., converts each byte in the message into a serial stream or bits. In addition, the serializer 154, as conventional, inserts "0's" at appropriate locations in the message so that, as in standard protocols, no more than five consecutive "1's" will appear in the message, other than at control or flag characters.

The serial stream of bits at the output of the serializer 154 is provided to an encoder circuit 156, which encodes the serial stream into a signal suitable for transmission. Such a signal may be in the form of a double frequency code, such as the well-known diphase or Manchester code. The encoded data at the output of encoder circuit 156 is then provided to the bus driver 46, which was described in detail earlier in conjunction with FIG. 4.

Simply circuitry, which by itself forms no part of the present invention, can be associated with either the serializer 154 or the encoder 156 in order to garble a message postamble. Such circuitry gates a source of "1's" or low frequency pulses to the signal line carrying the message, prior to the message being provided by the bus driver 46 to the System Bus. For present purposes, it can be assumed that this garbling circuitry consists simply of a gate or multiplexing circuit that selectively gates 1's at the output of the serializer 154. A specific circuit for garbling the postamble will be illustrated and described later in conjunction with a dual-channel System Bus seen in FIGS. 27 through 36.

When a message or signal is received from the System Bus by the system bus interface 28, it first passes through the bus receiver 58, which was also described earlier in conjunction with FIG. 4. The output of the bus receiver 58 is provided to a decoder circuit 158, a swamp circuit 160, and an idle detection circuit 162.

Exemplary forms of the swamp circuit 160 and the idle detection circuit 162 will be described in detail later in conjunction with FIG. 26. Briefly, the swamp circuit 160 monitors the pulse width of the encoded messages received from the System Bus, and provides a signal (not shown in FIG. 14) indicating to the message control circuit 144 when a signal having excessive pulse widths, such as one resulting from two interfering messages, is received. The idle detection circuit 162 monitors the System Bus for an idle condition, and provides a signal (not shown in FIG. 14) indicating to the message control circuit 144 when the System Bus is idle so that, among other things, a message from the message control circuit 144 is passed to the channel adapter 138 only when no other message is already on the System Bus. If an idle condition occurs at an inappropriate point in time, such as during a message, the message control circuit will determine that an idle error condition exists. The System Bus is detected as idle if the interval between pulses on the System Bus exceeds the normal interval between each pulse in an encoded message.

The decoder circuit 158 receives the encoded message from the output of the bus receiver 58, and decodes the signal in order to provide a serial stream of bits to a de-serializer 164. The de-serializer 164 takes the serial bits of the message and, in a conventional fashion, converts the message into parallel bytes and deletes any "0's" that were inserted when the message was serialized. The output of the de-serializer is provided to the message control circuit 144 by way of the bus 152.

Figure 15:
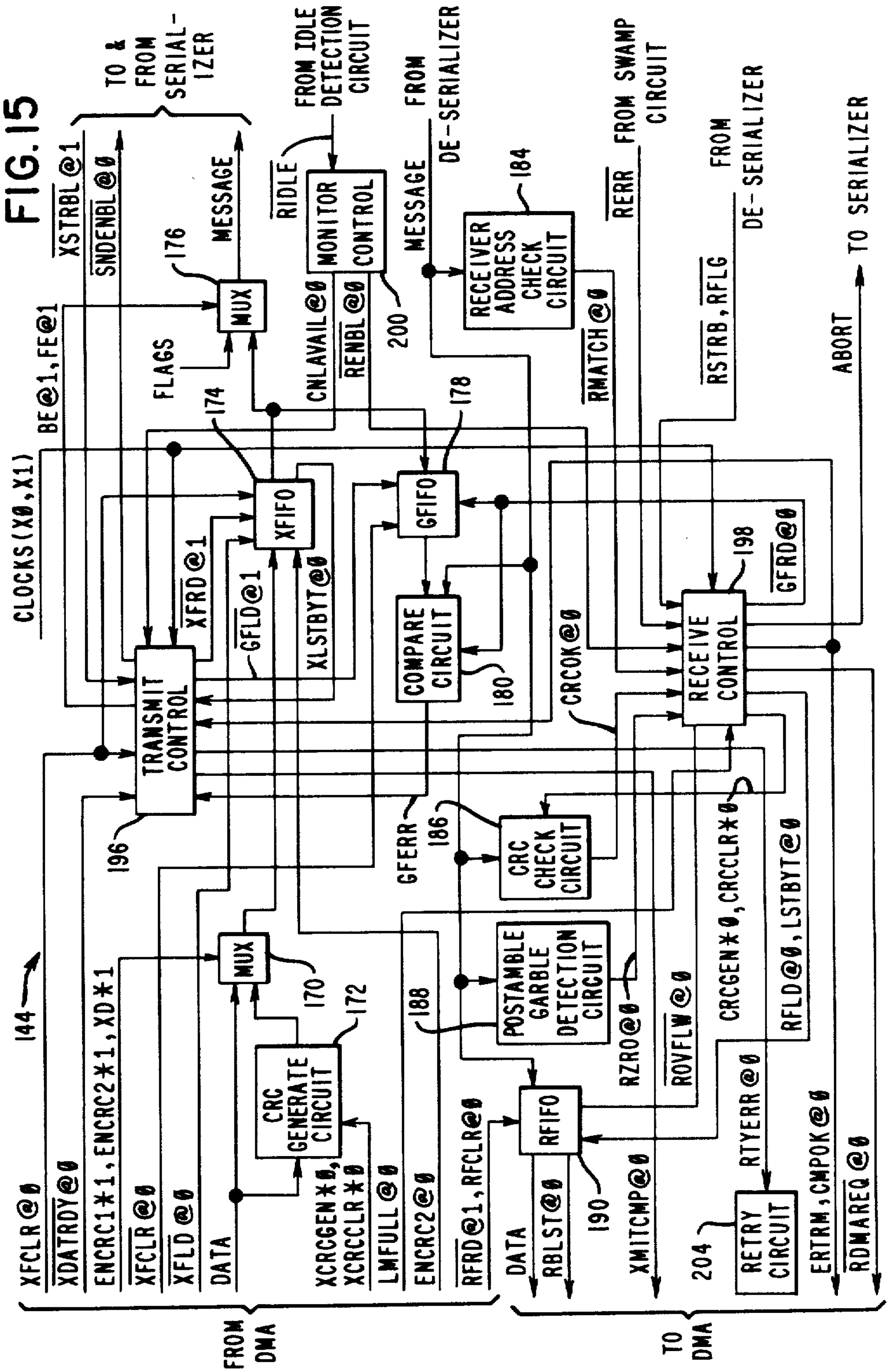
FIG. 15 is a detailed block diagram of the message control circuit shown in the system bus interface of FIG. 14.

FIG. 15 illustrates, in simplified form, the major circuit components within the message control circuit 144. As noted earlier, each message control circuit 144 performs a number of functions in controlling the transmission and receipt of messages at its associated subsystem 24. At the heart of one aspect of the present invention are the following functions:

(1) the detection of contention garble, i.e., the collision or interference between a message being transmitted by the associated subsystem and a message simultaneously transmitted by another subsystem;

(2) the detection of message errors, such as CRC errors, in any message on the System Bus, by the message control circuit 144 associated with every subsystem 24 in the data processing system 10, and causing the postamble of the message to be garbled if such an error is detected, and (3) the detection of a garbled postamble by the message control circuit 144 associated with every subsystem 24, and causing each subsystem to ignore or reject a message if a garbled postamble is detected.

Figure 89A:
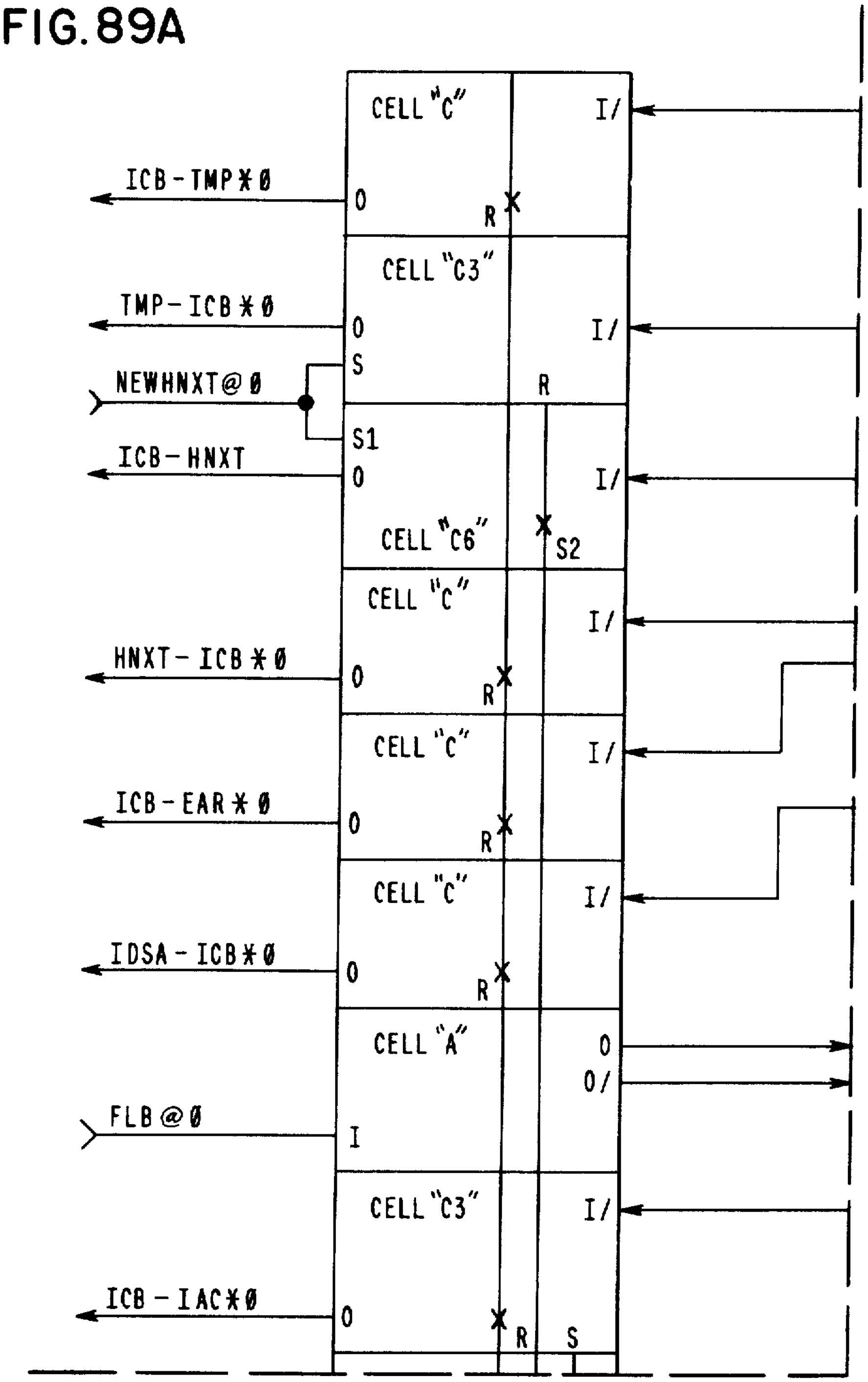
Figure 89B:
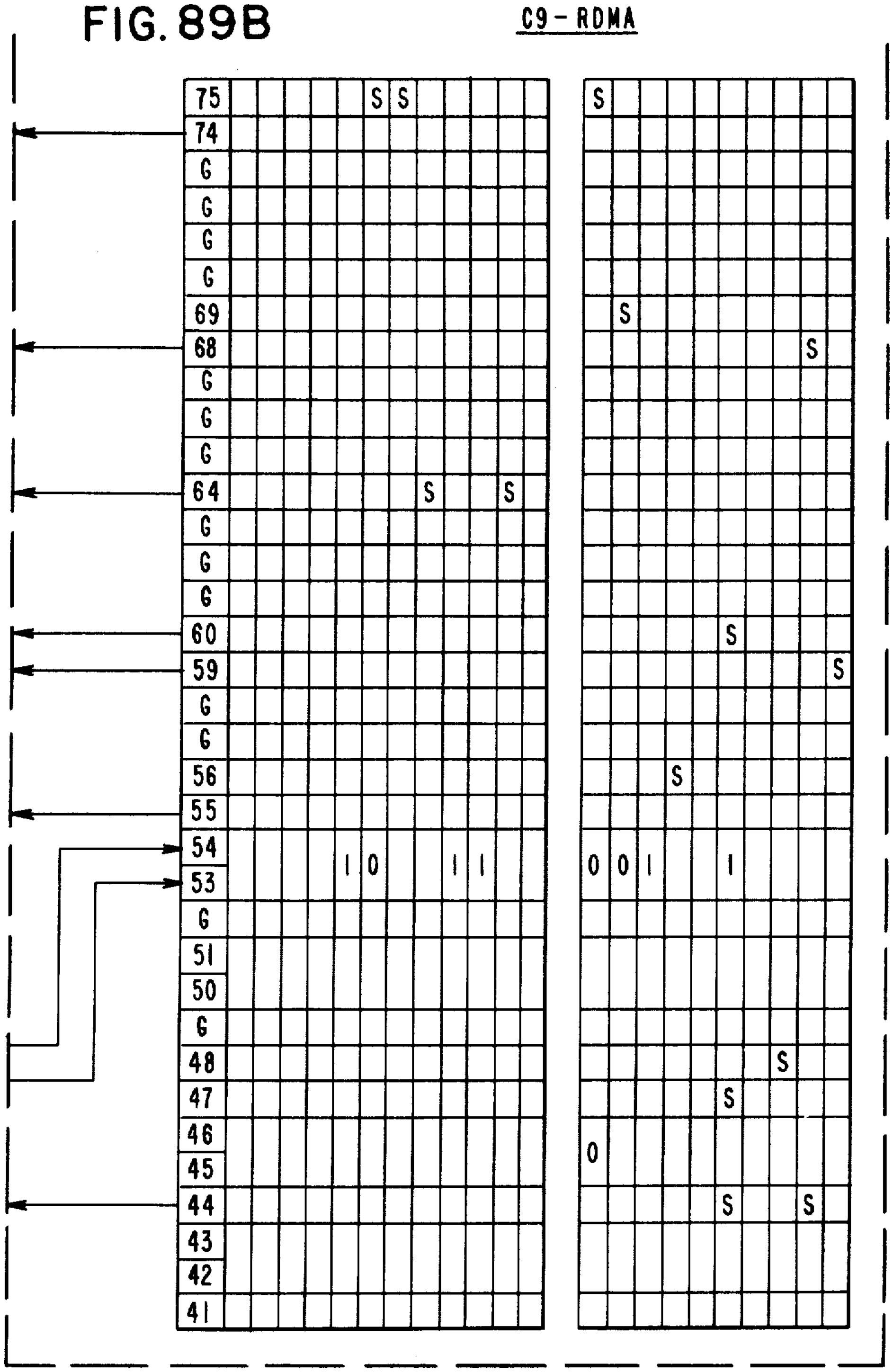
Figure 89C:
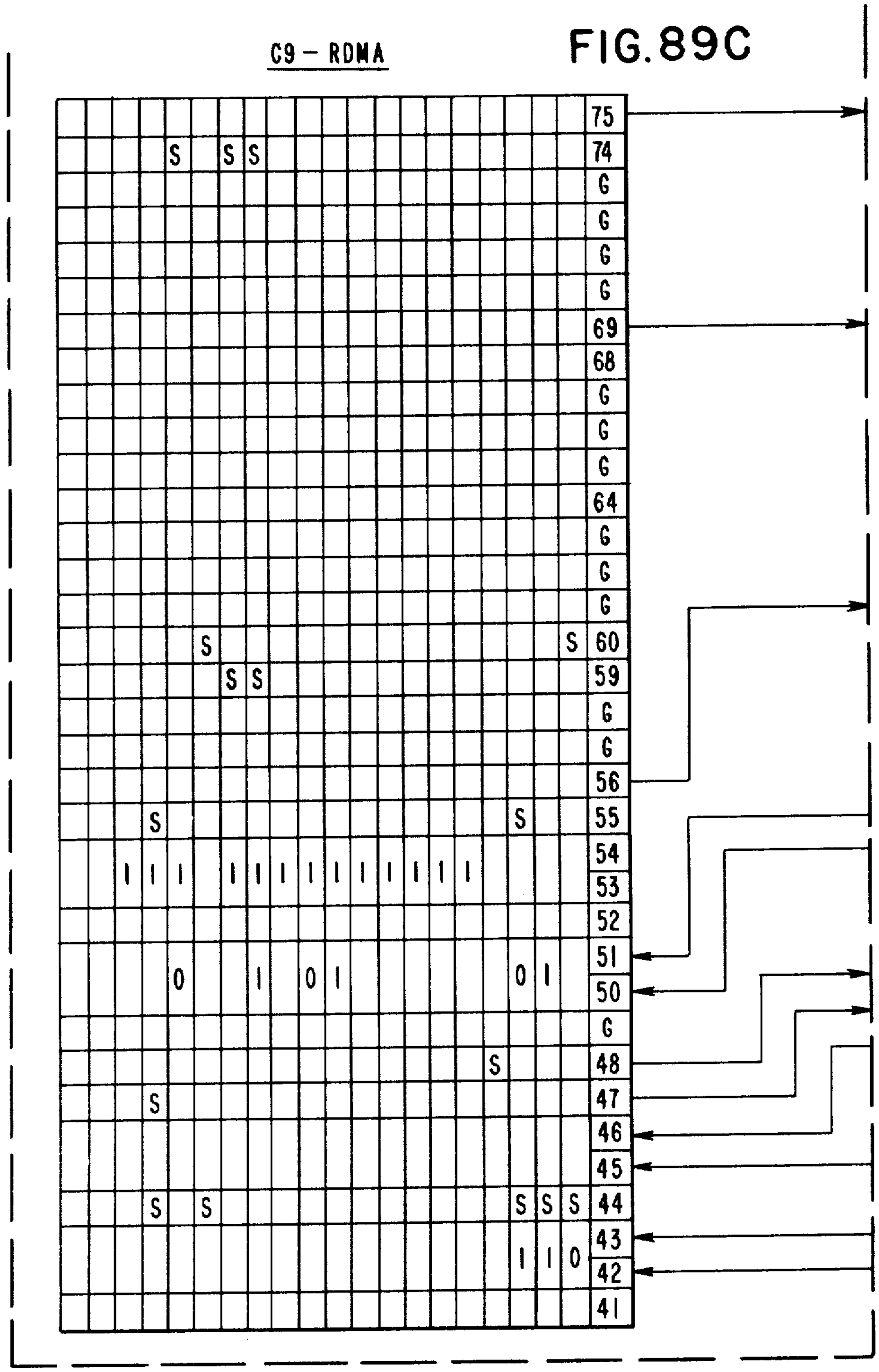
Figure 89D:
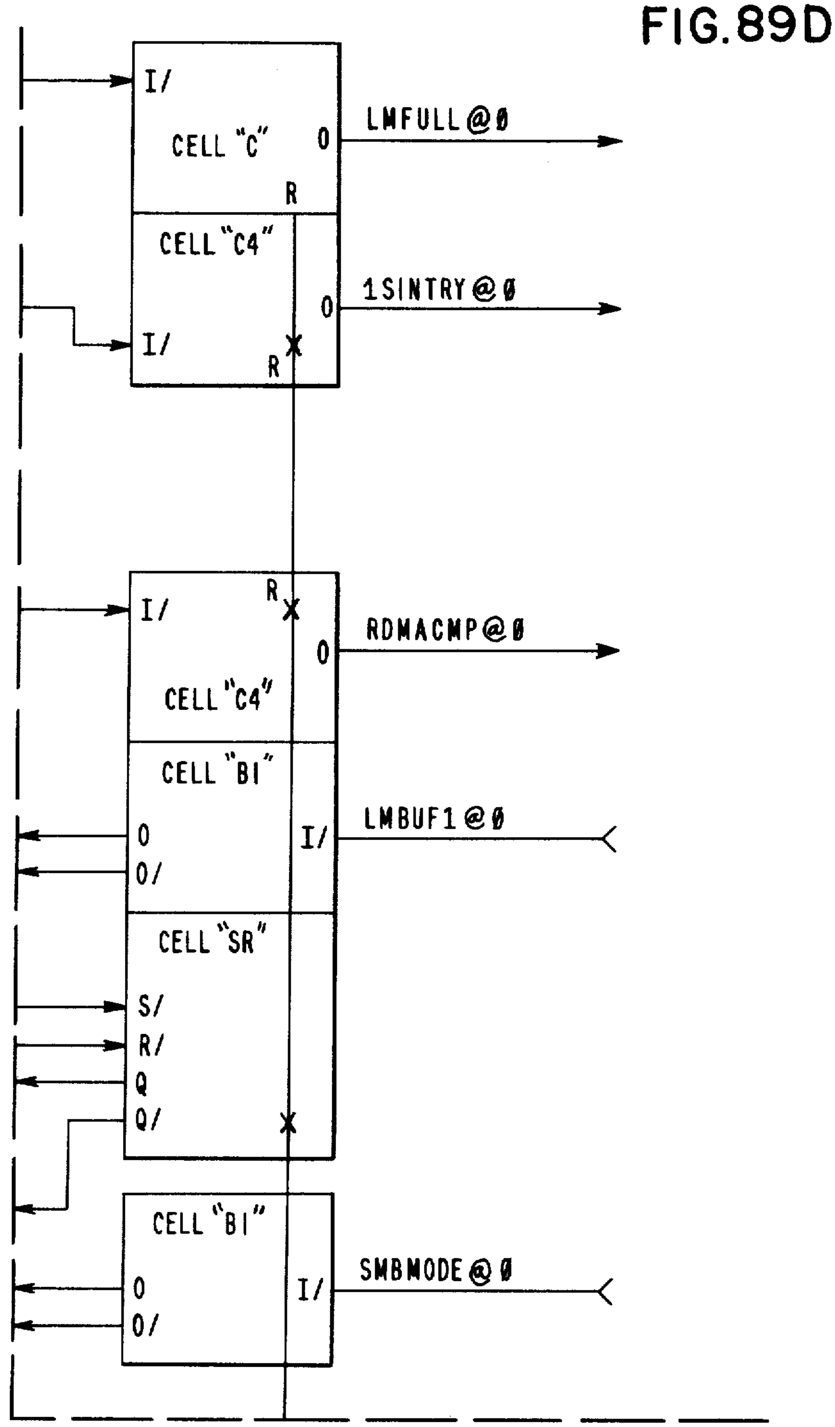
Figure 89E:
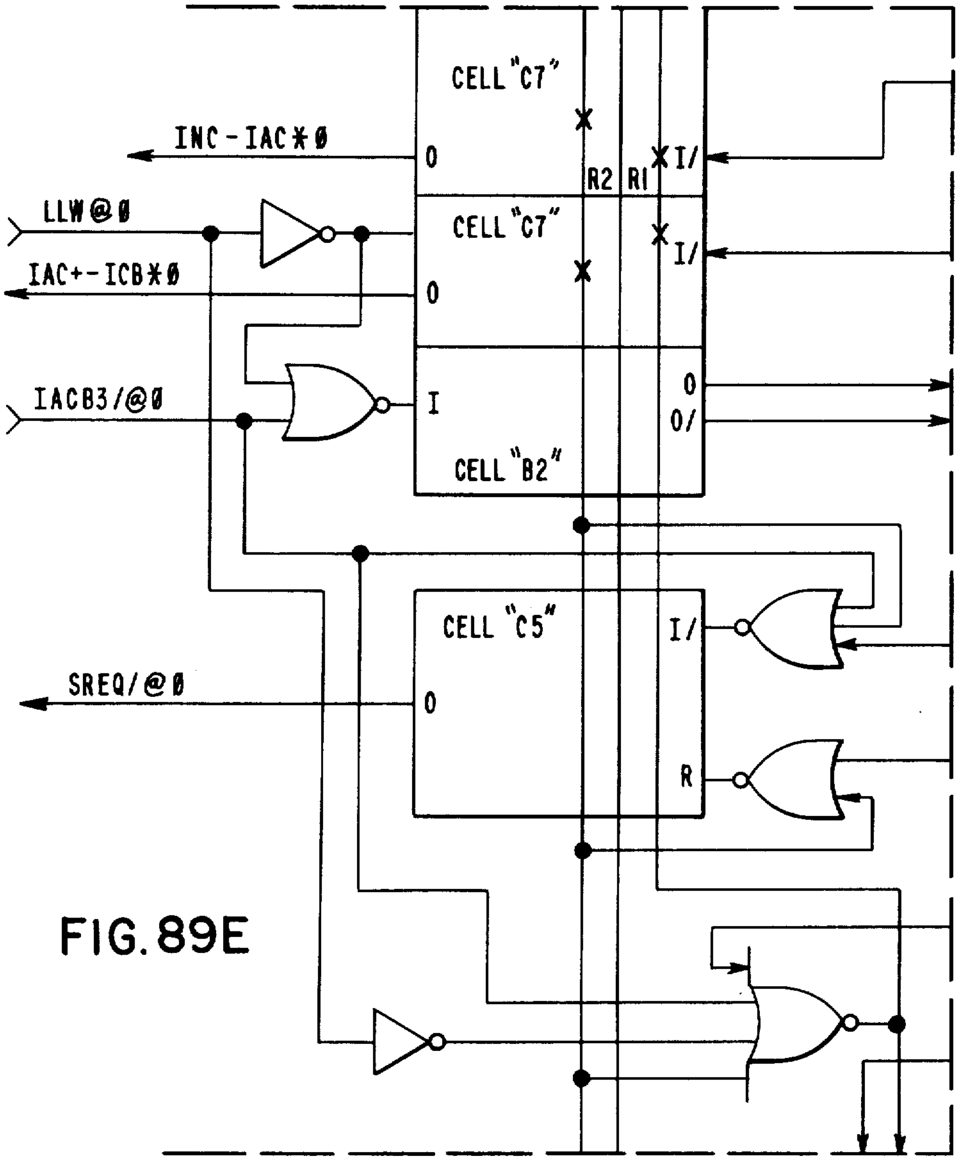
Figure 89F:
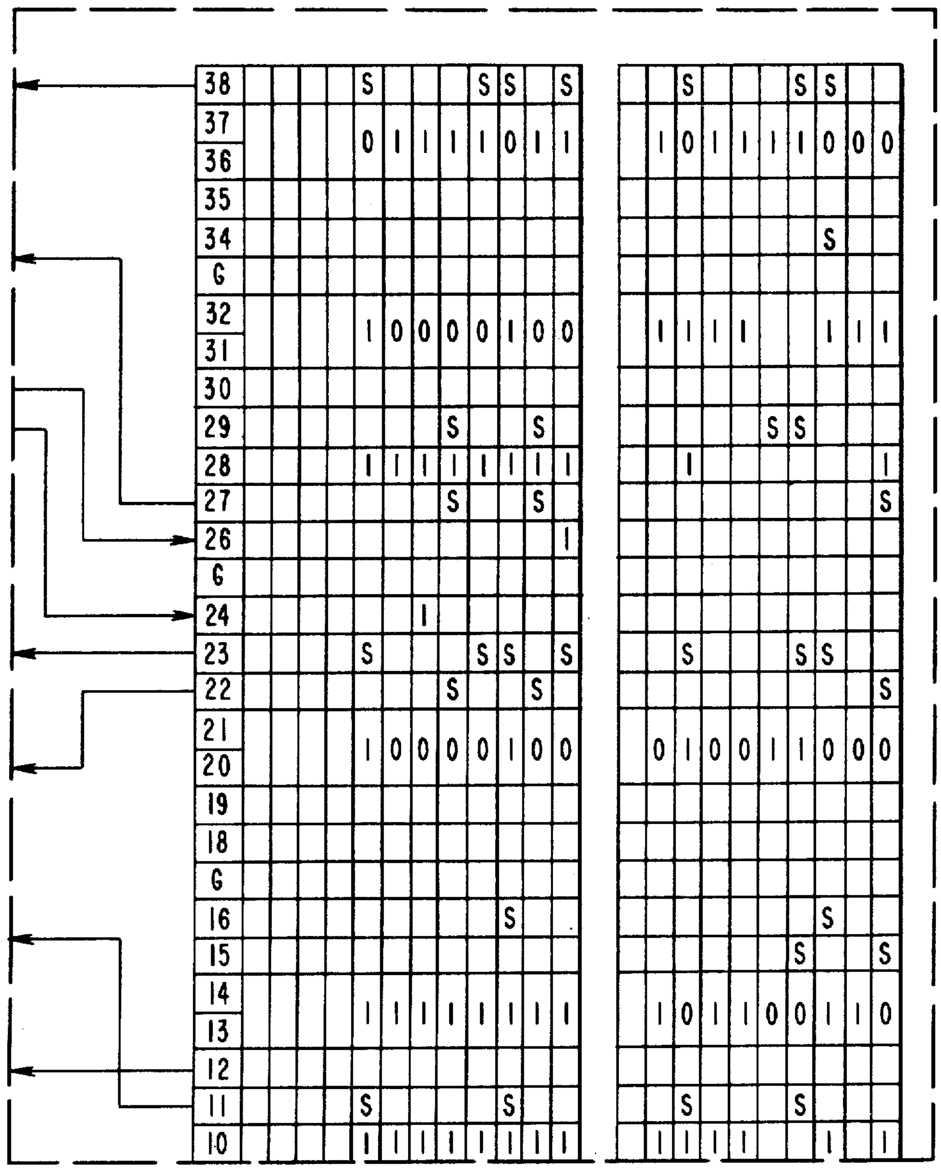
Figure 89G:
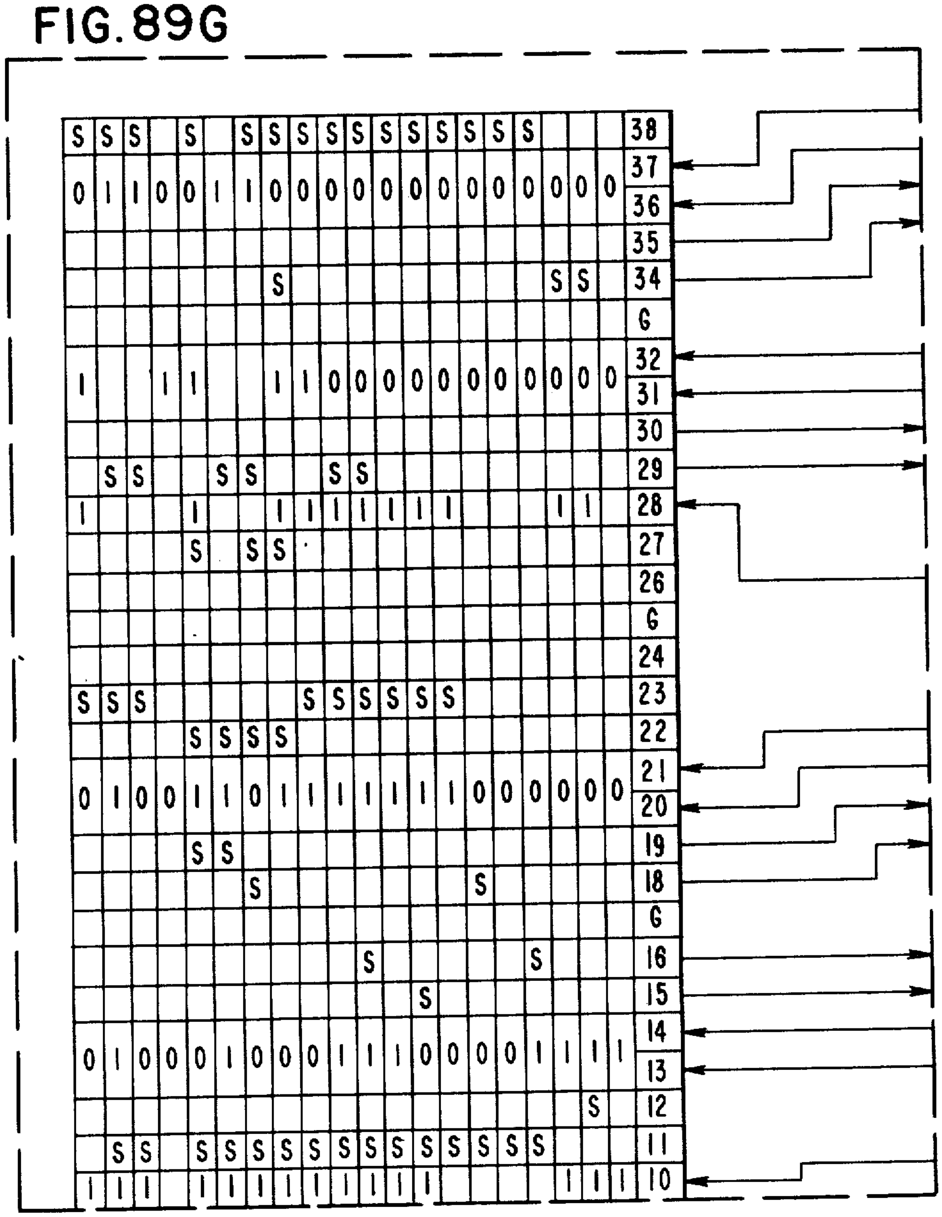
Figure 89H:
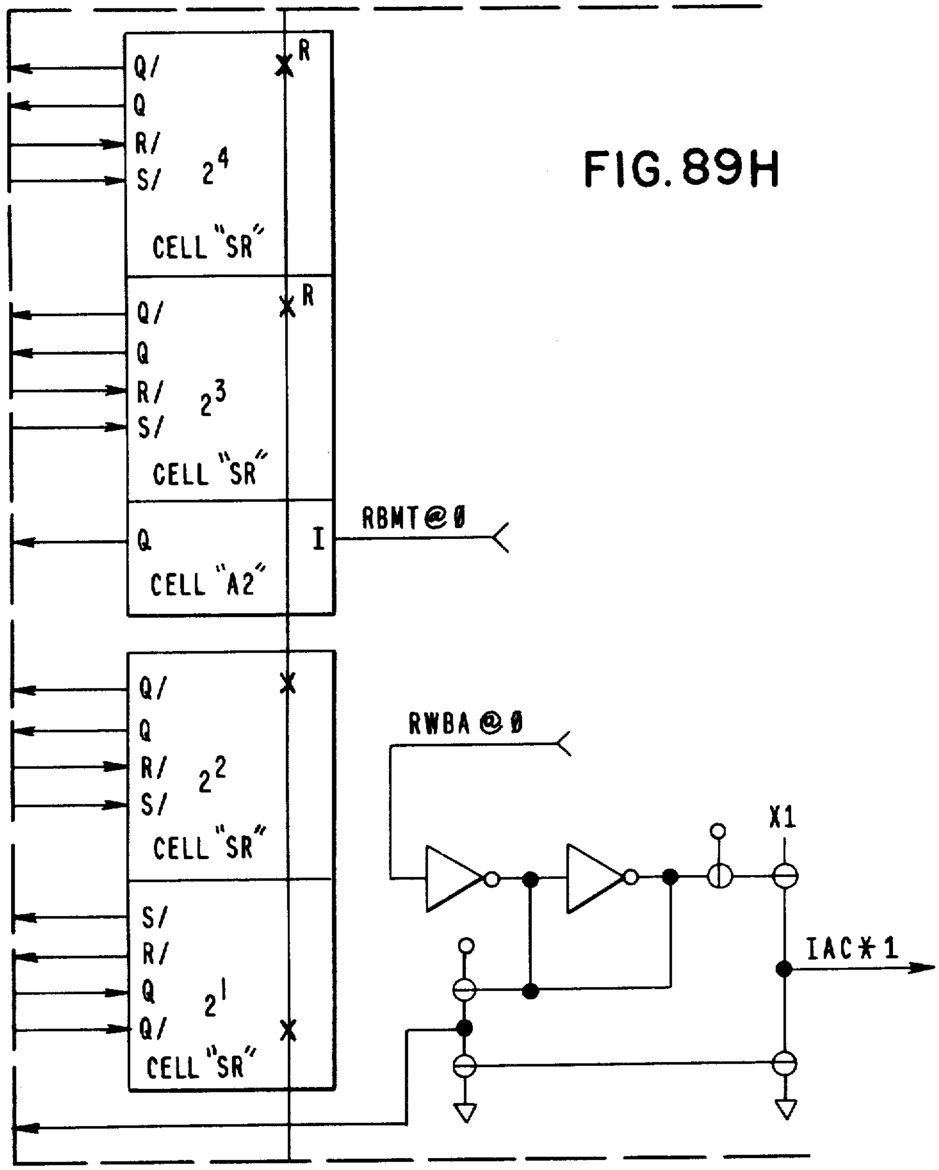
Figure 89I:
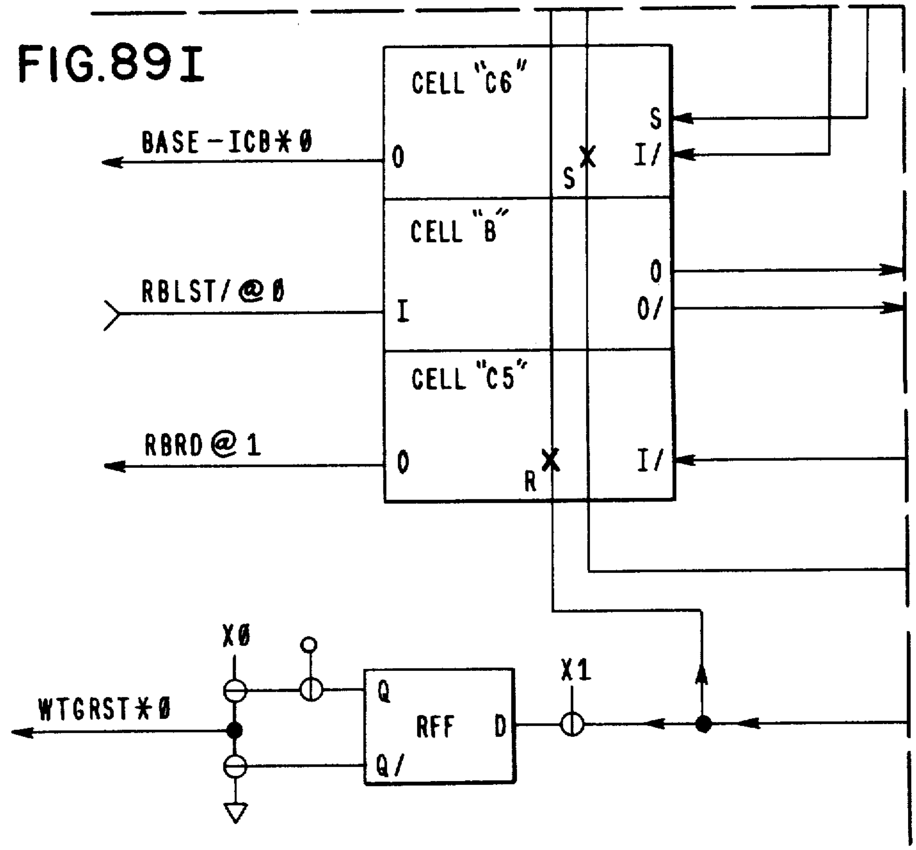
Figure 89:
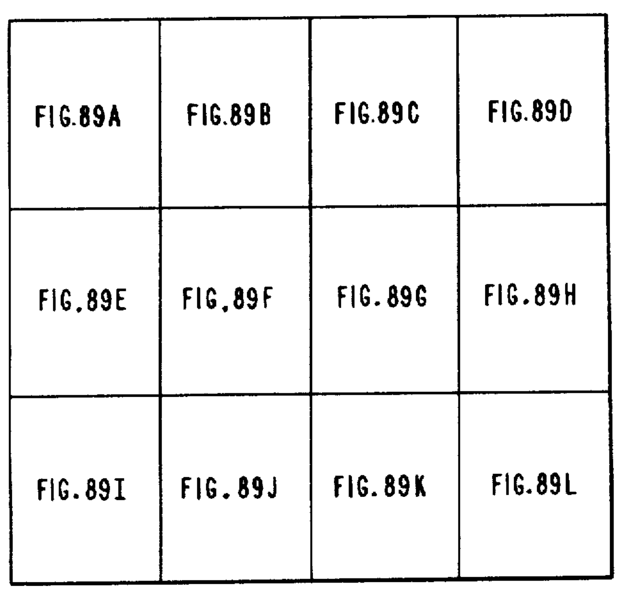
Figure 89J:
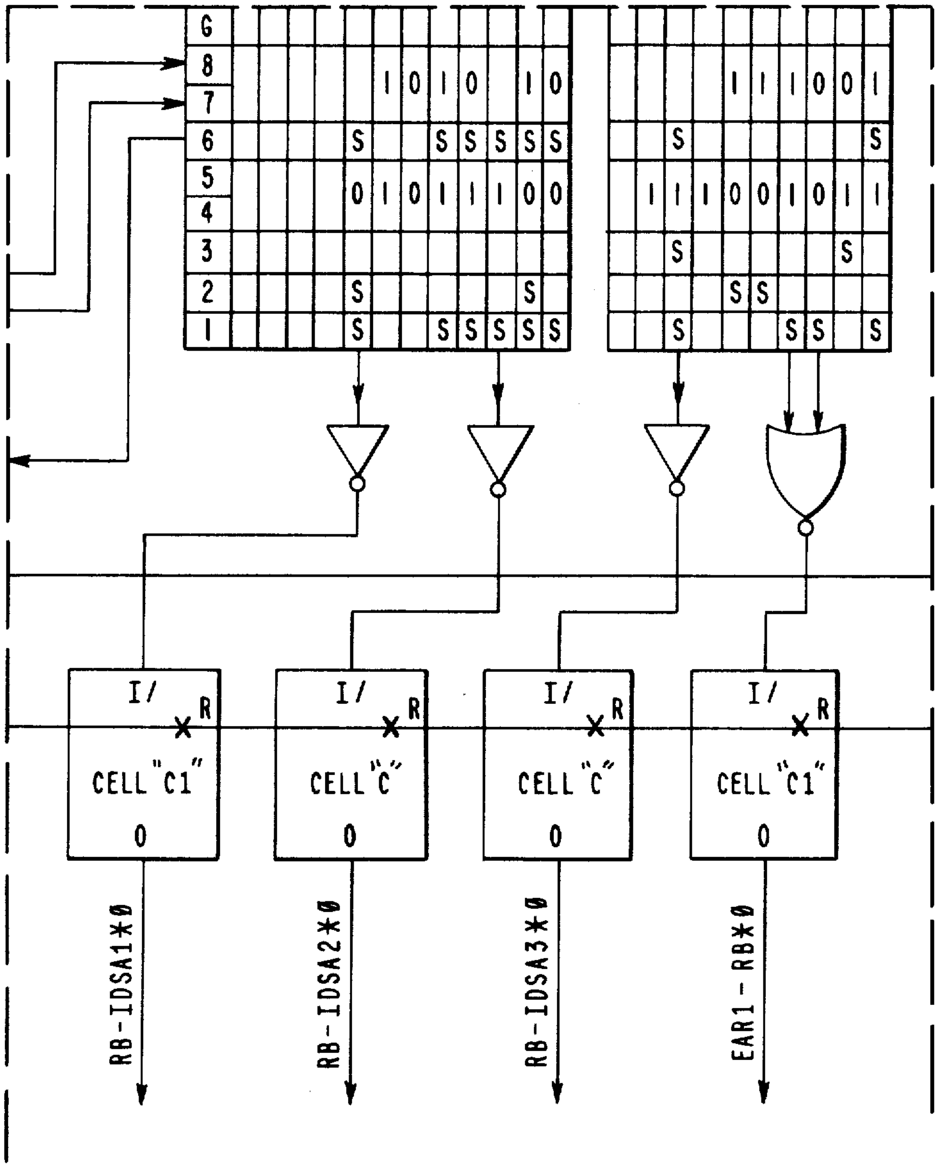
Figure 89K:
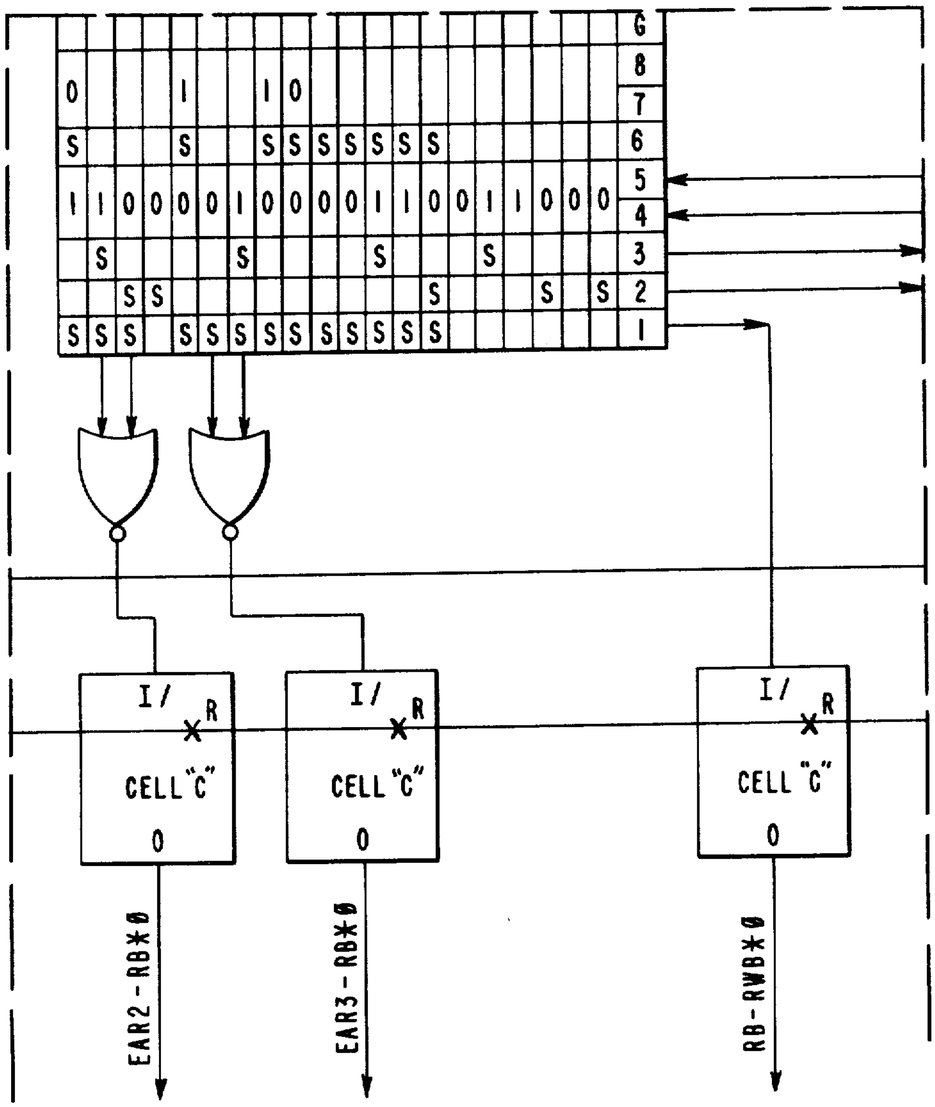
Figure 89L:
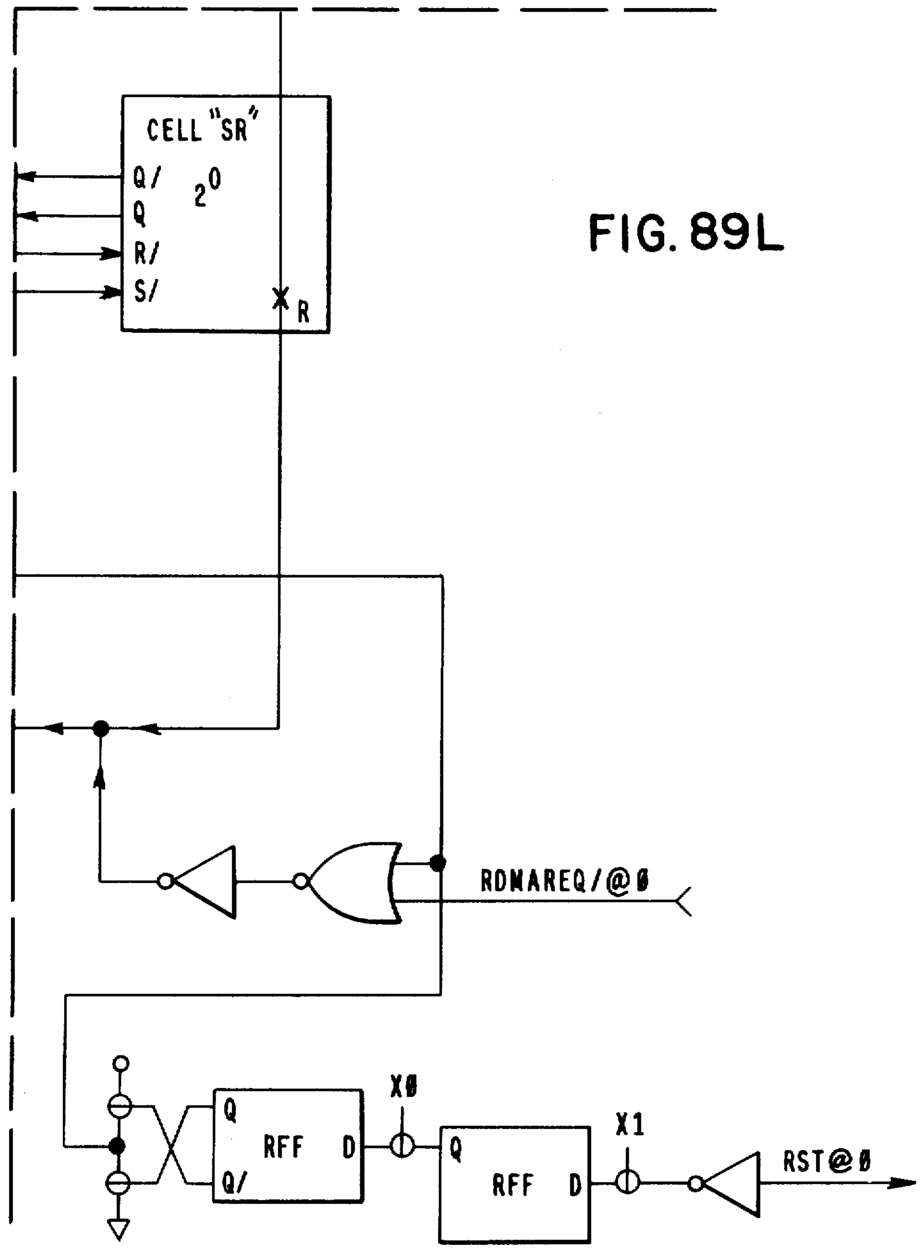

Before proceeding with the description of the message control circuit 144 in FIG. 15, it should be noted that only major circuit components of the message control circuit 144 are shown in somewhat simplified form as functional blocks in FIG. 15 in order to teach the important aspects of the present invention. Detailed circuit diagrams of an actual embodiment of a system interface chip, including a message control circuit in a dual-channel system, are shown in FIGS. 37 through 89L.

Referring now to FIG. 15, it can be seen that the illustrated message control circuit 144 receives data (representing destination address, source address, op code or data information) for a header-only message or a header and data message one byte at a time by way of the DMA 140 (FIG. 14) and passes the data through a multiplexer (MUX) 170. The MUX 170 also receives CRC check bits generated at a CRC generate circuit 172. The CRC generate circuit 172 can generate CRC bits in accordance with any one of numerous algorithms well known to those skilled in the art, such algorithms and the specific circuitry in CRC generate circuit 172 forming no part of the present invention. For example, in addition to the circuitry that can be found in FIGS. 37 through 89L, one such well-known algorithm, and circuitry for implementing that algorithm, are described in detail in Pandeya and Cassa, *Parallel CRC Lets Many Lines Use One Circuit,* 14 Computer Design 87 (September, 1975).

Data, and any CRC bits inserted at appropriate locations in the data by the MUX 170, are provided to a first-in-first-out memory (XFIFO) 174 which is capable of storing ten nine-bit words. The bytes of data provided by an associated subsystem 24 of way of the DMA 140 to the XFIFO 174 are only eight bits wide, with the reason for the ninth bit (referred to as ENCRC2@0 in the drawings) of each word stored in XFIFO 174 being described later with reference to the operation of the system bus interface 28 and the circuitry shown in FIG. 15.

Eight bits of each nine-bit word stored in the XFIFO 174 can be passed to a MUX 176 and to a first-in-first-out memory (GFIFO) 178. The GFIFO 178 stores ten bytes of data, each for comparison at a compare circuit 180 with each corresponding byte of data in each transmitted message that is returned by the System Bus. The MUX 176 has an input connected in a conventional fashion to selectively provide flag characters and is conventionally constructed so that it can also be controlled to selectively provide at its output zeroes for a postamble. The MUX 176 is controlled to insert flags and postamble bits at appropriate points during the transmission of each message.

The output of the MUX 176 is provided by way of the output bus 150 to the serializer 154 (FIG. 14), which in turn takes each byte of the message and serializes the byte for transmission on the System Bus.

After a message is received from the System Bus and passed, through bus receiver 58, decoder 158 and deserializer 164, to the input bus 152 (FIG. 14), the message is provided, as seen in FIG. 15, to a receiver address check circuit 184, a CRC check circuit 186, and a postamble garble detection circuit 188. In addition, each byte of the received message (less flags, preambles and postambles) is stored in a ten byte first-in-first-out memory (RFIFO) 190.

As will be described in detail below in connection with the operation of the system bus interface 28, receiver address check circuit 184 checks the destination address field of each message received from the System Bus, and if the destination address or addresses in the address field match the unique subsystem address or the group address of the subsystem associated with the message control circuit, an appropriate signal (RMATCH@0) is generated. The address check circuit 184 includes two registers (SADD and MASK that are shown only in FIGS. 63A through 63I in conjunction with the dual-channel system) that are loaded during initialization of the subsystem. The register SADD is loaded with the unique subsystem address and the register MASK with a group address assignment. When the destination addresses of a message are received, the contents of the two registers are compared with the addresses in the destination address field.

The CRC check circuit 186 generates CRC bits from the data received in each message and performs an error code check on the message by comparing the CRC bits with the CRC check bits in the CRC field of the message. The postamble garble detection circuit 188 checks the postamble of each message received from the System Bus and indicates when the postamble has been garbled, i.e., "1's" have been superimposed on the "0's" in the postamble.

Still referring to FIG. 15, a transmit control circuit 196, a receive control circuit 198, and a monitor control circuit 200 generally control the circuit components shown in the message control circuit 144. In the implementation of the message control circuit that is shown in FIGS. 37 through 89L, much of the control represented by control circuits 196, 198 and 200 is accomplished by programmable logic arrays (PLA's). In addition, the representation of only three control blocks 196, 198 and 200 only serves to generally illustrate the control functions needed to accomplish the operation to be described below. It should be obvious that in actual practice the control functions will be accomplished by many PLA's and by logic circuits associated with each of the major circuit components shown in FIG. 15.

Also shown in FIG. 15 is a retry circuit 204 which will cause any message that has not been successfully transmitted (for example, because of contention garble) to be retried later. Such a circuit can be of the type that is used in the Ethernet System that was mentioned earlier. A specific circuit and operational algorithm for implementing the retry circuit 204 in a system employing a dual-channel System Bus will be described later in conjunction with FIGS. 34 and 35.

In addition to the major circuit components, there are also shown in FIG. 15 numerous control signals for controlling the circuit components. These signals are identified by mnemonics which represent descriptive signal names. The mnemonics, descriptive signal names, and a general signal description for each of the control signals in FIG. 15 are shown below in Signal List #1.

SIGNAL LIST #1

| MNEMONIC | SIGNAL NAME | SIGNAL DESCRIPTION |
|---|---|---|
| ABORT | Abort Message | Causes serializer 154 to superimpose "1's" on the postamble |
| BE@1 | Byte Enable | Controls passage of data thru MUX 176 |
| CMPOK@0 | Complete and OK | Indicates that received message was complete and valid |
| CNLAVAIL@0 | Channel Available | Indicates that channel (System Bus) is idle and available for transmission |
| CRCCLR*0 | CRC Clear | Clears the CRC check circuit 186 |
| CRCGEN*0 | CRC Generate | Causes CRC check circuit 186 to compute CRC bits and compare with CRC check bits |
| CRCOK@0 | CRC OK | Indicates whether a CRC error has occurred |
| ENCRC1*1 | Enable CRC1 | Controls MUX 170 to pass first CRC byte from CRC generate circuit 172 |
| ENCRC2*1 | Enable CRC2 | Controls MUX 170 to pass second CRC byte from CRC generate circuit 172 |
| ENCRC2@0 | Enable CRC2 | Status signal to be stored with data in XFIFO as ninth bit to indicate last byte before flag character |
| ERTRM | Error Term | Indicates an error in the received message |
| FE@1 | Flag Enable | Causes flags or post- |

-continued

SIGNAL LIST #1

| MNEMONIC | SIGNAL NAME | SIGNAL DESCRIPTION |
|---|---|---|
| | | amble to be provided at output of MUX 176 |
| GFERR | GF Error | Indicates when a mismatch occurs at compare circuit 180 |
| $\overline{\text{GFLD}}$@1 | GFIFO Load | Causes byte to be loaded into GFIFO 178 |
| $\overline{\text{GFRD}}$@0 | GFIFO Read | Causes byte to be read from GFIFO 178 for comparison in compare circuit 180 |
| LMFULL@0 | Local Memory Full | Indicates when an area in the associated local memory, described as the "mailbox", is full and cannot accept message information |
| LSTBYT@0 | Last Byte | Status signal stored with data in RFIFO as ninth bit to indicate last byte of data for DMA |
| $\overline{\text{RDMAREQ}}$@0 | Receive DMA Request | Indicates to DMA that associated subsystem is the addressed destination |
| $\overline{\text{RENBL}}$@0 | Receive Enable | Indicates when channel (System Bus) is not idle, to enable message control circuit 144 to receive message |
| $\overline{\text{RERR}}$ | Receive Error | Indicates when swamp circuit 160 has detected a swamp error |
| RFCLR@0 | RFIFO Clear | Clears the RFIFO 190 |
| RFLD@0 | RFIFO Load | Causes byte to be loaded into RFIFO 190 |
| $\overline{\text{RFLG}}$ | Receive Flag | Indicates when received byte in de-serializer 164 is flag character |
| $\overline{\text{RFRD}}$@1 | RFIFO Read | Reads byte from RFIFO 190 |
| $\overline{\text{RIDLE}}$ | Idle | Indicates when the idle detection circuit 162 detects an idle condition of the System Bus |
| $\overline{\text{RMATCH}}$@0 | Receive Match | Indicates when destination address in message matches unique subsystem address or group address of associated subsystem |

-continued

SIGNAL LIST #1

| MNEMONIC | SIGNAL NAME | SIGNAL DESCRIPTION |
|---|---|---|
| $\overline{\text{RSTRB}}$ | Receive Strobe | Indicates when each byte of message is received by de-serializer 164 |
| RTYERR@0 | Retry Error | Indicates to Retry Circuit 204 that message should be retried |
| $\overline{\text{ROVFLW}}$@0 | RFIFO Overflow | Indicates when byte has been received by RFIFO 190 when RFIFO 190 is full |
| RZR0@0 | Receive Zeroes | Indicates whether a received postamble is garbled |
| $\overline{\text{SNDENBL}}$@0 | Send Enable | Enables serializer to pass byte received from MUX 176 |
| XCRCCLR*0 | CRC Clear | Clears the CRC generate circuit 172 |
| XCRCGEN*0 | CRC Generate | Enables CRC generate circuit to generate two bytes of CRC bits |
| XD*1 | Data Enable | Enables MUX 170 to pass data received from DMA |
| XFCLR@0 | XFIFO Clear | Clears XFIFO |
| $\overline{\text{XFCLR}}$@0 | XFIFO Clear | Clears GFIFO |
| $\overline{\text{XFLD}}$@0 | XFIFO Load | Causes byte to be loaded into XFIFO |
| $\overline{\text{XFRD}}$@1 | XFIFO Read | Causes byte to be read from XFIFO |
| XLSTBYT@0 | Last Byte | Status signal read with data from XFIFO as ninth bit to indicate last byte of data |
| XMITCMP@0 | Transmission Complete | Indicates transmission of message is complete and successful |
| $\overline{\text{XDATRDY}}$@0 | Transmission Ready | Indicates when DMA is ready to transmit message |
| $\overline{\text{XSTRBL}}$@1 | Transmit Strobe | Indicates when byte has been received by serializer 154 |

It can be seen from the above Signal List #1 that certain ones of the signals have the symbols "@" and "*" followed by either a "0" or a "1". These symbols, which will be used throughout this description, provide a convenient reference to the timing of the signal in relation to clock signals X0 and X1. The clock signals X0 and X1 are shown in FIG. 15 as provided to each of the transmit control circuit 196, receive control circuit 198 and monitor control circuit 200.

Figure 16:
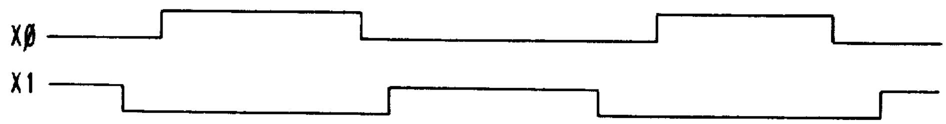
FIG. 16 shows waveforms illustrating the nature of the clock signals X0 and X1.

FIG. 16 shows waveforms illustrating the clock signals X0 and X1. It should be noted that the clock signals X0 and X1 have non-overlapping pulses or phases. This permits signals to be time multiplexed, in a conventional fashion, at the pins of the system interface chip, using the clock signals X0 and X1, in order to minimize the number of pins.

In Signal List #1 above, the symbol "@" means that the given signal begins or changes state at the same time that a pulse occurs in the clock signal. Thus, for example, the notation "@1" indicates that the given signal begins at the same time that a pulse in the X1 clock signal begins. The symbol "*" means that the given signal begins or changes state at the same time that a pulse occurs in the clock signal, and lasts for only the same amount of time as that pulse in the clock signal. Thus, for example, the notation "*1" indicates that the given signal begins at the same time that a pulse in the X1 clock signal begins and ends at the same time that the pulse in X1 ends.

Figure 17A:
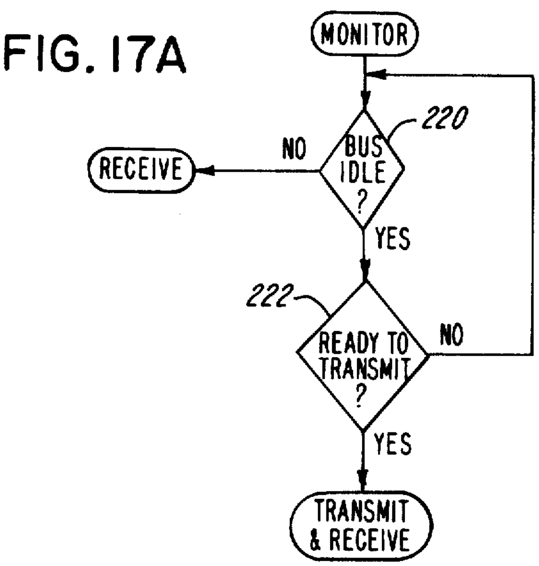
FIGS. 17A, 17B and 17C are flow diagrams illustrating the general operation of the system bus interface of FIG. 14.
Figure 17B:
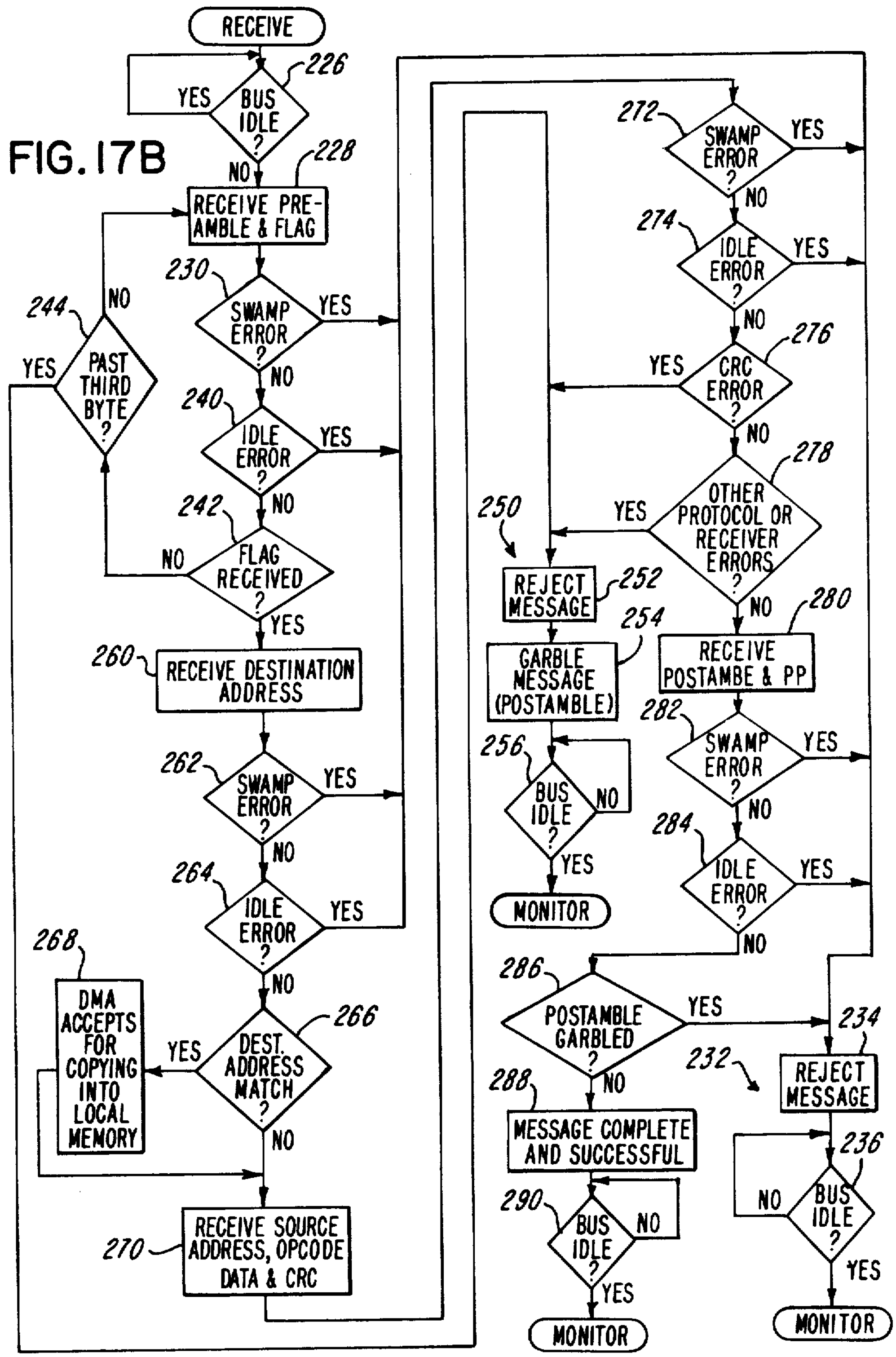
Figure 17C:
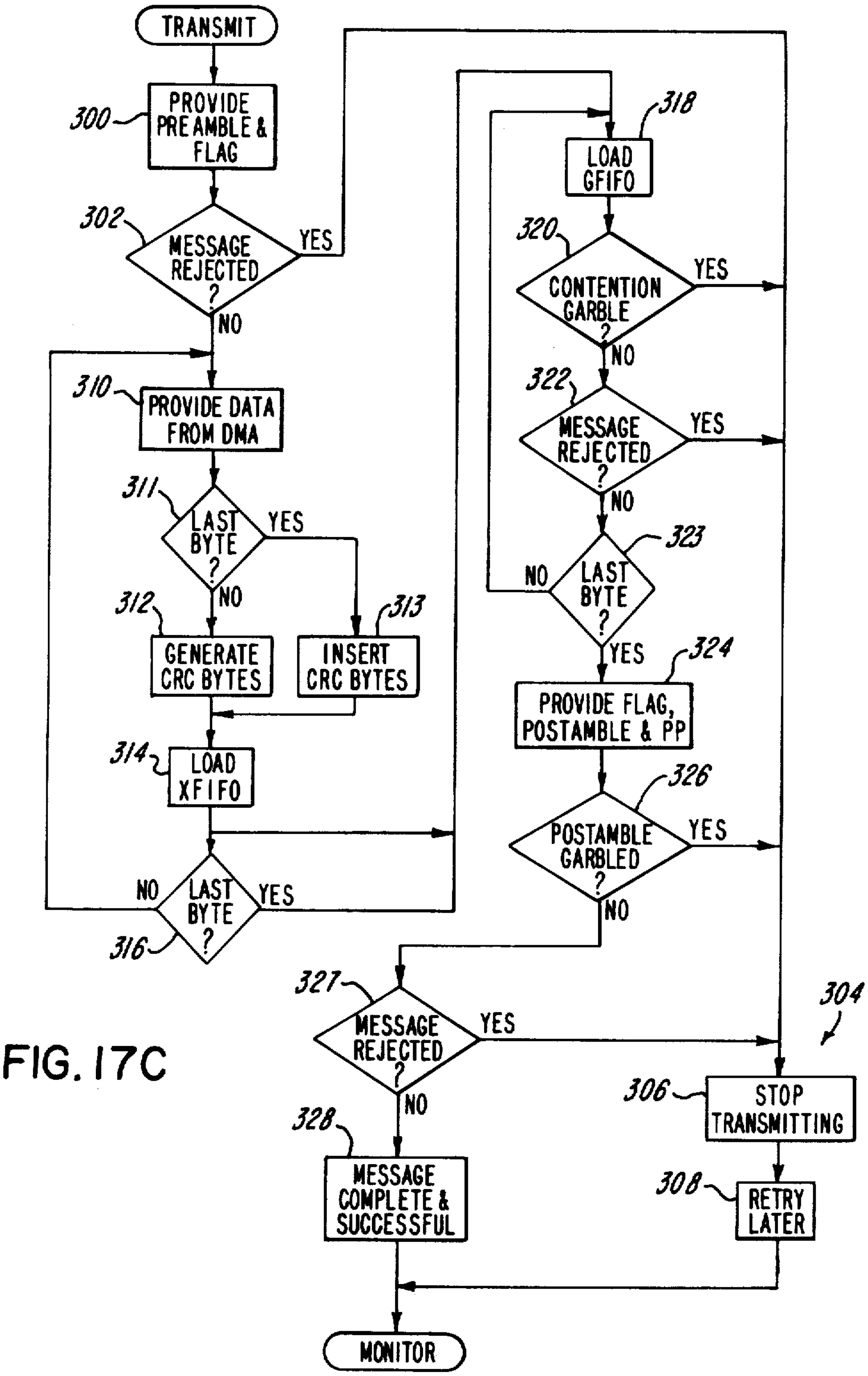

Turning now to FIGS. 17A, 17B and 17C, there are shown flow diagrams illustrating the operation of the message control circuit 144 (FIG. 15) and, in general, the system bus interface 28 (FIGS. 13 and 14).

For purposes of ease of description, the operation of the circuitry in FIGS. 17A, 17B and 17C is illustrated as involving three separate flows, one flow named "MONITOR" and illustrated in FIG. 17A, a second flow named "RECEIVE" and illustrated in FIG. 17B, and a third flow named "TRANSMIT" and illustrated in FIG. 17C. These three flows correspond generally to the control of circuitry carried out by receive control circuit 196, transmit control circuit 198 and monitor control circuit 200 that are shown in FIG. 15. While these flows illustrate the present invention, the description is somewhat simplified. For a more detailed understanding of an actual implementation, reference can be made to FIGS. 37 through 89L.

Turning now to the MONITOR flow seen in FIG. 17A, there is illustrated the operation of the system bus interface 28 when it is monitoring the System Bus and is neither actively receiving nor transmitting messages from its associated subsystem 24. Accordingly, as illustrated by Step 220, the system bus interface 28 will continuously monitor the System Bus to determine if it is idle, such step accomplished by the idle detection circuit 162 (FIG. 14). If the System Bus is idle and the monitor control circuit 200 is so informed by the signal $\overline{\text{RIDLE}}$, the CNLAVAIL@0 signal is enabled and passed from the monitor control circuit 200 to the transmit control circuit 196, which then determines by the XDATRDY@0 signal whether its associated subsystem is ready to transmit, step 222. If the associated subsystem is not ready to transmit, then the system bus interface, in accordance with the operation of the monitor control circuit 200, continues to monitor the bus for an idle condition, Step 220, and the transmit control circuit 196 continues to check whether the subsystem is ready to transmit, step 222.

If, as represented at Step 220, the bus is not idle, indicating that a message has been transmitted over the System Bus, then the monitor control circuit 204 passes the signal $\overline{\text{RENBL@0}}$ to the receive control circuit 198. The system bus interface then goes into the operational flow RECEIVE illustrated in FIG. 17B. If the bus is idle, step 220, and the associated subsystem is ready to transmit, step 222, then as indicated in FIG. 17A the associated subsystem must prepare itself to both transmit its message as well as receive back, by way of the System Bus, that same message. In such a case, the $\overline{\text{RENBL@0}}$ signal and the CNLAVAIL@0 signals are delivered to the receive control and transmit control circuits, respectively. The system bus interface goes into both the operational flow TRANSMIT illustrated in FIG. 17C and the operational flow RECEIVE illustrated in FIG. 17B.

Turning now to FIG. 17B, there is shown the operational flow RECEIVE. The monitor control circuit 200 continues to monitor the $\overline{\text{RIDLE}}$ signal from the idle detection circuit 162, step 226, since the RECEIVE flow may have been initiated because the associated subsystem is both transmitting and receiving back the same message. If the System Bus is idle, the monitor control circuit 200 continues to monitor the System Bus until the message has begun to be received and the System Bus is no longer idle.

Once the System Bus is no longer idle, the system bus interface 28 enters into a sequence of steps to check the preamble and flag that should be received at the beginning of the message. This sequence of steps includes receiving, as will be indicated by the signal RFLG, the preamble and flag, step 228, and then checking the preamble or flag for a swamp error, step 230. A swamp error will be indicated by the signal RERR from the swamp circuit 160 (FIG. 14) and will cause the system bus interface to enter a sequence of steps that are generally designated 232 and that are seen toward the lower right-hand side of FIG. 17B. In the sequence 232, the system bus interface will reject the message that has a swamp error, step 234, by enabling the ERTRM signal to the DMA. The DMA will thus know that if its associated subsystem is an addressed destination the message is to be ignored and is not to continue to be stored in the local memory of the associated subsystem. The system bus interface 28 will then wait until the System Bus becomes idle, step 236, and will then return to the MONITOR flow illustrated in FIG. 17A.

If there is no swamp error at step 230, the message control circuit 144 then determines if an idle error condition exists, step 240. As mentioned earlier, an idle error condition would normally exist if a message begins and then prematurely ends, with the duration between pulses too long. If the signal CNLAVAIL@0 from the monitor control circuit 200 indicates that the System Bus is idle before the completion of a message, the signal ERTRM is enabled and the sequence 232 is followed.

If there is no idle error, the receive control circuit 198 then checks for a flag in the first three bytes (preamble and flag) of the message, step 242. The signal $\overline{\text{RFLG}}$ (with the signal $\overline{\text{RSTRB}}$ as each byte is received) from the de-serializer 164 will indicate to the receive control circuit 198 the presence of a flag in the message. If the message is past the third byte, step 244, and there has not yet been a flag, the system bus interface enters a sequence 250.

In the sequence 250, the message control circuit 144 enables the signal ERTRM and rejects the message, step 252. The message on the System Bus is garbled, step 254, by the signal ABORT provided to the serializer 154. The system bus interface will wait until the bus is idle, step 256, before returning to the MONITOR flow.

It should be noted that although step 254, as depicted in FIG. 17B, indicates that the postamble is garbled, the postamble probably is not the part of the message garbled when the flow 250 is entered from step 244. Rather, since the actual fields of the message are not properly defined and the initial flags have not been located, the receive control circuit 198 will simply abort by superimposing 1's on whatever part of the message is then being transmitted. The other subsystems will each sense a swamp error and know that the message is to be disregarded.

In the other error condition that will be described shortly and that are shown in FIG. 17B as causing the sequence 250 to be entered, the fields of the message are defined and it is actually the postamble that is garbled.

Of course, normally there would be a flag in the first three bytes of the message since, as seen in FIGS. 12A and 12B, the preamble consists of two flags and the preamble is followed by a single flag. The message control circuit 144 loops through the steps 228, 230, 240 and 242 until the first three bytes of the message have been received so that, in normal circumstances, at least one of the flags sent in the preamble and first flag fields of the header will be detected.

If the flag has been properly received at step 242, the flow next enters into a sequence for checking the destination addresses in the message. The destination addresses are received by the system bus interface, step 260, and again the system bus interface checks for swamp and idle errors, steps 262 and 264, respectively. If there are swamp or idle errors, the flow will proceed to the sequence 232 described above.

The receiver address check circuit 184 (FIG. 15) checks for a match with the destination addresses in the message, step 266. If there is an address match, the signal RMATCH@0 is delivered to the receive control circuit 198 and, in turn, the receive control circuit 198 generates the signal RDMAREQ@0 which will cause, at step 268, the DMA to accept the message for copying into the local memory of the associated subsystem. The actual operation of the DMA in accepting or rejecting messages will be described later in conjunction with FIGS. 21 through 25.

After the destination addresses have been checked, the flow enters into a sequence for checking the source address, op code, data and CRC fields in the message. These fields of the message are first received by the system bus interface, step 270. As with the rest of the message, the de-serializer 164 generates the strobing or clocking signal RSTRB as each full byte is received. These fields are checked for swamp and idle errors, steps 272 and 274, respectively, and a swamp or idle error will lead to the sequence 232 described above. The CRC check circuit 186 will then check the CRC field for a data error, step 276.

It should be noted that the receive control circuit 198 will enable the CRC check circuit 186 to check the data by providing the signal CRCGEN*0, and that it will know when to enable the CRC check circuit by the location of the flags in the message format. That is, as seen in the message format shown in FIGS. 12A and 12B, after the preamble and first flag in each message have been received, the next flag received will be the one immediately following the two bytes of CRC check bits. The de-serializer 164 will generate the RFLG signal and the two immediately preceding bytes of CRC check bits, then held in buffers (not shown in FIG. 15) in the message control circuit before being passed to RFIFO 190, are compared with CRC bits generated from the message data by the CRC check circuit. After the CRC check, the CRC check circuit 186 is cleared by the signal CRCCLR*0.

If there is a CRC error, as indicated by the signal CRCOK@0, the flow proceeds to the sequence 250 described above, where the postamble of the message is garbled. If there is no CRC error, the system bus interface checks for other protocol or receiver errors, step 278. The type of errors checked in step 278 include the following:

1. The receipt of an unrecognizable character, having seven or more consecutive "1" bits;
2. The receipt of a flag character before a minimum acceptable message;
3. The mailbox (to be described later) in the local memory of the associated subsystem is full and cannot accept the data (indicated by the signal LMFULL@0);
4. If the system has two channels and two star couplers (as will be described later in conjunction with an alternate preferred embodiment), and the message on one channel is to be copied or received by the subsystem when the message on the other channel is already being copied.
5. The RFIFO 190 is filled and receives a byte that cannot be stored (an "overflow" condition, indicated by signal ROVFLW@0).

Although not specifically shown in the RECEIVE flow of FIG. 17B, it should be noted that each byte of the received message (less preamble, flags and postamble) is stored or buffered in the RFIFO 190 by the signal RFLD@0. In addition, a status signal or bit LSTBYT@0 is stored with each byte in the RFIFO, such bit controlled by the receive control circuit 198 in response to flag after the second CRC byte (see FIGS. 12A and 12B) to indicate or mark the last byte of the message stored in the RFIFO. As each byte of the message is read from the RFIFO and passed to the DMA by the signal RFRD@1, the DMA will receive the ninth bit (RBLST@0) at the output of the RFIFO, with RBLST@0 indicating the last byte of the message.

The flow in FIG. 17B next enters a sequence for checking the postamble of the message and post-postamble (PP). The postamble and post-postamble are received by the system bus interface, step 280, and there is again a check for swamp and idle errors, steps 282 and 284 respectively. If there is a swamp or idle error, the flow proceeds to he previously discussed sequence 232. The postamble is checked, step 286, for any garble in the postamble that may have occurred as the result of an error being detected in the message by any of the subsystems. Garble is indicated by the signal RZRO@0, which is enabled only when the appropriate bytes of the postamble are not garbled and are at zero. It should be apparent that the system bus interface 28 associated with every subsystem 24 in the system is receiving the message in accordance with the operational flow of FIG. 17B, and any one of the system bus interfaces will garble the postamble if an error is detected as described above in connection with step 254.

If there is garble in the postamble, the flow proceeds into the previously described sequence 232 and the message is rejected. When the message is rejected, whether due to garble or any other error, the RFIFO, is cleared by the RFCLR@0 signal. If there is no garble, the transmission of the message has been complete and successful, step 288, and the signal CMPOK@0 is provided to the DMA so that the associated subsystem, if the intended destination, will copy and act on the message. After the System Bus becomes idle, step 290, the operation of the system bus interface returns to the MONITOR flow of FIG. 17A.

It should be pointed out that the receipt of each message by every subsystem, the checking for errors by every subsystem, and the garbling of the postamble by the message control circuit 144 associated with any subsystem that detects an error, is an important feature of the present invention. Such an operation prevents the loss of a message that, for example, may have an error in the destination address field so that it does not match the address of any subsystem. Since all subsystems, whether destinations or not, check the message, the circumstance cannot occur where the transmitting subsystem believes the message has been successfully transmitted, but due to a transmission or other error one or more of the subsystems does not recognize its address and does not copy the message.

In the TRANSMIT flow illustrated in FIG. 17C, the transmit control circuit 196 will, in response to the signal $\overline{\text{XDATRDY}}$@0, first provide a preamble (two flags) and then a single flag at the MUX 176. This step, designated 300, is controlled by the signal FE@1 delivered by the transmit control circuit 196 to the MUX 176. As the preamble and flag are generated, it is possible that the message will be rejected at this point, step 302, since the subsystem is also simultaneously in the RECEIVE flow. Such a rejection might be due, for example, to a detected swamp or idle error, described earlier in conjunction with sequence 232 in FIG. 17B. The rejection will cause the signal ERTRM to be provided to transmit control circuit 196 and the DMA 140, and will cause the TRANSMIT flow of FIG. 17C to proceed to a sequence, generally designated 304, seen toward the lower right-hand side of FIG. 17C. Sequence 304 includes the steps of stopping the transmission of the message, step 306, and causing the signal RTYERR@0 to be enabled so that the retry circuit 204 will cause the DMA to try to generate the same message again at a later point in time, step 308. When the transmission of the message is stopped at step 306, the XFIFO 174 will be cleared of any messge information by the signal XFCLR@0.

If the message has not been rejected at step 302, then the data or information from the DMA that is to be included in the message is passed through and provided at the output of the MUX 170, step 310, one byte at a time in response to the signal XD*1. If, at step 311, the byte being passed from the DMA is not the last byte, then the data is used to compute and generate CRC bits, step 312, at the CRC generate circuit 172 in response to the signal XCRCGEN*0. This computation of CRC bits continues until the last byte of data is received from the DMA, at which time the MUX 170 passes or inserts into the message two bytes of CRC check bits from the CRC generate circuit in response to the signals ENCRC1*1 and ENCRC2*1, step 313. The data and CRC bytes from the MUX 170 are loaded, one byte at a time, into the XFIFO 174, step 314, by the signal $\overline{\text{XFLD}}$@0, along with the status bit ENCRC2@0. Steps 310, 312, 314 and 313 are repeated until the last byte of the CRC check bits has been loaded into the XFIFO at step 316.

At any time after the first byte is loaded into the XFIFO at step 314, the information in the XFIFO may be read, one byte at a time, in response to the signal $\overline{\text{XFRD}}$@1 and passed to the MUX 176. The MUX 176 in turn passes the byte to the serializer 154, in response to the signal BE@1 and after the signal $\overline{\text{XSTRBL}}$@1 indicates the previous byte has been transmitted. The serializer transmits each serialized byte in response to the signal $\overline{\text{SNDENBL}}$@0.

Each byte read from the XFIFO 174 is also loaded under the control of the signal $\overline{\text{GFLD}}$@1 into the GFIFO 178, step 318. As each byte of the message is transmitted and is returned by the System Bus, it is compared, one byte at a time, at the compare circuit 180 with the corresponding byte read from the GFIFO 178 by the signal GFRD@0. If contention garble is detected, step 320, by the comparison at the compare circuit 180, and the signal GFERR is enabled, then the flow goes to the sequence 304 mentioned above. In addition, if the message has been rejected, step 322, by one of the subsystems receiving the message because of errors in the message information, the flow goes to the sequence 304.

When, as indicated by the ninth bit XLSTBYT@0 in the XFIFO, the last byte of information (which is also the second byte of the CRC check bits) has been transmitted, step 323, the flag immediately preceding the postamble, the postamble, and then the post-postamble (PP) are provided at the output of the MUX 176, step 324. If the postamble is garbled by any one of the subsystems, step 326, the flow again proceeds to the sequence 304. If the postamble is not garbled, and the message has not been rejected, step 327, for other errors, the transmission of the message has been complete and successful, step 328, and the signal CMPOK@0 is provided to the transmit control circuit 196 and to the DMA. The CRC generate circuit 172 will have been cleared by the signal XCRCCLR*0, and the system bus interface returns to the MONITOR flow illustrated in FIG. 17A.

While the above description of the RECEIVE and TRANSMIT flows is directed to a header message, it should be apparent that the same flow is duplicated for the data portion of a header and data message. Of course, in the data portion of the header and data message the RECEIVE and TRANSMIT flows would not include receiving or providing the preamble, destination address, source address and op code fields, since they are not present in the data portion of the message. It should be noted that it is advantageous however, for both the header portion and the data portion to include a postamble, so that if an error is detected in the header portion the postamble there can be garbled and the message aborted without having to await the postamble in the data portion of the message.

THREE EXEMPLARY CASES

Figure 18:
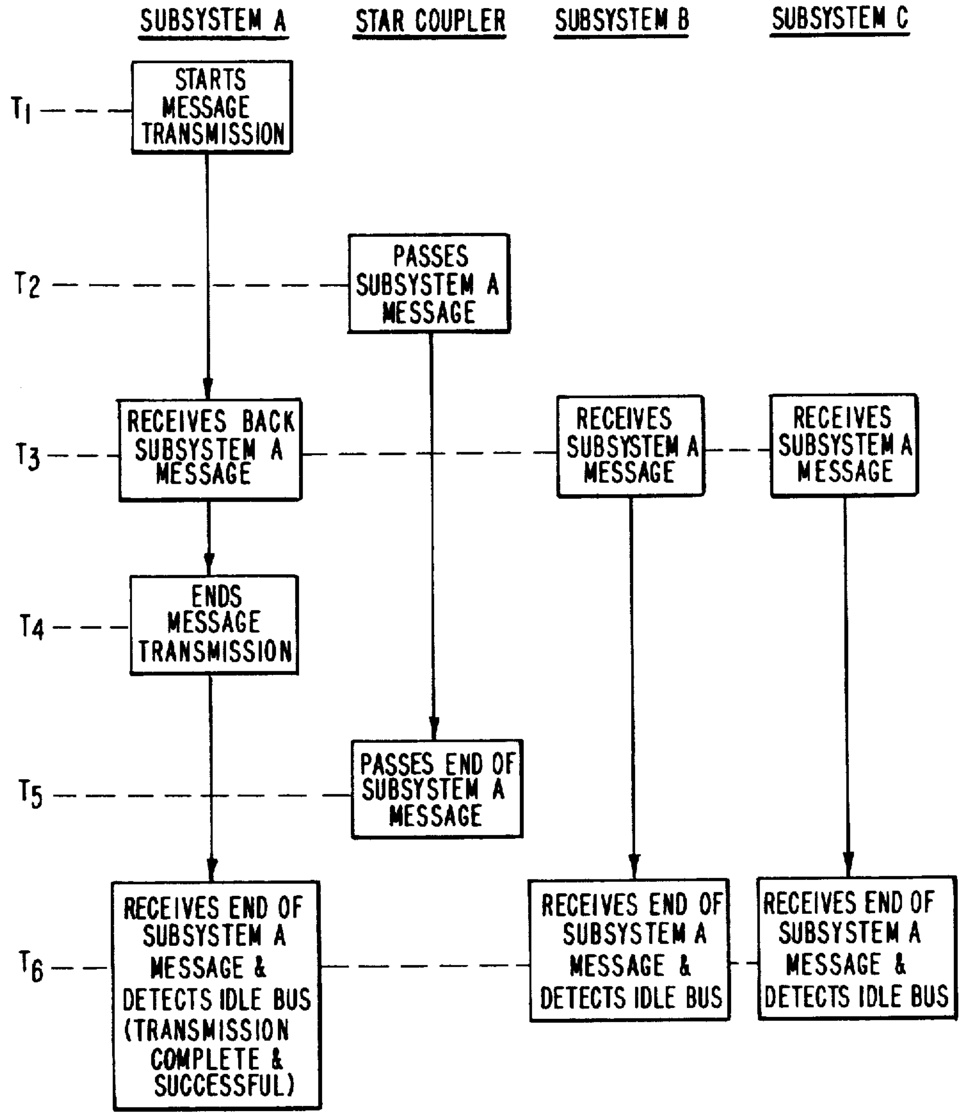
FIGS. 18, 19 and 20 illustrate three exemplary cases in which messages are transmitted in the data processing system of FIGS. 1 and 2.
Figure 19:
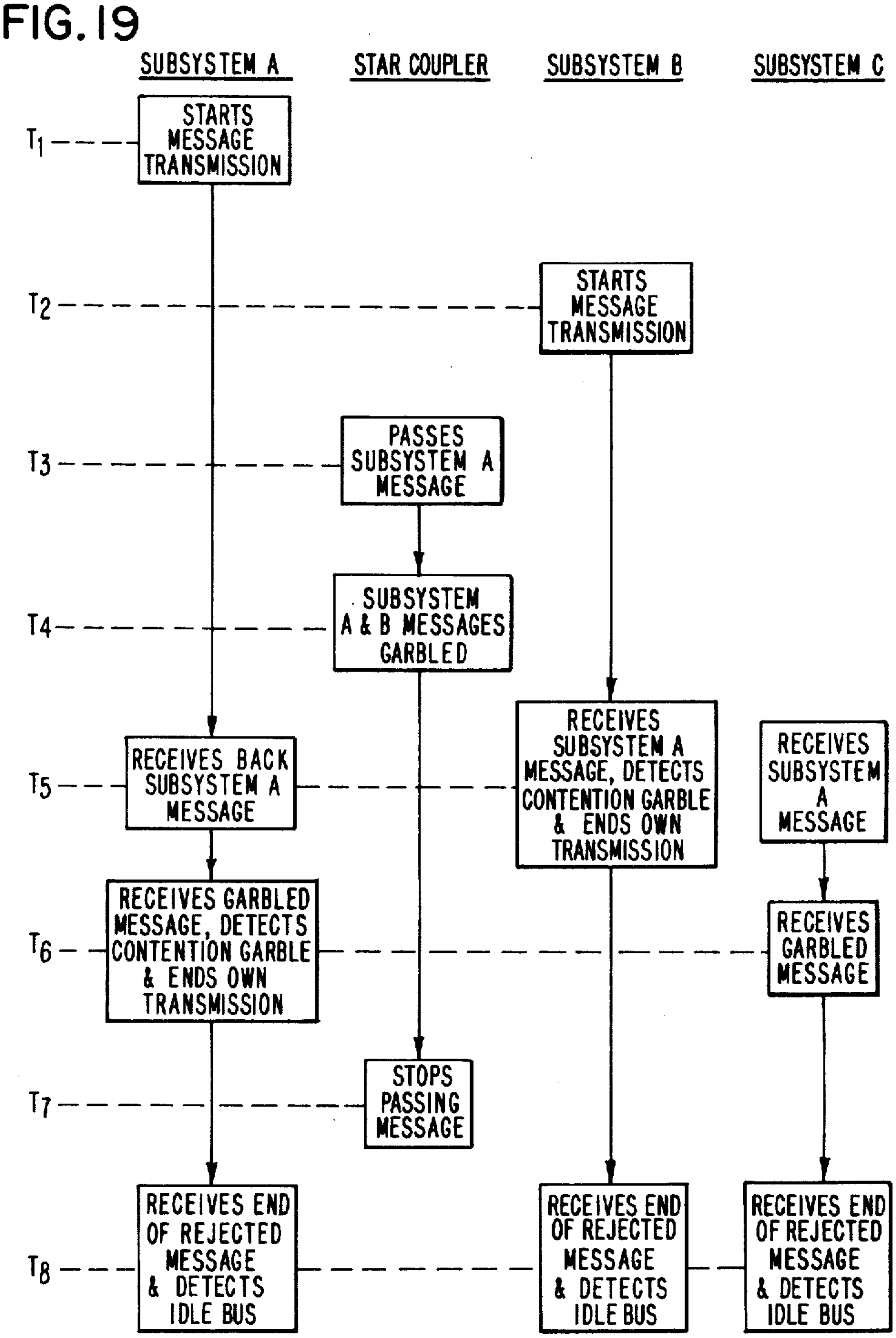
Figure 20:
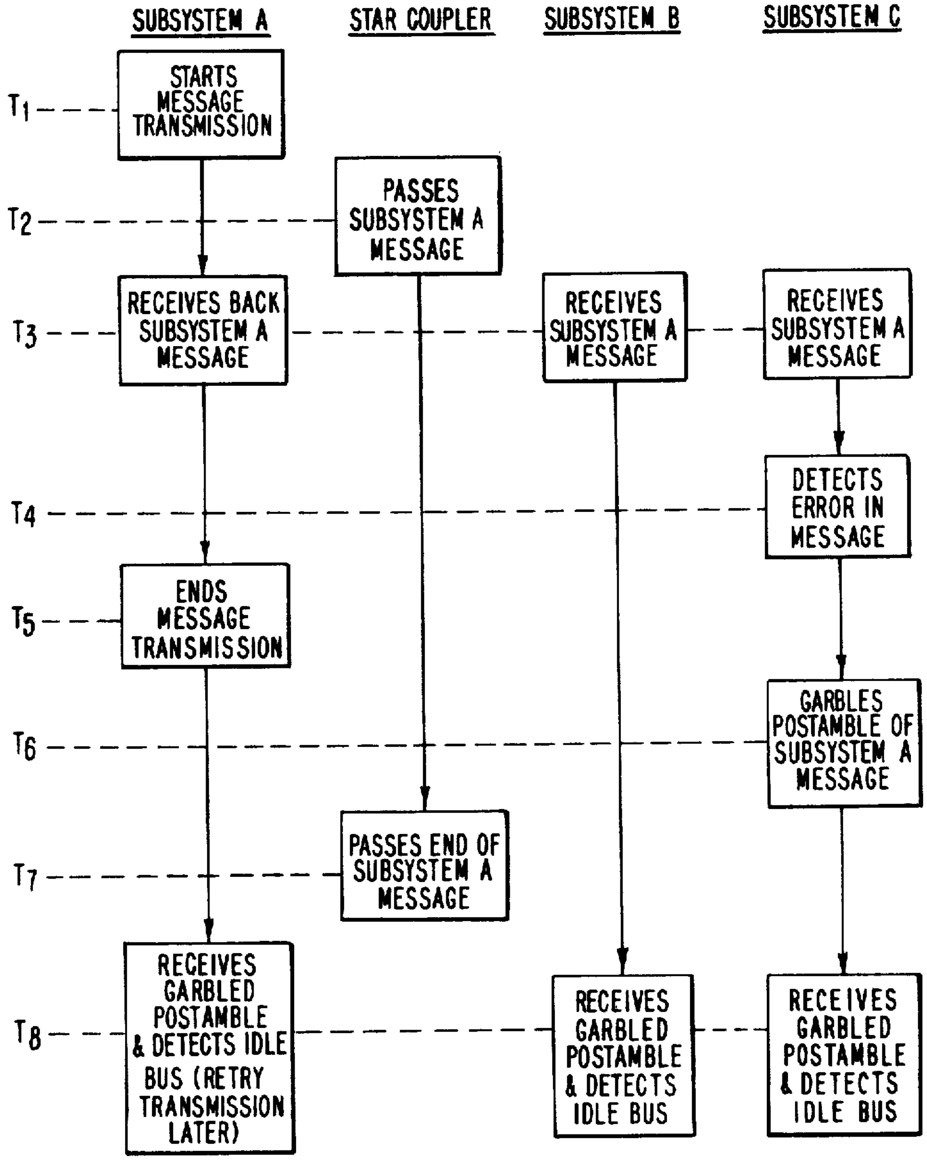

FIGS. 18, 19 and 20 illustrate the operation of the System Bus and the system bus interface 28 by showing three exemplary cases involving three subsystems 24 (referred to as Subsystem A, Subsystem B and Subsystem C). In the case shown in FIG. 18, Subsystem A successfully transmits a message. In the case shown in FIG. 19, Subsystem A transmits a message, but it is garbled by a simultaneous transmission by Subsystem B. Finally, in the case shown in FIG. 20, Subsystem A transmits a message, but Subsystem C detects an error and garbles the postamble of the message.

Turning first in particular to FIG. 18, it can be seen that Subsystem A starts the transmission of its message at time $T_1$. At time $T_2$, the star coupler of the System Bus receives the message and passes it to all of the other subsystems in the system, including Subsystems B and C. At time $T_3$, Subsystem A begins receiving back its own message and both Subsystems B and C also begin to receive the Subsystem A message. At time $T_4$ the transmission of the message from Subsystem A ends and at time $T_5$ the end of the message from Subsystem A is passed through the star coupler. Finally, at time $T_6$, Subsystem A, Subsystem B and Subsystem C each receive the end of the message from Subsystem A, and then detect the System Bus as going idle. Since there was neither contention garble detected by Subsystem A nor postamble garble resulting from errors in the message detected by Subsystems B and C, the transmission of the message is complete and successful.

In FIG. 19 there is illustrated the case where Subsystem A begins transmitting a message and, shortly therefter but prior to the receipt of the message by Subsystem B, Subsystem B also begins the transmission of the message. As seen in FIG. 19, Subsystem A begins transmitting a message at time $T_1$. At time $T_2$ Subsystem B then begins transmitting its message. As mentioned earlier, a subsystem will not begin to transmit a message unless the System Bus is idle. However, in the case of Subsystem B, it has not yet received the message from Subsystem A at time $T_2$, and the System Bus thus appears to it to be idle. In the case of any subsystem that begins to transmit a message on the System Bus, there is an interval, referred to as a "contention window", in which another subsystem may garble the message because it still sees the System Bus as idle. The maximum contention window of the system is essentially equal to the time in which it takes a message to travel along the System Bus between the two stations located the greatest distance apart on the System Bus.

The star coupler receives the message from Subsystem A at time $T_3$ in FIG. 19 and passes the message to the other subsystems. At time $T_4$ the star coupler also receives the message from Subsystem B and the messages passing through the star coupler then become garbled. At time $T_5$, Subsystem A receives the beginning portion of its own message back, before it has been garbled by the message from Subsystem B. Also at time $T_5$ Subsystem B and C receive the ungarbled message from Subsystem A. Since Subsystem B receives a message different than the one that it is transmitting, contention garble is detected and Subsystem B terminates or ends its own transmission. At time $T_6$ Subsystem A will finally receive the garbled portion of its own message resulting from the message from Subsystem B being passed through the star coupler. Subsystem A detects contention garble and ends its own transmission. In addition, Subsystem C at time $T_6$ receives the garbled messages from Subsystem A and Subsystem B. At time $T_7$, the end of the terminated messages is passed through the star coupler and at Time $T_8$ all the subsystems will receive the end of the terminated message and detect an idle bus.

Subsystems A and B will retry their messages later in accordance with the algorithm implemented in the retry circuit 204 of each system bus interface. Subsystem C will disregard the messages, since it will probably detect a swamp error when receiving the garbled messages at time $T_6$, and will always detect an idle error at time $T_8$ when it receives the end of the terminated messages.

It should be noted in connection with FIG. 19 that, in a worst case condition, Subsystem A might not receive back the garbled portion of its own message until after the system bus interface has provided the first byte of the CRC field to the serializer for transmission. In such a case, Subsystem A continues the transmission of the rest of the message, including the postamble and post-postamble. Since both Subsystem A and Subsystem B will detect contention garble, the transmission of their messages will be retried later. Subsystem C will disregard the garbled message since it will detect a CRC error.

In FIG. 20, there is shown the case where Subsystem A transmits a message without contention garble, but Subsystem C detects an error in the message. In particular, it can be seen that Subsystem A in FIG. 20 starts the transmission of its message at time $T_1$. At time $T_2$, the message is received by the star coupler and is passed to the other subsystems. At time $T_3$, Subsystem A receives back its own message and Subsystems B and C receive the message from Subsystem A. However, at time $T_4$ Subsystem C detects an error in the message that it is receiving from Subsystem A. This error could be a swamp error, a CRC error or one of the protocol errors mentioned earlier in connection with FIG. 17B. At time $T_5$, Subsystem A ends the transmission of its completed message and momentarily later, at time $T_6$, Subsystem C garbles the postamble of the message. At time $T_7$ the end of the message from Subsystem A (including the garbled postamble) passes through the star coupler. At time $T_8$, Subsystem A and Subsystem B detect the garbled postamble of the message and after the post-postamble, the System Bus is detected as idle. Subsystem A will retry the message at a later time. If either Subsystem B or Subsystem C were an intended destination, they will disregard the message.

DMA 140

The features of the DMA 140 (FIG. 14) in the system bus interface and its operation will be described in conjunction with FIGS. 21 through 25. Before proceeding with this description, however, it should be noted that there are two aspects of the present invention that are generally implemented by or in conjunction with the DMA 140. These two aspects, to be described in detail later, are:

(1) A storage area, referred to as a "mailbox", in the local memory of the subsystem associated with the DMA, such mailbox managed by the DMA for storing header information received by the subsystem; and (2) The inclusion of a local memory address (referred to herein as a data starting address or DSA address) in any message requesting data (data request message) and in any message returning the data (data return message) in response thereto, so that the processor in the subsystem receiving the data return message need not be interrupted to store the data at the memory address.

MAILBOX 350

Figure 21:
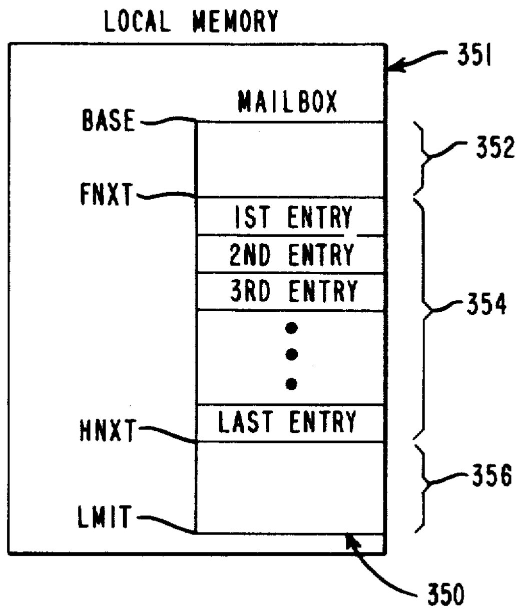
FIG. 21 illustrates the content of the local memory in each of the subsystems.

The mailbox referred to above is illustrated in FIG. 21 and is designated 350. As mentioned above, the mailbox is part of the local memory, designated 351, of each subsystem 24. The mailbox 350 consists of a predetermined number of consecutive memory locations in the local memory and stores all header messages (including header portions of header and data messages) that are received and that include the destination address of the subsystem. The header messages are stored or entered sequentially and consecutively in the memory locations in the mailbox and, each time the processor within the module or subsystem is able to act on a message, it accesses the header message in the top or first entry of the mailbox.

The mailbox 350 in FIG. 21 is illustrated as having an empty portion 352, an entry portion 354 in which a number of entries (labeled "1st entry" through "last entry") or header messages are stored, and an empty portion 356 following the last entry in the portion 354. The first memory word address within the mailbox 350 is identified as "BASE" and the last memory word address in the mailbox 350 is identified as "LMIT". The beginning byte address of the first entry stored in the mailbox (representing the earliest received message) is identified as "FNXT" and the byte following the last byte address of the last entry (representing the last received message) is identified as "HNXT". The values of BASE, FNXT, HNXT and LMIT are maintained by the DMA 140, as will be described later. As header messages are received by the system bus interface associated with an addressed subsystem, they are passed, one word at a time, to the mailbox where they are stored beginning three bytes past the address defined by HNXT. When the header is completely stored, the ending header address plus one (EEBA+1) is stored into the three byte area addressed by the original value of HNXT. When the processor in the subsystem is ready to act on a message, it withdraws the header message in the first entry in the mailbox, beginning at the address defined by FNXT, with the end of entry defined by the first three bytes of the entry. The second entry then becomes the first entry representing the earliest received message not yet accessed by the processor.

Initially, of course, the addressed specified by BASE, FNXT and HNXT will be the same. As entries are added, the valve of HNXT increases, and as entries are acted on by the processor, the value of FNXT increased The empty portion 352 shown in FIG. 21 represents memory space where entries have been withdrawn and acted on by the processor. The empty space 356 represents memory space which initially has not yet been used. When the value of FNXT is equal to the value of HNXT, the processor knows that the mailbox is empty. In addition, as words of entries are written into the mailbox, if the value of the address at which the words are being written increments to the value of LMIT, the DMA will return the address automatically to the value of BASE so that the mailbox continues to store header messages, but now in the empty portion 352. If the address at which words of an entry are being written into the mailbox reaches the value of FNXT, the entry or header message will generally be rejected and aborted in the message control circuit 144 associated with the subsystem, since the mailbox is full and would otherwise overflow.

All of the above management functions of the mailbox are accomplished by the DMA in a manner that will be described later.

Since each local memory of each subsystem 24 will have a mailbox 350, there will be no processor in the system 10 that will be routinely interrupted by the receipt of messages from the System Bus. Rather, each processor will act on the entries stored in its mailbox only at times when it purposely looks in the mailbox for the first or top entry. The processor is thus able to complete its tasks without interruption, even though messages are received and stored in its local memory. In order to further assure that each processor will not be routinely interrupted by the receipt of messages, and as will be described later in more detail, any message that is sent by a subsystem requesting data includes the local memory address at which such data is to be stored when returned to the requesting subsystem. The header portion of the header and data message that includes the data that is returned in response to such a request also includes the local memory address so that the DMA 140 can load the data into the desired area of local memory without interrupting the processor and without requiring a subsequent movement of data.

Figure 22A:
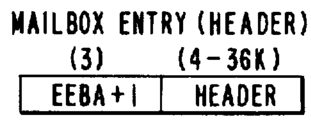
FIGS. 22A and 22B illustrate the format of mailbox entries in the local memory shown in FIG. 21.
Figure 22B:
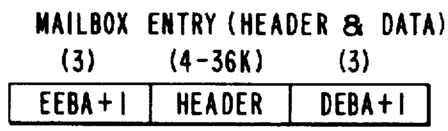

In FIGS. 22A and 22B there are shown the format of entries in the mailbox 350. Specifically, there is shown in FIG. 22A an entry format for a header-only message, and there is shown in FIG. 22B the entry format for a header and data message.

Looking first at FIG. 22A, it can be seen that the first three bytes of the mailbox entry are reserved for the entry ending byte address plus one (EEBA+1) and the remaining portion of the entry, depending upon the size of the header (four through 36K bytes) is reserved for the destination address field, source address field, op code field and header data field of the message. The preamble, flags, CRC bits, postamble and post-postamble are removed from the message at the message control circuit 144 and are not stored as part of the entry. Storing the ending entry byte address plus one (EEBA+1) will enable the processor to know the exact length of the entry when it accesses the entry from the mailbox.

Looking now at FIG. 22B, the mailbox entry for a header and data message also includes, in its first three bytes, the entry ending byte address plus one (EEBA+1). The next portion of the entry includes the destination address field, source address field, op code field and header data field of the header portion of the message (four through 36K bytes). Following the header portion of the entry are three bytes representing a data ending byte address plus one (DEBA+1).

As mentioned earlier in conjunction with FIG. 12B, the header data field of a header and data message includes, in its first three bytes, the starting data address in the local memory of the data included in the header and data message. Consequently, when the processor accesses an entry from the mailbox 350 representing a header and data message, it will know the beginning address of the separately stored data in the local memory from this three byte address which is part of the header message in the entry. In addition, the processor will know the ending address of the data in the local memory by the three bytes at the end of the entry representing the data ending byte address plus one (DEBA+1).

It should be noted at this point that, when a header and data message is received by a subsystem, the DMA 140 loads the header portion of the message directly into the mailbox 350 and then loads the data portion of the message directly into the local memory at the address specified by the data starting address in the header data field. It is significant that the loading of the data portion of the message is not in the mailbox but, rather, is at memory locations in some other part of the local memory specified originally by a starting address in the message that requested the data. This other part of the local memory is normally the desired part or location from where the data is to be accessed by the processor in the subsystem in order to complete the execution of the task or job that needs the data. Otherwise, storing the data with the header information in the mailbox would result in the disadvantage of having to later interrupt the processor in order to move the data portion from where it is stored with the control or header information to the desired part of the local memory. Of course, when a header-only message is received by the subsystem, the DMA 140 merely loads the header into the mailbox.

As mentioned above, it is an important aspect of the present invention that the data starting address of any data that is either requested by a message or that is being provided by a message, be included in that message. That is, when one of the subsystems 24 requests data from another of the subsystems 24, that request, in the form of a header-only message, includes the local memory address at which the requested data is to be stored in the local memory of the requesting subsystem. When the requested data is returned, in the form of a header and data message, the data starting address is included in the header and data message (in the first three bytes of the header data field). Consequently, the processor of the requesting subsystem need not be interrupted for the data starting address when the requested data is returned. This, of course, enables the processor to complete its own tasks without interruption at all, since the mailbox also permits the storage of header information without interruption of the processor. This technique is superior to prior techniques used to avoid processor interrupts such as storing the data in general purpose buffers, which techniques require a subsequent movement of data to get the data to its intended destination in local memory.

DMA 140 (DETAIL)

Figure 23:
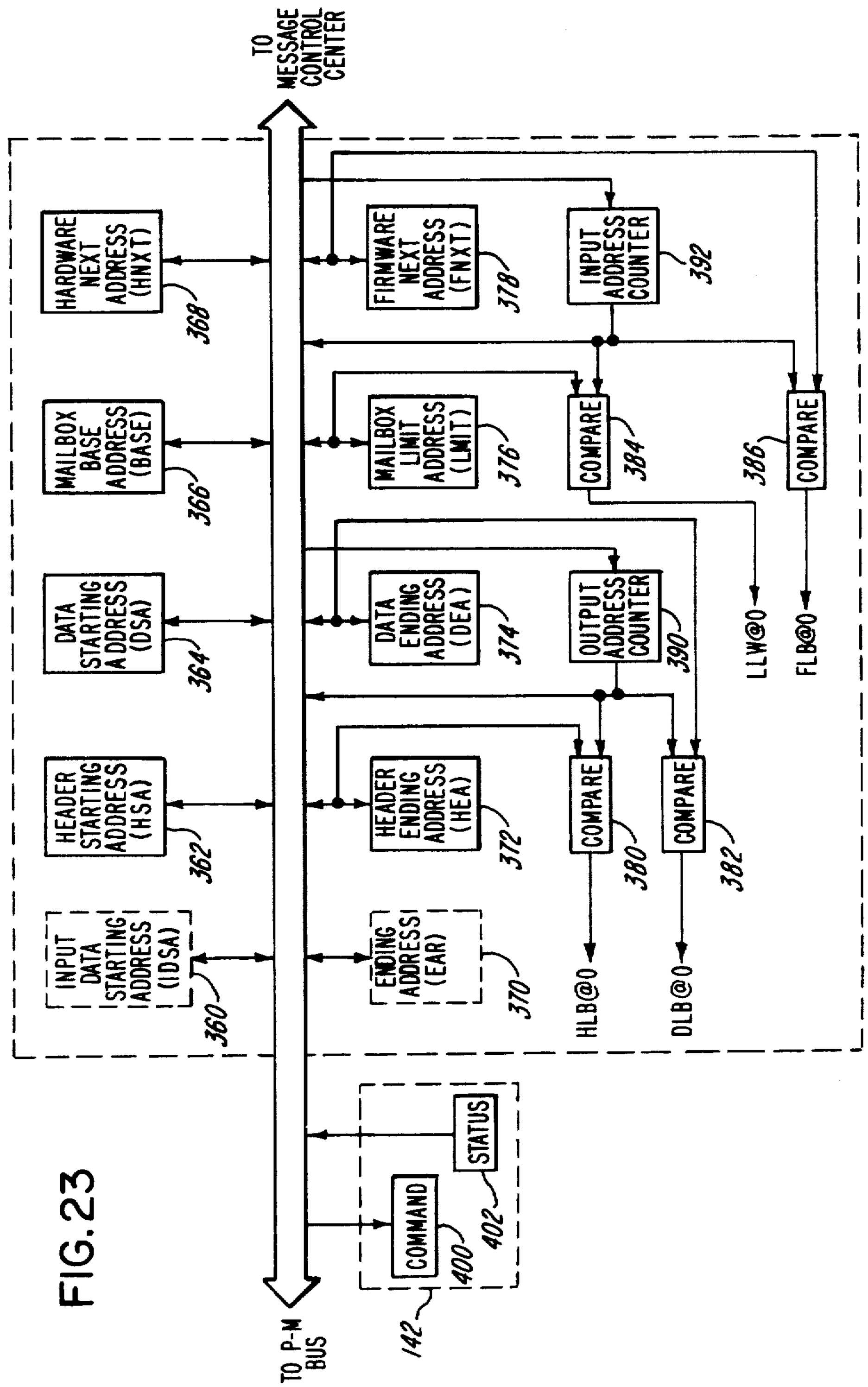
FIG. 23 is a block diagram illustrating in greater detail the DMA and the control and status registers shown in FIG. 14.

Turning now to FIG. 23, there is shown in greater detail the DMA 140 and the command and status registers 142 that were previously shown in general form in FIG. 14. As seen in FIG. 23, the DMA 140 includes a plurality of registers for managing the direct access to the local memory of its associated subsystem and, in accordance with the present invention, for managing the mailbox 350 within the local memory of its associated subsystem. The registers within the DMA 140 include:

Input Data Starting Address (IDSA) Register 360
Header Starting Address (HSA) Register 362
Data Starting Address (DSA) Register 364
Mailbox Base Address (BASE) Register 366
Hardware Next Address (HNXT) Register 368
Ending Address (EAR) Register 370
Header Ending Address (HEA) Register 372
Data Ending Address (DEA) Register 374
Mailbox Limit Address (LMIT) Register 376
Firmware Next Address (FNXT) Register 378

In addition, the DMA 140 includes four compare circuits 380, 382, 384 and 386, an output address counter 390 and an input address counter 392. The IDSA register 360 and the EAR register 370 are shown by broken lines in FIG. 23, since they are not directly accessible by the processor of the associated subsystem and are not directly concerned with the management of the mailbox 350. The remaining registers 362, 364, 366, 368, 372, 374, 376 and 378 are directly accessible by the processor. The registers 366, 368, 376, and 378 are, in addition, concerned with the management of the mailbox 350.

Not shown in FIG. 23 is the control circuitry for controlling the DMA operations that will shortly be described. Such control circuitry can be implemented largely by programmable logic arrays (PLA's) that can be found primarily in FIGS. 79A through 89L.

Referring first to the BASE register 366, HNXT register 368, LMIT register 376 and FNXT register 378, these registers control the operation of the mailbox 350 as messages are received by the associated subsystem. The BASE and LMIT registers are initially loaded by the processor of the associated subsystem by way of the P-M bus during the initialization of the subsystem. In addition, the HNXT register 368 and the FNXT register 378 are loaded with the same value as the BASE register during initialization.

DMA OPERATION—RECEIVING MESSAGES

When a message is received by the system interface chip 136 in the system bus interface, and is passed through the message control circuit 144, the header (or header portion of a header and data message) is stored in the mailbox 350 in accordance with the information stored in the BASE, LMIT, HNXT and FNXT registers. The input address counter 392 is initially loaded with the same address as that in the HNXT register 368. As each byte of data is received from the message control circuit 144, the input address counter 392 is incremented, and its address is provided to the P-M bus in order to store each word of the message in a local memory address location in the mailbox 350. In addition, the output of the input address counter 392 is compared to the value in the FNXT register 378 by the compare circuit 386. When the signal FLB@0 at the output of compare circuit 386 indicates that the input address counter 392 has reached the FNXT address within the mailbox (see FIG. 21), the mailbox 350 has been completely filled and there is no remaining room for the header message. Generally, the message in such a circumstance will be aborted or rejected and the HNXT register 368 will not be incremented to the next available entry address. If, by chance, input address counter 392 has reached the FNXT address but there are so few bytes left in the message that they are all temporarily buffered in the message control circuit 144, the control for the DMA will permit the DMA to store the message up to the FNXT address, and when the first entry at the FNXT address is later accessed by the processor, the DMA will continue to store the remaining bytes (then stored in the buffers within the message control circuit 144) into the mailbox, and then increment the HNXT register 368.

The compare circuit 386 and the signal FLB@0 also provide a means for the DMA to determine when the mailbox 350 is empty. The DMA control circuitry can cause the value of the address in HNXT register 360 to be loaded into the input address counter 392 so that the addresses in the HNXT register 360 and in FNXT register 378 are compared. Thus, status bits can be generated when the mailbox is empty and has not yet received any entries, and when the last entry in the mailbox is accessed by the processor and the mailbox becomes empty.

The address in the input address counter 392 is also compared to the LMIT address within the LMIT register 376 at the compare circuit 384 to indicate that the empty portion 356 (FIG. 21) of the mailbox has been filled. If the signal LLW@0 at the output of the compare circuit 384 indicates a match, then the input address counter 392 is loaded with the same address as the address in the BASE register 366 so that the message can continue to be stored, but now in the empty portion 352 starting at the BASE address.

When the header information has been completely stored in its entry in the mailbox 350, the input address counter 392 is incremented once again and its output is provided to the ending address register 370. This value represents the previously described entry ending byte address plus one (EEBA+1) which is then stored in the mailbox as the first three bytes of the entry. The HNXT register 368 is then changed to the same value as the input address counter 392, which represents the beginning address of the next entry.

If the message received is a header and data message, the input data starting address register 360 will have previously been enabled by the DMA control circuitry to receive the data starting address in the first three bytes of the header data field of the message. The input address counter 392 is loaded, after the header portion is stored, with that data starting address and then increments as each byte of data in the data portion of the message is received from the message control circuit 144. When the last byte of data has been received and stored as a word in the local memory of the associated subsystem, the value of the input address counter 392 is incremented to represent the data ending byte address plus one (DEBA+1) and this value is stored in the ending address register 370. The data ending byte address plus one (DEBA+1) is then stored in the mailbox, along with the header portion, as the last three bytes of the mailbox entry. The EEBA+1 information in the entry will then point to the first byte beyond the DEBA portion of the entry.

It should be apparent from the foregoing description that the provision of the mailbox 350 managed by the registers in the DMA and the inclusion of a DSA address in any header and data message essentially eliminate immediate processor involvement in the receipt of messages from the System Bus.

By way of comparison, prior systems have required that the processor at any subsystem be interrupted each time a message is received in order to load the DMA circuitry with the starting address at which the message information was to be stored in the memory of the subsystem, regardless of whether the message contents were control information, requested data, or both. Once supplied with the starting address, the DMA circuitry could then sequentially access storage or memory locations, beginning from the starting address, in order to store the entire informational contents of the message.

In contrast, the DMA 140 does not require processor interruption or involvement to store the contents of messages received from the System Bus. If header or control information is received (either as a header-only message or as a header and data message), the mailbox managing or addressing registers of the DMA 140 load the control information directly into the mailbox 350, beginning at the location pointed to by HNXT, without the interruption or involvement of the processor. Likewise, if blocks of data are received in a header and data message, the DSA address has already been provided to the DMA by the header information in the header portion of that message, and the DMA loads the blocks of data directly into the local memory without interruption or involvement of the processor. While messages are being received by any subsystem and directly stored by the DMA 140 in the local memory, the processor is free to continue uninterrupted with the execution of its tasks.

DMA OPERATION—TRANSMITTING MESSAGES

When messages are transmitted from a subsystem, the processor of the subsystem issues a send command which loads the HSA register 362 with the header starting address in the local memory, the HEA register 372 with the header ending address and, if a header and data message, the DSA register 364 with the data starting address and the DEA register 374 with the data ending address. The DMA 140 will then access the local memory to sequentially read, without processor interruption, each word of the header and data portions in the message and provide the message information to the message control circuit 144.

The DMA 140 will initially load the output address counter 390 with the value of the header starting address and will sequentially read each word of the header until the signal HLB@0 at the output of the compare circuit 380 indicates that the output address counter 390 has reached the header ending address stored in the HEA register 372. If a header and data message, the DMA will then load the output address counter 390 with the data starting address in the DSA register 364, and the output address counter 390 then increments to sequentially read each word in the data portion of the message from the local memory. Of course, if the transmitted message is a header-only message, the transmission ends after the header ending address has been reached.

When the signal DLB@0 at the output of the compare circuit 382 indicates that the output address counter has reached the data ending address in the DEA register 374, the DMA ceases to access the local memory and the transmission of the data, after passing through the message control circuit 144, ends.

COMMAND AND STATUS REGISTERS 142

Also shown in FIG. 23 is a block representing the command and status registers 142 previously mentioned in conjunction with FIG. 14. As seen in FIG. 23, the command and status registers 142 include a command register 400 and a status register 402. The command register 400 is loaded by the processor of the associated subsystem and indicates to the system interface chip 136 the operation that is to be performed in connection with transmitting and receiving messages. This operation would normally concern both the DMA 140 as well as the message control circuit 144.

The status register 402 is loaded, during the operation of the system interface chip 136, with status bits indicating the status of the system interface chip. These status bits will be used, in conjunction with the control circuitry in the DMA 140 and the message control circuit 144, to control the operation of the system interface chip 136.

Figure 24:
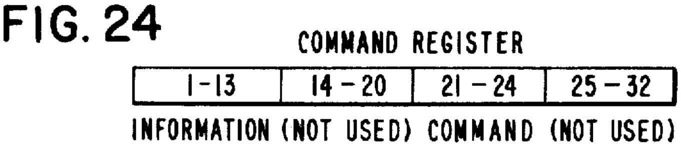
FIG. 24 illustrates the content of the command register shown in FIG. 23.

FIG. 24 illustrates the contents of the command register 400. As can be seen, the command register is a 32-bit register, with Bits 21–24 providing the command and Bits 1–13 providing information for use in conjunction with the command. The Bits 14–20 and 25–32 of the command register are not used in any of the described aspects of the present invention. The following Command Table #1 illustrates, for various commands, the bits that are loaded into the command field (Bits 21–24) of the command register.

COMMAND TABLE #1

| COMMAND | COMMAND FIELD (BITS 21-24) |
|---|---|
| INITIALIZE | 0000 |
| SEND | 1000 |
| RECEIVE | 0100 |
| LOAD MASK | 0010 |

INITIALIZE

The INITIALIZE command shown in Command Table #1 resets the system interface chip 136. In response to the INITIALIZE command, the BASE and LMIT registers 366 and 376 are loaded with their permanent values and the HNXT register 368 and the FNXT register 378 are initially loaded with the value of the BASE register 366. Bits 1-8 of the command register are loaded with the unique subsystem address of the associated subsystem. This information is transferred to the SADD register in the receiver address check circuit 184, described earlier in conjunction with FIG. 15. Bit 9 (a diagnostic control bit) can be used to permit the system interface chip (SIC) to enable circuitry for returning a message directly to the SIC without use of the System Bus. Returning the message in this manner is useful in performing diagnostic operations, but is not part of the present invention. Bit 10 is not used in the described embodiment. Bit 11 controls whether each byte serialized for transmission on the System Bus will be serialized beginning from the most significant bit or from the least significant bit. Bit 12 is delivered to diagnostic circuitry, forming no part of the present invention, that will make the associated subsystem a destination or required receiver for all header messages. Bit 13 is set to "1" during initialization, and is then set to "0" to clear the INITIALIZE command before the command register 400 is loaded with the next command.

SEND

The SEND command in Command Table #1 directs the system interface chip to send or transmit a message on the System Bus. Bits 1-4 and 8-12 of the command register are not used, and Bits 7 and 13 are always set at "1" and "0", respectively, in this command. Bits 5 and 6 determine the type of message that is to be transmitted from the system interface chip, with the type of command and the corresponding values of Bits 5 and 6 shown in the following Command Table #2:

COMMAND TABLE #2

| TYPE OF MESSAGE | BITS 5 & 6 |
|---|---|
| HEADER | 00 |
| HEADER (WITH DATA) | 01 |
| HEADER AND DATA | 11 |

The header message and the header (with data) message are both header-only messages, the format of which was described earlier in conjunction with FIG. 12A. The header (with data) message contains data information in its header data field which must be obtained from the local memory of the sending subsystem at a location separate from that where the other fields of header information are stored. For purposes of obtaining this header data information, the DMA will use the DSA register 364 and DEA register 374 in the same way that they are used to obtain the data portion of a header and data message. The header message, on the other hand, does not include information in its header data field that must be obtained separately.

The header and data message has a format which was described earlier in conjunction with FIG. 12B.

RECEIVE

The RECEIVE message in Command Table #1 directs the system interface chip to compare, at the address check circuit 184, the destination address field of each received message with the unique station or subsystem address byte that was provided to the SADD register during the INITIALIZE command. Bits 2-12 are not used in this command. Bit 13 is always at a "0". If Bit 1 is at "1", the destination address of each message is checked against the subsystem address. If Bit 1 is at a "0", there is no check for the subsystem address, but only the more general broadcast or group address that is specified by the LOAD MASK command.

LOAD MASK

The LOAD MASK command directs the system interface chip to load the MASK register in the address check circuit 184 (FIG. 15) with a broadcast or group address. Bits 1-8 indicate the group address, and all messages that have a matching group address in their destination address field will be received by the subsystem. The following Command Table #3 indicates the values of Bits 1-8 in the command register 400 and the resulting messages that will be received or copied.

COMMAND TABLE #3

| BITS 1-8 | MESSAGES COPIED ARE THOSE HAVING IN THEIR DESTINATION ADDRESS FIELD: |
|---|---|
| 10000000 | F8 |
| 01000000 | F9 |
| 00100000 | FA |
| 00010000 | FB |
| 00001000 | FC |
| 00000100 | FD |
| 00000010 | FE |
| 00000001 | FF |

The destination addresses shown are hexidecimal and are equivalent to one byte. If Bits 1-8 are all "0", the associated subsystem is not a destination in any of the groups specified by the group addresses.

Figure 25:
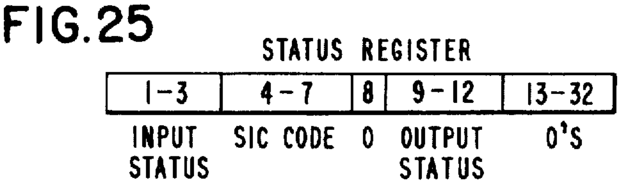
FIG. 25 illustrates the content of the status register shown in FIG. 23.

The status register 402 contains the status of the system interface chip. The content of the status register is illustrated in FIG. 25. As can be seen, Bit 8 and Bits 13-32 are always at "0". Bits 1-3 reflect the input status of the system interface chip 136, Bits 4-7 contain a system interface chip (SIC) code, and bits 9-12 reflect the output status of the system interface chip. The SIC code is only used if more than one system bus interface is attached to the P-M bus of a subsystem, and is used to identify the system bus interfaces (or SIC's) to the processor of the subsystem. This configuration was mentioned earlier in conjunction with FIGS. 9 through 11, but is not concerned with any aspect of the present invention.

The following Status Table #1 illustrates, for various output (transmission) status conditions of the system interface chip, the corresponding values of Bits 9-12.

STATUS TABLE #1

| OUTPUT STATUS | BITS 9-12 |
|---|---|
| No Output Status Available | 000X |
| Output Complete | 100+ |
| Output Error (Buffer Underflow) | 110+ |

STATUS TABLE #1-continued

| OUTPUT STATUS | BITS 9-12 |
|---|---|
| Output Error (Memory Error) | 101+ |
| Output Error (Excessive Retry) | 111+ |

In Status Table #1, "X" indicates a "don't care" value and "+" indicates either a "0" or a "1"

The Output Complete status indicated in Status Table #1 is generated when the system interface chip 136 has successfully transmitted a message. The Output Error (Buffer Underflow) status is generated when the system interface chip has detected a buffer underflow condition, i.e., the subsystem associated with the system interface chip has not provided bytes of data quickly enough, and the message control circuit 144 has transmitted all the bytes that it has received and is waiting during the middle of a message transmission for a new byte of data from the subsystem. The Output Error (Memory Error) status is generated when the data fetched from the local memory for transmission has an error that cannot be corrected, such as a double-bit error. The Output Error (Excessive Retry) status is generated when the system interface chip has not been able to successfully transmit a message after going through a predetermined maximum number of retry attempts under the control of the retry circuit 204, described earlier in conjunction with FIG. 15.

For all the output status conditions (except No Output Status Available), the value of Bit 12 can either be a "0" or a "1". In one preferred embodiment of the present invention to be described later in conjunction with FIGS. 27 through 31, the System Bus is actually two separate "system buses" or "channels". Each of these system buses or channels include a star coupler and transmission lines to and from each subsystem. A "0" at Bit 12 indicates that a message is being transmitted on one of the channels (Channel A) and a "1" indicates a message is being transmitted on the other of the channels (Channel B).

The input status field of the status register indicates the input status of the system interface chip 136, with the values of the Bits 1-3 and their corresponding input (receiving) status indicated in Status Table #2:

STATUS TABLE #2

| INPUT STATUS | BITS 1-3 |
|---|---|
| No Input Status Available | 000 |
| Mailbox Non-Empty | 100 |
| Input Buffer Overflow (Message Rejected) | 010 |
| Mailbox Overflow (Message Not Rejected) | 001 |
| Mailbox Overflow (Message Rejected) | 110 |

The Mailbox Non-Empty status is generated when the system interface chip 136 has received and entered a message in the mailbox 350, and the mailbox has previously been empty. The Input Buffer Overflow (Message Rejected) status is generated when the system interface chip has received a message and has not been able to transfer all of the message to the local memory because the RFIFO 190 (FIG. 15) or its associated buffers (not shown) have overflowed. In such an event, the message is rejected. The Mailbox Overflow (Message Not Rejected) status is generated when the system interface chip has received a message but has not been able to transfer all of the header information into the local memory as an entry because the mailbox has been filled. However, since the bytes not stored are all in buffers within the message control circuit 144 and can be later stored in the mailbox, the message is not rejected. The Mailbox Overflow (Message Rejected) status is also generated when the system interface chip has received a message but has not been able to transfer all of the header information into the local memory because the mailbox has been filled. However, there are too many bytes to be buffered in the message control circuit 144, and the message is rejected. Both the Mailbox Overflow (Message Not Rejected) and the Mailbox Overflow (Message Rejected) status conditions have been briefly described earlier in conjunction with FIG. 23.

SWAMP CIRCUIT 160 AND IDLE DETECTION CIRCUIT 162

Figure 26:
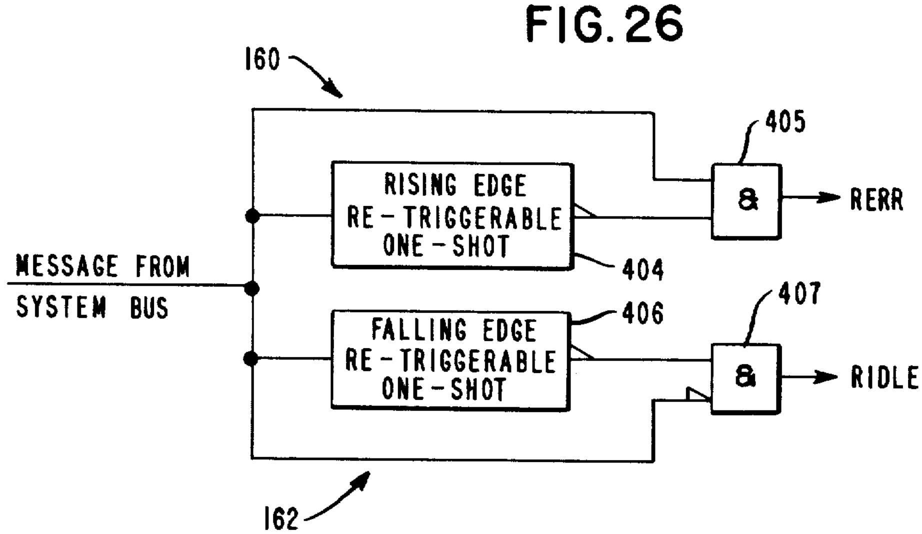
FIG. 26 is a detailed block diagram of the swamp circuit and the idle detection circuit shown in the system bus interface of FIG. 14.

FIG. 26 illustrates circuitry that could be used to accomplish the functions of the swamp circuit 160 and the idle detection circuit 162 that were mentioned earlier in conjunction with FIG. 14. The swamp circuit 160 includes a rising edge re-triggerable one-shot 404 and an AND gate 405. The input of the one-shot 404 is connected for receiving encoded messages or signals on the System Bus by way of the bus receiver 58. The AND gate 405 receives at one input the signals from the System Bus and receives at its other input the signal at the inverted output of the one-shot 404. The output of the AND gate 405 is the previously mentioned signal RERR, which is enabled when the swamp circuit 160 detects a swamp condition or error on the System Bus.

The inverted output at the one-shot 404 goes to a "0" or low value when the signal on the System Bus goes to a "1", and stays at a "0" for a period of time just slightly greater than the normal pulse width of the encoded signals on the System Bus. Accordingly, when there is no swamp condition present on the System Bus and the pulses in the received message are of the correct width, the signal RERR at the output of AND gate 405 remains at a "0". When a swamp condition exists, with one or more pulses in the message being excessively wide, the output of the one-shot 404 will return to a "1" at the same time that the signal or pulse from the System Bus is still at a "1". The signal RERR at the output of AND gate 405 will thus go to a "1".

The idle detection circuit 162 seen in FIG. 26 includes a falling edge re-triggerable one-shot 406 and an AND gate 407. The one-shot 406 receives at its input encoded messages or signals from the System Bus by way of the bus receiver 58. The AND gate 407 receives at one input the signal at the inverted output of the one-shot 406 and receives at a second, inverted input the signals from the System Bus. The inverted output of the one-shot 406 goes to a "0" value when the signal on the System Bus goes to a "0" value between pulses, and remains at the "0" value for a period of time just slightly greater than the normal interval between pulses during a message.

When there is no idle condition on the System Bus, and the interval between pulses are of the correct length, the signal RIDLE at the output of the AND gate 407 remains at a "0". When an idle condition exists, and the interval between pulses on the System Bus is greater than the normal interval between pulses in a message, the output of the one-shot 406 will return to a "1" value while the signal on the System Bus is still at a "0". The RIDLE signal at the output of AND gate 407 will thus go to a "1".

DUAL-CHANNEL DATA PROCESSING SYSTEM 410

Figure 27:
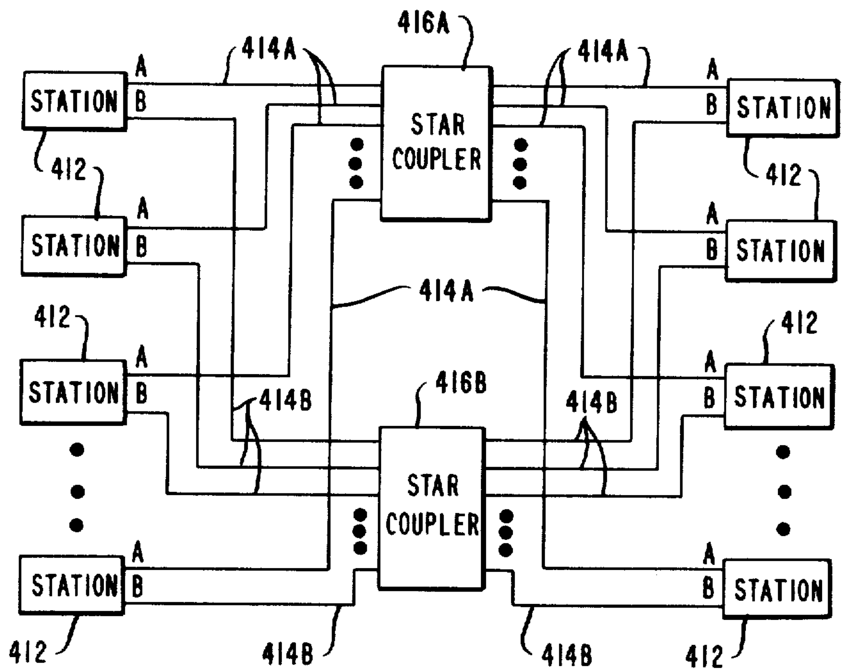
FIG. 27 is a simplified block diagram illustrating an alternate embodiment of a data processing system in accordance with the present invention.

In FIG. 27 there is shown a data processing system 410 in accordance with a further aspect of the present invention. The data processing system 410, like the data processing system 10 illustrated in FIGS. 1 through 3, includes a plurality of stations 412, each enclosed within a single computer cabinet. Each station 412 is linked by an associated cable 414A to a star coupler 416A and by an associated cable 414B to a second star coupler 416B. Each of the cables 414A and 414B is comprised of a pair of optical fibers. Like the cables 14 in the data processing system 10 of FIGS. 1 through 3, one fiber in each of the cables 414A and 414B carries signals from its associated station to one of the star couplers and the other fiber in each of the cables carries signals back from that star coupler to the station.

For purposes of describing the inventive aspects of the data processing system 410, all of the cables 414A and 414B (with associated internal lines in the stations) and both star couplers 416A and 416B will be hereinafter collectively referred to as a dual-channel "System Bus". In addition, the cables 414A (with associated internal lines) and the star coupler 416A will be referred to as "Channel A" of the System Bus, and cables 414B (with associated internal lines) and the star coupler 416B will be referred to as "Channel B" of the System Bus.

It should be apparent from the foregoing description of FIG. 27 that a message transmitted from any one of the stations 412 can be sent either over Channel A or Channel B. If the message is sent, for example, over Channel A, it is transmitted along one of the two optical fibers in the associated cable 414A from the transmitting station to the star coupler 416A. The star coupler 416A, in turn, directs the signal back along the other of the two optical fibers in the same cable 414A to the transmitting station, and also back to every other station in the system 410 along all the other cables 414A. Likewise, a signal may be transmitted from any one of the stations 412 along one of the two fibers in the associated cable 414B to the star coupler 416B. The star coupler 416B in turn directs the signal back to the transmitting station as well as to every other station in the system 410, along the cables 414B.

The use of two channels in the data processing system 410 offers several significant advantages over the use of a single-channel System Bus, such as illustrated in the data processing system 10 of FIGS. 1, 2 and 3. Specifically, the dual-channel System Bus in FIG. 27 increases the reliability of the system since one channel can be used exclusively if the other channel should fail. In addition, the use of two channels increases the availability of the System Bus for transmitting messages. That is, at the same time that a first station is transmitting a message to a second station on one of the channels, a third station can be transmitting a message to a fourth station on the other channel, without either of the messages interfering with the other.

Figures 28, 29:
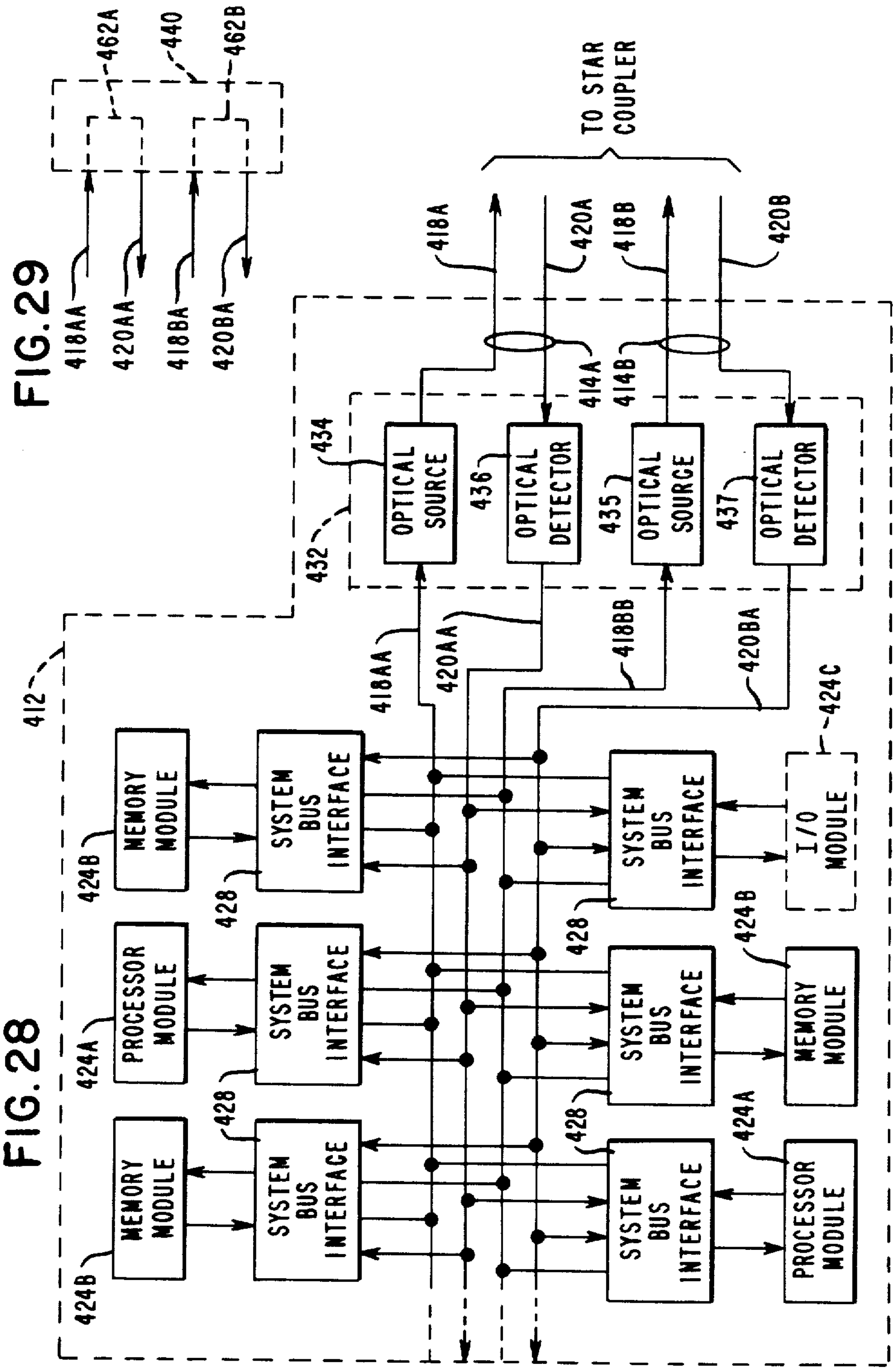
FIG. 28 is a simplified block diagram showing in greater detail a plurality of subsystems within one of the stations in the data processing system of FIG. 27.
FIG. 29 illustrates a wiring pattern for providing electrical turn around paths in the station of FIG. 28.

In FIG. 28 there is shown one of the stations 412 in greater detail. The cable 414A connected to the illustrated station 412 comprises a pair of optical fibers 418A and 420A. Similarly, the cable 414B comprises a pair of optical fibers 418B and 420B. The cables 414A and 414B are coupled within the station or cabinet to electrical internal transmission lines 418AA, 420AA, 418BA and 420BA by an optical interface 432. The optical interface 432 includes optical sources 434 and 435 and optical detectors 436 and 437. Optical signals on the optical lines 420A and 420B are converted into electrical signals for the lines 420AA and 420BA by the optical detectors 436 and 437, and electrical signals representing messages on the lines 418AA and 418BA are converted into optical signals for the optical lines 418A and 418B by the optical sources 434 and 435.

Each station 412 includes a plurality of subsystems that, as illustrated in FIG. 28, in turn include processor modules 424A, memory modules 424B and an I/O module 424C. Each of the modules 424A, 424B and 424C is connected or coupled both to the lines 418AA and 420AA and to the lines 418BA and 420BA by a single system bus interface 428.

Like the data processing system 10 of FIGS. 1, 2 and 3, one of the stations 412 in the data processing system 410 can include electrical turn around or return paths in the event that only one of the stations 412 is used in the system 410. An exemplary wiring pattern 440 for accomplishing the return paths in the case of the system 410, where there are two channels, is shown in FIG. 29. The wiring pattern 440 includes an electrical transmission line 462A connecting transmission lines 418AA and 420AA, and an electrical transmission line 462B connecting the transmission lines 418BA and 420BA. The wiring pattern 440 is placed in the station 412 at the location where optical interface 432 is shown in FIG. 28. Since there are no other stations in this circumstance, there would be no need, of course, for the illustrated optical interface or the optical cables 414A or 414B.

While the wiring pattern 440 can be used in the system 410 having only a single station 412, it should be noted that if there are two stations 412 in the system 410, then each station 412 could have one of the wiring patterns 440 connected at the free ends (toward the left-hand side of FIG. 28) of the lines 418AA, 420AA, 418BA and 420BA in order to accomplish the function of each of the two star couplers, without the use of star couplers 416A and 416B. The lines 418A, 420A, 418B and 420B would directly link the two stations without an external star coupler.

SYSTEM BUS INTERFACE 428

Figure 30:
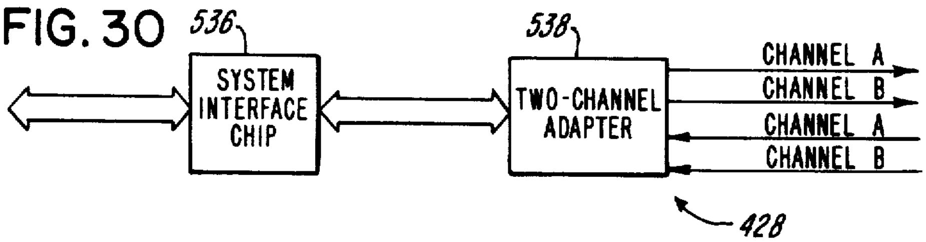
FIG. 30 is a simplified block diagram of the system bus interface shown connecting each subsystem or module to the dual-channel system bus in FIG. 28.

In FIG. 30, there is shown in simplified form the major circuit blocks within each system bus interface 428 As can be seen, the system bus interface 428 includes a system interface chip 536 and a two-channel adapter 538. The system interface chip 536 is similar to the system interface chip 136 described earlier in connection with FIGS. 13 through 25, except as will be noted hereafter. The two-channel adapter 538 is likewise similar to the channel adapter 138 shown in FIGS. 13 and 14, except that the two-channel adapter includes circuitry for connection to both Channel A and Channel B of the dual-channel System Bus, rather than a single channel System Bus.

Figure 31:
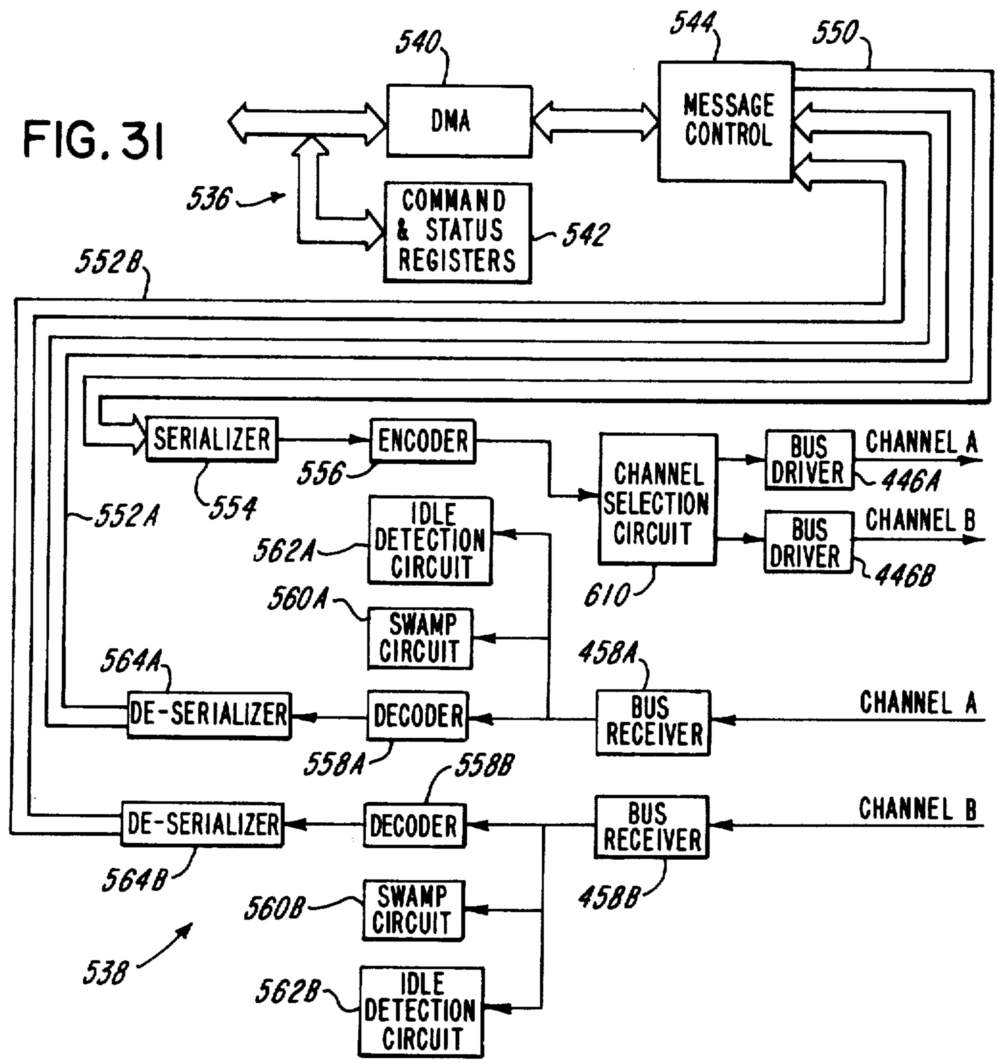
FIG. 31 is a block diagram illustrating in greater detail the circuitry within the system bus interface shown in FIG. 30.

In FIG. 31, the system interface chip 536 and the two-channel adapter 538 of the system bus interface 428 are shown in greater detail. As can be seen, the system interface chip 536 includes a DMA circuit 540, command and status registers 542, and a message control circuit 544.

The two-channel adapter 538 in FIG. 31 includes a serializer 554 connected to the message control circuit 544 by a bus 550. The serializer 554 serializes messages from the message control circuit 544 that are to be transmitted on the System Bus. The serial bits of the message at the output of the serializer are encoded by an encoder 556 and passed to a channel selection circuit 610. The channel selection circuit 610 is controlled by signals (not shown in FIG. 31) from the message control circuit 544 and passes the message to either Channel A, by way of a bus driver 446A, or to Channel B, by way of a bus driver 446B.

Any messages transmitted on the dual-channel System Bus are received from Channel A by a bus receiver 458A or from Channel B by a bus receiver 458B. The message received at bus receiver 458 is passed to a decoder 558A, a swamp circuit 560A and an idle detection circuit 562A. The message is decoded by decoder 558A and is then provided to a de-serializer 564A, which deserializes the message and provides it to the message control circuit 544 by way of a bus 552A. Similarly, the message received at bus receiver 458B is passed to a decoder 558B, a swamp circuit 560B, and an idle detection circuit 562B. The decoded message from decoder 558B is then provided to a de-serializer 564B, which de-serializes the message and provides it to the message control circuit 544 by way of bus 552B.

The DMA 540, the command and status registers 542 and the transmitting functions of the message control circuit 544 operate essentially in the same manner as described earlier with reference to the DMA 140, the command and status registers 142, and the message control circuit 144 in the single channel System Bus described in conjunction with FIGS. 14 through 25. Of course, the transmit control circuit (not shown in FIG. 31) of the message control circuit 544 must determine which of the two channels (Channel A or Channel B) will be used in transmitting each message from the subsystem. Such determination is made in accordance with the following three criteria:

(1) If only one channel is idle, then that idle channel is used to transmit the message;

(2) If both channels are idle, then the channel which was not used during the last transmission of a message on the System Bus is used to transmit the message; and (3) If neither channel is idle, the first channel which becomes idle is used to transmit the message.

The use of the above three criteria assures that there is "load leveling" between the two channels. By "load leveling" it is meant that the use of the System Bus is divided equally or nearly equally between the two channels. Load leveling tends to reduce contention garble since message transmissions that are equally divided between two channels result in each channel being less busy than if one channel were more frequently used than the other channel.

While each subsystem, and its associated DMA 540 and message control circuit 544, will only transmit one message at a time and, therefore, use only one channel for transmitting the message, the message control circuit 544 must be capable of receiving two messages simultaneously over the two channels. This is necessary since the message control circuit 544 associated with every subsystem must receive and monitor every message, even if it is not an addressed subsystem, in order to check the message for the errors described earlier in connection with the single channel embodiment of FIGS. 1 through 26. Accordingly, the pairs of bus receivers 458A and 458B, decoders 558A and 558B, swamp circuits 560A and 560B, idle detection circuits 562A and 562B, serializers 564A and 564B and the buses 552A and 552B permit the message control circuit 544 to receive simultaneously the message on each of Channel A and Channel B. Much of the circuitry associated with the message receiving functions of the message control circuit 544 is duplicated so that the message control circuit 544 will check the destination address fields of both messages for a match with the unique subsystem address or the group address of the subsystem, and will check both messages for CRC, swamp and idle errors.

Figure 32:
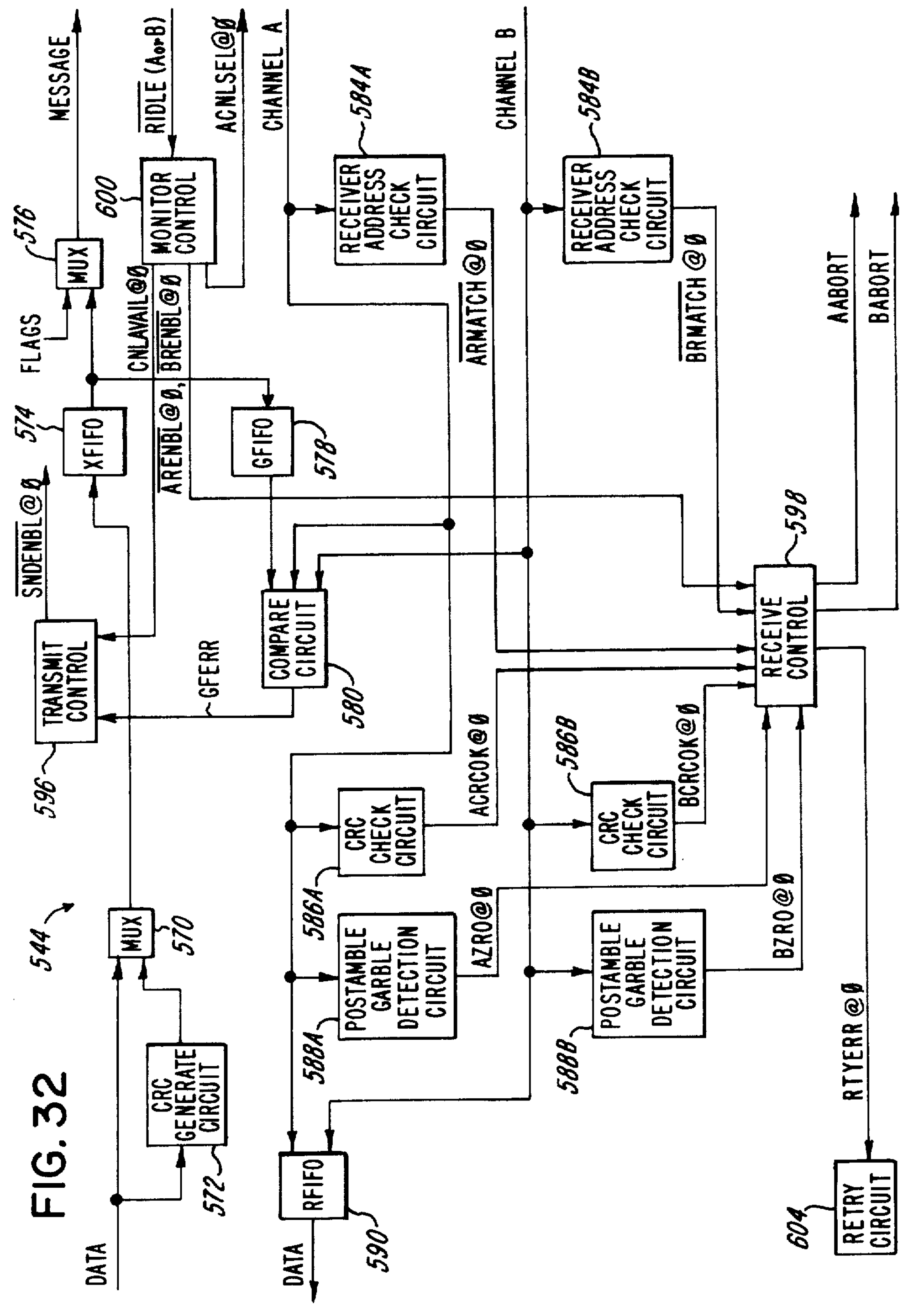
FIG. 32 is a detailed block diagram of the message control circuit shown in the system bus interface of FIG. 31.

This is illustrated in FIG. 32, which shows in simplified form the message control circuit 544 of the two-channel system. As can be seen, the message control circuit 544 includes generally the same circuit blocks as the message control circuit 144 in FIG. 15. Specifically, message control circuit 544 includes a MUX 570, a CRC generate circuit 572, an XFIFO 574, a MUX 576, a GFIFO 578, a compare circuit 580, an RFIFO 590, a retry circuit 604, a transmit control circuit 596, a receive control circuit 598 and a monitor control circuit 600. These circuit blocks generally correspond to the identically named and similarly numbered circuit blocks in FIG. 15.

Of course, monitor control circuit 600 must monitor both Channel A and Channel B for an idle condition. This is indicated in FIG. 32 by the signal notation $\overline{\text{RIDLE}}$ (A or B). The signal RIDLE is actually comprised of two components that are time multiplexed by the clock signals X0 and X1, with each component indicating an idle condition of one of the channels. The signal CNLAVAIL@0 is provided by the monitor control circuit 600 to the transmit control circuit 596 and indicates that at least one of the channels is idle and available for transmission. A signal ACNLSEL@0 is provided by the monitor control circuit 600 to the channel selection circuit 610 (FIG. 31) for indicating which of the two channels is being selected for the transmission of the message, in accordance with the criteria mentioned previously. Signals $\overline{\text{ARENBL@0}}$ and $\overline{\text{BRENBL@0}}$ are provided by the monitor control circuit 600 to the receive control circuit 598 to indicate when Channel A and Channel B, respectively, are not idle and messages are to be received.

Also seen in FIG. 32 are a receiver address check circuit 584A, a CRC check circuit 586A, and a postamble garble detection circuit 588A, all connected for receiving only the messages on Channel A of the System Bus. A receiver address check circuit 584B, a CRC check circuit 586B, and a postamble garble detection circuit 588B are all connected for receiving only the messages on Channel B of the System Bus.

The destination address field of the messages received on Channel A of the System Bus is checked at the receiver address check circuit 584A. If either the unique subsystem address or group address of the associated subsystem is in the destination address field, a signal $\overline{\text{ARMATCH@0}}$ is delivered to the receive control circuit 598. The CRC check circuit 586A checks the messages on Channel A for CRC errors, with a signal ACRCOK@0 delivered to the receive control circuit 598 to indicate a CRC error. The postamble garble detection circuit 588A checks the postamble of the messages on Channel A and provides a signal AZRO@0 to the receive control circuit 598 to indicate a garbled postamble.

In a similar fashion, the destination address field of the messages on Channel B are checked by the receiver address check circuit 584B, with a signal BRMATCH@0 being provided to the receive control circuit 598 to indicate that the destination address field includes the unique subsystem address or the group address of the associated subsystem. The CRC check circuit 586B checks the messages on Channel B for CRC errors and provides the signal BCRCOK@0 to indicate a CRC error. Finally, the postamble garble detection circuit 588B checks the postamble of the messages on Channel B and provides a signal BZRO@0 to indicate a garbled postamble.

When the message control circuit 544 detects an error in the message on Channel A or on Channel B, it will abort the message by garbling its postamble. Accordingly, the receive control circuit 598 provides a signal AABORT to garbling circuitry to be described in conjunction with FIG. 33 in order to garble the postamble of the message on Channel A, and provides a signal BABORT to the same circuitry in order to garble the postamble of the message on Channel B.

It is possible, of course, that messages transmitted simultaneously on Channel A and Channel B and received at a destination will both include the same address in their destination address field. The receive control circuit 598 will only pass to the RFIFO 590 the message that is first received at the message control circuit 544. The other message, if it includes the address of the same subsystem, will be rejected and will have its postamble garbled. If messages on Channel A and Channel B are both received at the same time, then the receive control circuit 598 is so programmed that it will always select the message on a predetermined one of the two channels. In the specific circuitry shown in FIGS. 37 through 89L, Channel A is always selected in the event that two messages having the same destination are received at the same time.

When a message is transmitted from the subsystem, the message information is buffered into the GFIFO 578 in the same fashion as has been previously described in conjunction with the GFIFO 178 in FIG. 15. However, the compare circuit 580 is connected for receiving the message on either Channel A or Channel B. If Channel A has been selected for transmission, then the compare circuit 580 compares each byte of the message in GFIFO 578 with each byte received on Channel A. Alternatively, if Channel B has been selected for transmission, then the compare circuit 580 compares each byte of the message in GFIFO 578 with each byte received on Channel B.

Figure 33:
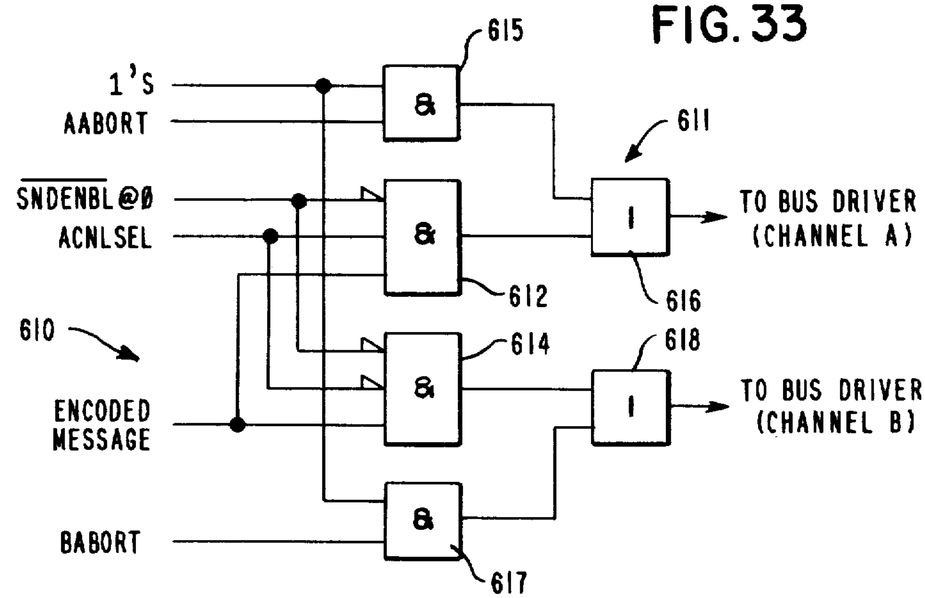
FIG. 33 is a block diagram illustrating the circuitry within the channel selection circuit shown in the system bus interface in FIG. 31.

FIG. 33 illustrates specific circuitry that could be used to accomplish the function of the channel selection circuit 610 that was shown in simplified form in the two-channel adapter 538 of FIGS. 30 and 31. Also illustrated is a garbling circuit 611 associated with the channel selection circuit 610 for selectively garbling the messages on either Channel A or Channel B.

The channel selection circuit 610 includes two AND gates 612 and 614. The signal SNDENBL@0 is received at an inverted input of AND gate 612 and the signal ACNLSEL and the encoded message are received at non-inverted inputs of AND gate 612. The signals SNDENBL@0 and ACNLSEL are also received at inverted inputs of the AND gate 614 and the encoded message at a non-inverted input of the AND gate 614. When the signal ACNLSEL is at a "1", the encoded message is passed through the AND gate 612 and by way of the garbling circuit 611 to the bus driver 446A for transmitting the message over Channel A. When the signal ACNLSEL is at a "0", the encoded message is passed through the AND gate 614 and by way of the garbling circuit 611 to the bus driver 446B for transmitting the message over Channel B.

The garbling circuit 611 may be used to selectively pass a garbling signal to either Channel A or Channel B. The garbling circuit 611 includes an AND gate 615 and an OR gate 616 that will garble any message on Channel A. The AND gate 615 receives a garbling signal in the form of a series of 1's or low frequency pulses and the AABORT signal mentioned earlier in connection with FIG. 32. The output of the AND gate is provided to the OR gate 616, which also receives any encoded message for Channel A from the channel selection circuit. The garbling circuit also includes an AND gate 617 and an OR gate 618. The AND gate 617 receives the garbling signal in the form of 1's and the signal BABORT, also mentioned earlier in connection with FIG. 32. The output of AND gate 617 is provided, with any encoded message for Channel B from the channel selection circuit, to the OR gate 618. When the AABORT signal is enabled at a "1", the series of 1's are passed through AND gate 615 and OR gate 616, to be transmitted on Channel A of the System Bus. When the BABORT signal is enabled at a "1", the series of 1's are passed through AND gate 617 and OR gate 618, to be transmitted on Channel B of the System Bus.

RETRY CIRCUIT 604

Figure 34:
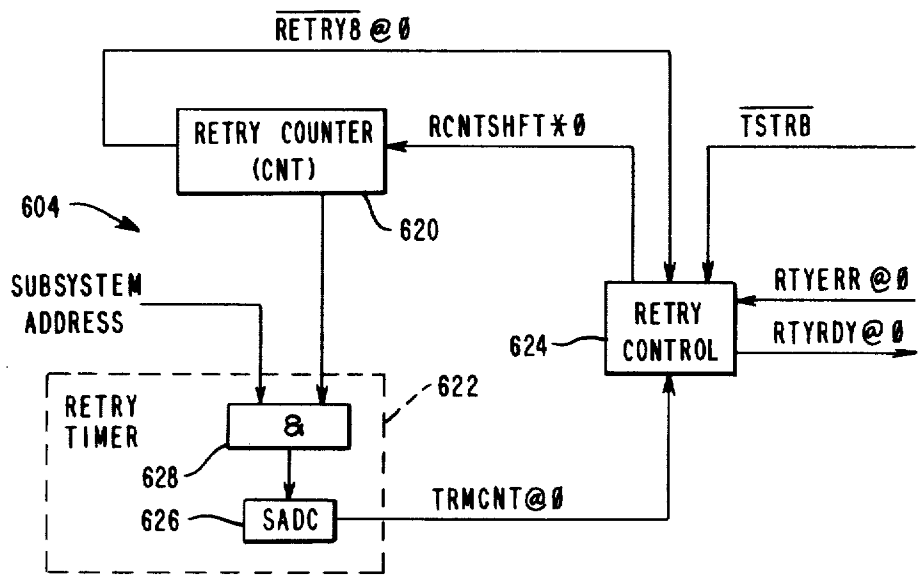
FIG. 34 is a simplified block diagram of a retry circuit for use in the message control circuit of the system bus interface in FIG. 31.

In FIG. 34 there is shown in greater detail the retry circuit 604 in the message control circuit 544 of the two channel system. The retry circuit 604 includes a retry counter (CNT) 620, a retry timer 622 and control circuitry 624. As mentioned earlier in conjunction with the one-channel System Bus in FIGS. 1 through 26, the retry circuit 604 will cause the transmission of a message to be retried when a retryable error has occurred. The retry interval between retries is determined by the retry timer 622 and will be made different, in a manner which will become apparent shortly, for the retry circuit associated with each subsystem so that subsystems having retryable errors do not retry at the same time. Furthermore, the retry counter 620 permits only a predetermined maximum number of retries.

The retry counter (CNT) 620 comprises an 8-bit shift register that can be hardwired to receive a "1" at its first stage. The retry counter 620 receives a signal RCNTSHFT*0 from the control circuit for shifting the "1" through its eight stages, and provides a signal RETRY8@0 back to the control circuit when the "1" reaches the eighth stage. The retry timer includes a retry timer counter (SADC) 626 which is connected for being loaded with bits at the output of a set of eight AND gates 628. The AND gates 628 logically combine, in parallel, the eight bits in the retry counter 620 with the eight bits in the unique subsystem address of the associated subsystem from the register SADD that was mentioned earlier in connection with the address check circuit 184 in FIG. 15. When the SADC counter 626 decrements from its loaded value to a zero value, it provides a signal TRMCNT@0 to the control circuit 624.

The control circuit 624 receives a retry clock signal TSTRB that is provided from an external clock source to the system interface chip 536. The control circuit also receives the signal RTYERR@0 for indicating a retryable error and provides a signal RTYRDY@0 for indicating when the timed interval of the retry timer 622 has expired and the retry of the message is to take place.

Figure 35:
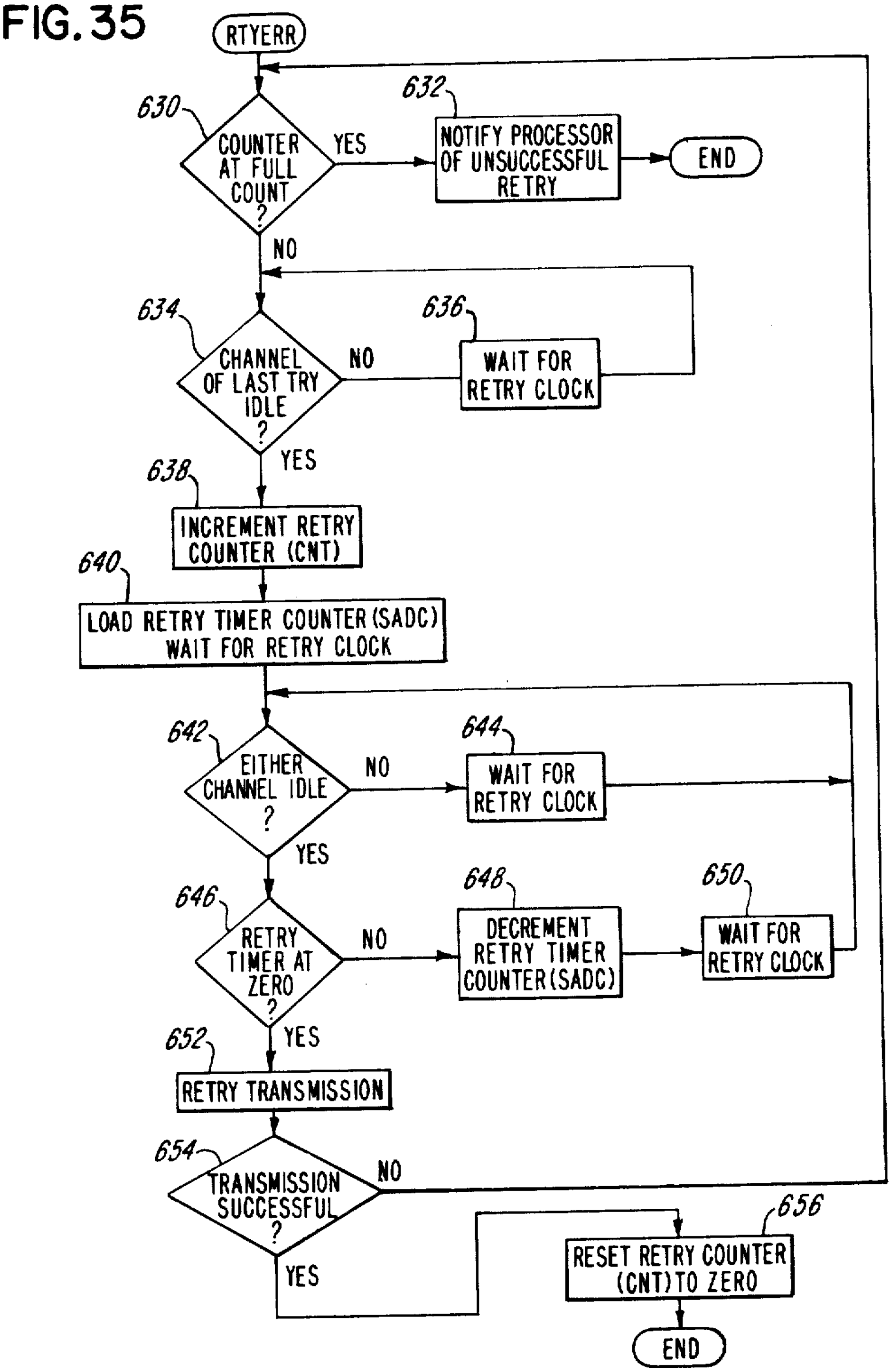
FIG. 35 is a flow diagram illustrating the operation of the retry circuit shown in FIG. 33.

The operation of the retry circuit 604 is illustrated in FIG. 35 by an operational flow or sequence "RTYERR". As seen in FIG. 35, the retry circuit 604 first determines whether the retry counter (CNT) 620 has reached a full count, step 630. If the counter has reached a full count, then the retry circuit has attempted to retry the message a predetermined maximum number of times (eight times) and the processor is notified that the retry has been unsuccessful, step 632, and the sequence ends. If the retry counter 620 has not reached its full count, then the retry circuit determines whether the channel on which the last try was made is idle, step 634. If the channel is not idle, then the retry circuit waits for the next pulse in the retry clock TSTRB, step 626. The flow continues through steps 634 and 636 until the channel becomes idle at step 634. By waiting until the channel is idle, all subsystems that are retrying a transmission will begin to time the retry interval in the retry timer 622 from the same point in time. Since the retry intervals are different in each retry circuit 604, this further reduces the likelihood that two subsystems will retry at the same time or within the same contention window.

When the channel over which the last try was made has become idle at step 634, the retry counter (CNT) 620 is then incremented, step 638, and then the retry timer 612 is loaded with the output of the AND gates 628 and waits for the next retry clock $\overline{TSTRB}$, step 640. At the retry clock, the retry circuit determines whether either channel is idle, step 642, since it is fruitless to retry a transmission if both channels are busy. If neither channel is idle, then the sequence waits for the next retry clock, step 644, and again determines if either channel is idle at step 642. When one channel does become idle, the sequence next determines whether the SADC counter 626 in retry timer 622 has reached its zero value, step 646, and if it has not, the retry circuit decrements the SADC counter 626, step 648, and waits for the next retry clock, step 650. The steps 642 and 646 are repeated until the counter in the retry timer reaches zero at step 646.

When the counter in the retry timer reaches zero, the transmission is retried, step 652, and if the transmission is successful, step 654, then the retry counter 620 is reset to zero, step 656, and the sequence ends. If the transmission is not successful, then the sequence returns to step 630 and is repeated until either the transmission is successful or the retry counter 620 does reach its full count at step 630 and the processor is notified of the maximum unsuccessful retries at step 632.

SYSTEM INTERFACE CHIP 536 (DETAIL)

Figure 36:
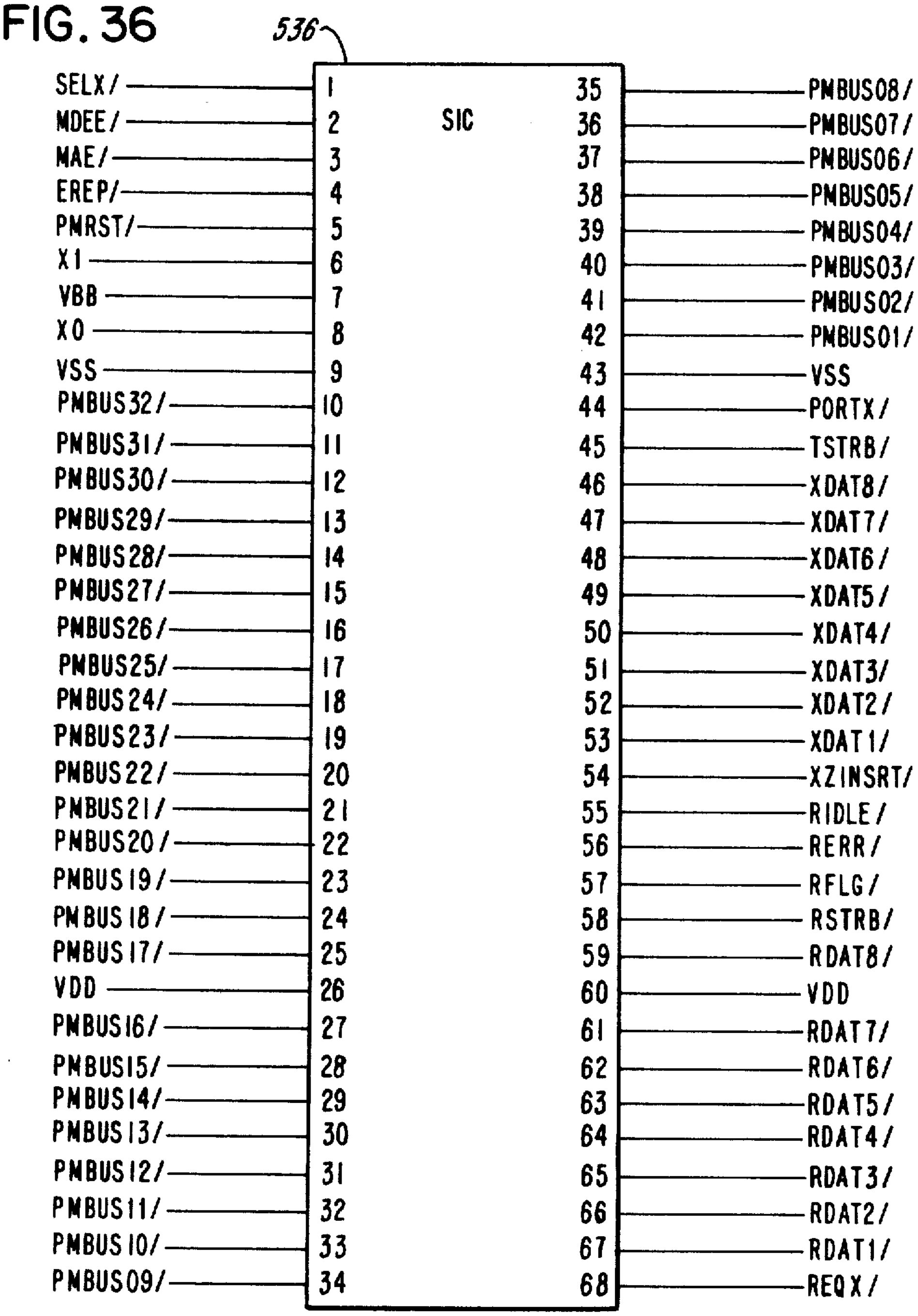
FIG. 36 is a simplified block diagram illustrating the pins or pads on the system interface chip that is seen in FIGS. 30 and 31.

In FIG. 36 there is shown a simplified representation of the system interface chip (SIC) 536. The actual details of the circuitry within the system interface chip 536 is illustrated by the Table in FIGS. 37A, 37B and 37C and the circuitry in FIGS. 38A through 89L. There are 68 electrical pins or pads on the system interface chip 536, these pins or pads each uniquely named and numbered 1 through 68 in FIG. 36 and in 38A through 89L. The functions of the signals at each of the pins or pads will be appreciated by studying FIGS. 37 through 89L and the Signal, Pin and Component List given in connection with FIGS. 37 through 89L. However, briefly, for purposes of illustrating the general nature of the system interface chip 536, the following Pin Assignment List indicates the general use of each of the pins or pads:

Pin Assignment List

| Pin Number | Pin Name | Pin Use |
|---|---|---|
| 1 | SELX/ | Input pin, connected to processor |
| 2 | MDEE/ | Input pin, connected to local memory |
| 3 | MAE/ | Output pin, connected to local memory |
| 4 | EREP/ | Input/Output pin, connected to processor |
| 5 | PMRST/ | Input pin, connected to processor |
| 6 | X1 | Connected to external clock signal source |
| 7 | VBB | Connected to external −3V source |
| 8 | X0 | Connected to external clock signal source |
| 9 | VSS | Input pin, connected to external ground source |
| 10 | PMBUS32/ | Input/Output pin, connected to P-M bus |
| 11 | PMBUS31/ | Input/Output pin, connected to P-M bus |
| 12 | PMBUS30/ | Input/Output pin, connected to P-M bus |
| 13 | PMBUS29/ | Input/Output pin, connected to P-M bus |
| 14 | PMBUS28/ | Input/Output pin, connected to P-M bus |
| 15 | PMBUS27/ | Input/Output pin, connected to P-M bus |
| 16 | PMBUS26/ | Input/Output pin, connected to P-M bus |
| 17 | PMBUS25/ | Input/Output pin, connected to P-M bus |
| 18 | PMBUS24/ | Input/Output pin, connected to P-M bus |
| 19 | PMBUS23/ | Input/Output pin, connected to P-M bus |
| 20 | PMBUS22/ | Input/Output pin, connected to P-M bus |
| 21 | PMBUS21/ | Input/Output pin, connected to P-M bus |
| 22 | PMBUS20/ | Input/Output pin, connected to P-M bus |
| 23 | PMBUS19/ | Input/Output pin, connected to P-M bus |
| 24 | PMBUS18/ | Input/Output pin, connected to P-M bus |
| 25 | PMBUS17/ | Input/Output pin, connected to P-M bus |
| 26 | VDD | Input pin, connected to external +5V source |
| 27 | PMBUS16/ | Input/Output pin, connected to P-M bus |
| 28 | PMBUS15/ | Input/Output pin, connected to P-M bus |
| 29 | PMBUS14/ | Input/Output pin, connected to P-M bus |
| 30 | PMBUS13/ | Input/Output pin, connected to P-M bus |
| 31 | PMBUS12/ | Input/Output pin, connected to P-M bus |
| 32 | PMBUS11/ | Input/Output pin, connected to P-M bus |
| 33 | PMBUS10/ | Input/Output pin, connected to P-M bus |
| 34 | PMBUS09/ | Input/Output pin, connected to P-M bus |
| 35 | PMBUS08/ | Input/Output pin, connected to P-M bus |
| 36 | PMBUS07/ | Input/Output pin, connected to P-M bus |
| 37 | PMBUS06/ | Input/Output pin, connected to P-M bus |
| 38 | PMBUS05/ | Input/Output pin, connected to P-M bus |
| 39 | PMBUS04/ | Input/Output pin, connected to P-M bus |

-continued

| Pin Assignment List | | |
|---|---|---|
| Pin Number | Pin Name | Pin Use |
| 40 | PMBUS03/ | Input/Output pin, connected to P-M bus |
| 41 | PMBUS02/ | Input/Output pin, connected to P-M bus |
| 42 | PMBUS01/ | Input/Output pin, connected to P-M bus |
| 43 | VSS | Input pin, connected to ground source |
| 44 | PORTX/ | Not used |
| 45 | TSTRB/ | Input pin, connected to external clock signal source |
| 46 | XDAT8/ | Output pin, connected to serializer |
| 47 | XDAT7/ | Output pin, connected to serializer |
| 48 | XDAT6/ | Output pin, connected to serializer |
| 49 | XDAT5/ | Output pin, connected to serializer |
| 50 | XDAT4/ | Output pin, connected to serializer |
| 51 | XDAT3/ | Output pin, connected to serializer |
| 52 | XDAT2/ | Output pin, connected to serializer |
| 53 | XDAT1/ | Output pin, connected to serializer |
| 54 | XZINSRT/ | Input/Output pin, connected to serializer |
| 55 | RIDLE/ | Input pin, connected to idle detection circuit |
| 56 | RERR/ | Input pin, connected to swamp circuit |
| 57 | RFLG/ | Input pin, connected to serializer |
| 58 | RSTRB/ | Input pin, connected to de-serializer |
| 59 | RDAT8/ | Input pin, connected to de-serializer |
| 60 | VDD | Input pin, connected to external +5V source |
| 61 | RDAT7/ | Input pin, connected to de-serializer |
| 62 | RDAT6/ | Input pin, connected to de-serializer |
| 63 | RDAT5/ | Input pin, connected to de-serializer |
| 64 | RDAT4/ | Input pin, connected to de-serializer |
| 65 | RDAT3/ | Input pin, connected to de-serializer |
| 66 | RDAT2/ | Input pin, connected to de-serializer |
| 67 | RDAT1/ | Input pin, connected to de-serializer |
| 68 | REQX/ | Output pin, connected to processor |

It should be noted that two signals are time multiplexed on many of the pins, using the non-overlapping phases or pulses of the clock signals X0 and X1.

As mentioned above, FIGS. 37 through 89L illustrate the specific circuitry within the system interface chip 536. The operation of this specific circuitry will not be described herein. However, the Signal, Pin and Component List that follows later provides, for each of the signals, pins and components illustrated in FIGS. 37 through 89L, an accompanying brief description. The Signal, Pin and Component List, in conjunction with the previously described Figures, will make the operation of the circuitry in FIGS. 37 through 89L apparent to one skilled in the art. The items that begin with either a number or a Greek Letter are shown at the end of the Signal, Pin and Component List. In addition, those components or signals that correspond to components or signals previously described in conjunction with FIGS. 1 through 35 are similarly named or referenced.

Figure 37A:
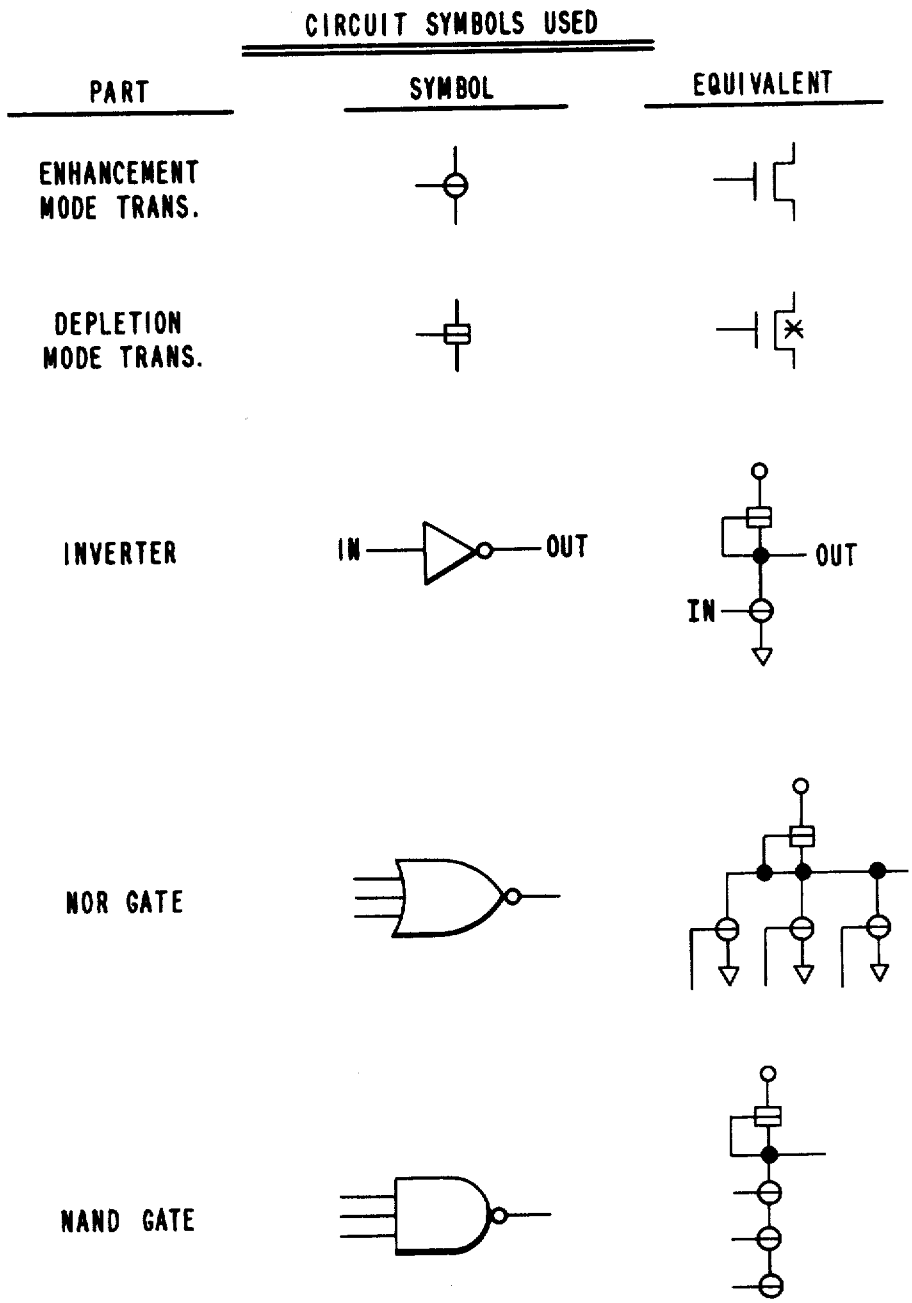
FIGS. 37 through 89L are detailed drawings, including schematic drawings, illustrating the circuitry within the system interface chip of FIGS. 30, 31 and 36.
Figure 37B:
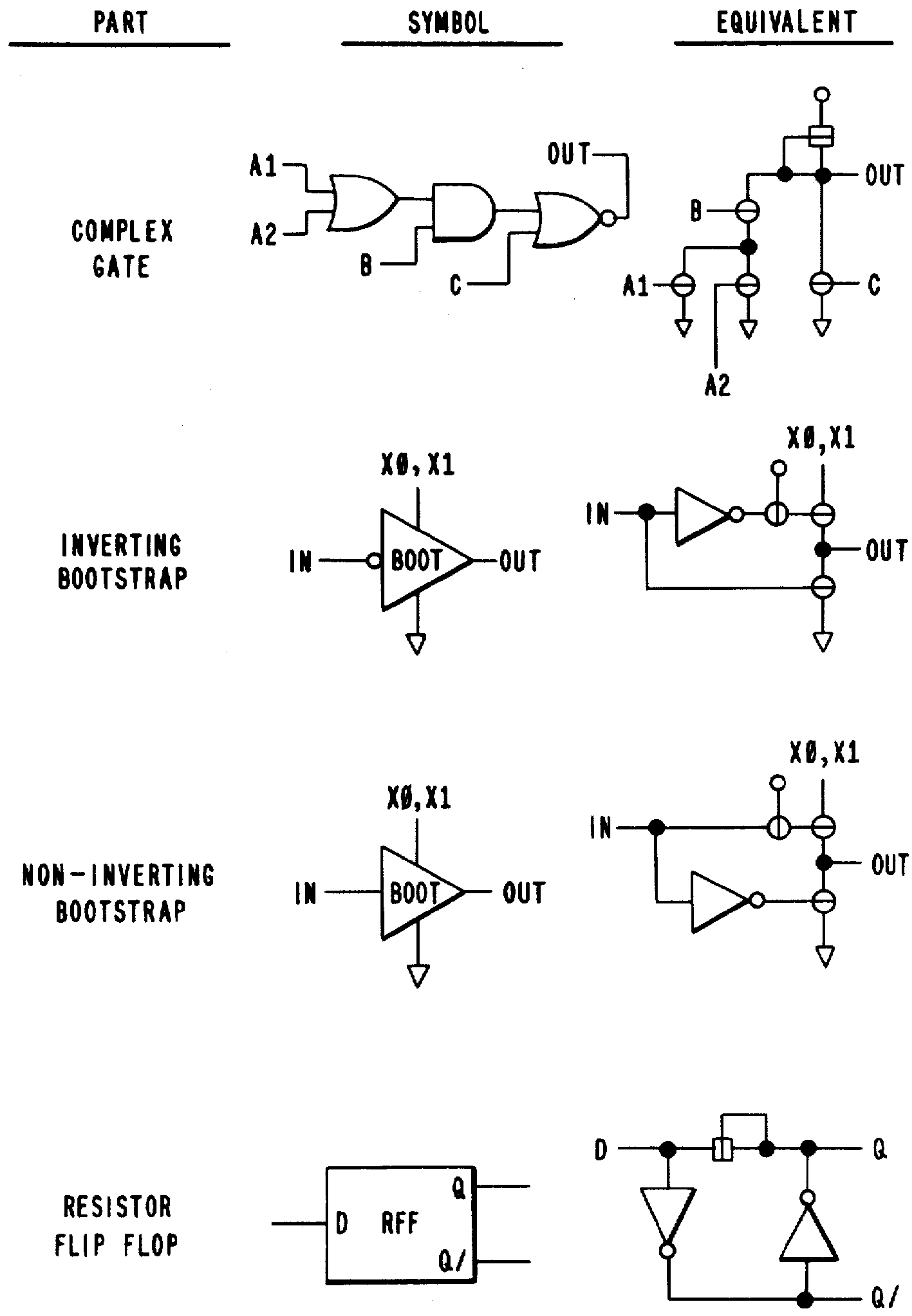
Figure 38A:
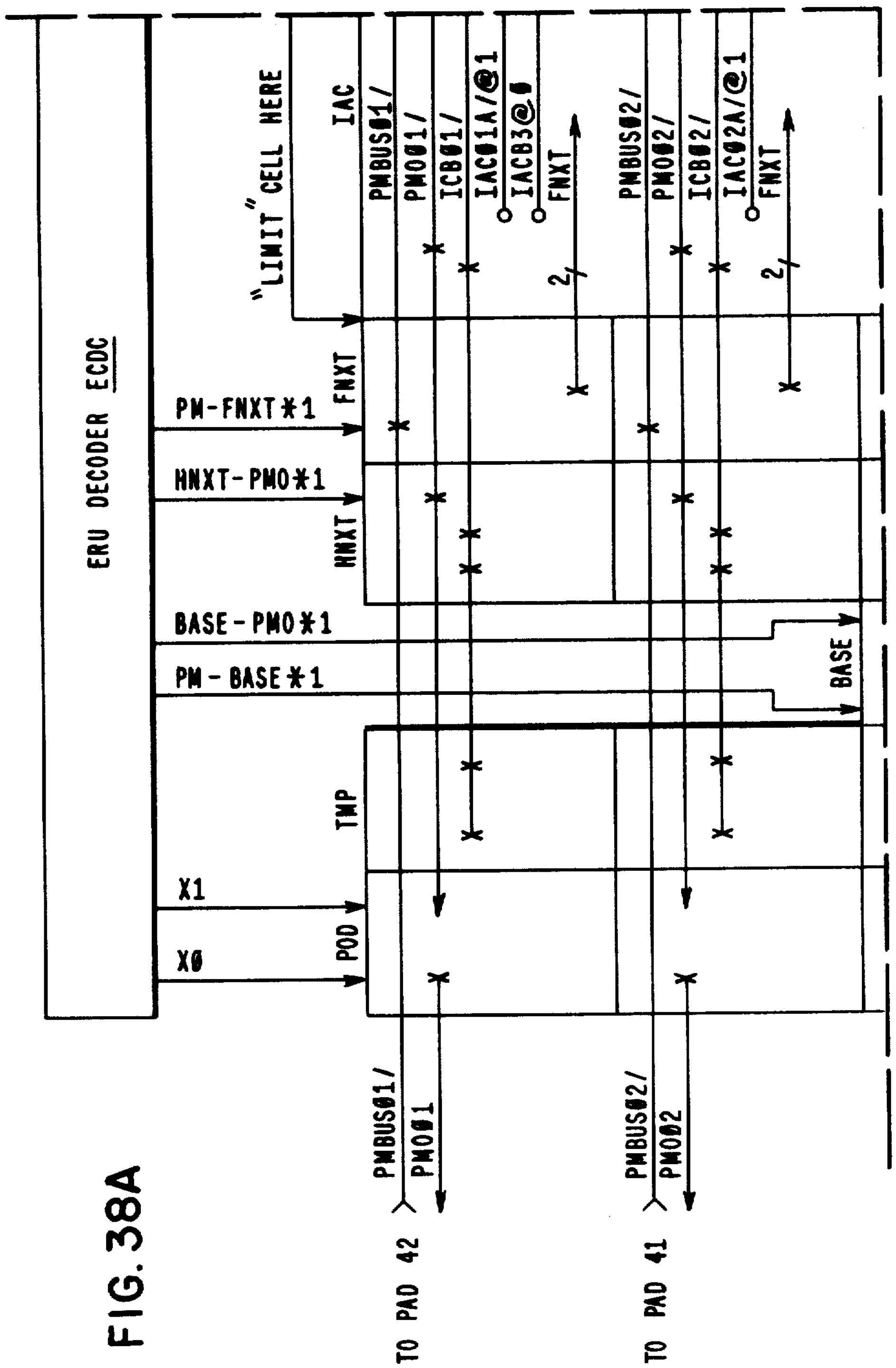
Figure 38B:
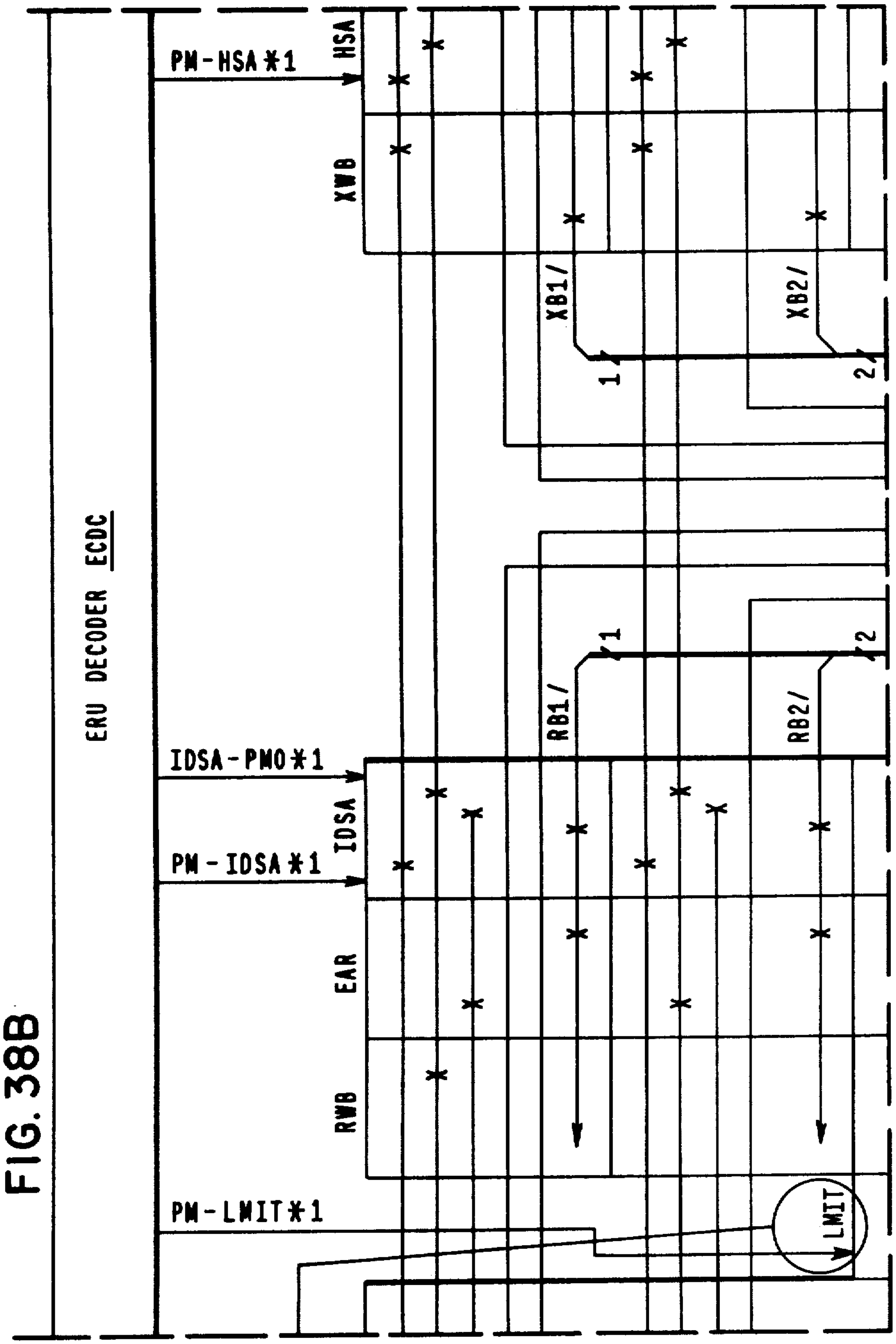
Figure 38C:
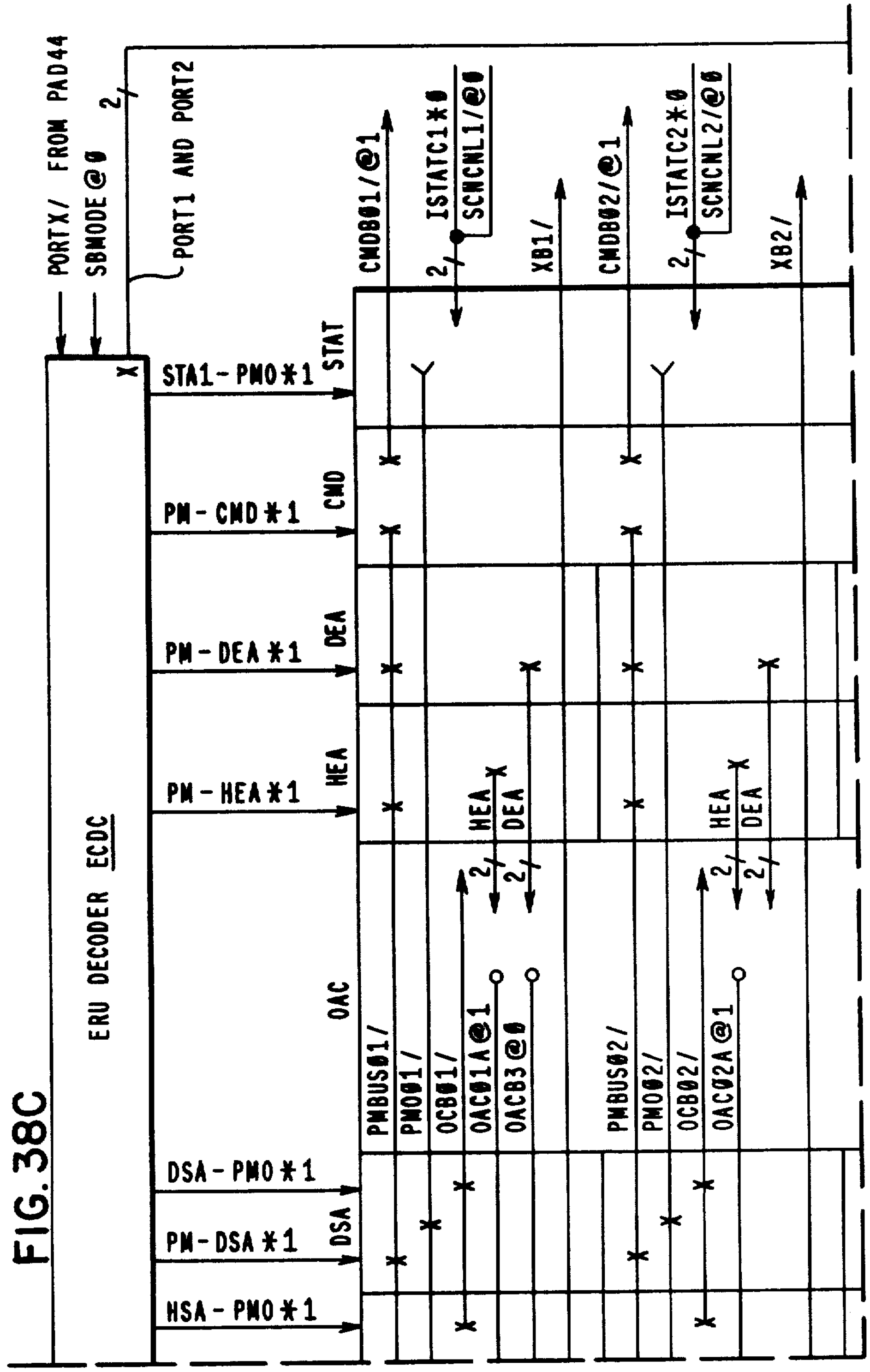
Figure 38D:
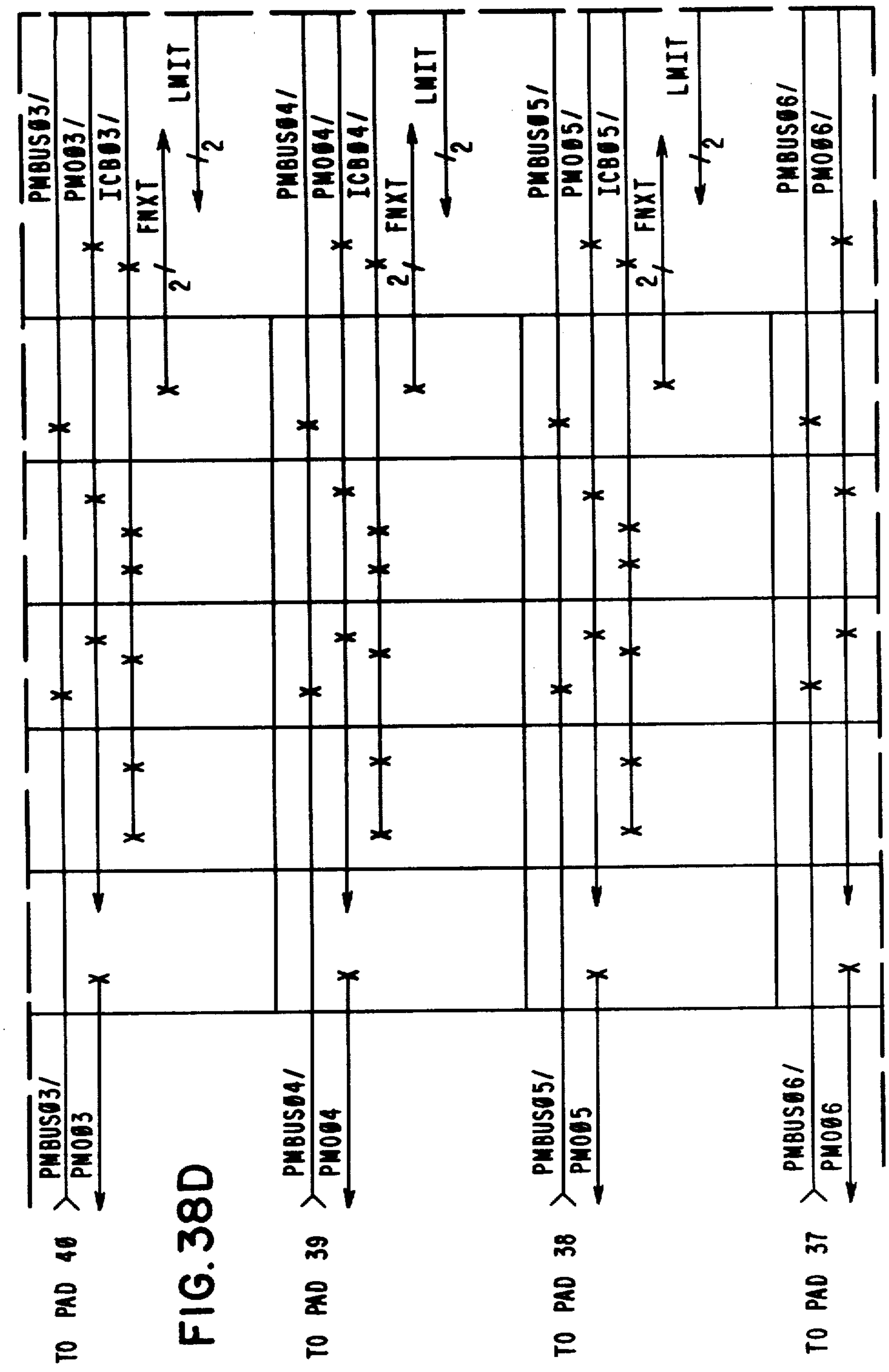
Figure 38E:
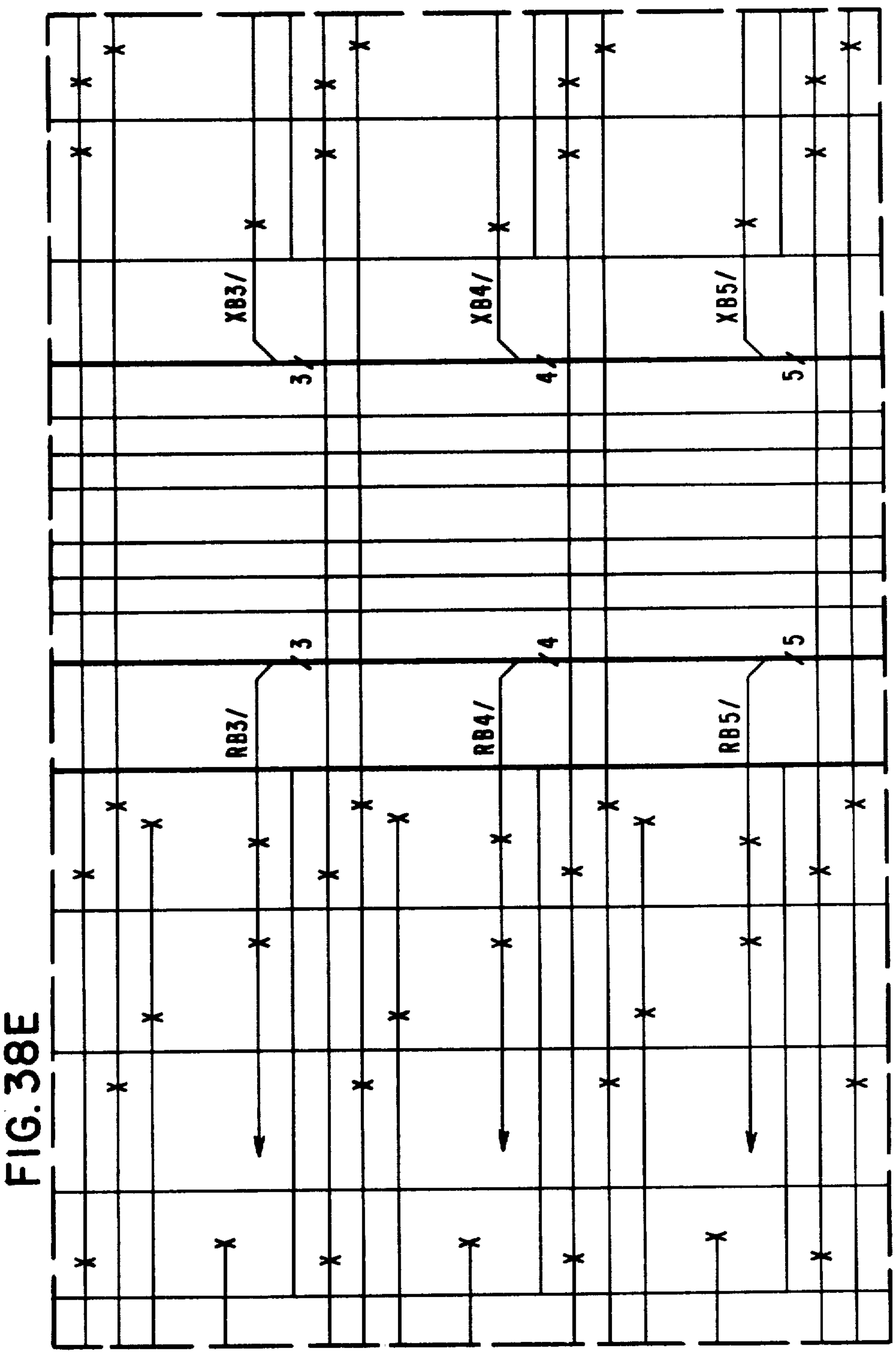
Figure 38F:
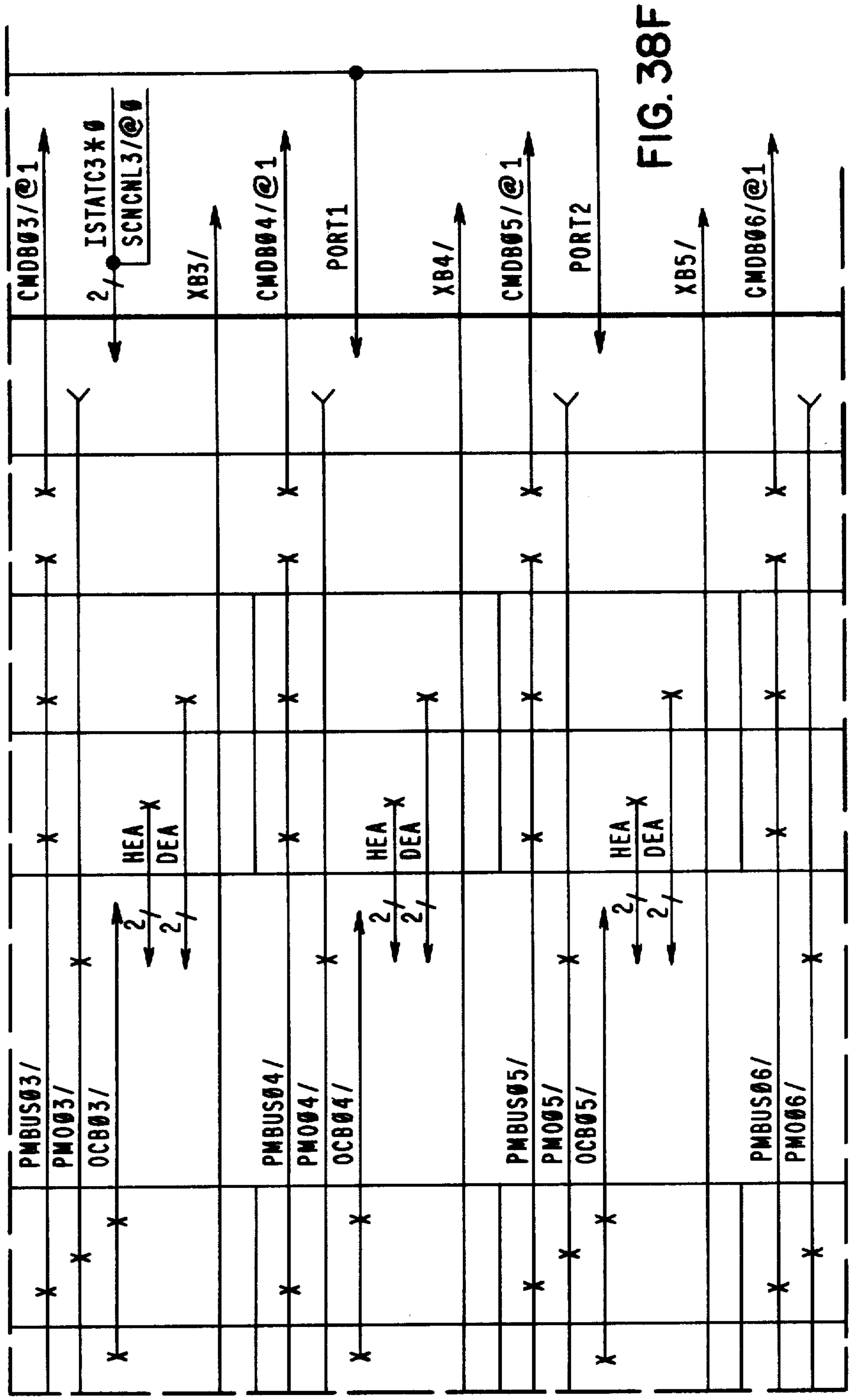
Figure 38G:
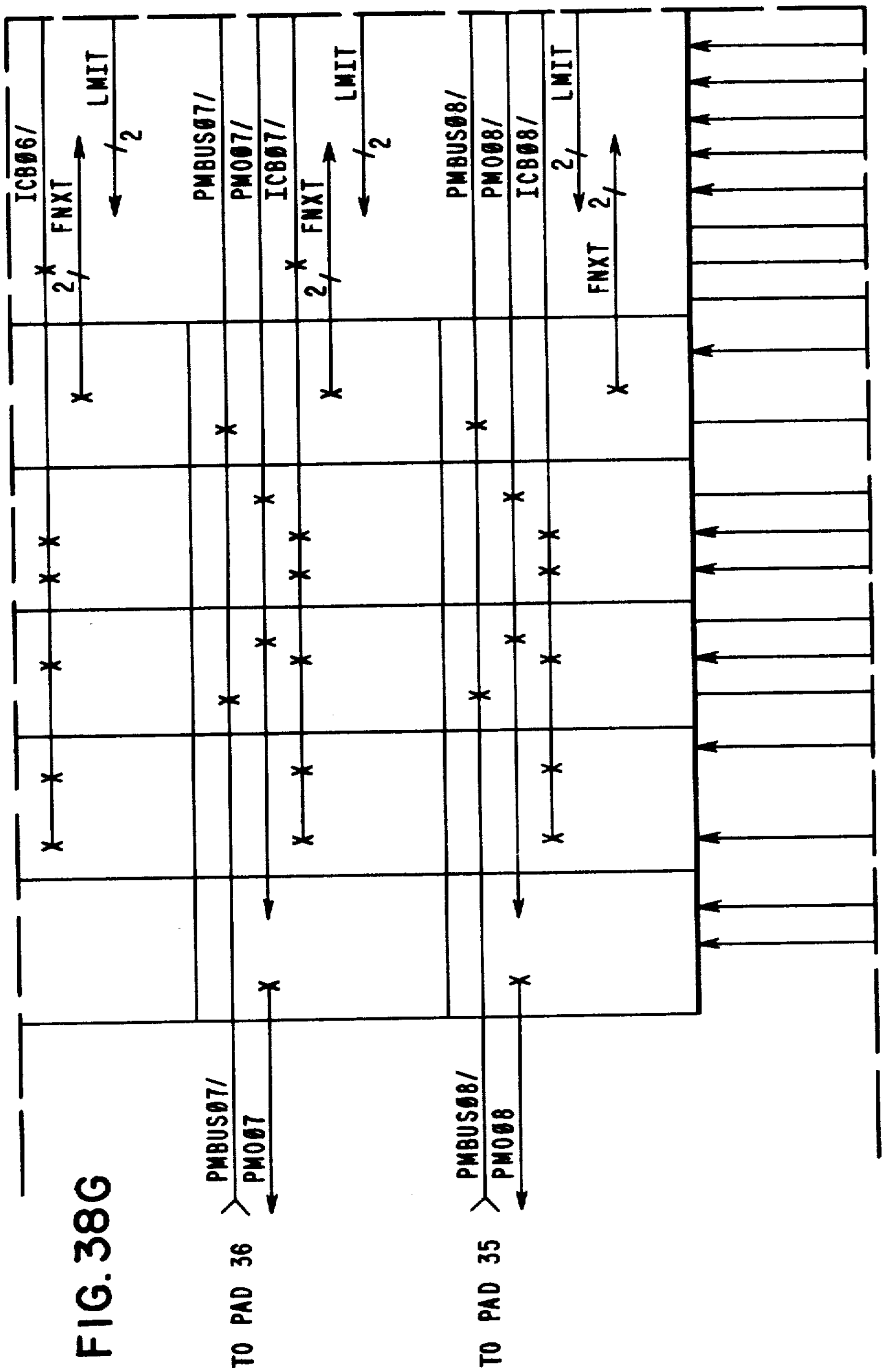
Figure 38H:
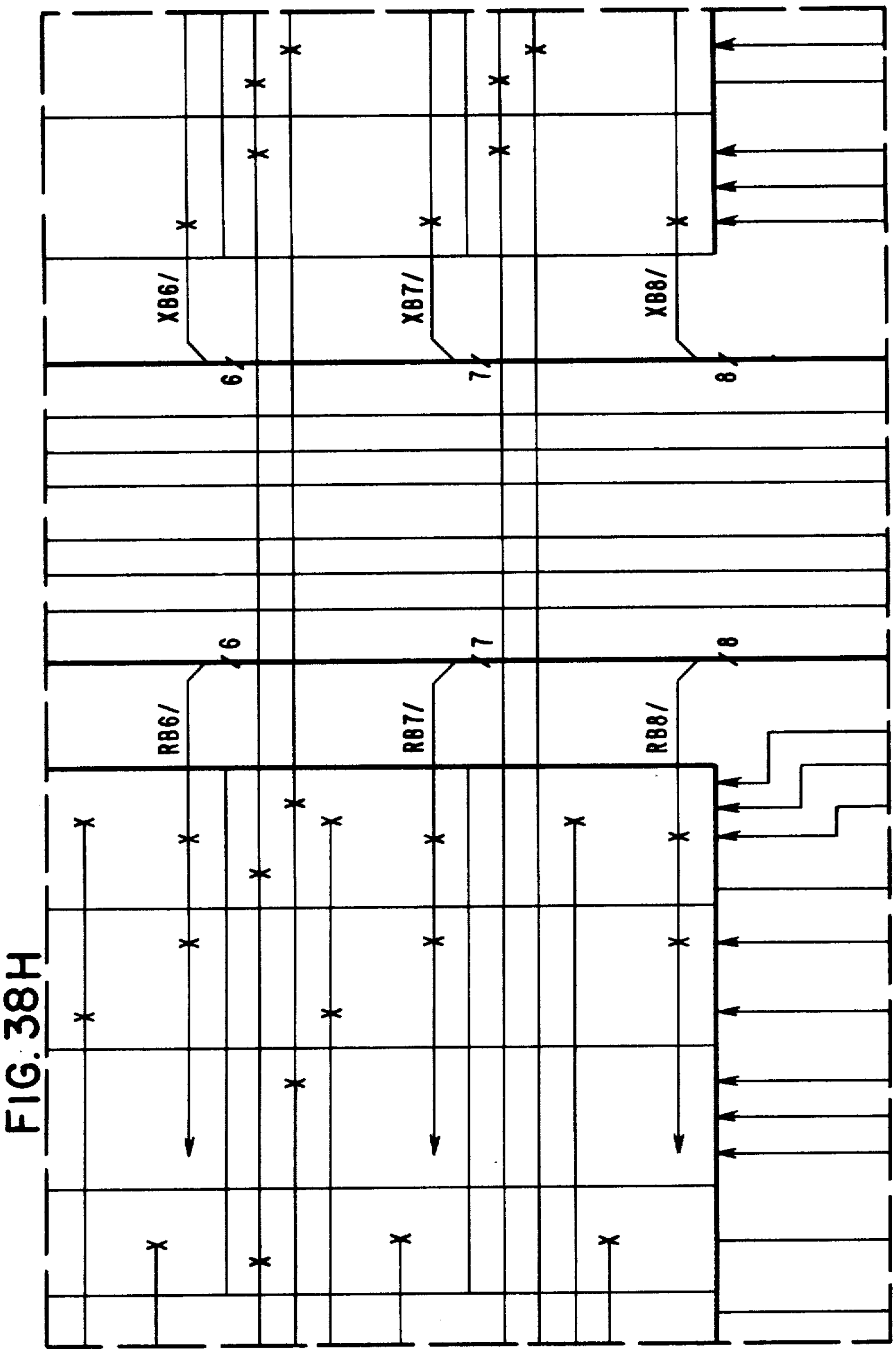
Figure 38I:
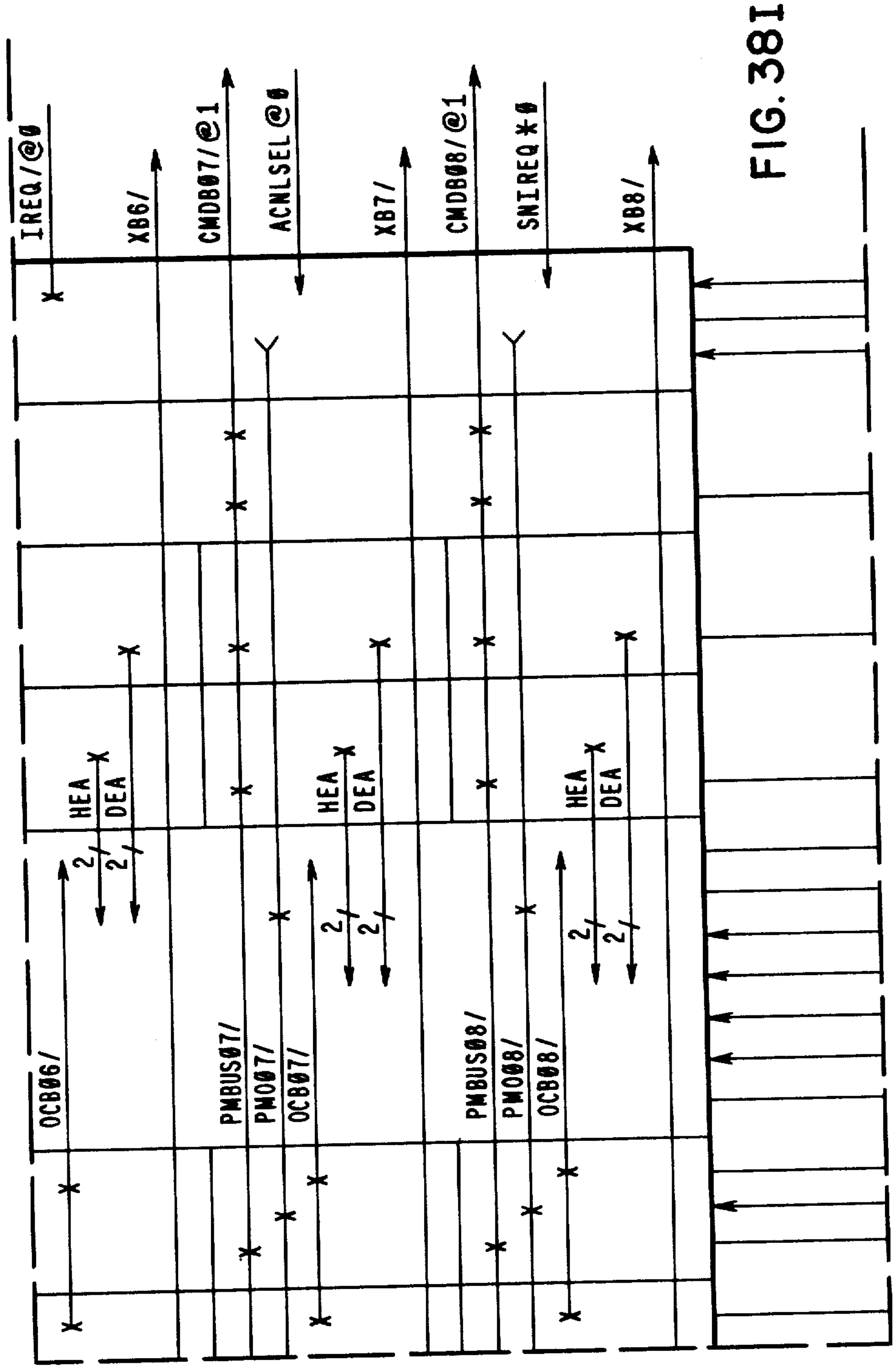
Figure 38J:
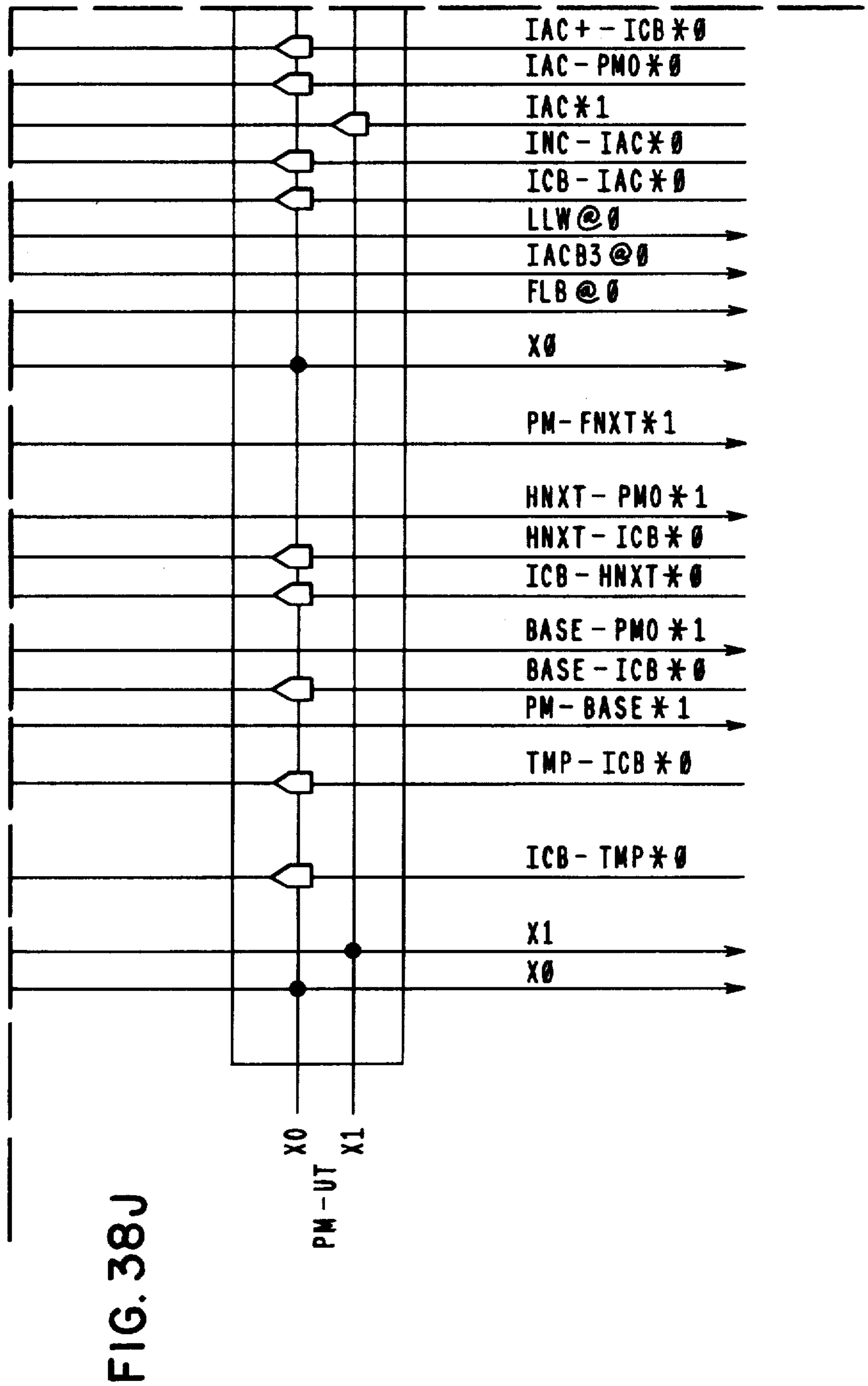
Figure 38K:
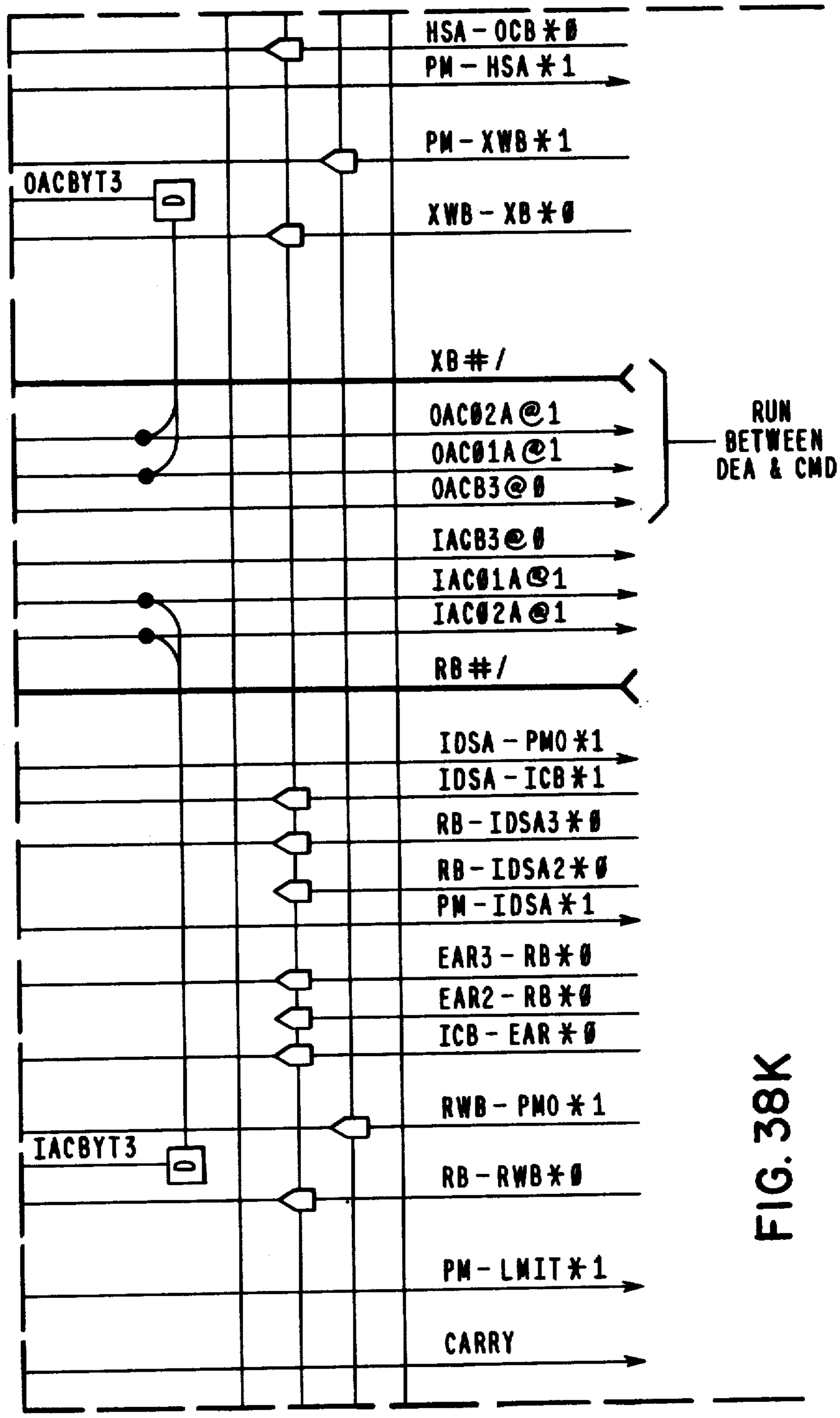
Figure 38L:
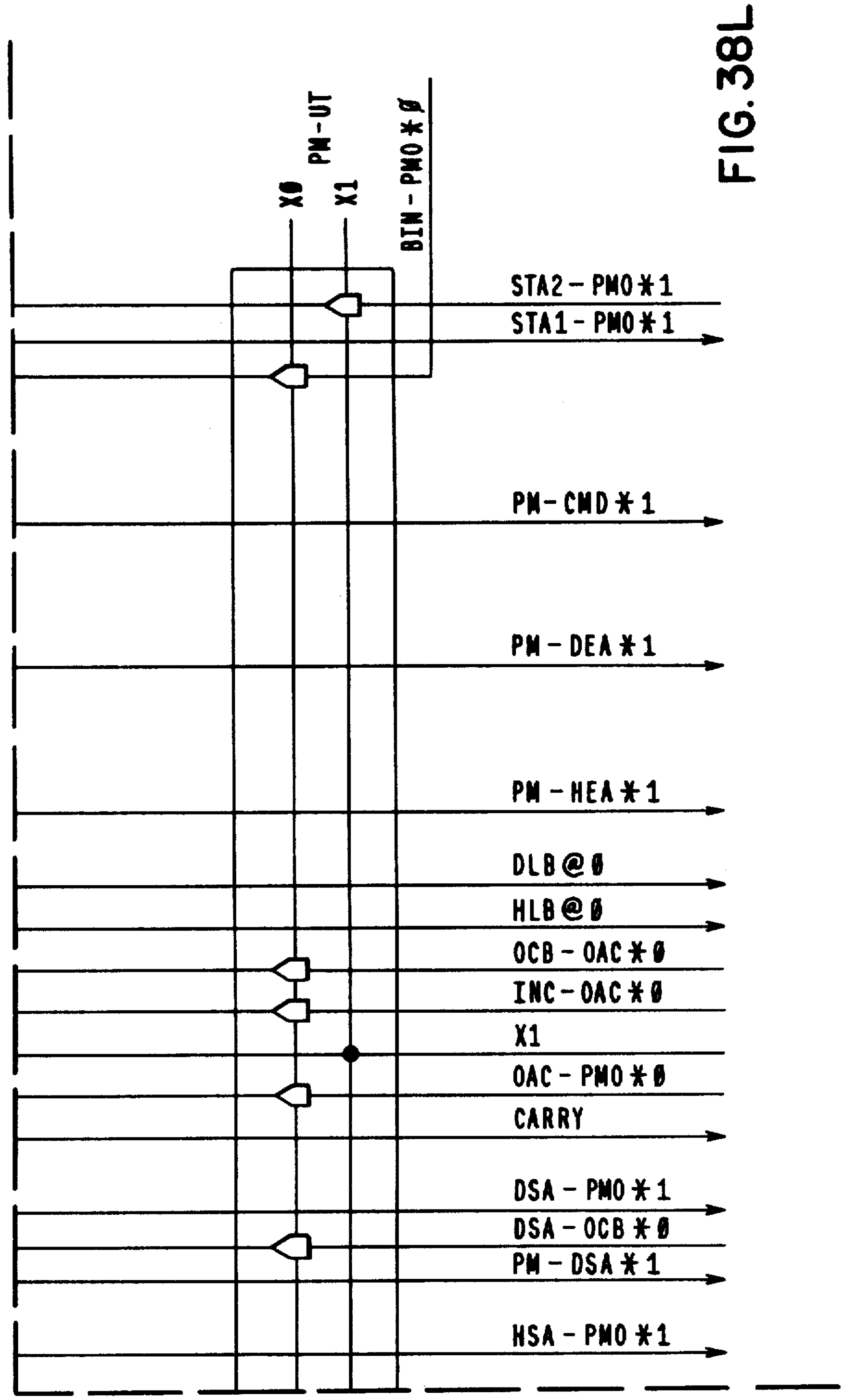

FIGS. 37A, 37B and 37C are Tables explaining the symbols used in FIGS. 38A through 89L, and the corresponding part names and transistor equivalents.

Figure 39A:
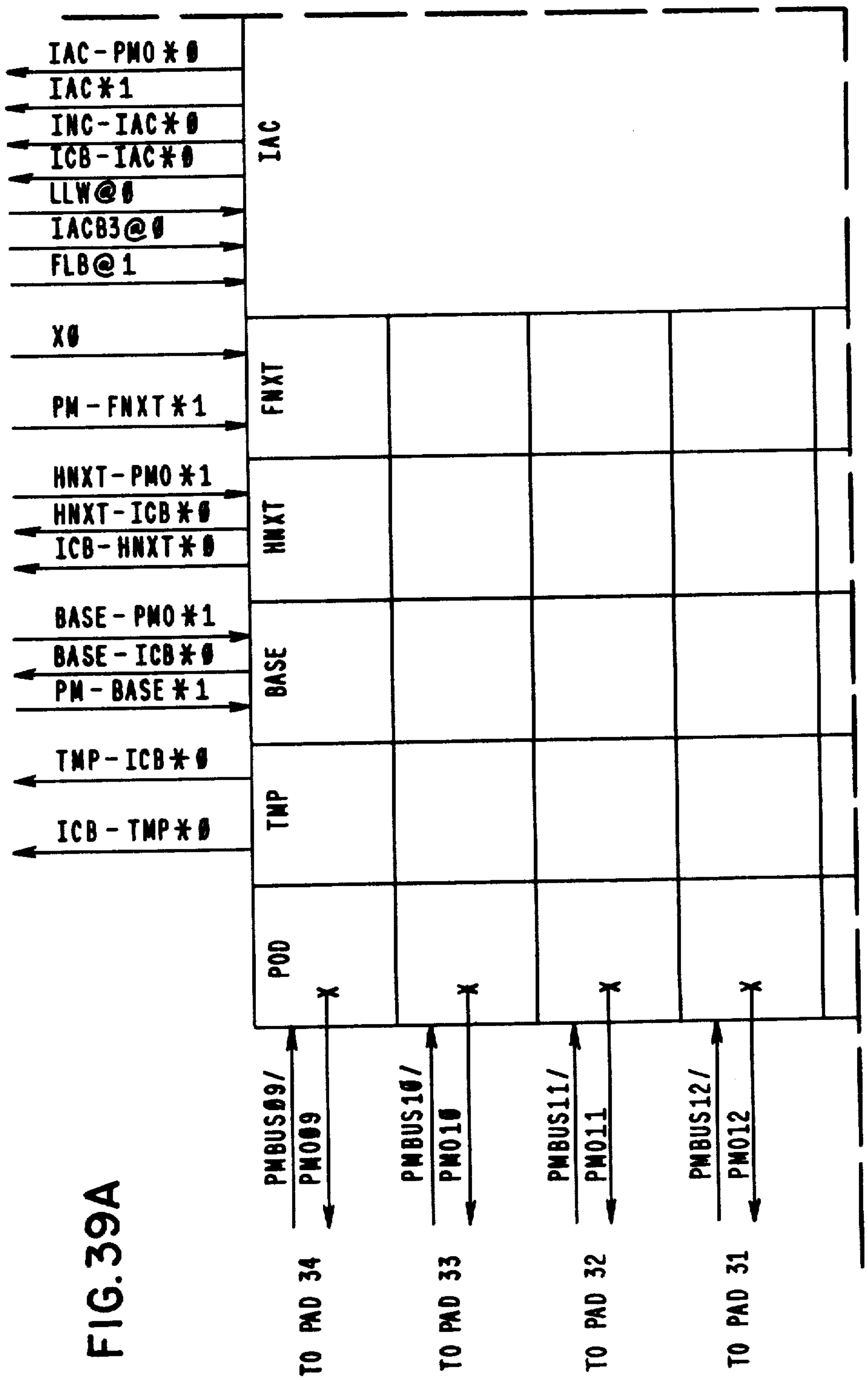
Figure 39B:
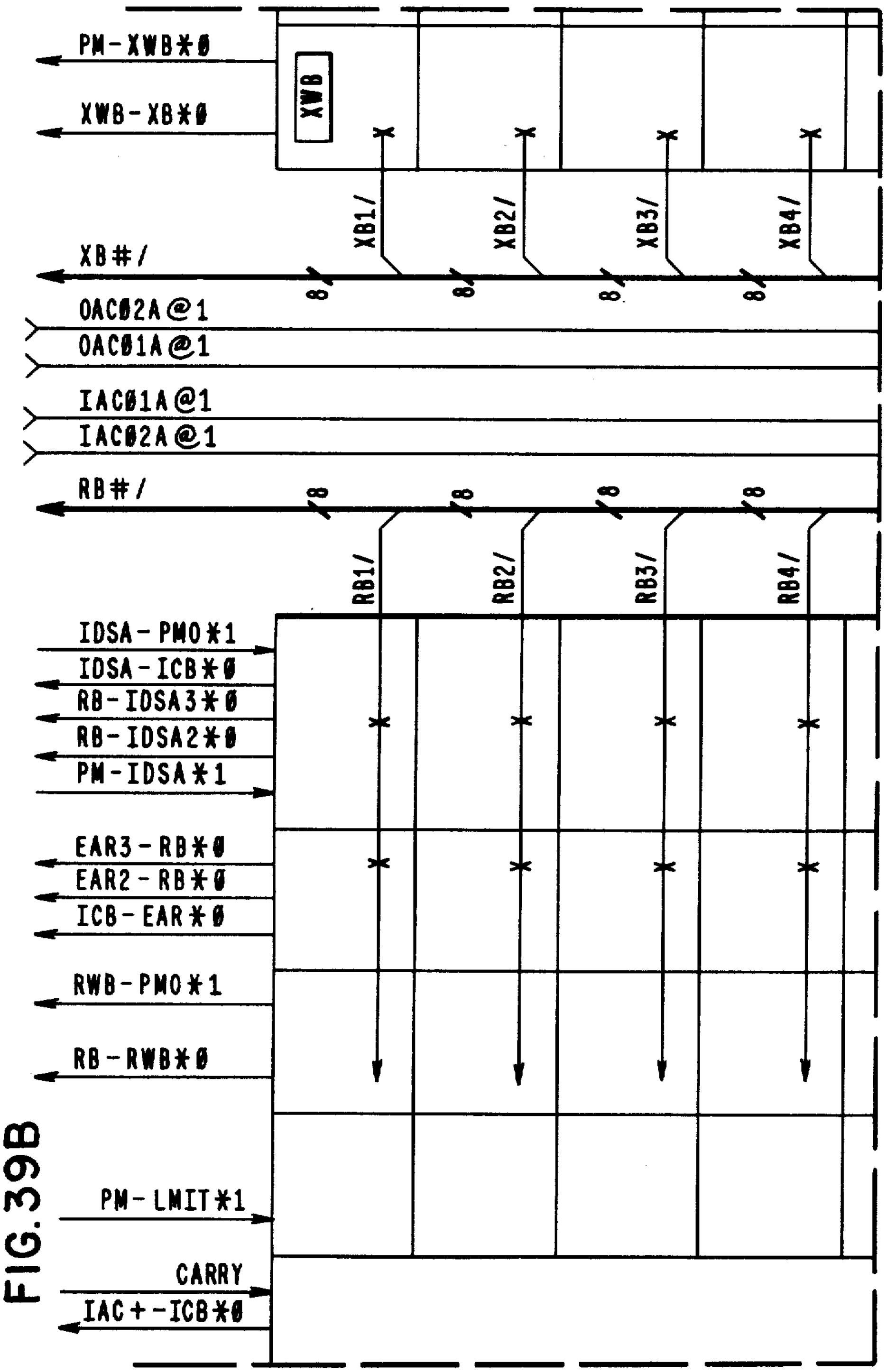
Figure 39C:
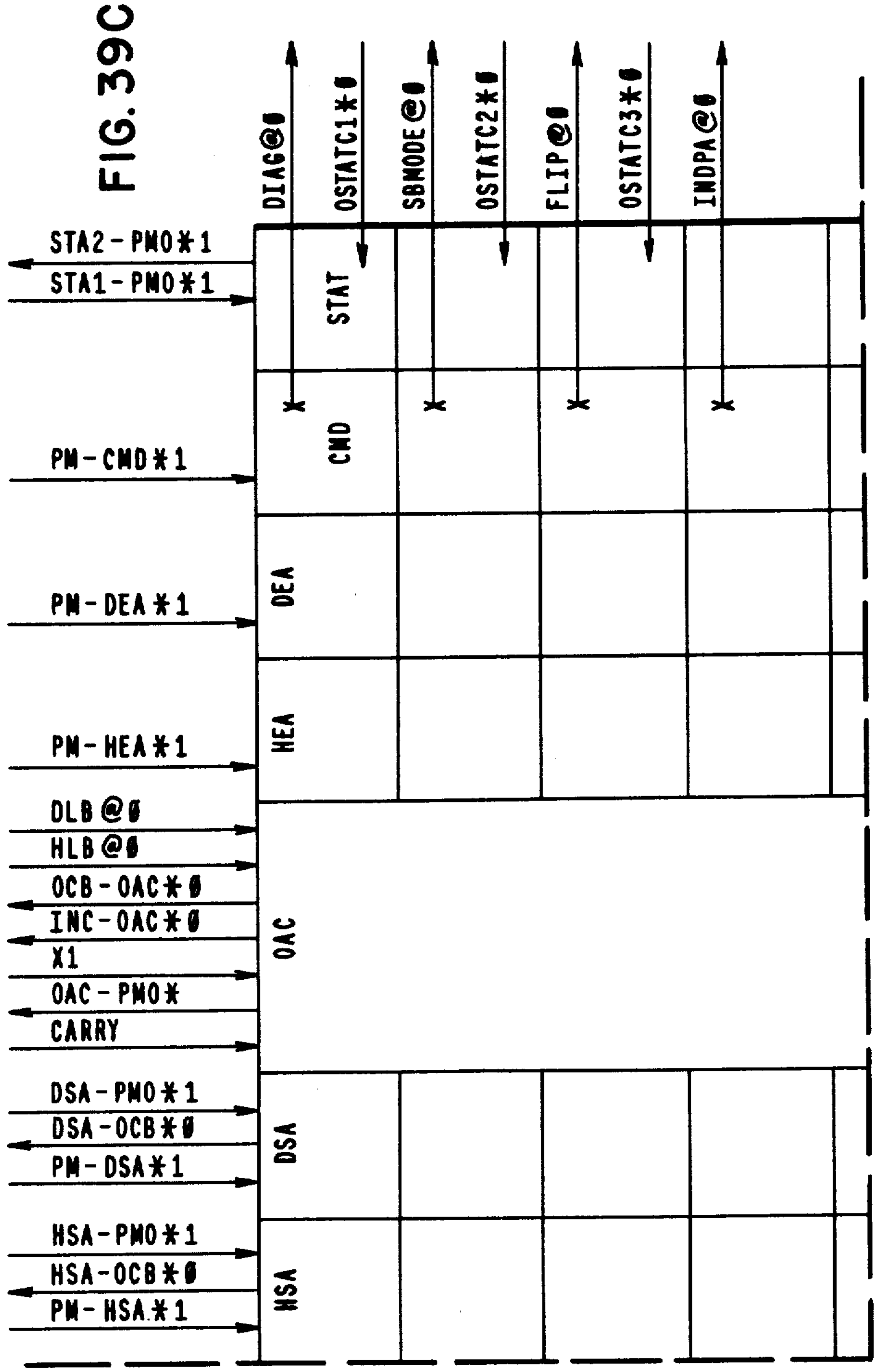
Figure 39D:
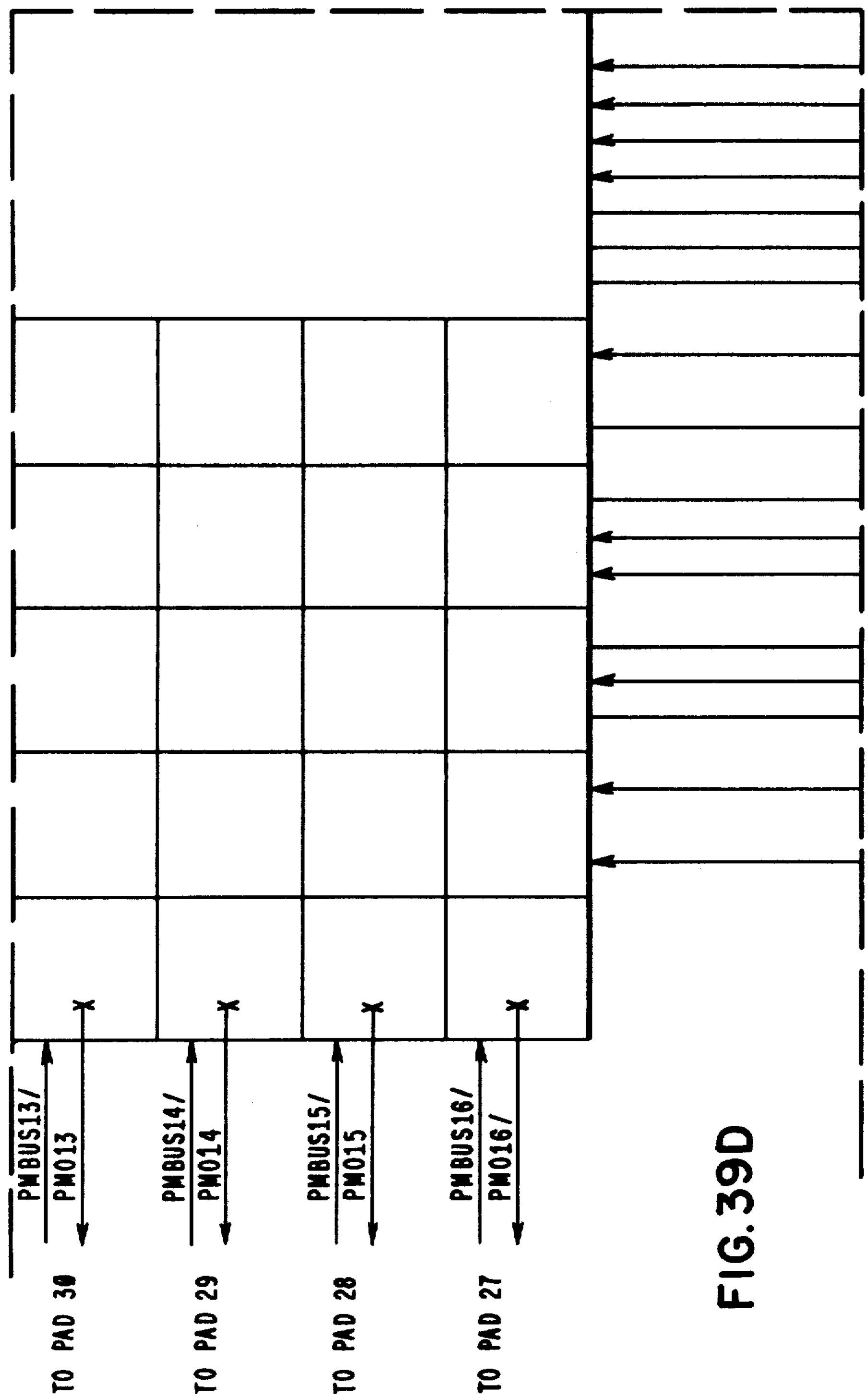
Figure 39E:
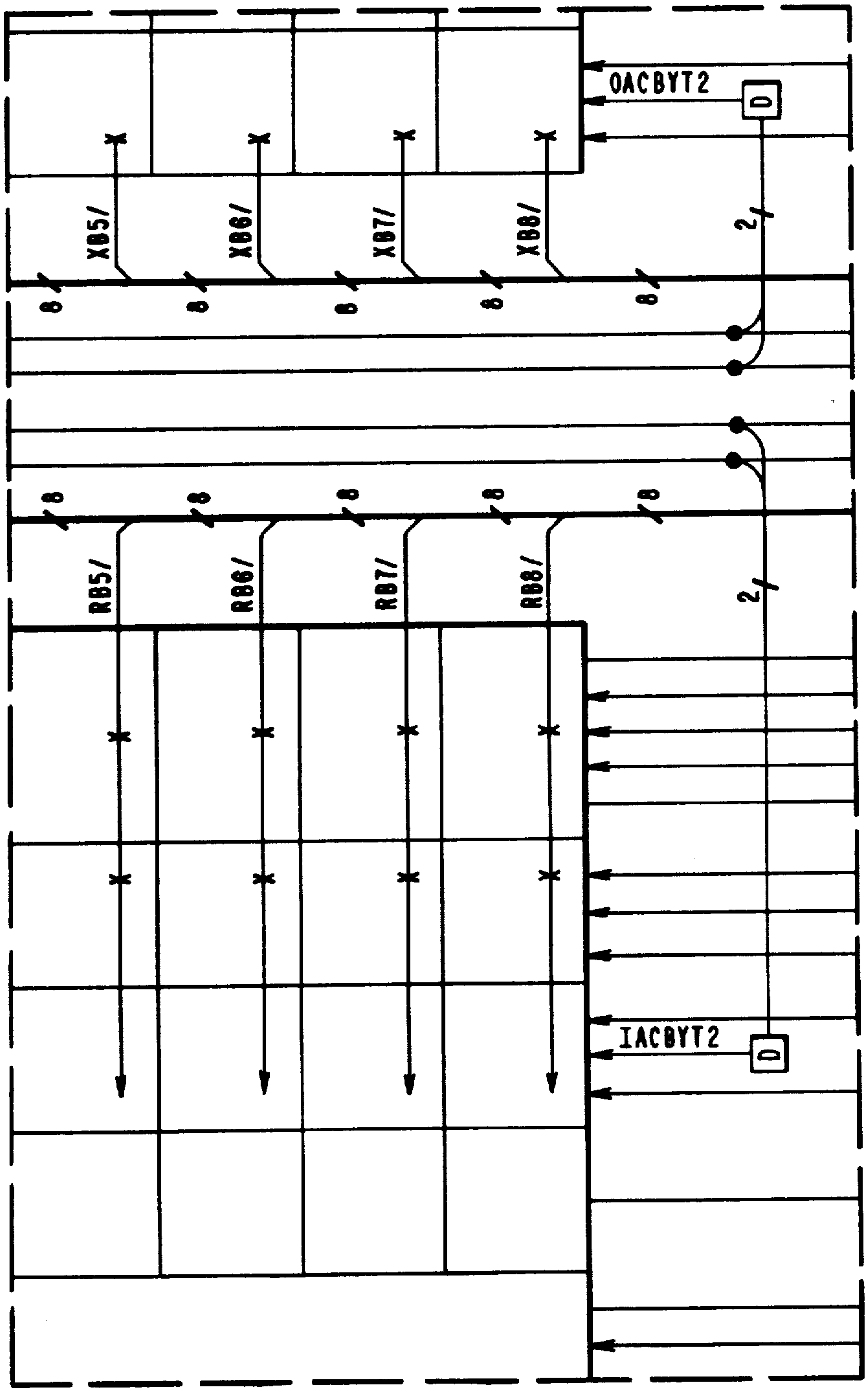
Figure 39F:
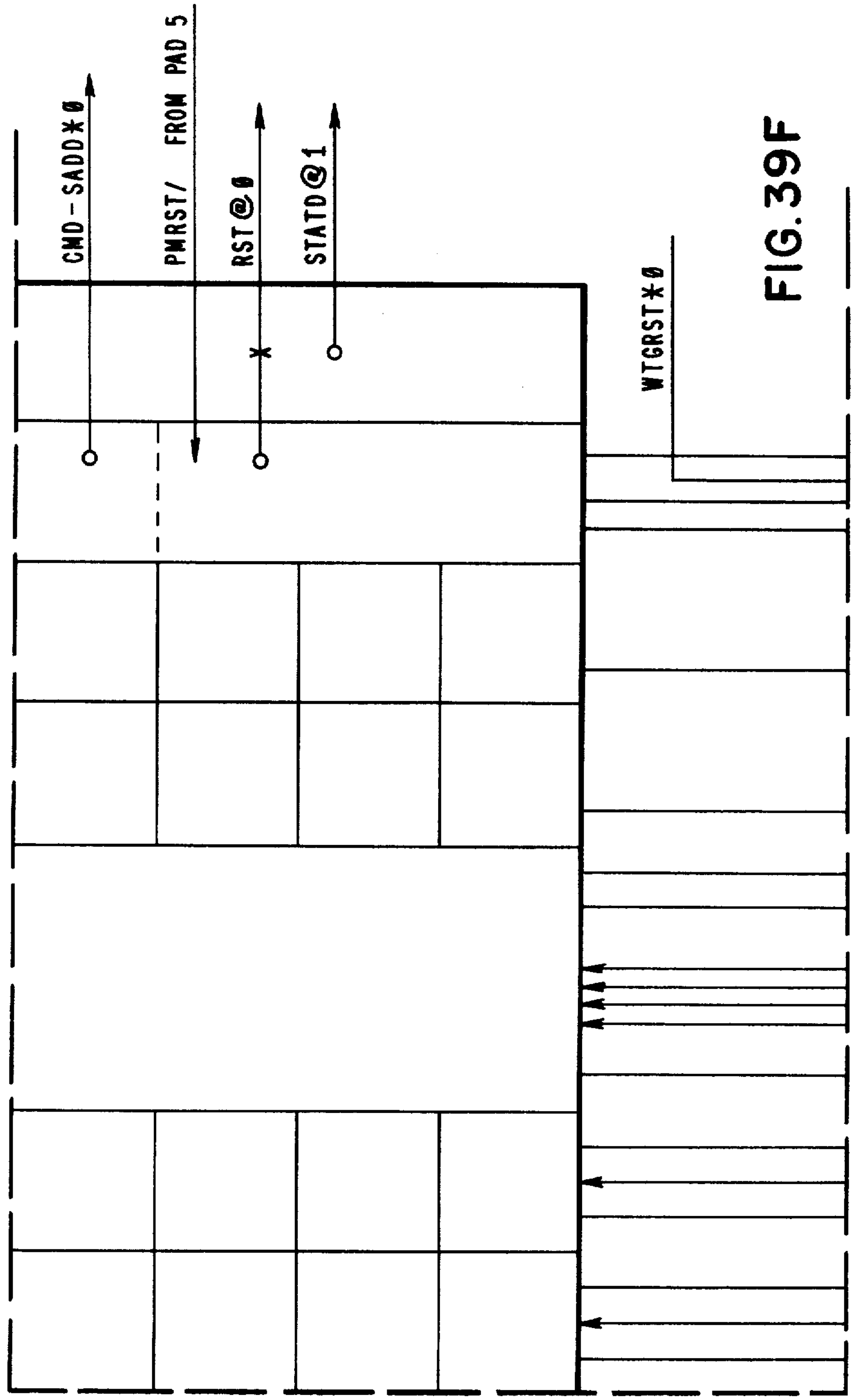
Figure 39G:
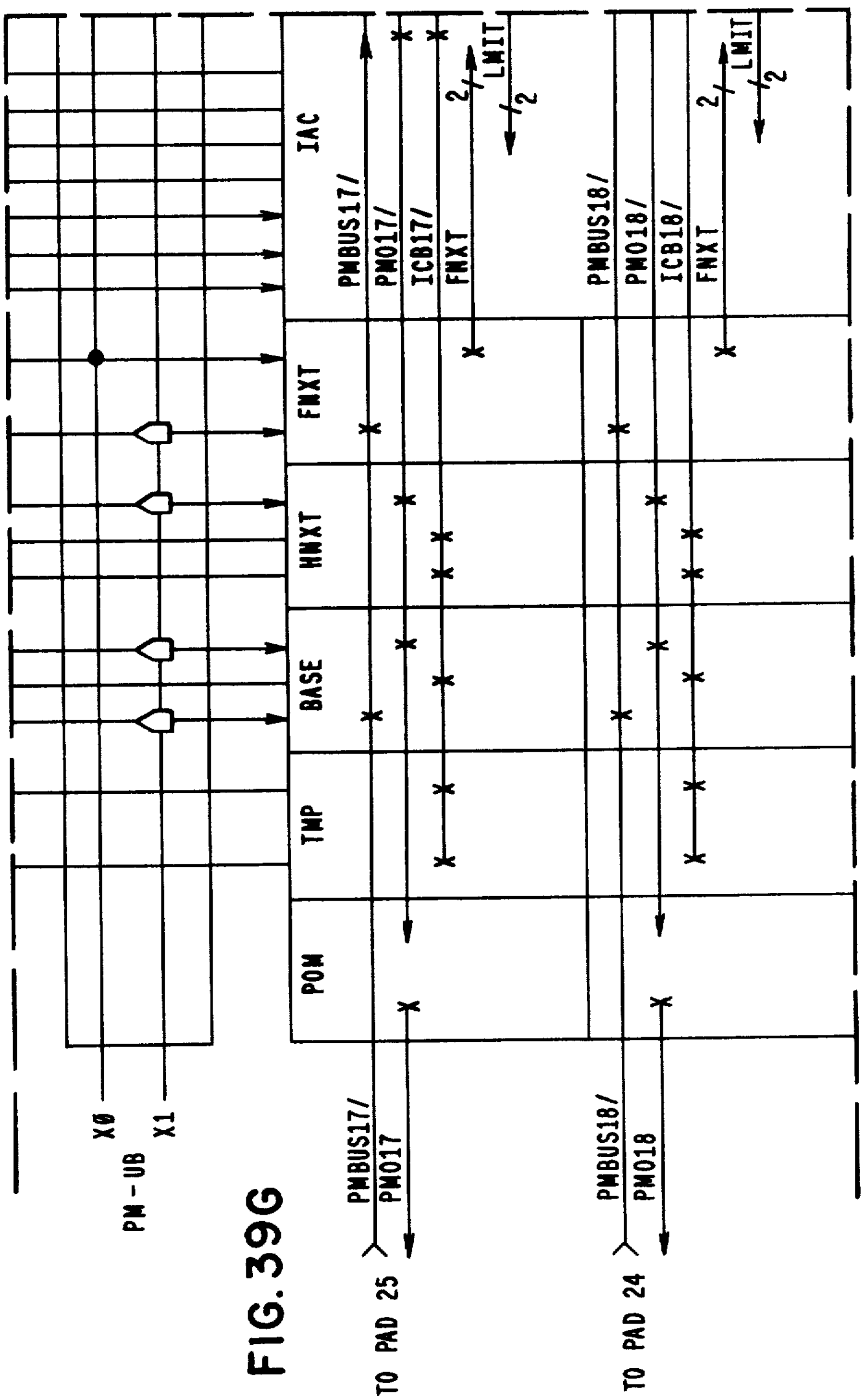
Figure 39H:
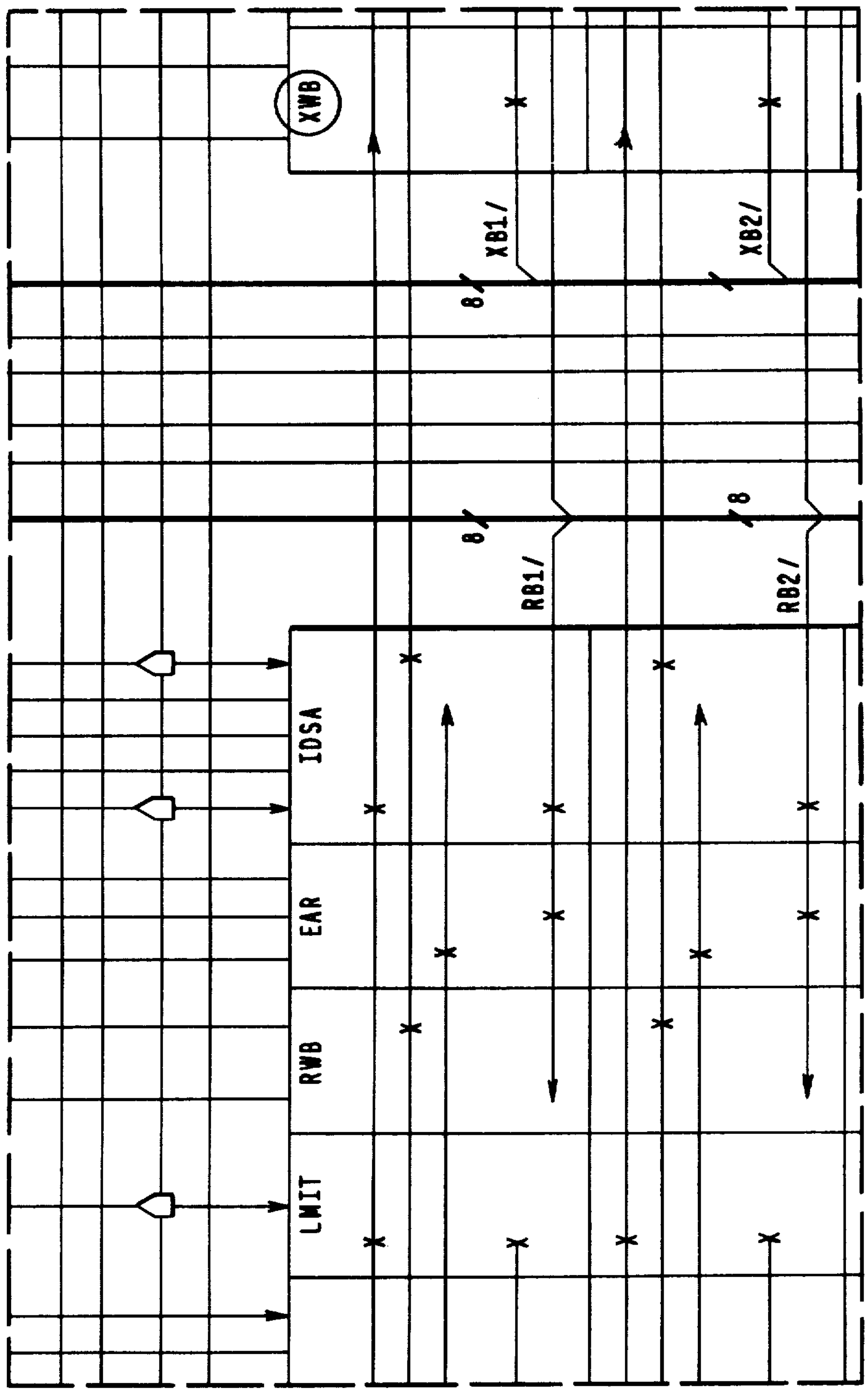
Figure 39I:
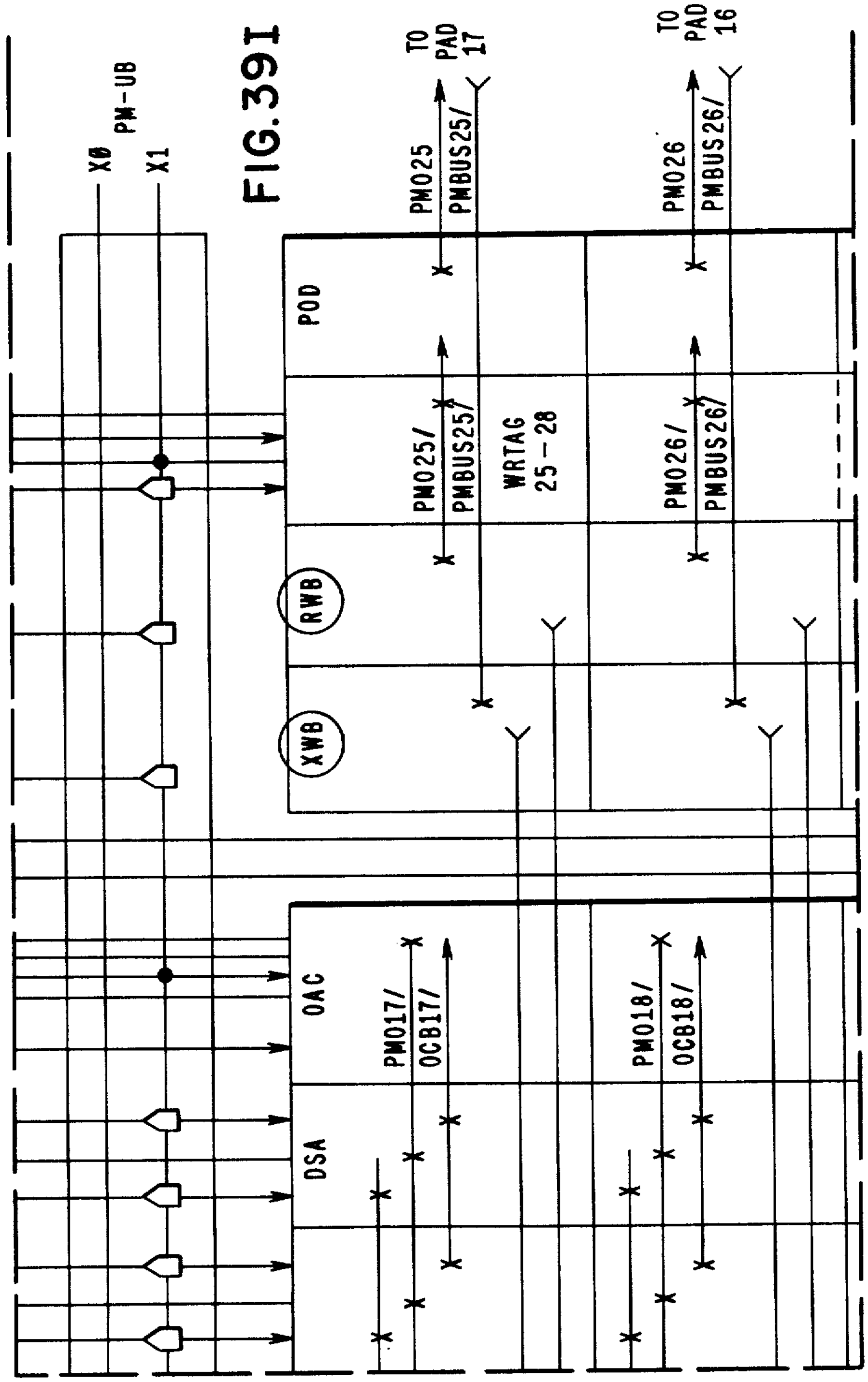
Figure 39J:
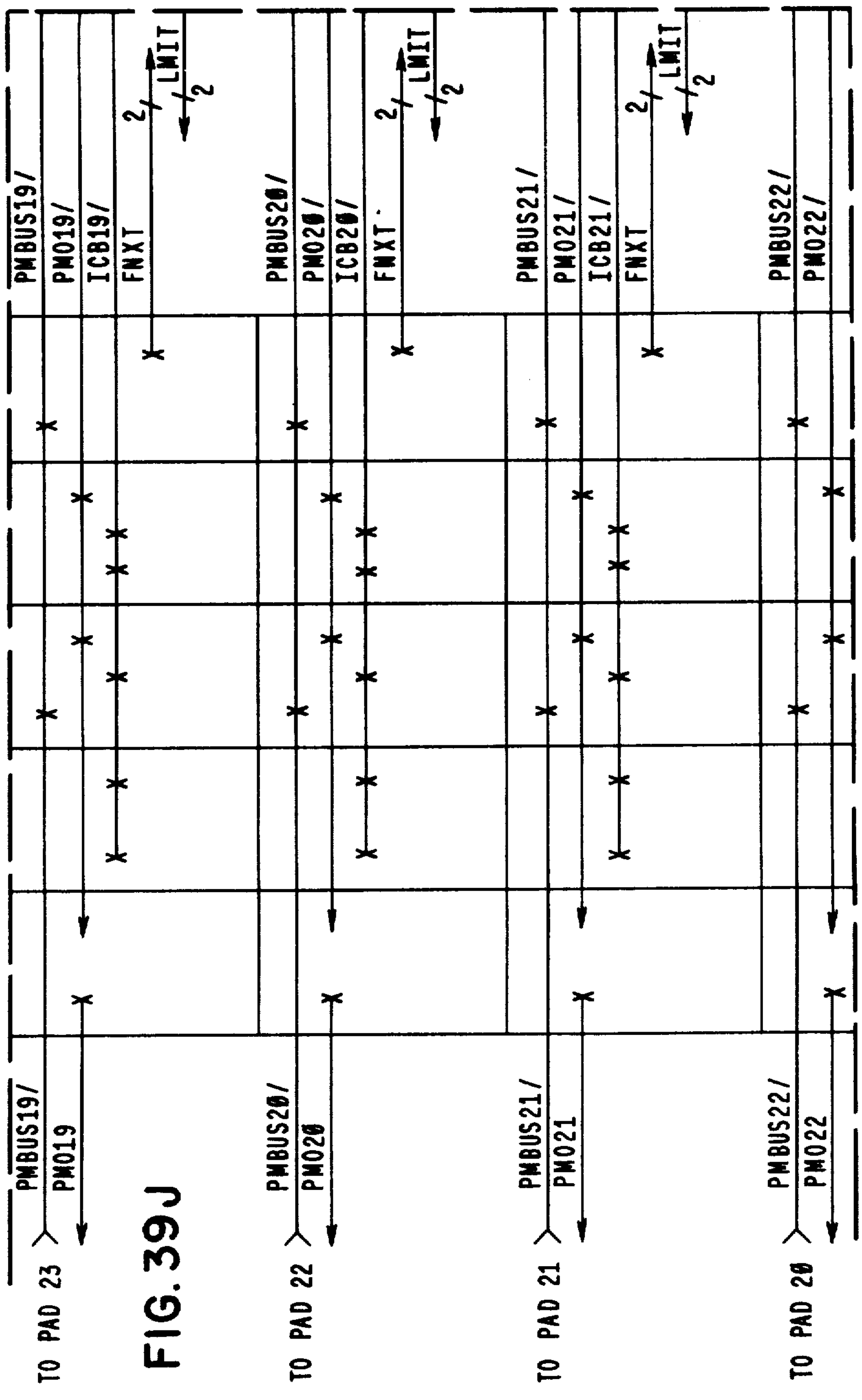
Figure 39K:
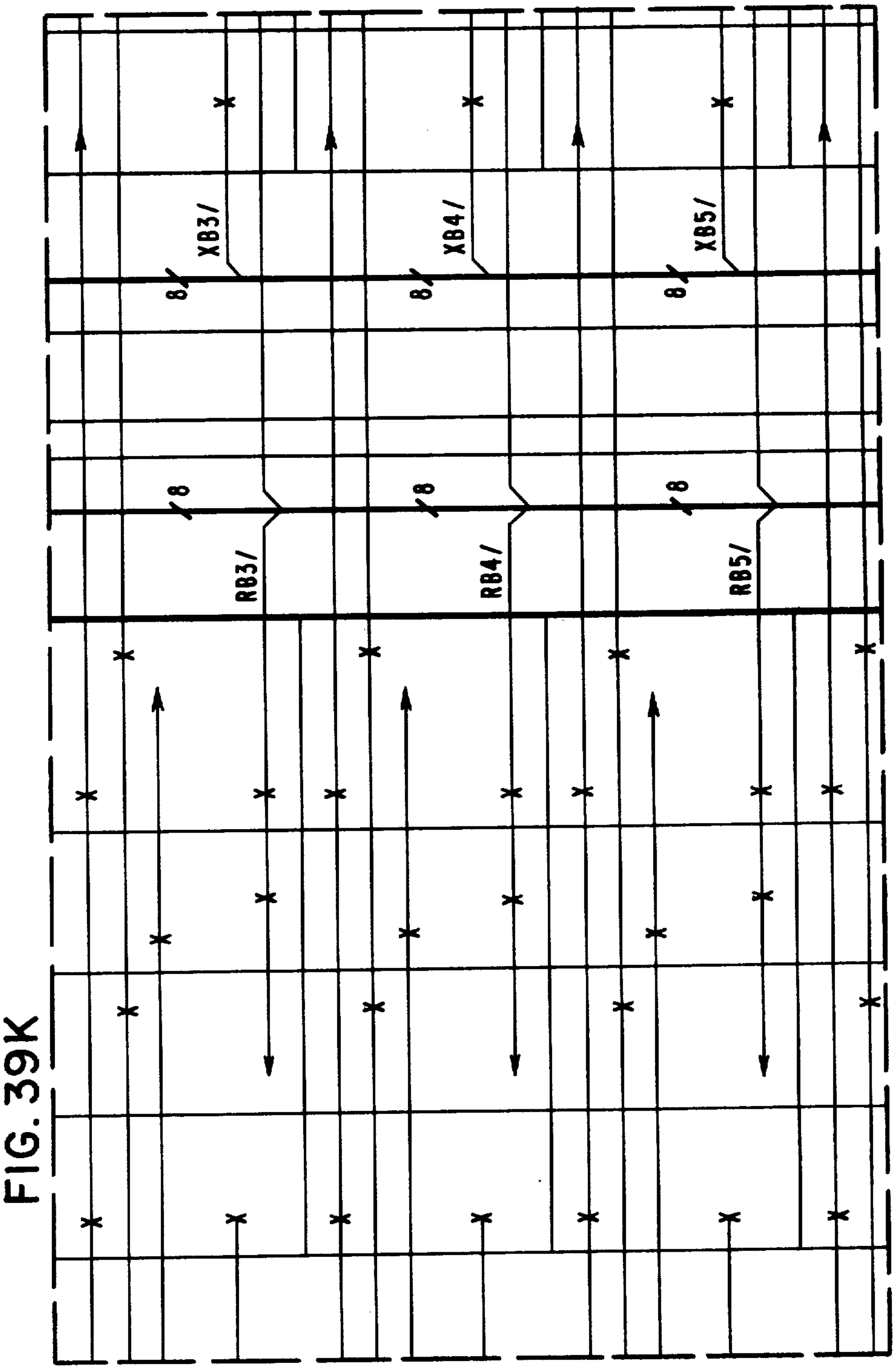
Figure 39L:
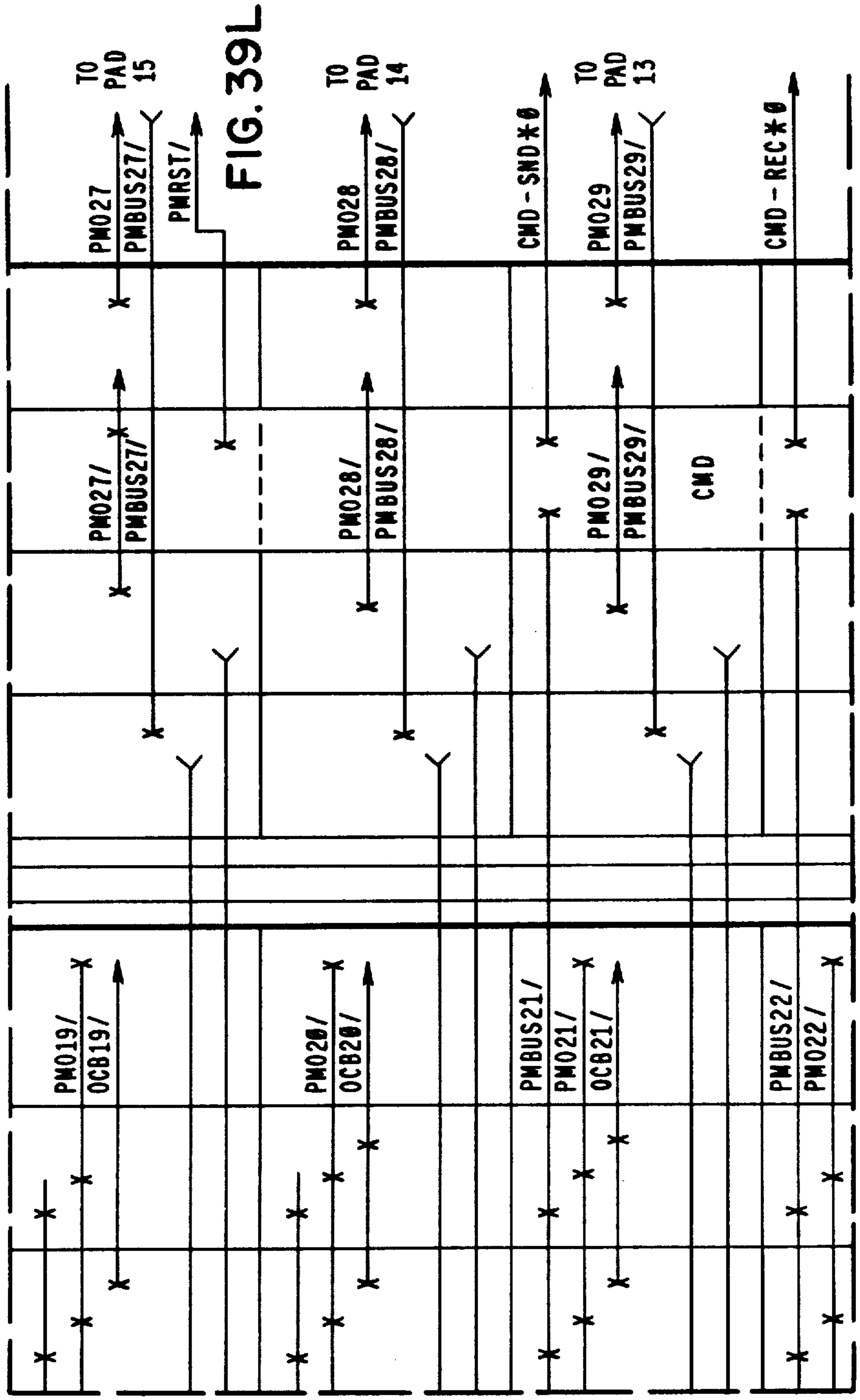
Figure 39M:
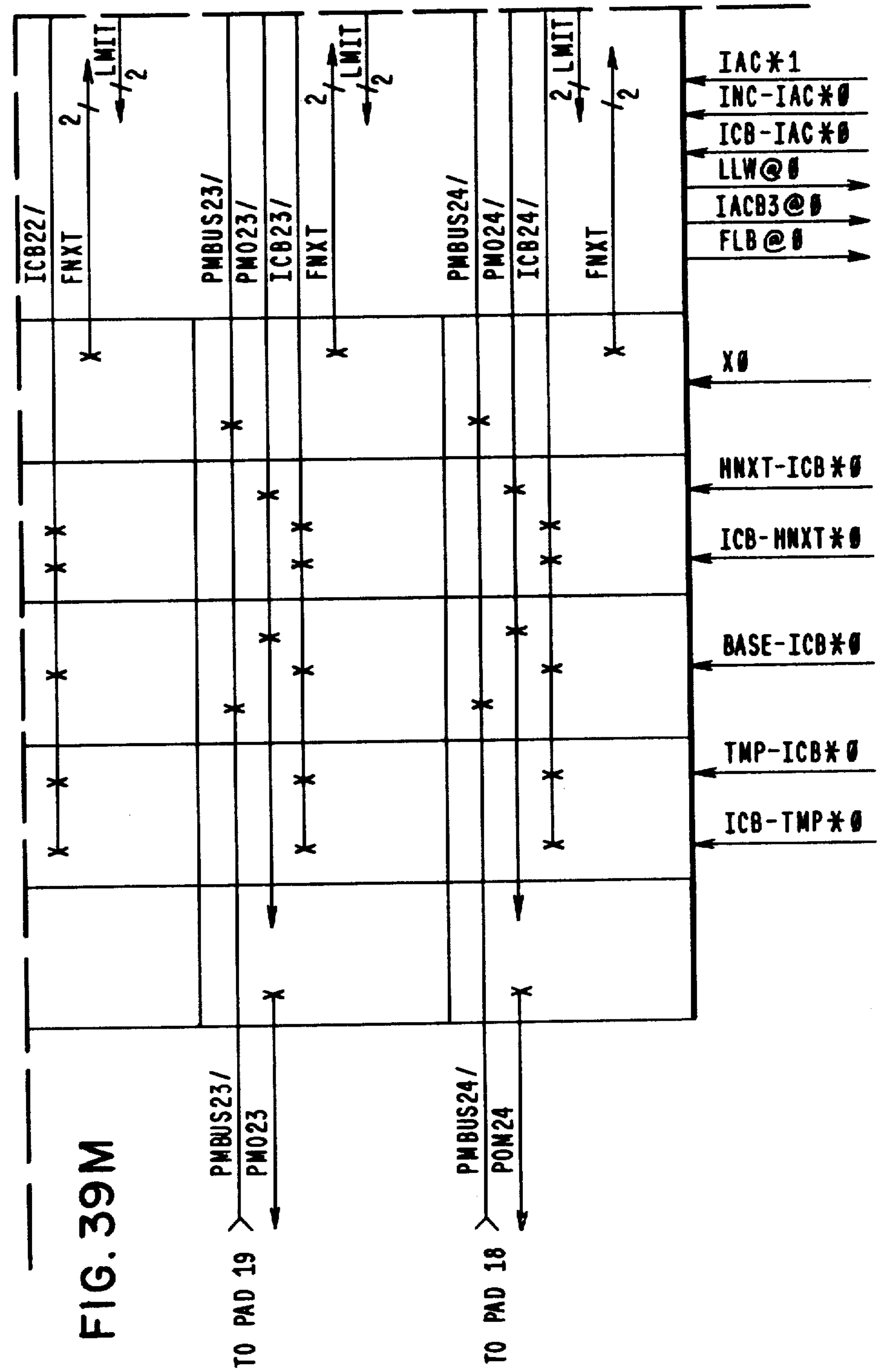
Figure 39N:
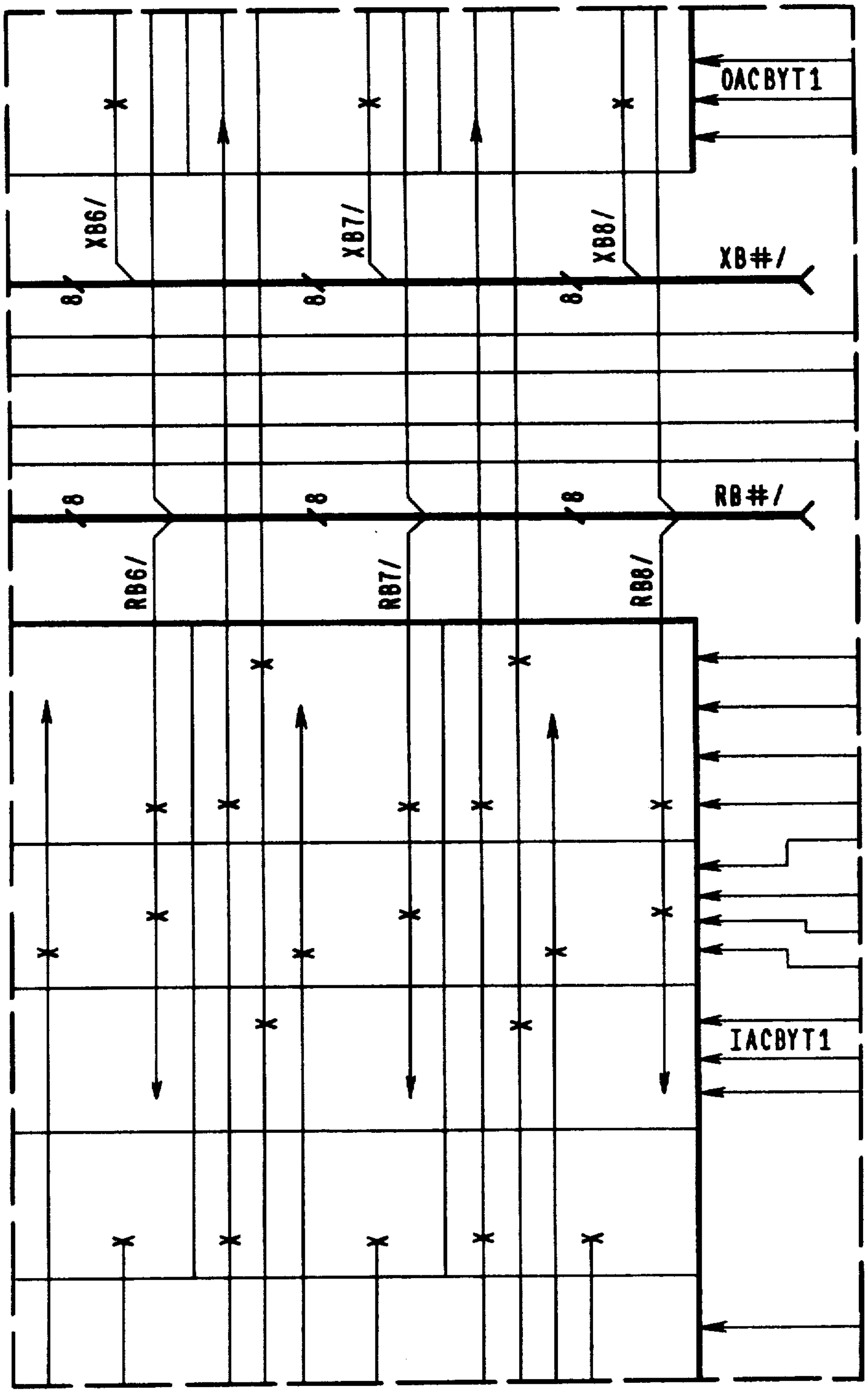
Figure 390:
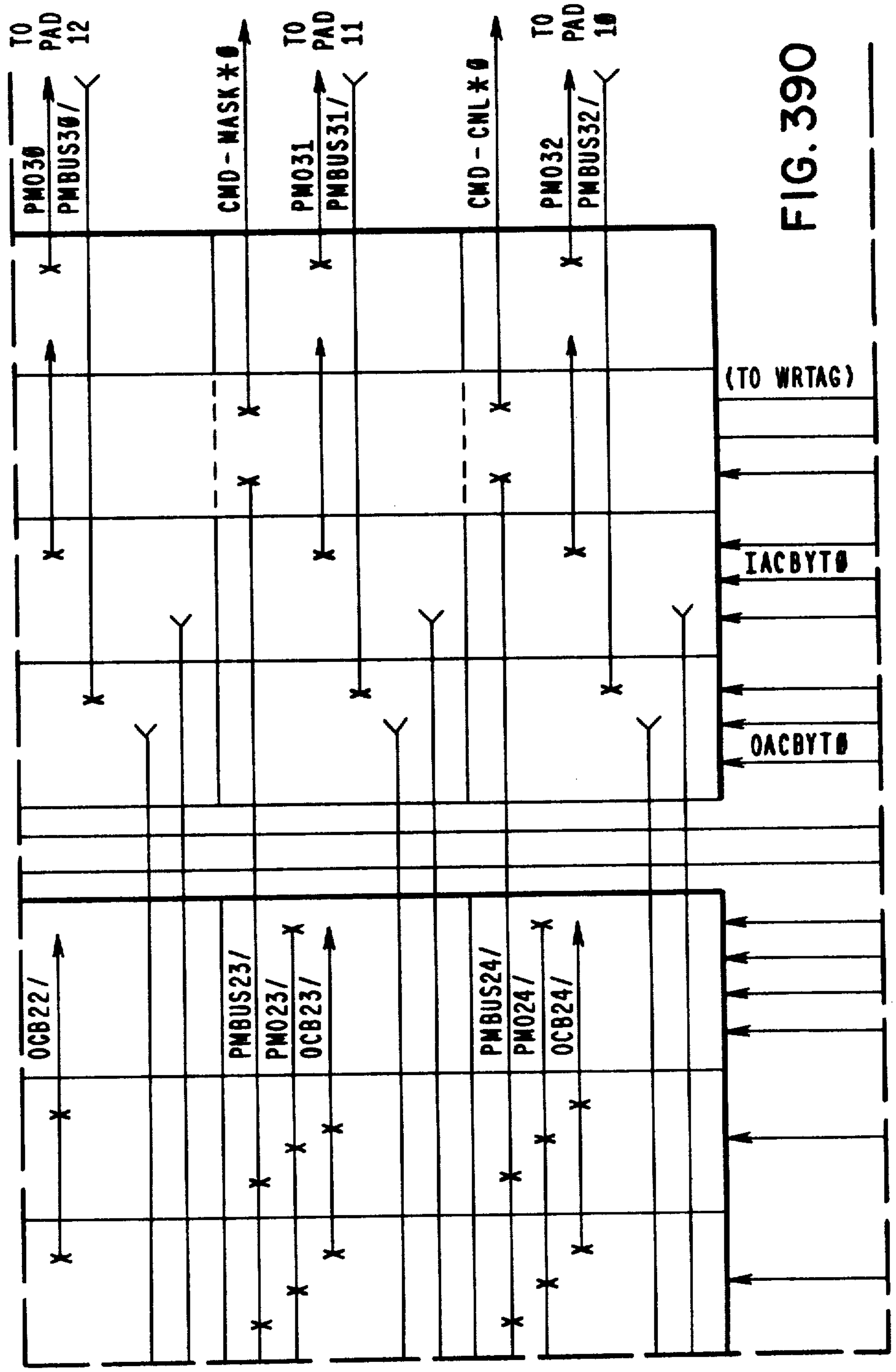
Figure 39P:
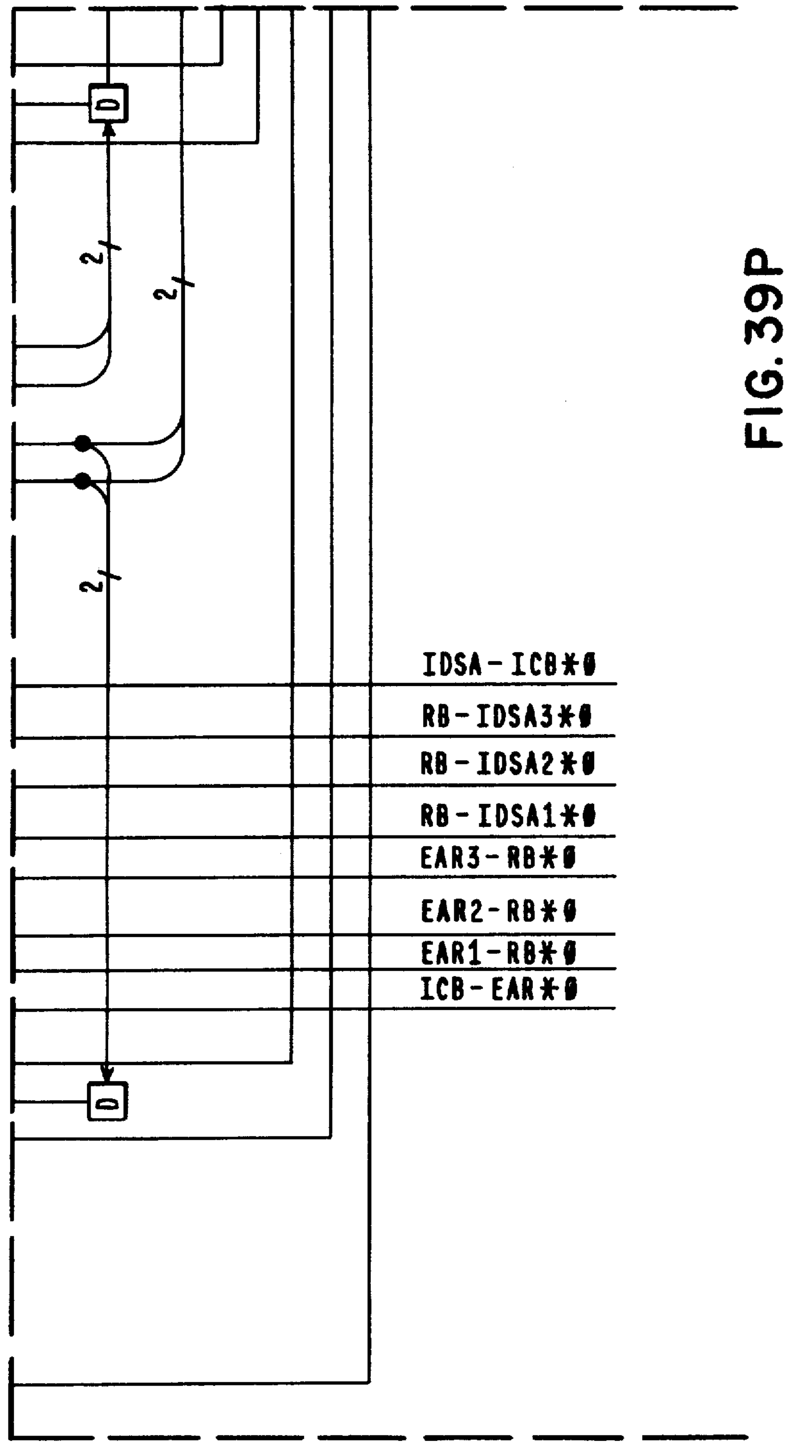
Figure 39Q:
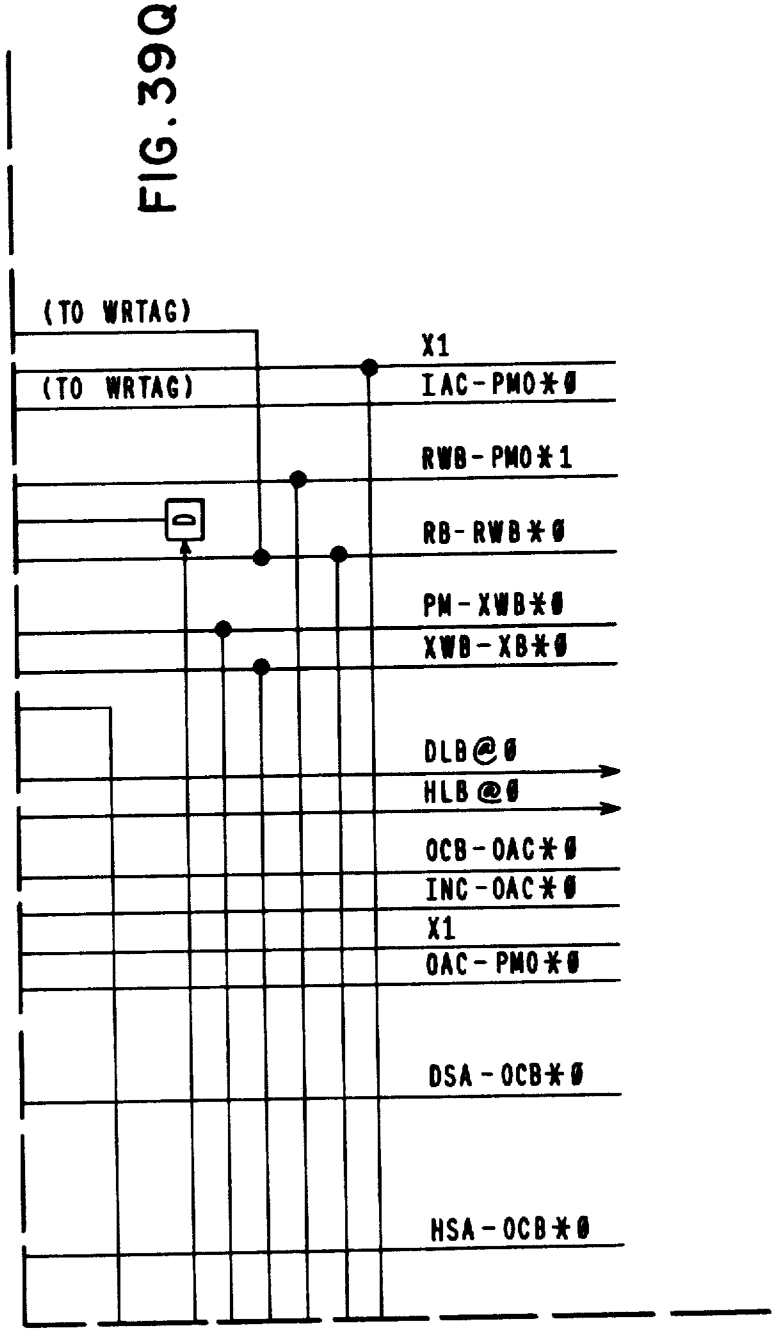
Figure 40A:
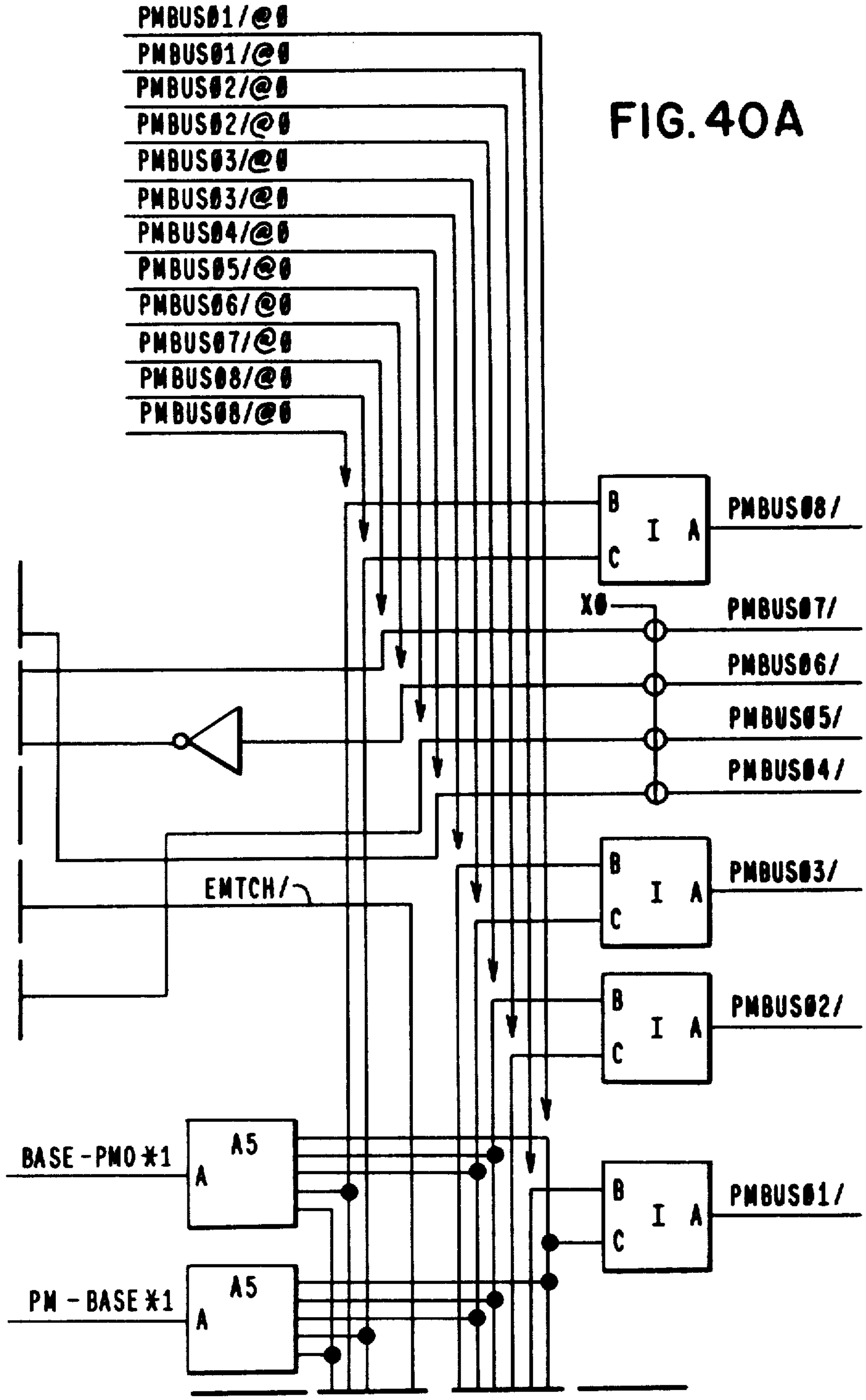
Figure 40B:
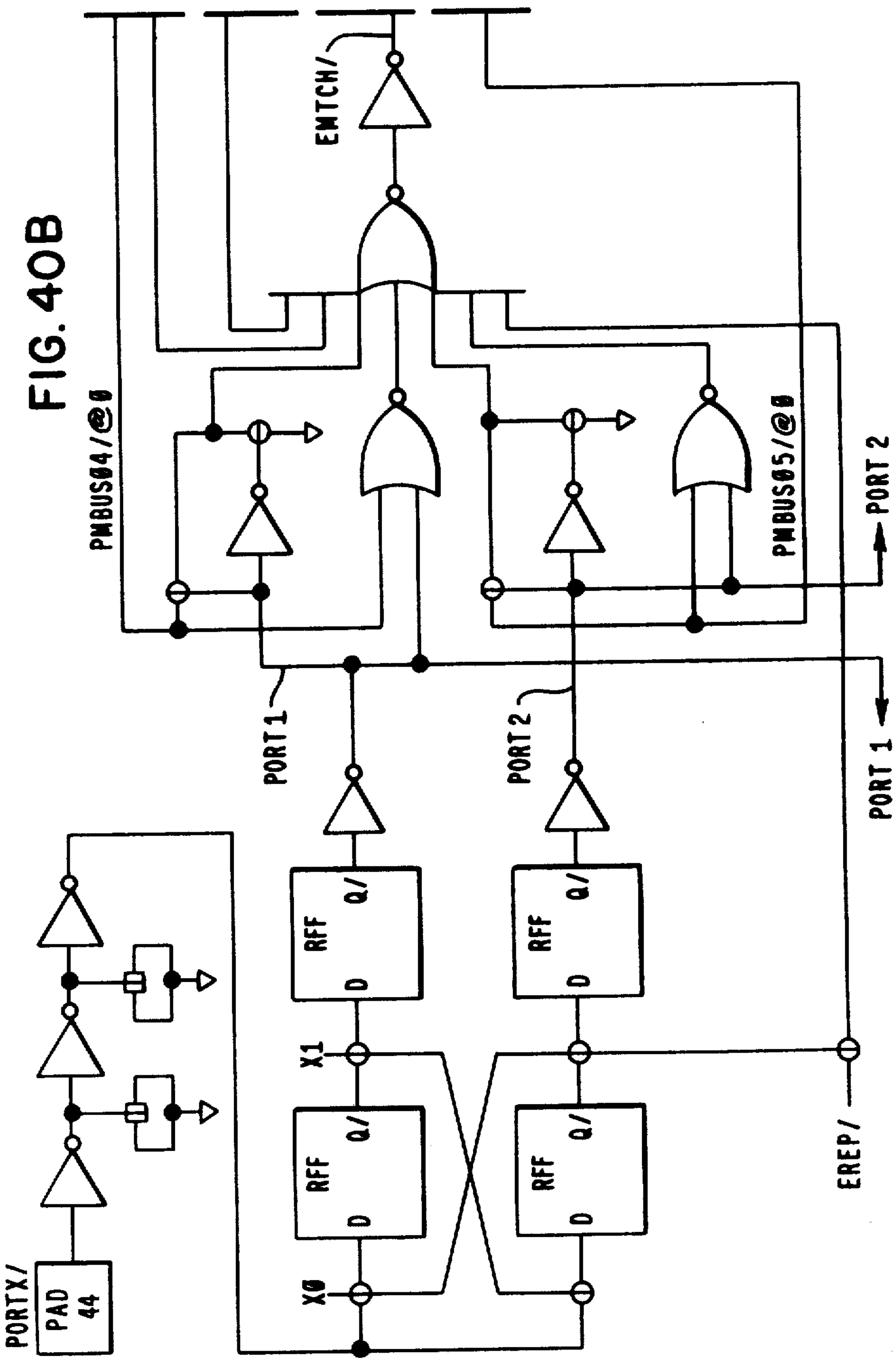
Figure 40C:
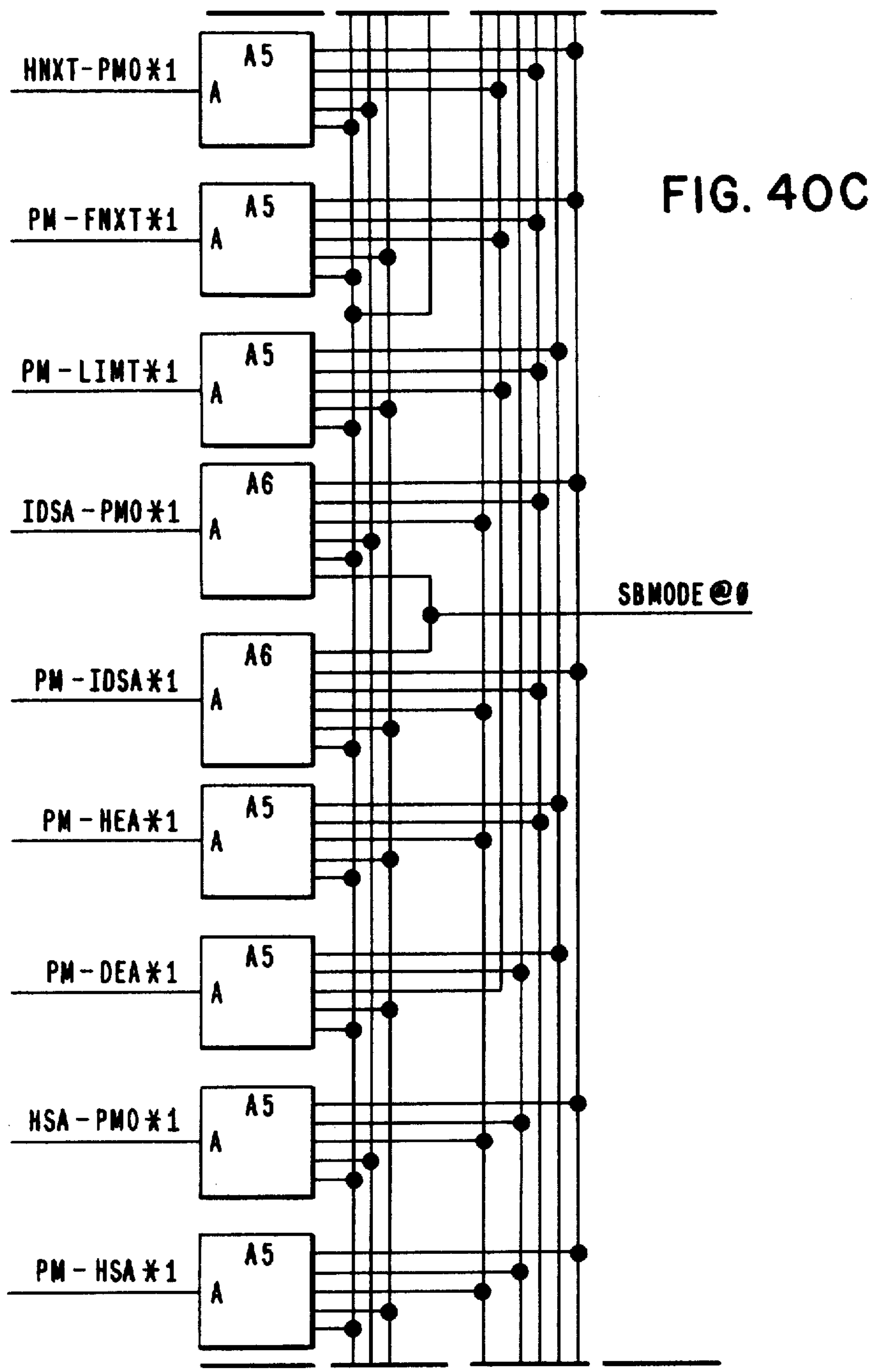
Figure 40D:
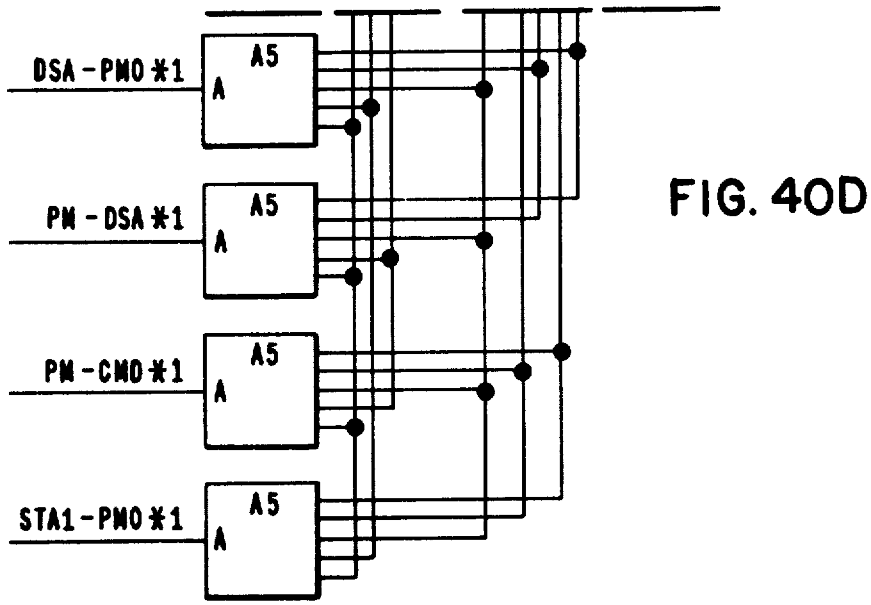
Figure 40:
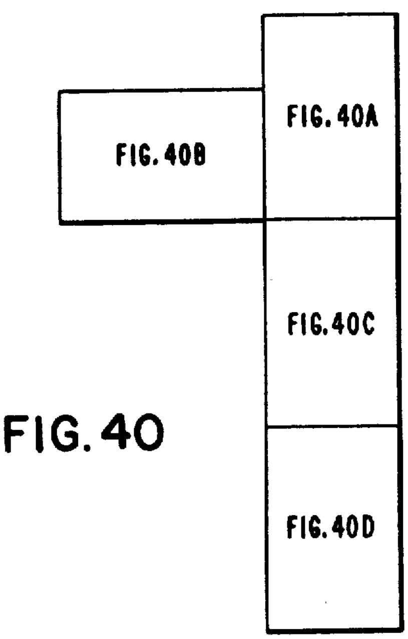

FIGS. 38A through 38L and FIGS. 39A through 39Q show, in somewhat general block form, the assembled circuit components that are depicted individually in detail in FIGS. 40A through 40D, 41, 42A through 42T, 43, 44, 45, 46, 47, 48, 49, 50, 51, 52, 53, 54, 55A and 55B, 56, and 57A through 57H. In particular, FIGS. 38A through 38L and 39A through 39Q show connection of the P-M bus to each cell or stage of the illustrated circuit components POD, TMP, HNXT, FNXT, IAC, LMIT, RWB, EAR, IDSA, XWB, HSA, DSA, OAC, HEA, DEA, CMD, STAT and WRTAG. The symbol # indicates the numbers 1 through 8. The circuit blocks in FIGS. 38A through 38L are positioned directly above the circuit blocks in FIGS. 39A through 39Q. The use of the mark "X" on a signal line in these Figures indicates that the signal line is connected to provide its signal to or receive its signal from the illustrated component.

Figure 41:
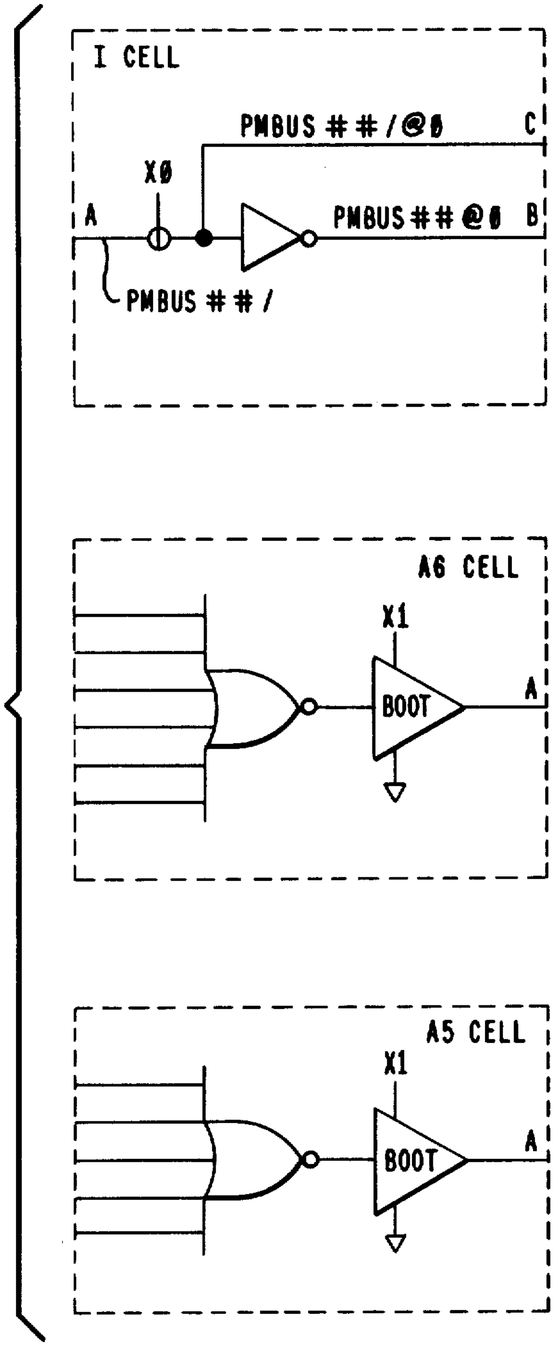

FIGS. 40A through 40D show the circuit components within the ERU decoder (ECDC) of FIGS. 38A through 38L. FIG. 41 shows the circuitry within the cells A5, A6 and I of FIGS. 40A through 40D.

Figure 42A:
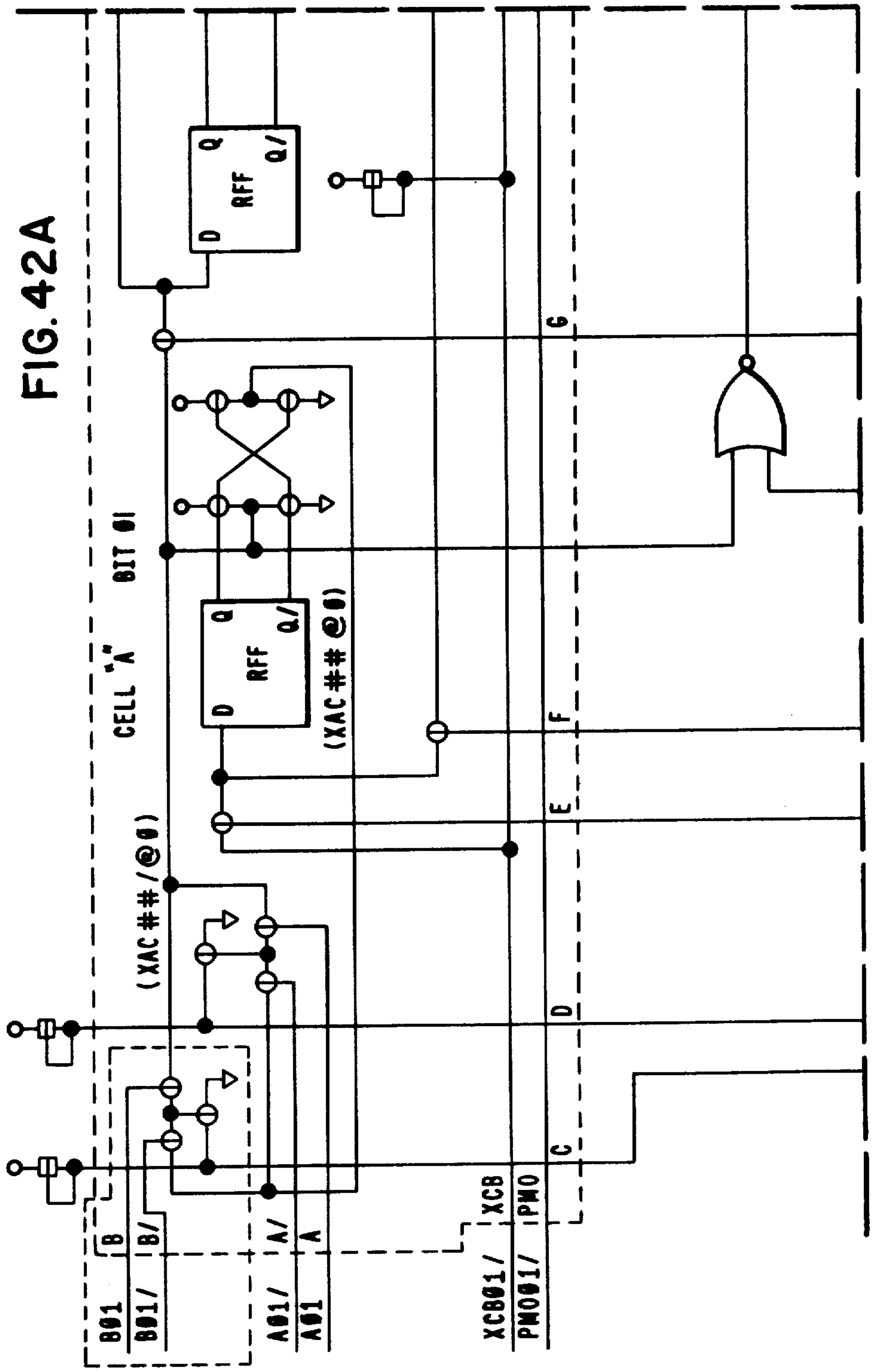
Figure 42B:
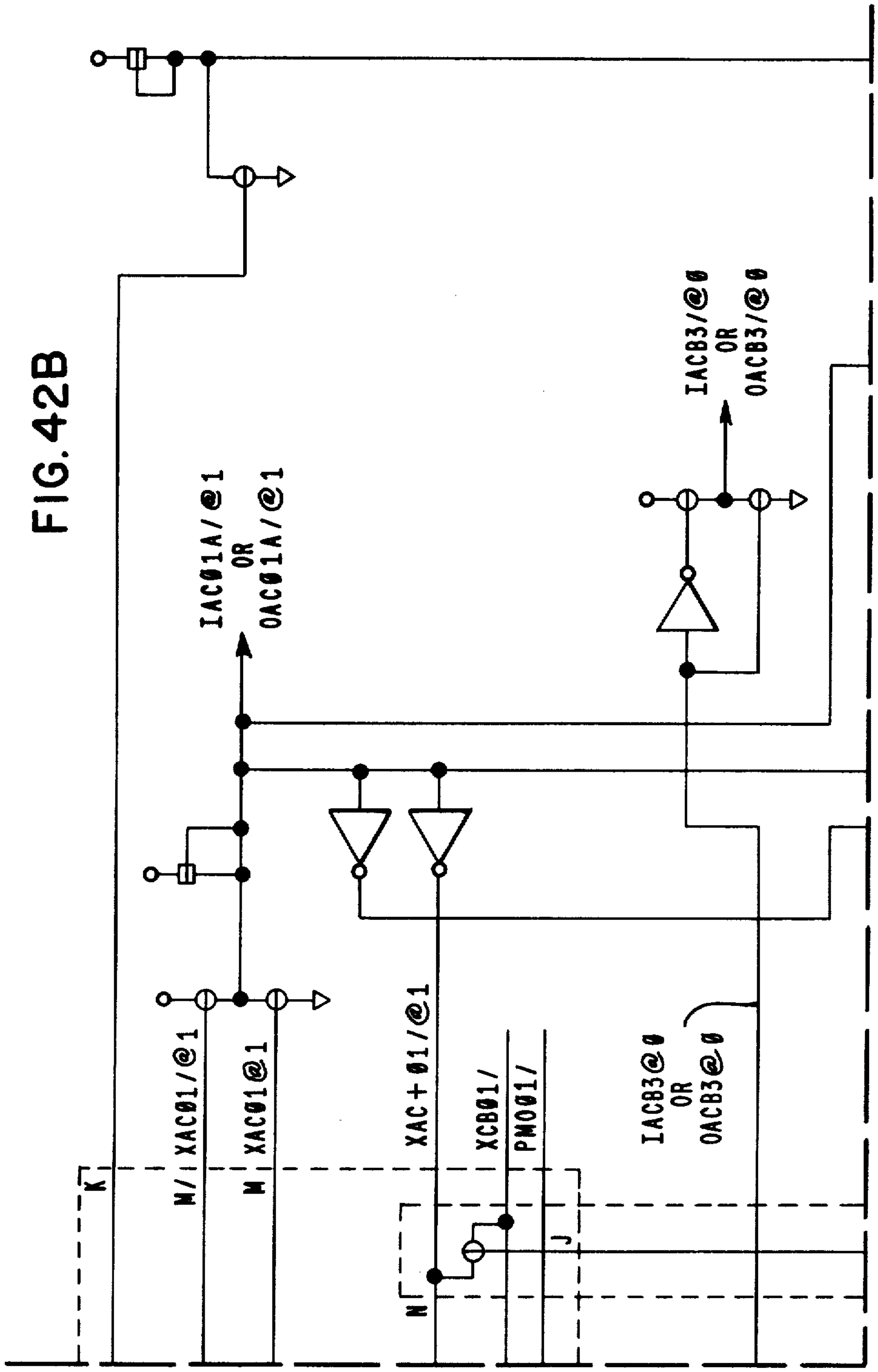
Figure 42C:
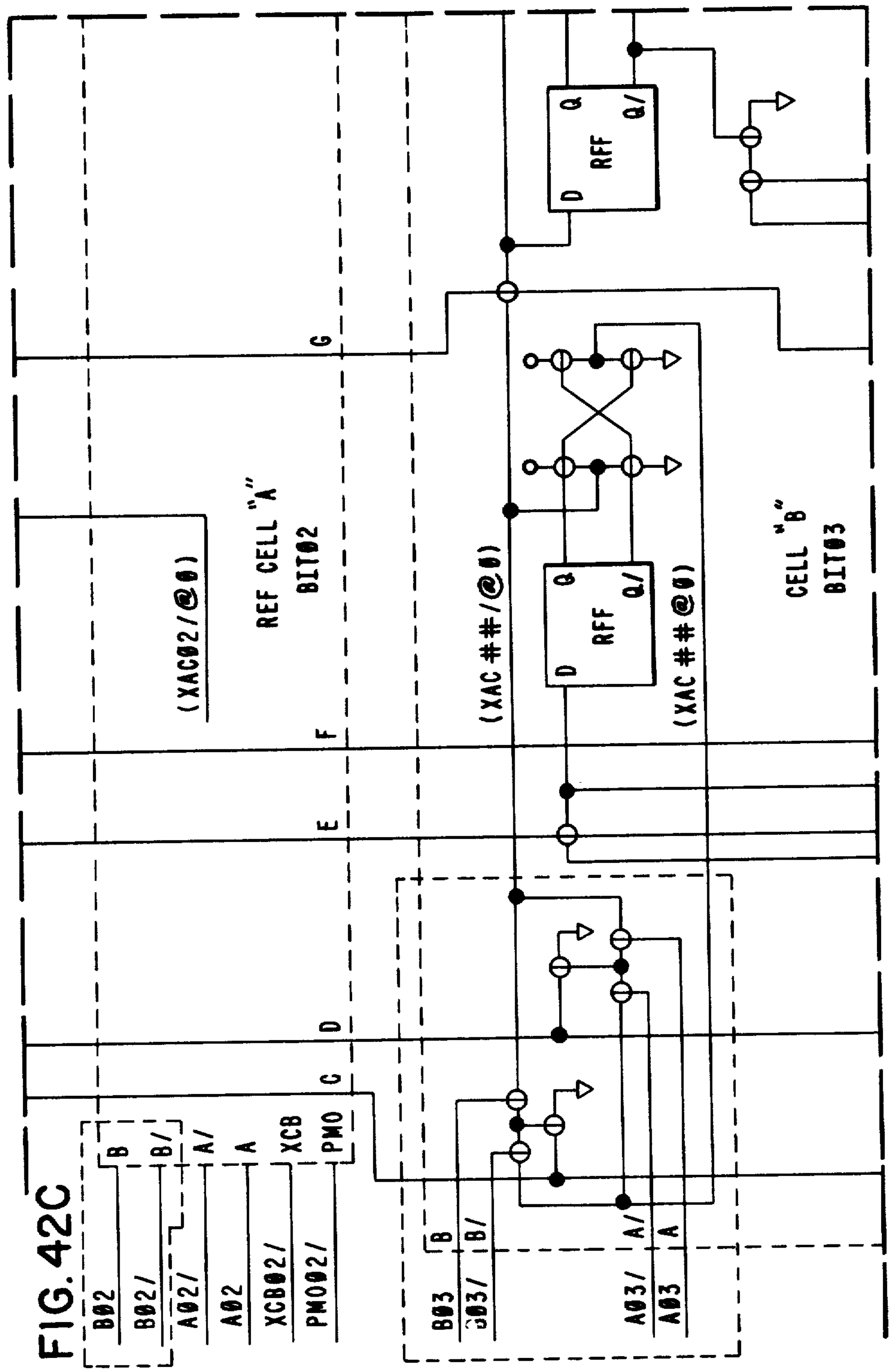
Figure 42D:
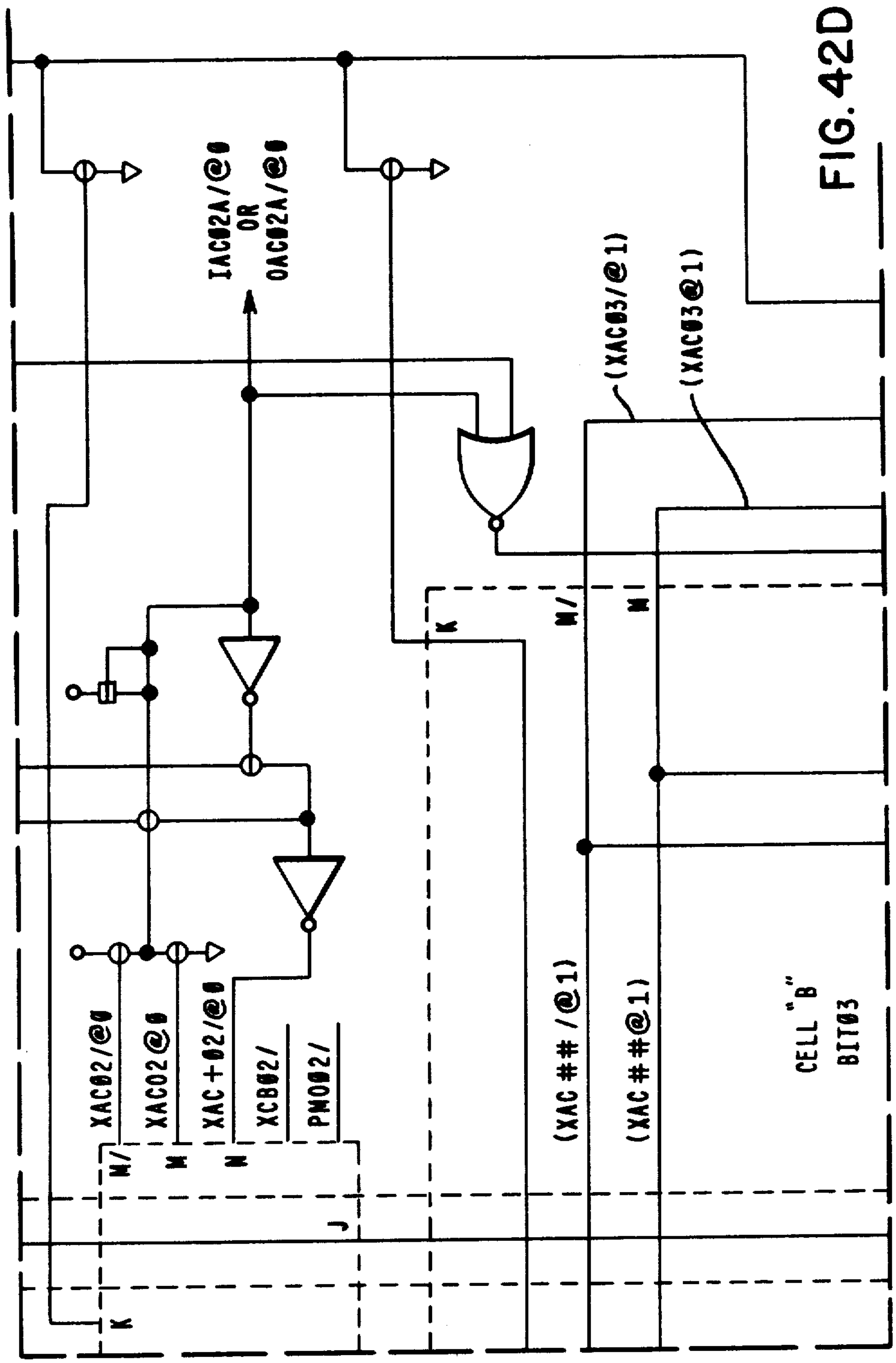
Figure 42E:
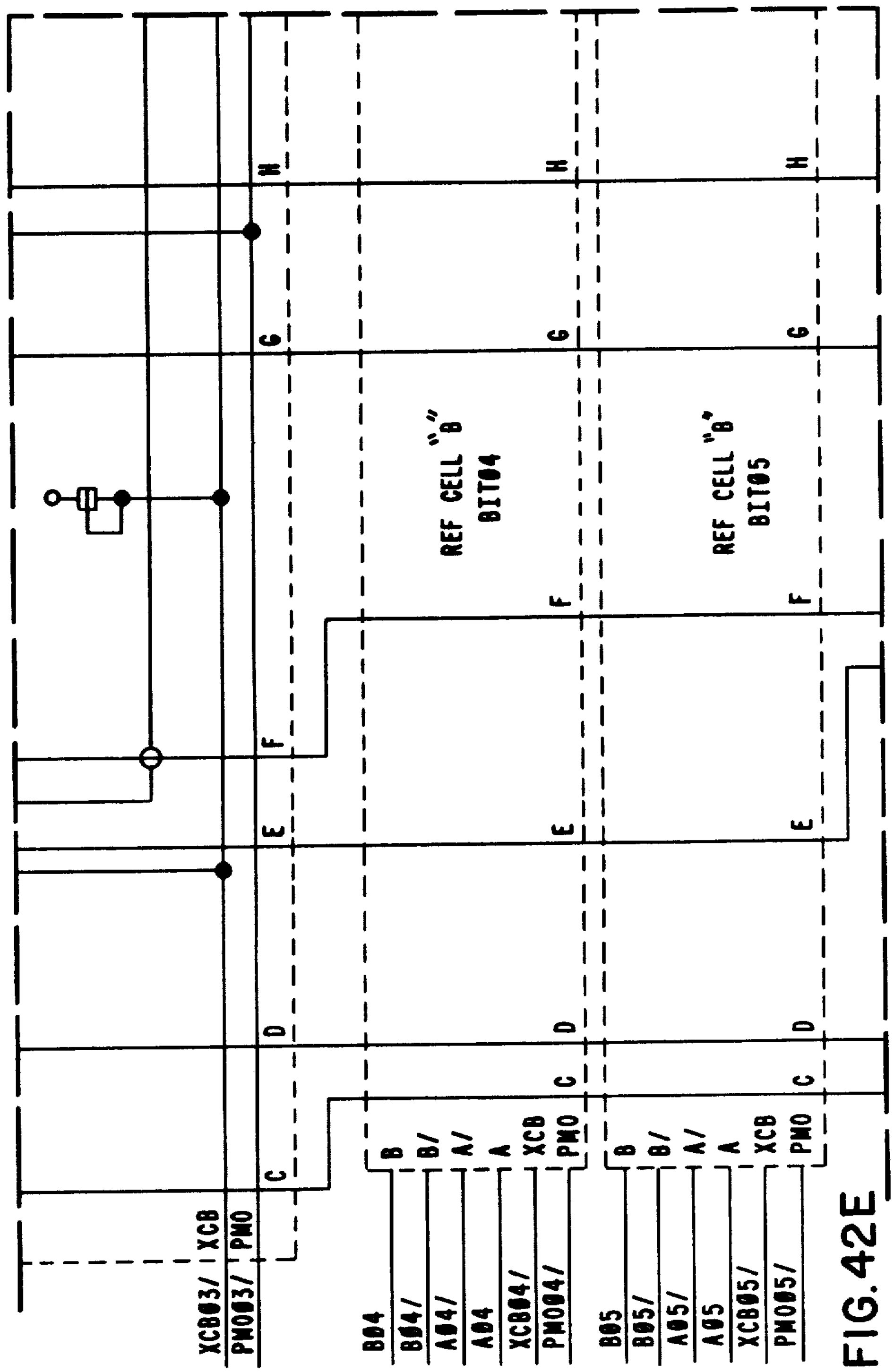
Figure 42F:
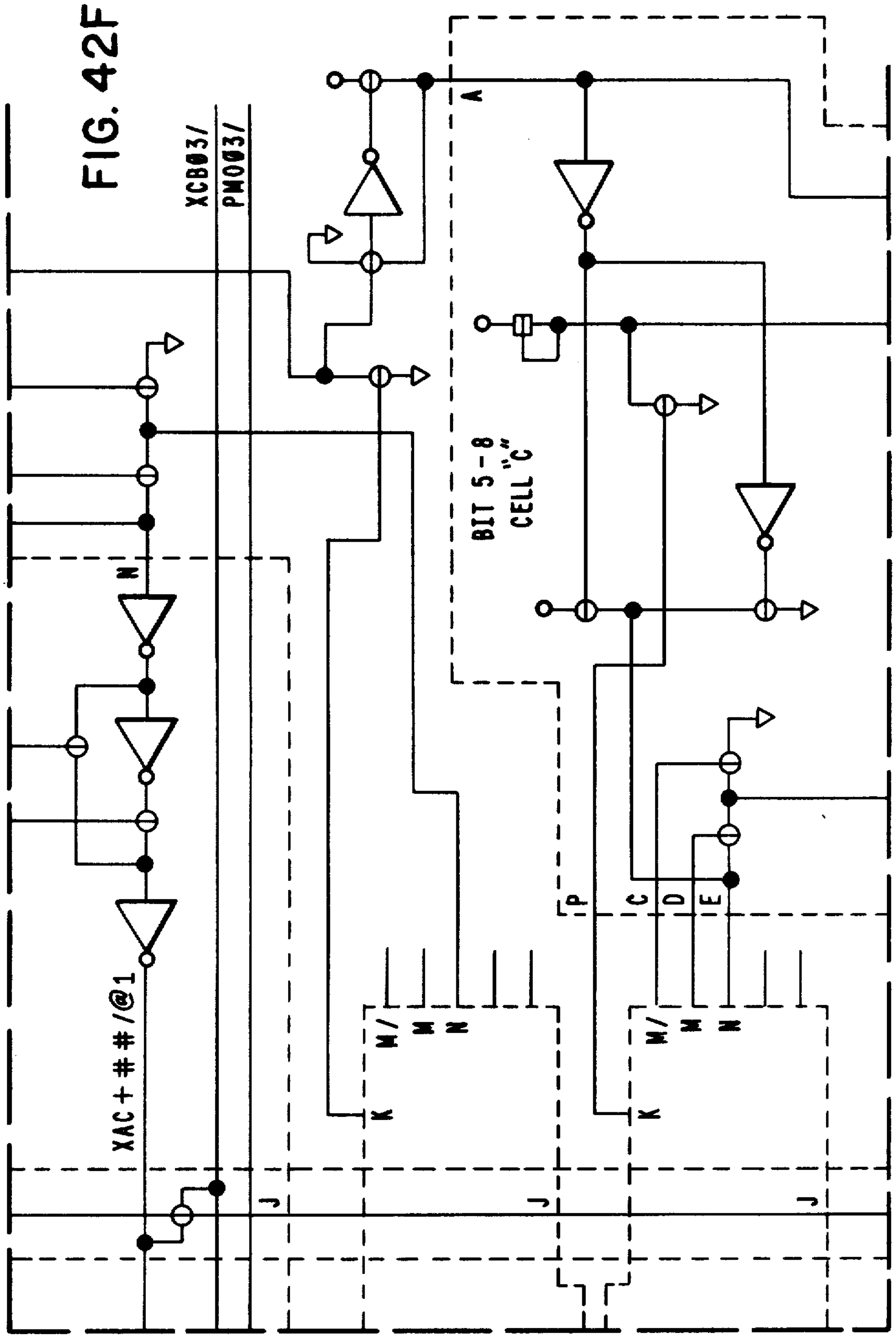
Figure 42G:
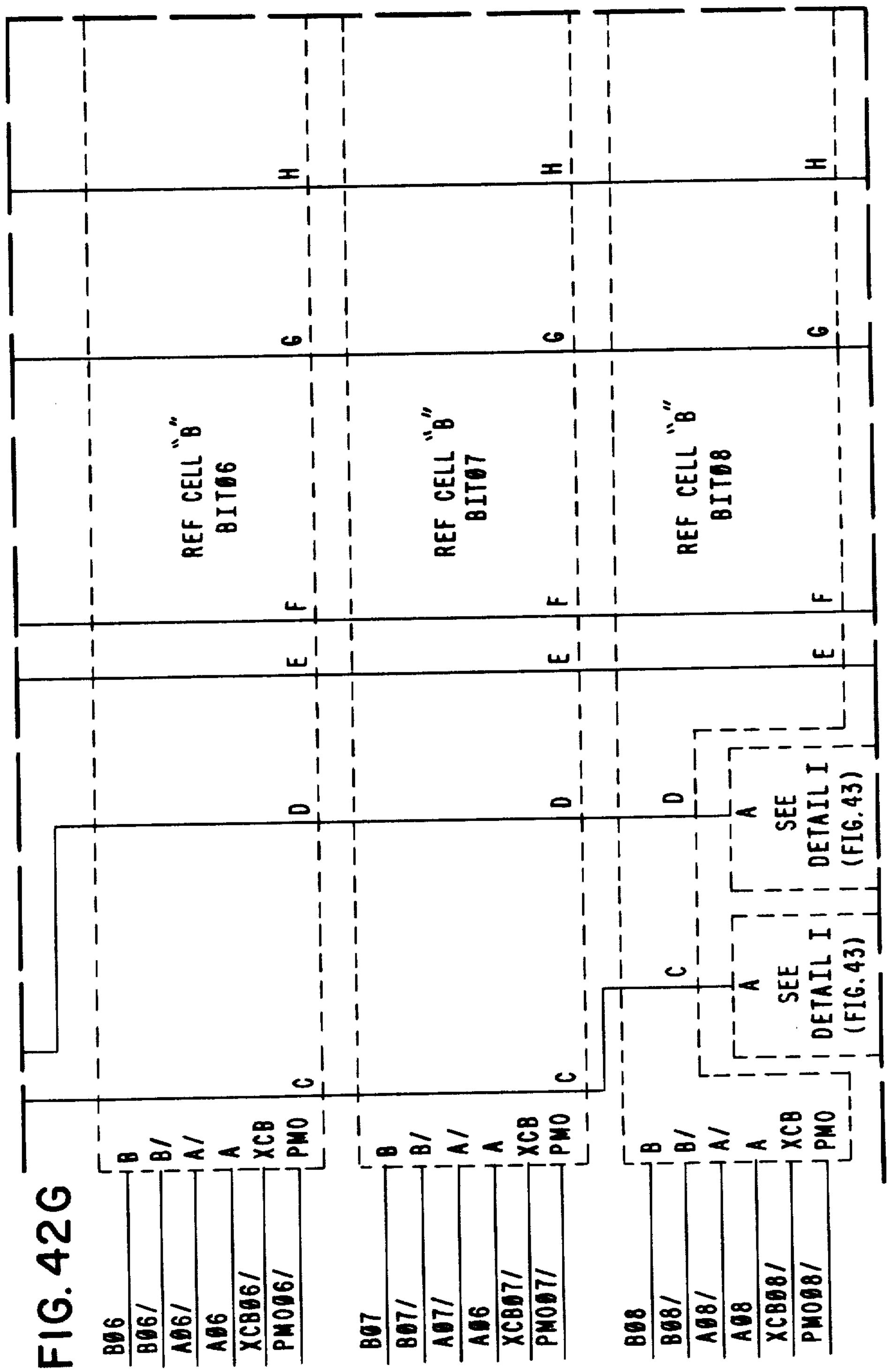
Figure 42H:
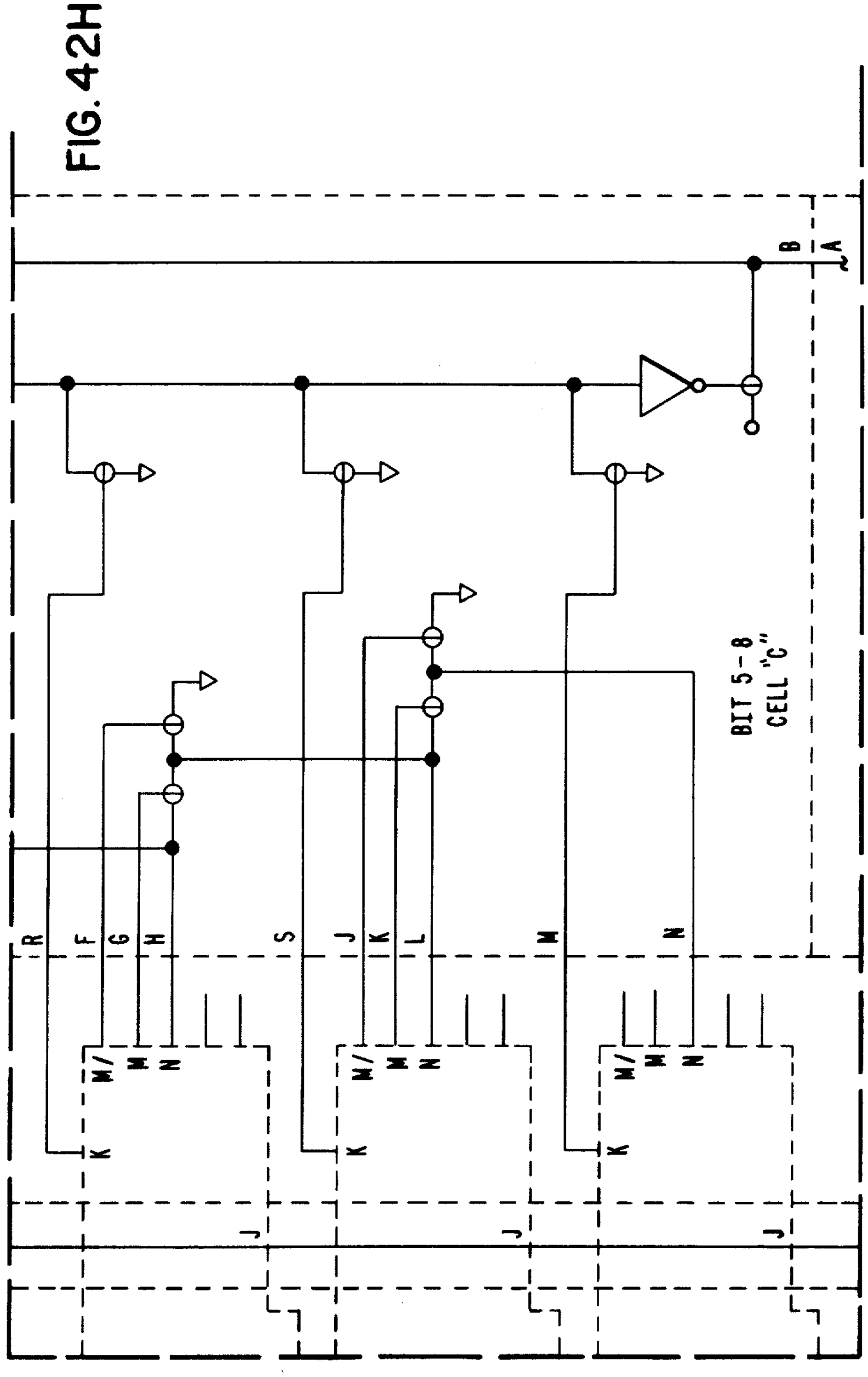
Figure 42I:
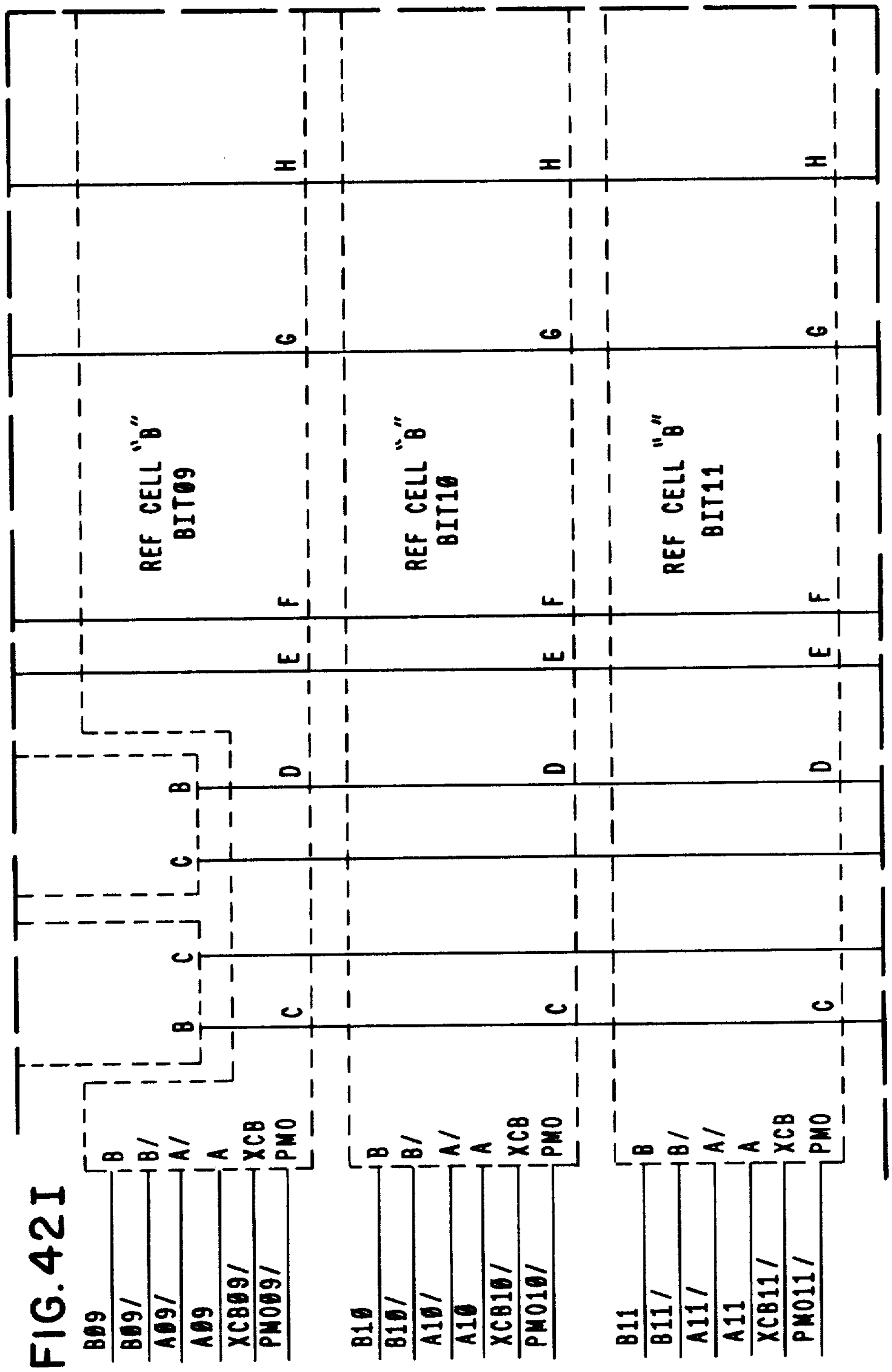
Figure 42J:
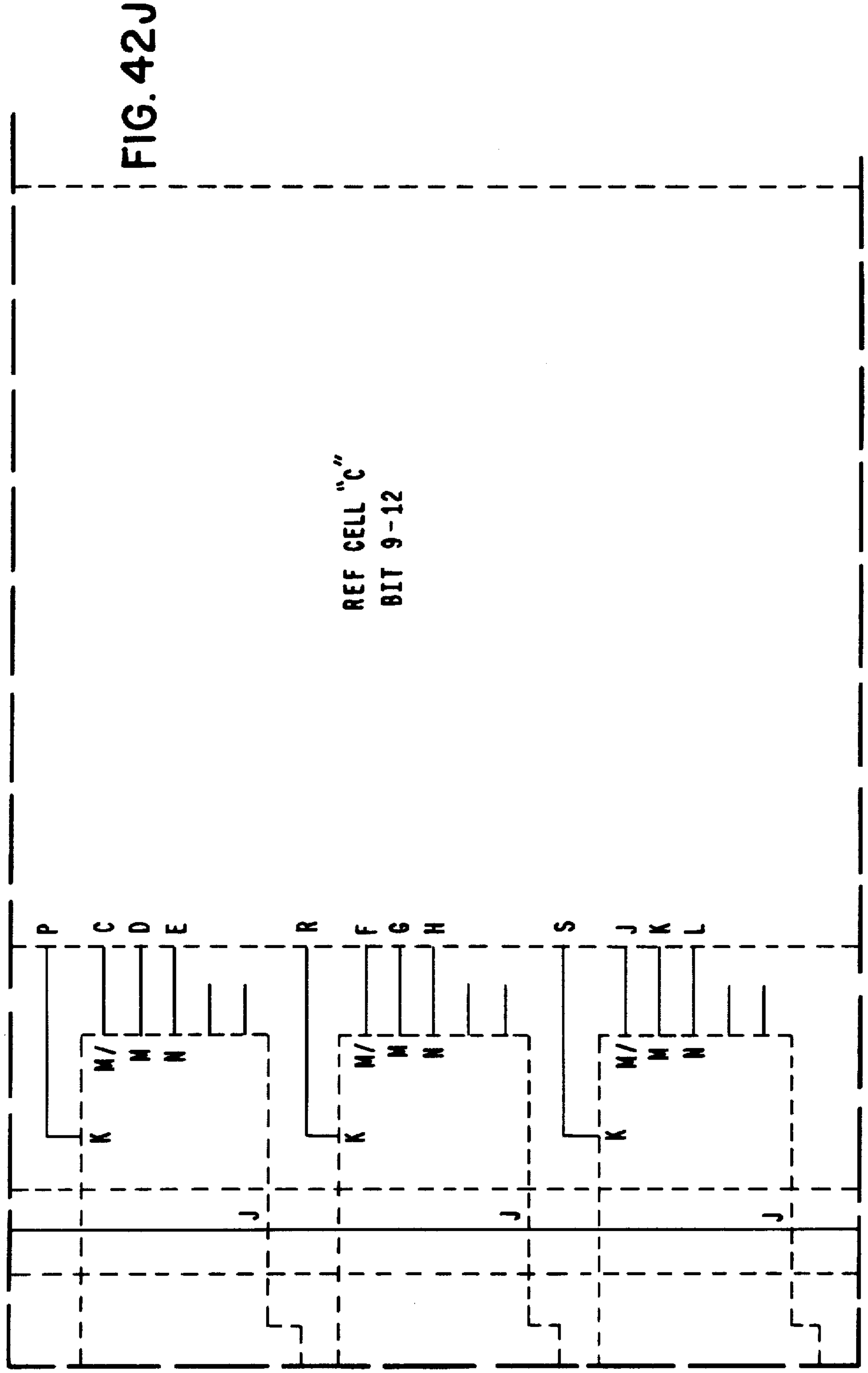
Figure 42K:
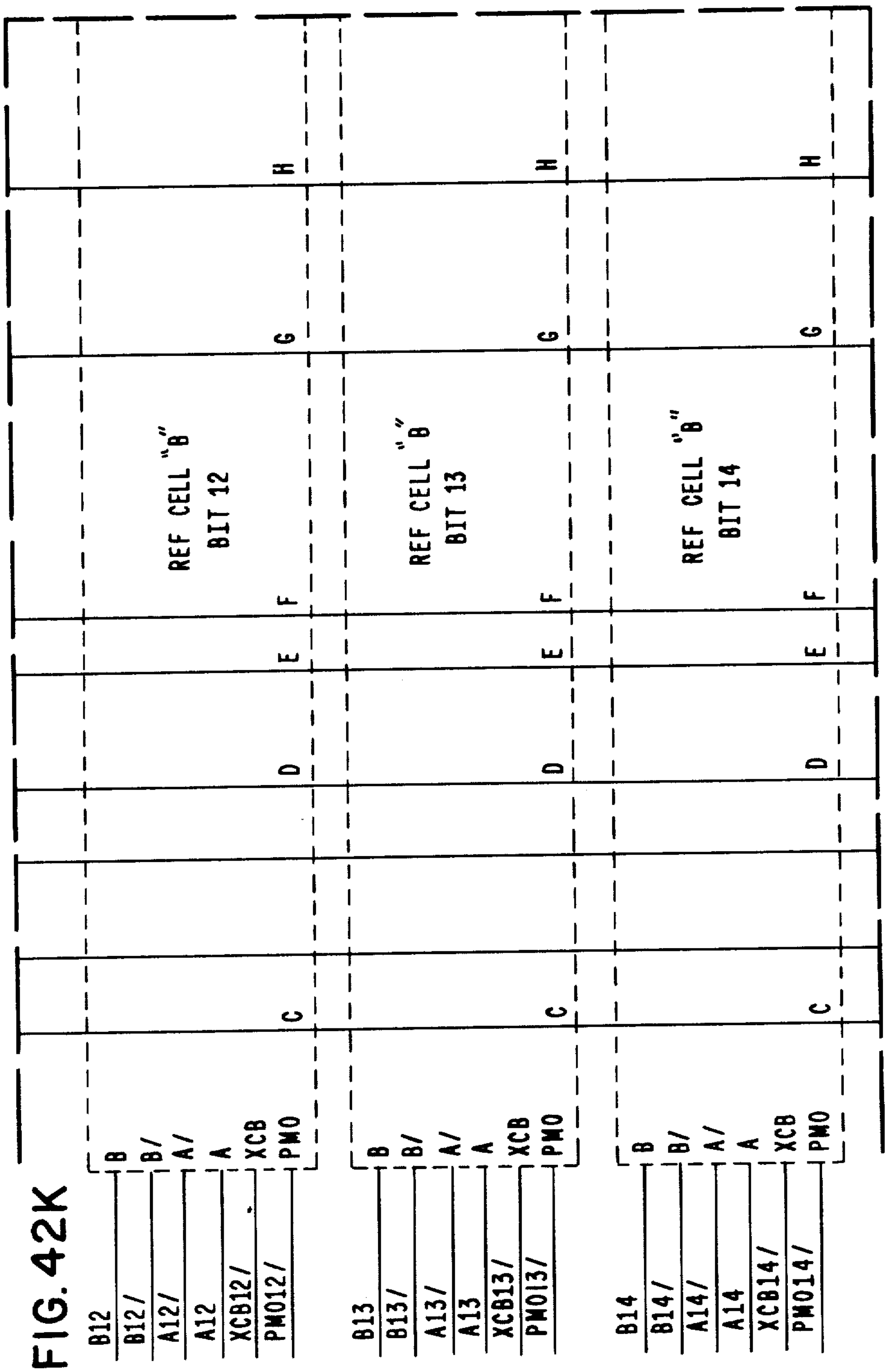
Figure 42L:
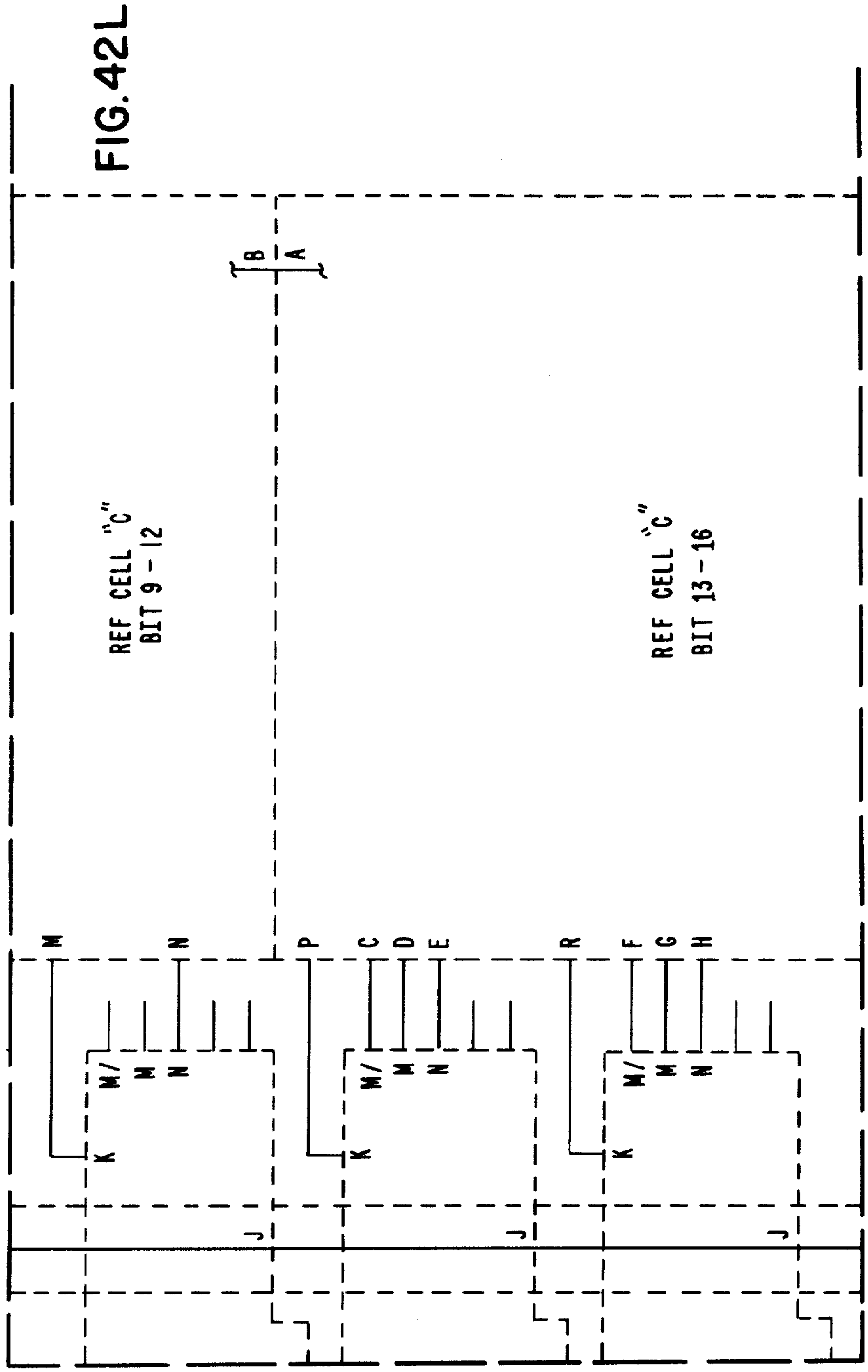
Figure 42M:
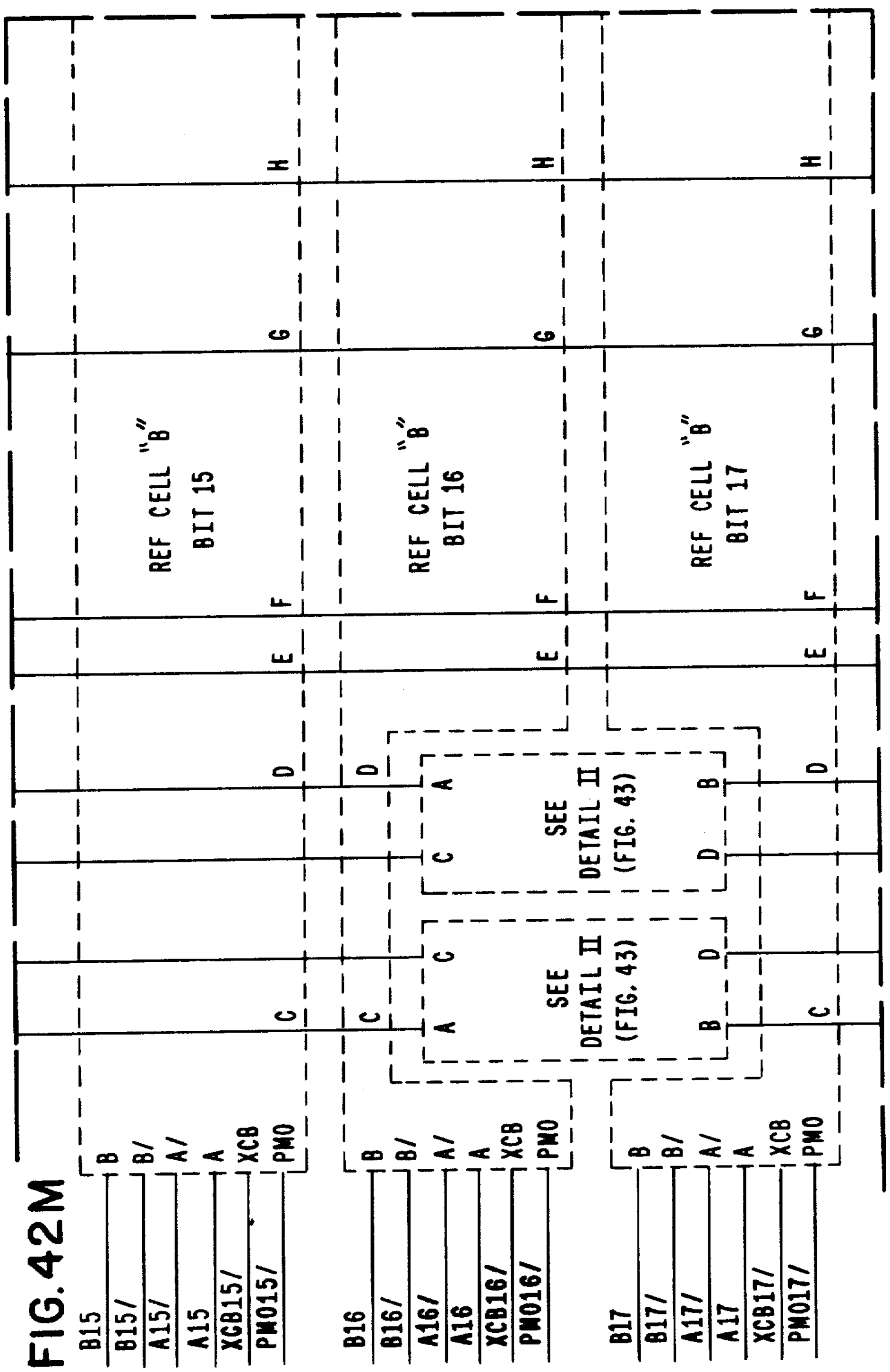
Figure 42N:
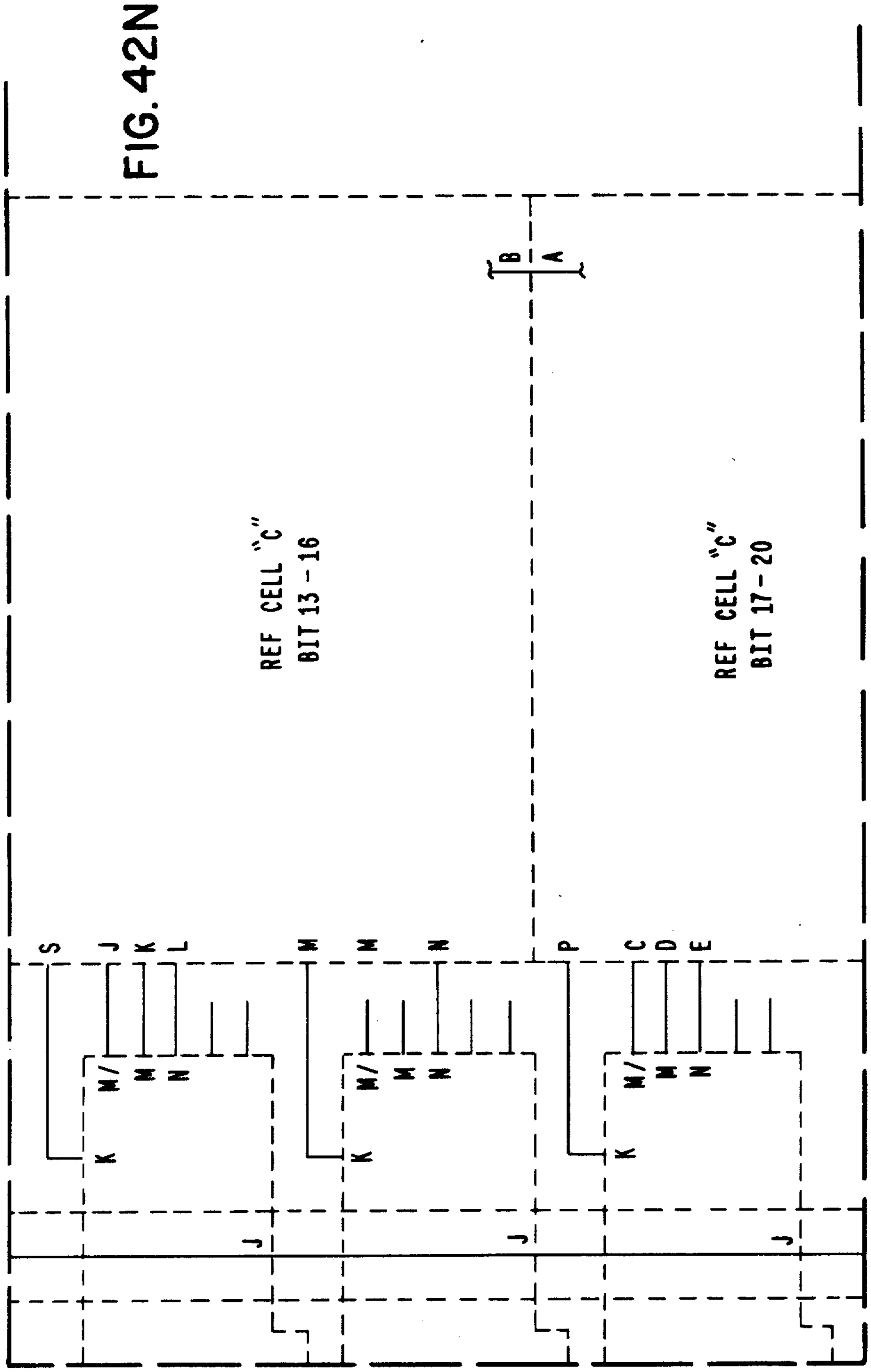
Figure 420:
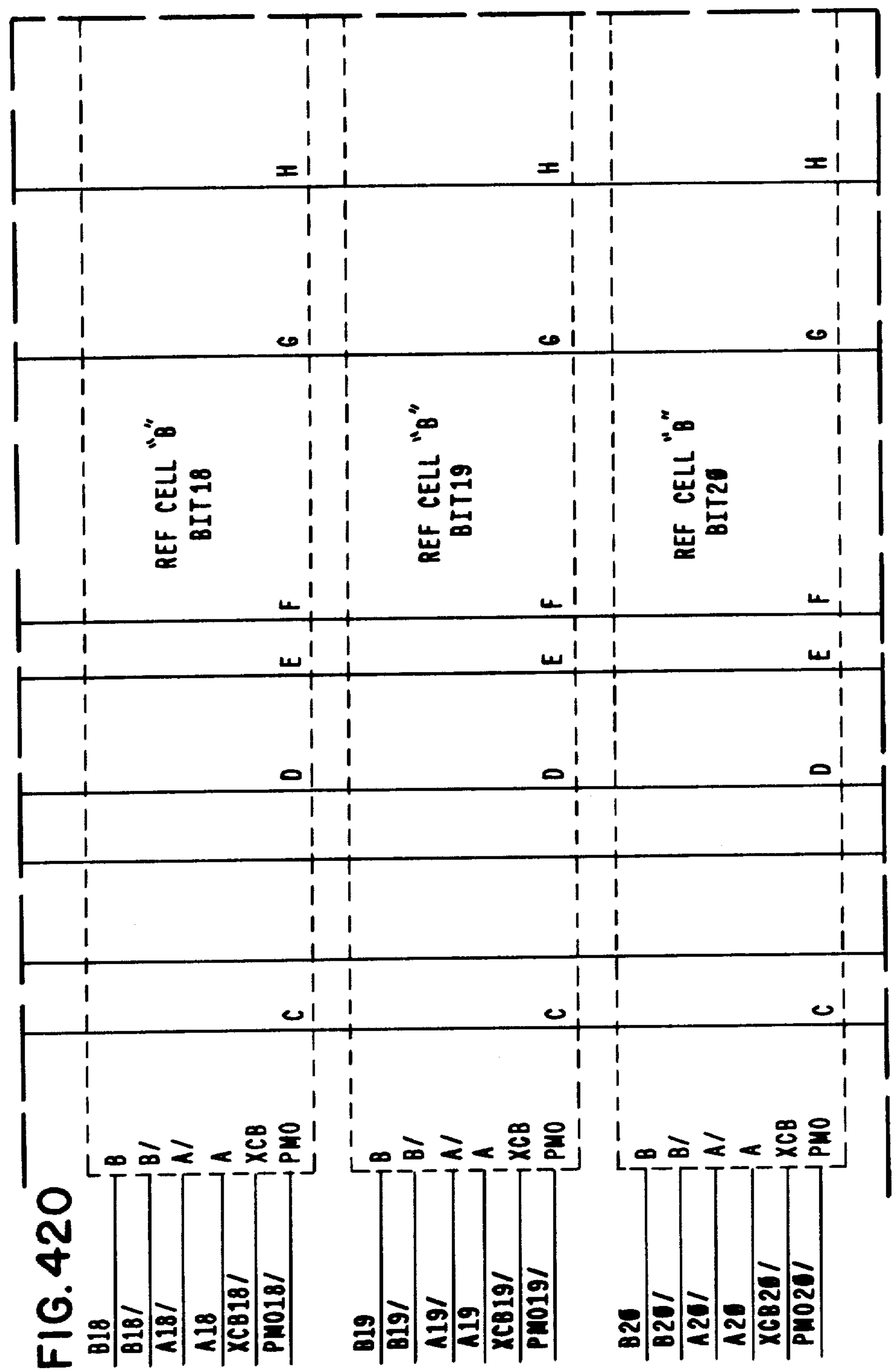
Figure 42P:
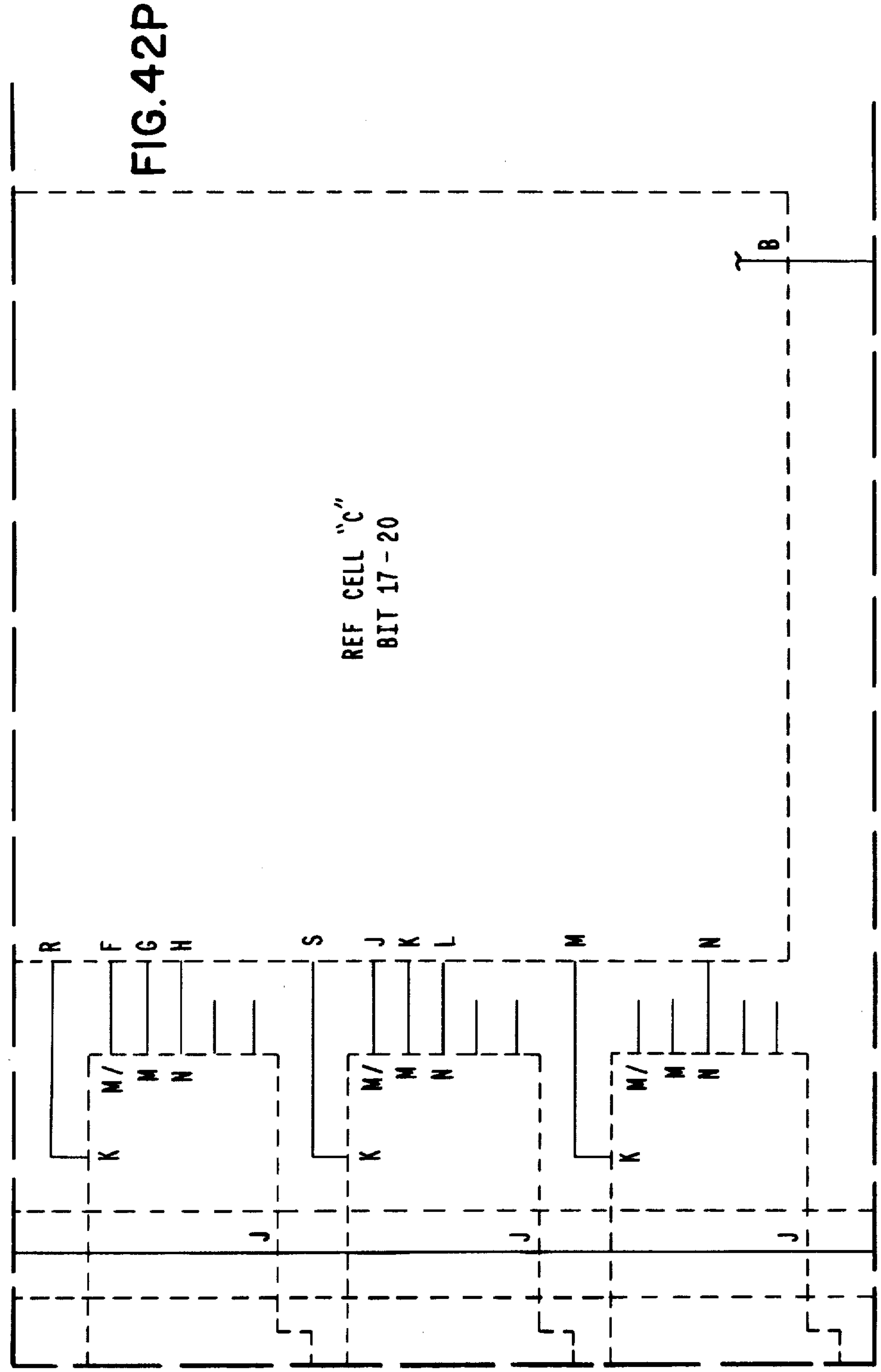
Figure 42Q:
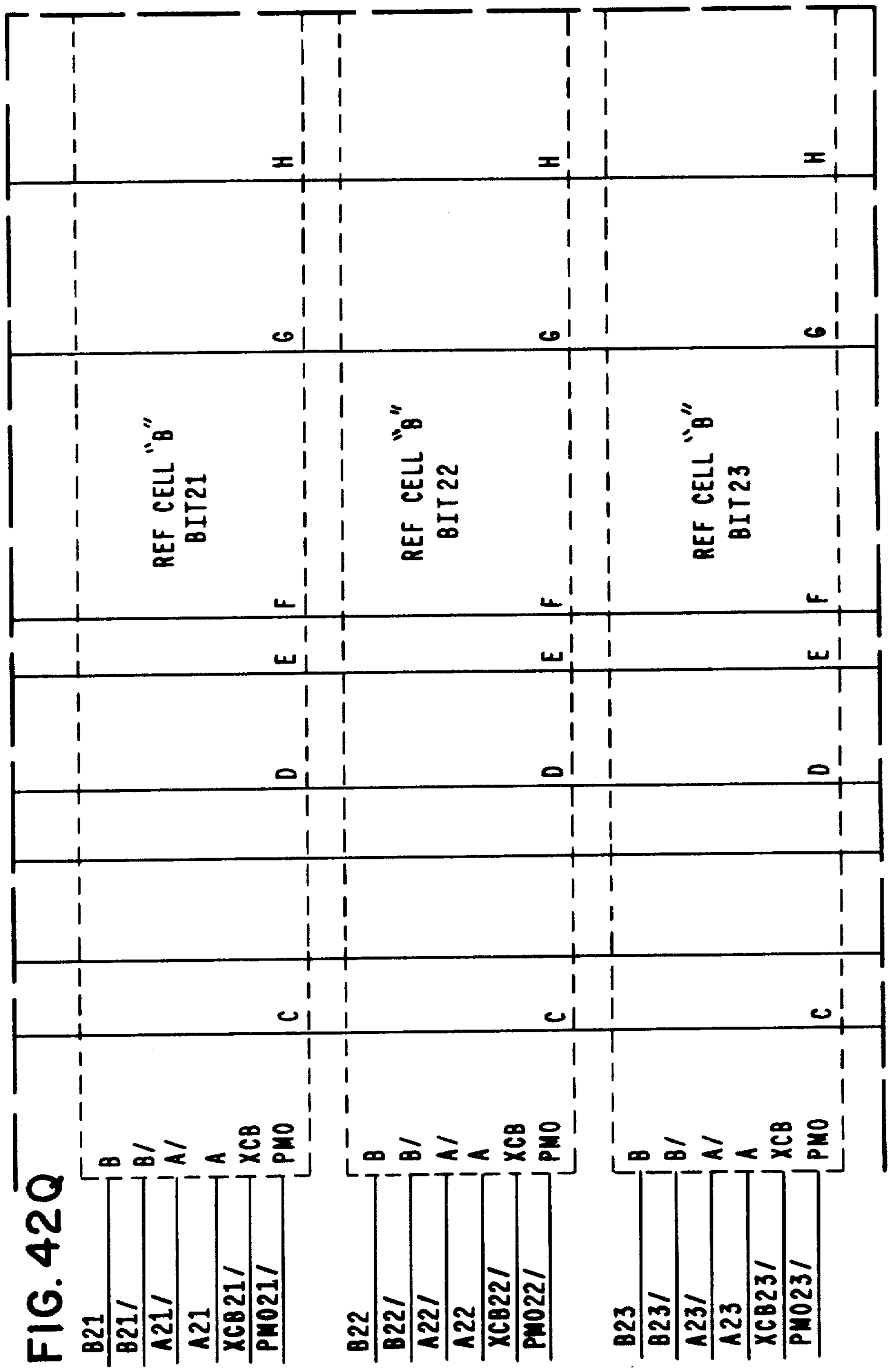
Figure 42R:
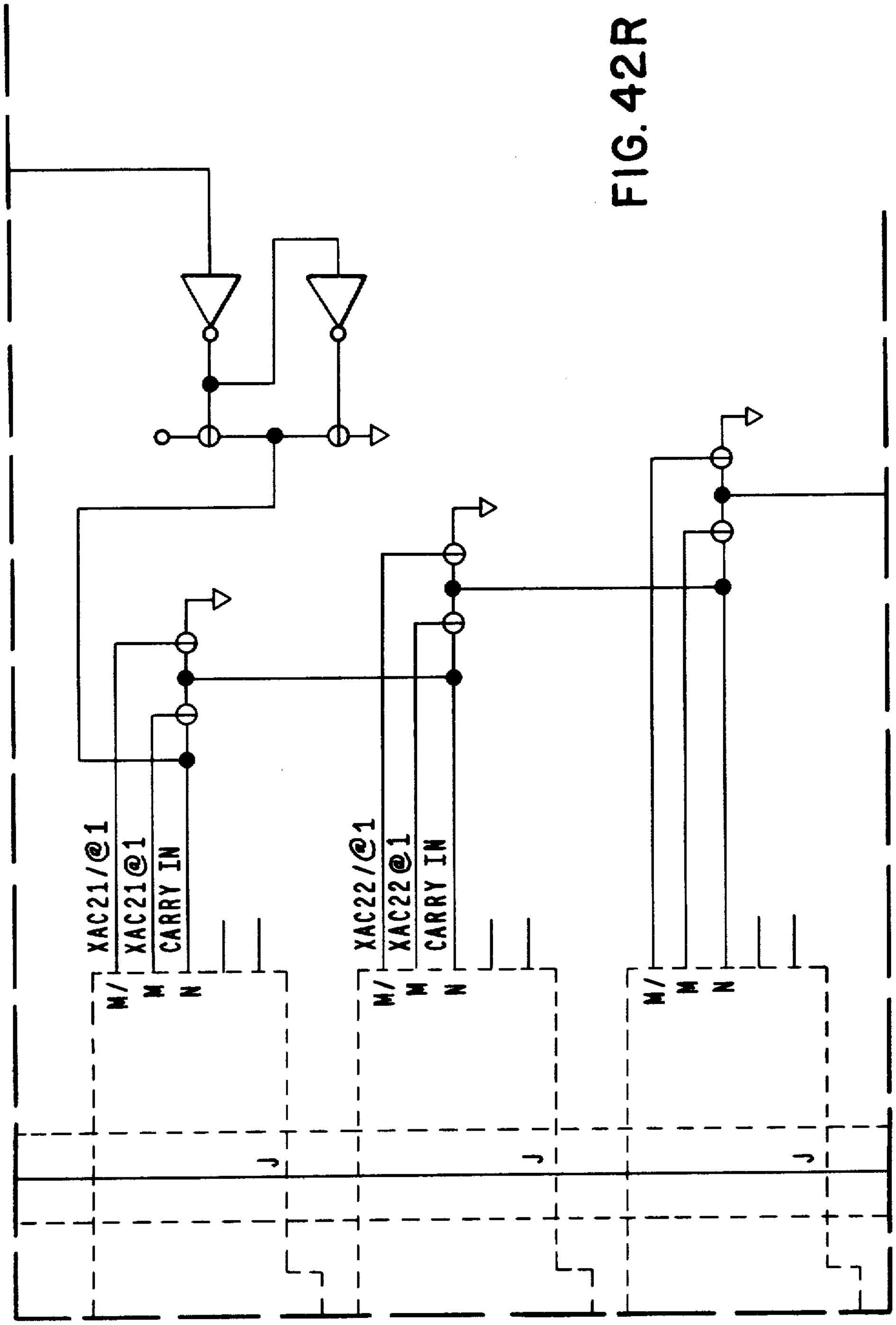
Figure 42S:
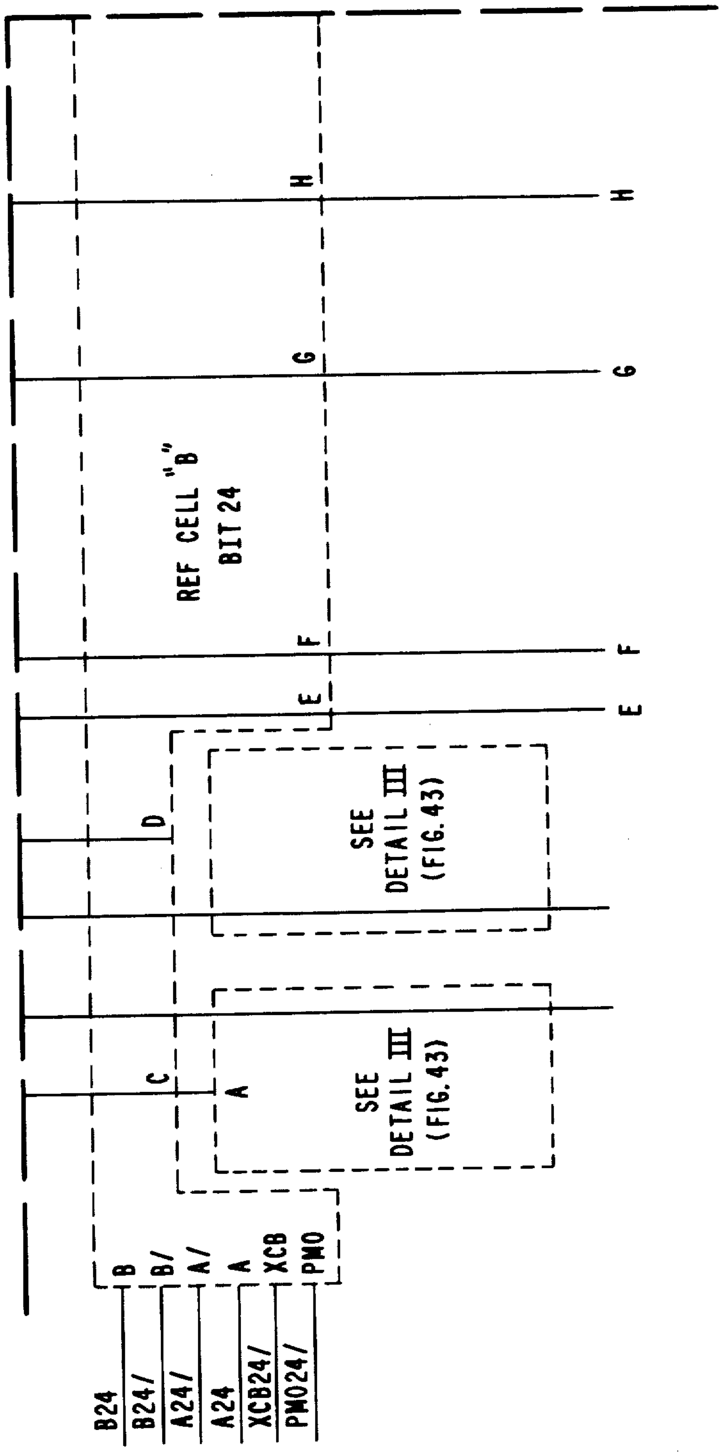
Figure 42T:
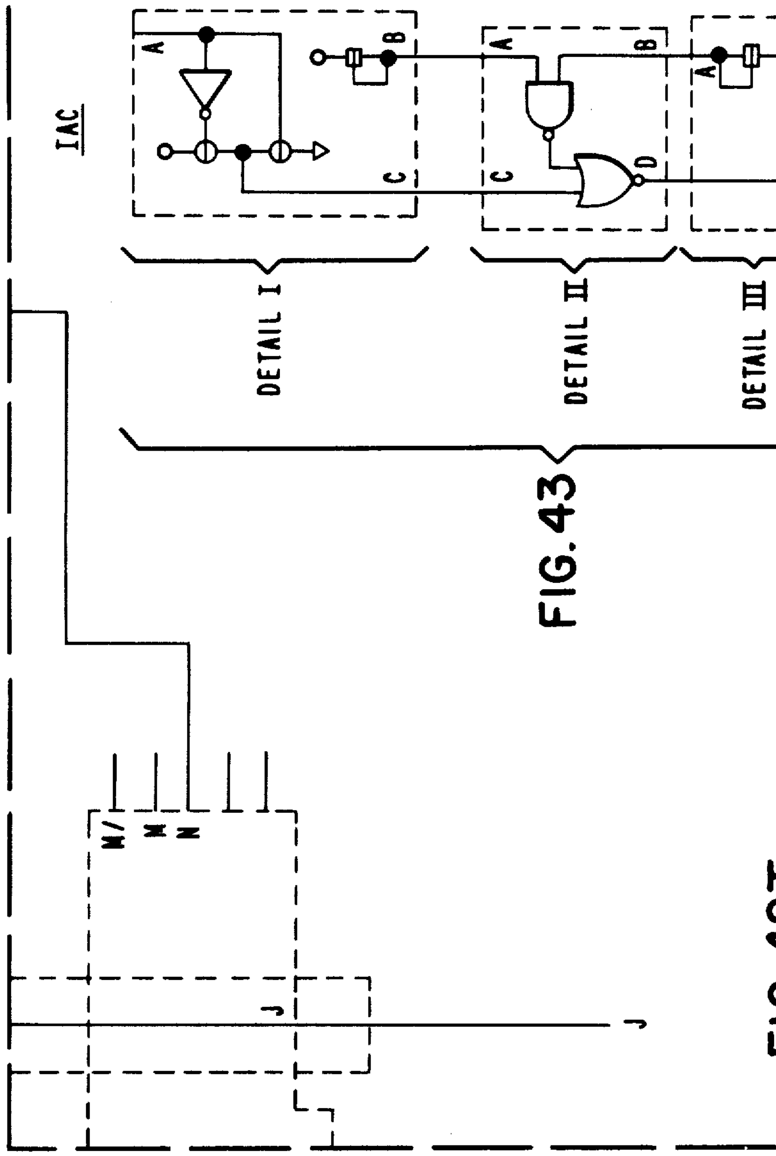
Figure 44:
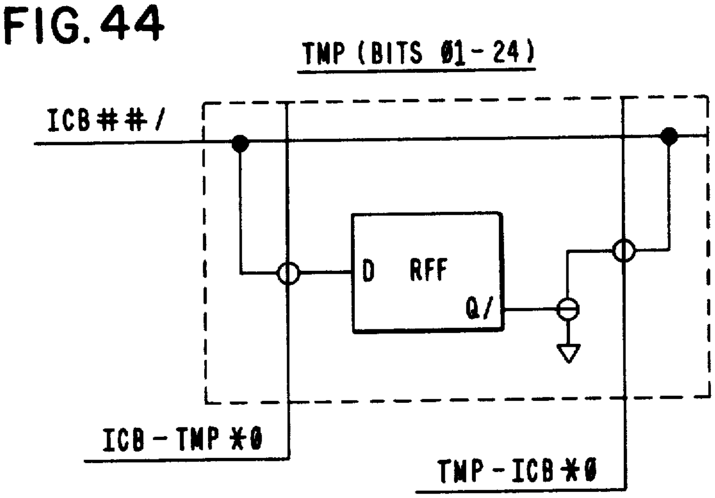
Figure 45:
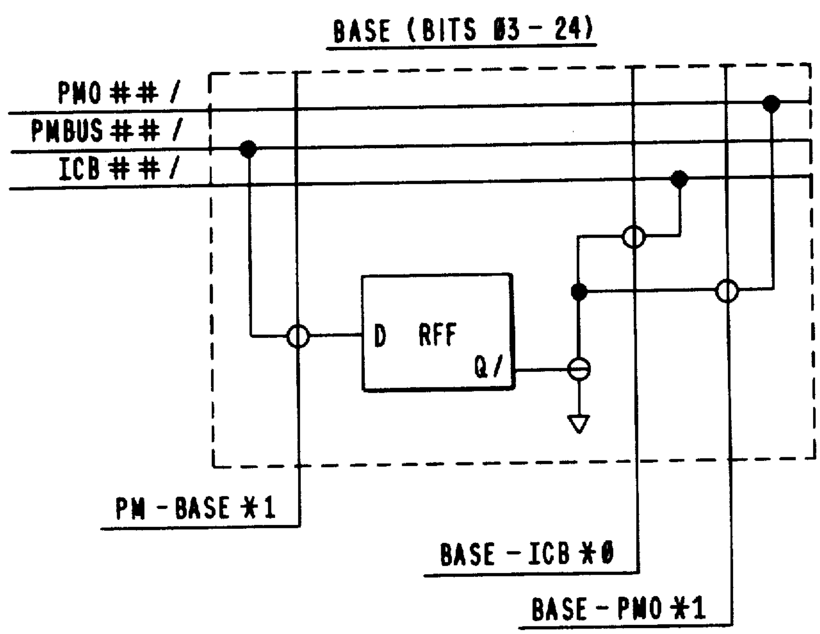
Figure 46:
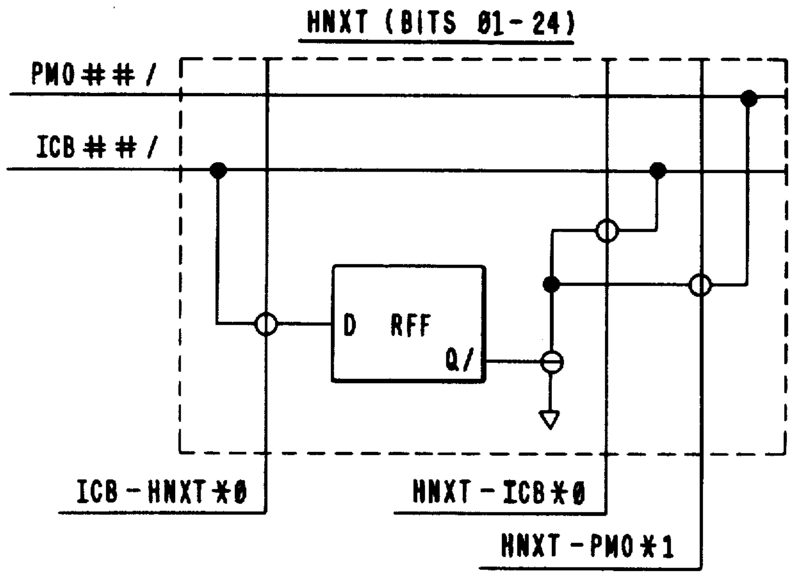
Figure 47:
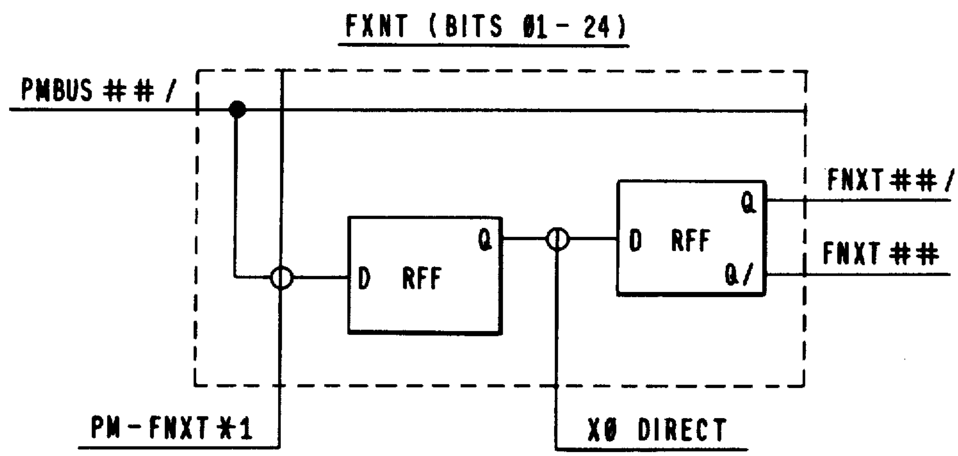
Figure 48:
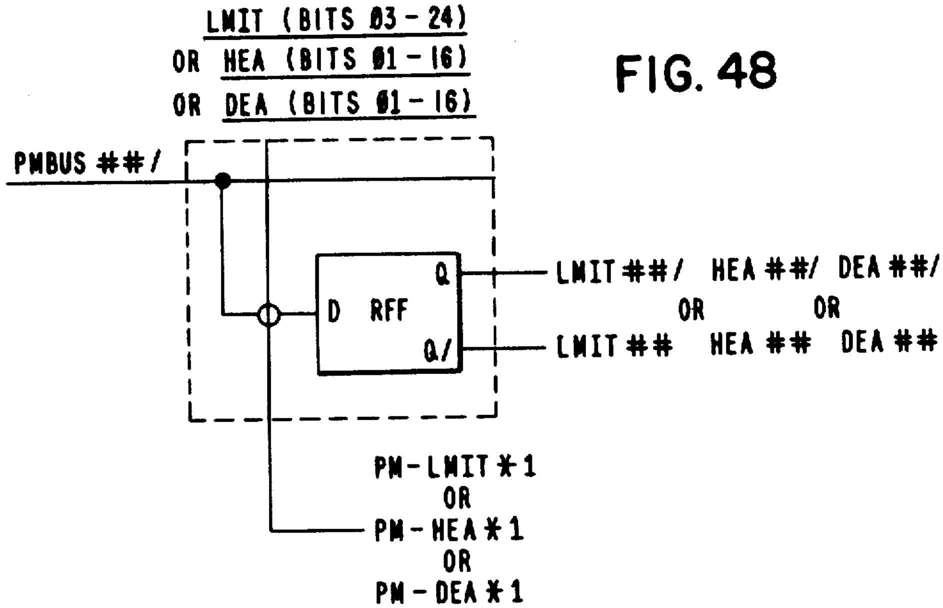
Figure 49:
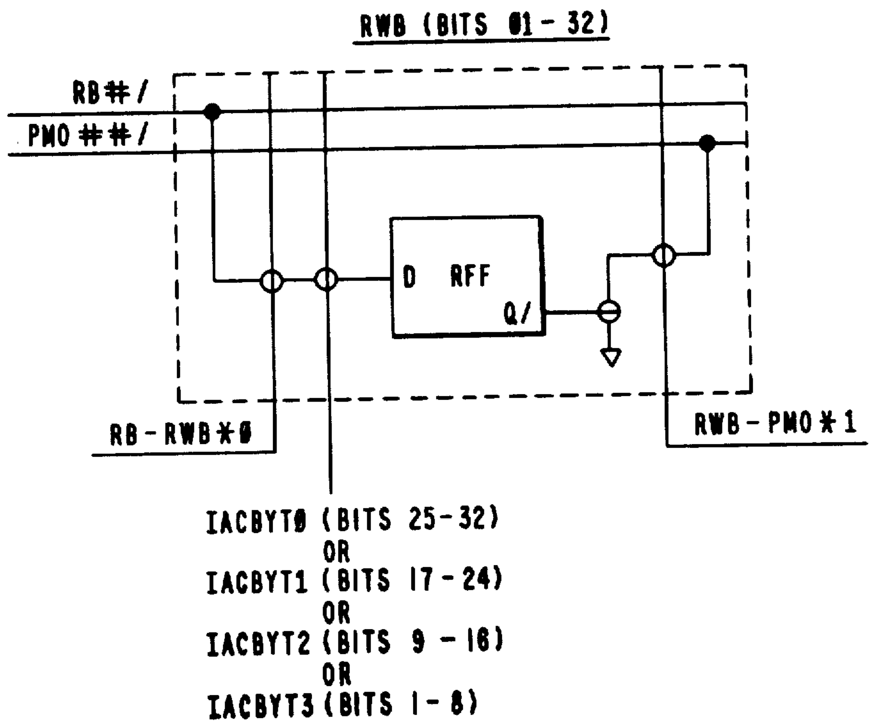
Figure 50:
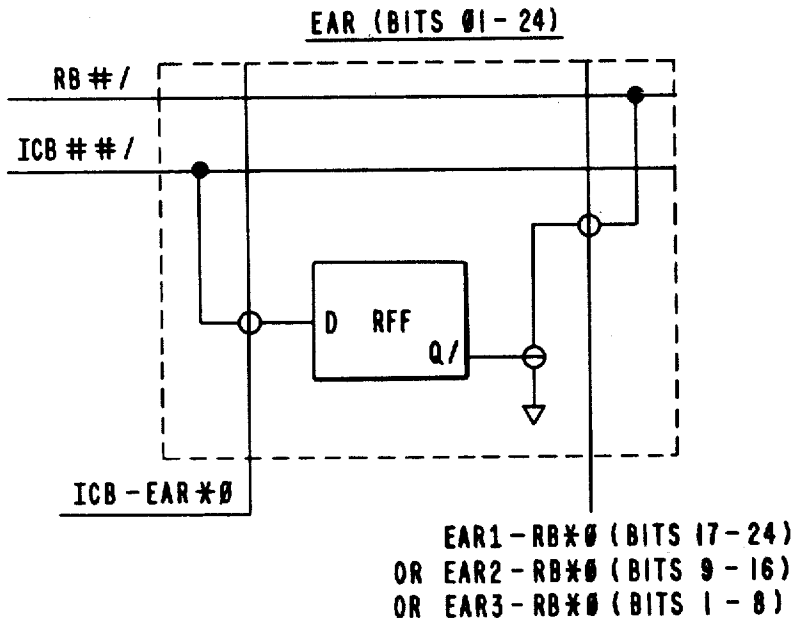
Figure 51:
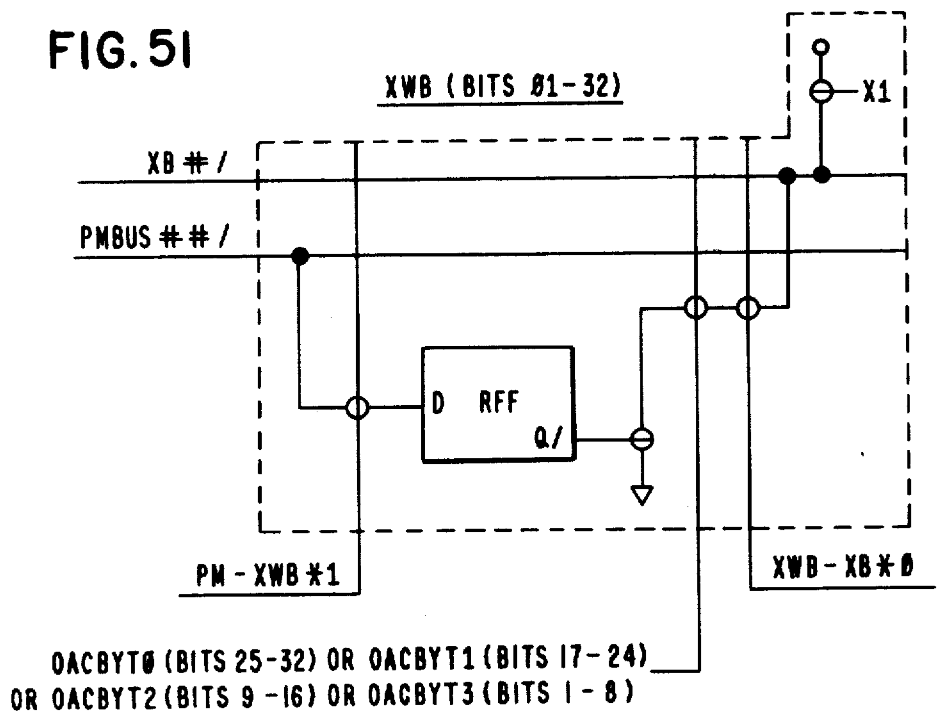
Figure 52:
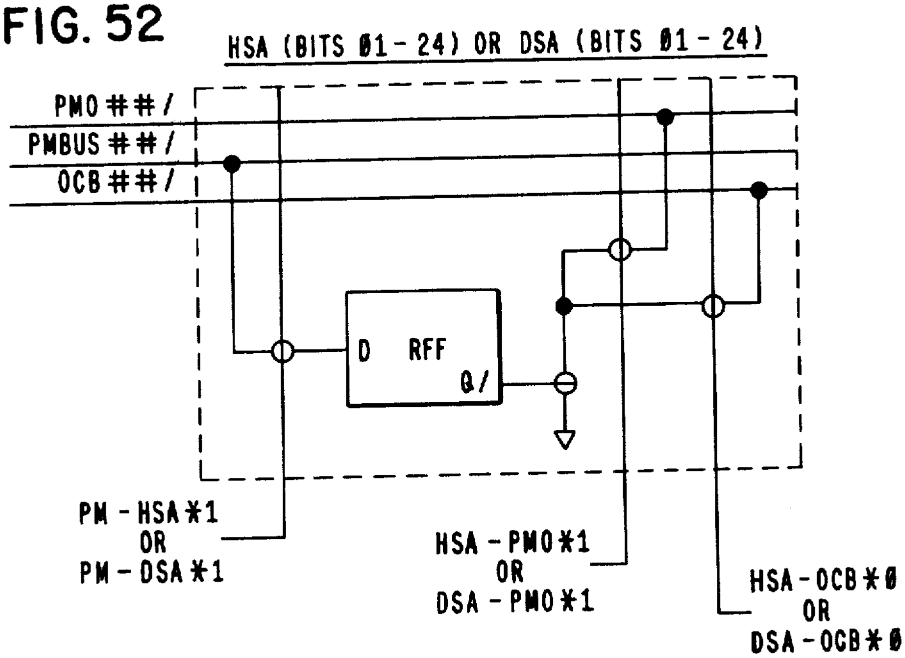
Figure 54:
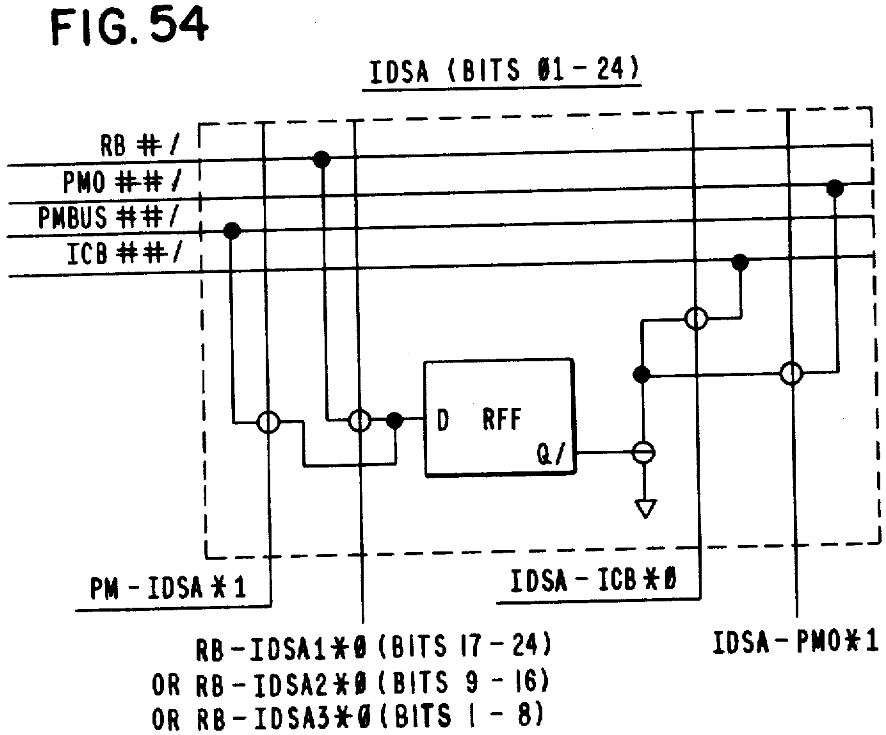
Figure 53:
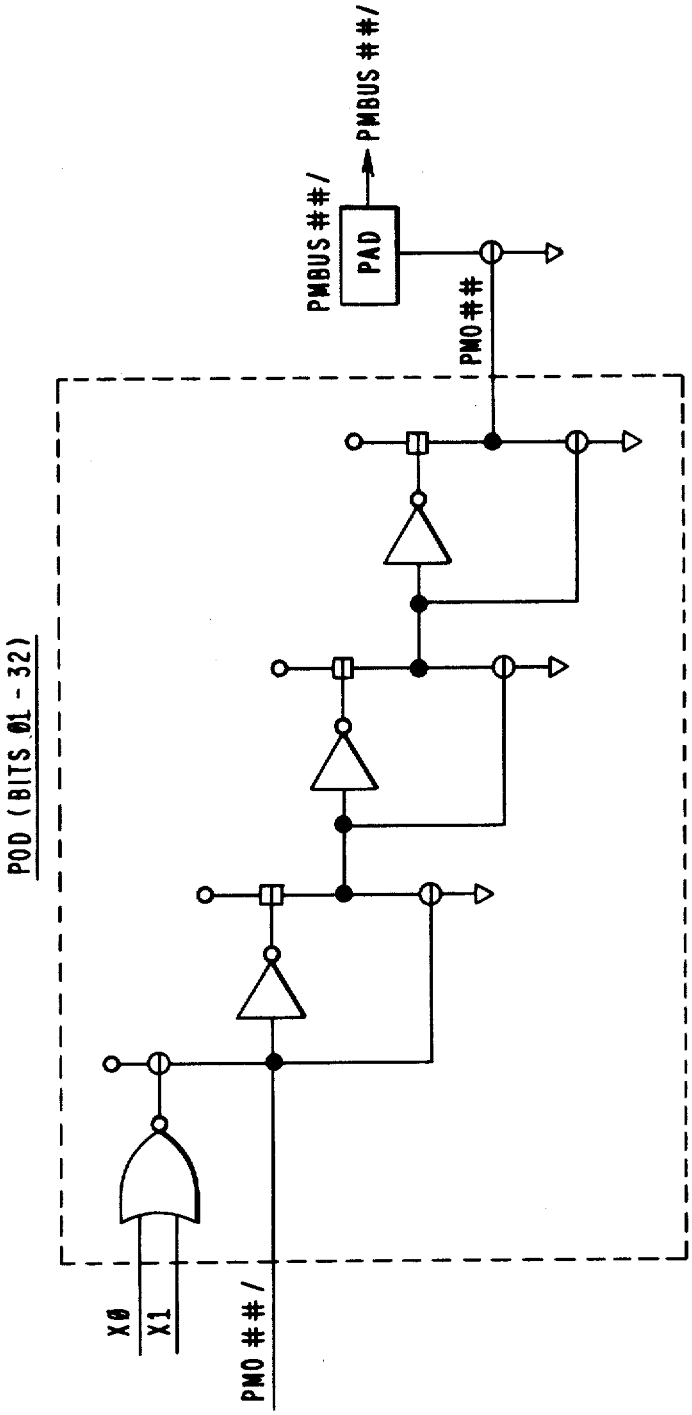
Figure 55:
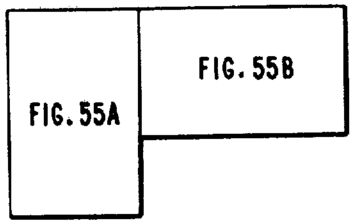
Figure 55A:
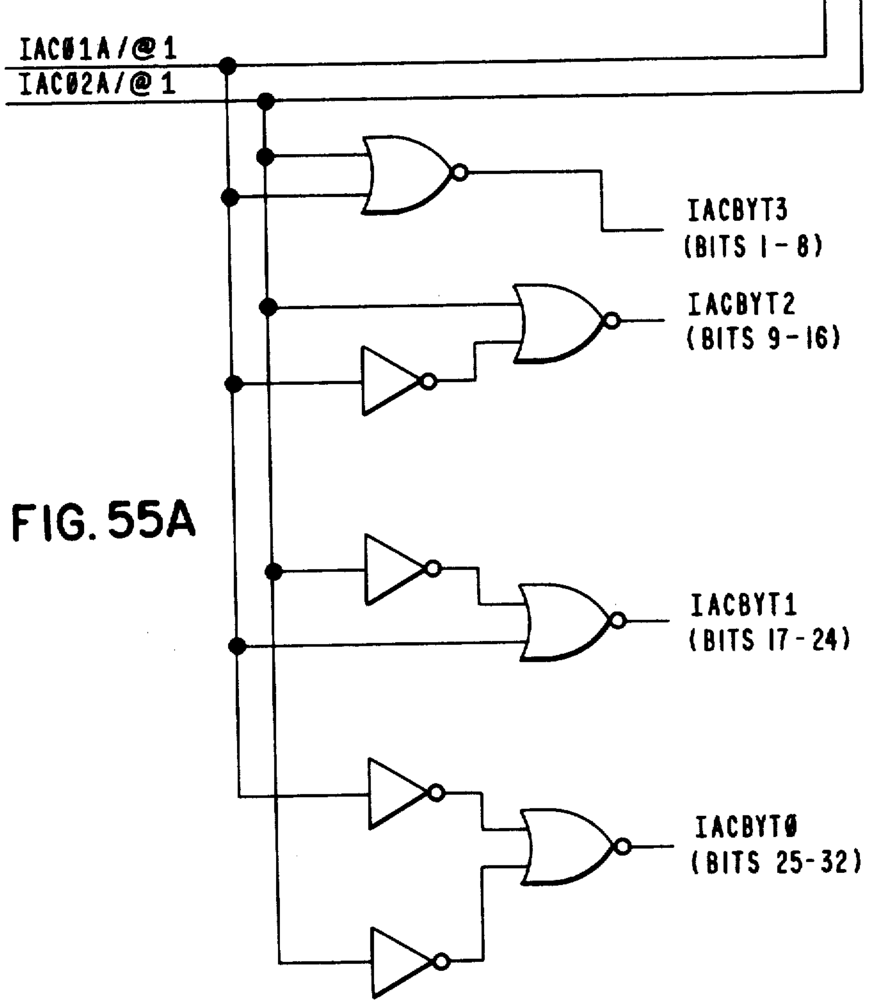
Figure 55B:
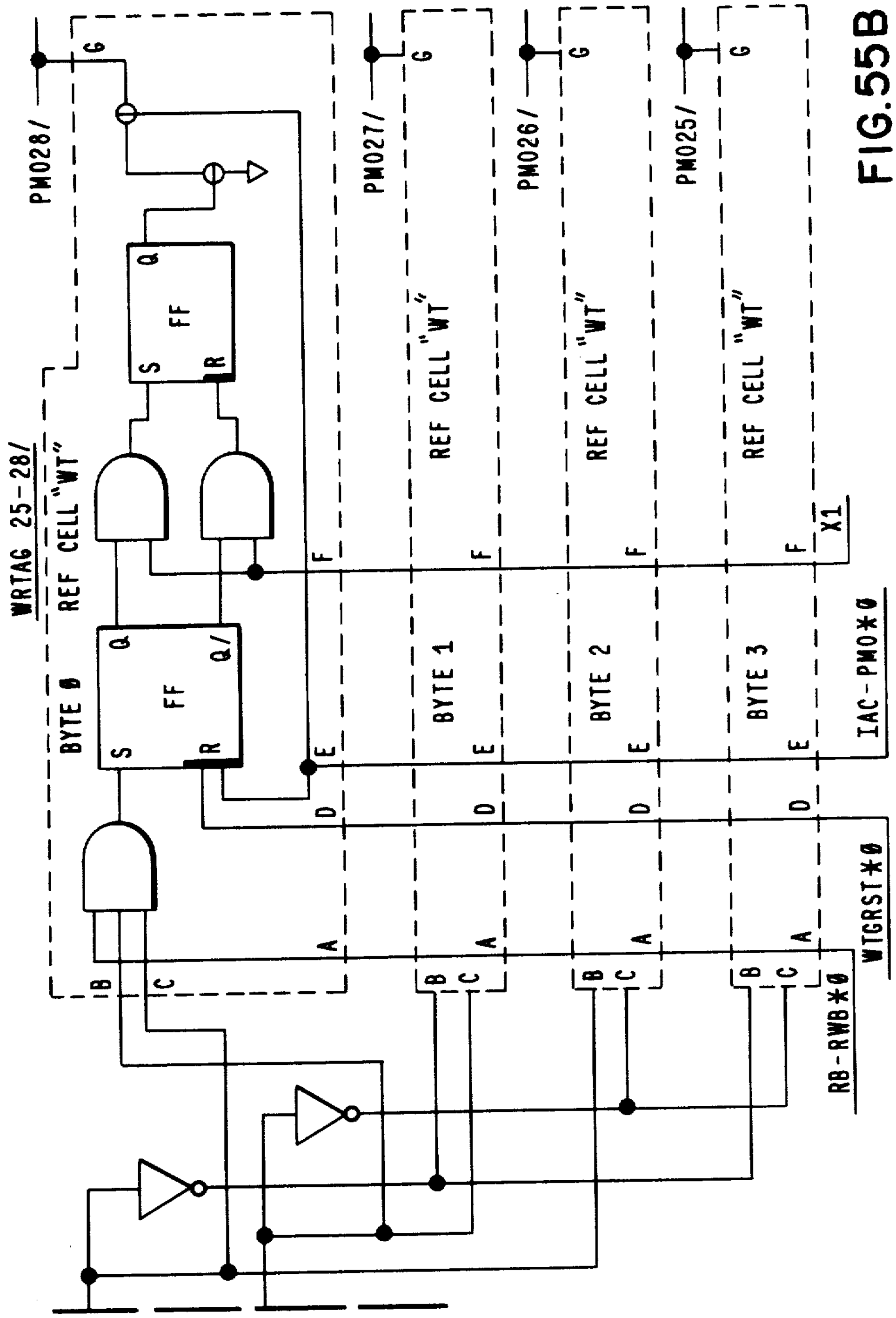
Figure 56:
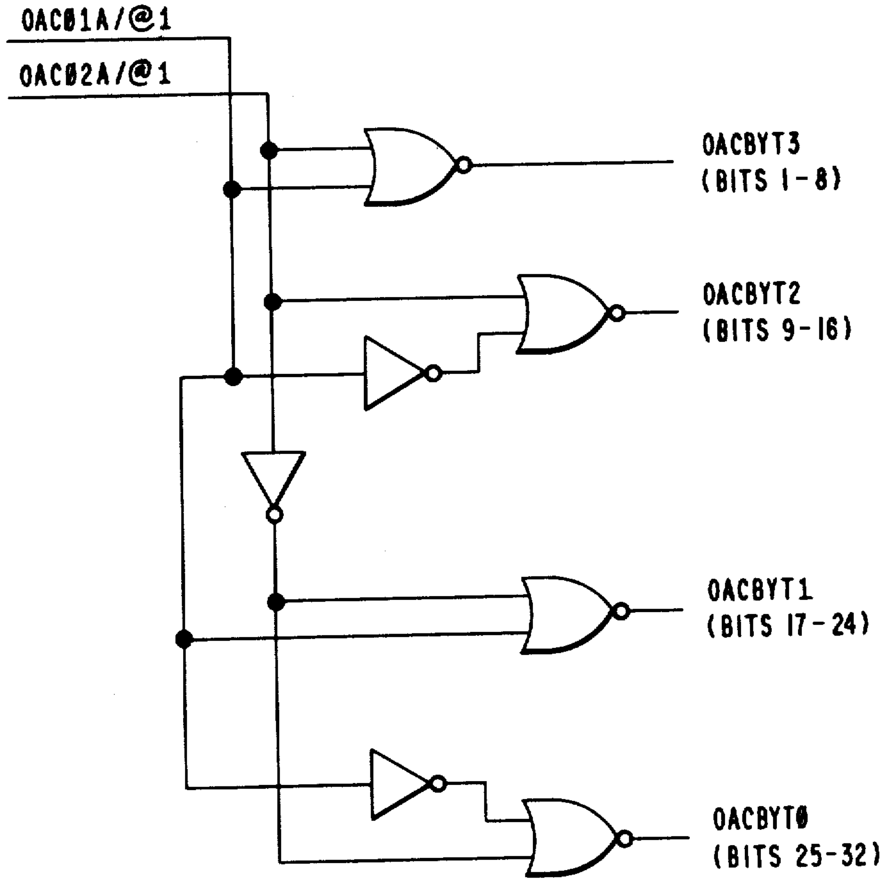
Figure 57A:
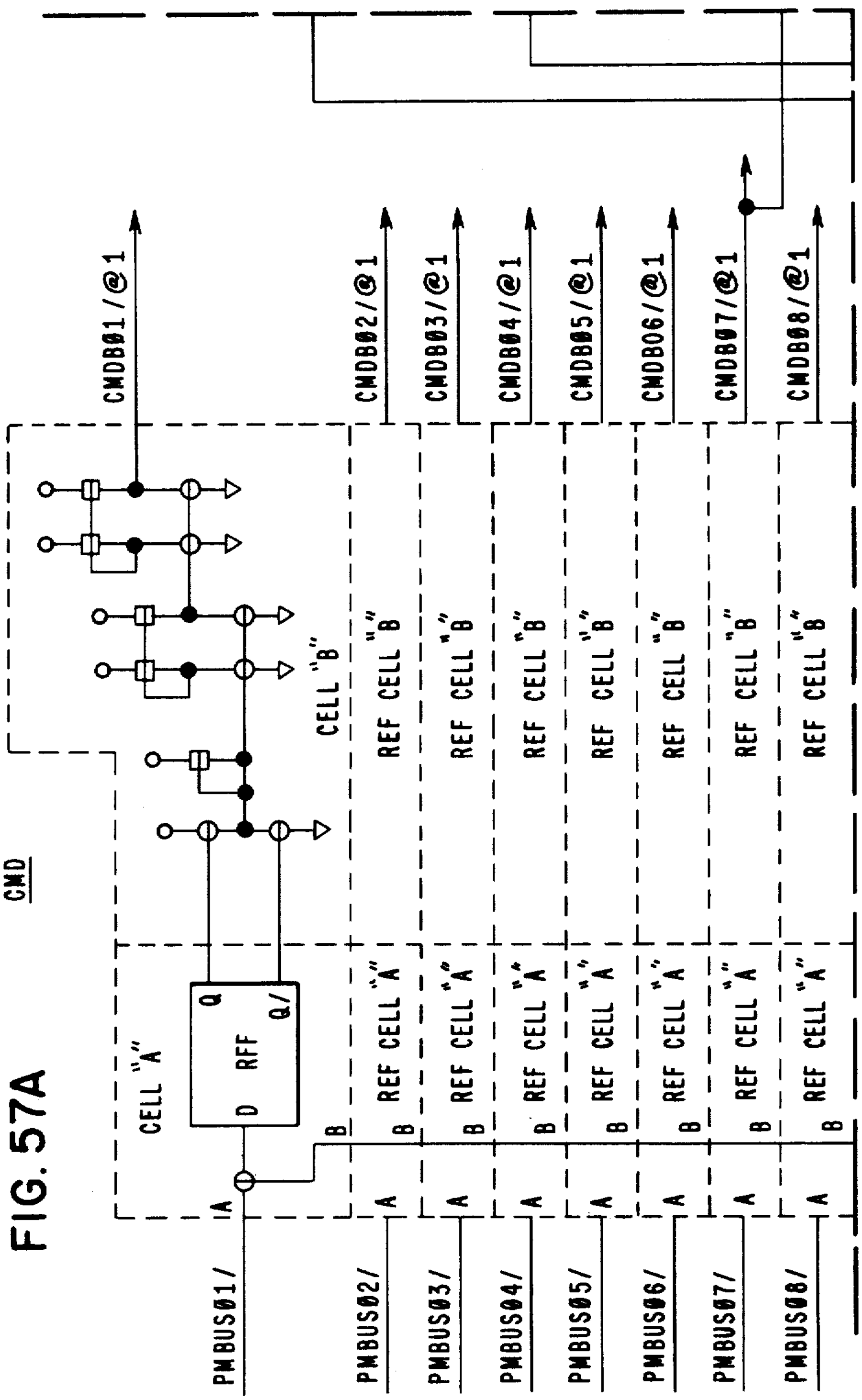
Figure 57B:
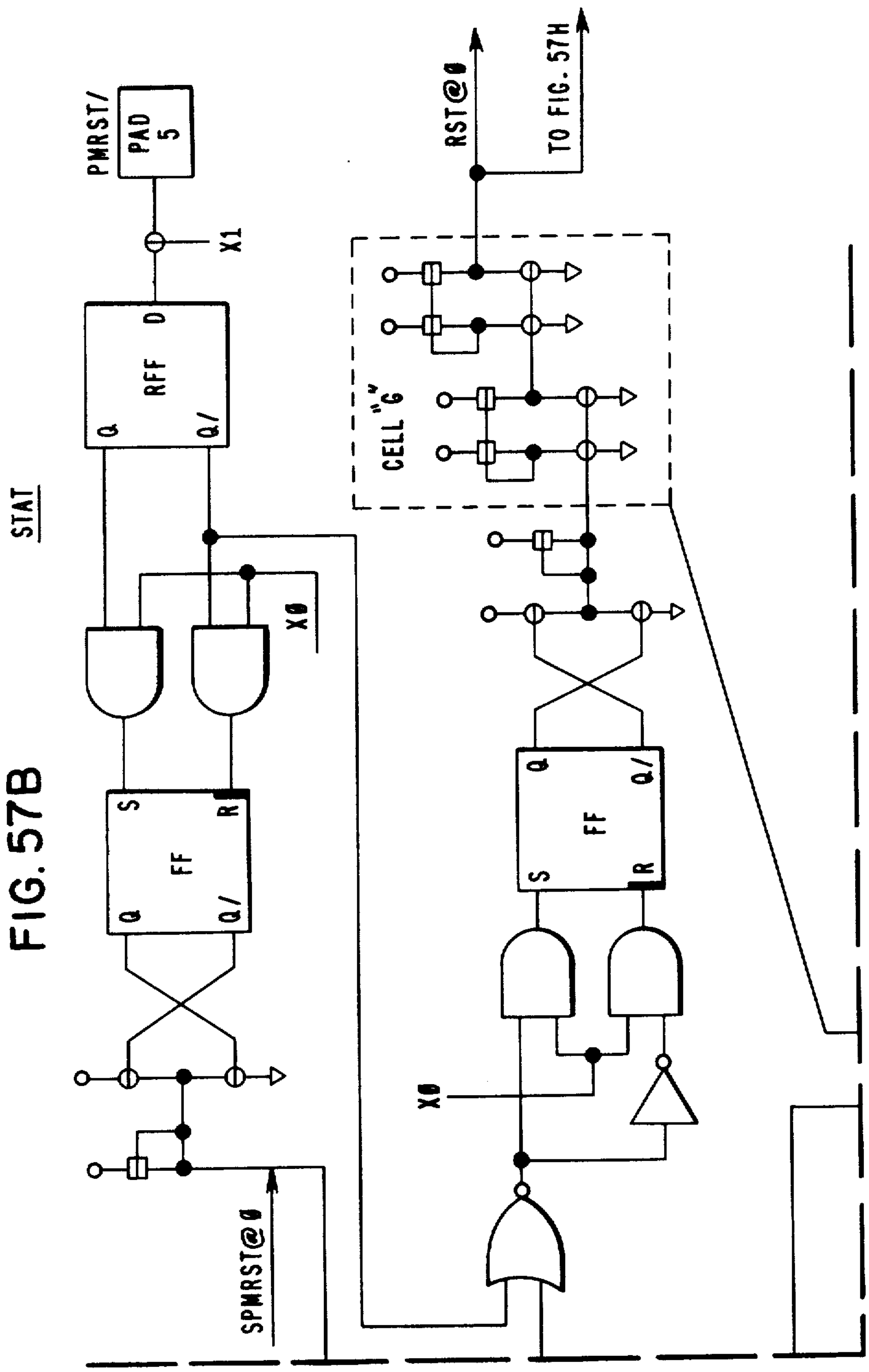
Figure 57C:
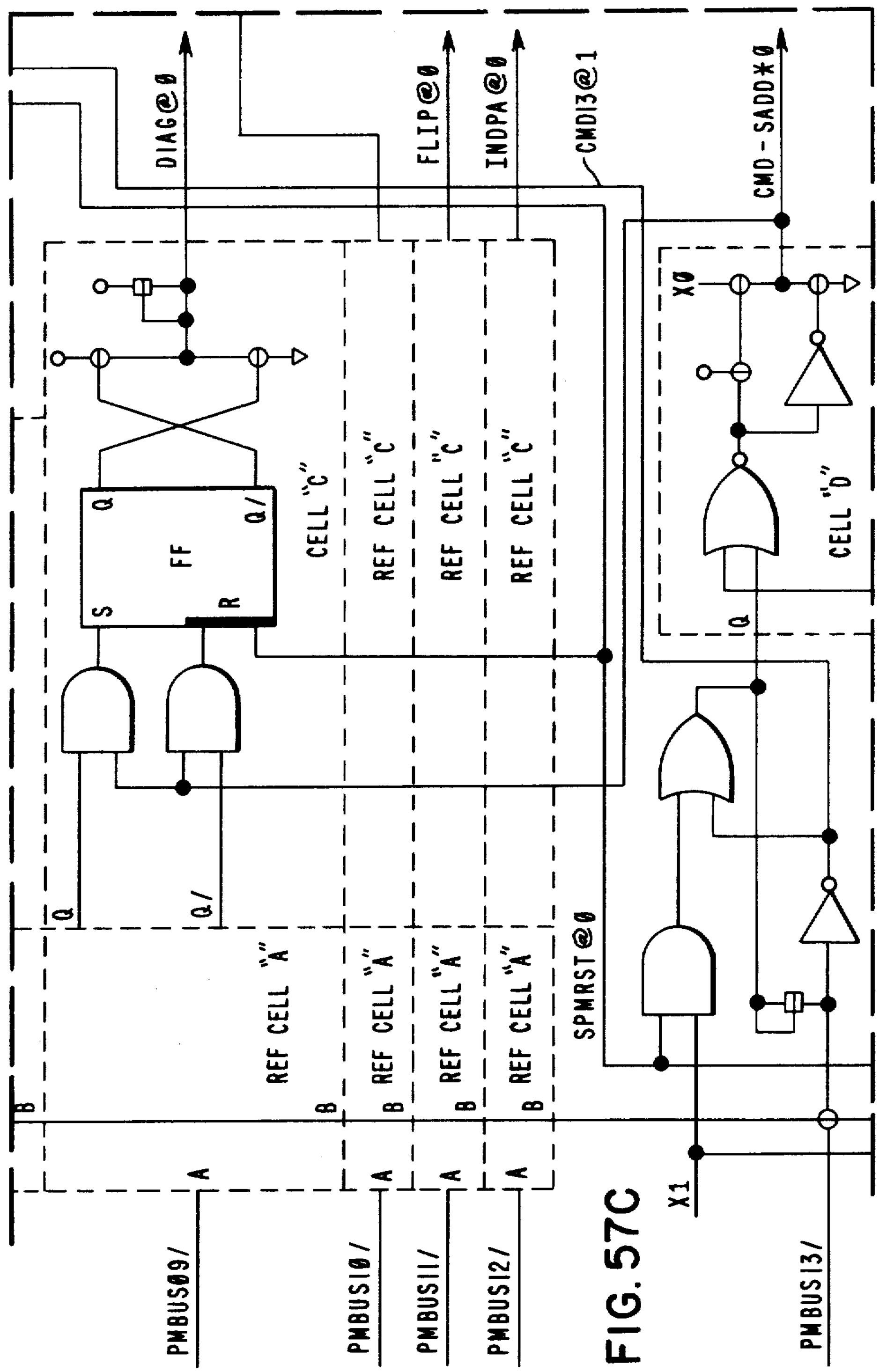
Figure 57D:
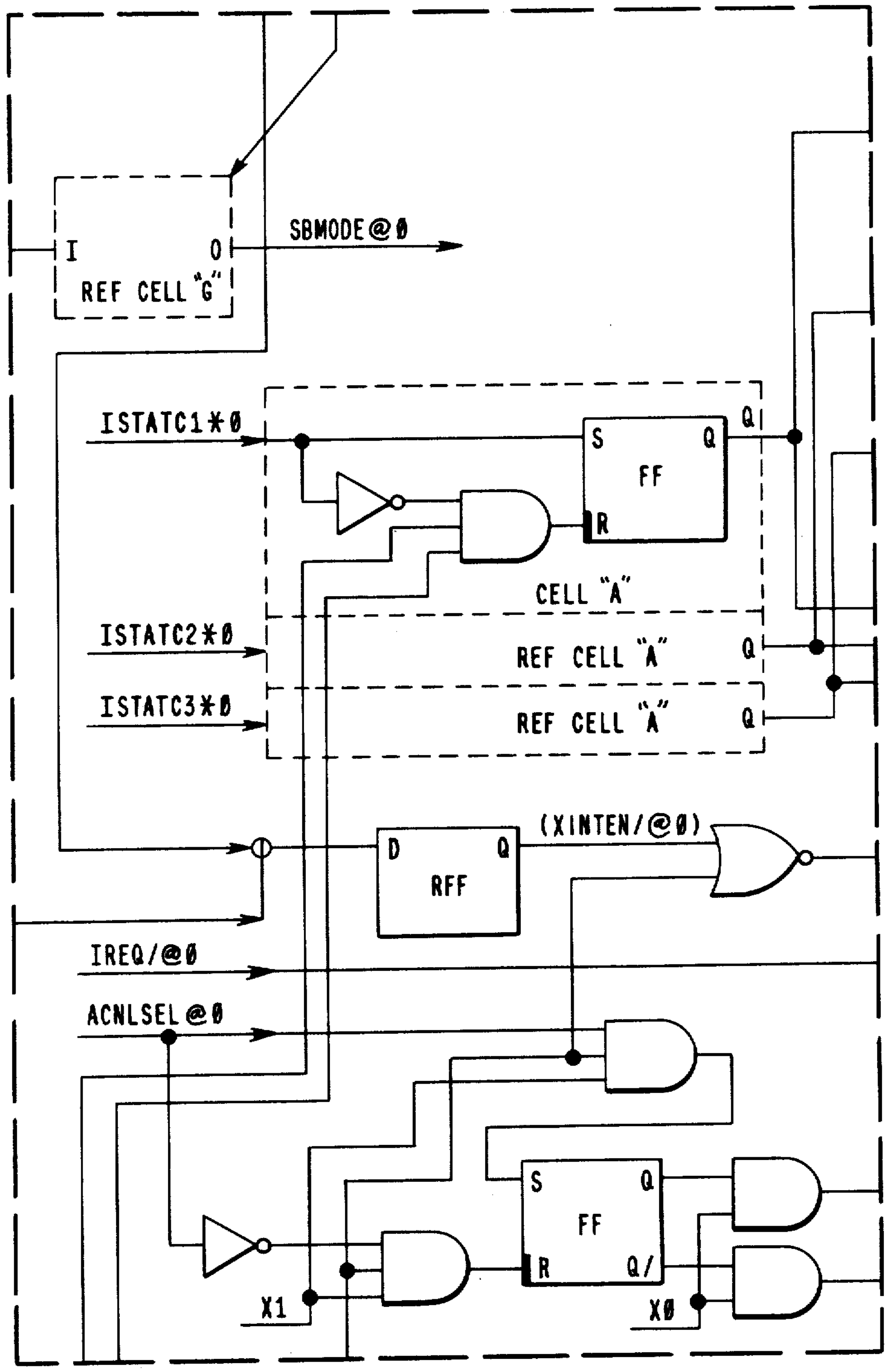
Figure 57E:
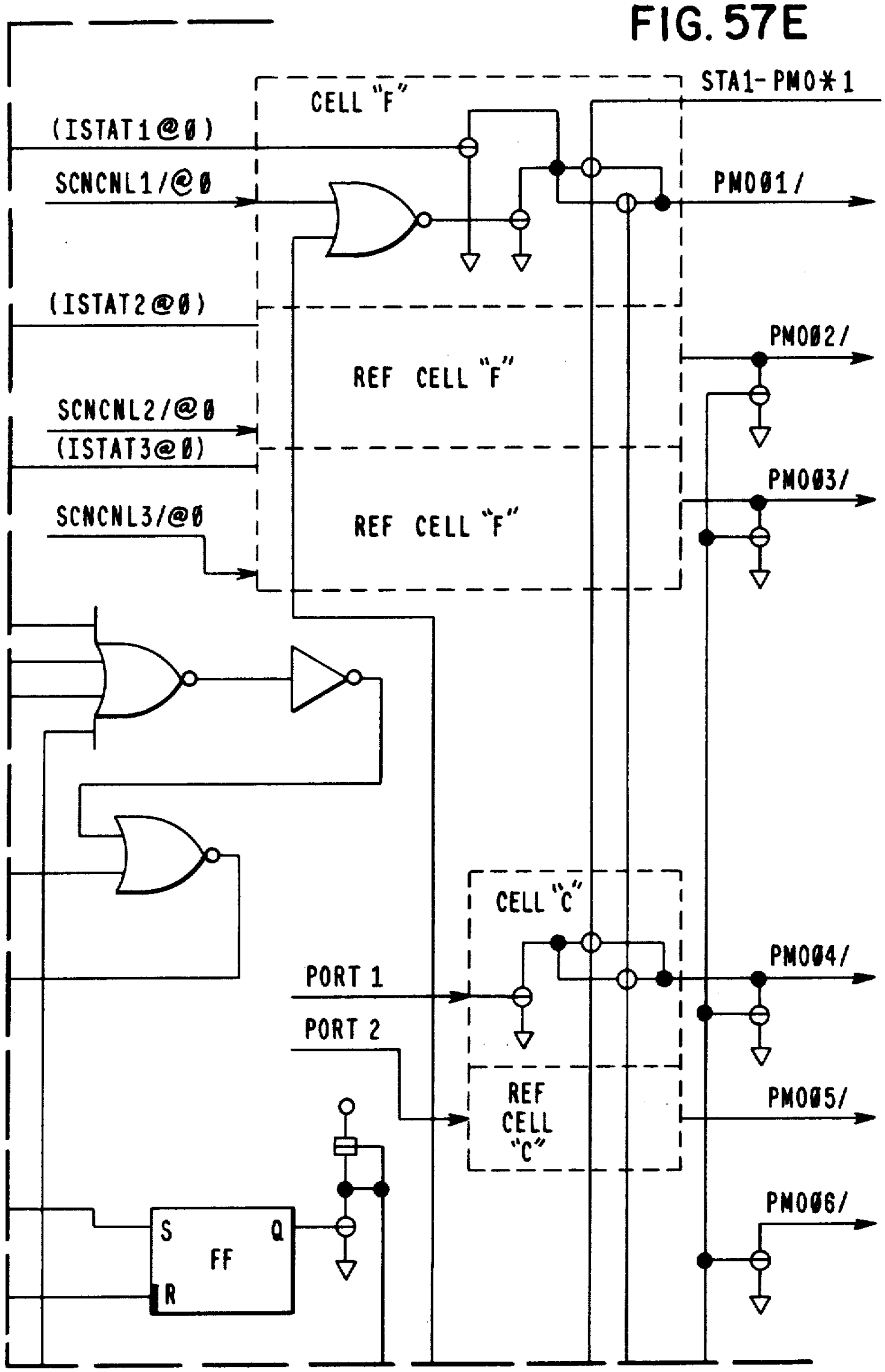
Figure 57F:
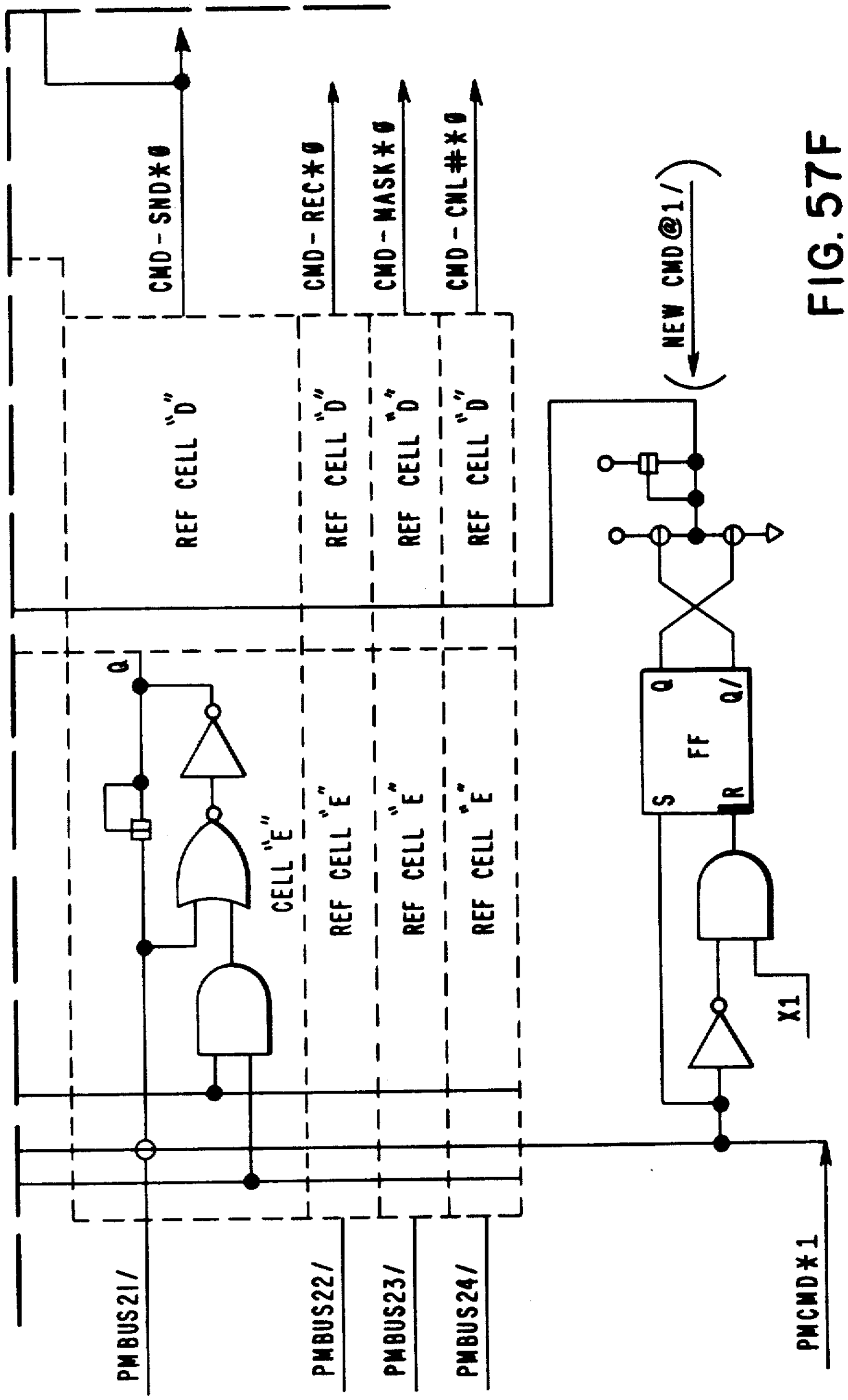
Figure 57G:
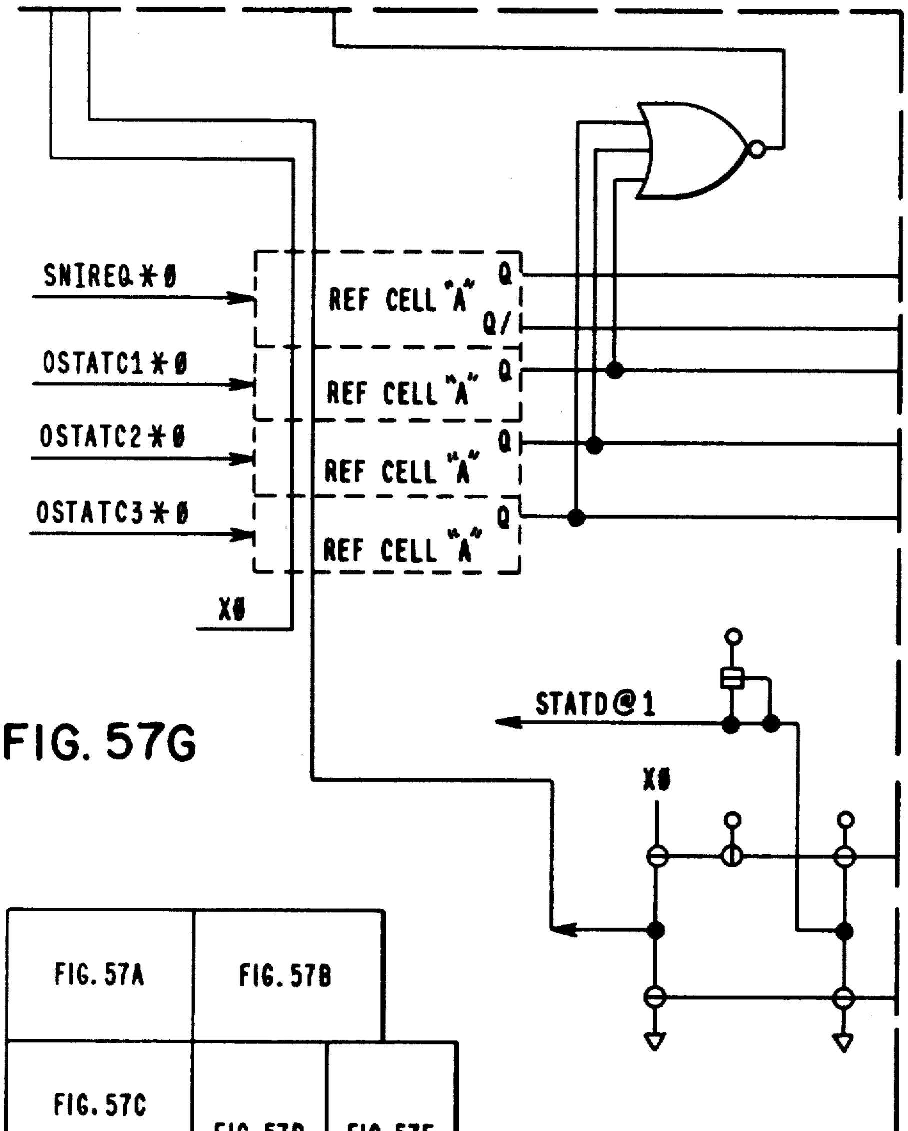
Figure 57:
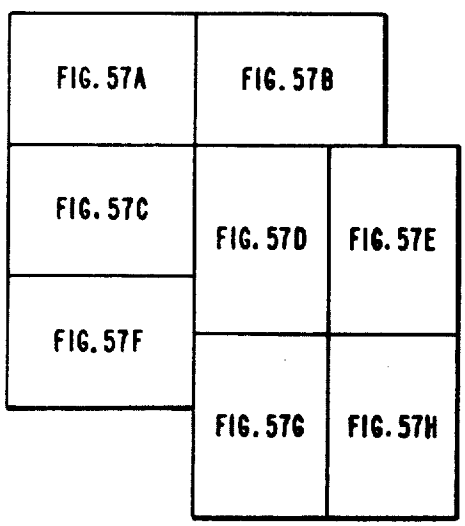
Figure 57H:
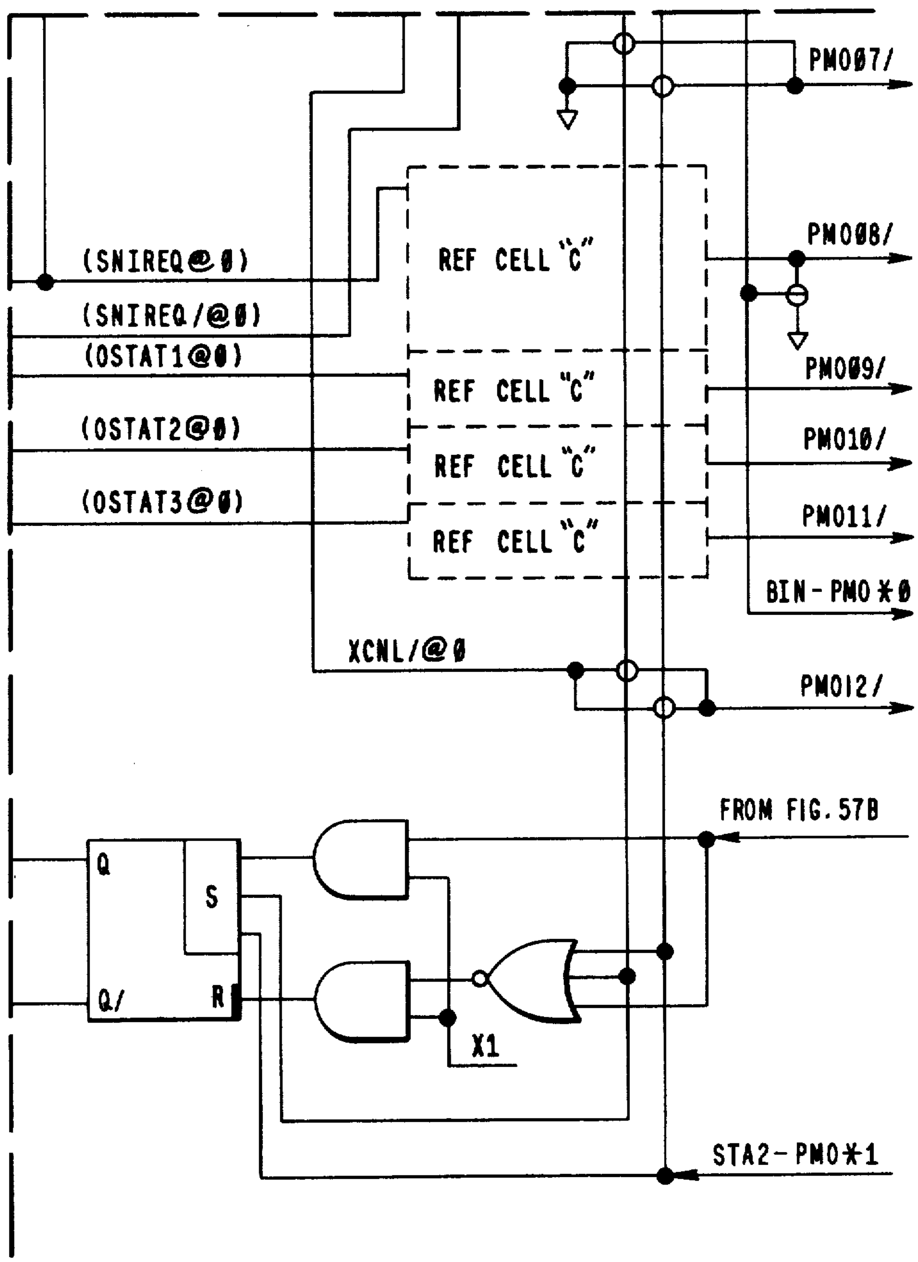
Figure 58A:
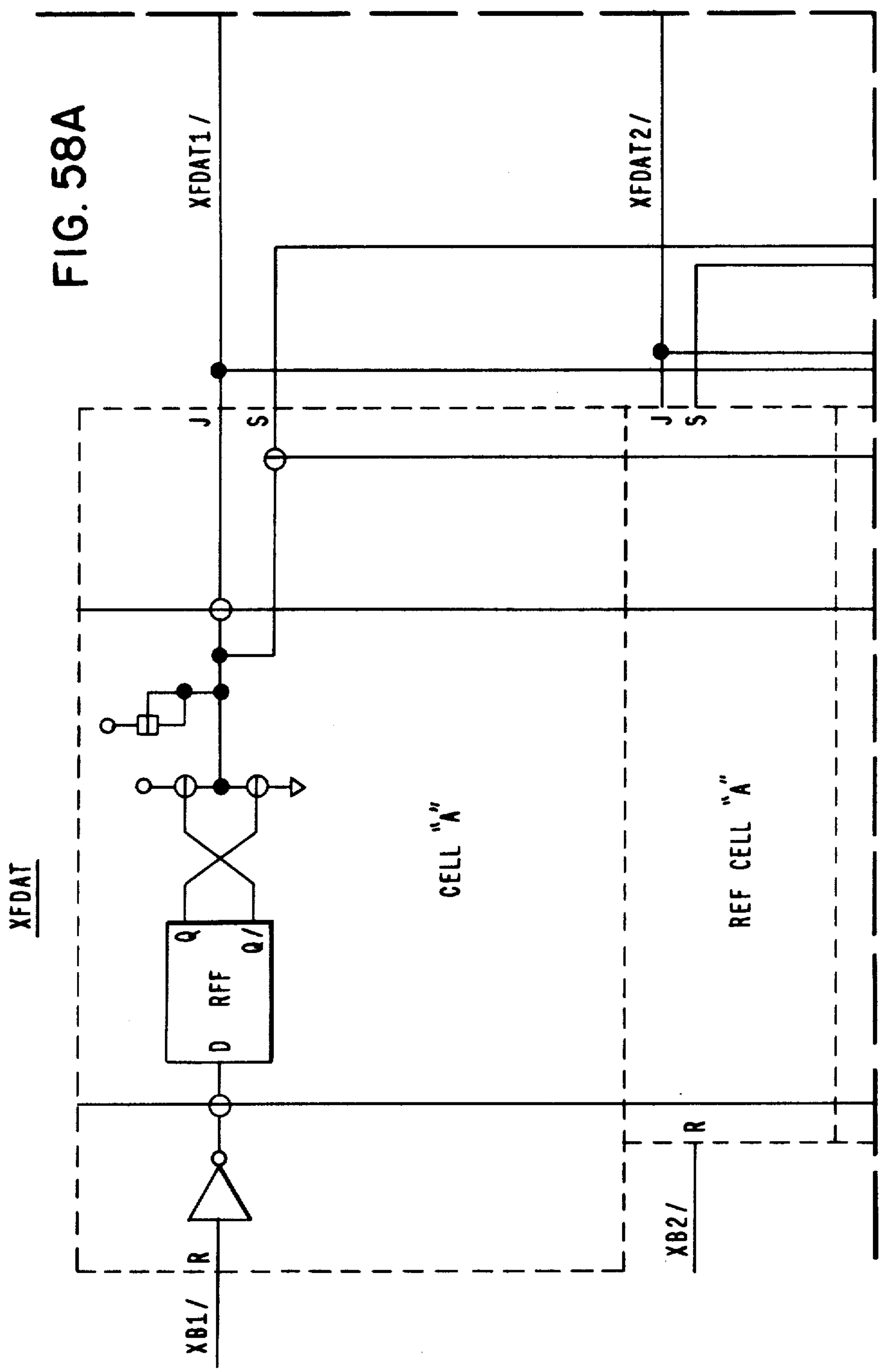
Figure 58B:
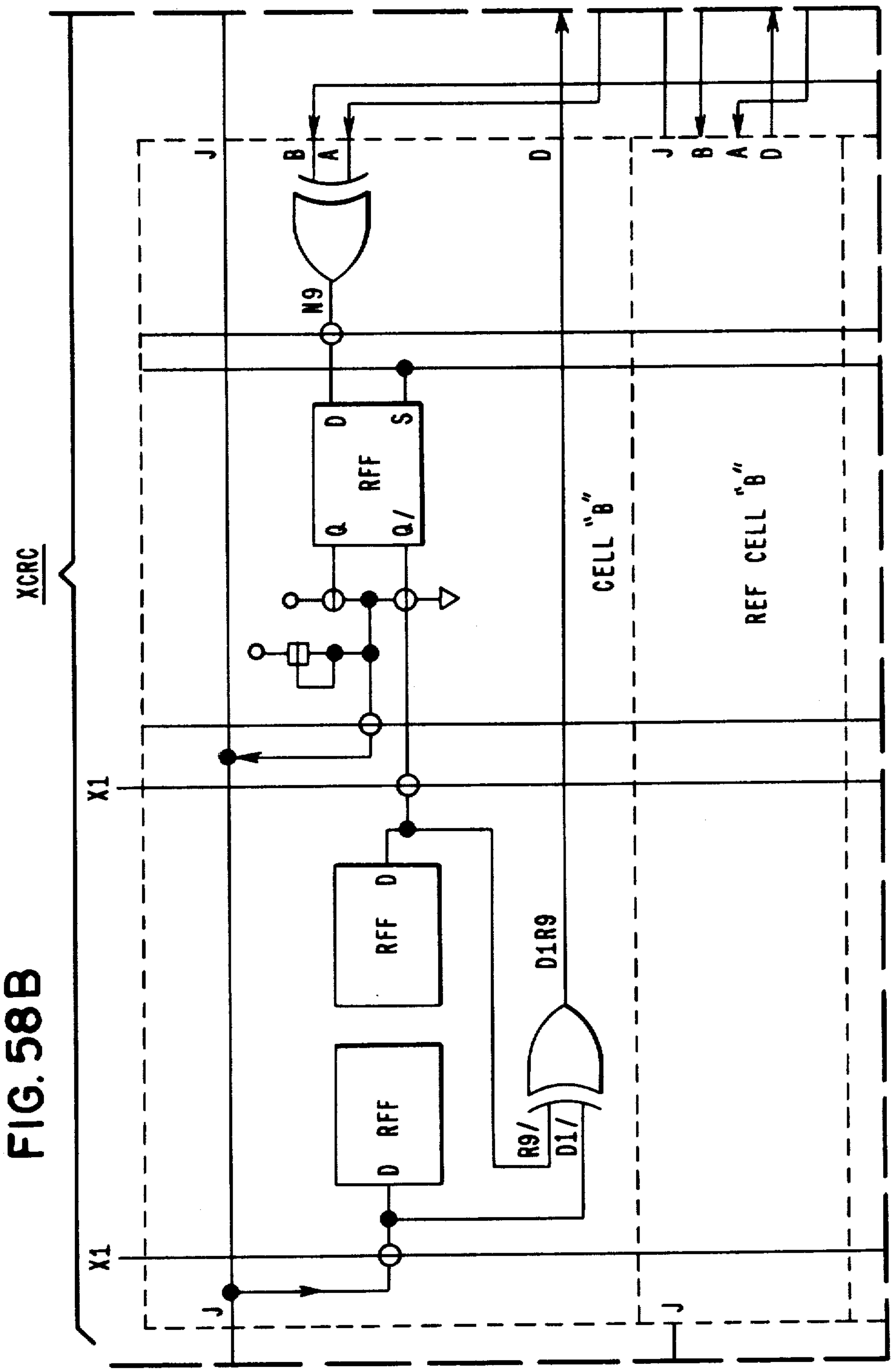
Figure 58C:
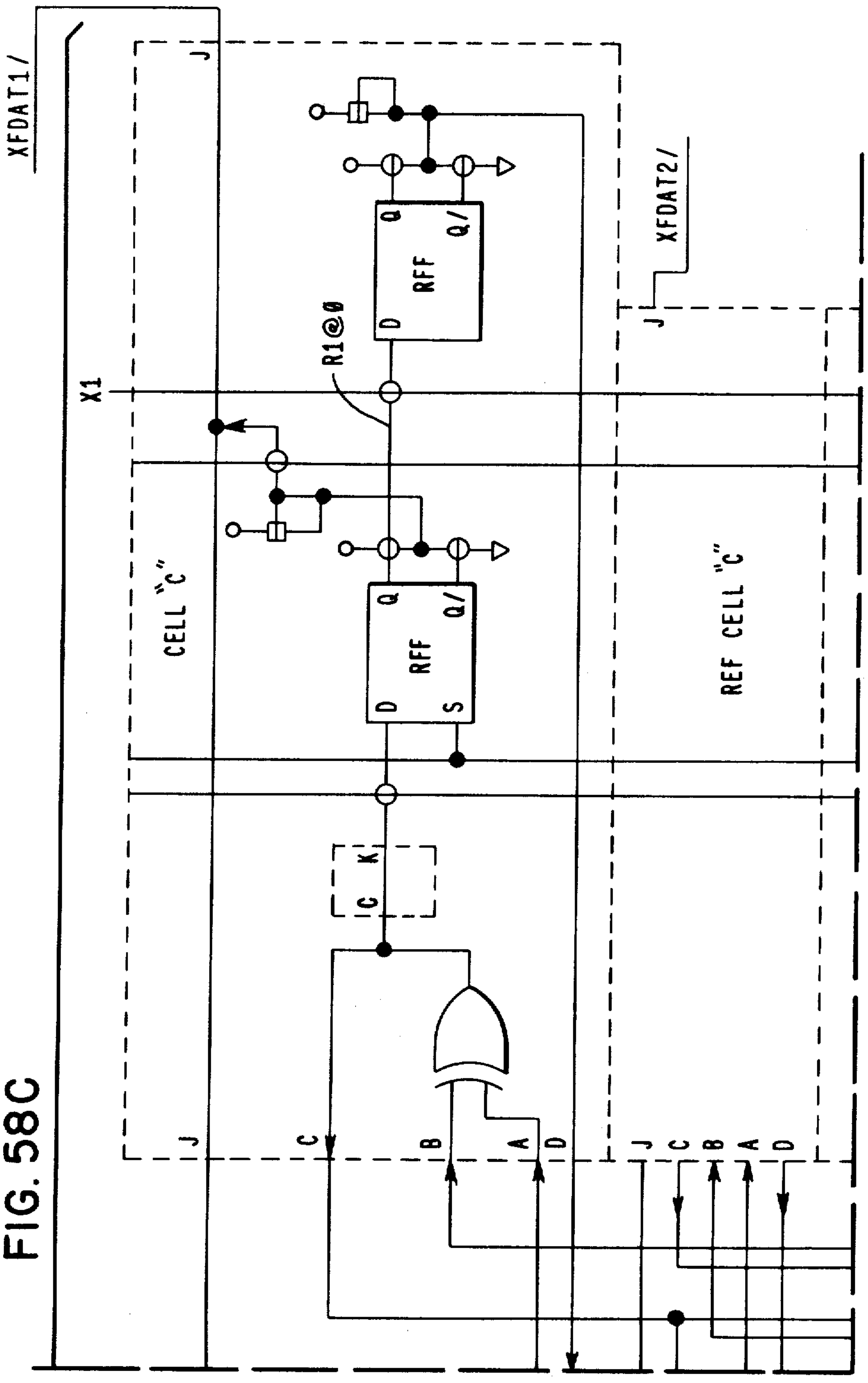
Figure 58D:
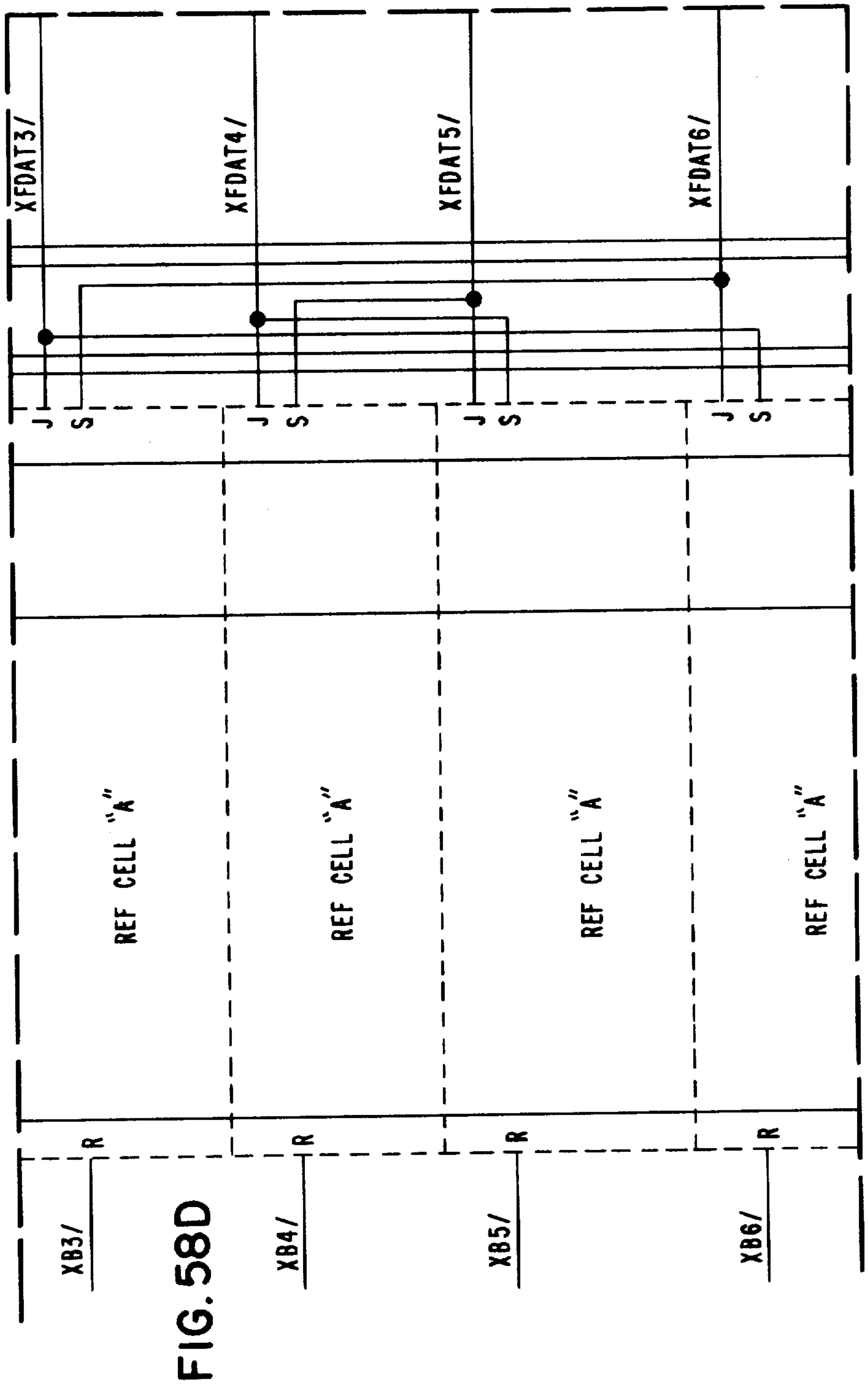
Figure 58E:
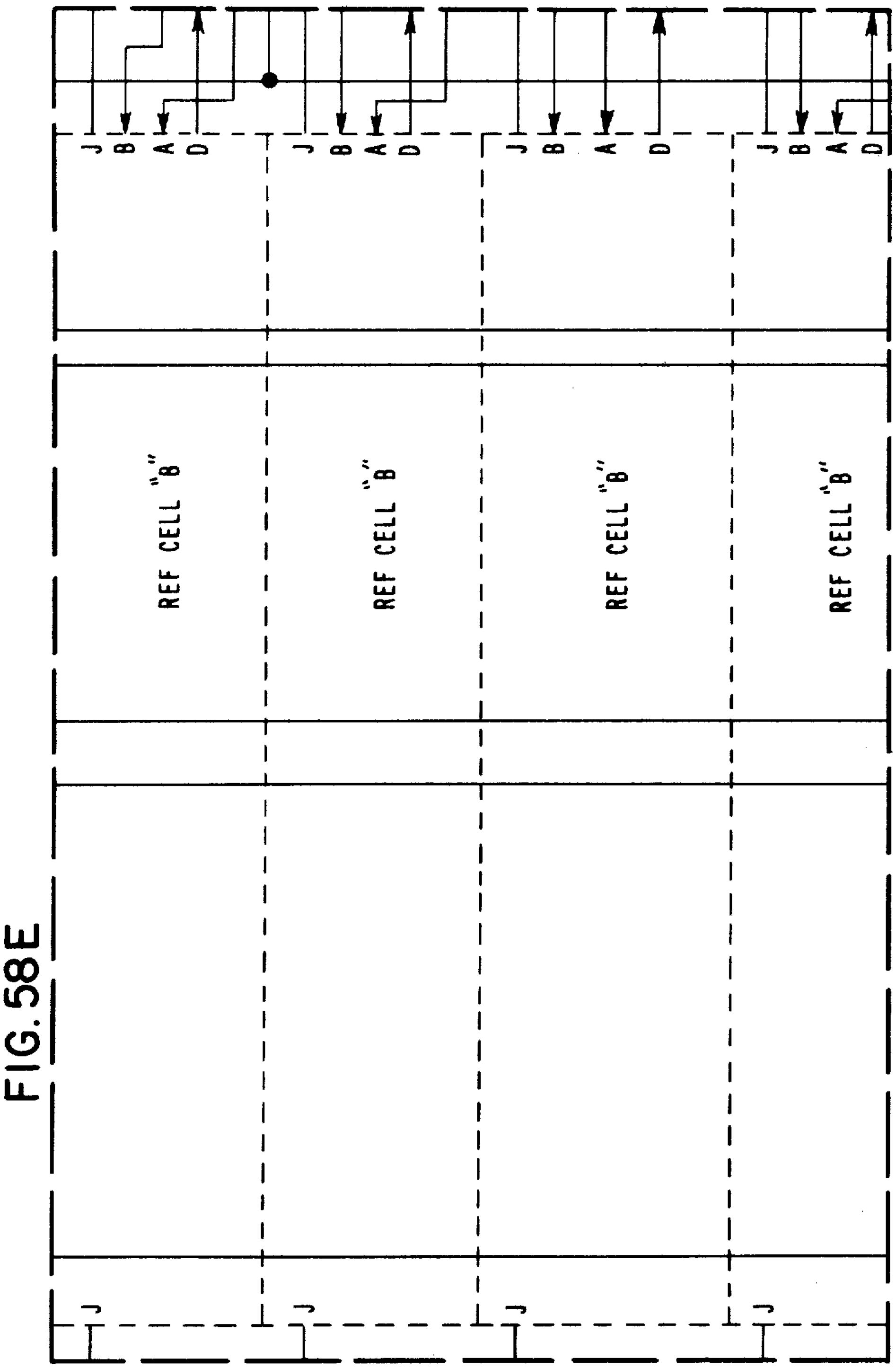
Figure 58F:
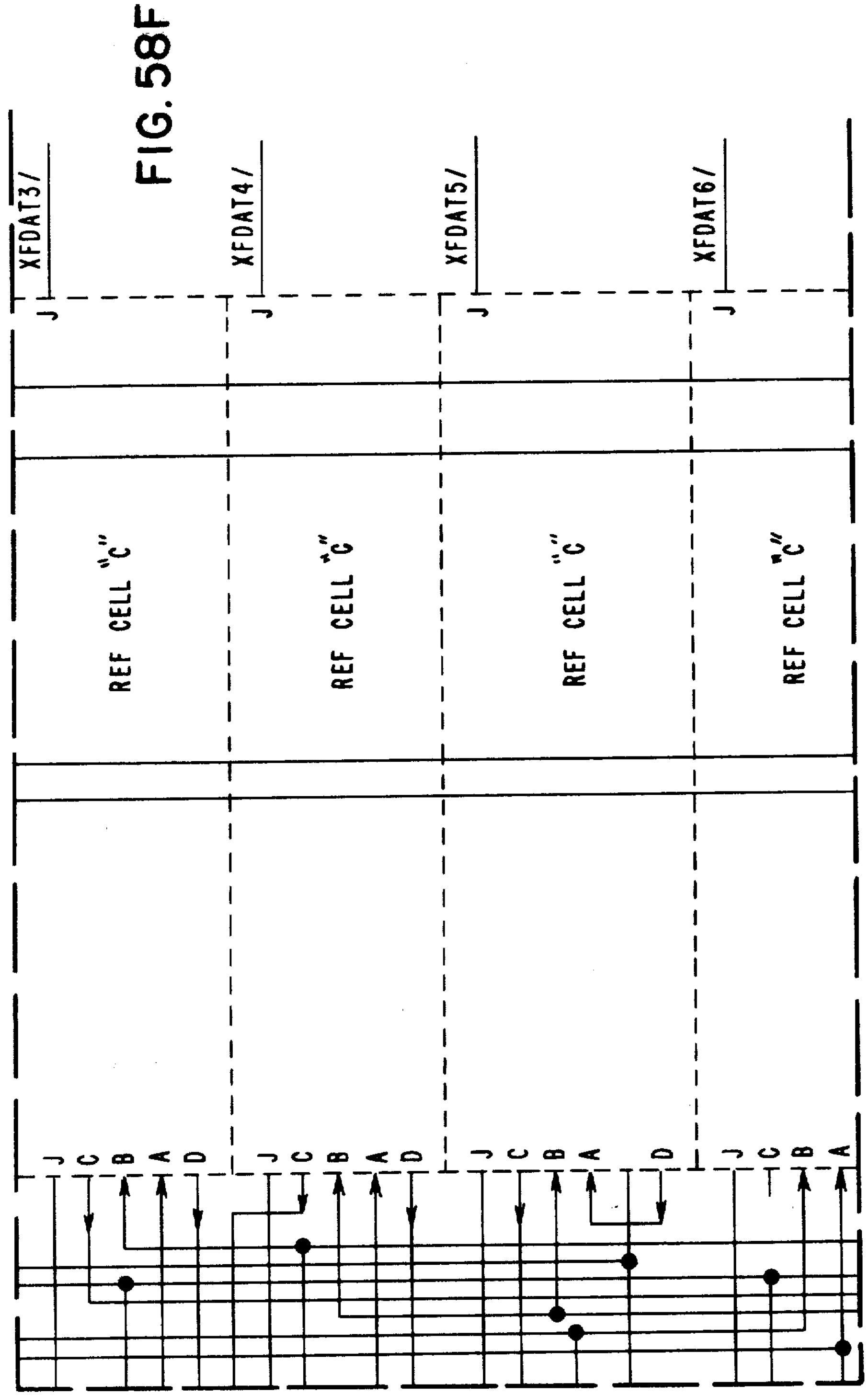
Figure 58G:
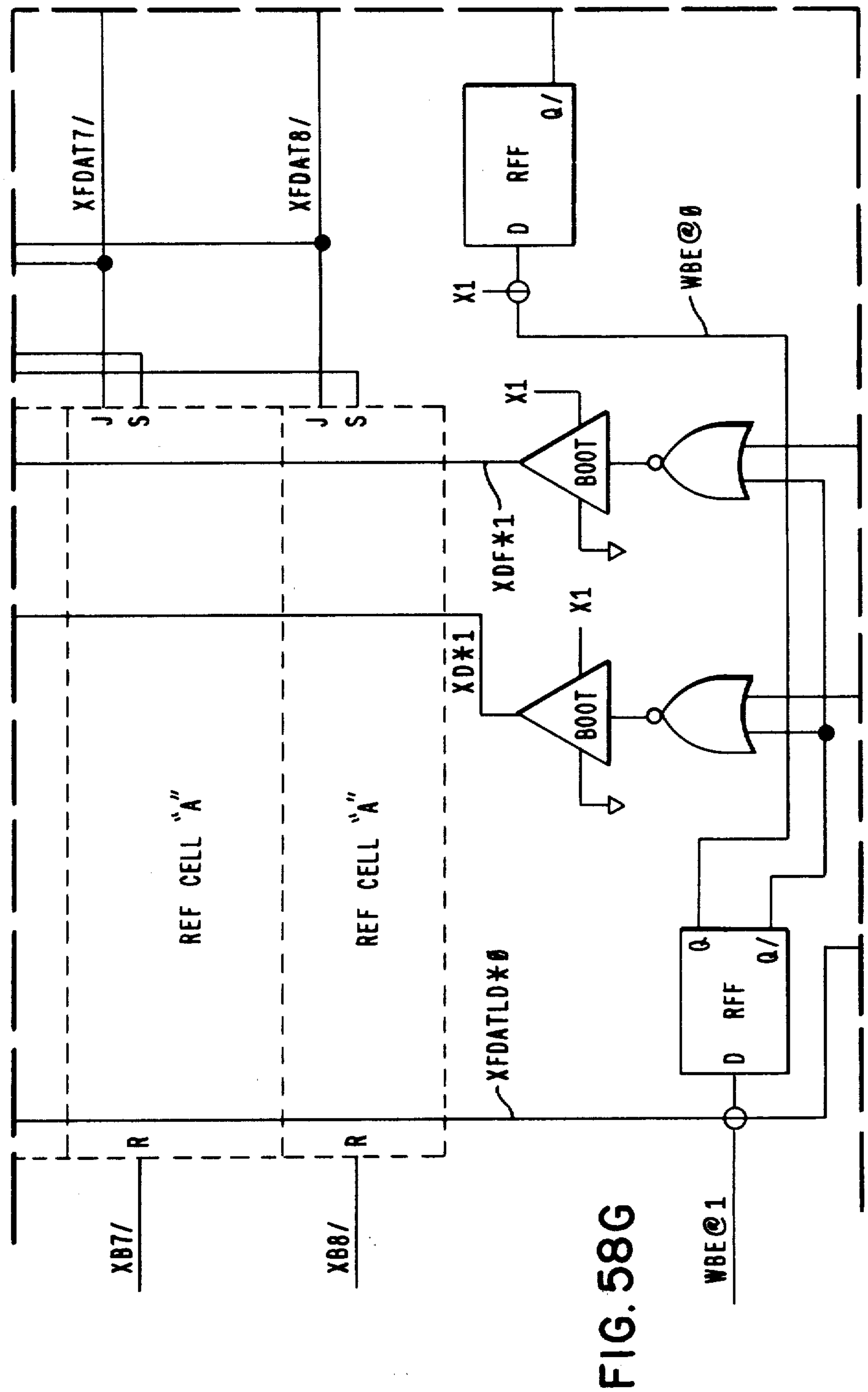
Figure 58H:
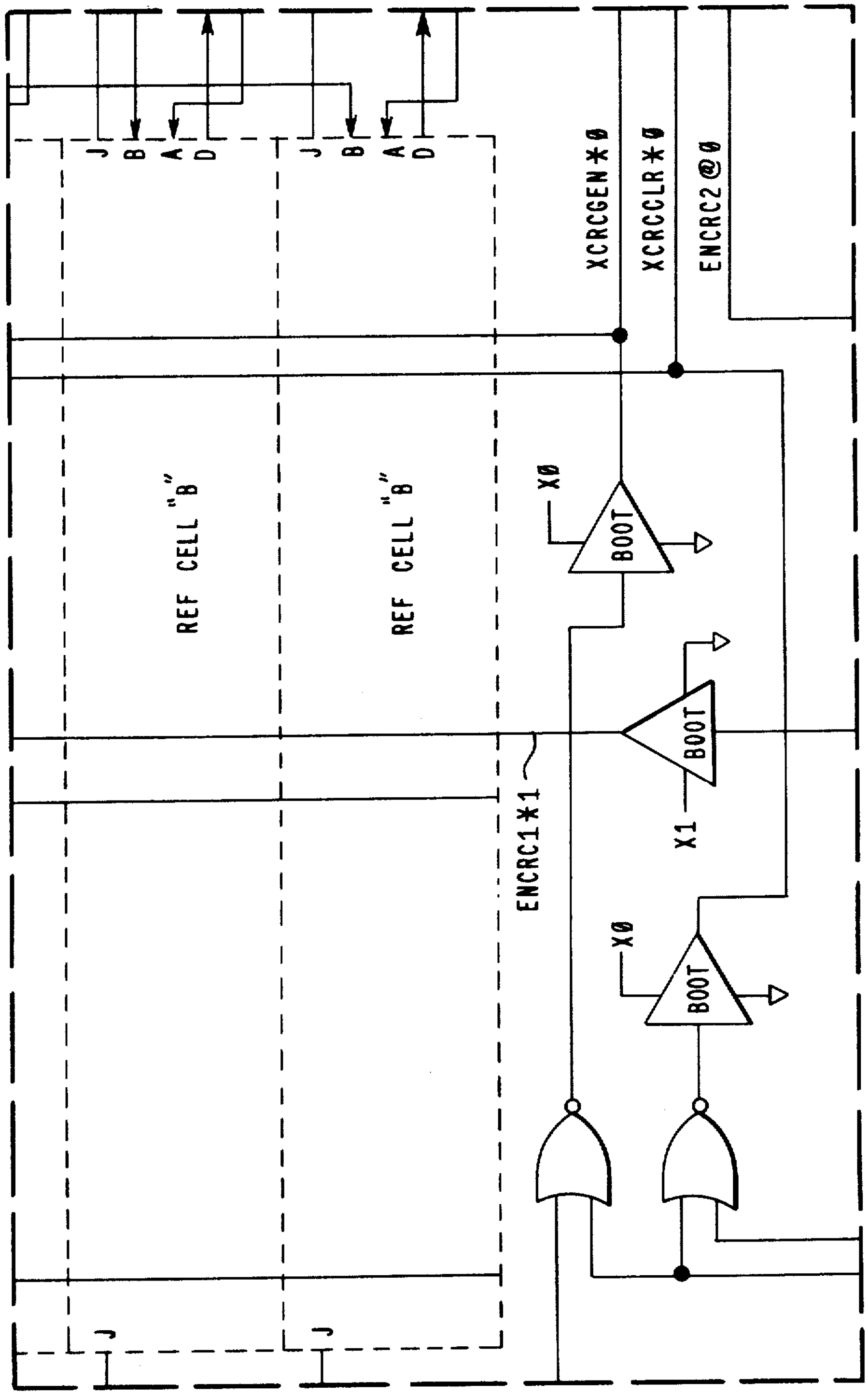
Figure 58I:
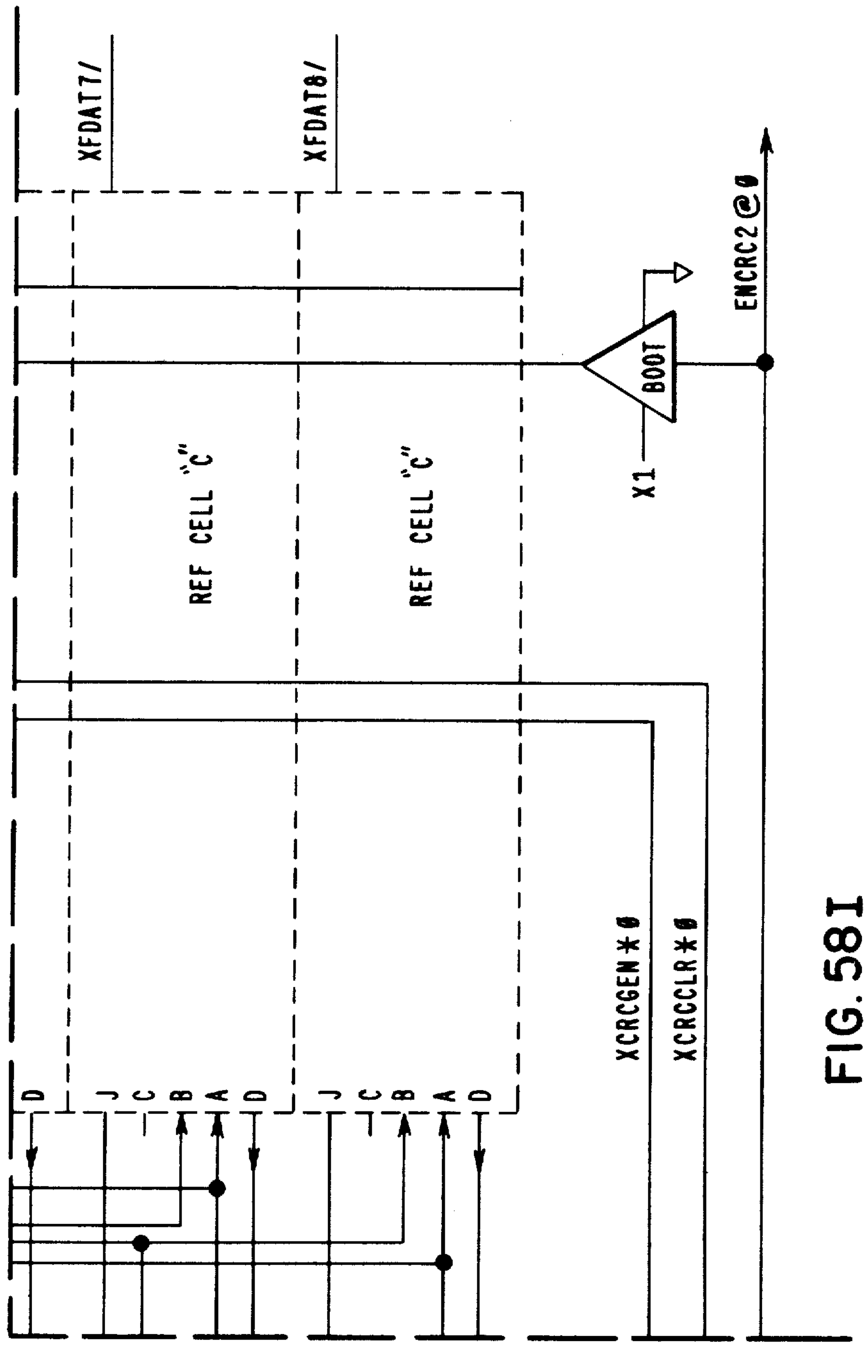
Figure 58J:
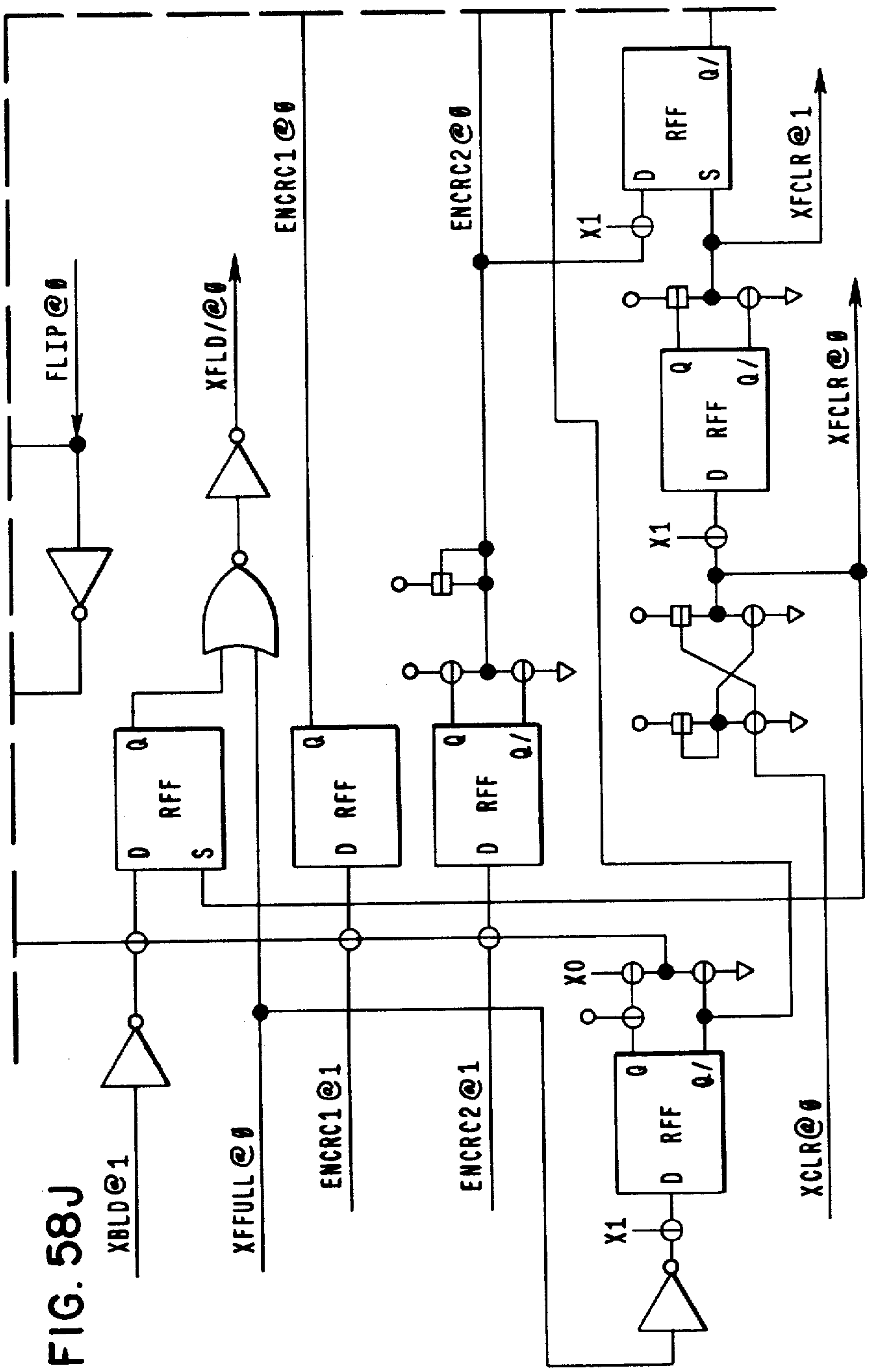
Figure 58:
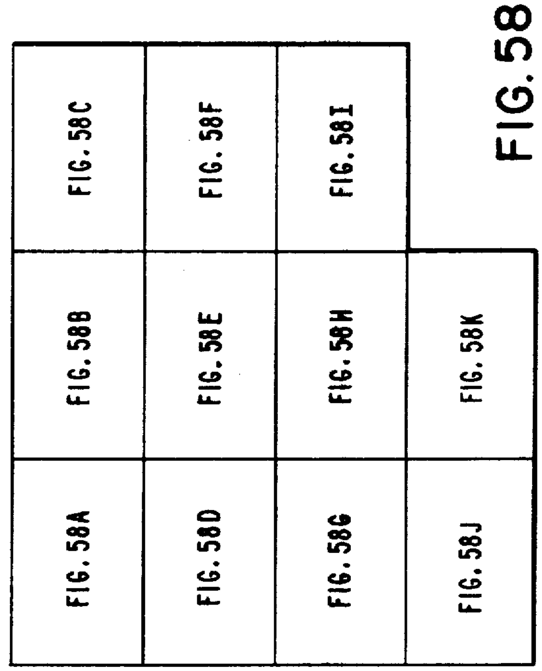
Figure 58K:
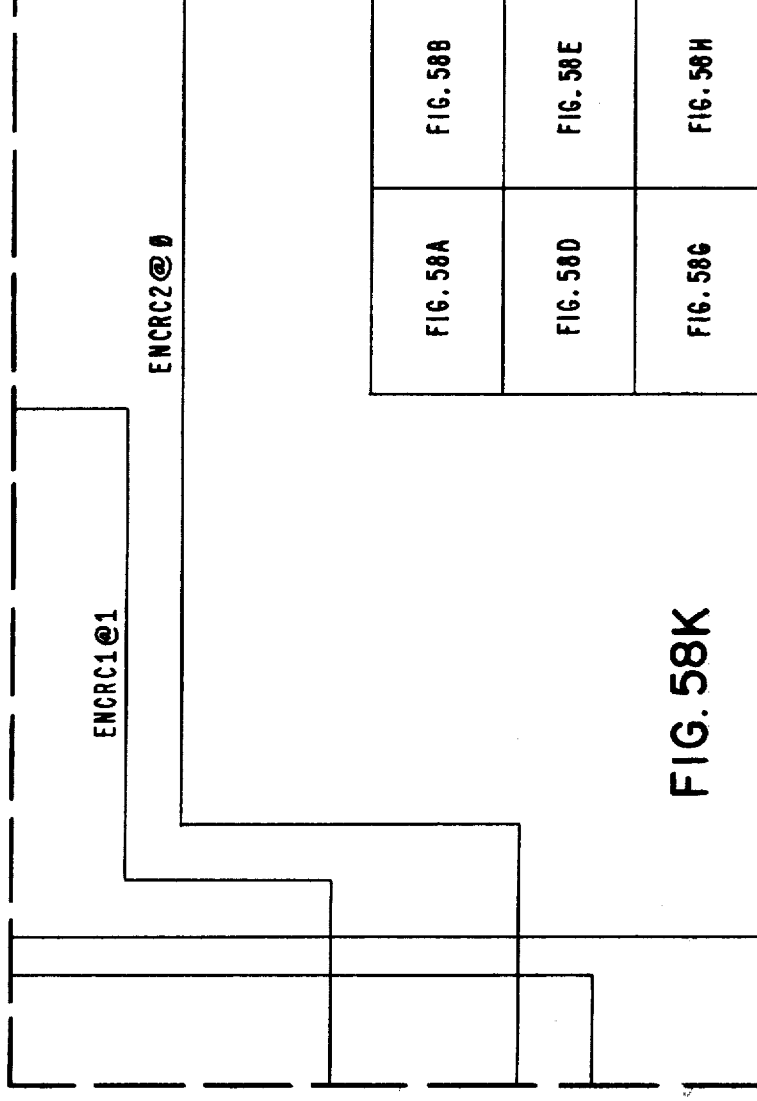

FIGS. 42A through 42T show the circuitry in either the component IAC or the component OAC. For the component IAC, the lettered input and output symbols are explained in the following IAC TABLE.

IAC TABLE

| SYMBOL | REPRESENTS |
|---|---|
| X | I |
| A | FNXT |
| B | LMIT |
| C | LLW |
| D | FLB |
| E | ICB-IAC*0 |
| F | INC-IAC*0 |
| G | IAC*1 |
| H | IAC-PMB*0 |
| J | IAC+-ICB*0 |
| PMO | PMO##/ |
| XCB | ICB##/ |
| M | IAC##@1 |
| N | CARRY |

For the component OAC the lettered input and output symbols are explained in the following Table OAC.

| OAC TABLE | |
|---|---|
| SYMBOL | REPRESENTS |
| X | O |
| A | DEA## |
| B | HEA## |
| C | HLB |
| D | DLB |
| E | OCB-OAC*Ø |
| F | INC-OAC*Ø |
| G | X1 |
| H | OAC-PMO*Ø |
| PMO | PMO##/ |
| XCB | OCB##/ |
| M | OAC##@1 |
| N | CARRY |

Figure 43:
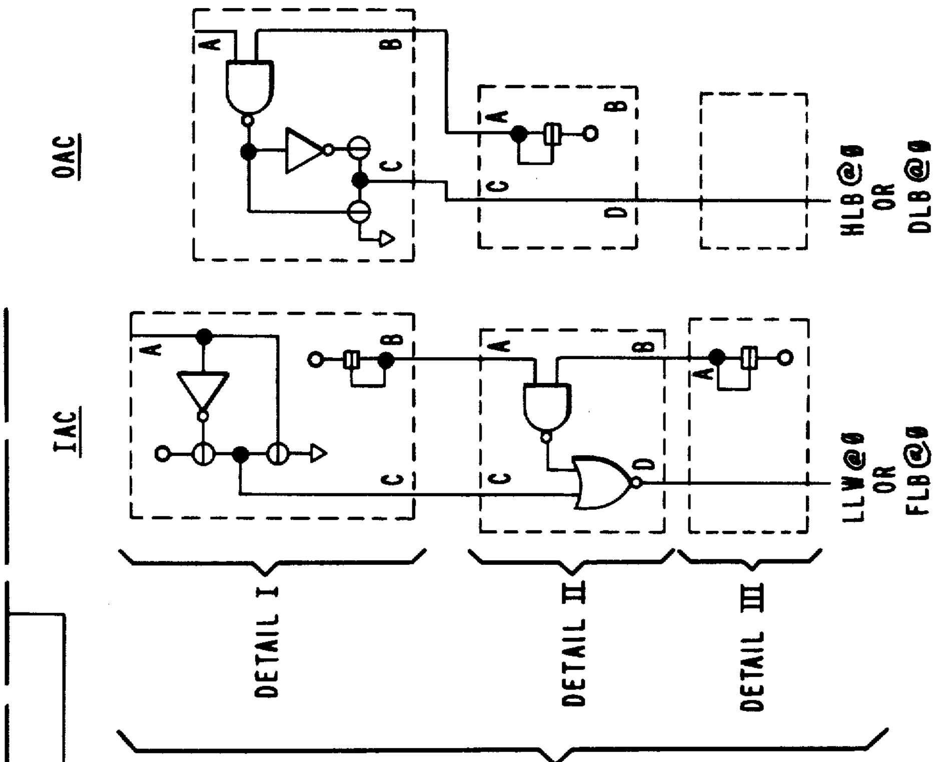

The symbol ## indicates any number from 01 through 16 for the component IAC and any number from 01 through 24 for the component OAC. The circuitry shown enclosed within broken lines at the upper left-hand side of FIG. 42A (and at the upper lefthand side of FIG. 42C) is a modification of cell A only for bit 01 and bit 02. The circuitry shown enclosed within broken lines at the lower lefthand side of FIG. 42C is used in cell B for bit 03 through bit 16 for both components IAC and OAC, and is used in cell B for bit 17 through bit 24 for the component IAC. The circuitry shown enclosed within broken lines and extending vertically from FIG. 42B down through 42T is used only in the component IAC. FIG. 43 illustrates the compare details I, II and III that are seen in FIGS. 42G–42J, 42M, and 42S.

In FIGS. 42A through 42T, and in other Figures, cells or components are shown in detail only once, and any cells identical thereto are identified by the same letter.

FIGS. 44 through 56 show the circuitry within each stage or cell of the register components TMP, BASE, HNXT, FNXT, LMIT, HEA, DEA, RWB, EAR, XWB, HSA, DSA, IDSA, POD, and WRTAG, and the decoders D shown as blocks in FIGS. 38A–38L and 39A–39Q and associated with the registers RWB and XWB.

FIGS. 57A through 57H show the circuitry in the CMD and STAT register components.

FIGS. 58A through 58K show the circuitry within the XFDAT component and the XCRC component. This circuitry also accomplishes the function of MUX 570.

Figure 59A:
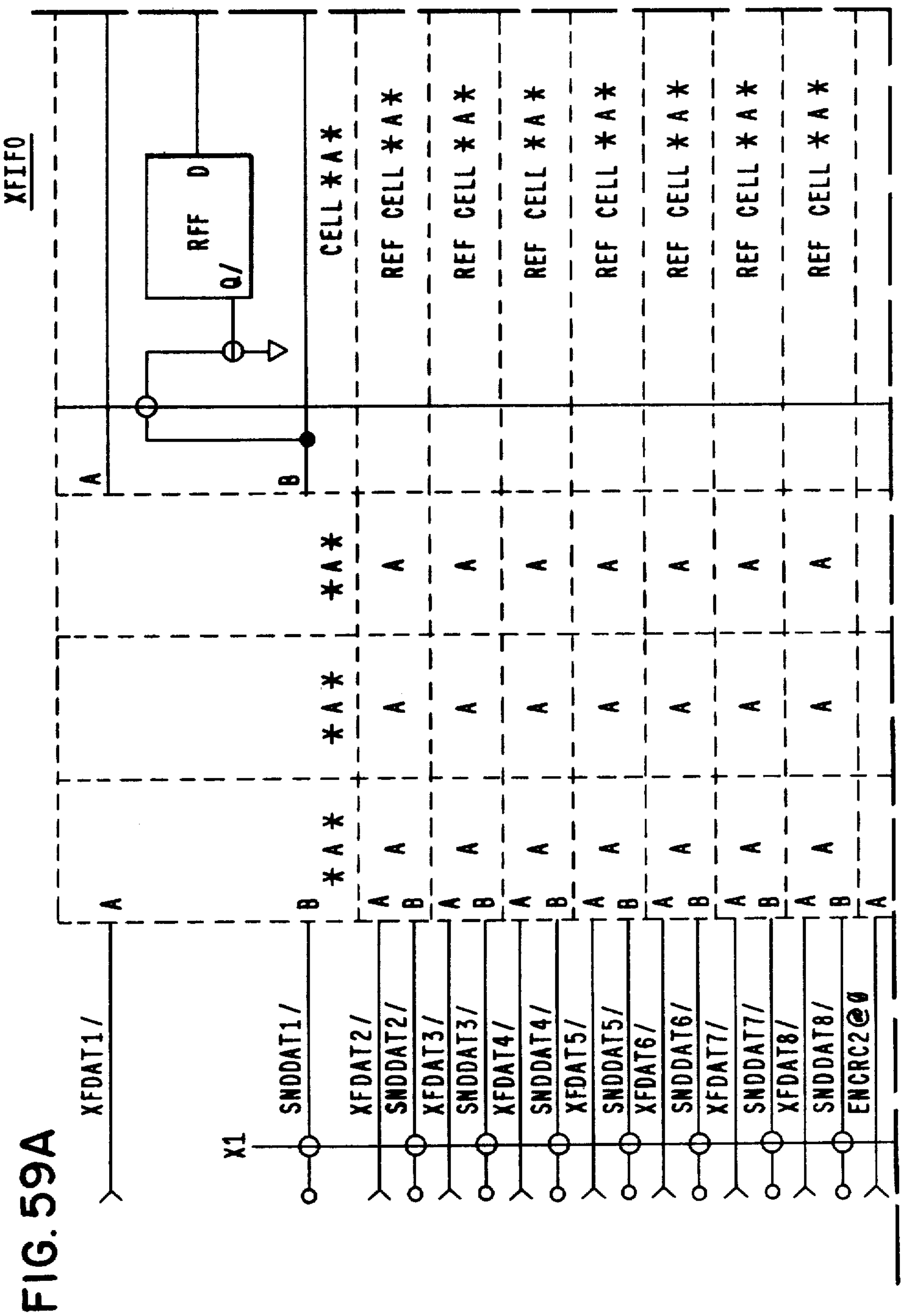
Figure 59B:
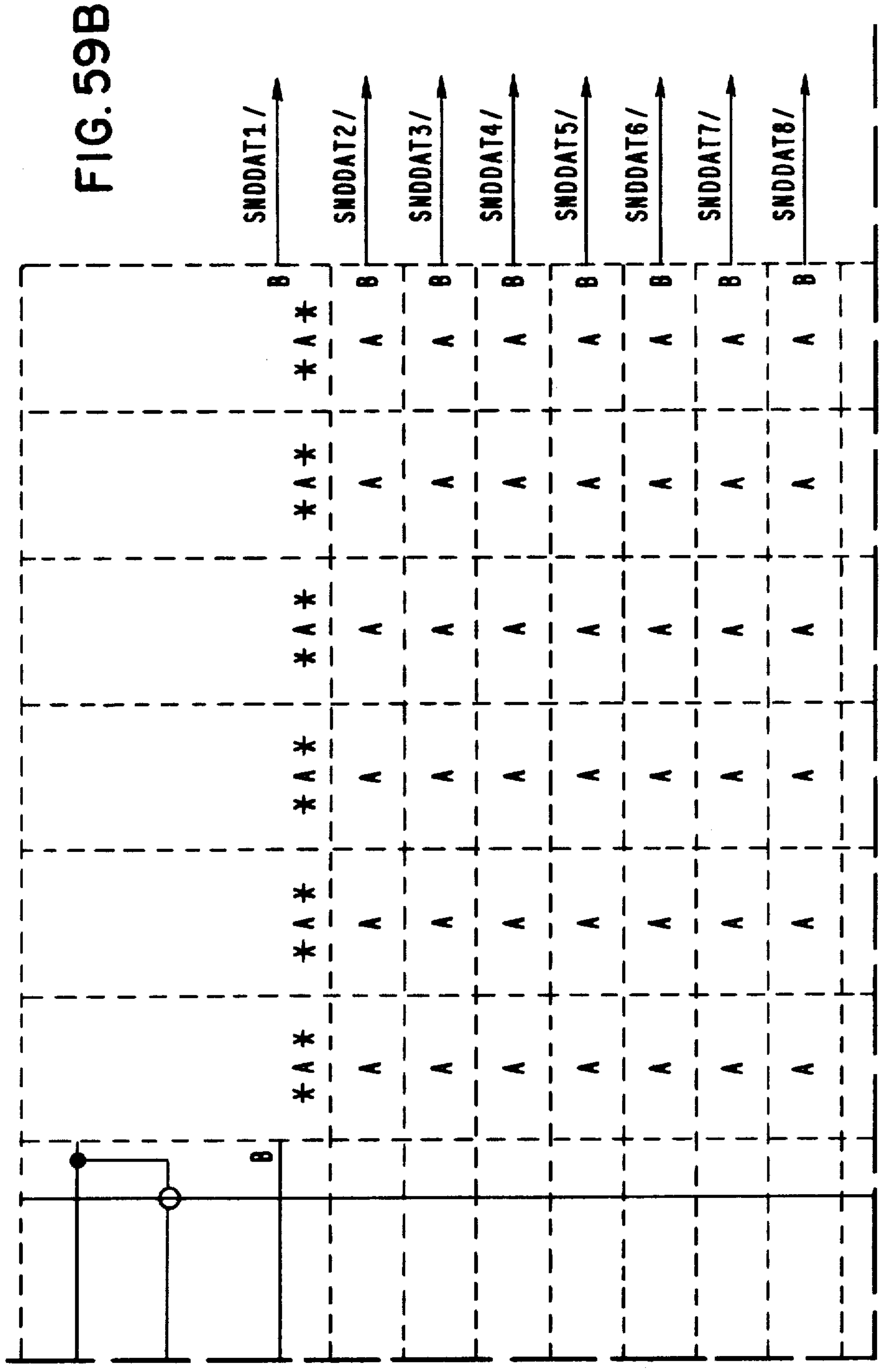
Figure 59C:
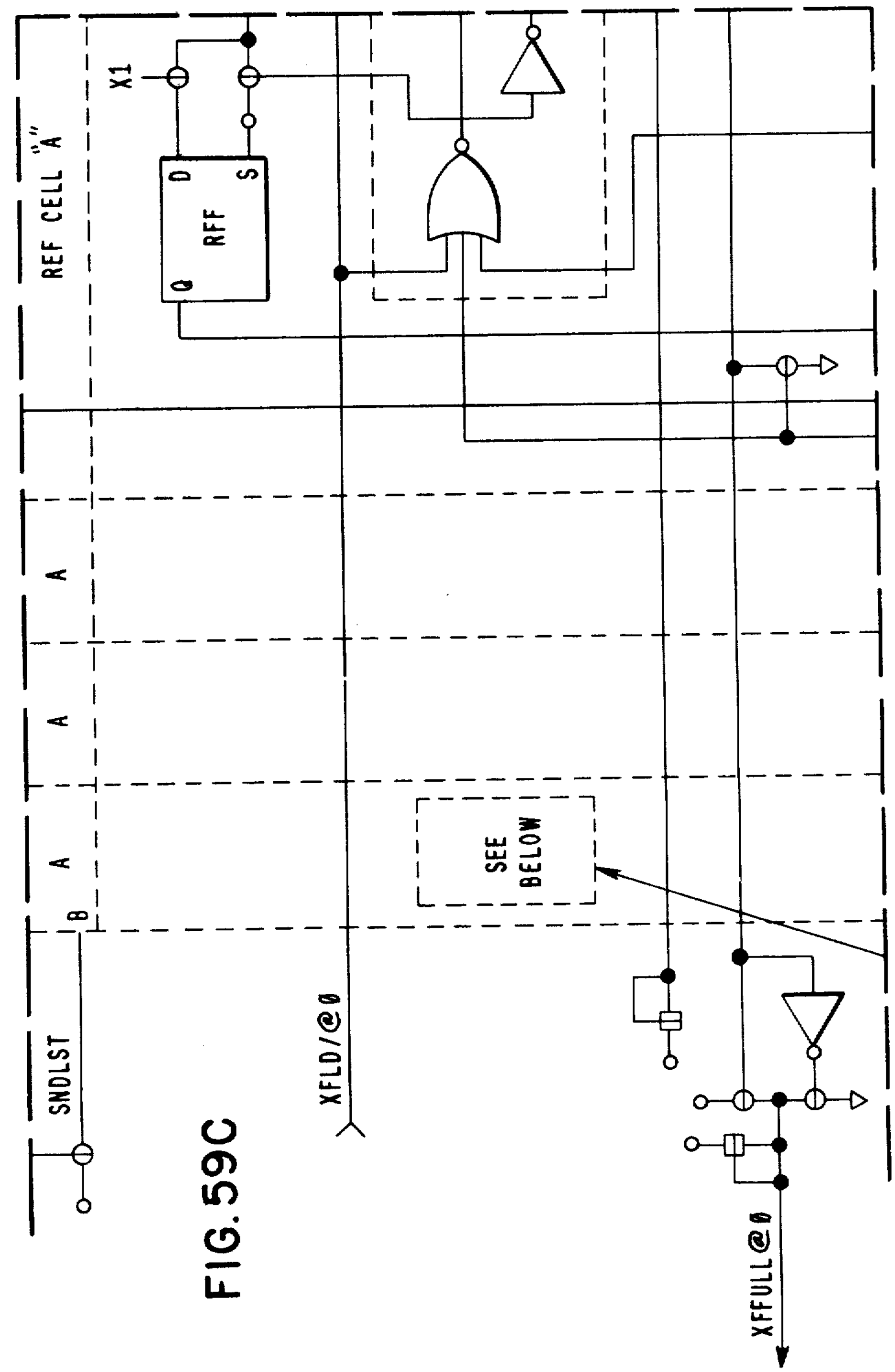
Figure 59D:
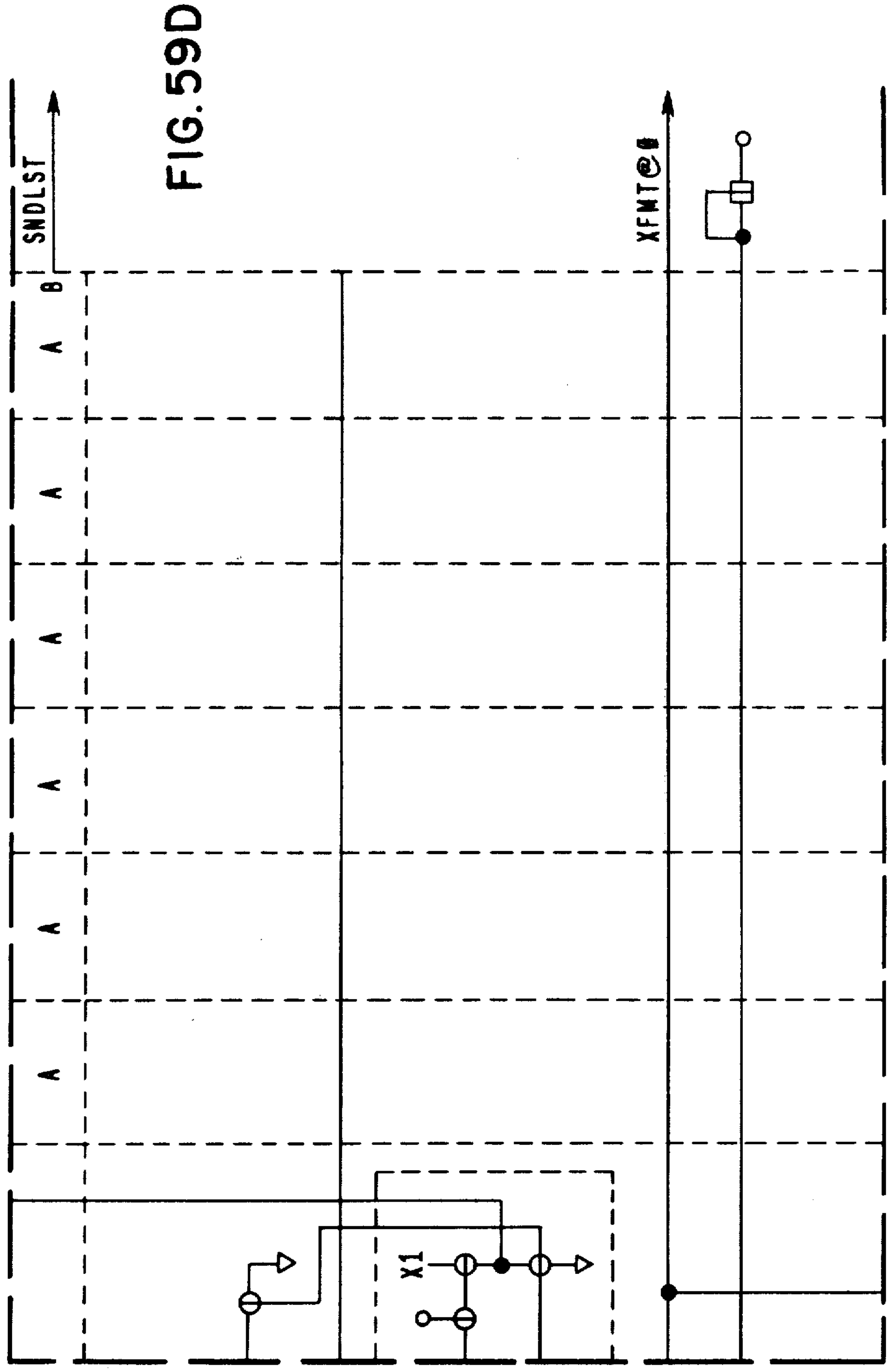
Figure 59E:
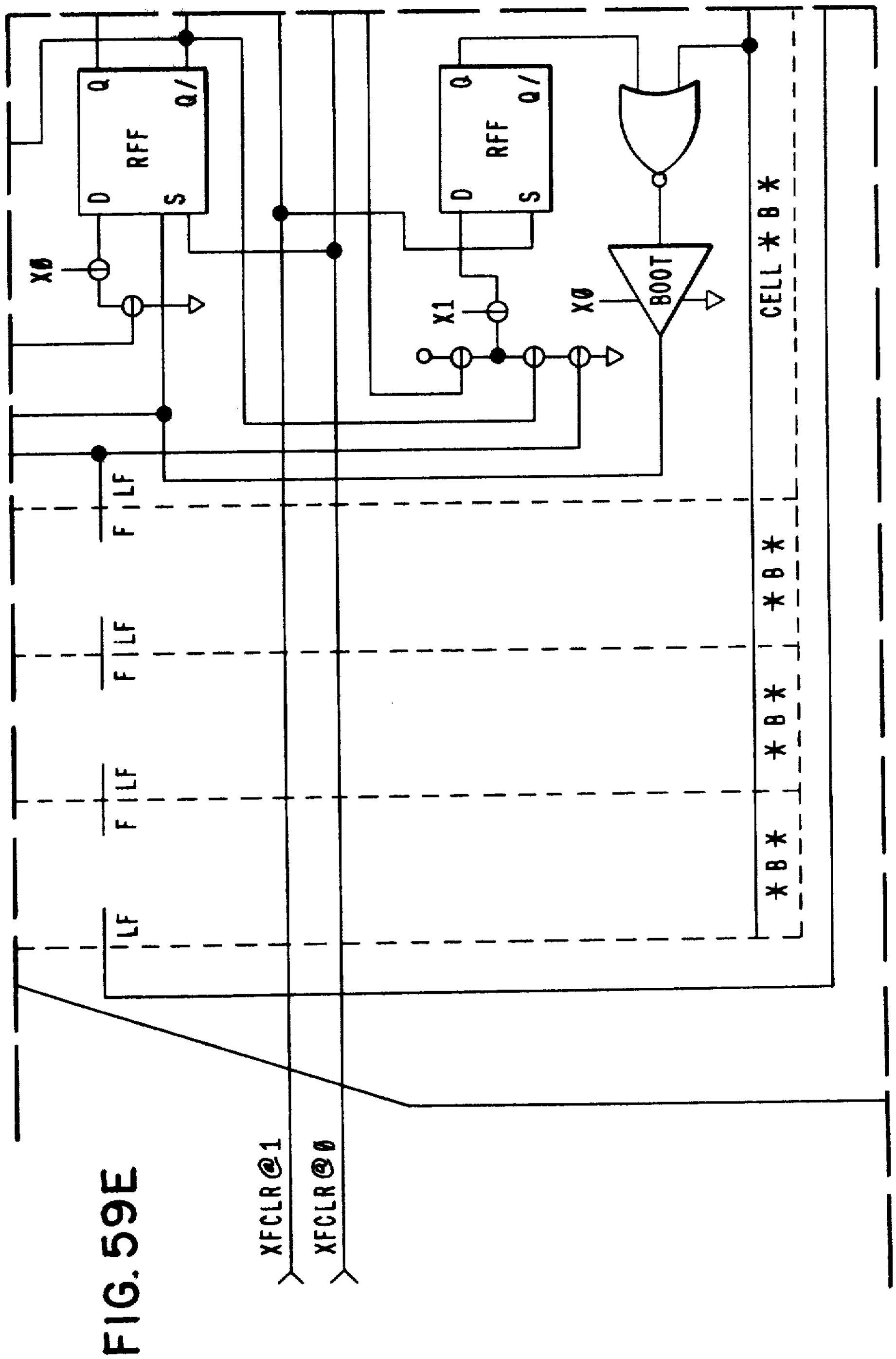
Figure 59F:
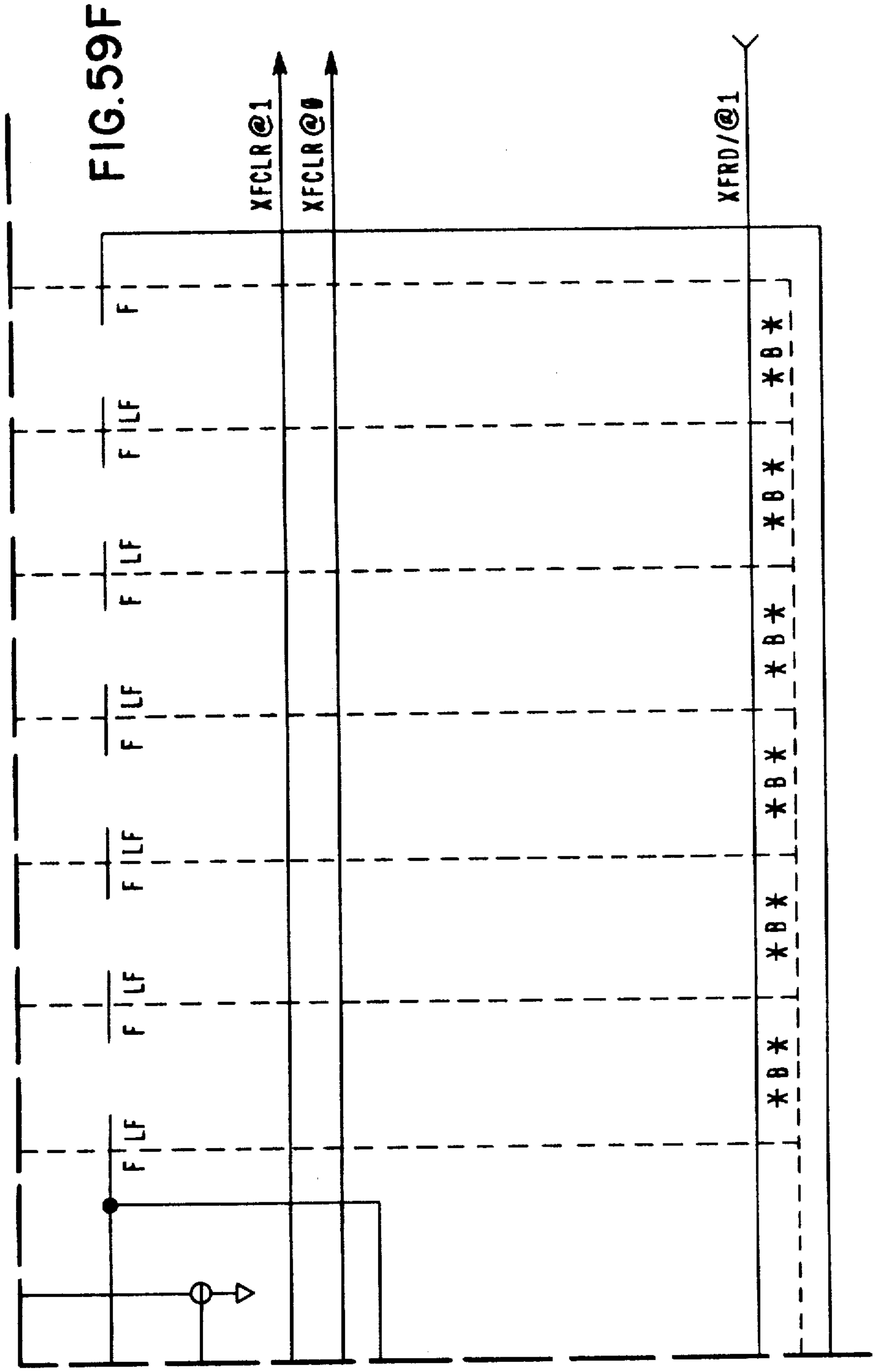
Figure 59G:
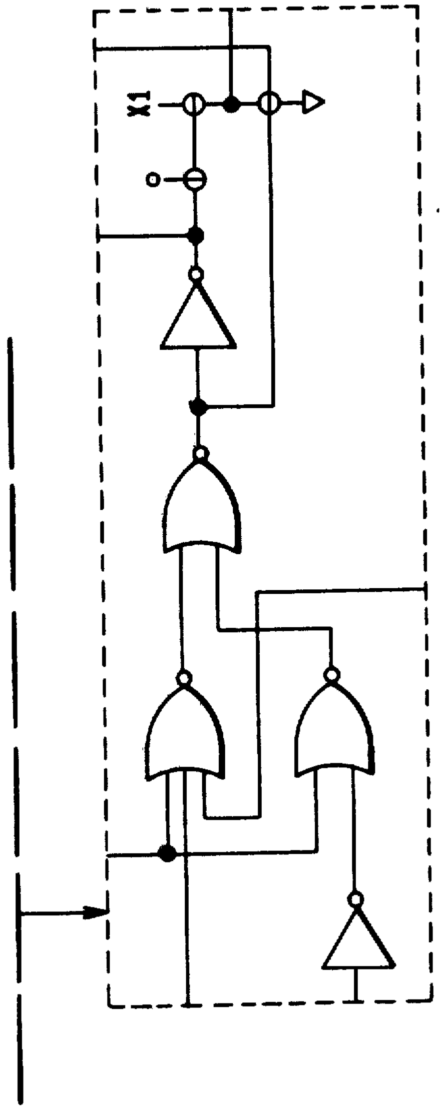
Figure 59:
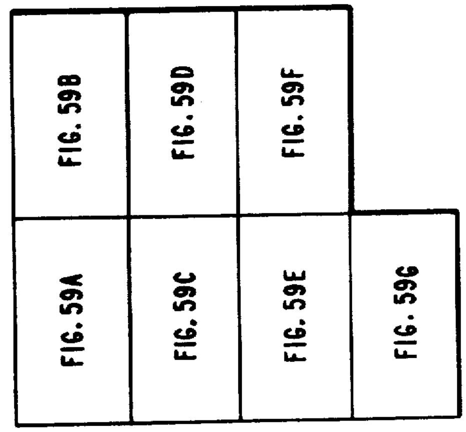

FIGS. 59A through 59G show the circuitry within the XFIFO component. The circuitry within broken lines in FIG. 59G is a variation only for the cell indicated in FIG. 59C.

Figure 60A:
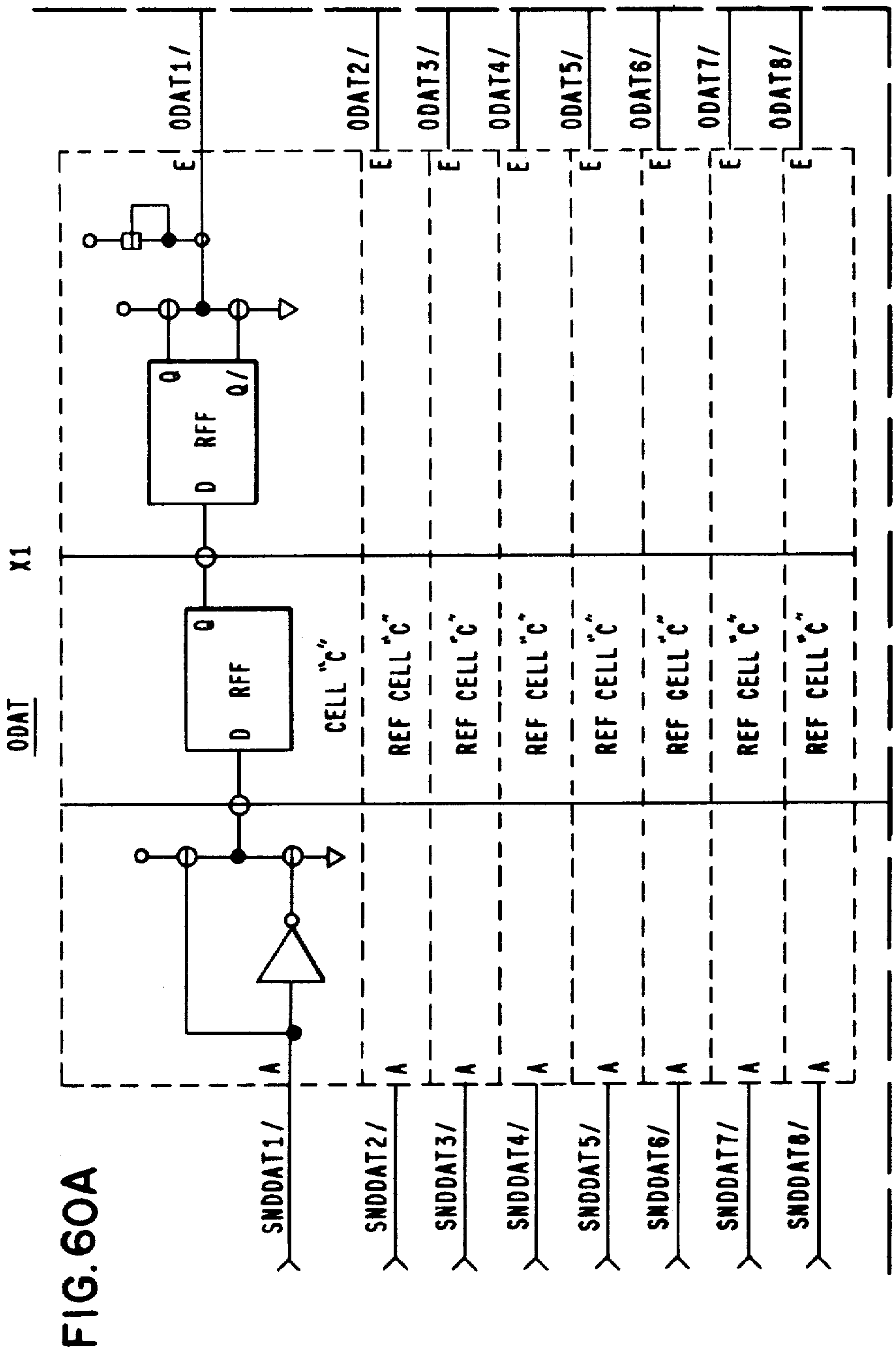
Figure 60B:
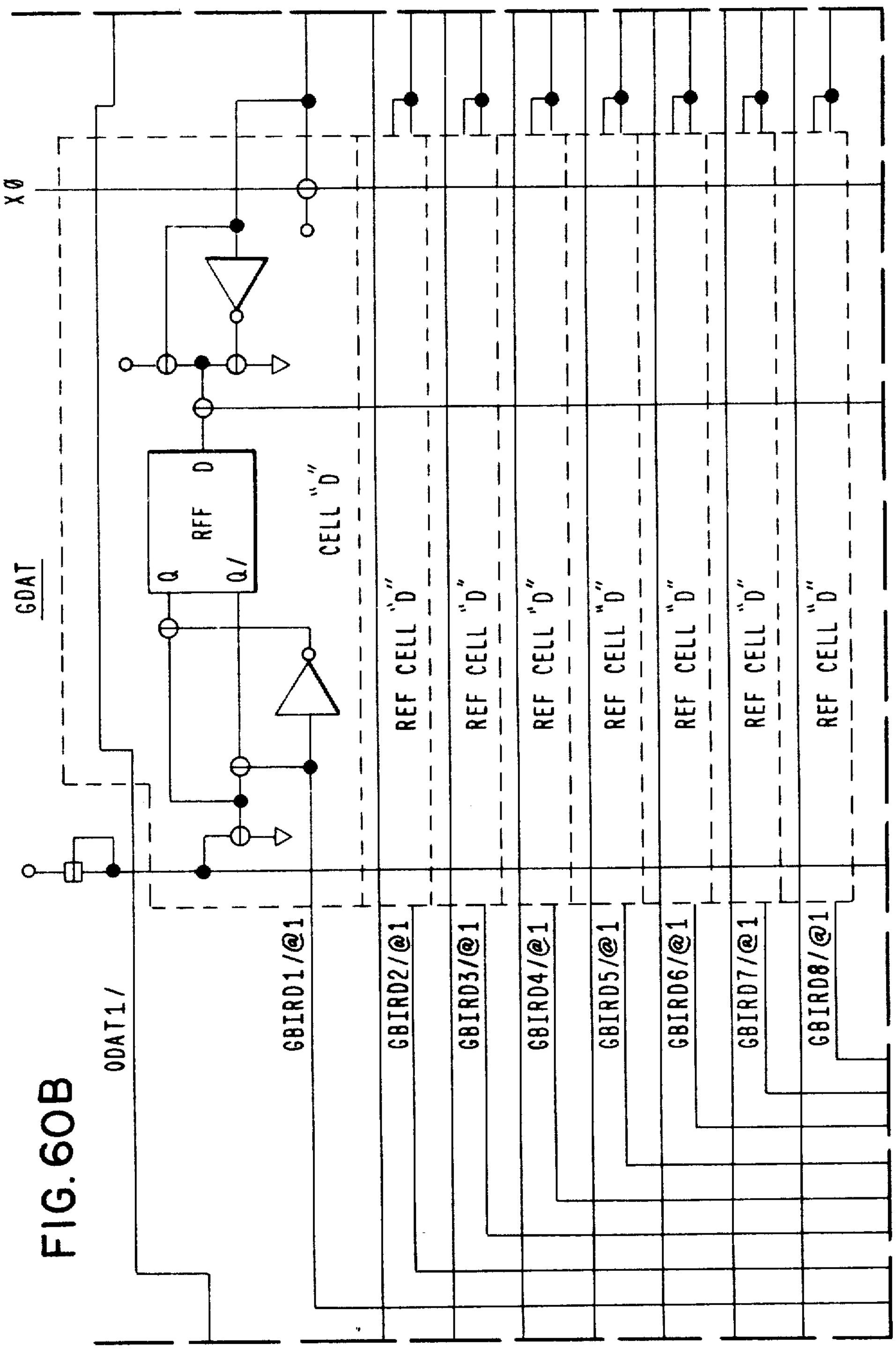
Figure 60C:
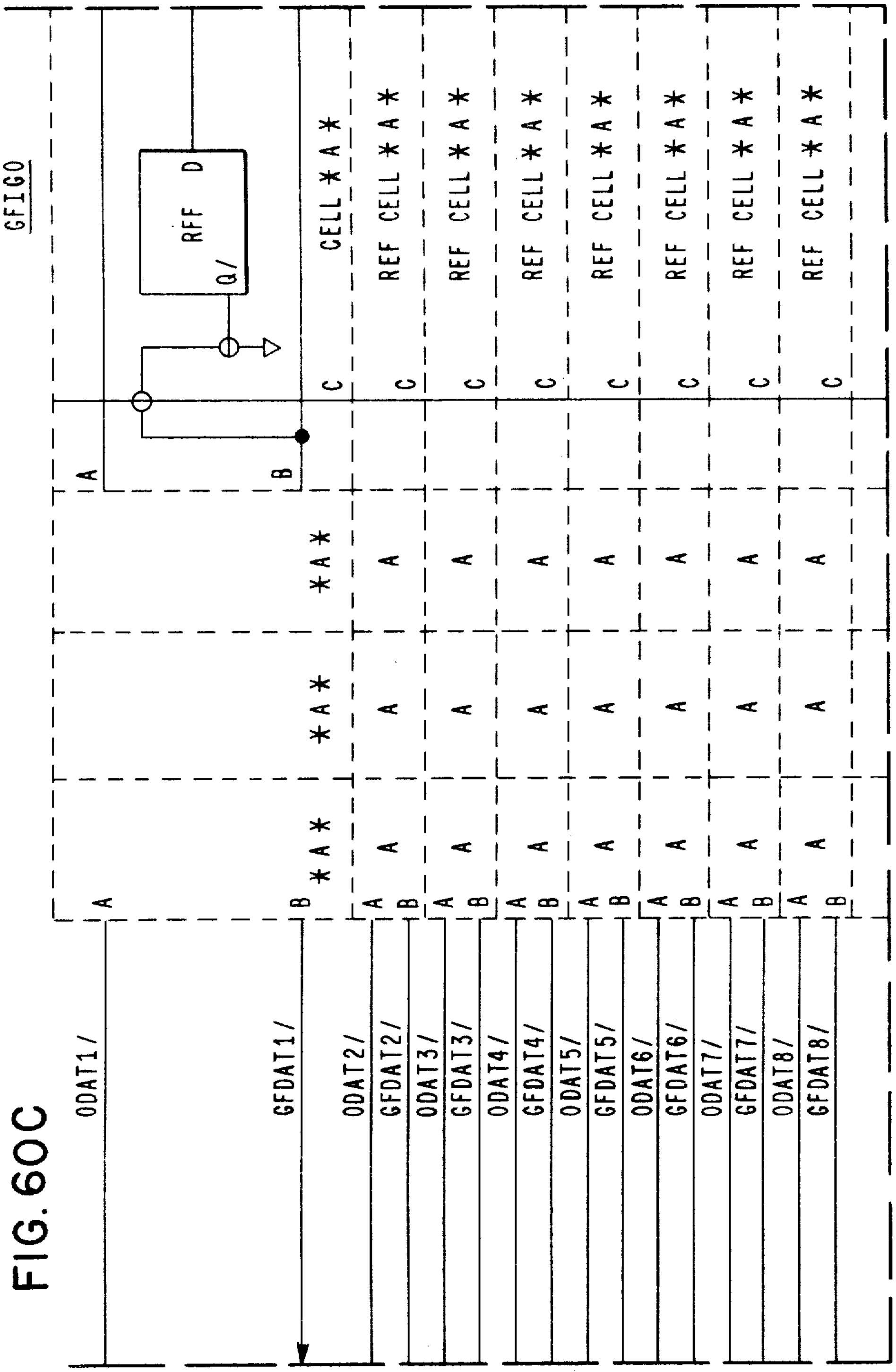
Figure 60D:
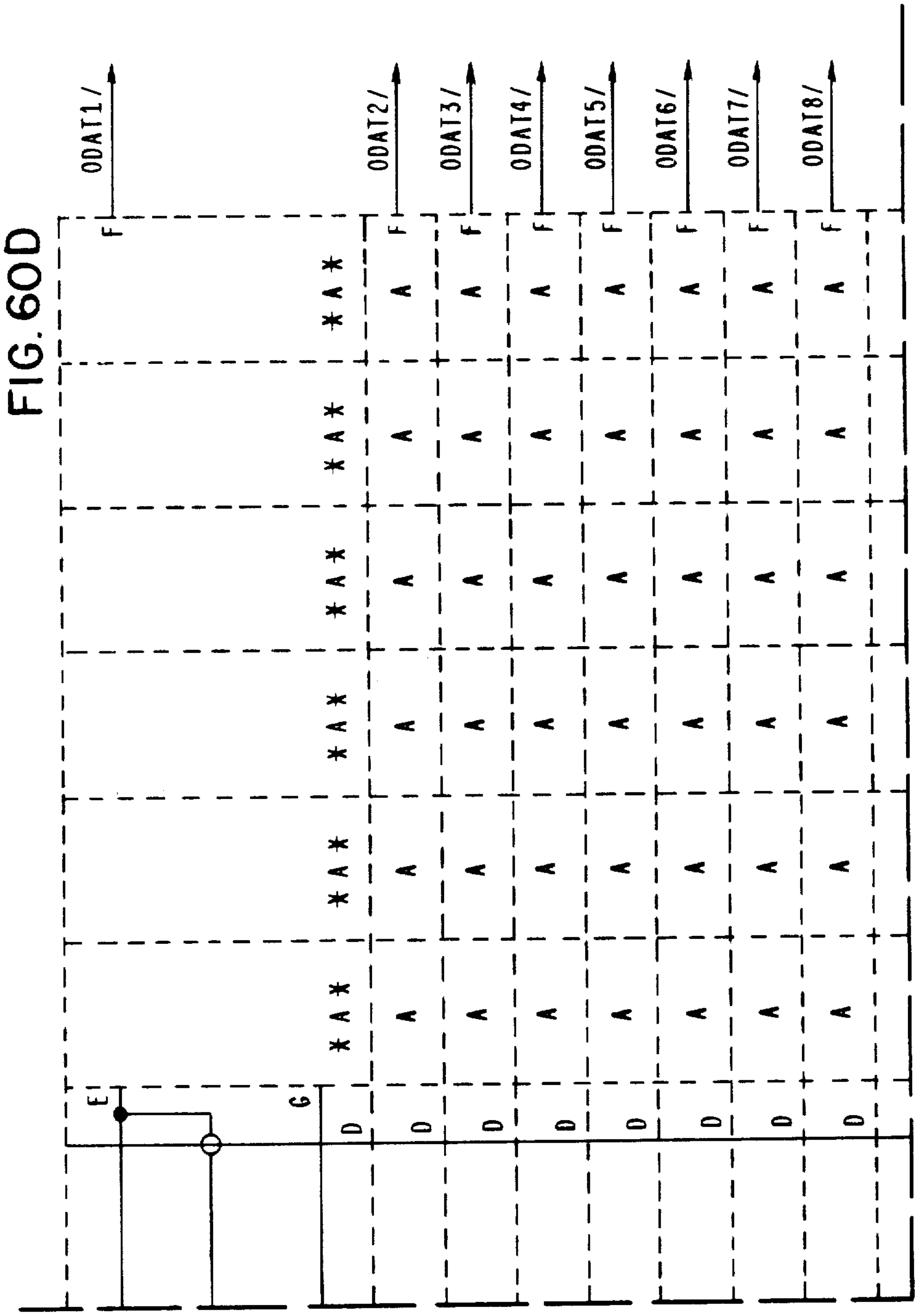
Figure 60E:
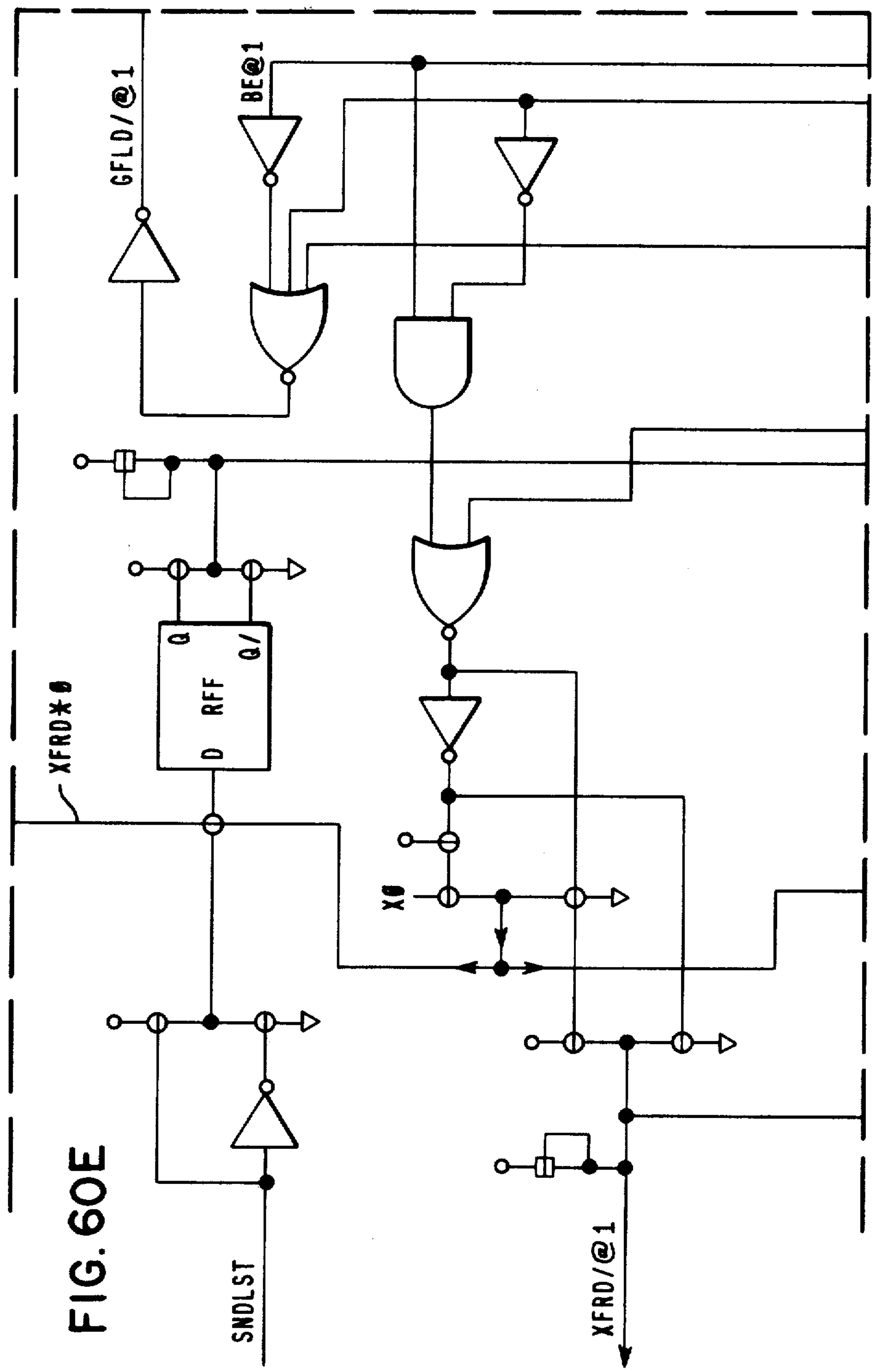
Figure 60F:
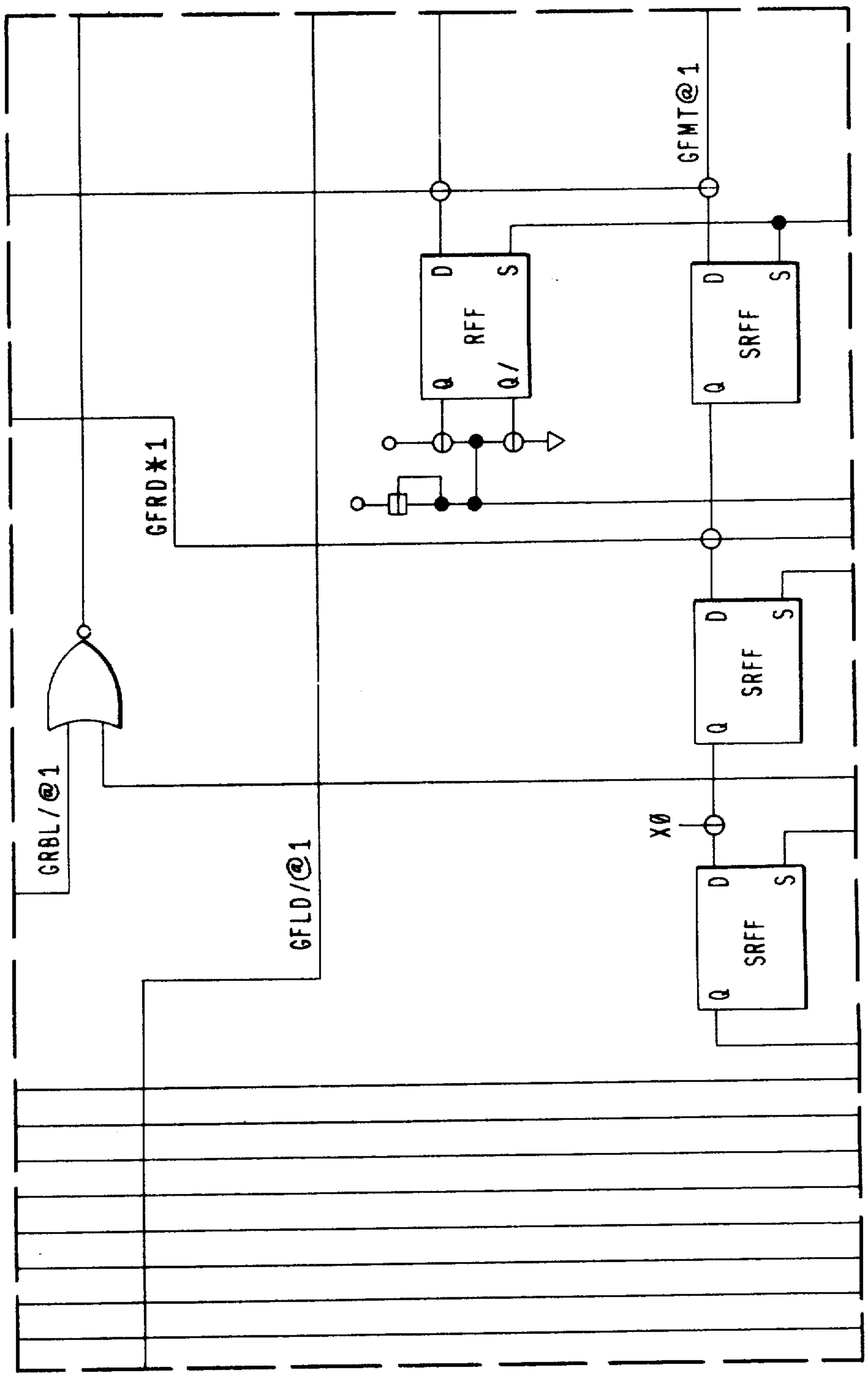
Figure 60G:
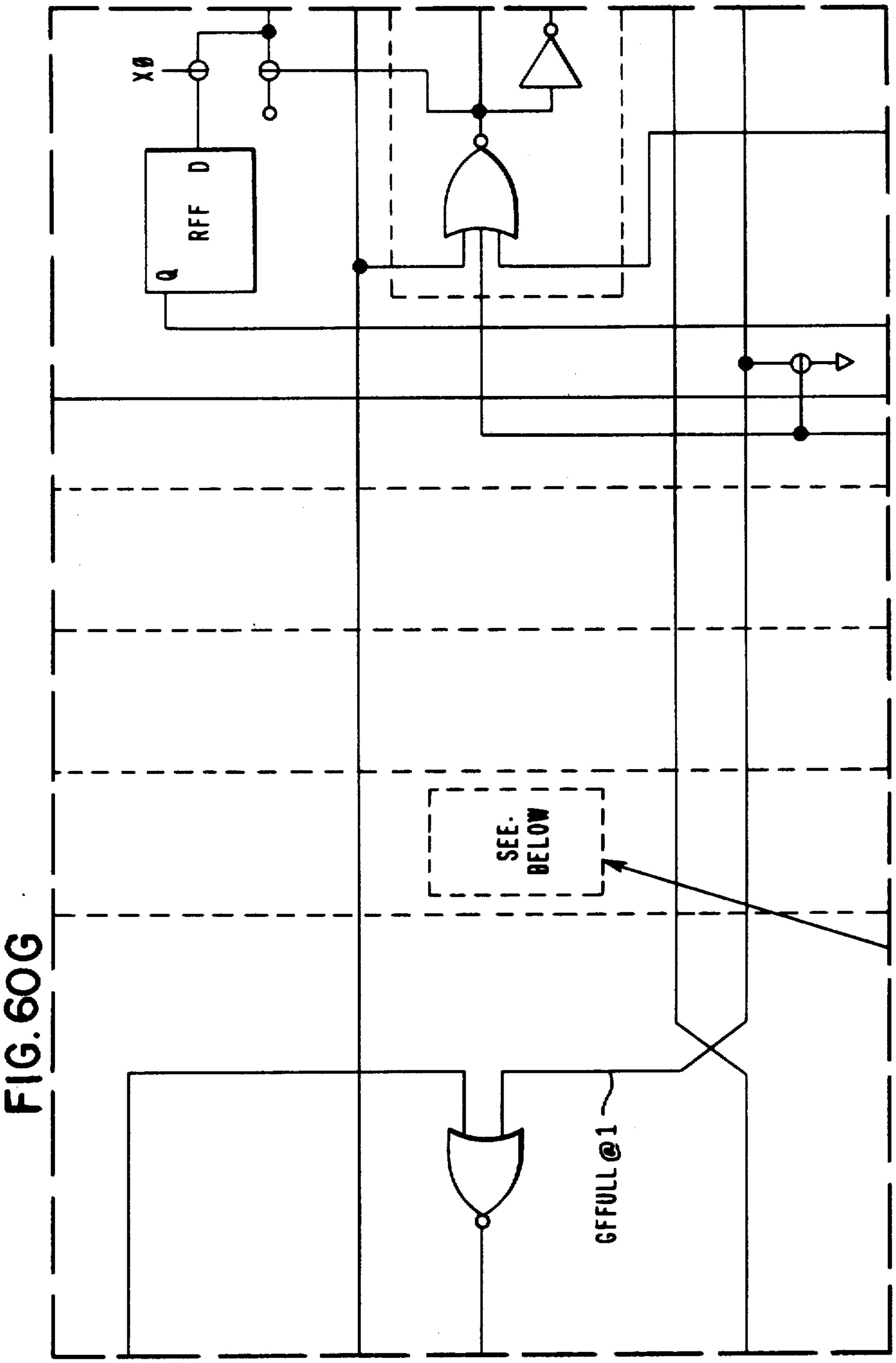
Figure 60H:
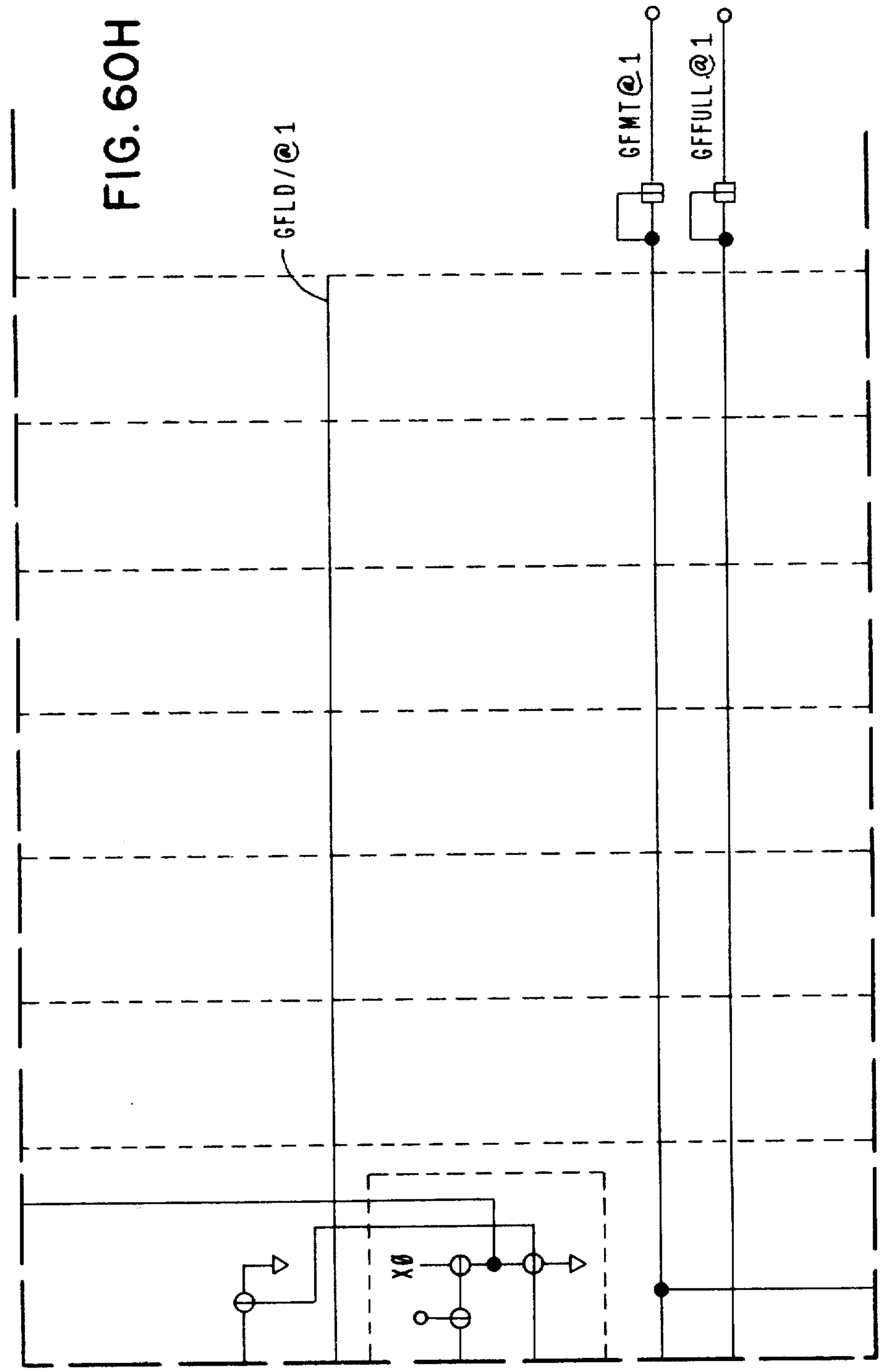
Figure 60I:
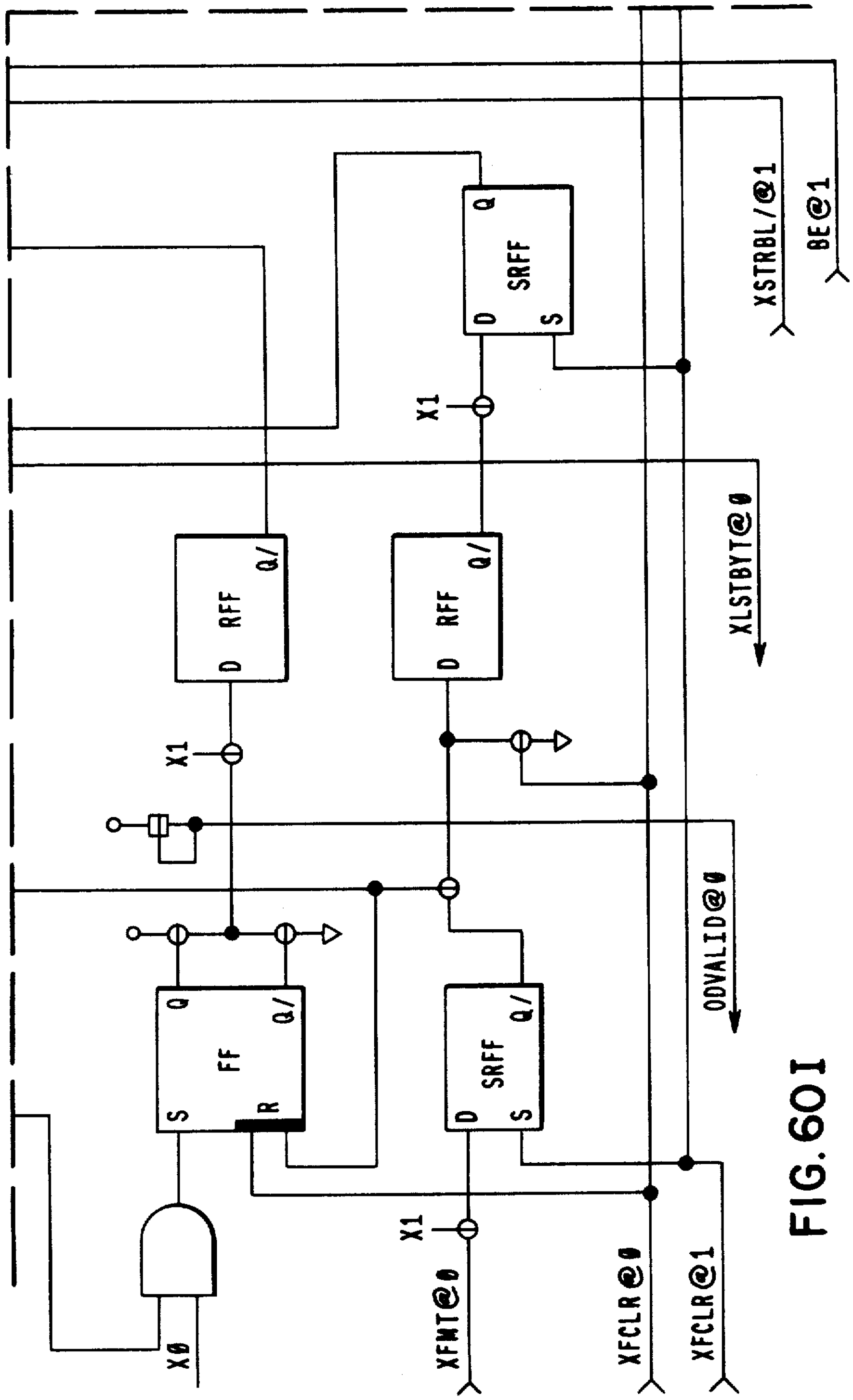
Figure 60J:
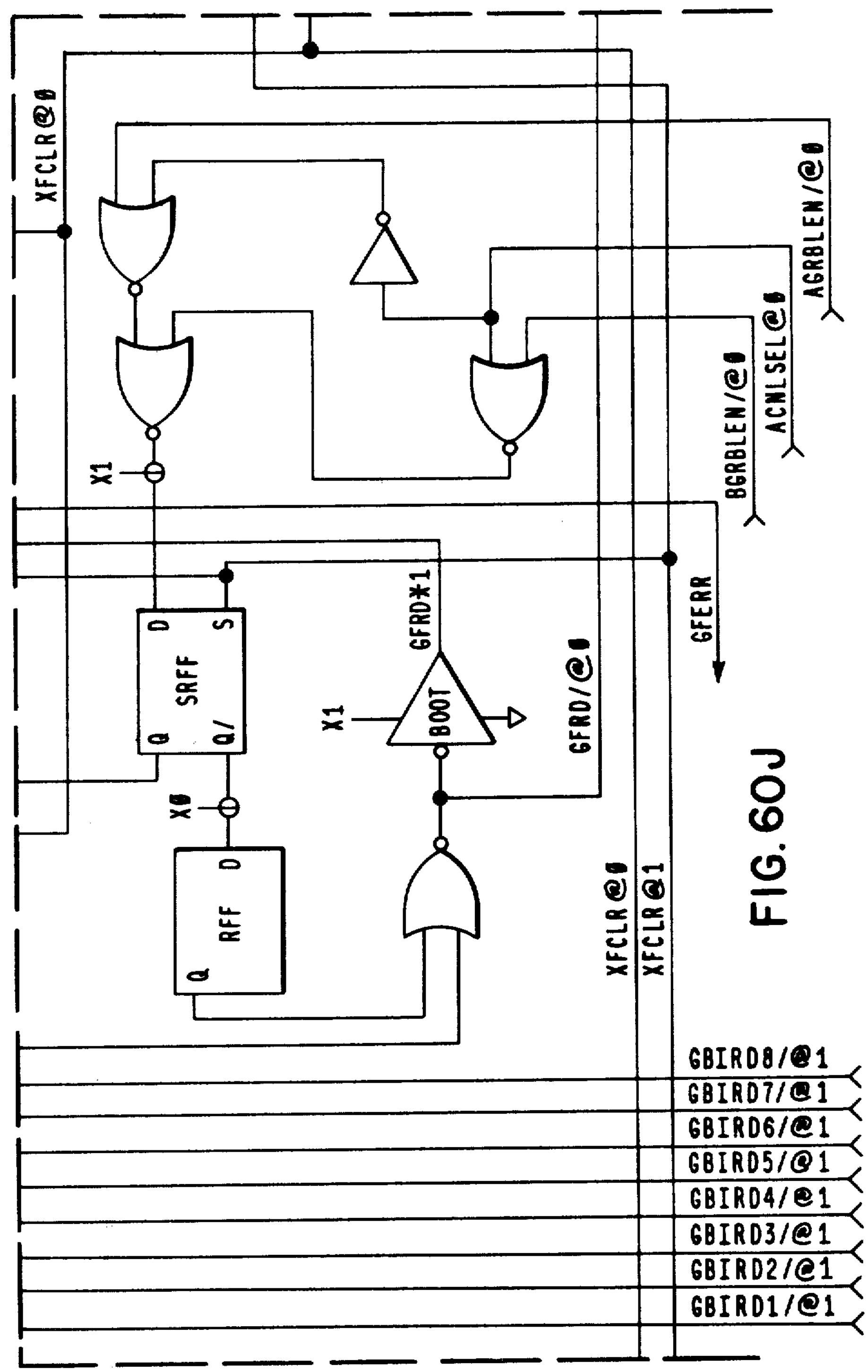
Figure 60K:
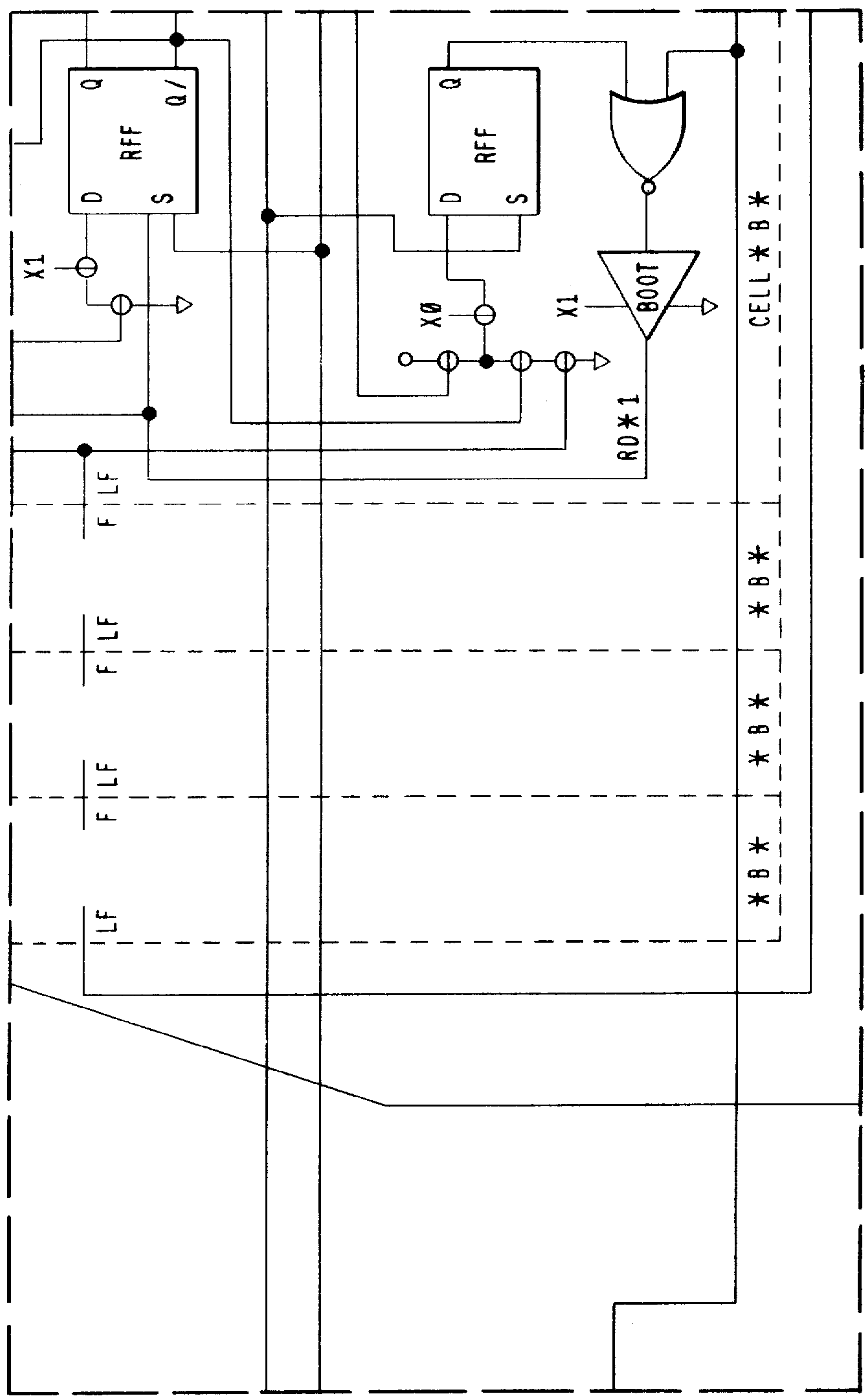
Figure 60L:
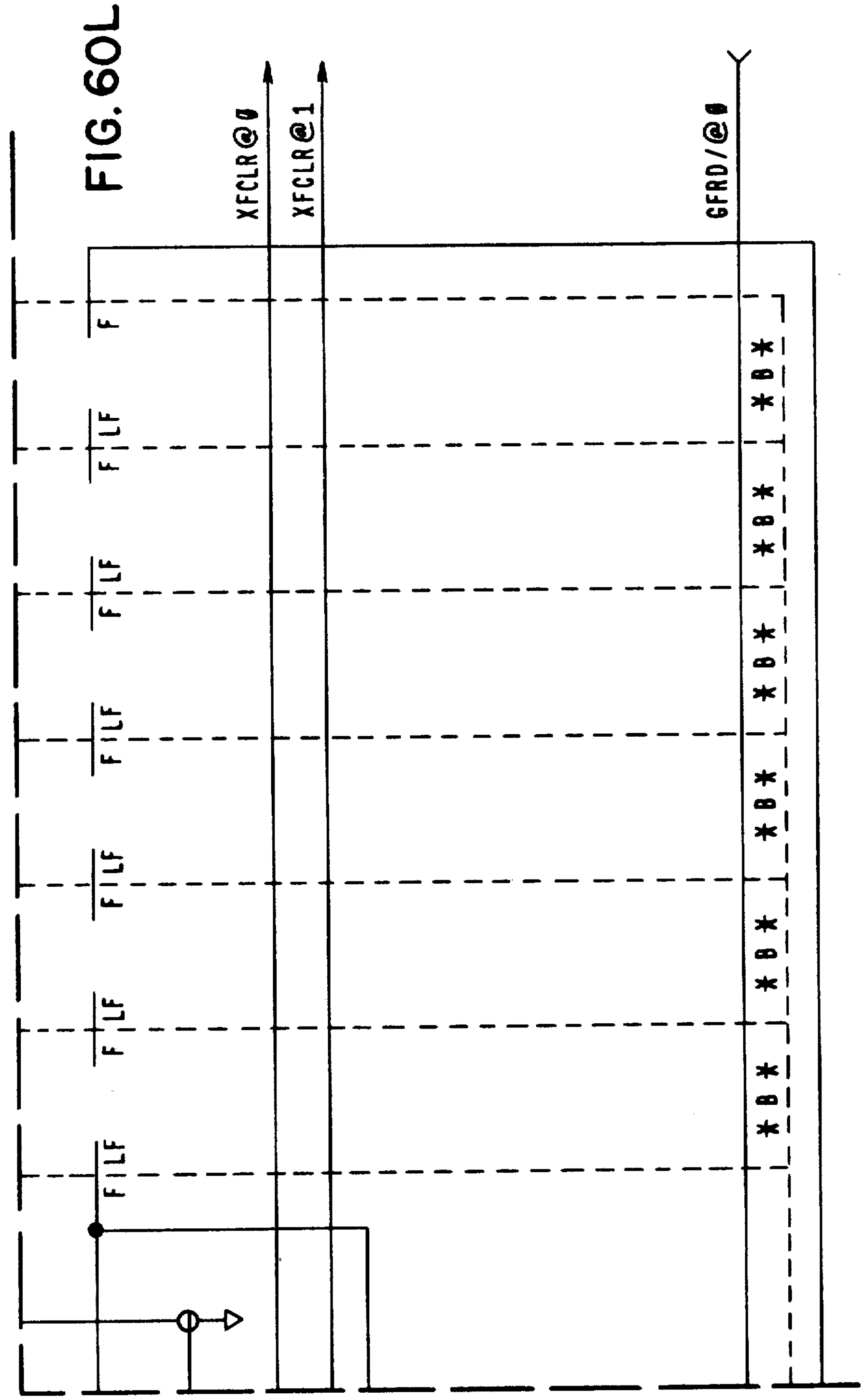
Figure 60:
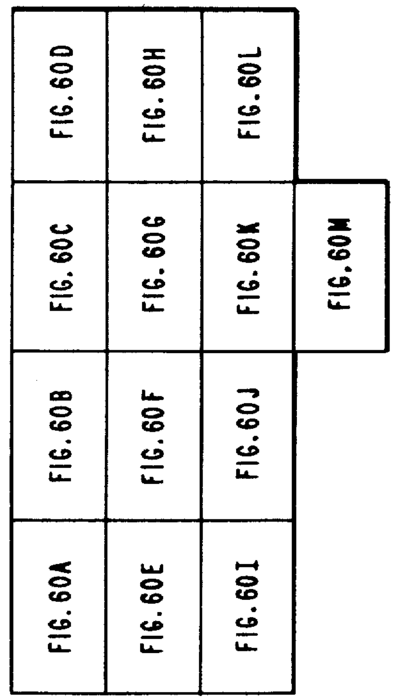
Figure 60M:
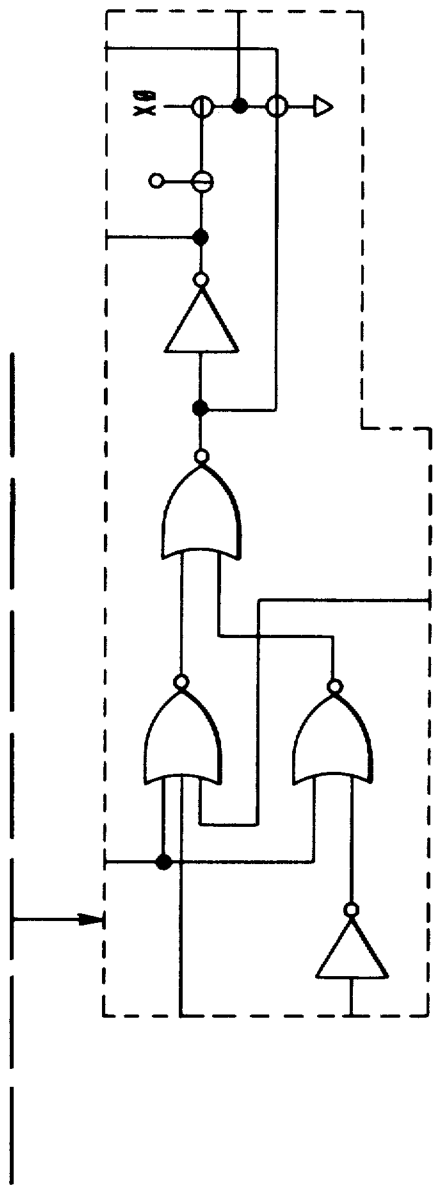
Figure 61A:
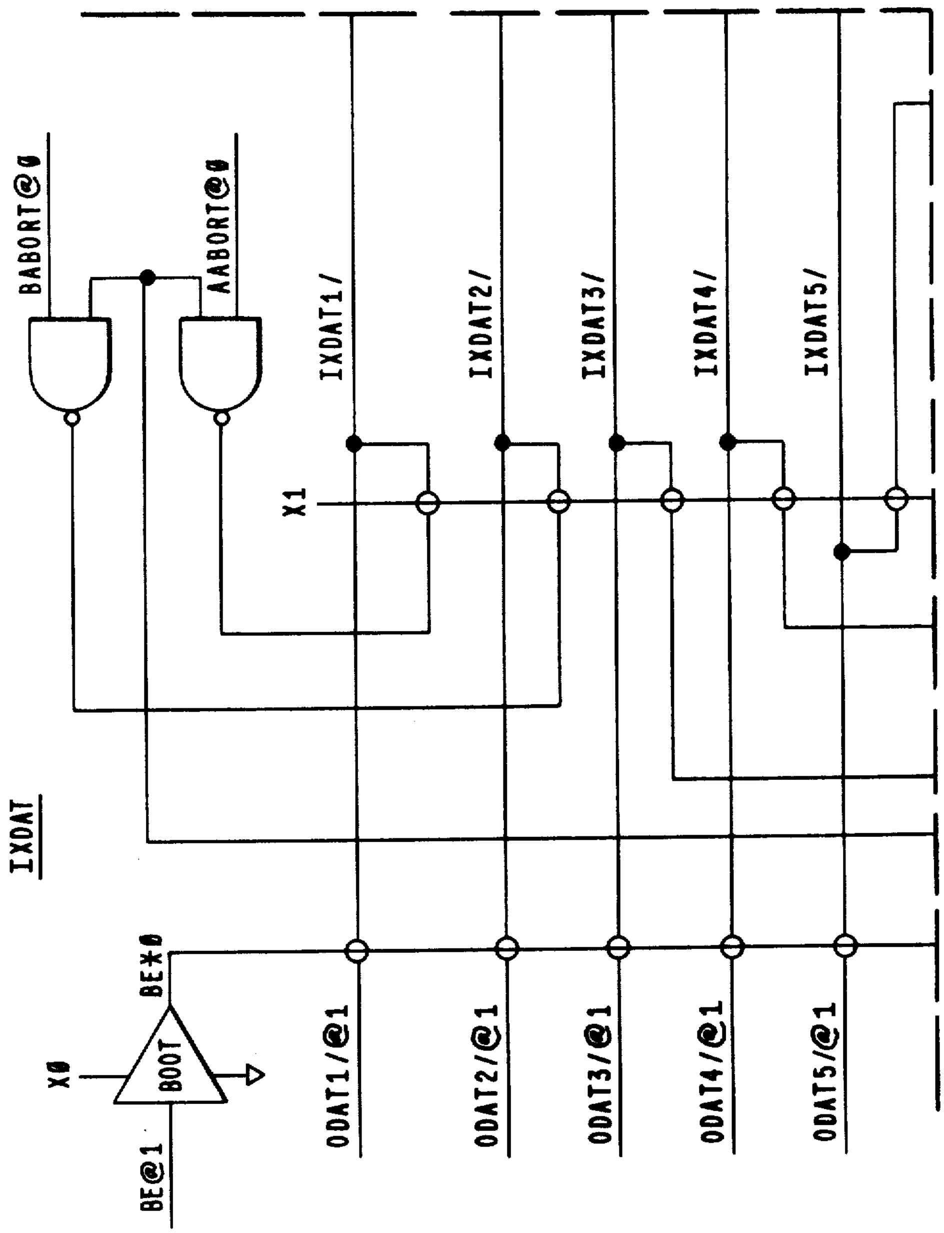
Figure 61B:
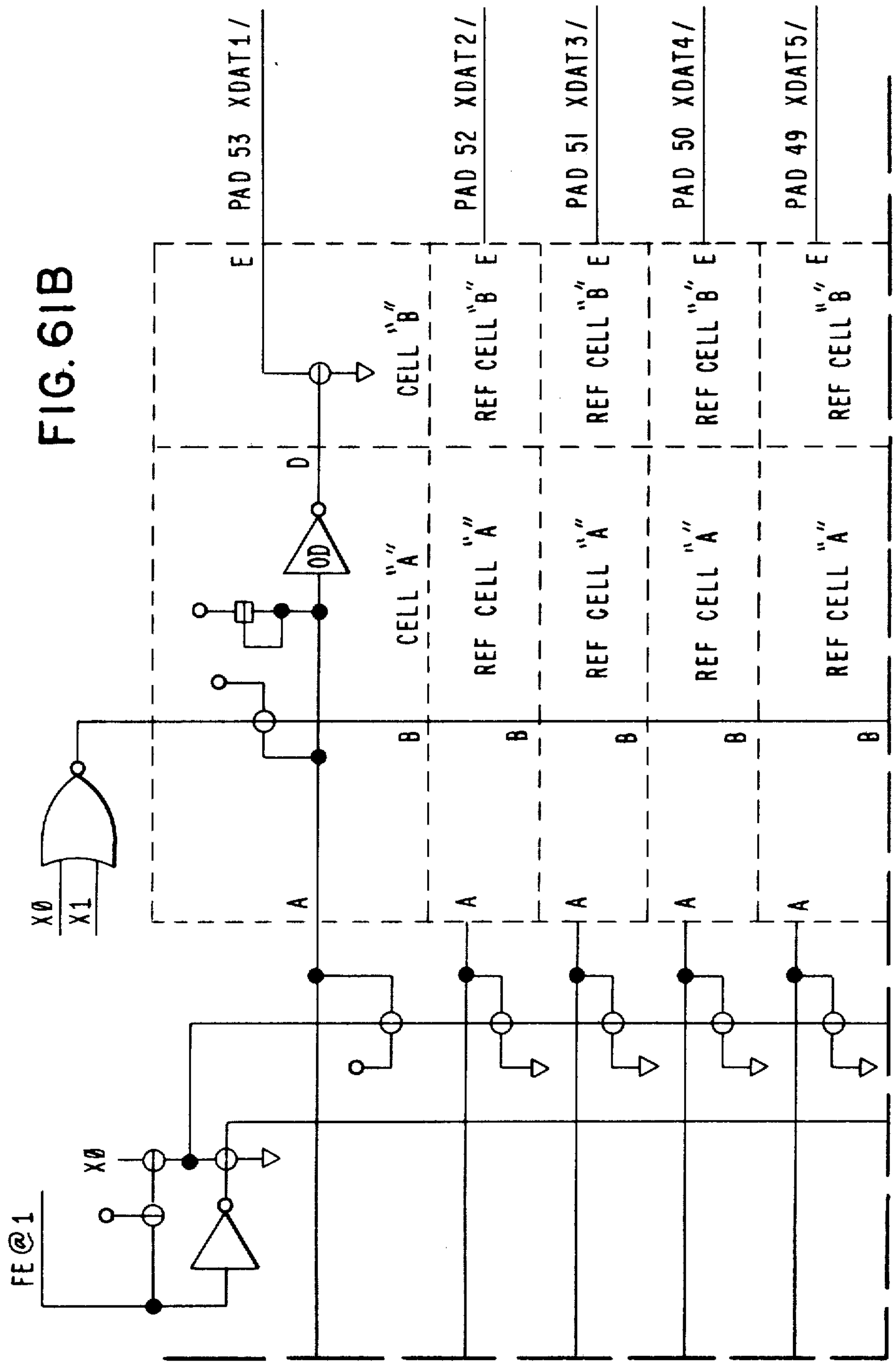
Figures 61C, 62:
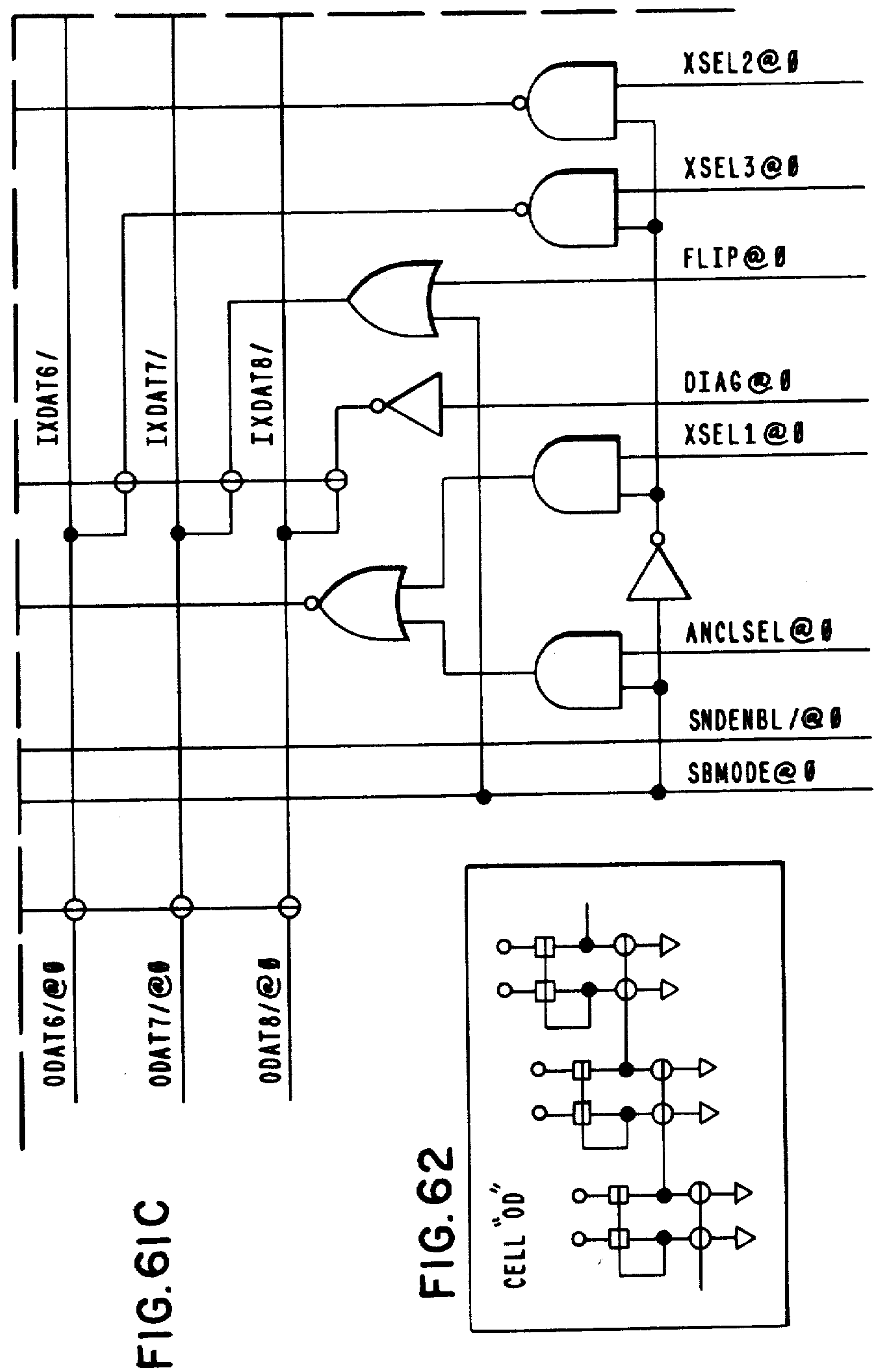
Figures 61, 61D:
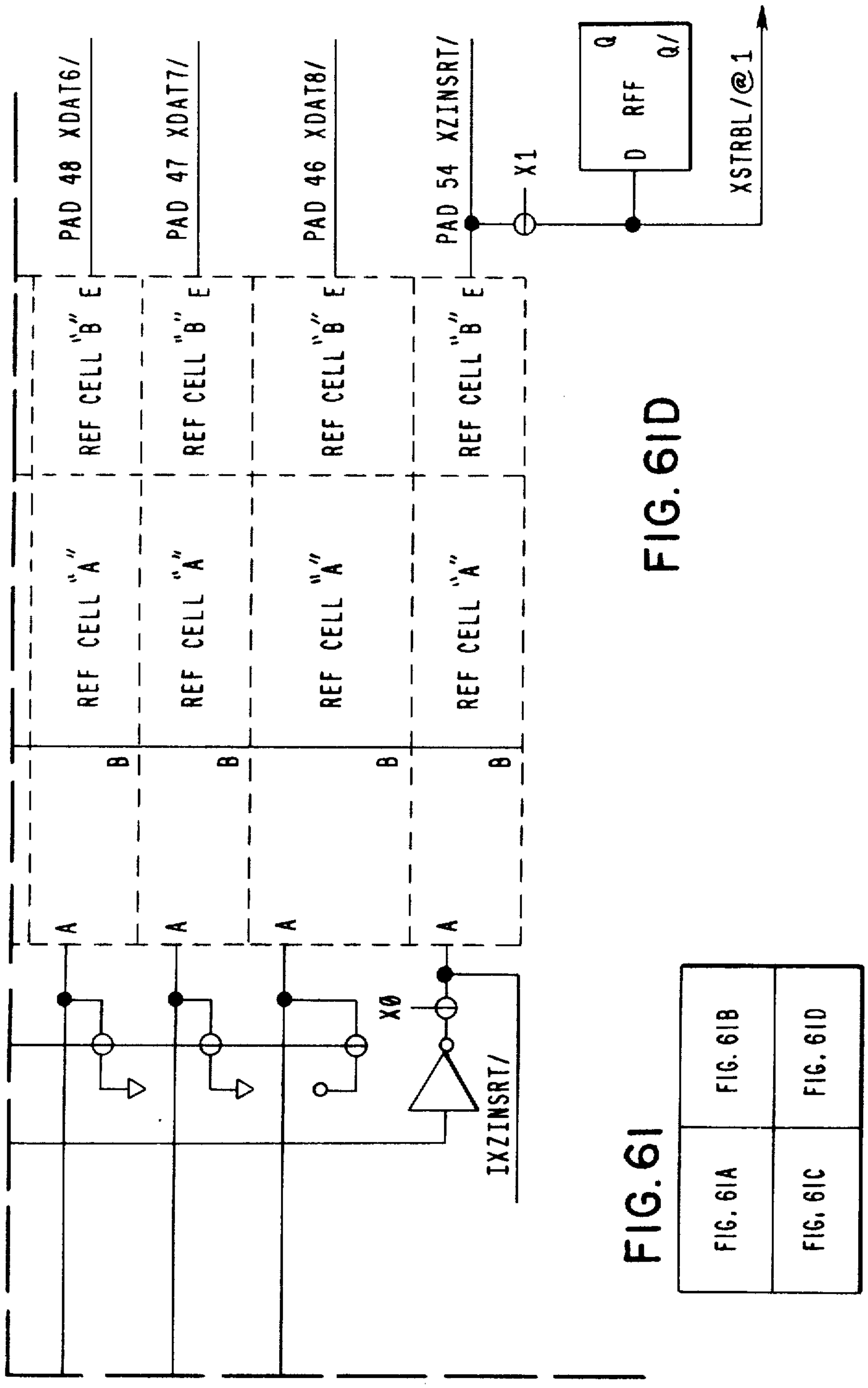
Figure 63A:
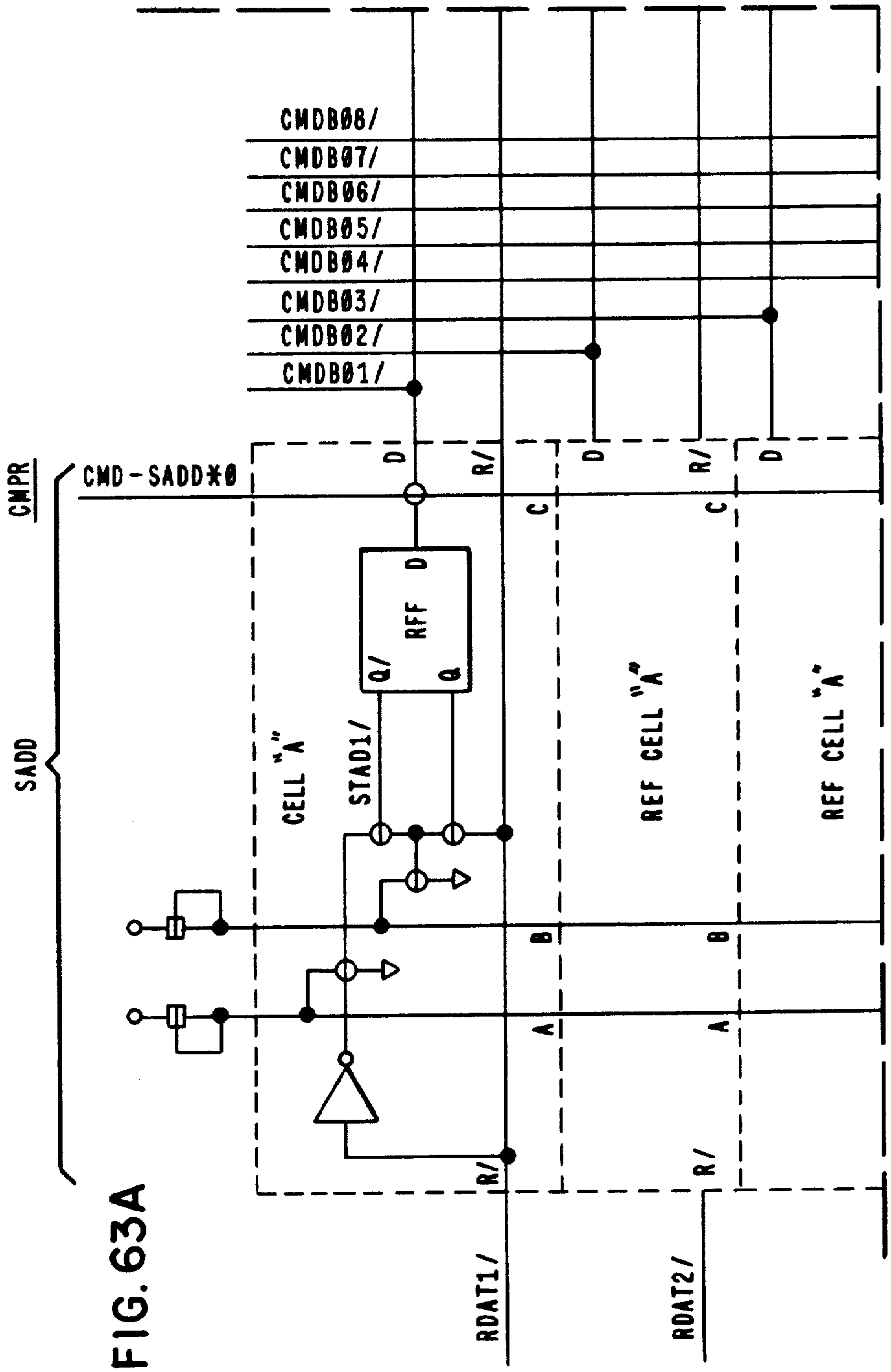
Figure 63B:
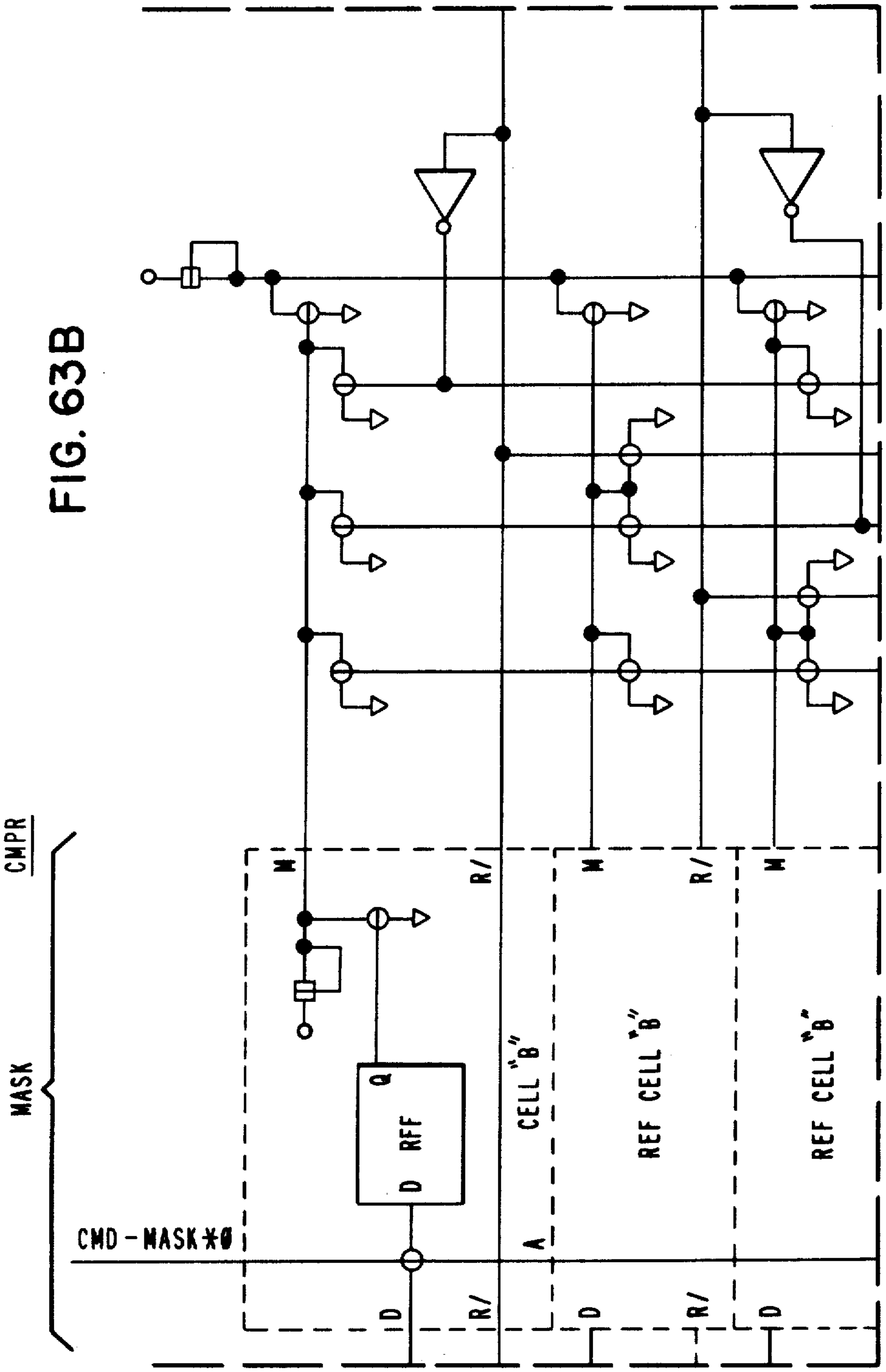
Figure 63C:
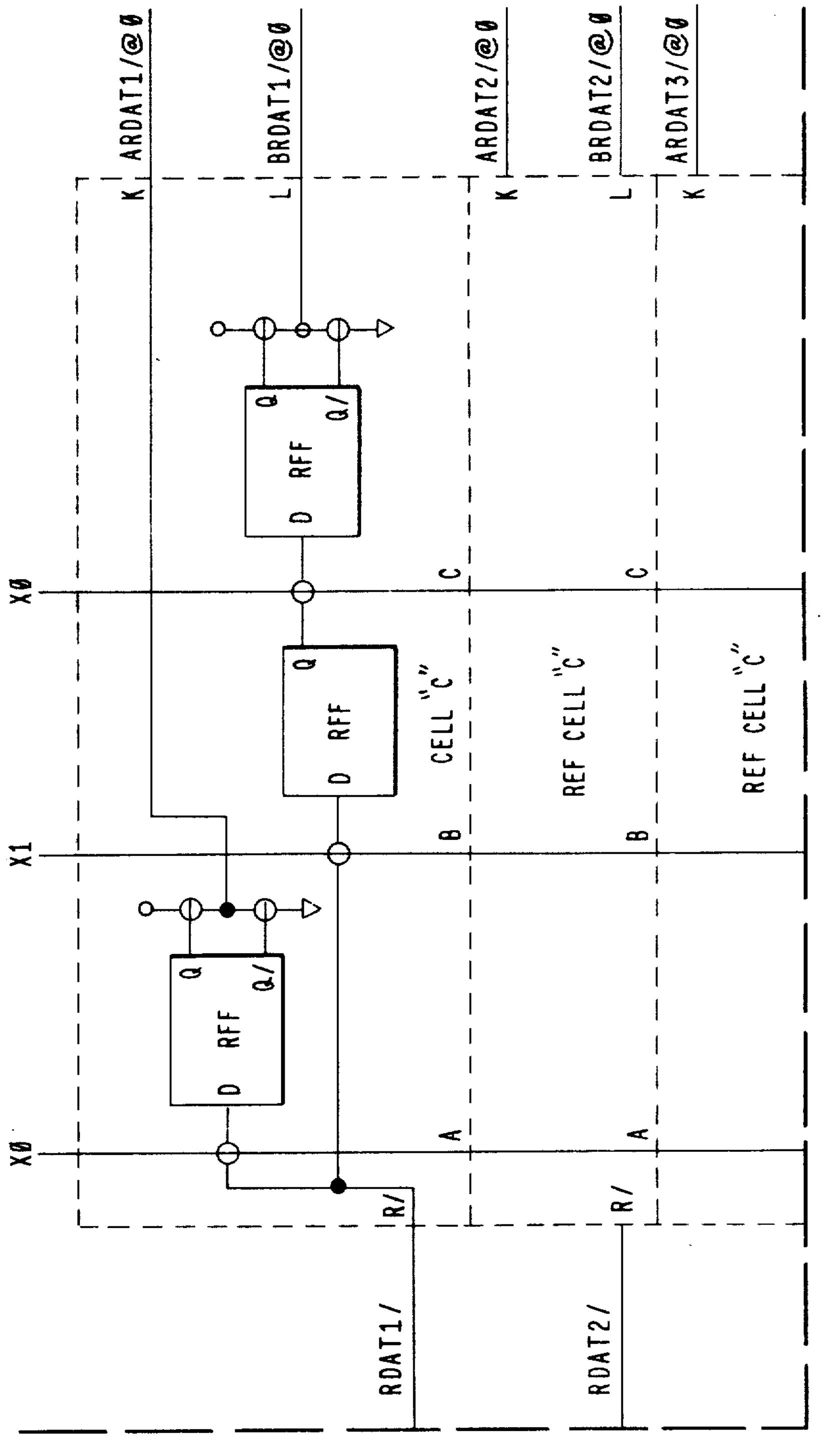
Figure 63D:
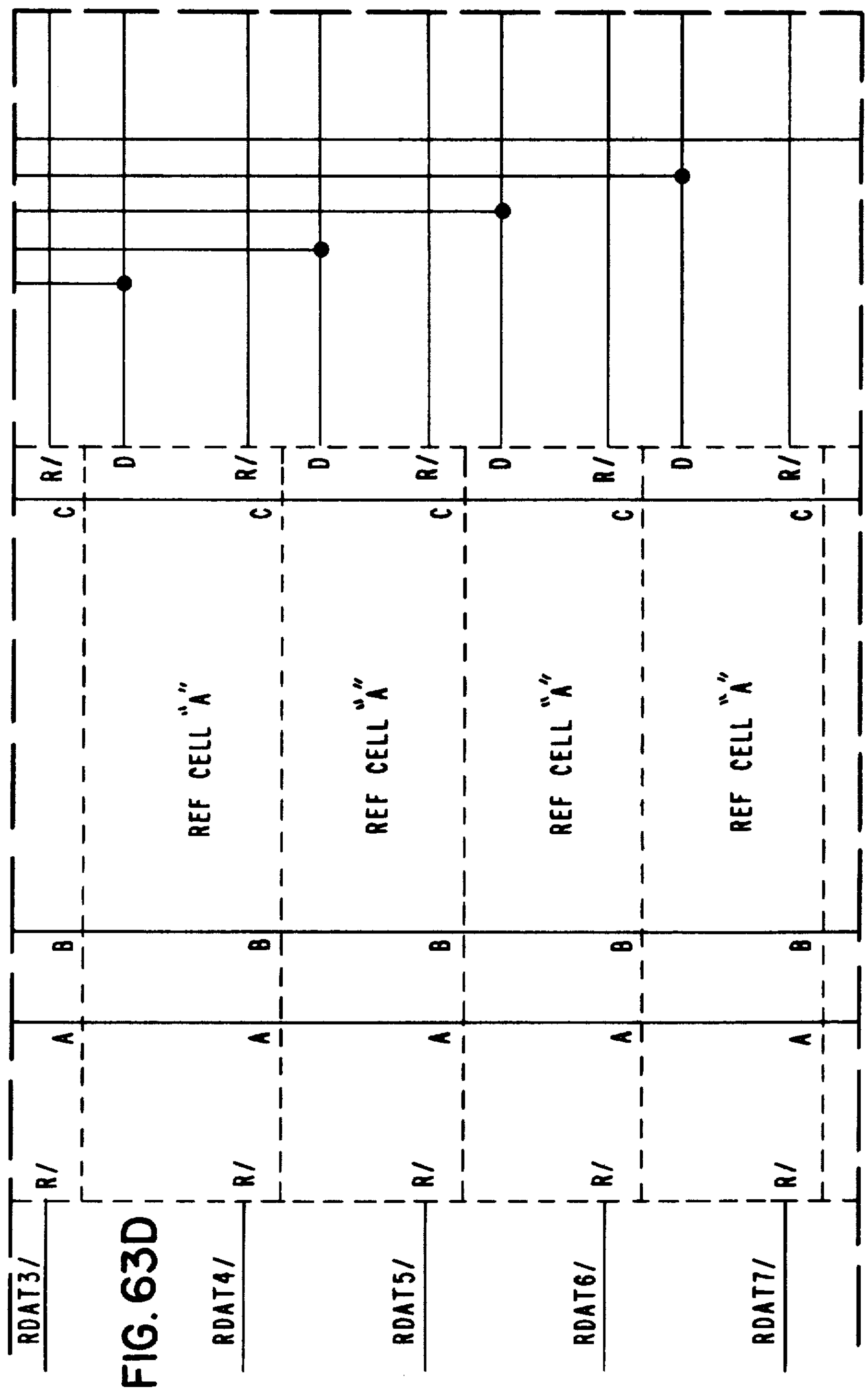
Figure 63E:
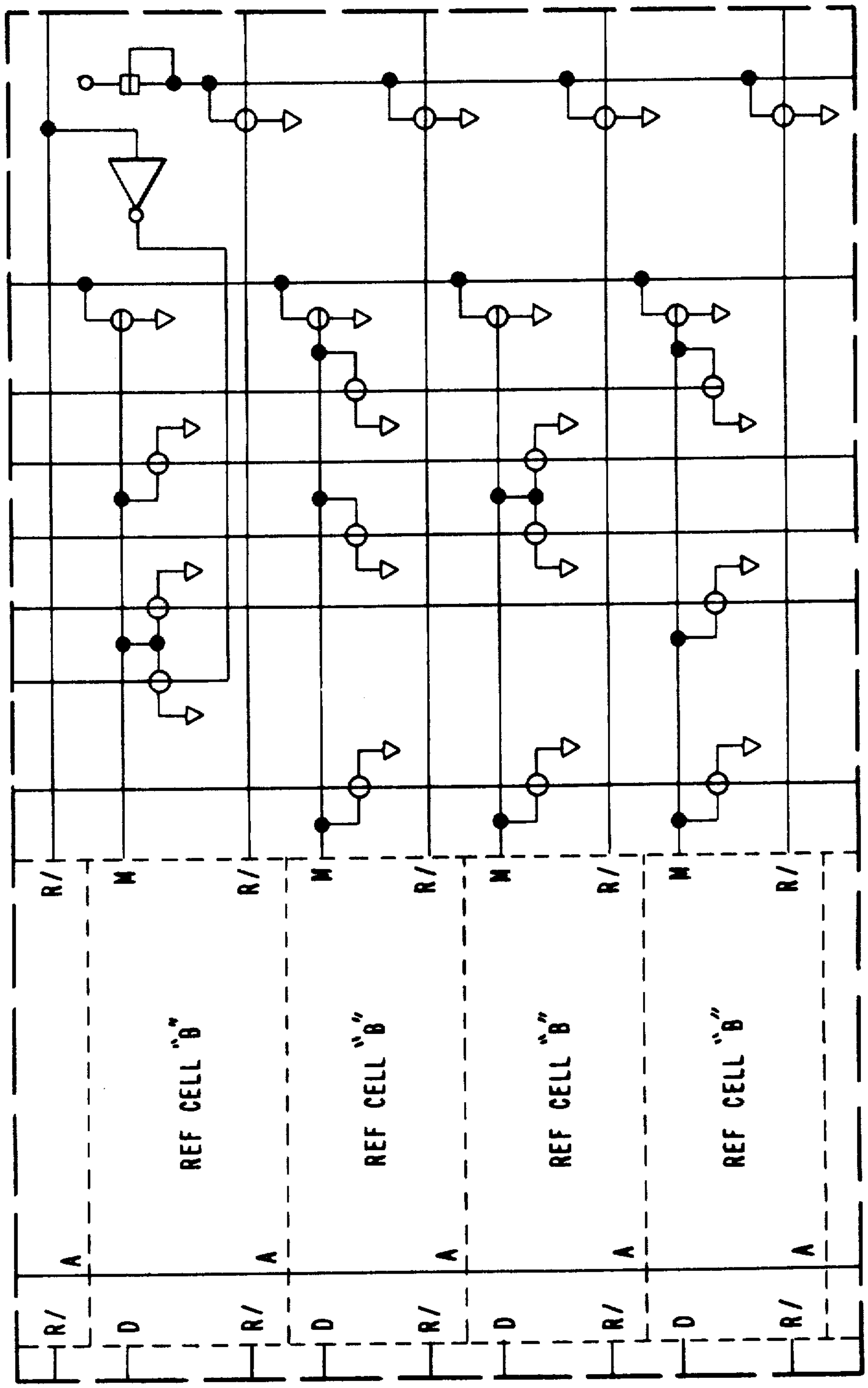
Figure 63F:
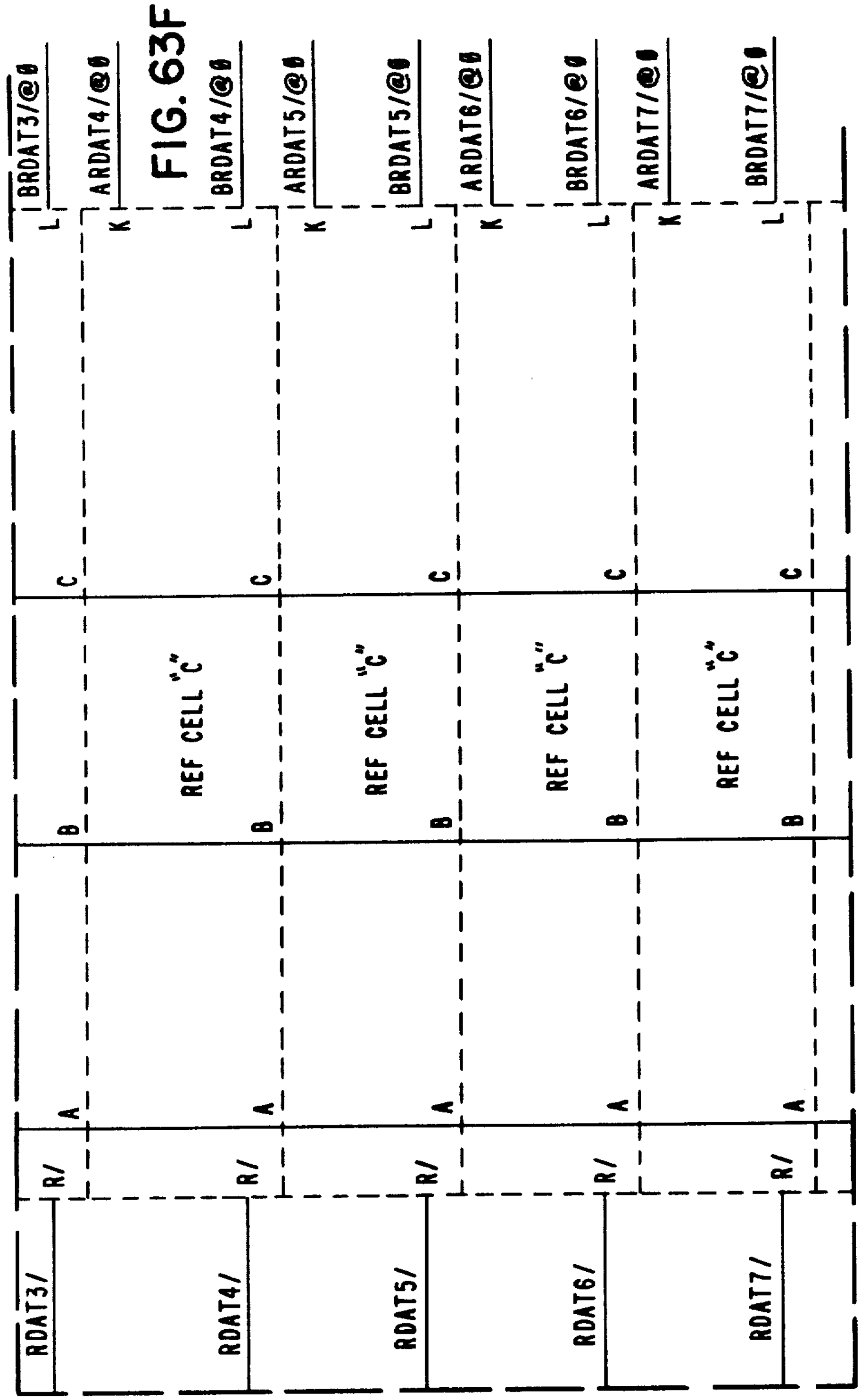
Figure 63H:
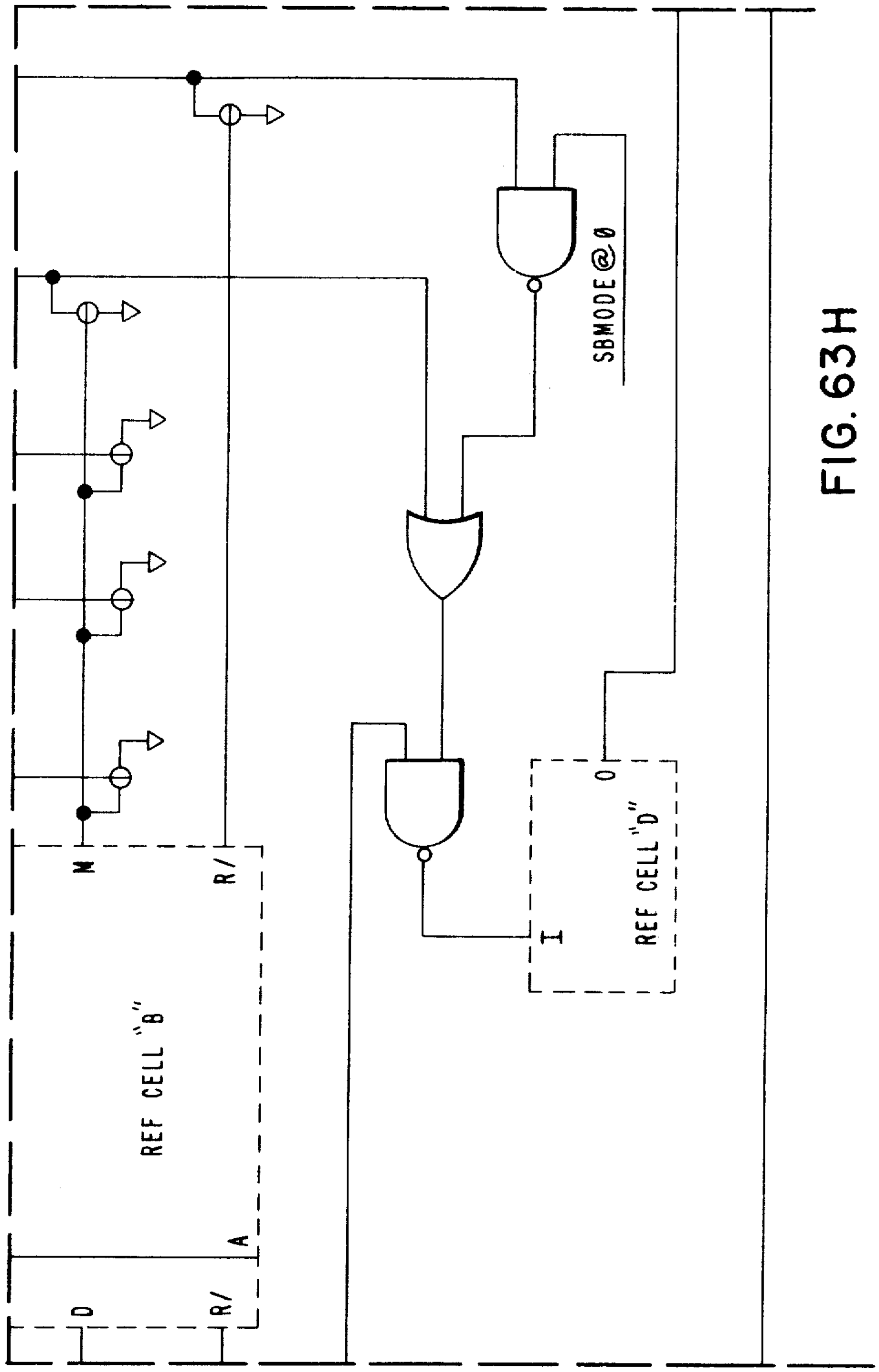
Figure 63I:
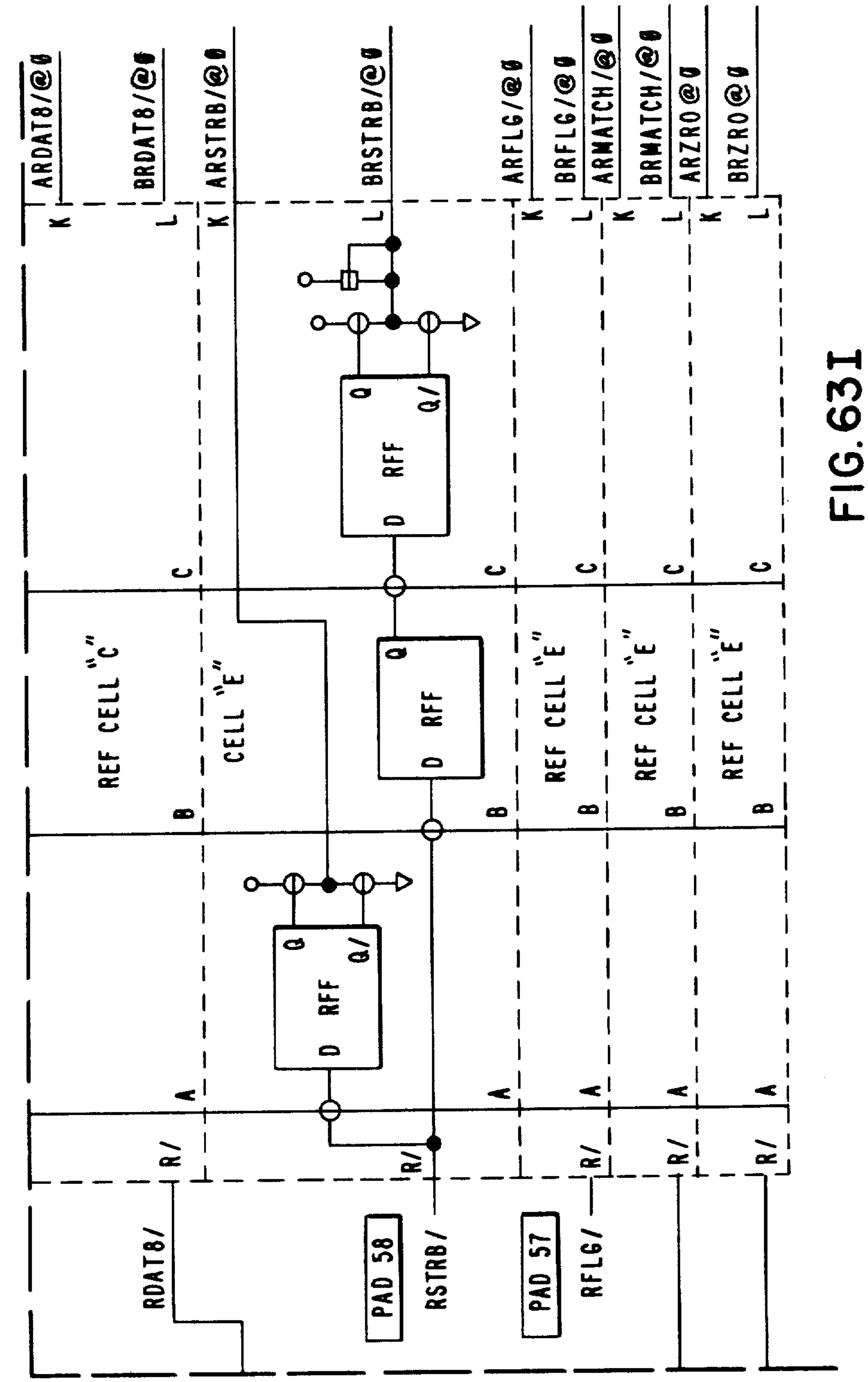
Figure 64A:
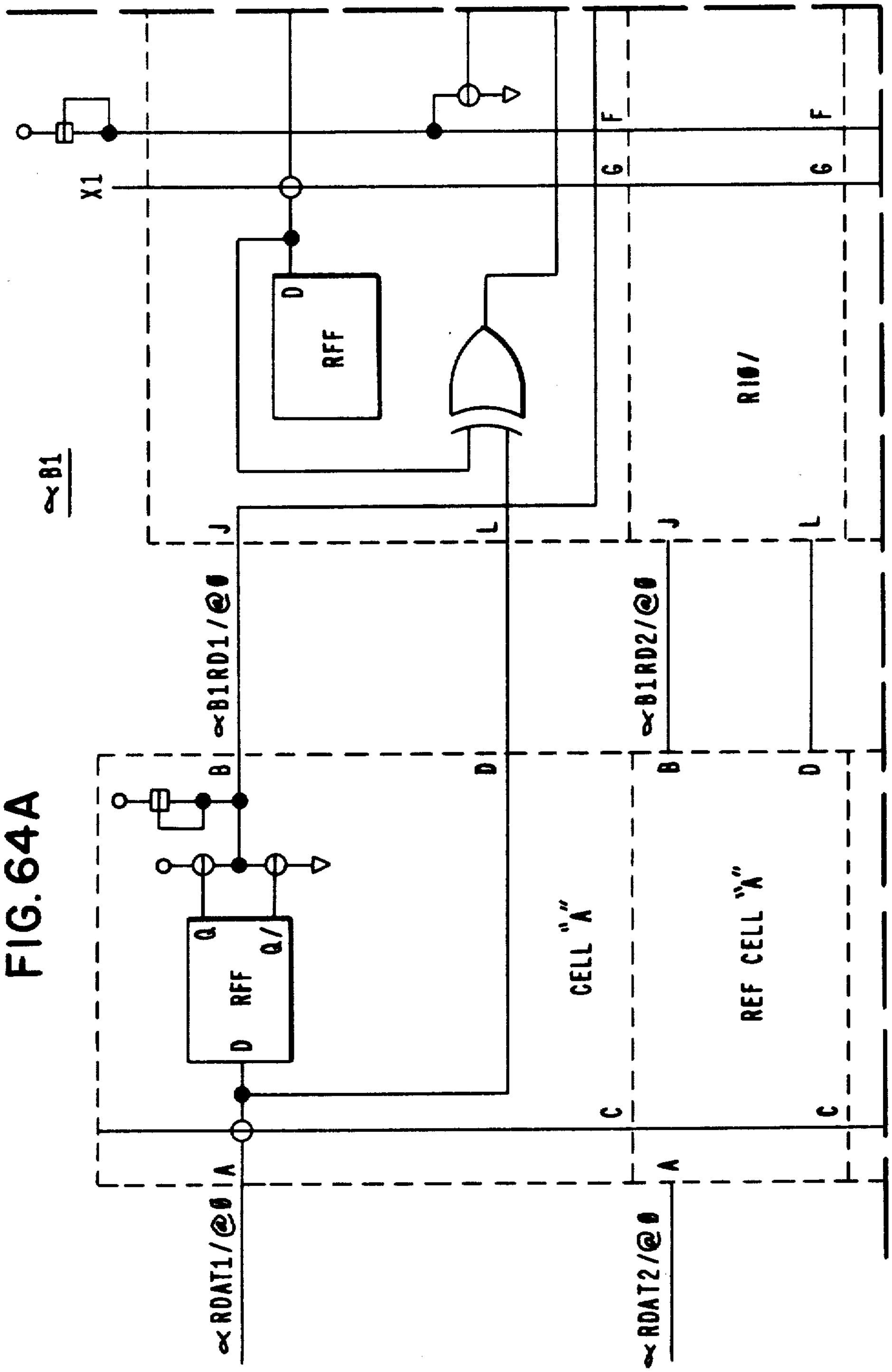
Figure 64B:
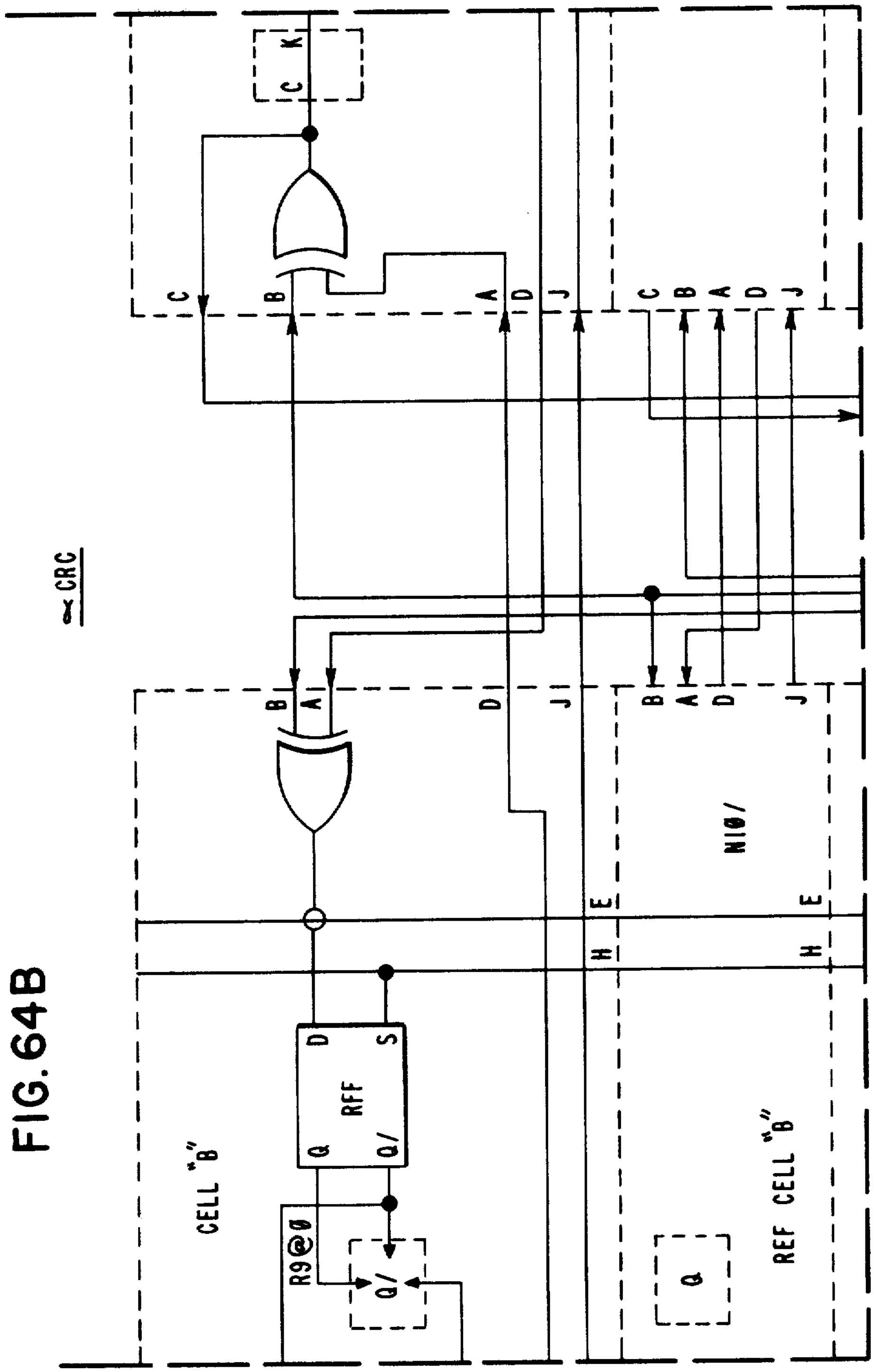
Figure 64C:
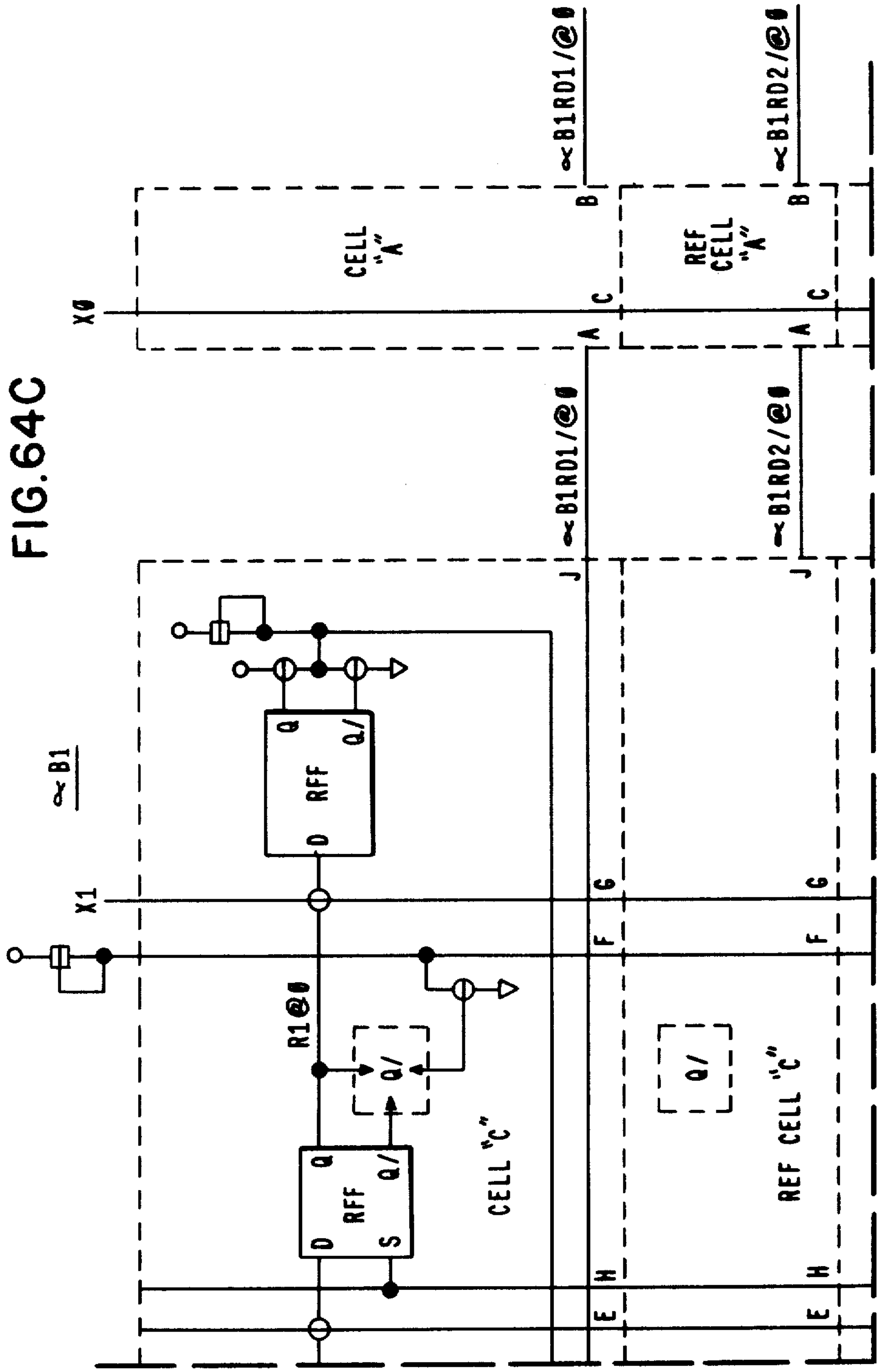
Figure 64D:
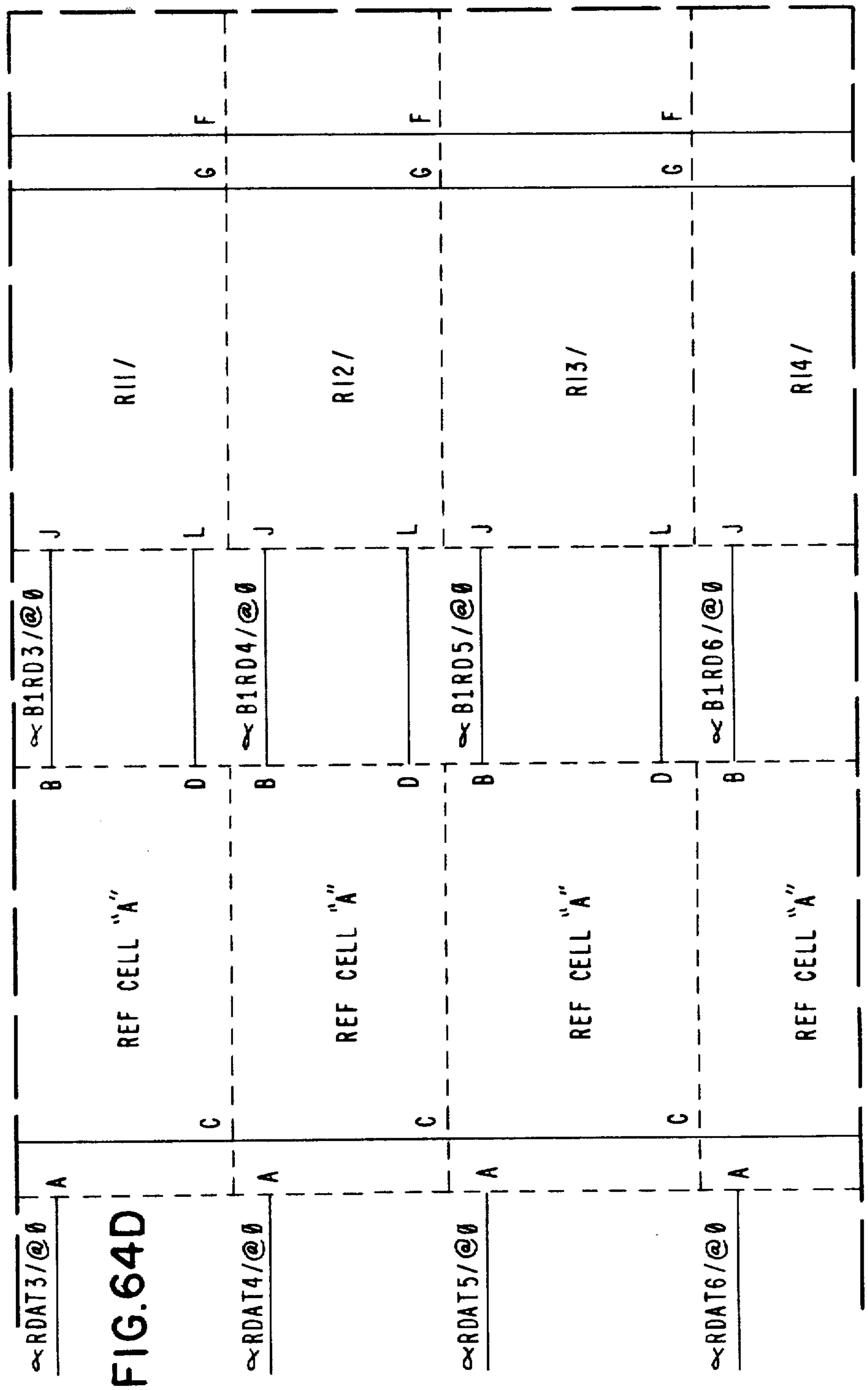
Figure 64E:
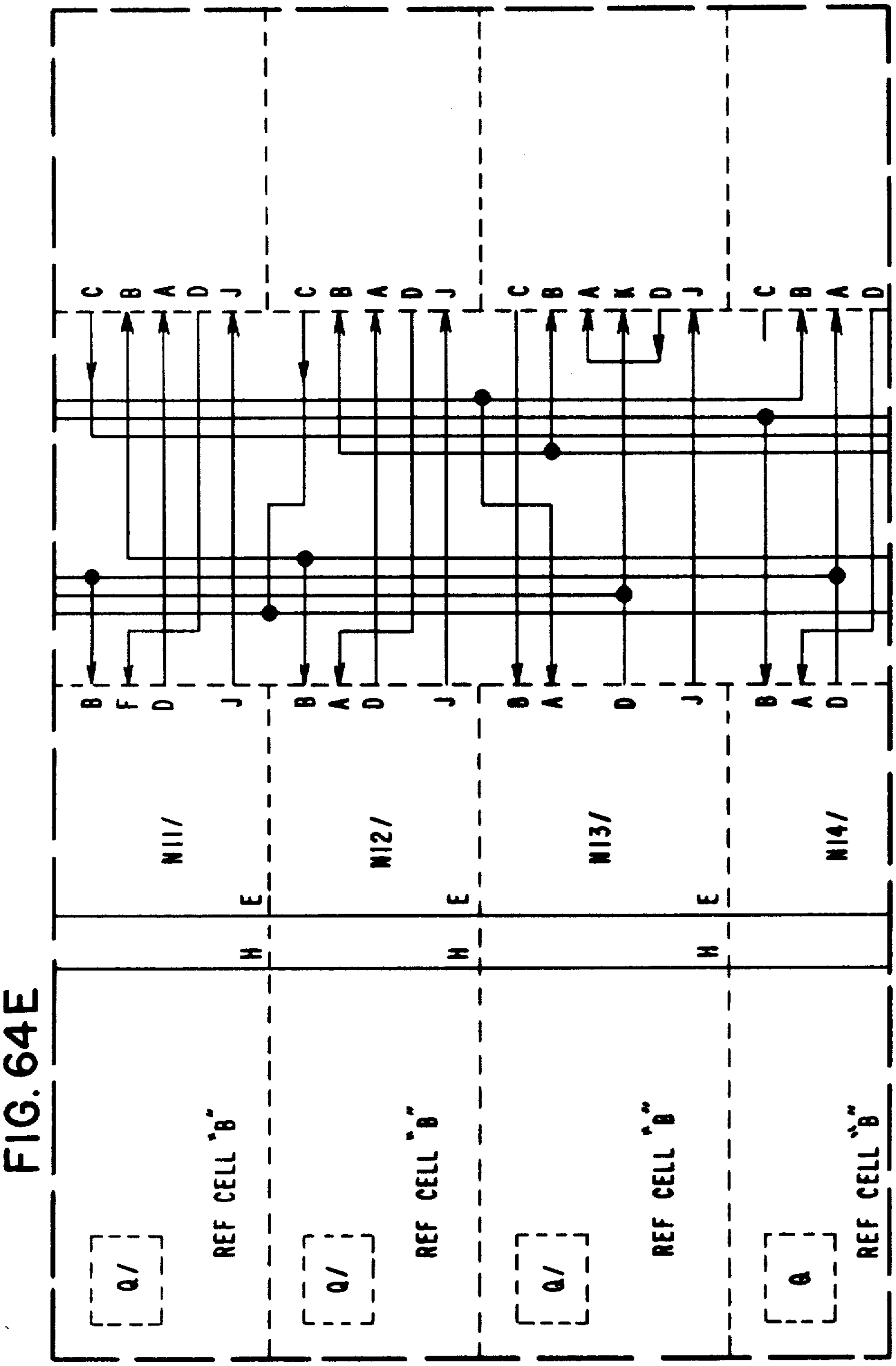
Figure 64F:
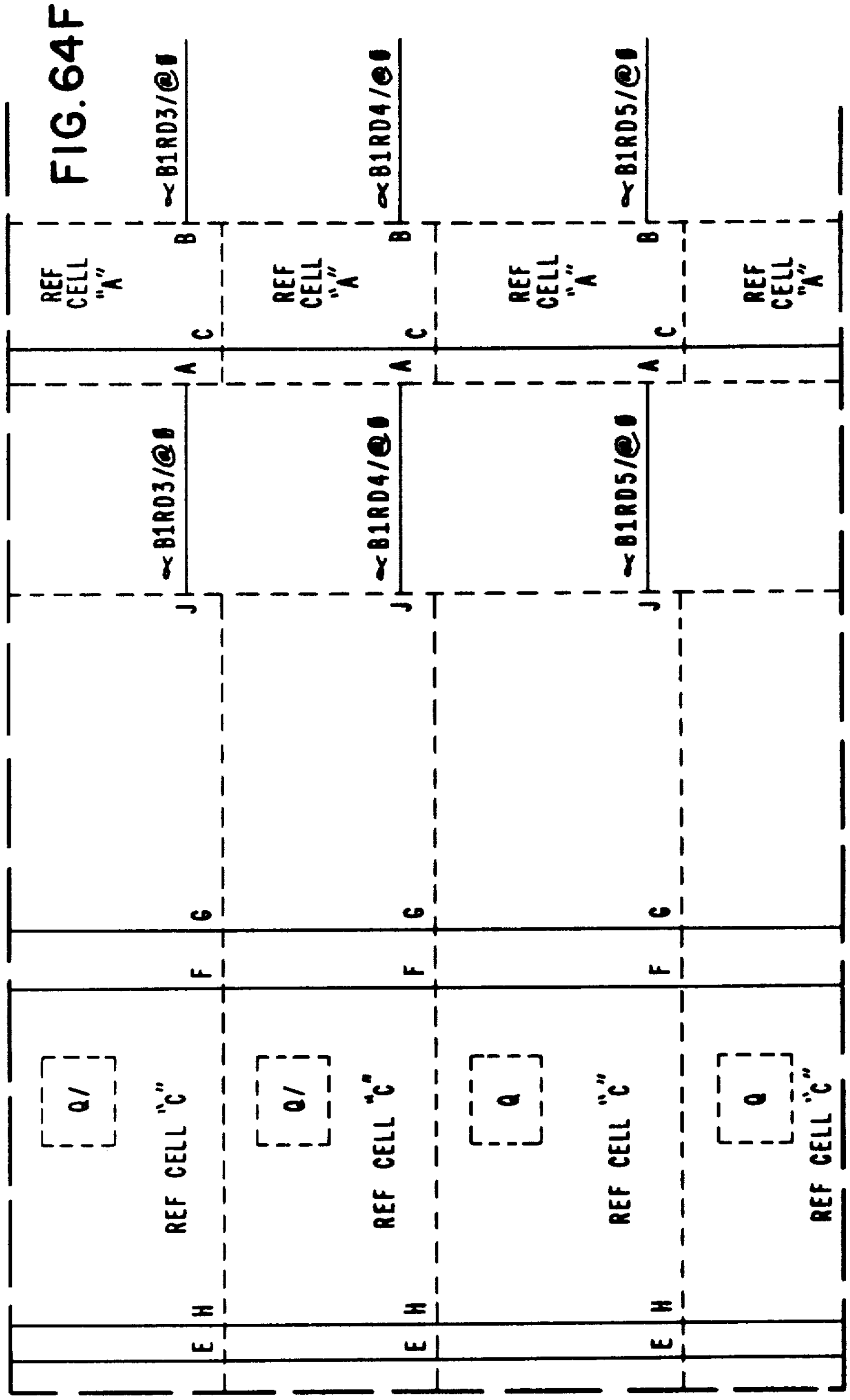
Figure 64G:
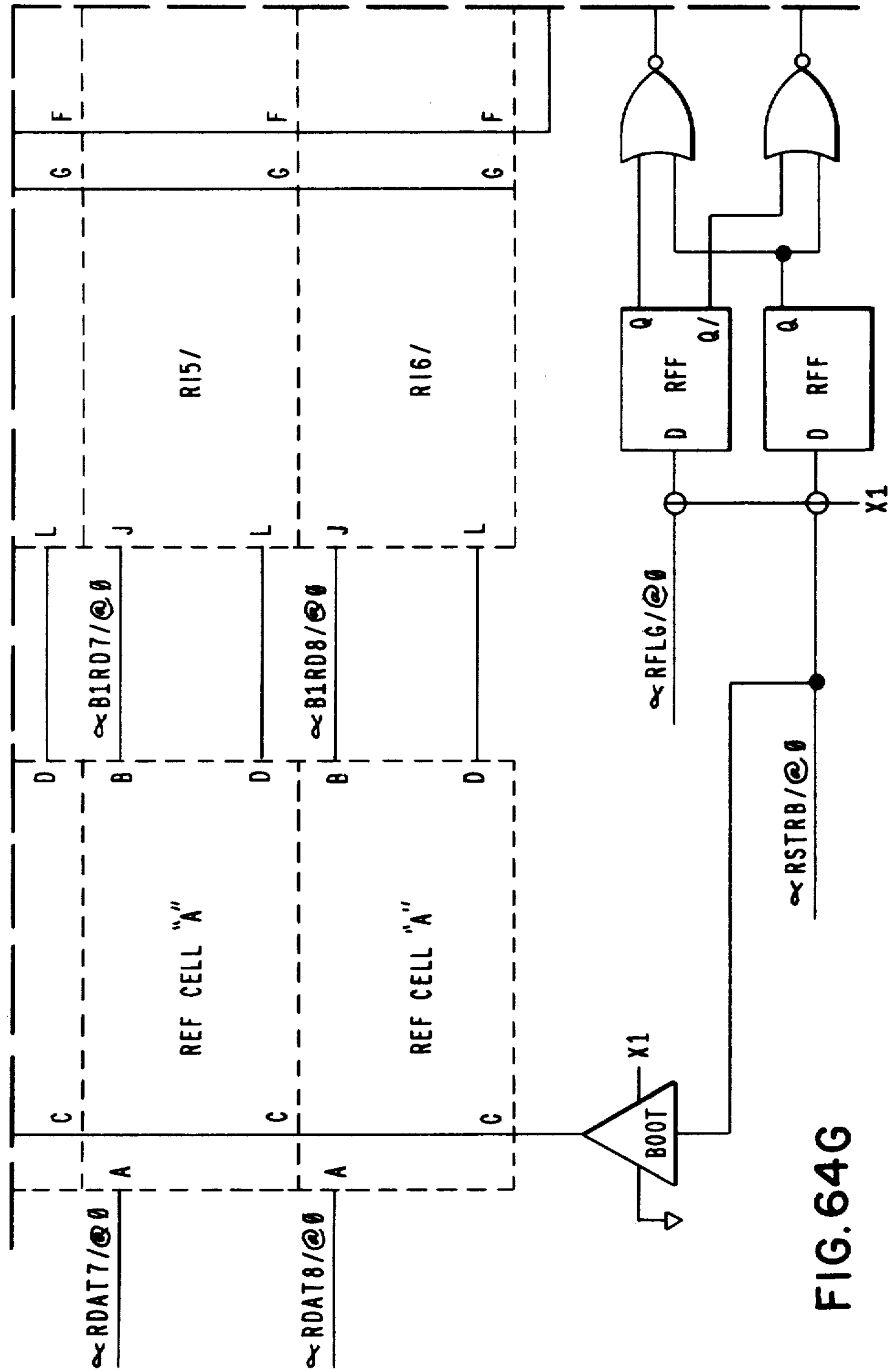
Figure 64H:
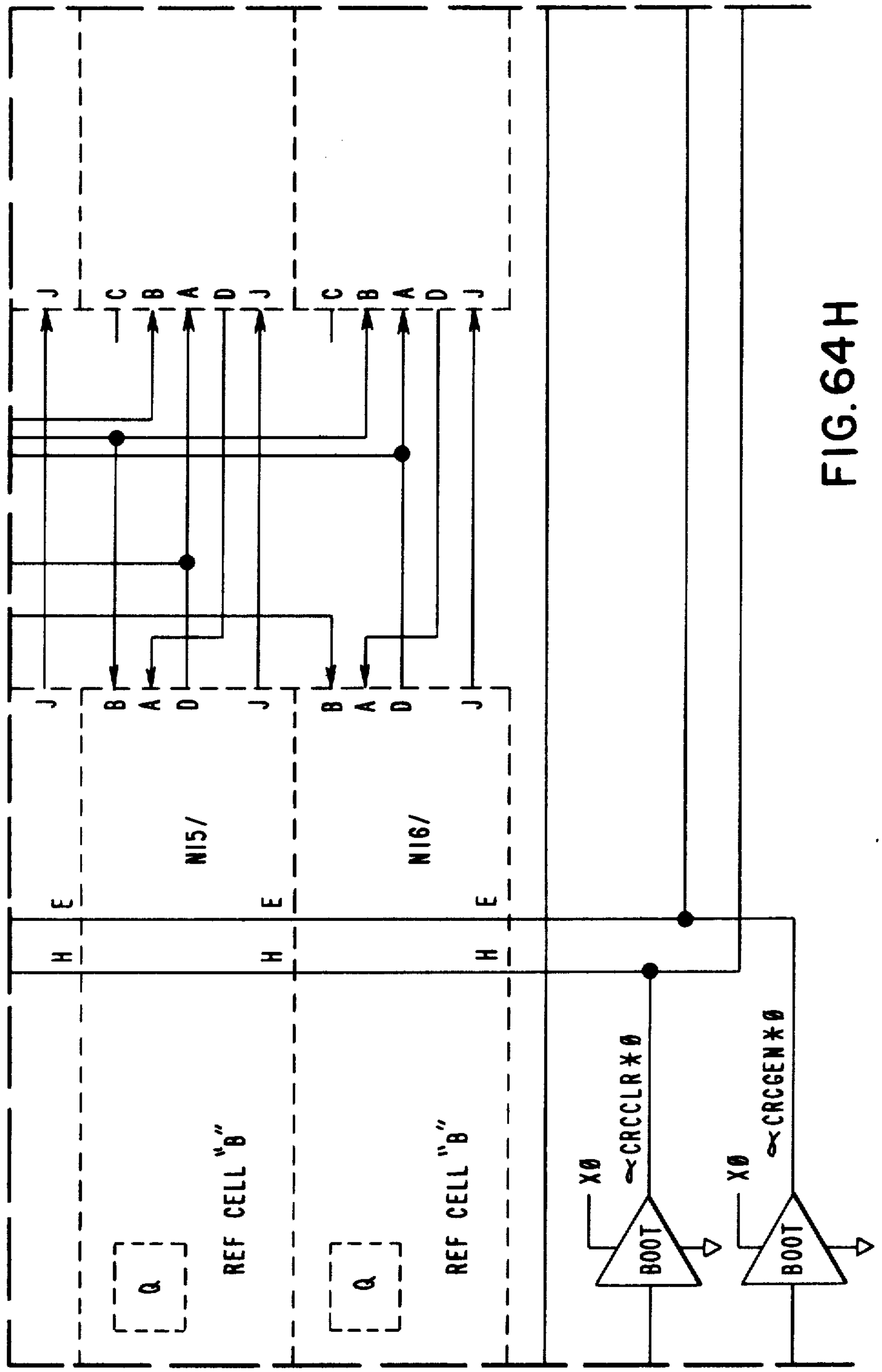
Figures 64, 64I:
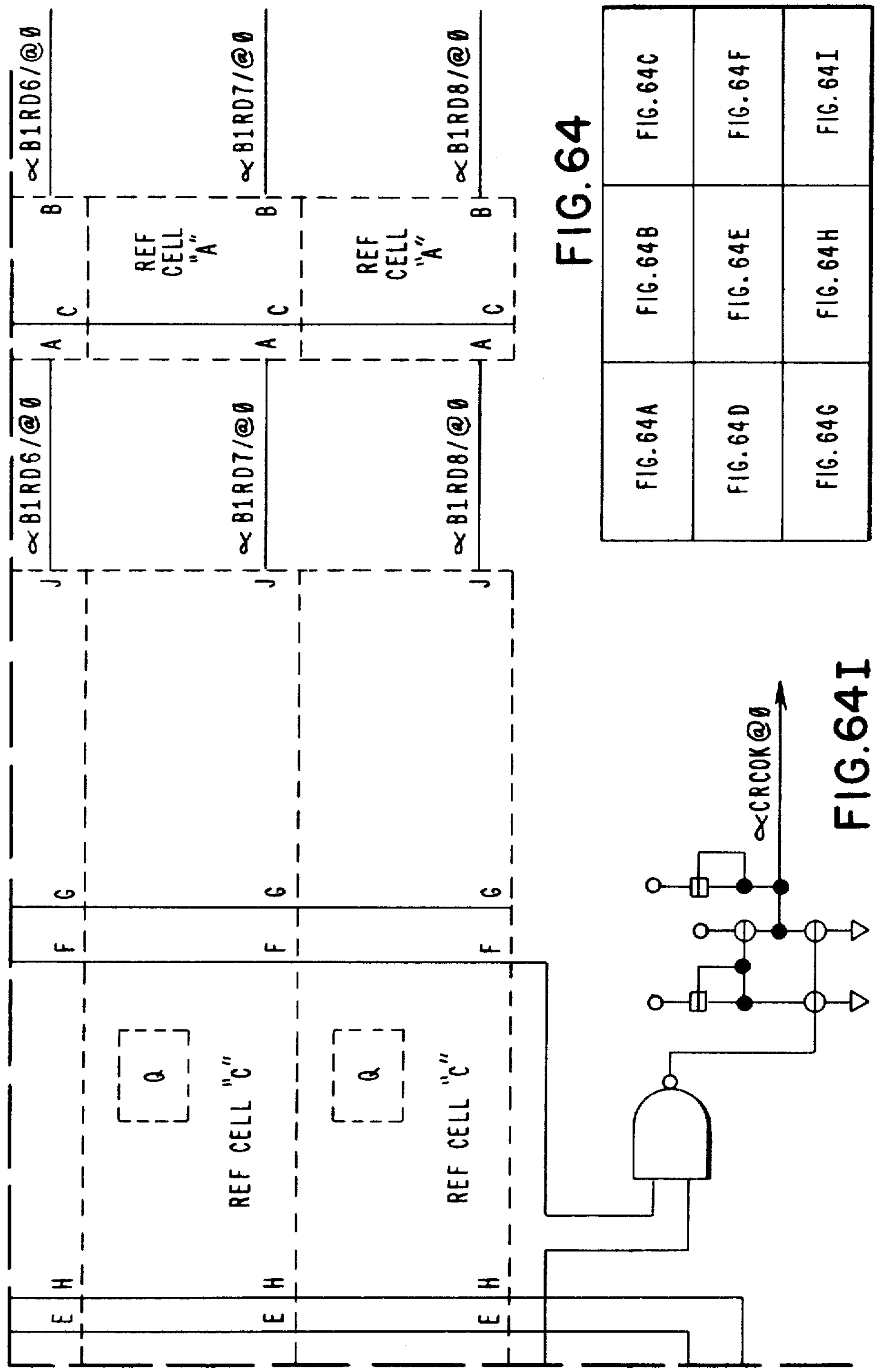
Figure 65A:
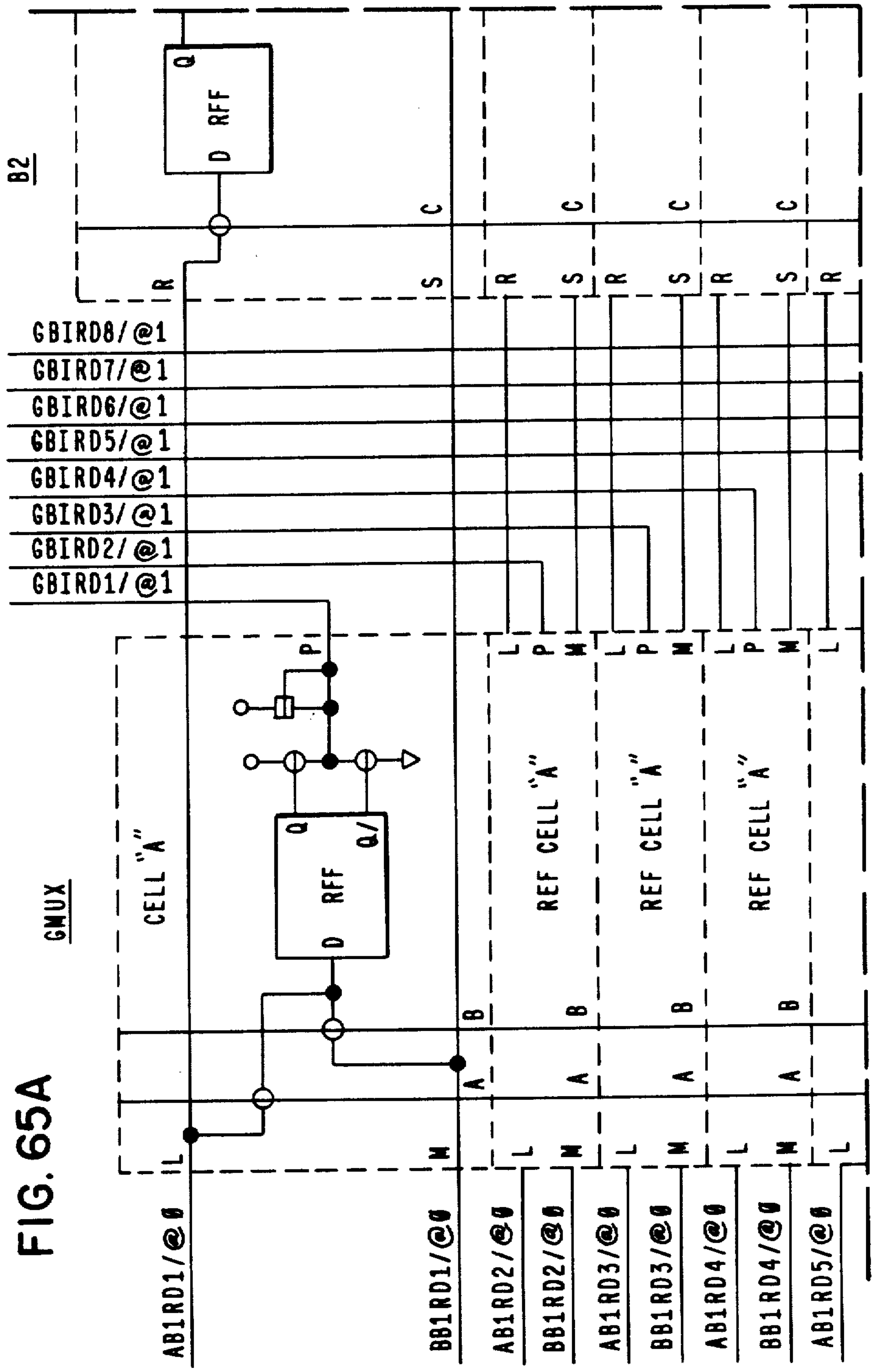
Figure 65B:
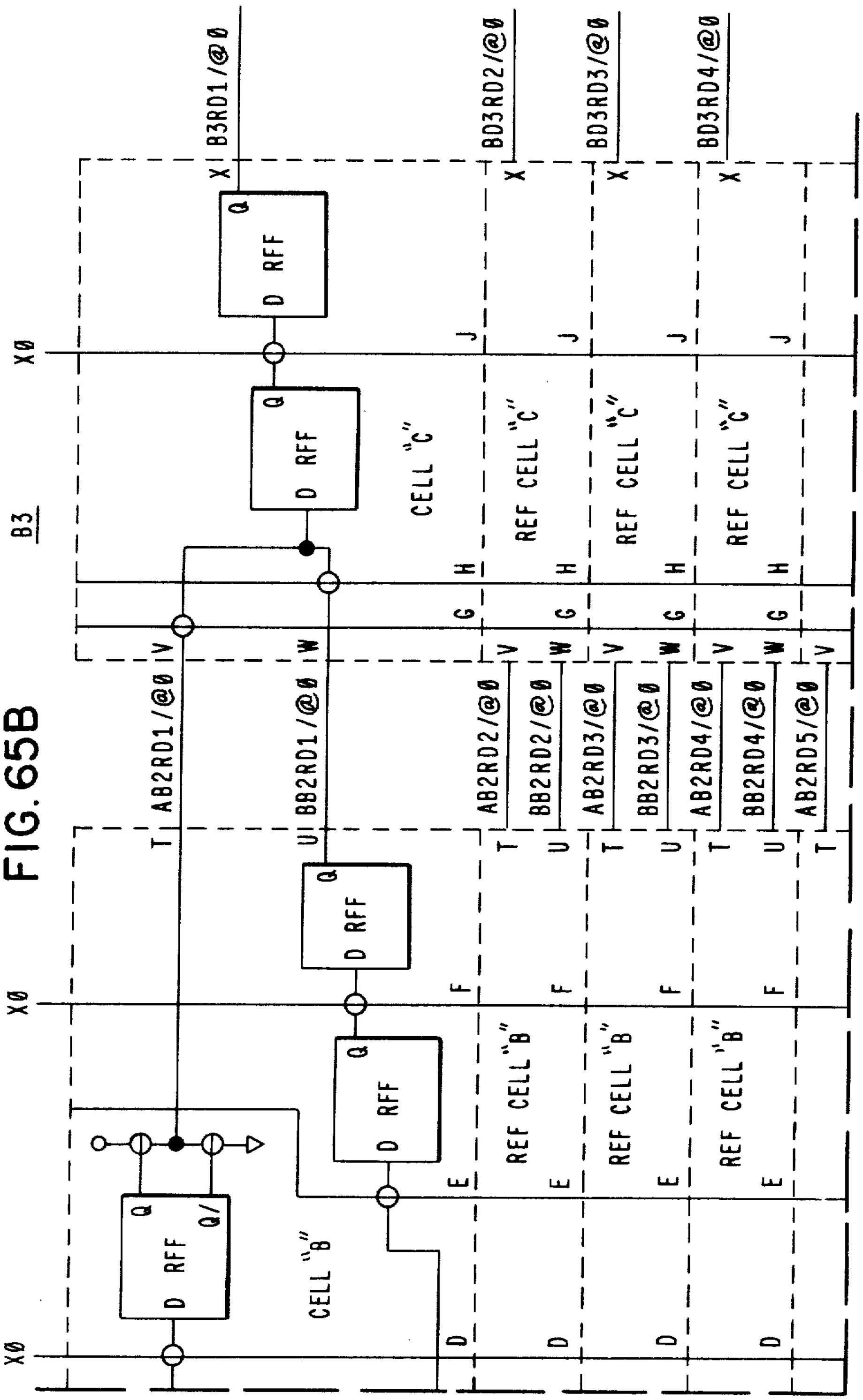
Figure 65C:
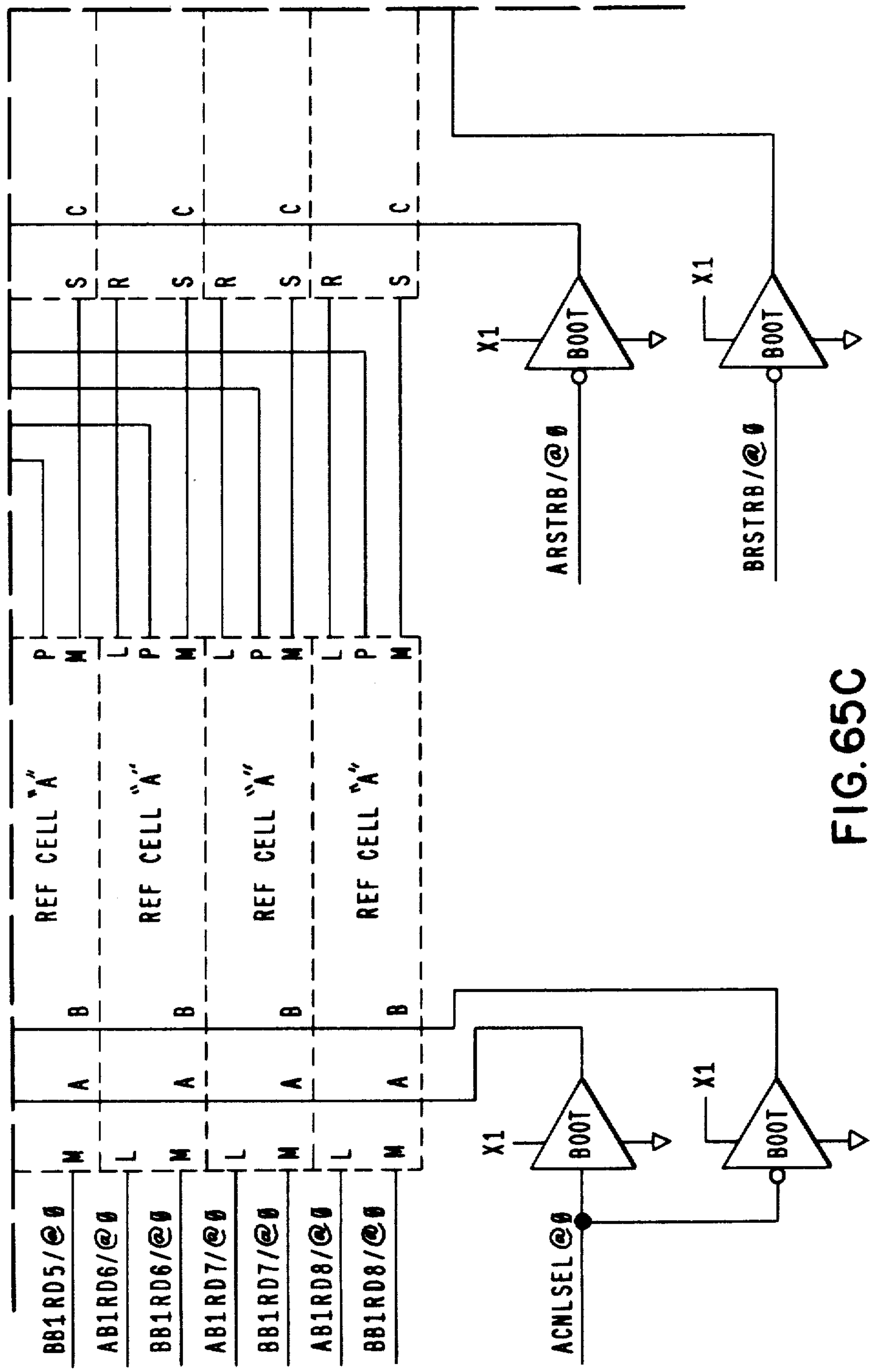
Figures 65, 65D:
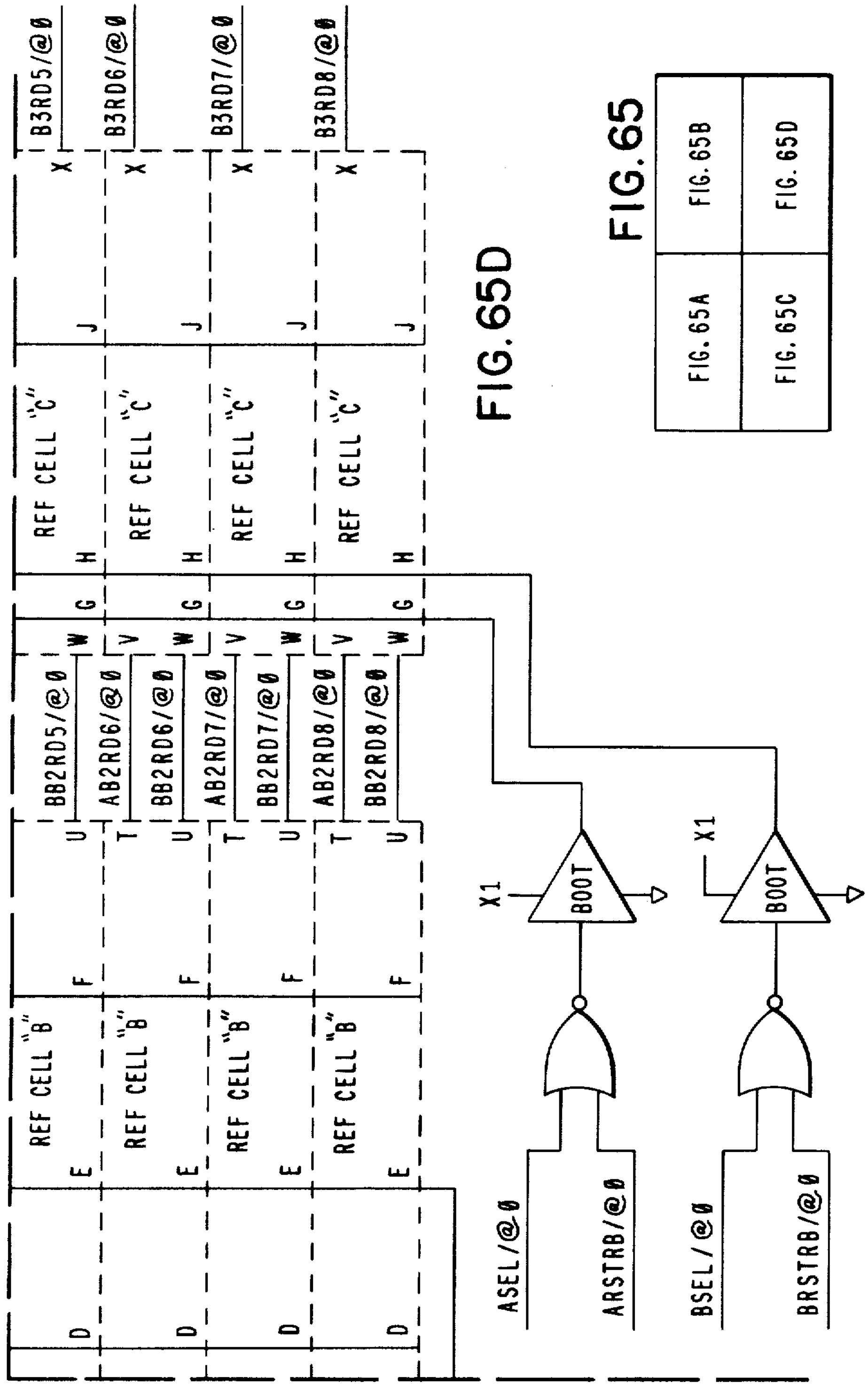

FIGS. 60A through 60M show the circuitry within the ODAT, GDAT, and GFIFO components. The circuitry within broken lines in FIG. 60M is a variation only for the cell indicated in FIG. 60G.

FIGS. 61A through 61D show the circuitry within the IXDAT component, which also accomplishes the function of the MUX 576. FIG. 62 shows the circuitry within the inverter labeled "OD" in FIG. 61B.

FIGS. 63A through 63I show the circuit components CMPR and DMUX. During the enabling phase of clock signal X0 the pins $\overline{\text{RDAT1}}$ through $\overline{\text{RDAT8}}$ receive the message on Channel A of the System Bus, and during the enabling phase of the other clock signal X1, the pins RDAT1/through RDAT8/receive the message on Channel B of the System Bus. The circuitry within DMUX demultiplexes the signals received from Channel A and from Channel B. The circuitry within CMPR generally performs the functions of the receiver address checking circuit and the functions of the postamble garble detection circuits for both channels. It includes registers SADD and MASK.

FIGS. 64A through 64I show the circuitry within the circuit component ACRC or BCRC. The letter "α" preceding circuit components and signal names indicates that, if the illustrated circuitry in FIGS. 64A through 64I is associated with Channel A, then the letter "α" is replaced by the letter "A" and, if the circuitry illustrated in FIGS. 64A through 64I is associated with Channel B, then the letter "α" is replaced by the letter "B". The circuitry shown in FIGS. 64A through 64I also includes a portion of the buffer AB1 or BB1.

FIGS. 65A through 65D show the circuitry within the circuit components GMUX, B2 and B3.

Figure 66A:
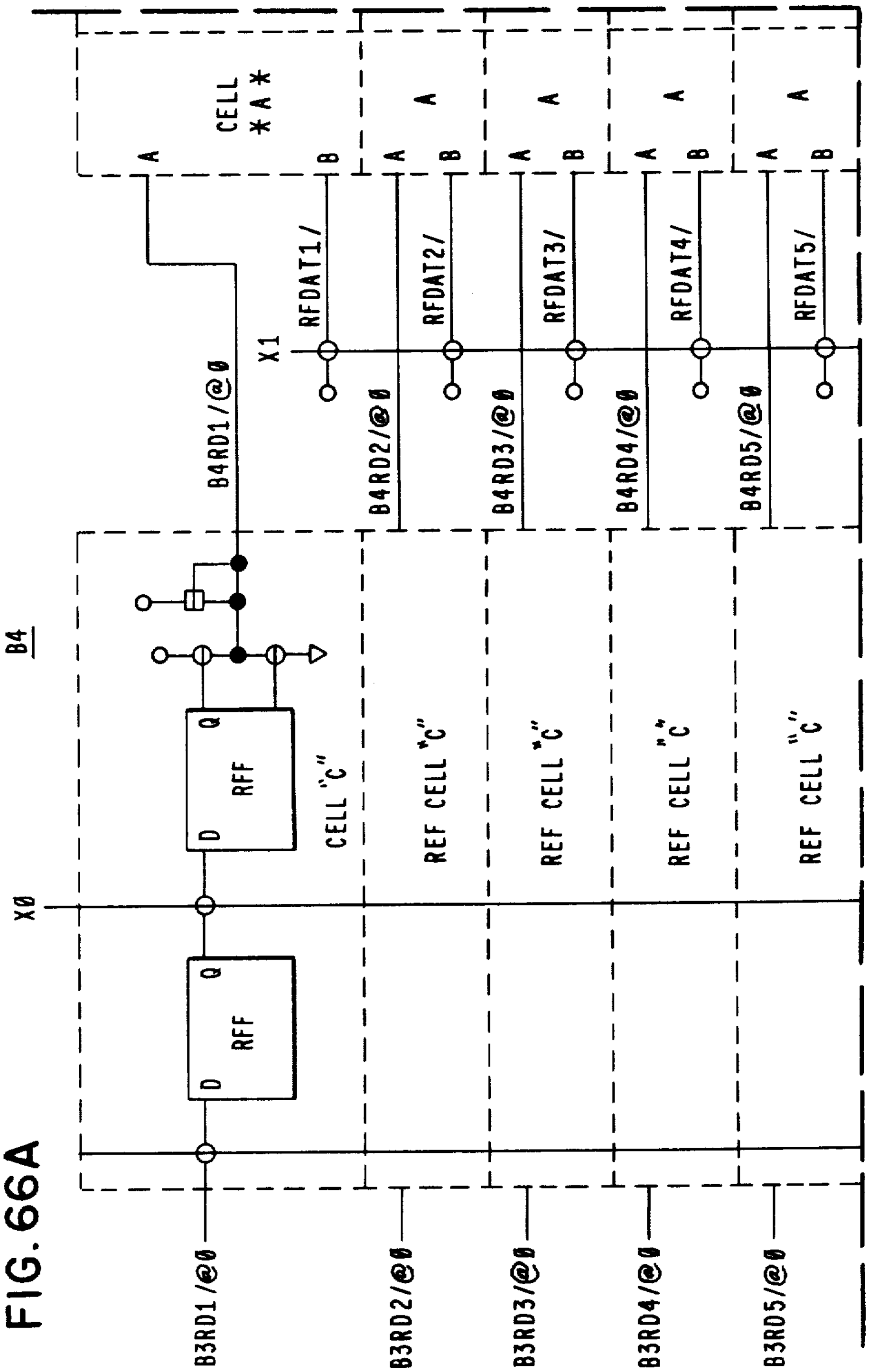
Figure 66B:
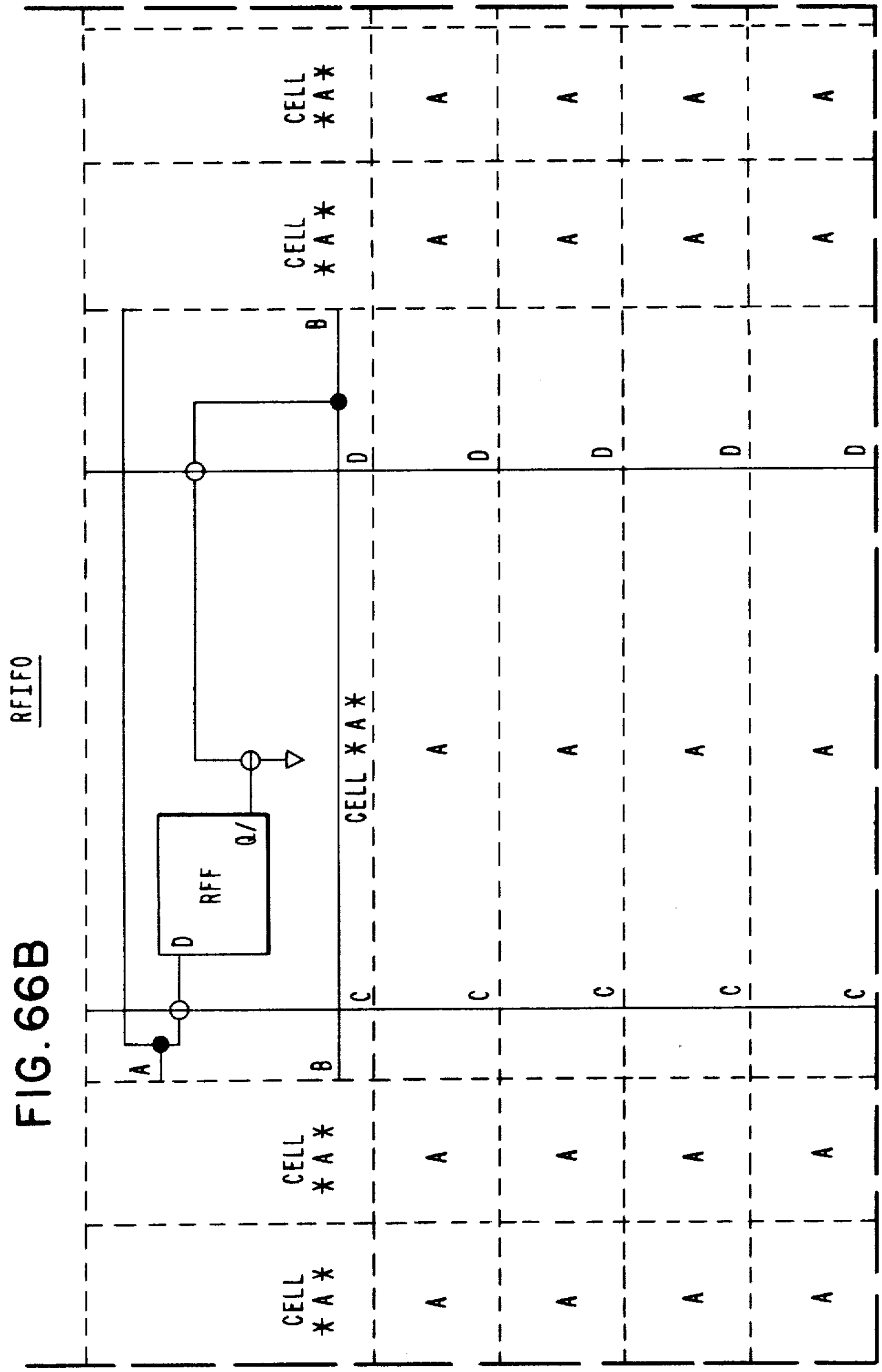
Figure 66C:
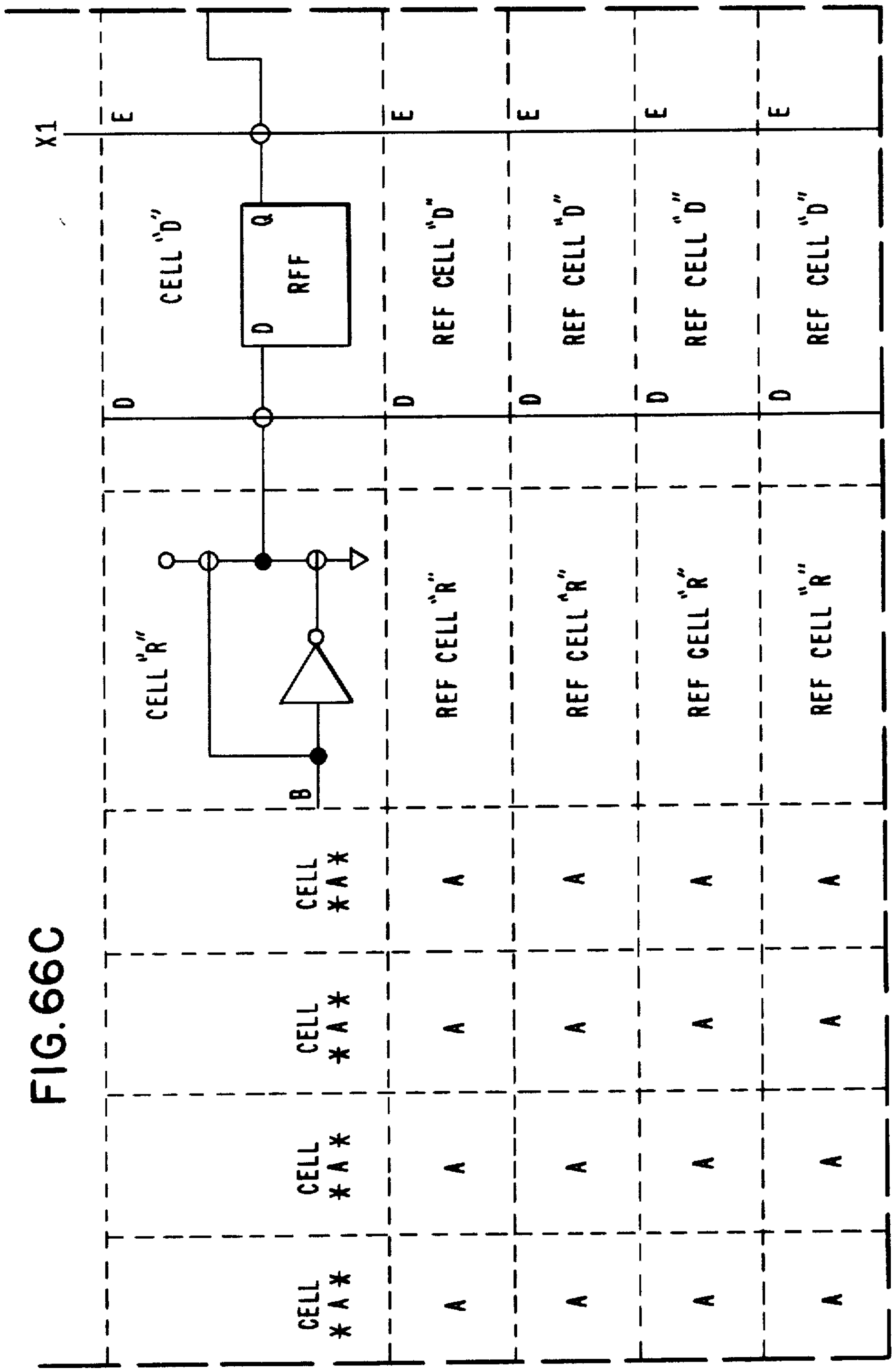
Figure 66D:
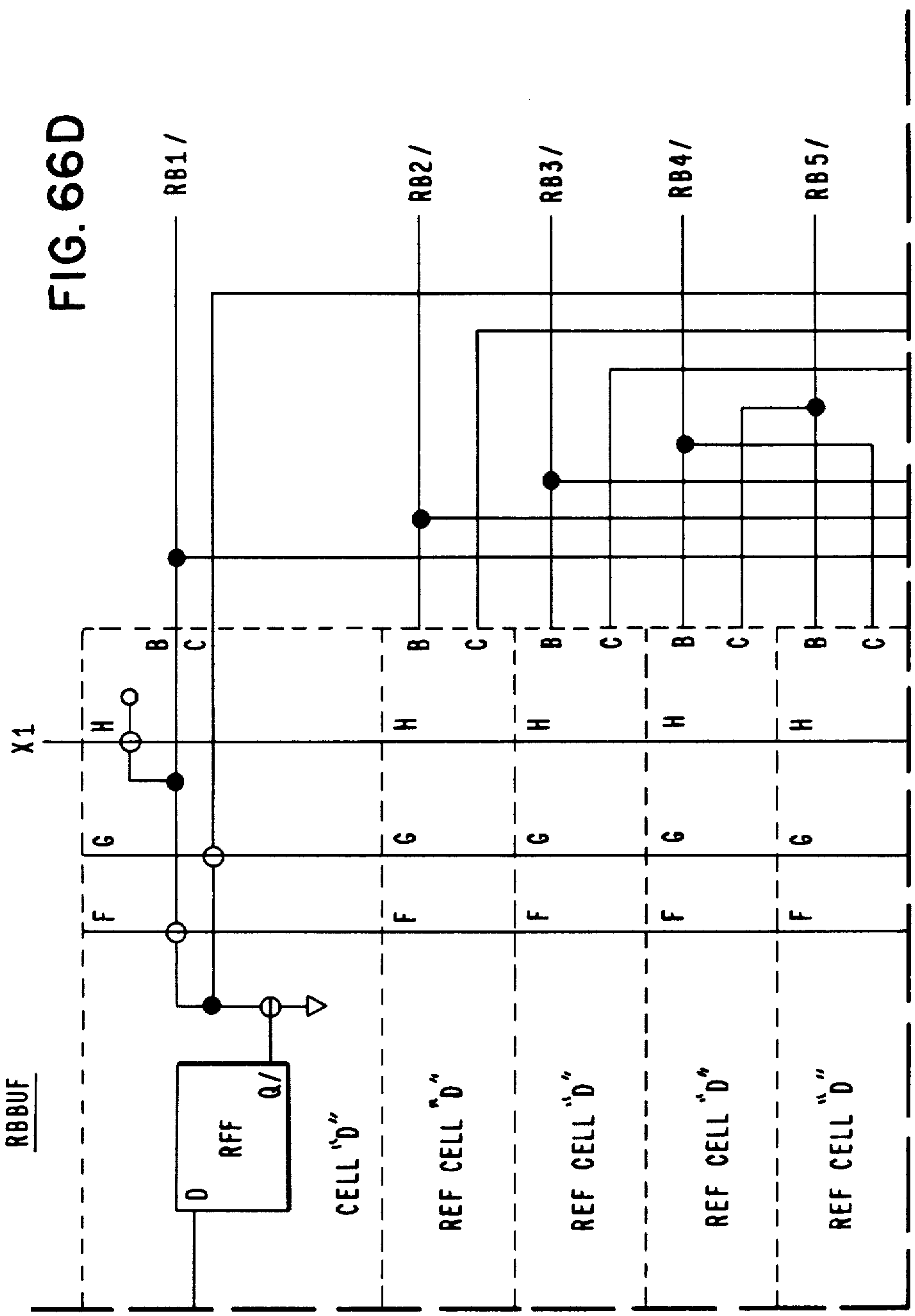
Figure 66E:
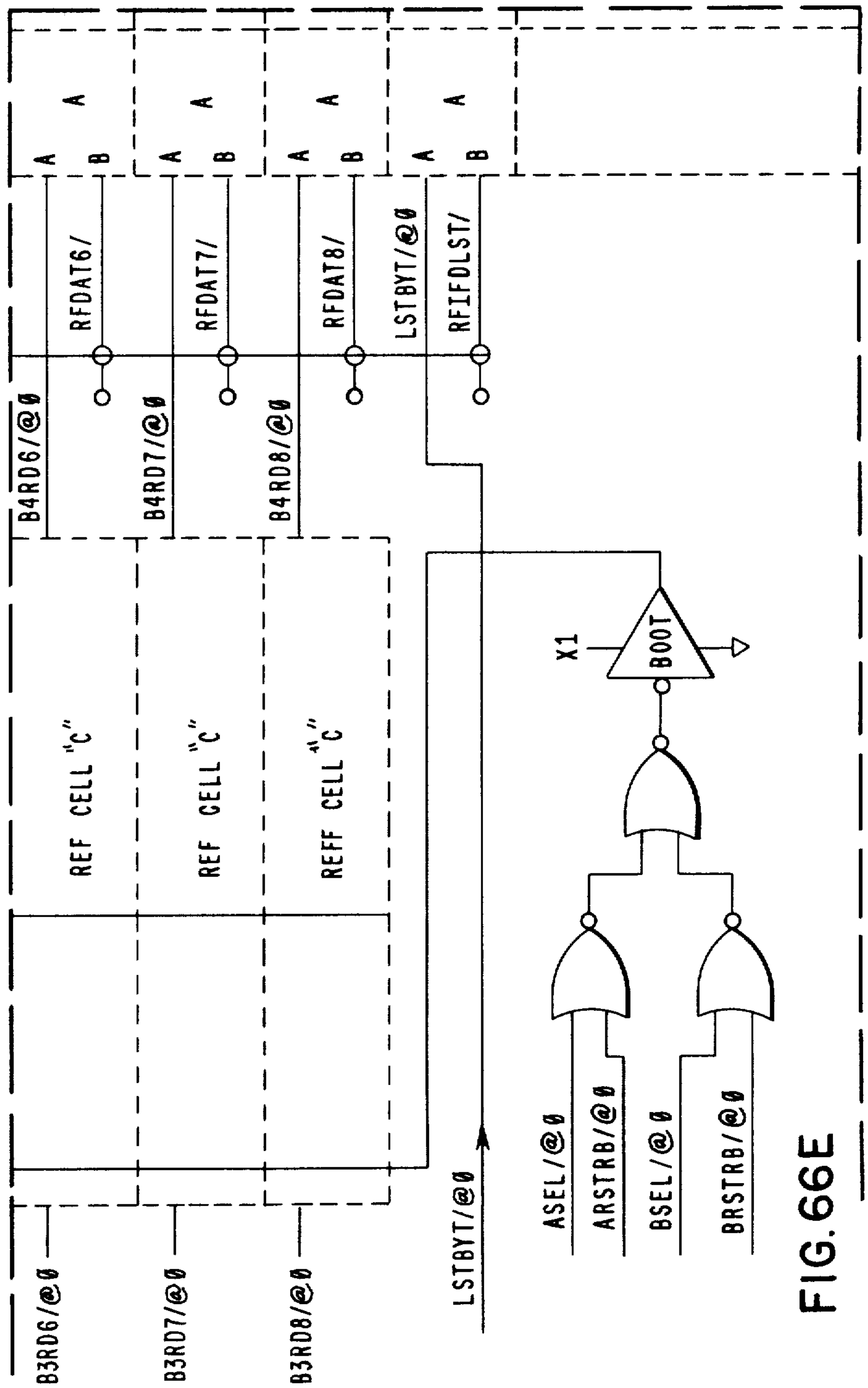
Figure 66F:
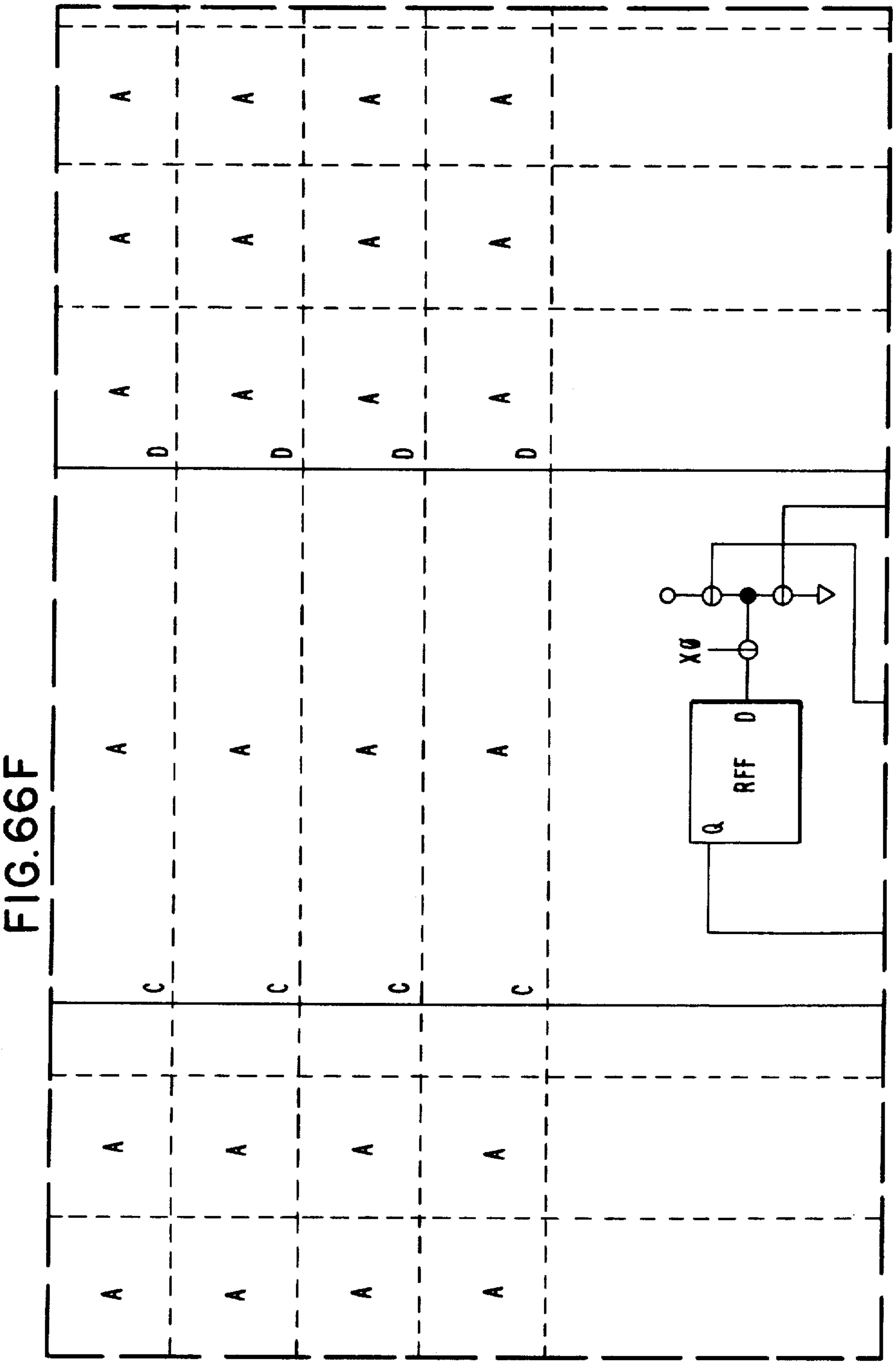
Figure 66G:
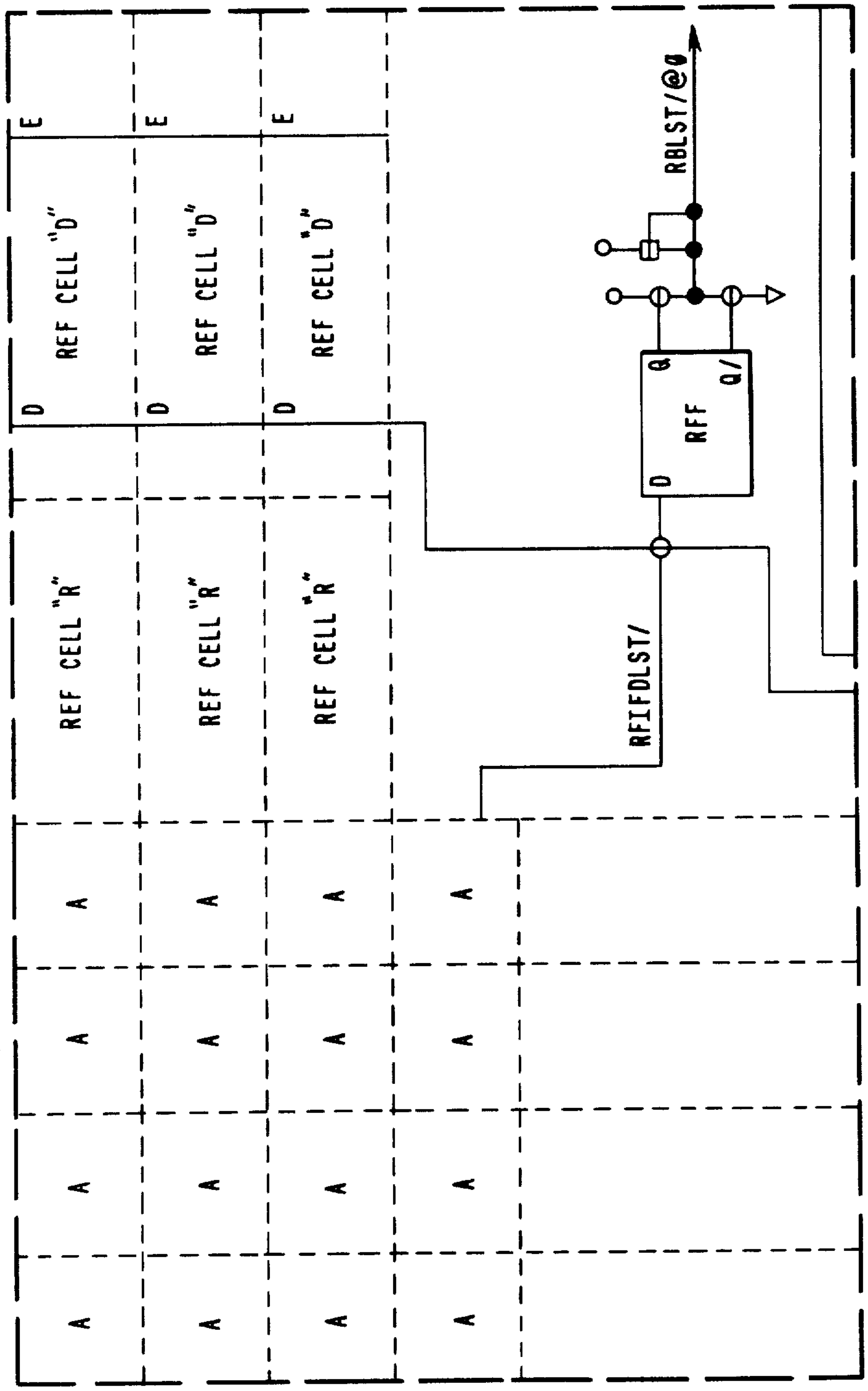
Figure 66H:
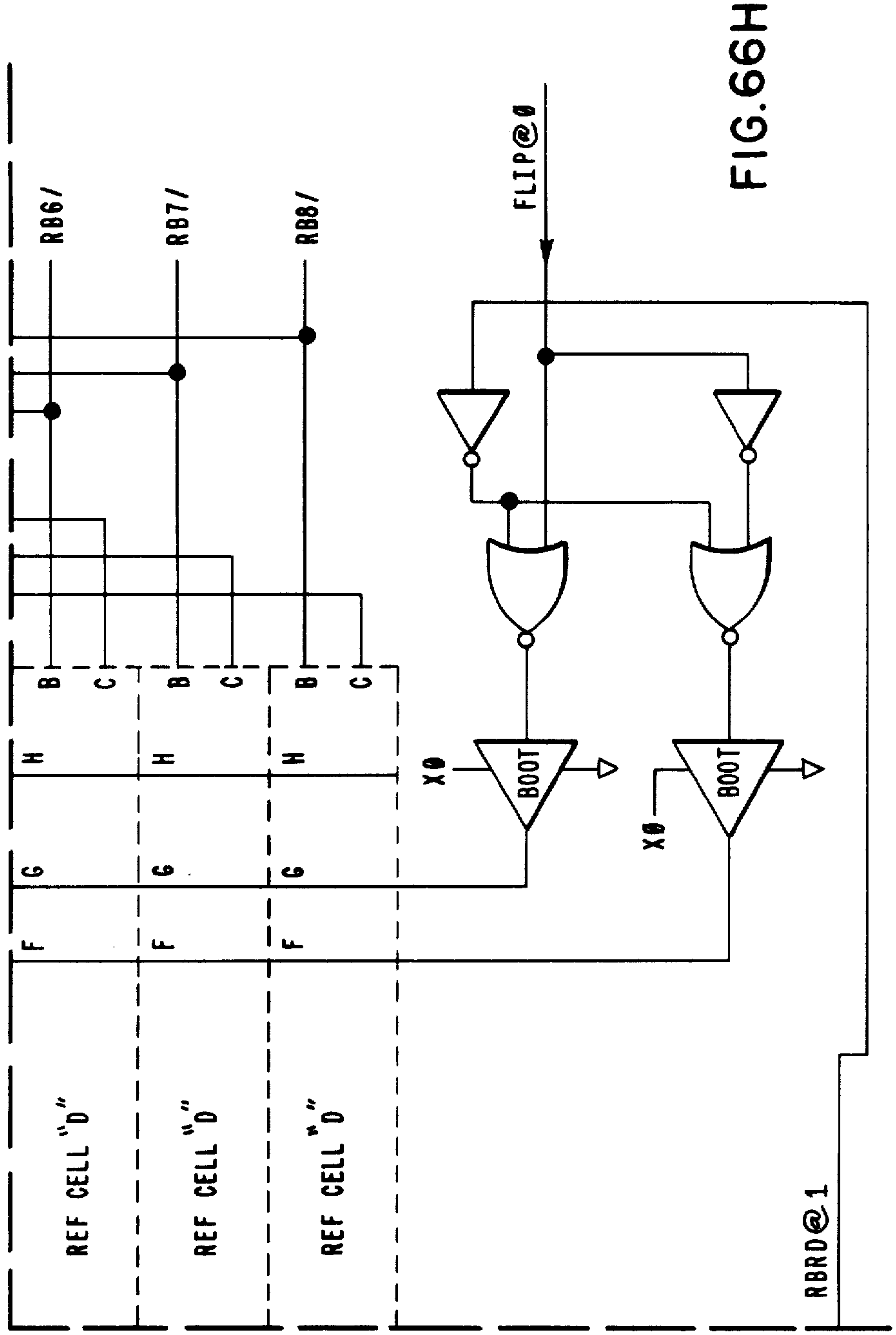
Figure 66I:
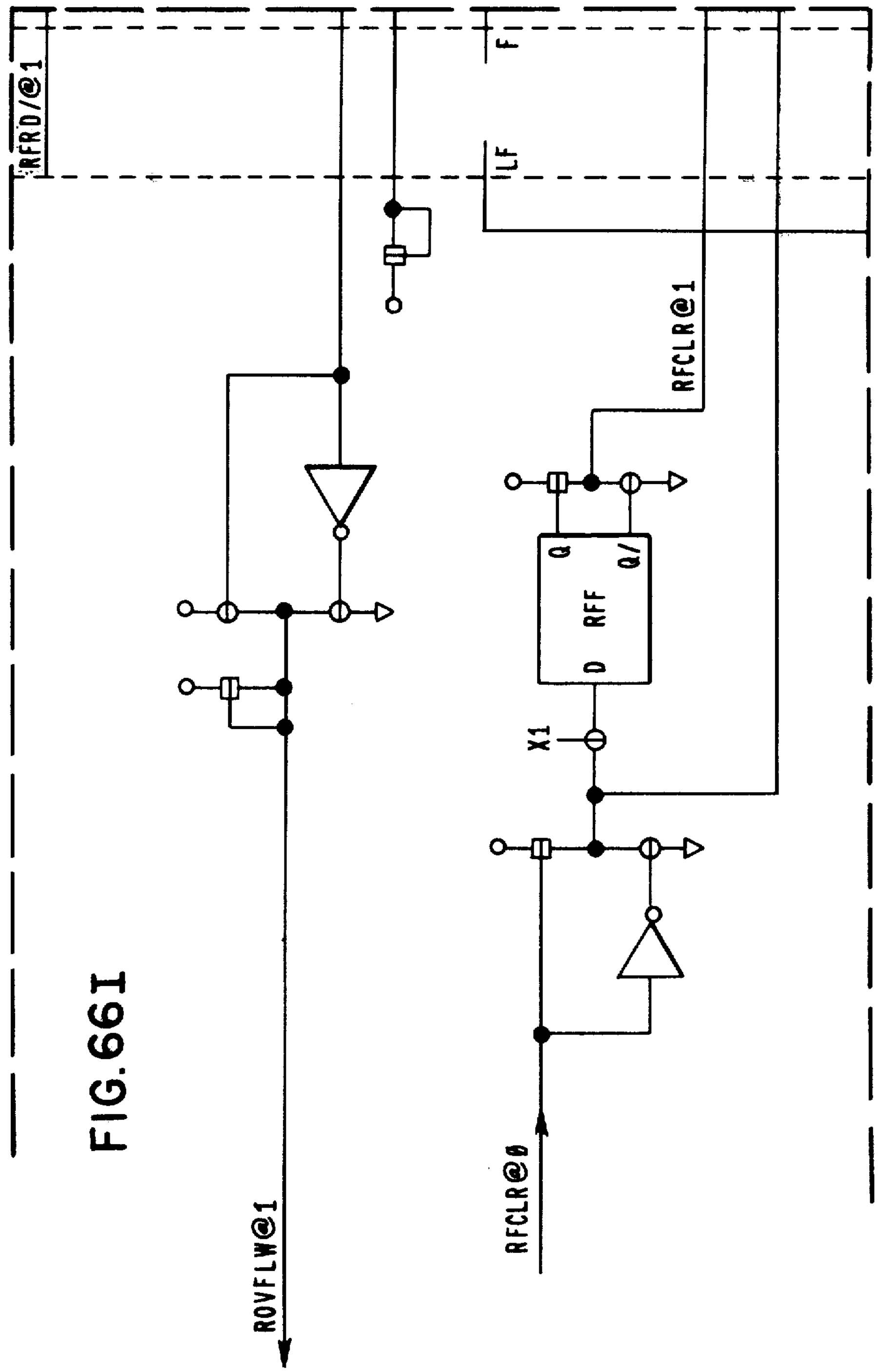
Figure 66J:
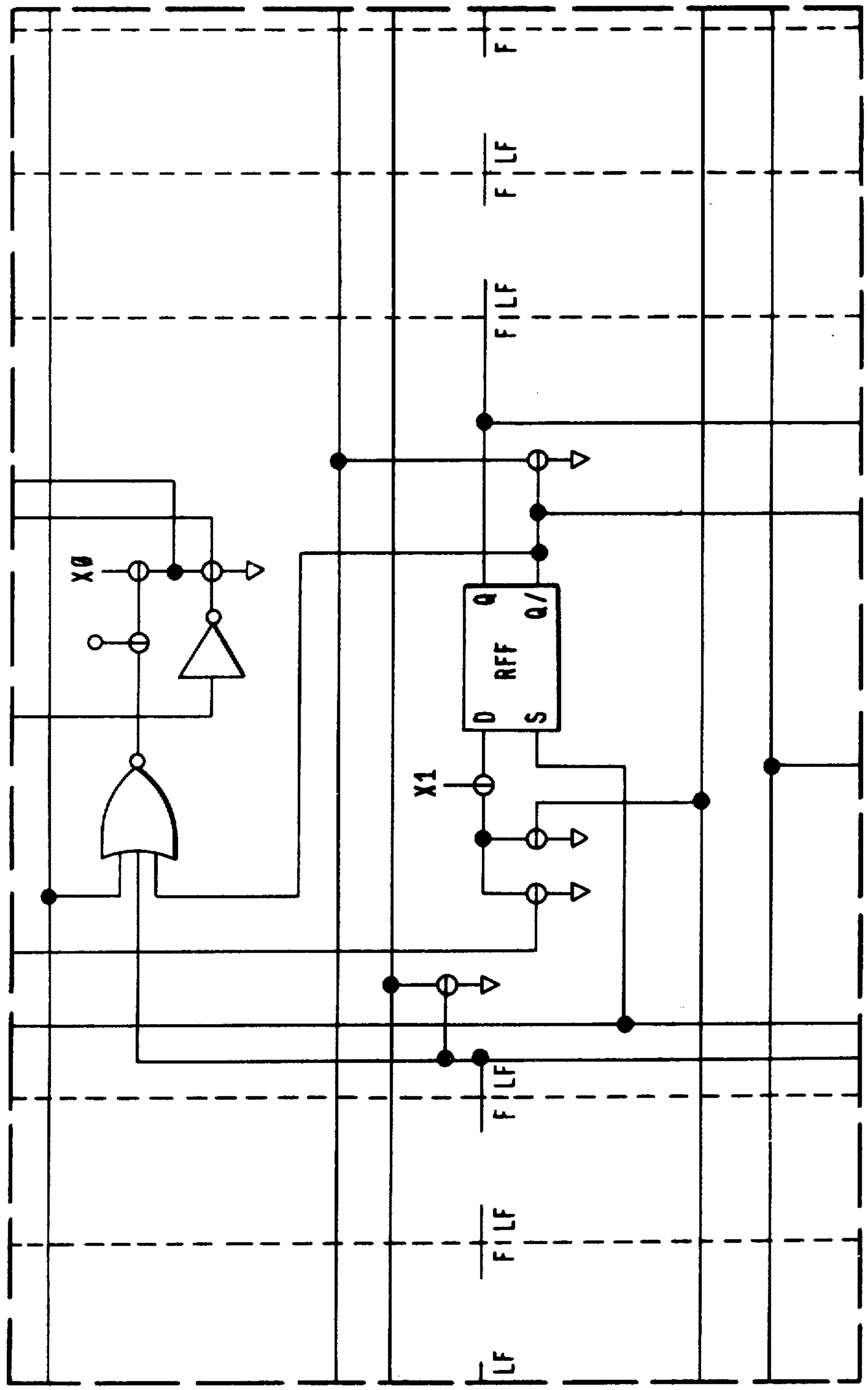
Figure 66K:
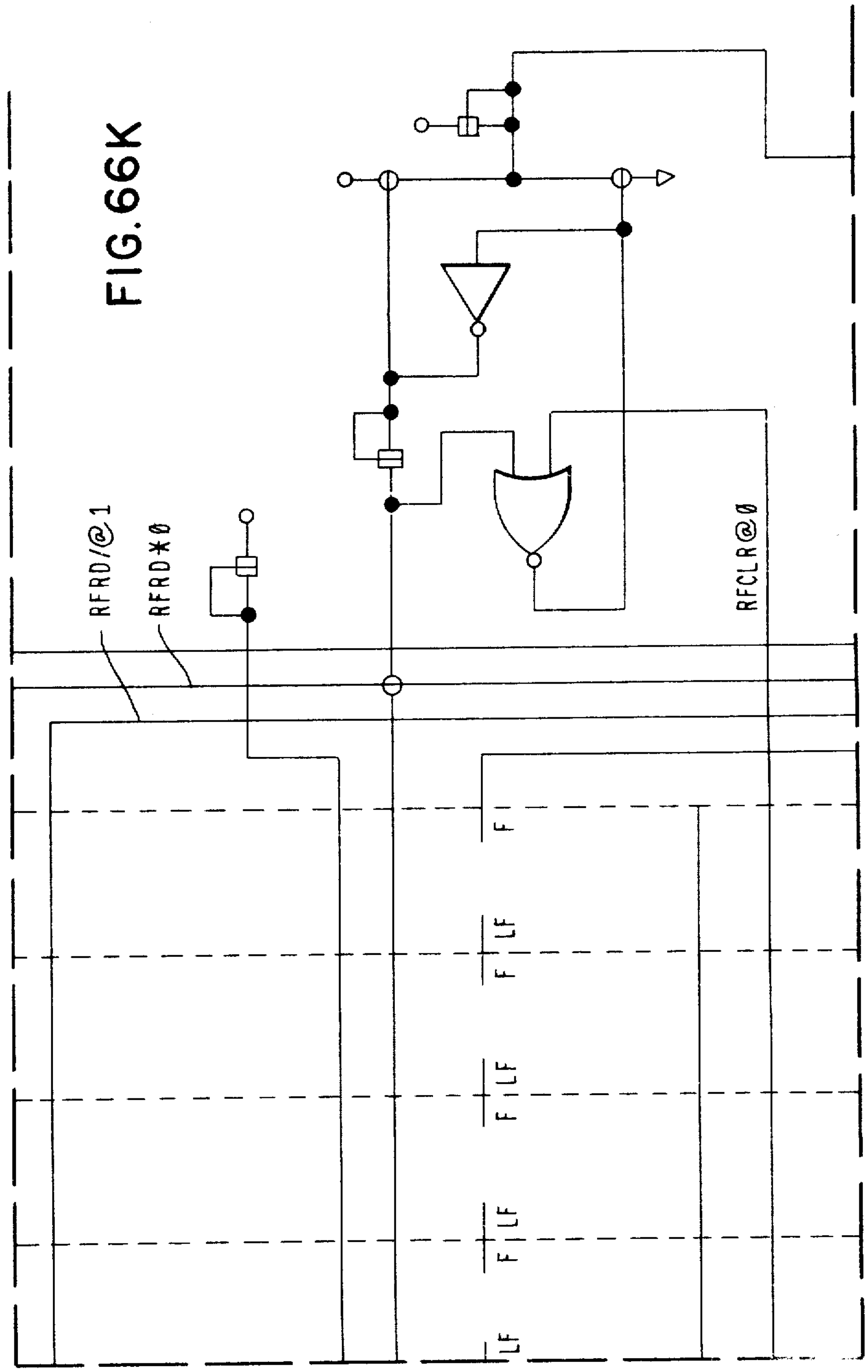
Figure 66L:
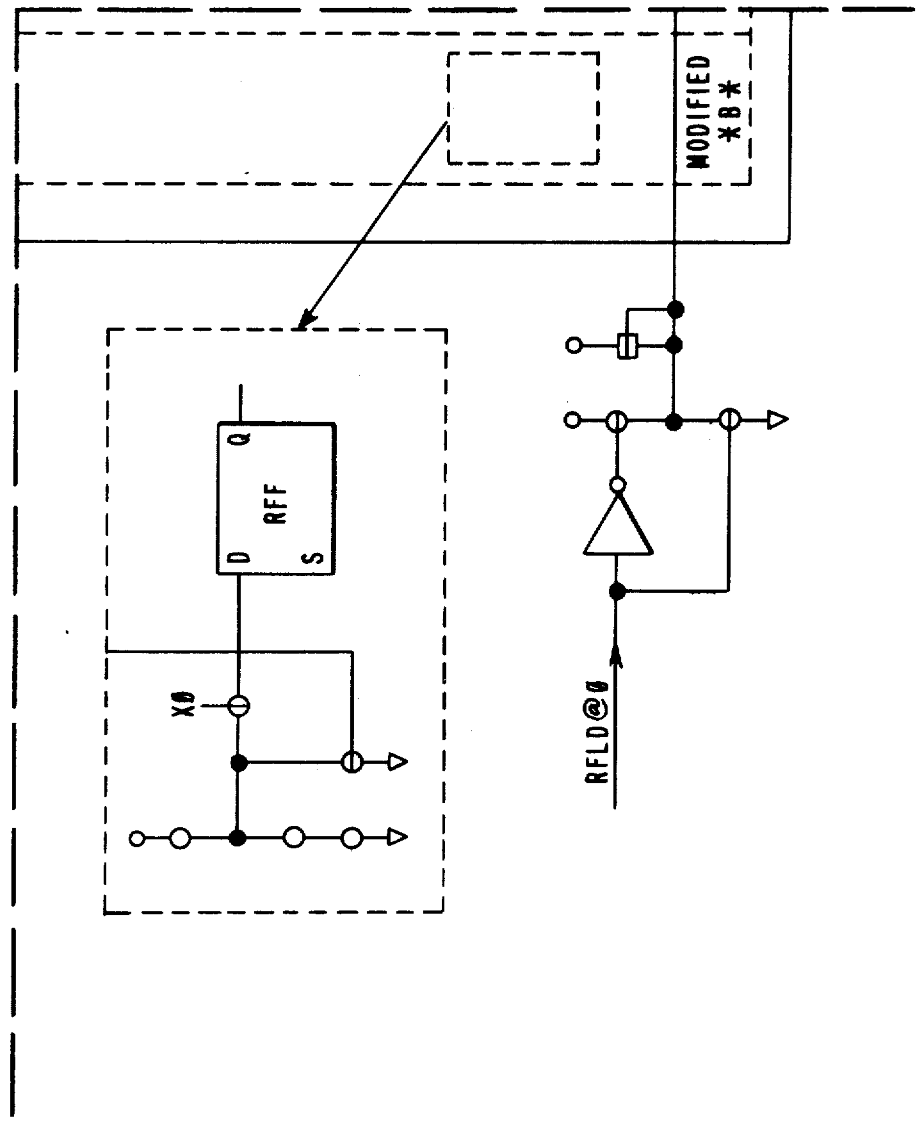
Figure 66M:
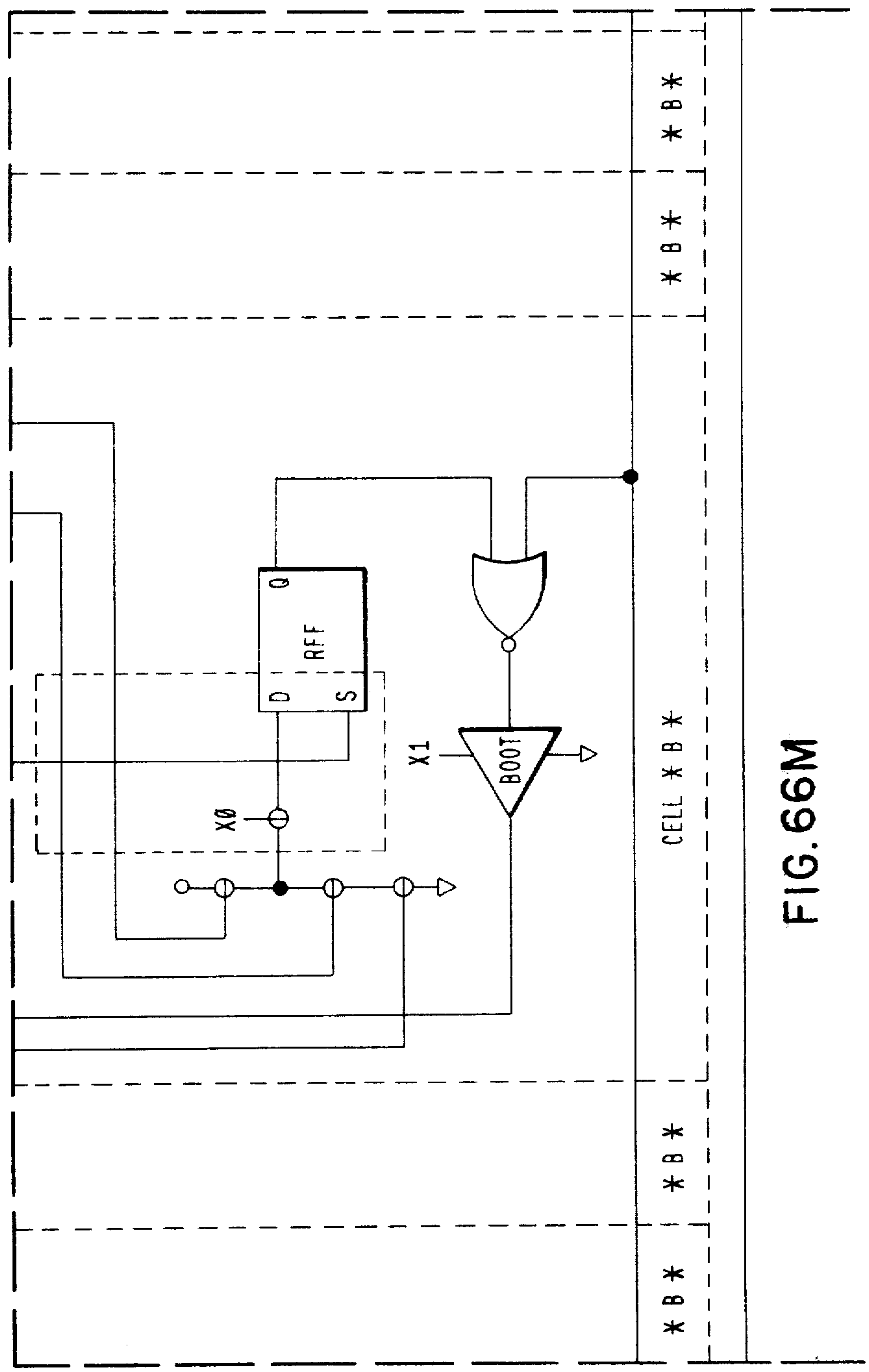
Figures 66, 66N:
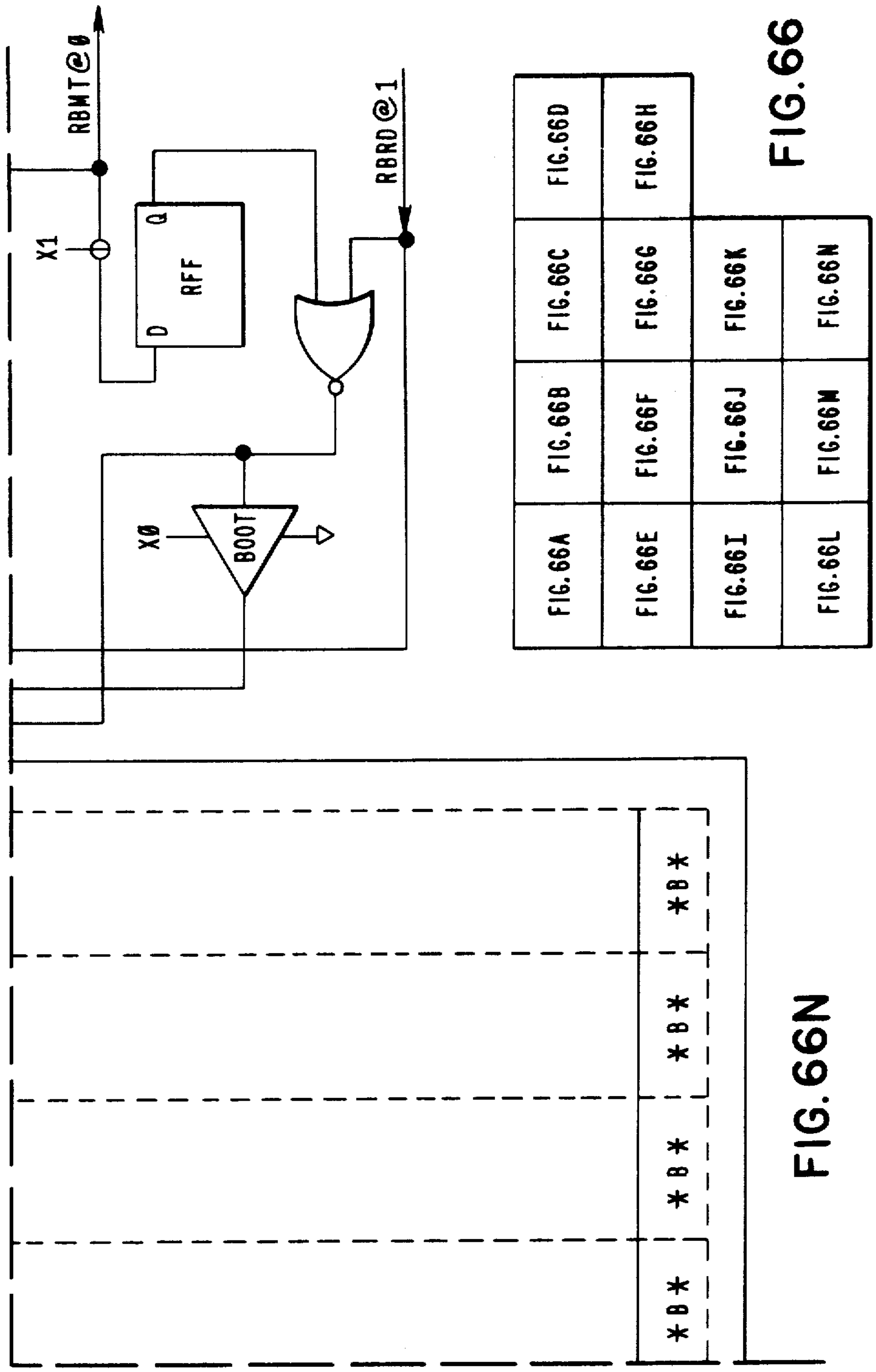
Figure 67A:
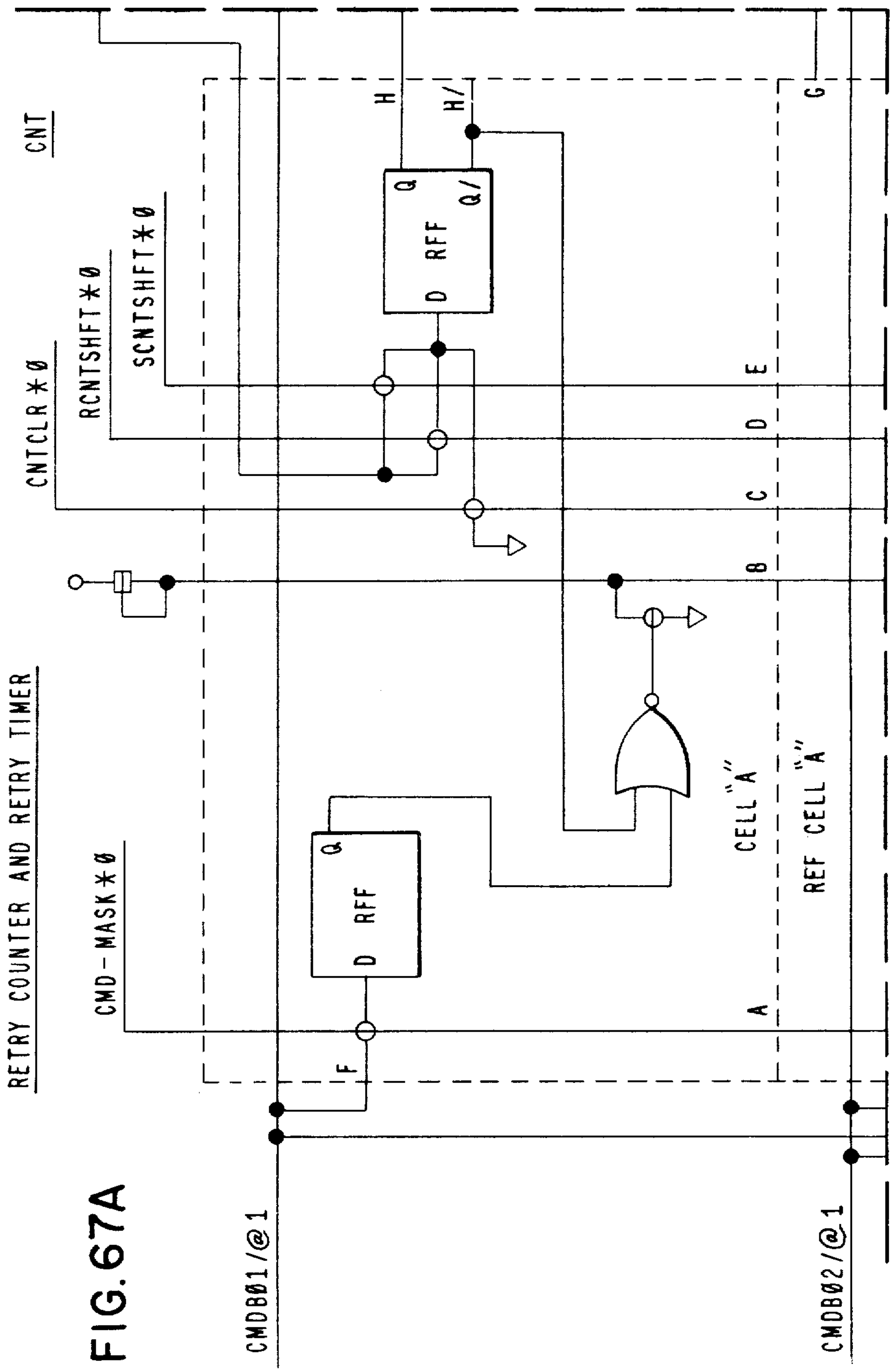
Figure 67B:
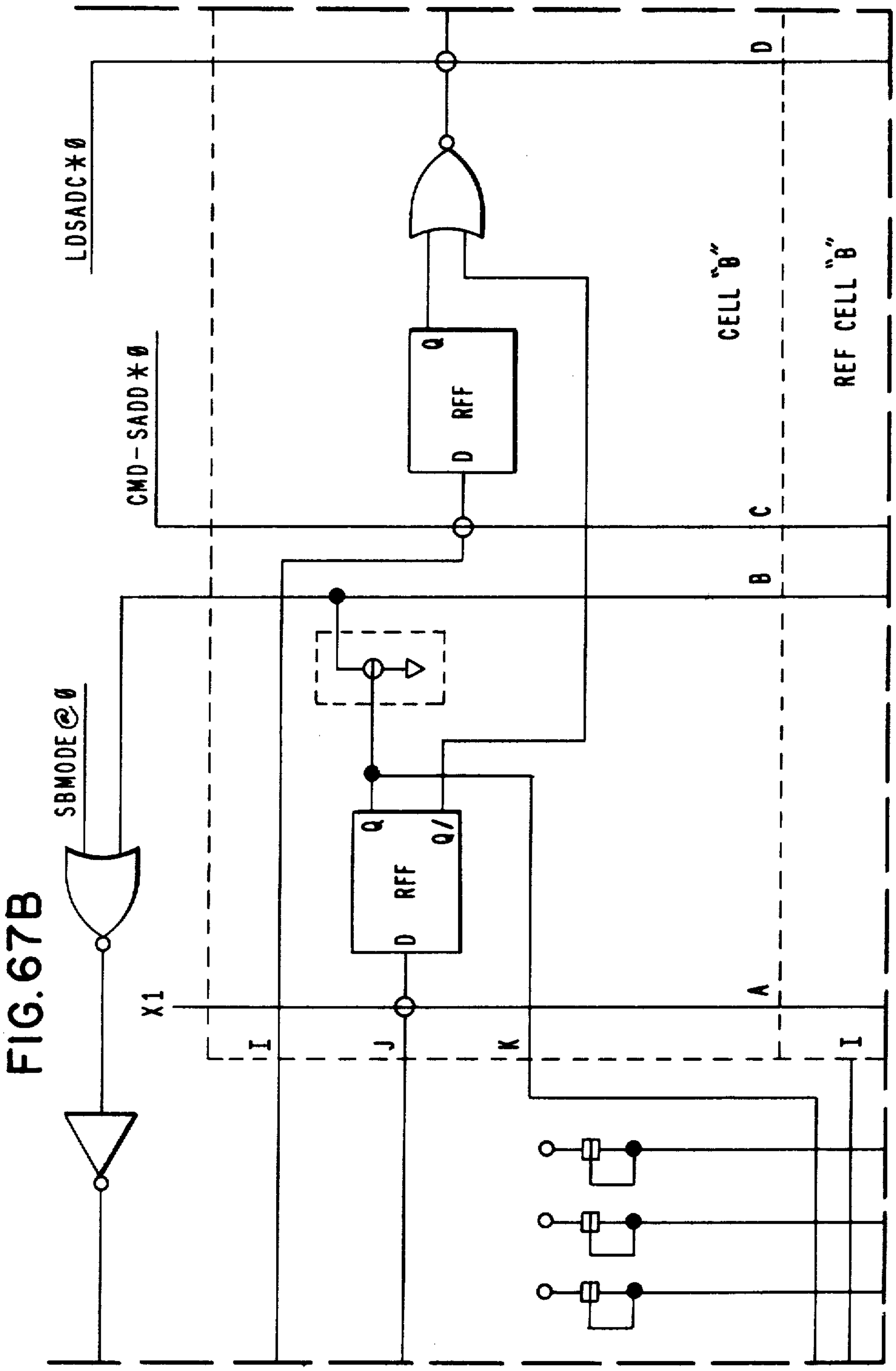
Figure 67C:
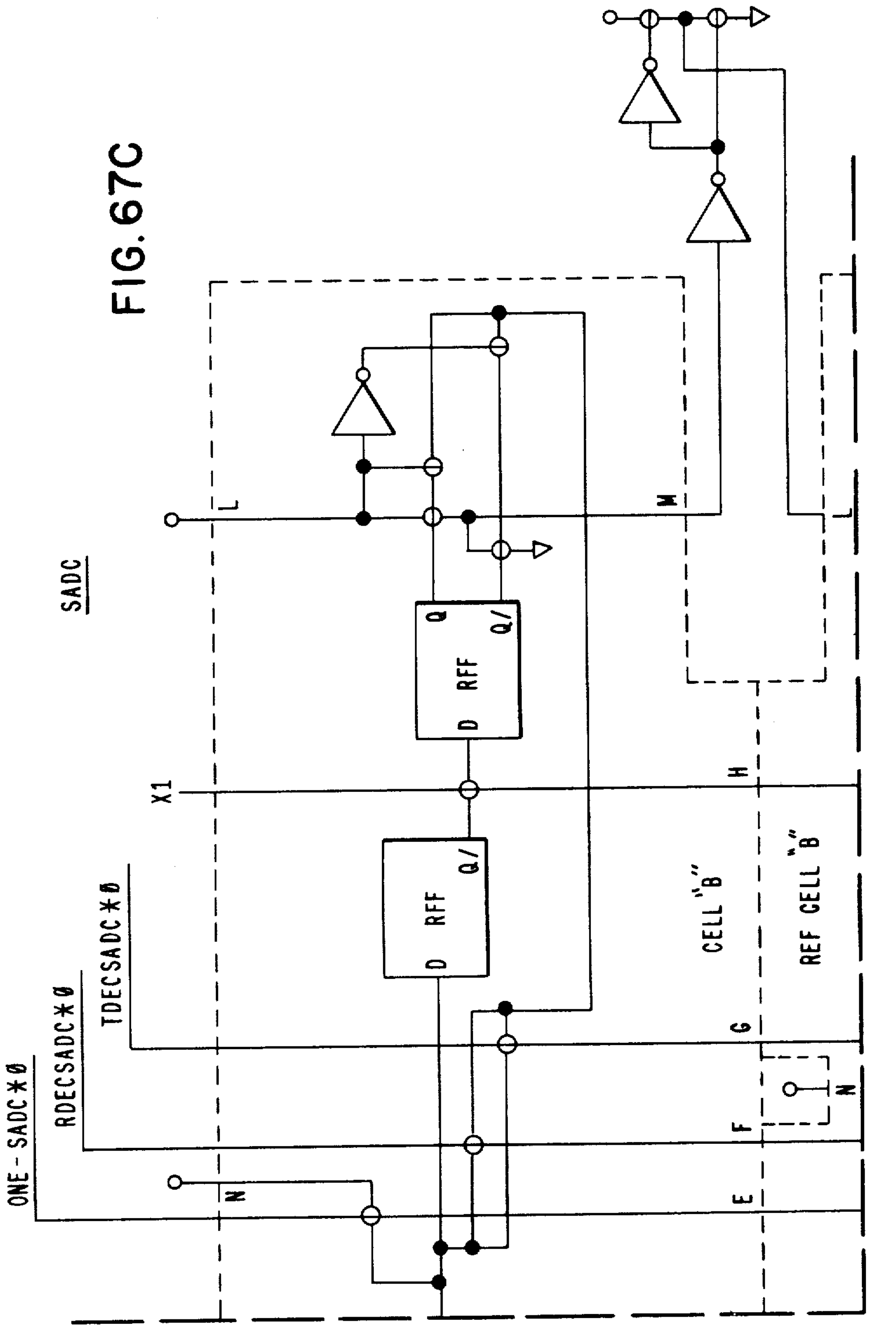
Figure 67D:
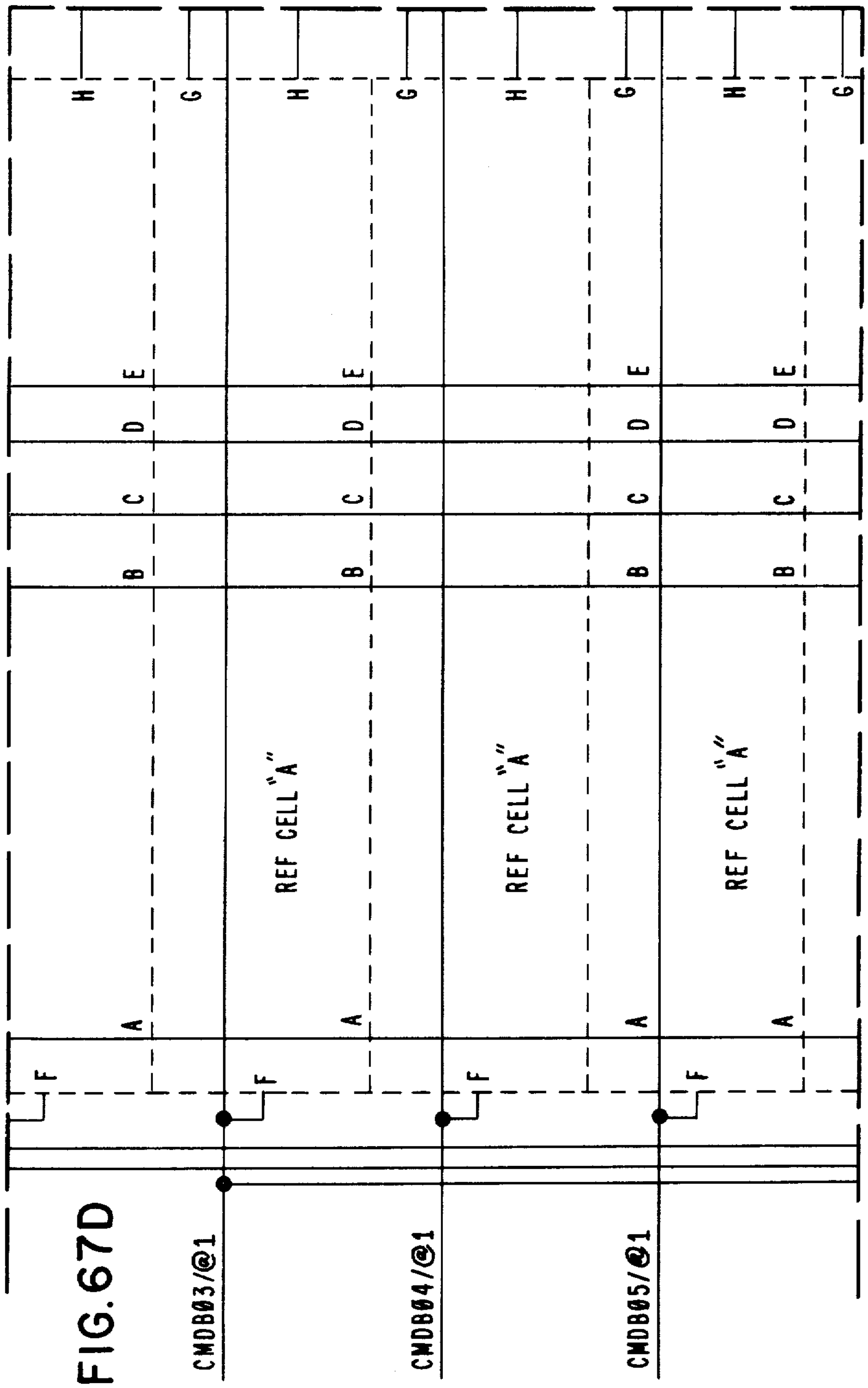
Figure 67E:
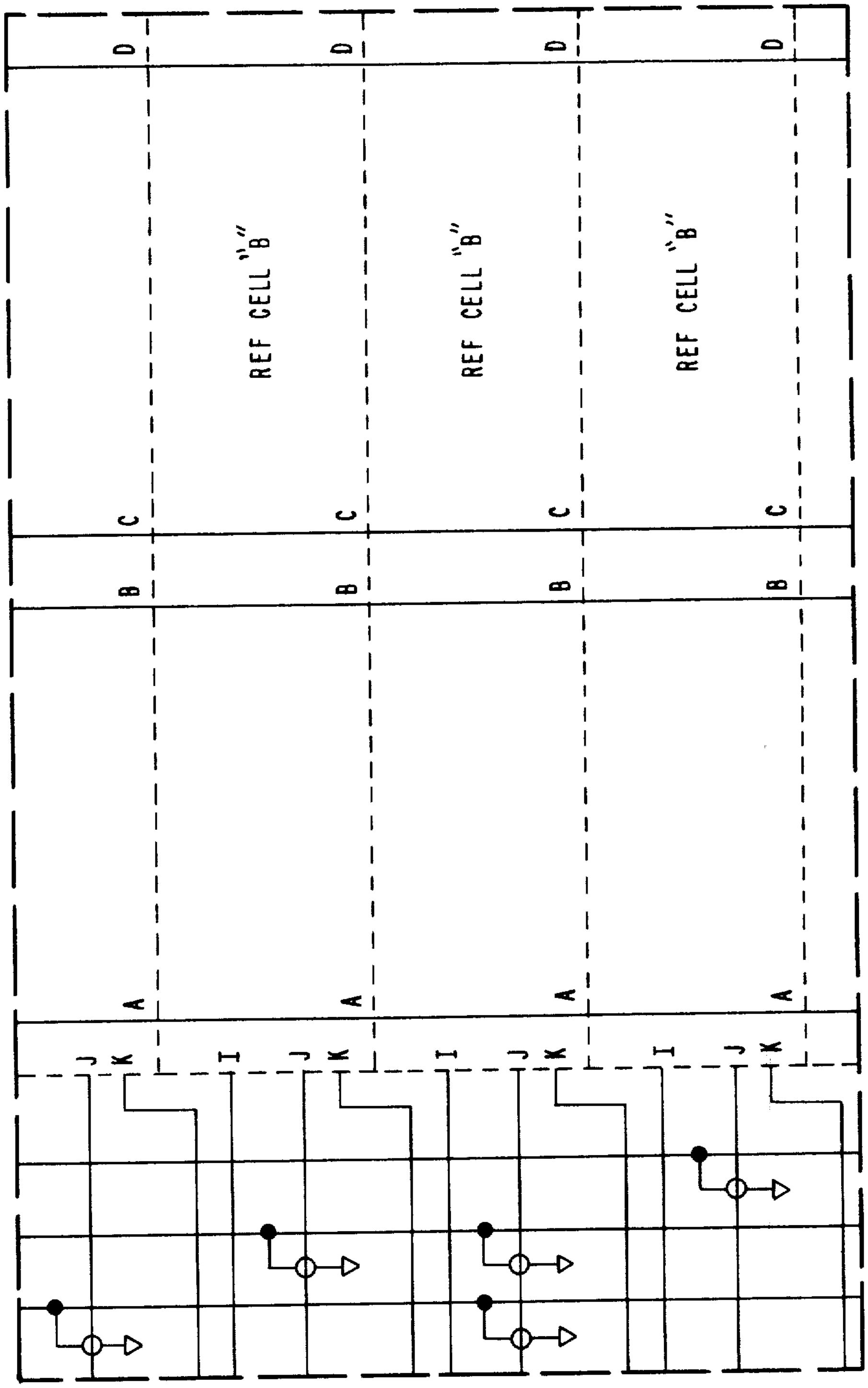
Figure 67F:
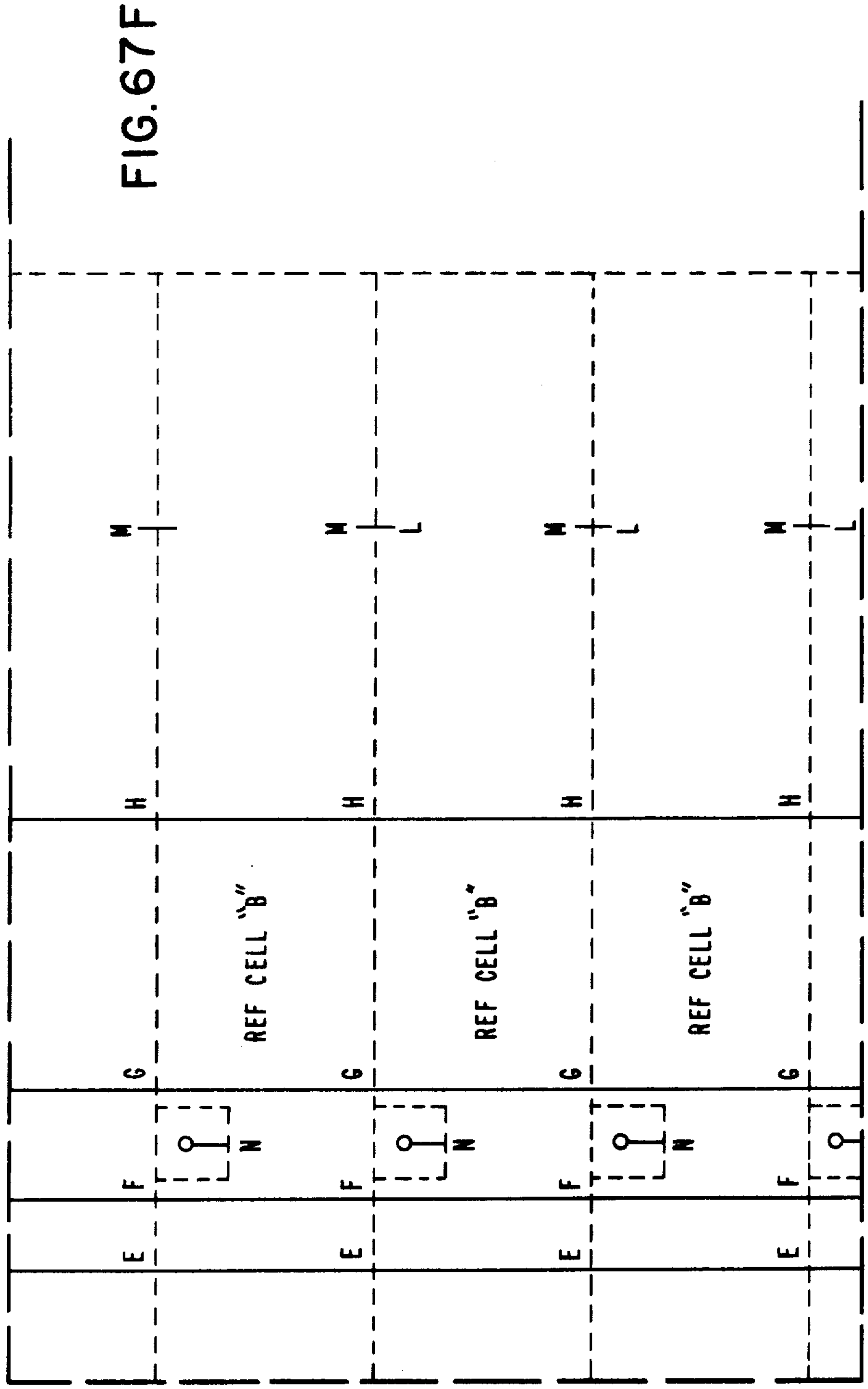
Figure 67G:
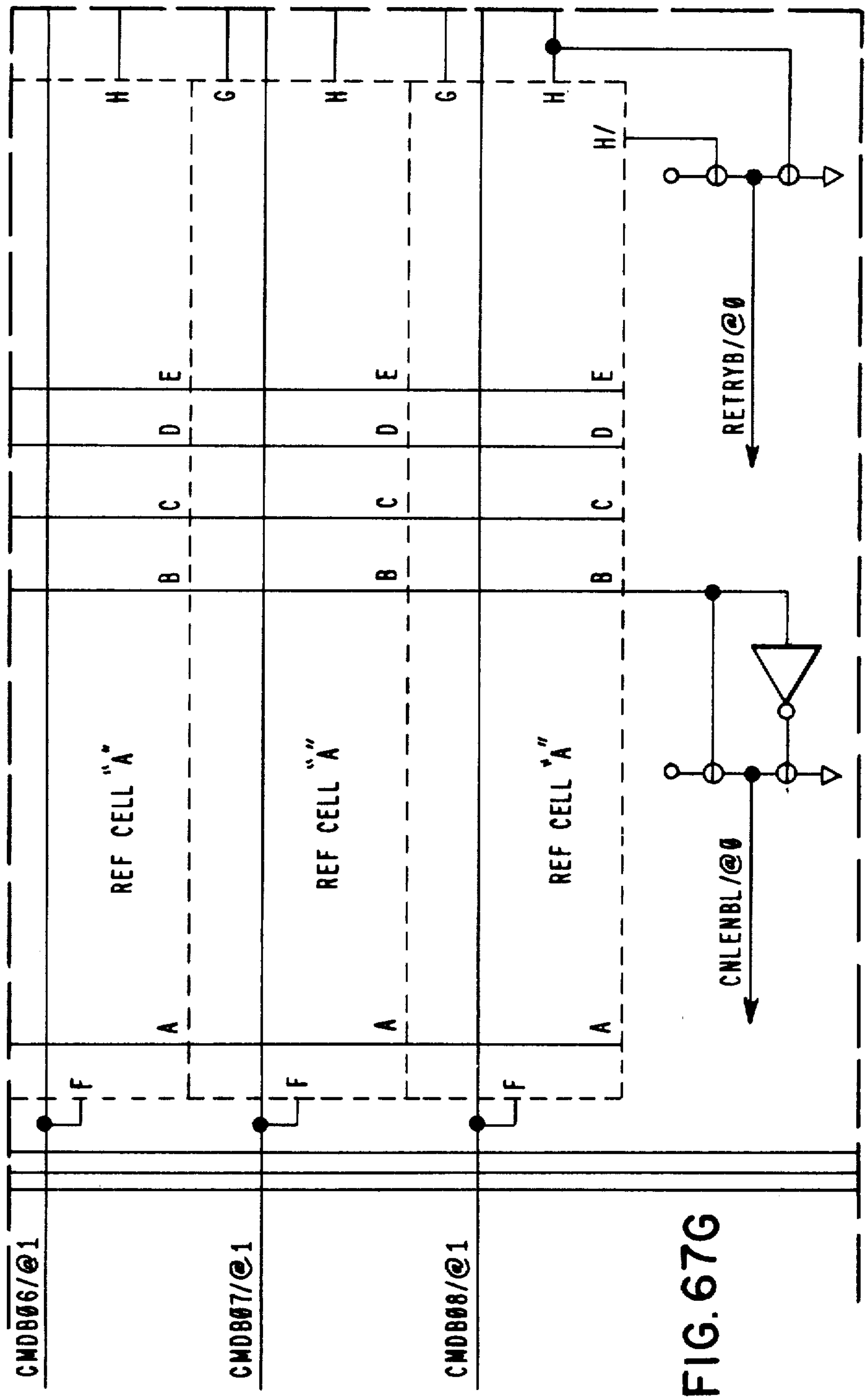
Figure 67H:
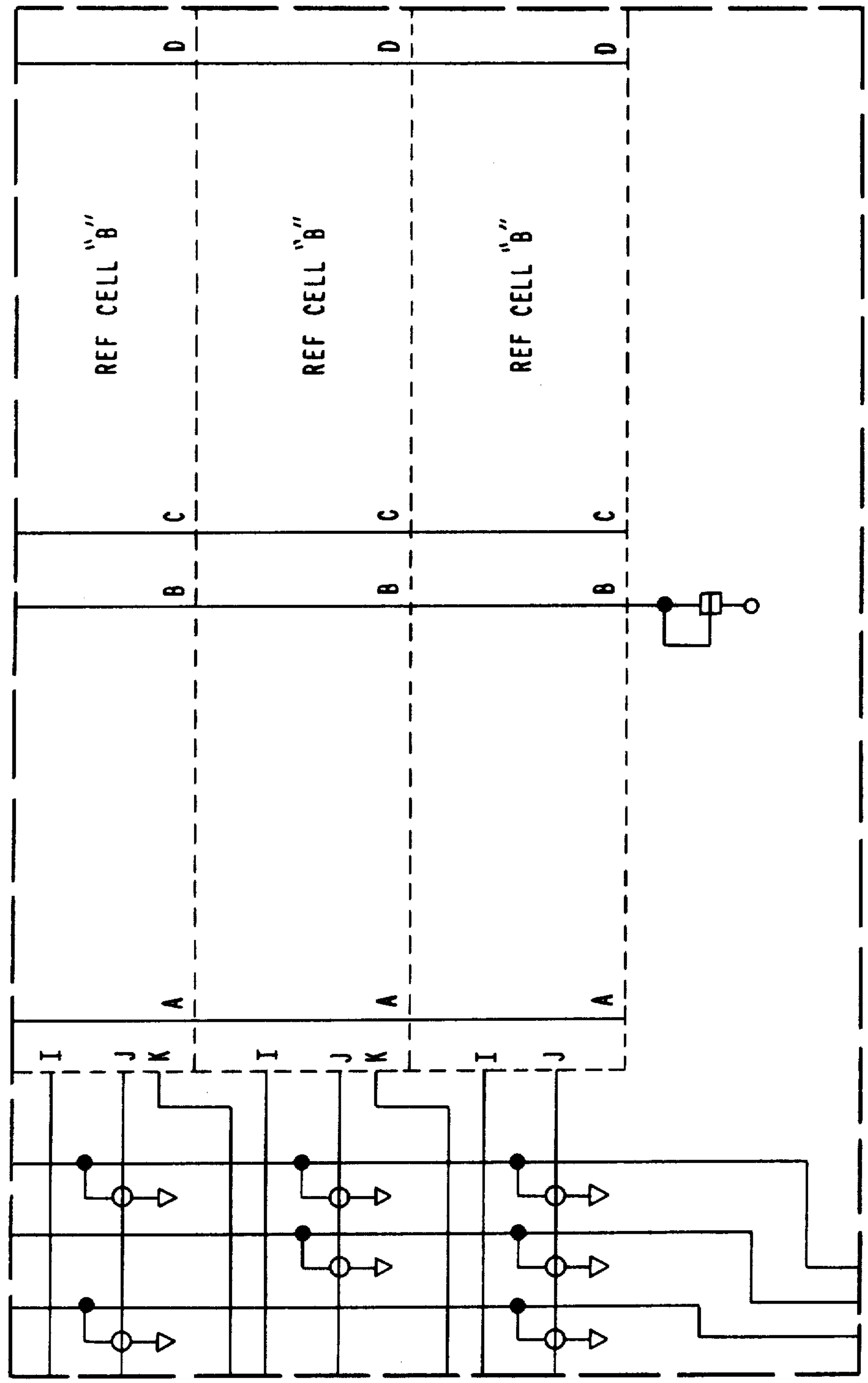
Figure 67I:
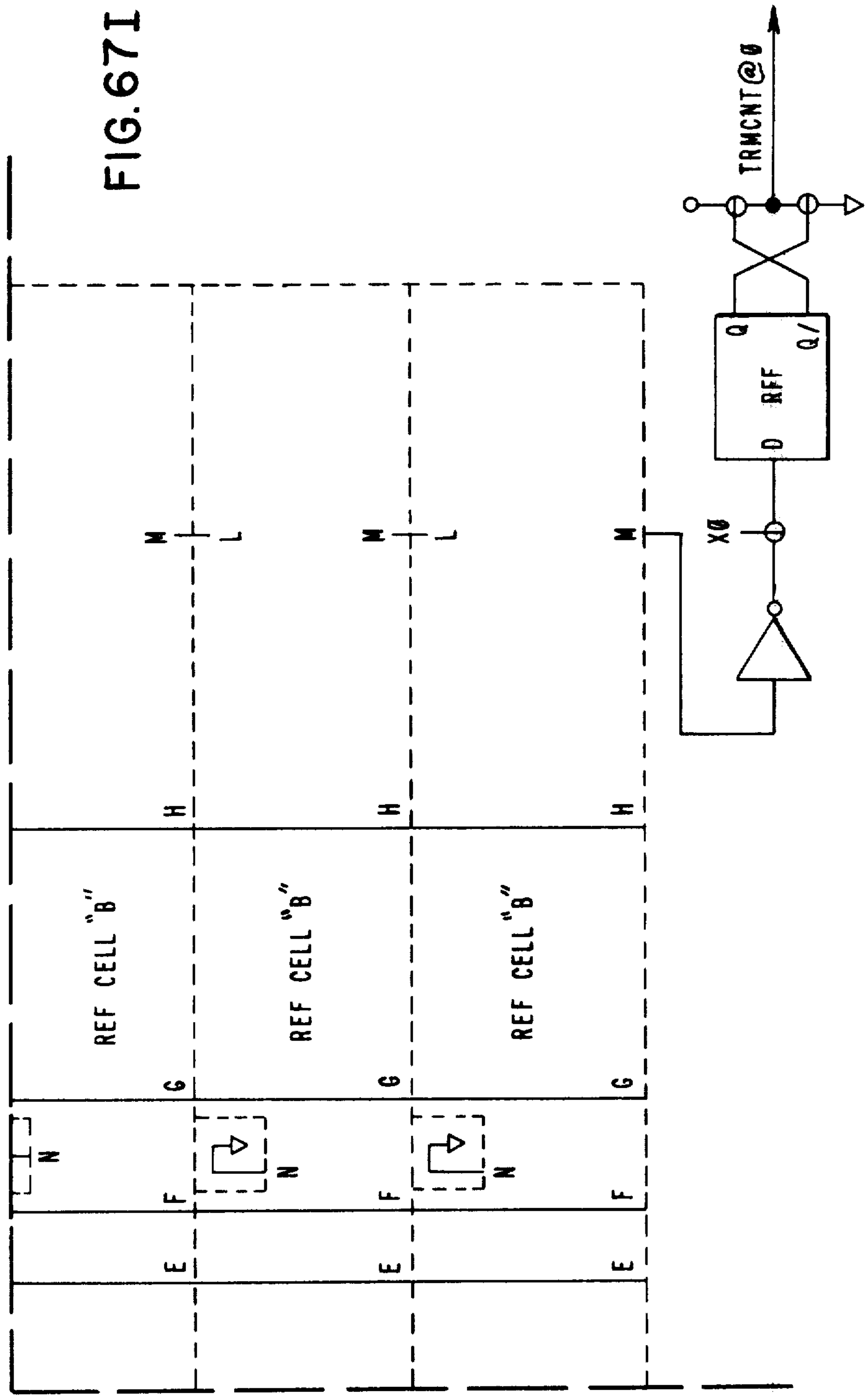
Figure 67J:
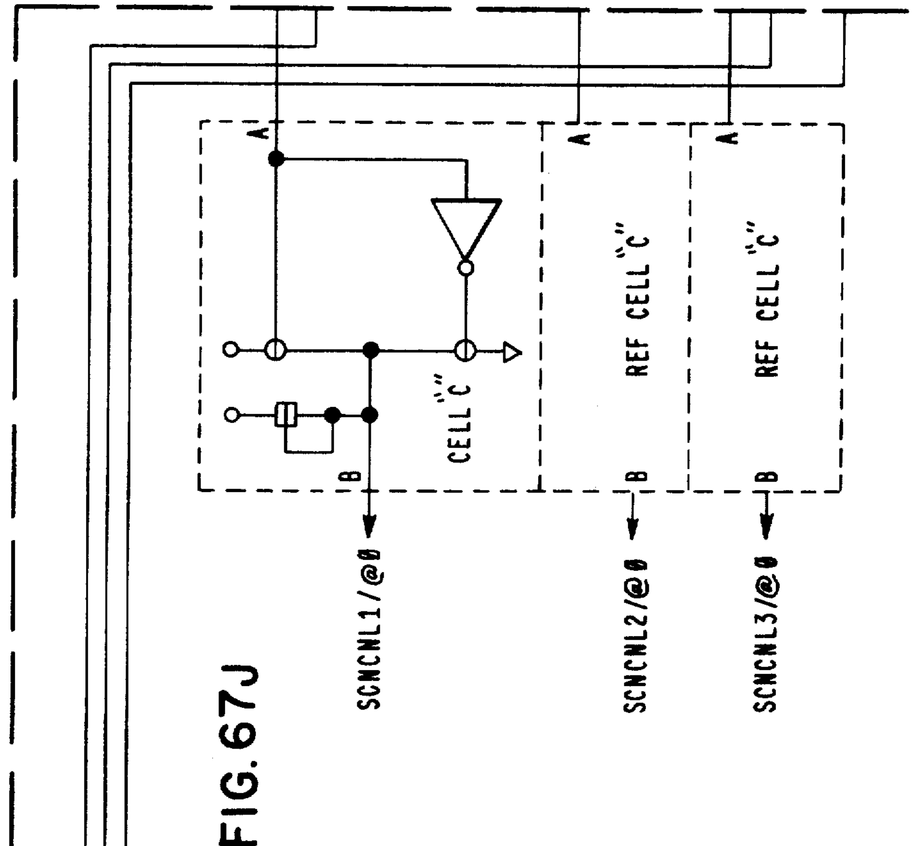
Figure 67:
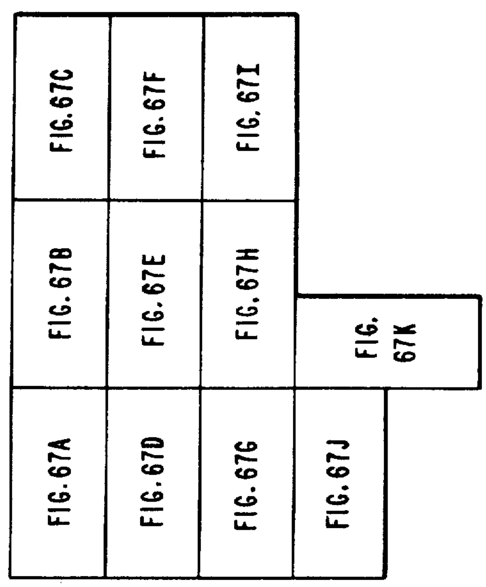
Figure 67K:
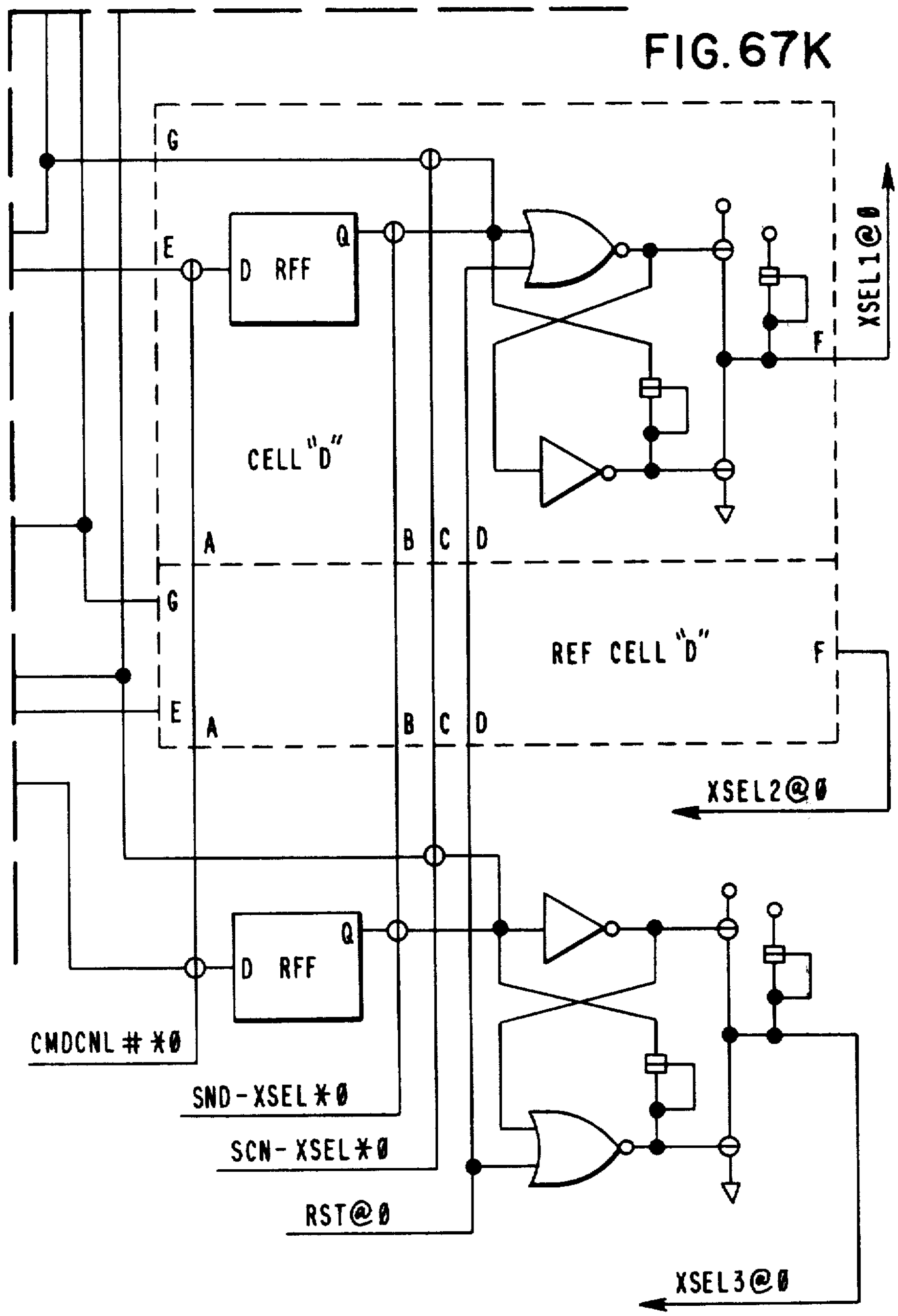
Figure 68A:
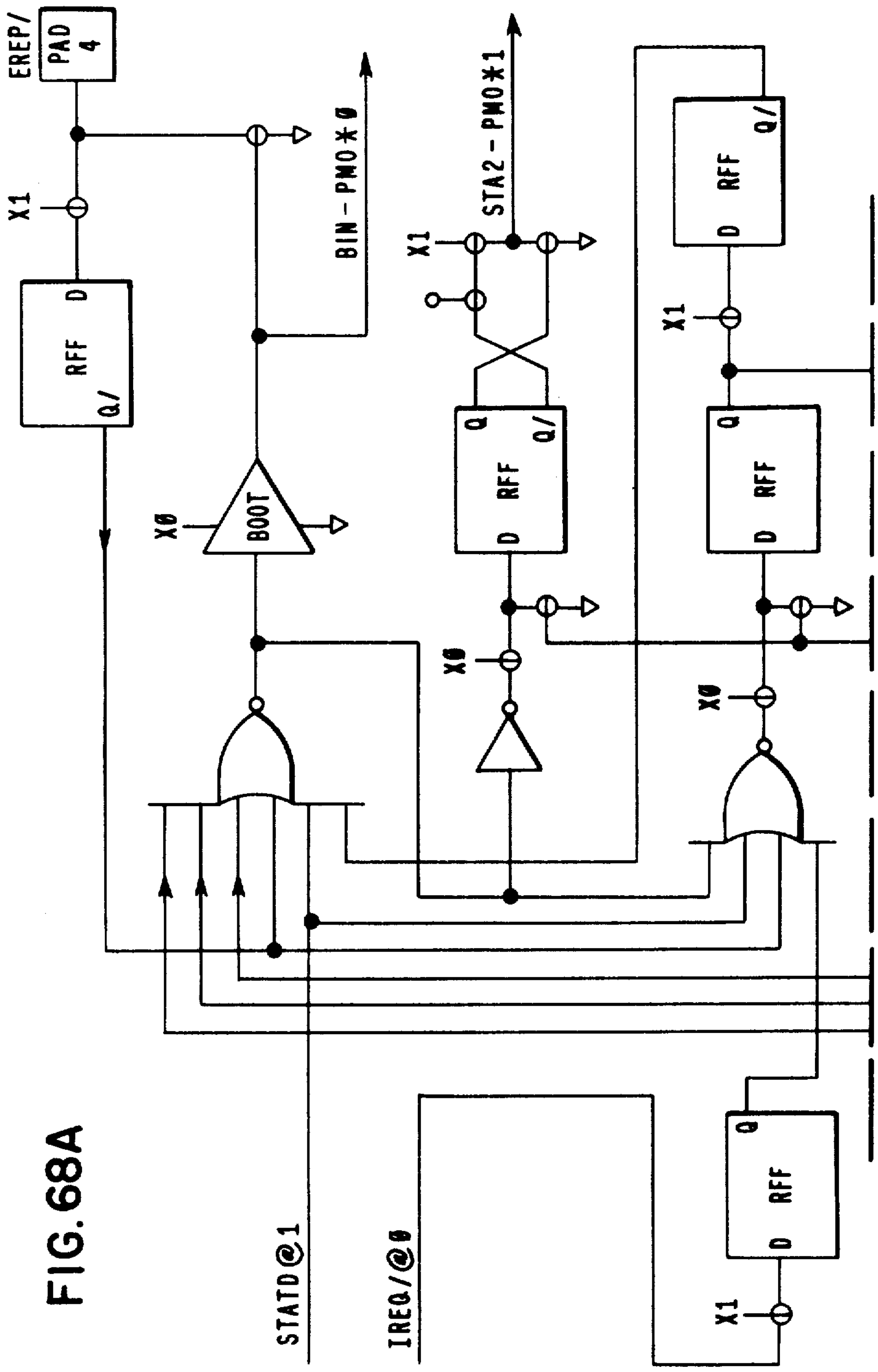
Figure 68B:
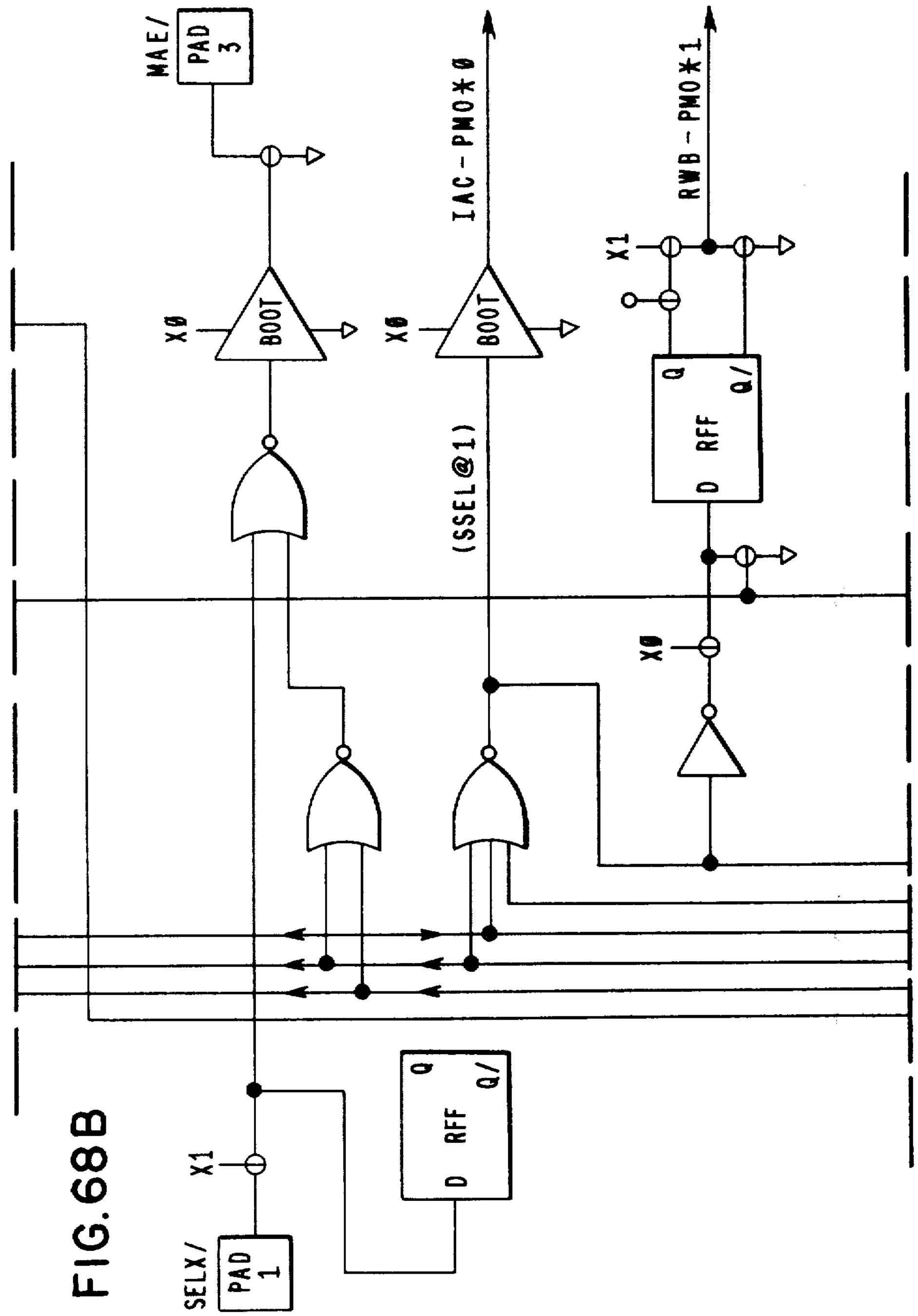
Figure 68C:
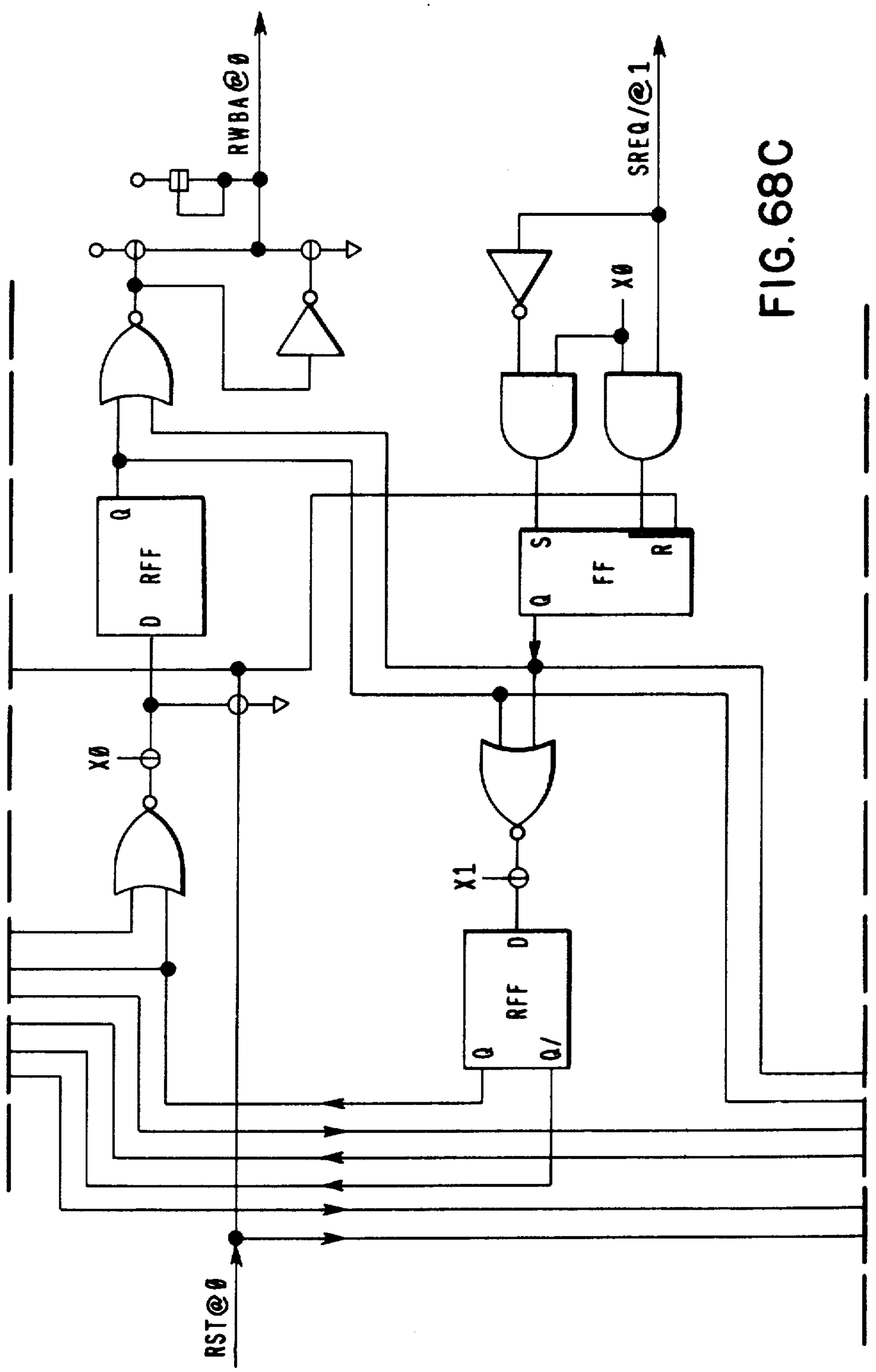
Figure 68D:
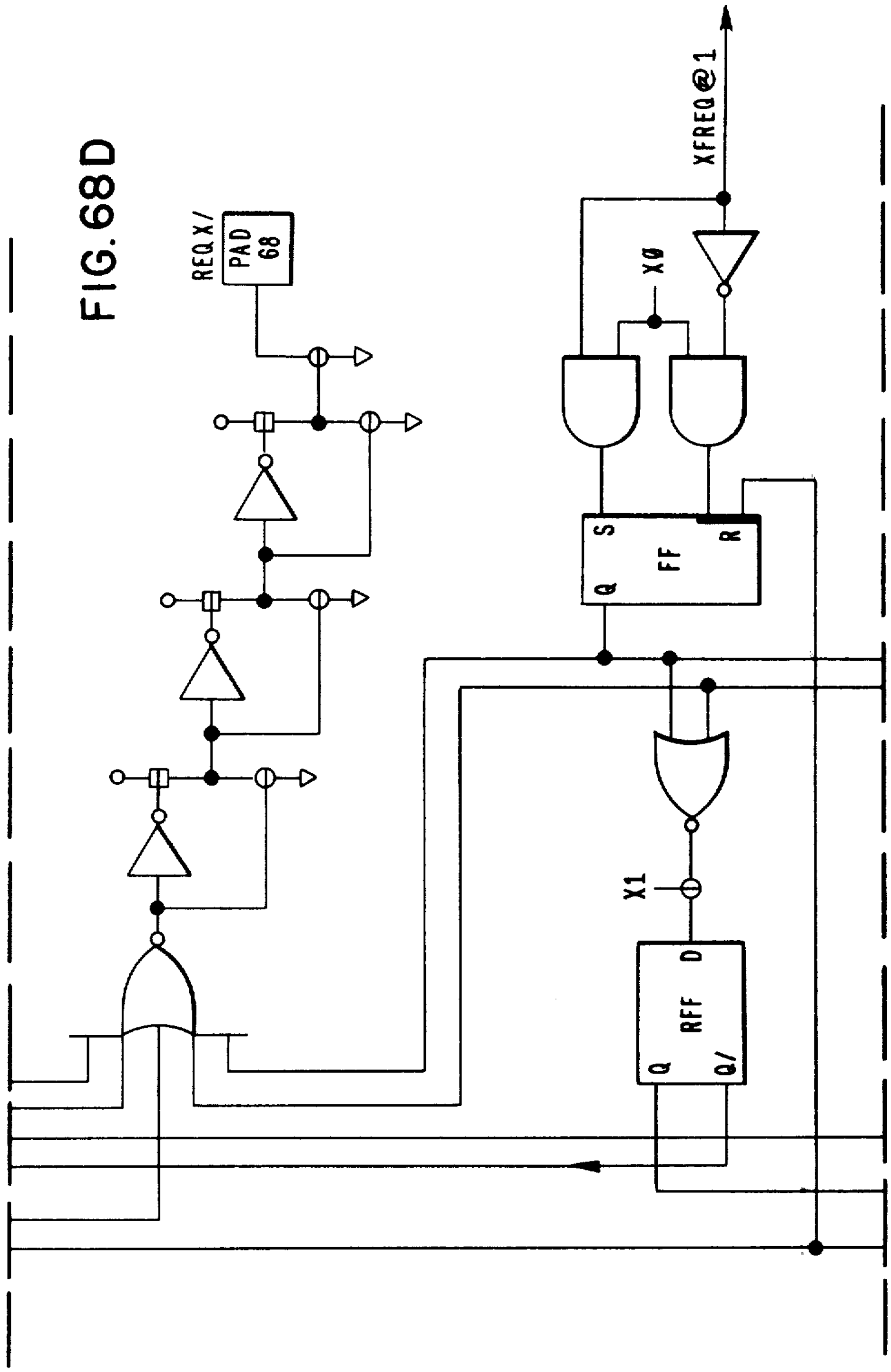
Figure 68E:
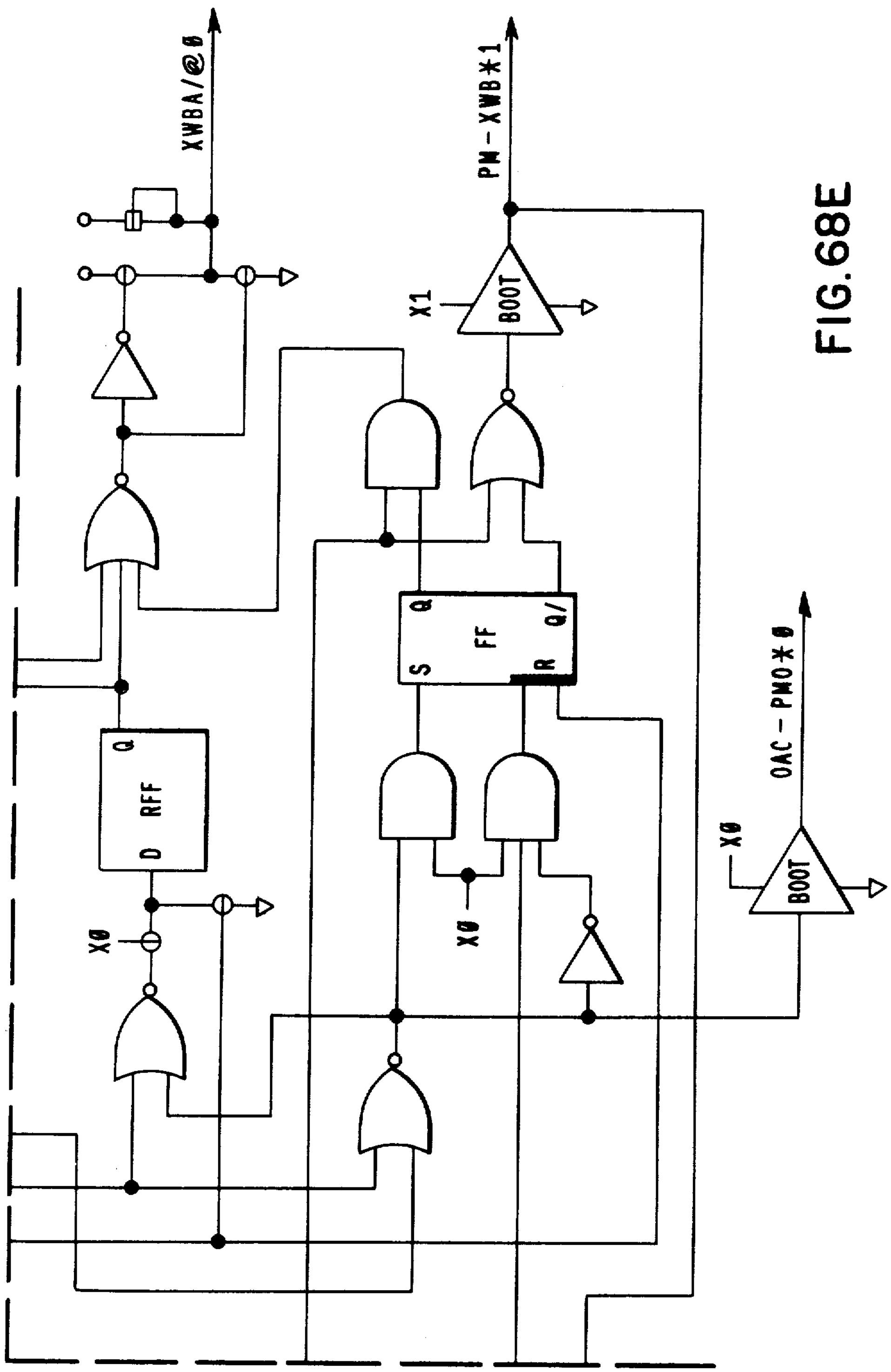
Figure 68F:
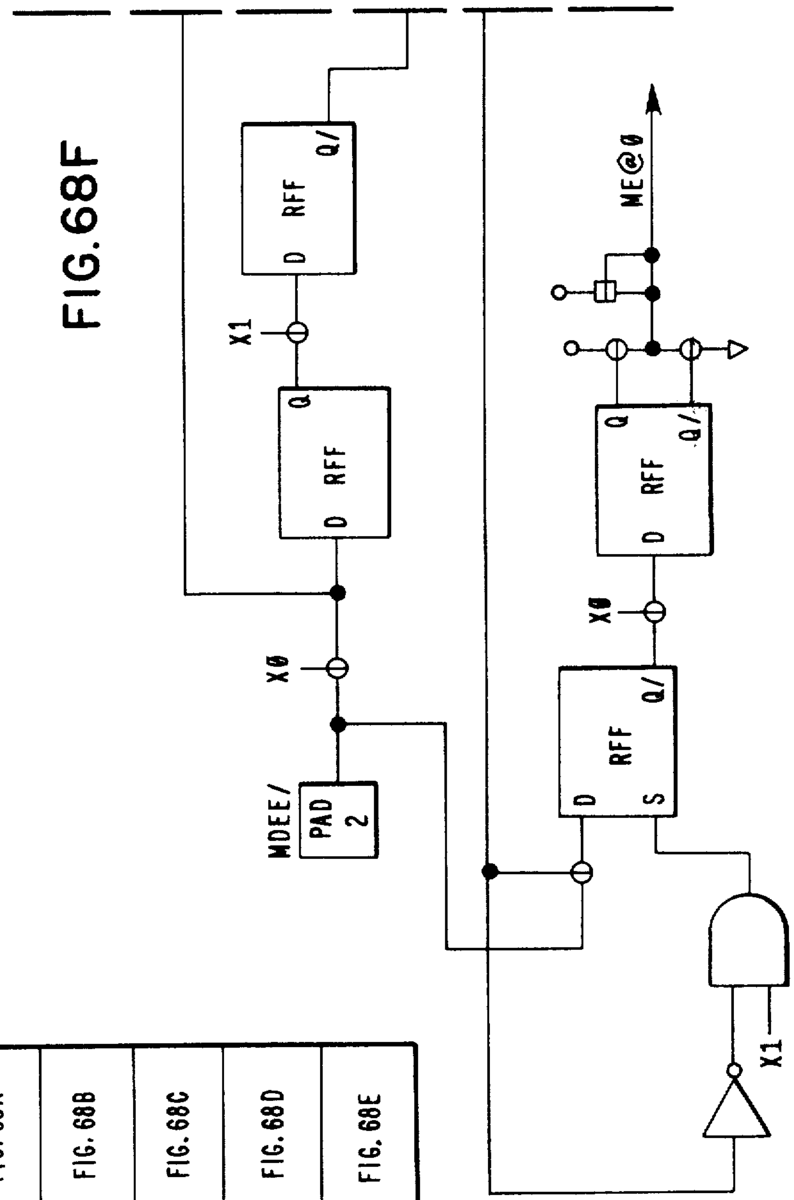
Figure 68:
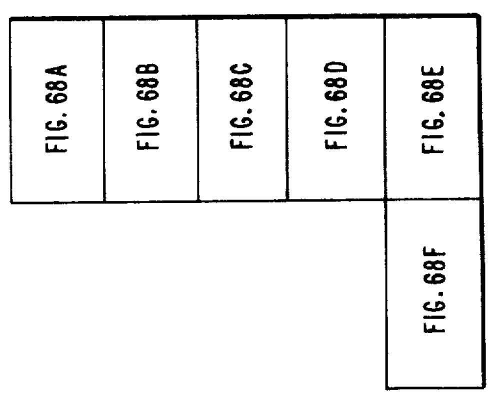

FIGS. 66A through 66N show the circuitry within the circuit components B4, RFIFO, and RBBUF. The circuitry within the broken lines in FIG. 66L is a variation only for the indicated cell in FIG. 66L.

FIGS. 67A through 67K generally show the circuit components of the retry counter CNT and the retry timer (including SADC) in the retry circuit for the two-channel System Bus.

FIGS. 68A through 68F show logic circuitry used in controlling the manner in which the system interface chip is connected to the P-M bus.

Figure 69:
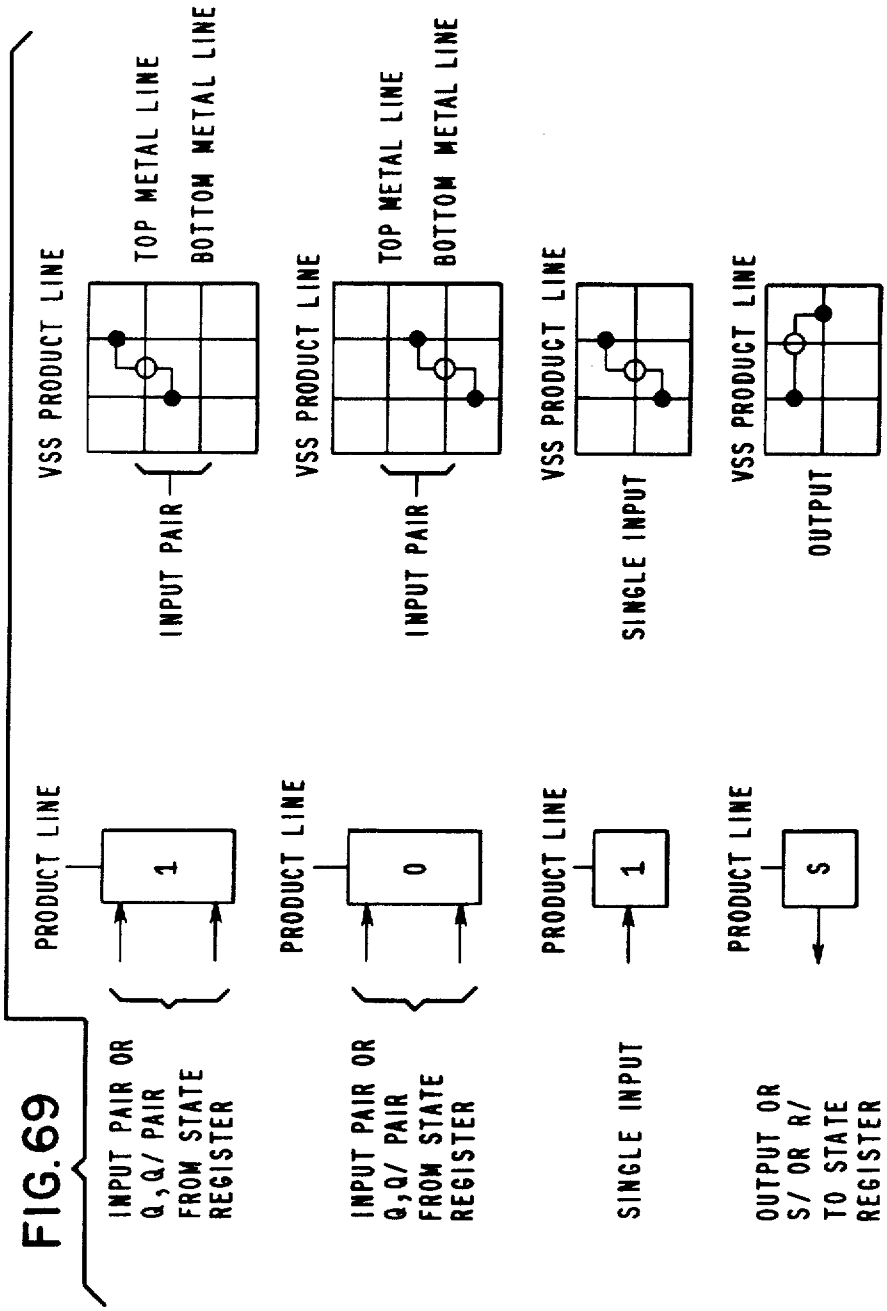
Figure 70:
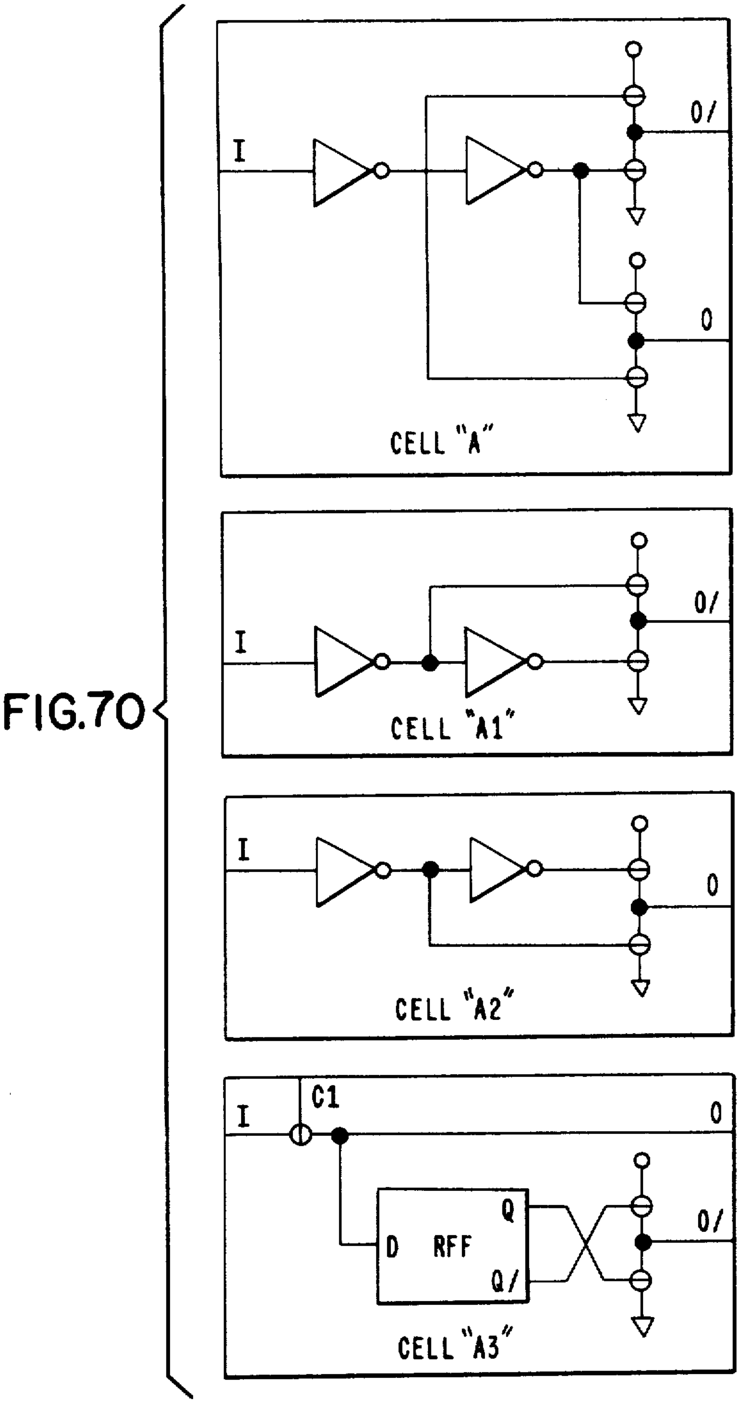
Figure 7I:
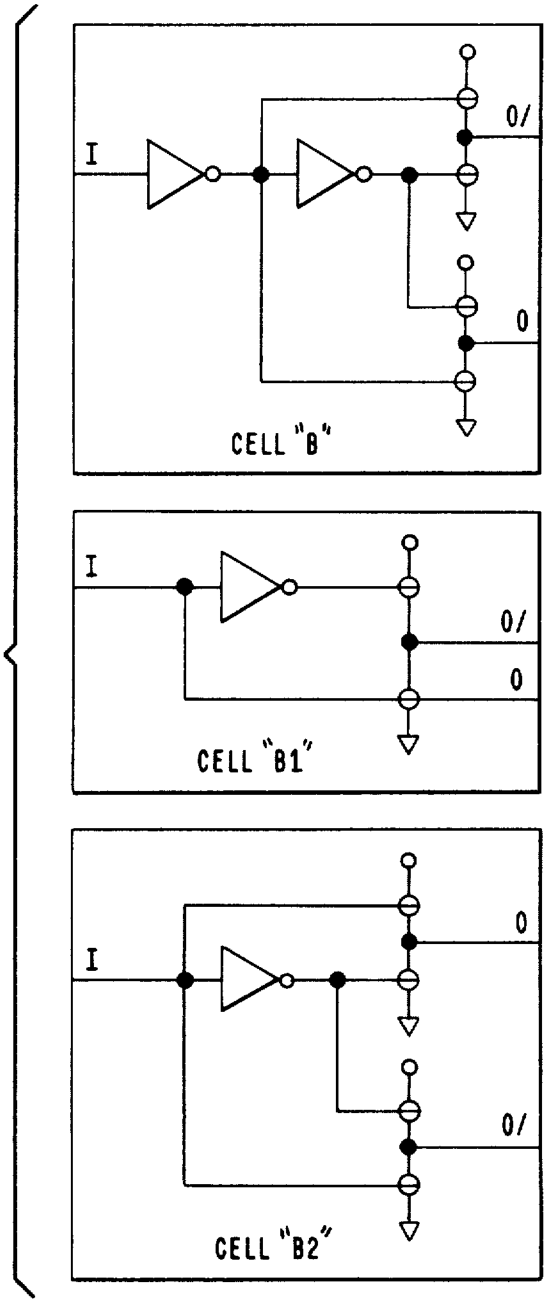
Figure 72:
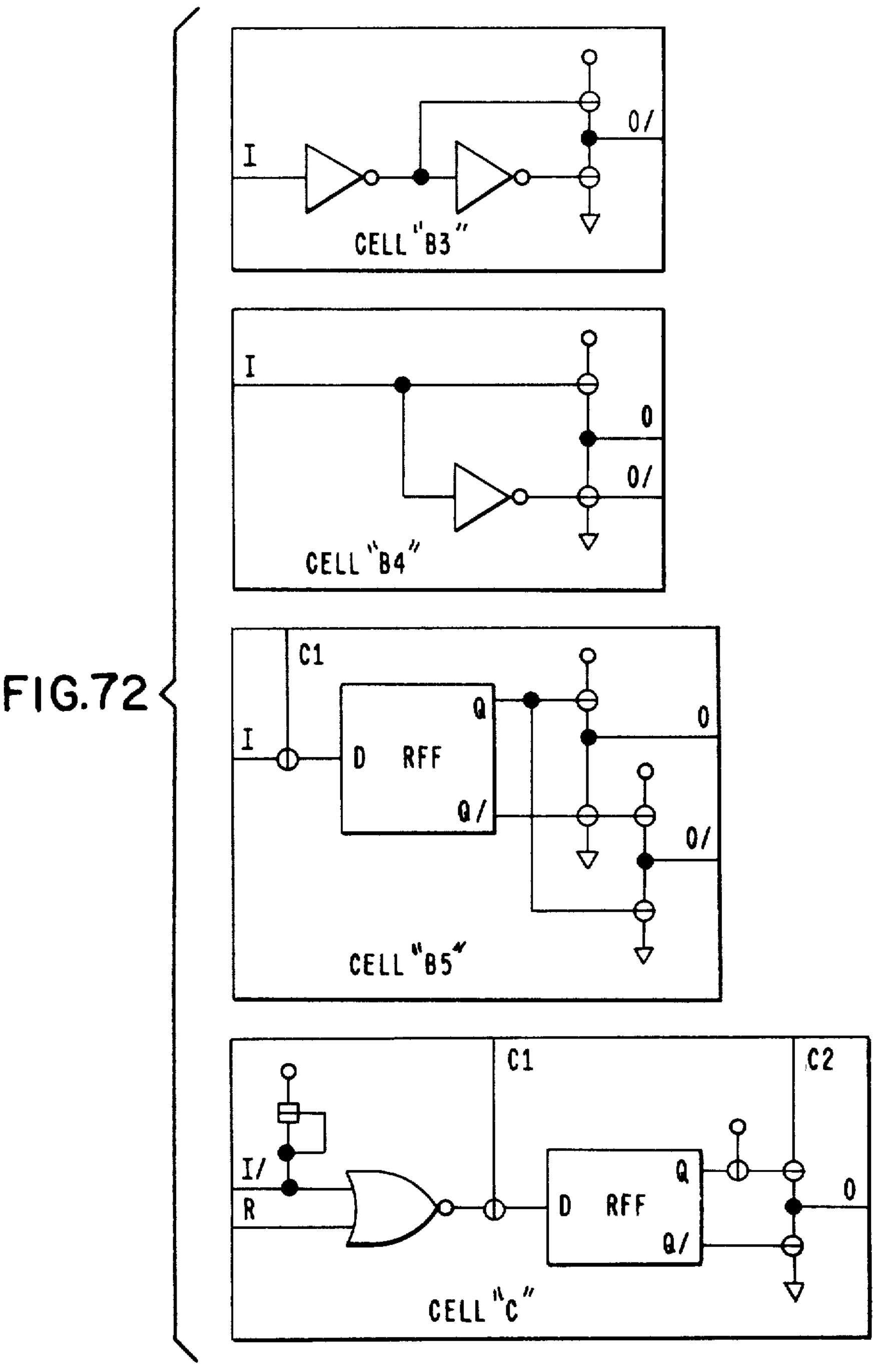
Figure 73:
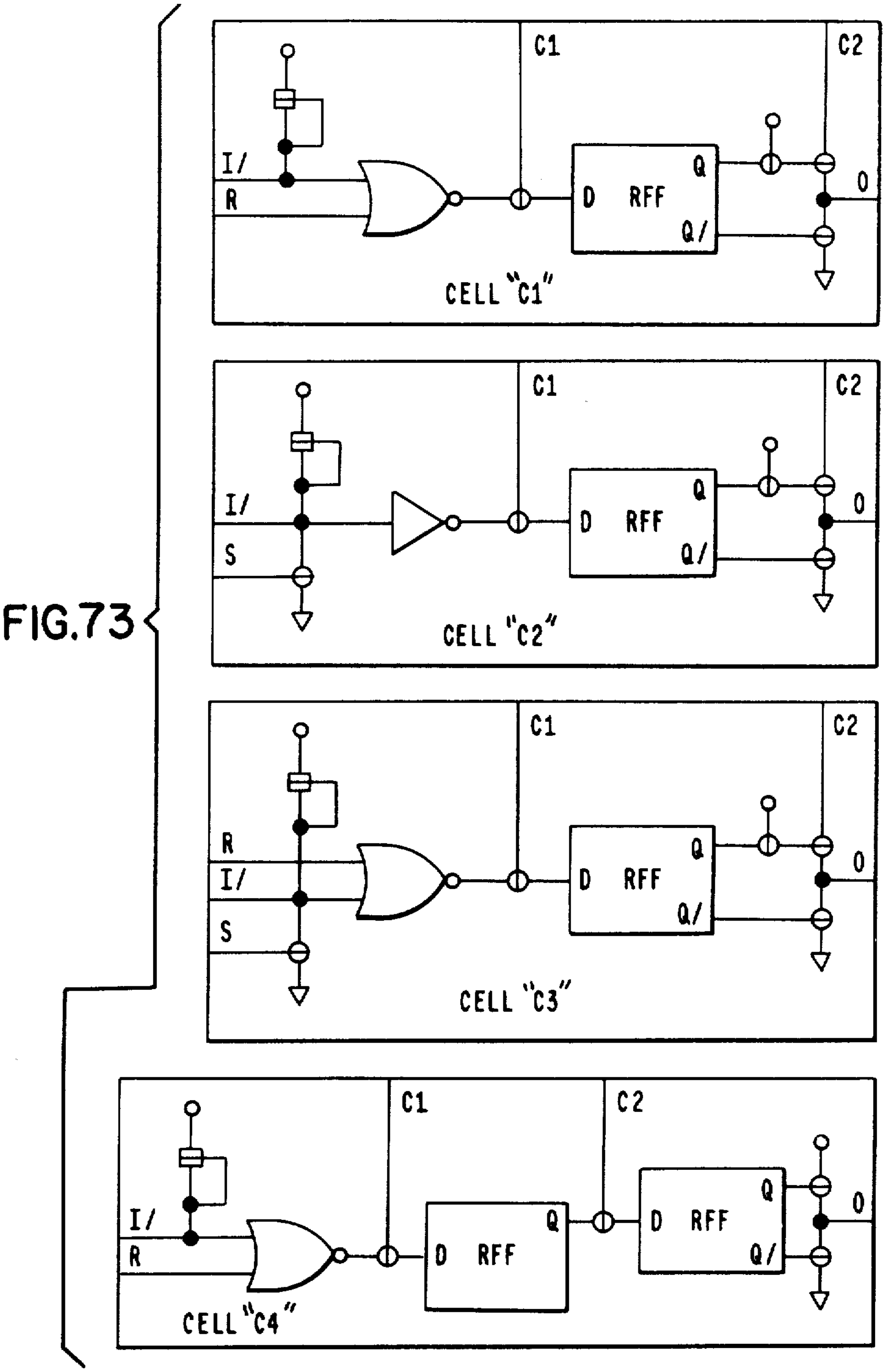
Figure 74:
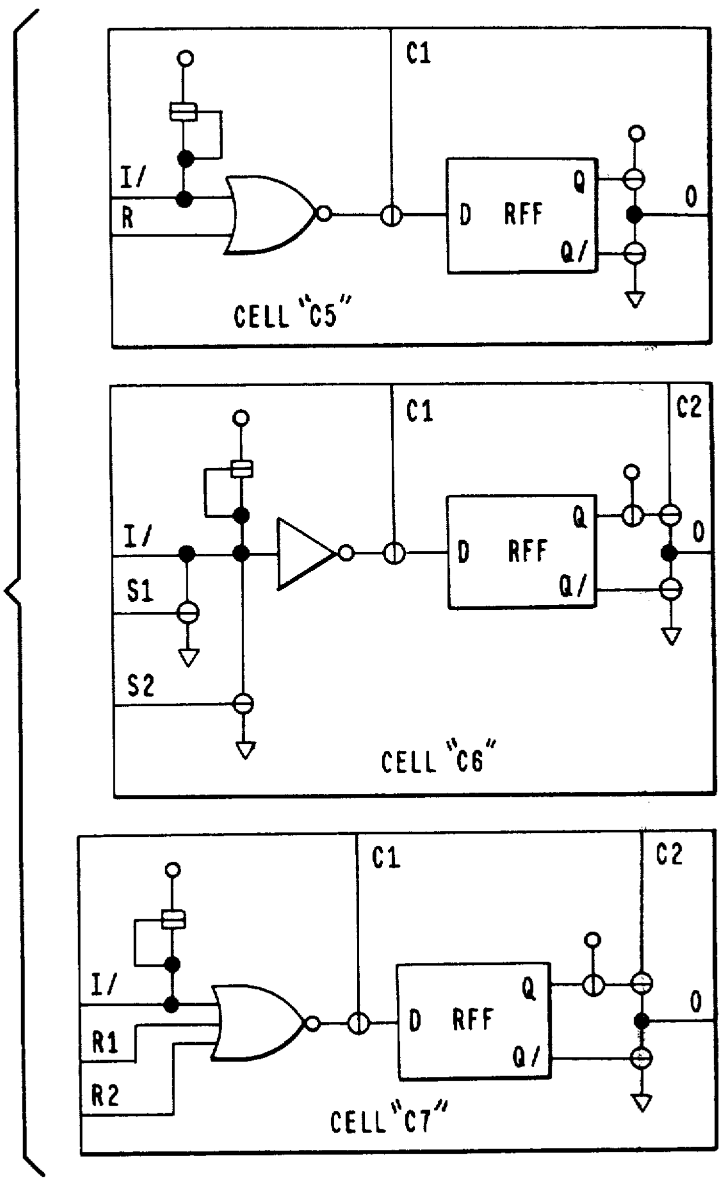
Figure 75:
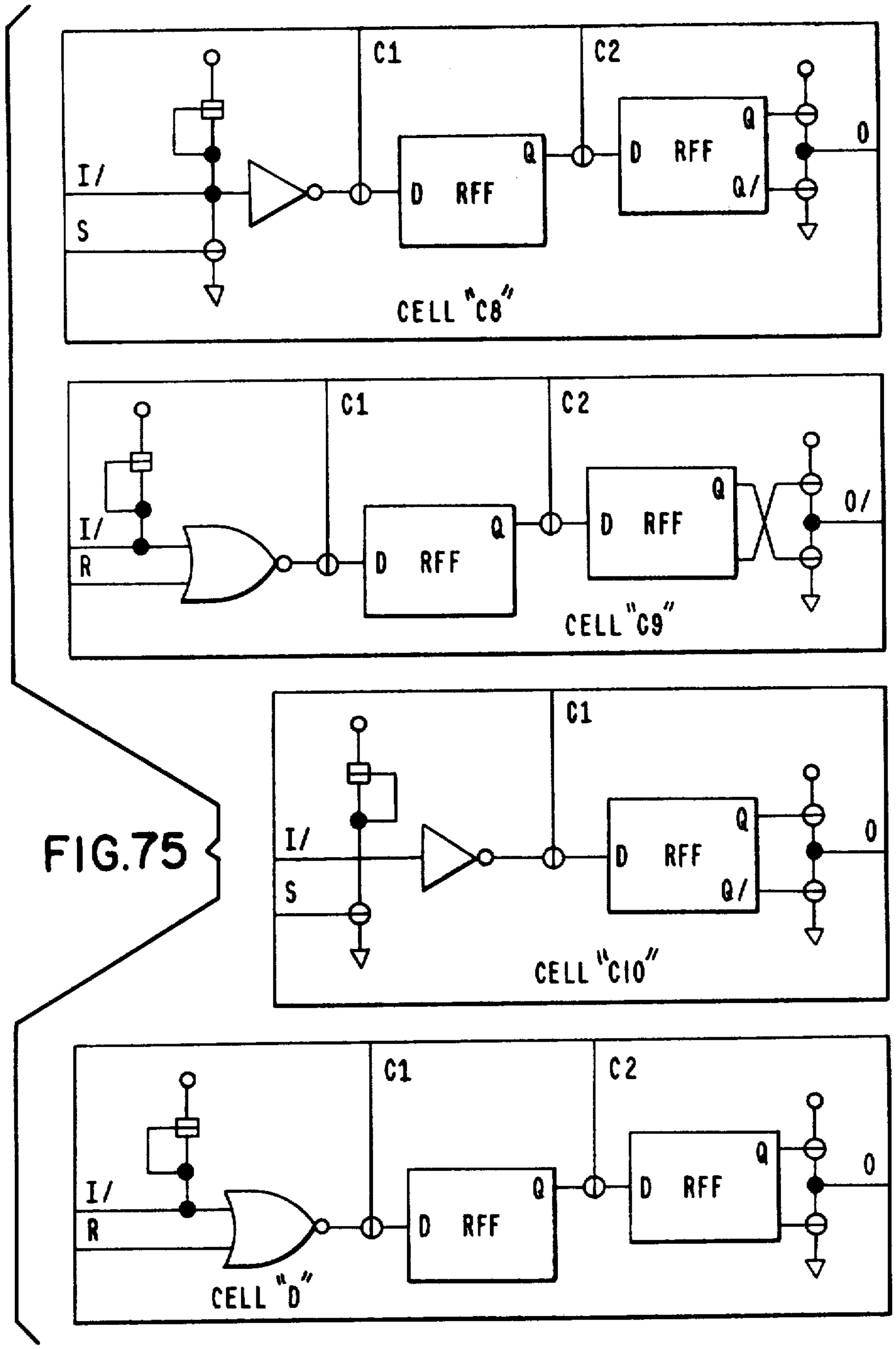
Figure 76:
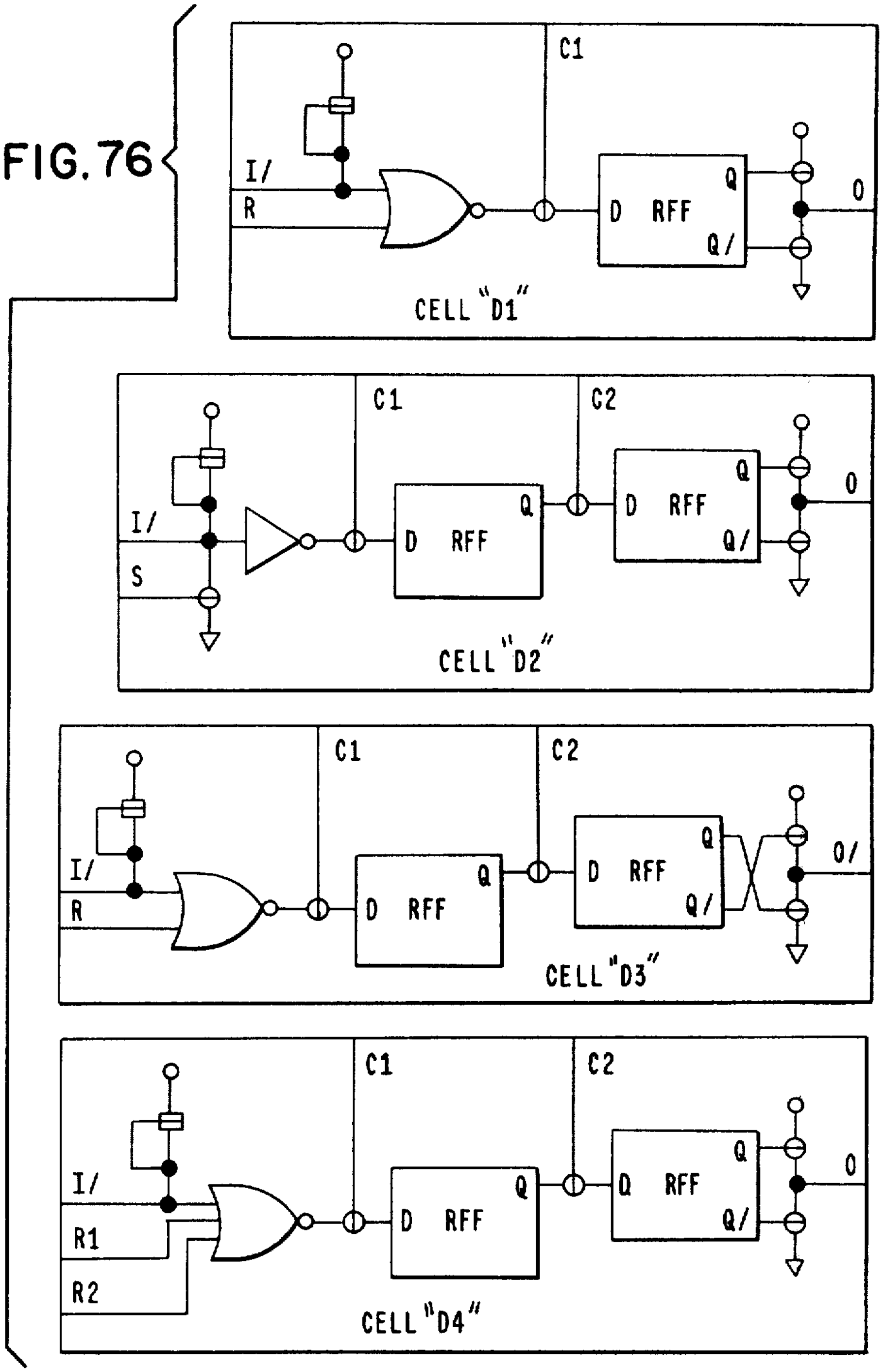
Figure 77:
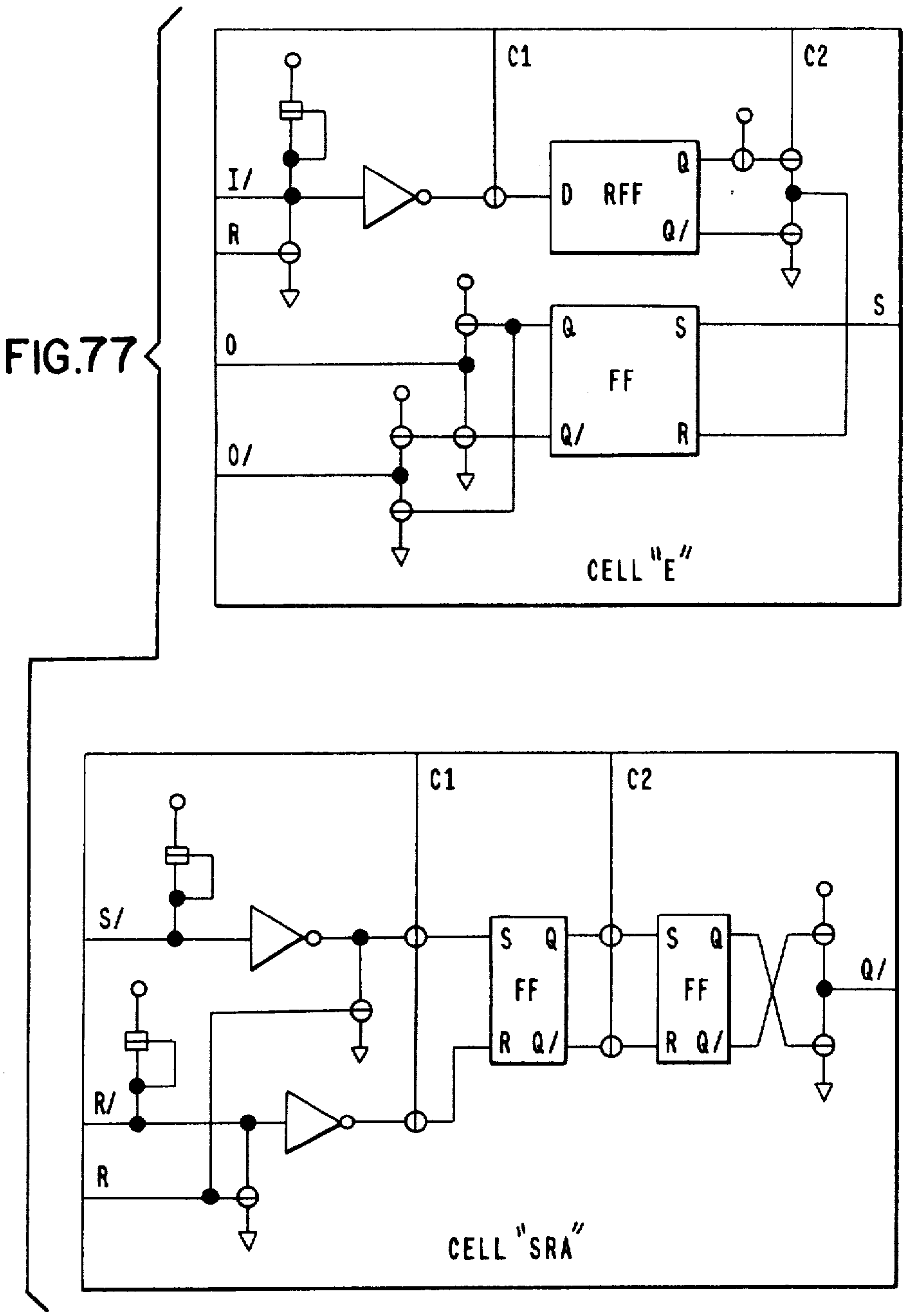
Figure 78:
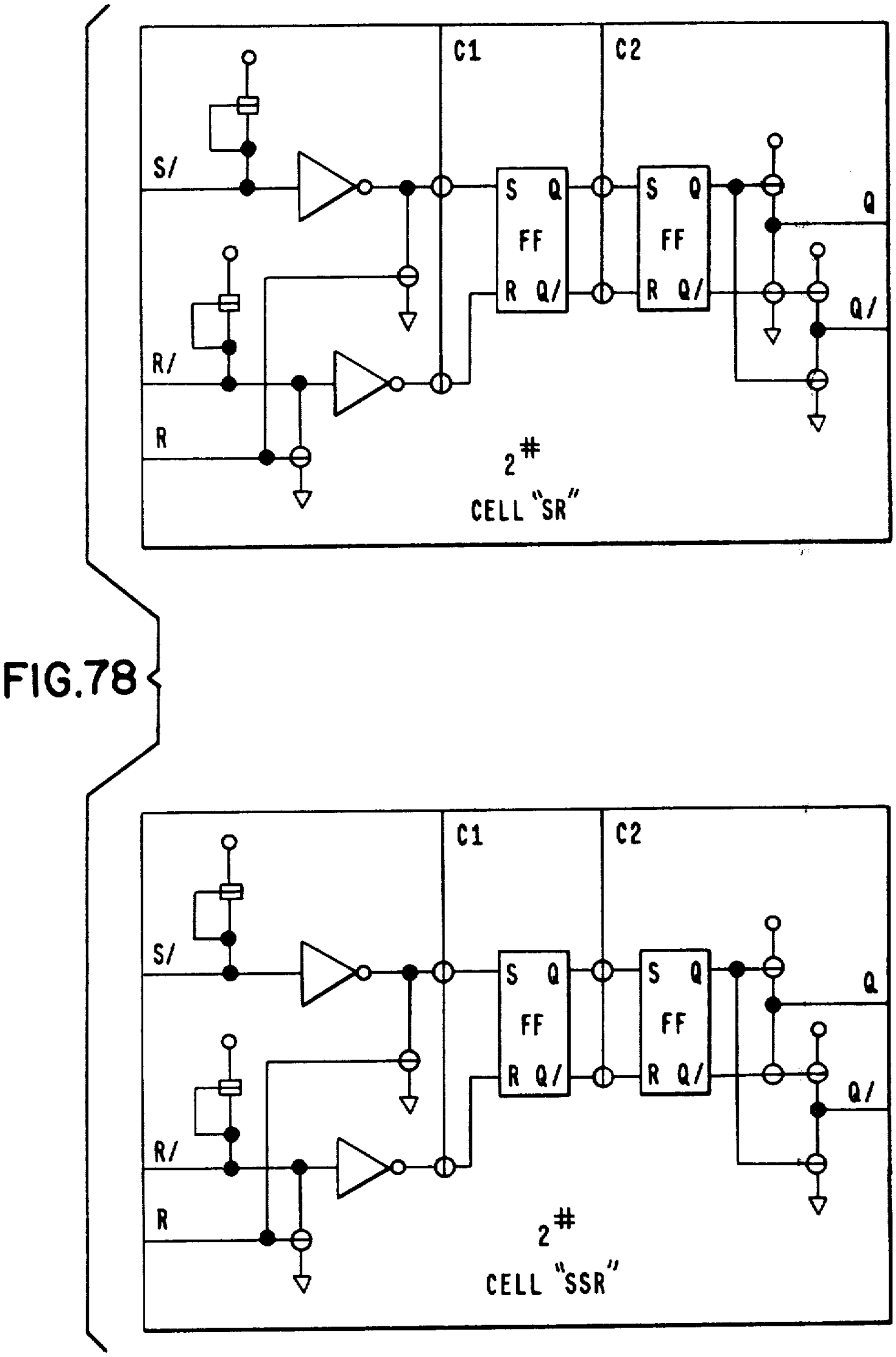
Figure 79A:
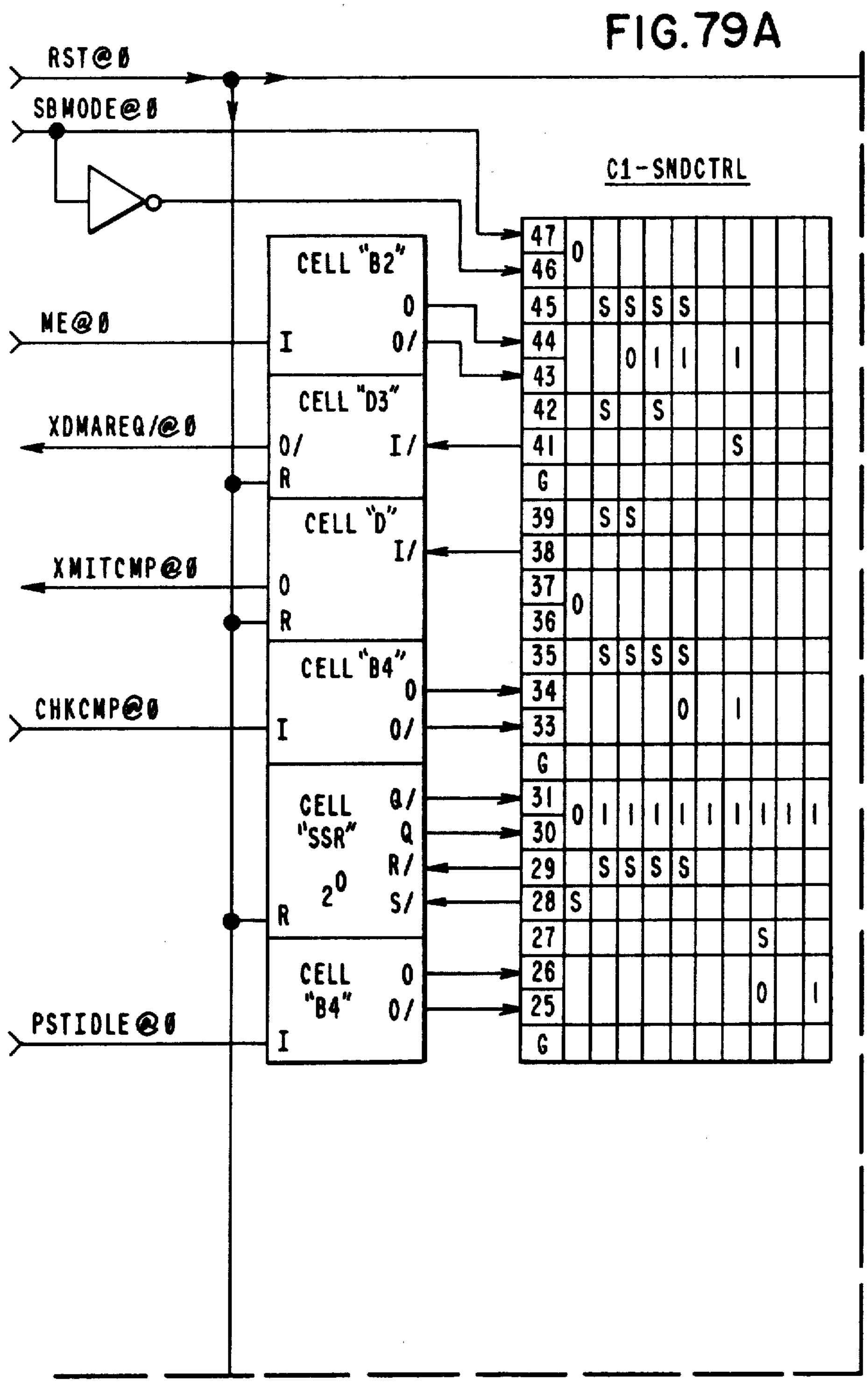
Figure 79B:
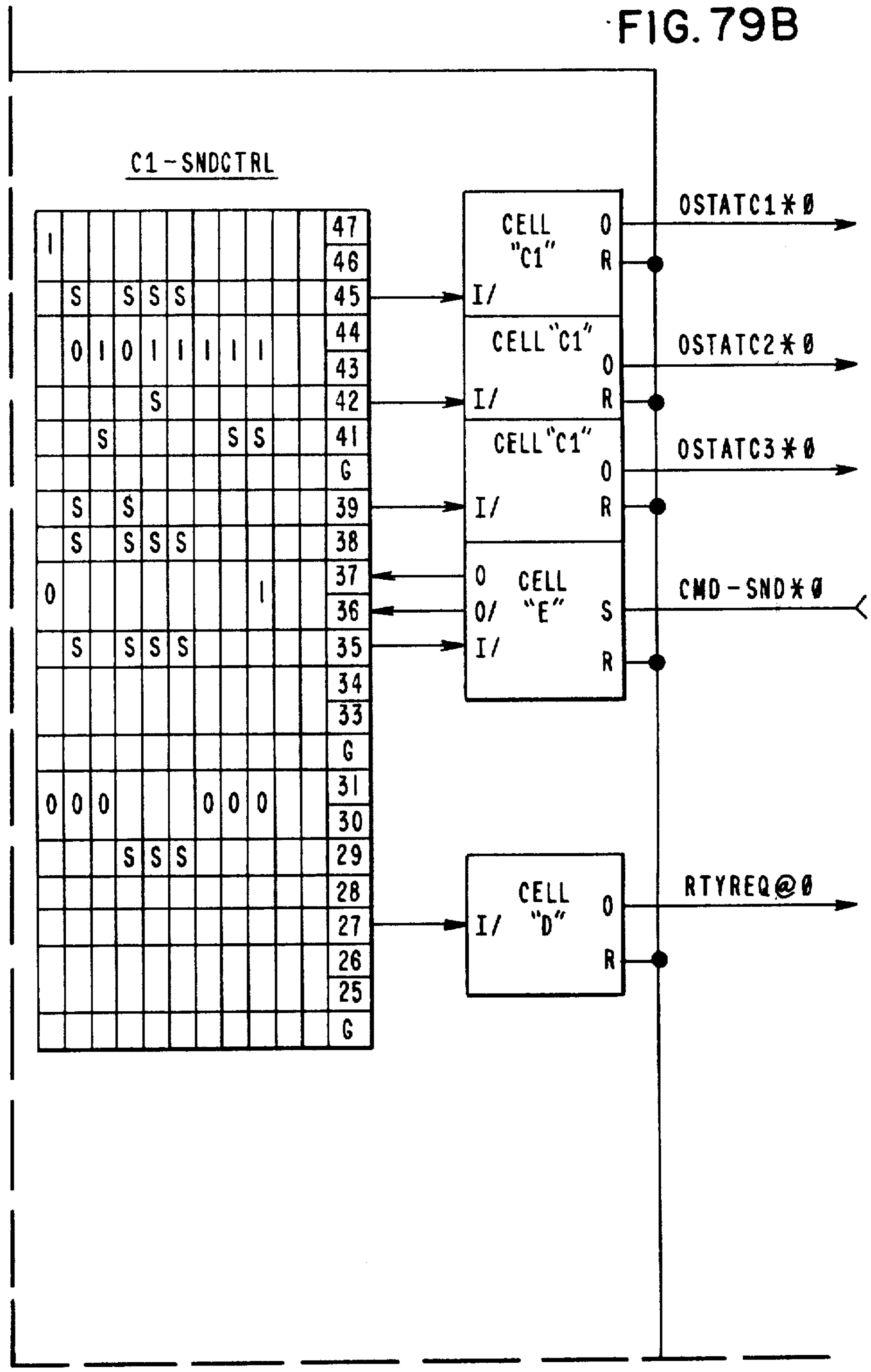
Figure 79C:
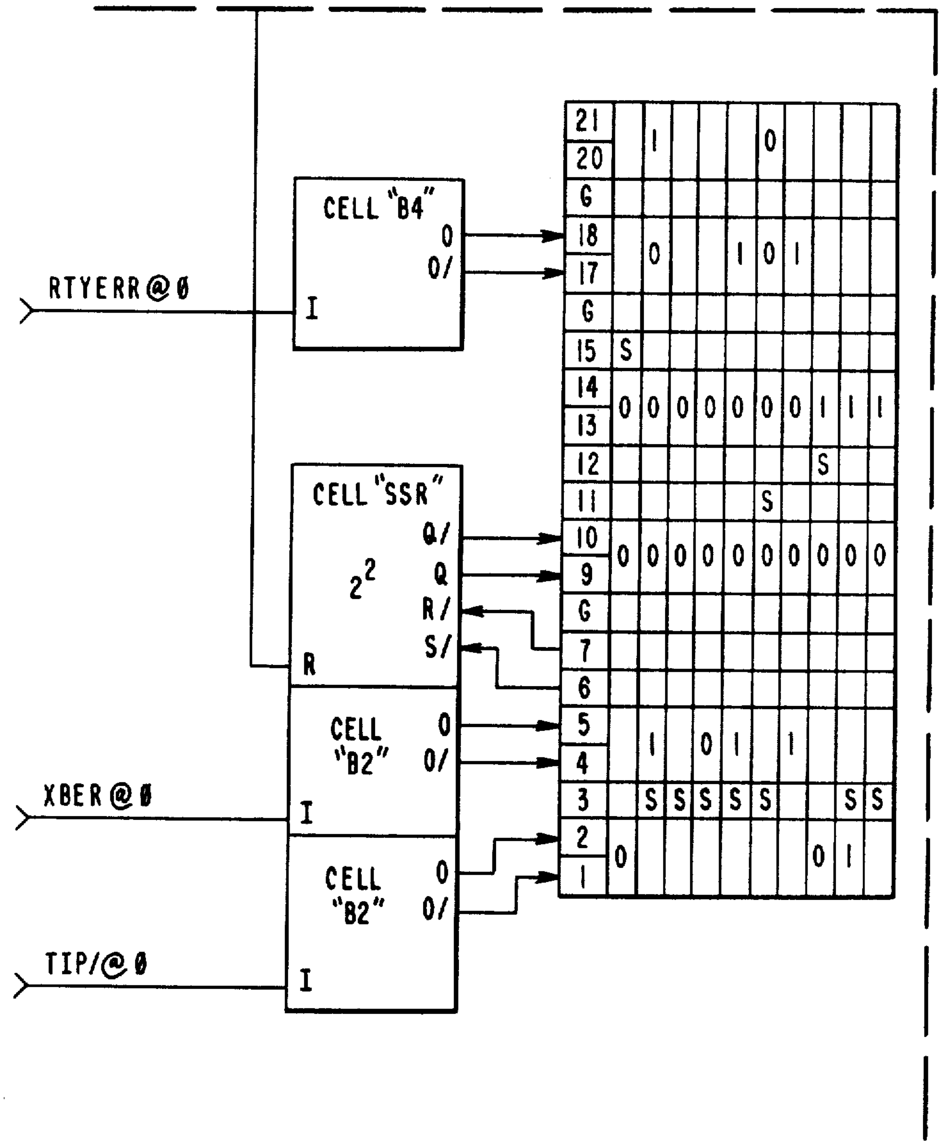
Figure 79D:
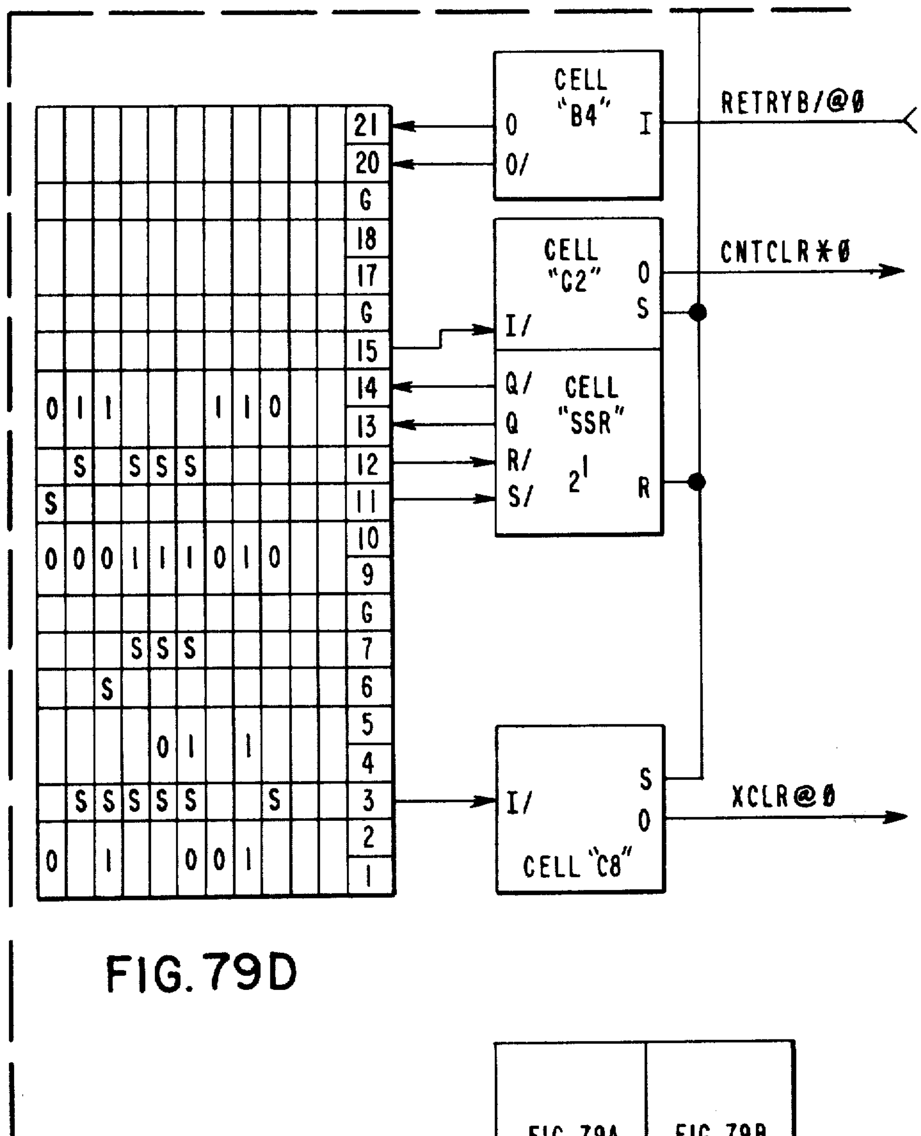
Figure 79:
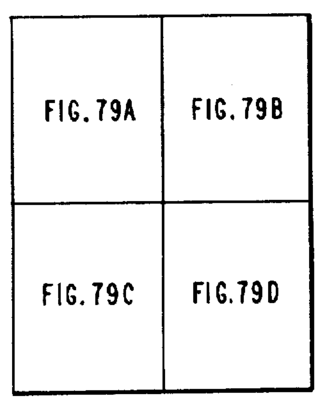
Figure 80B:
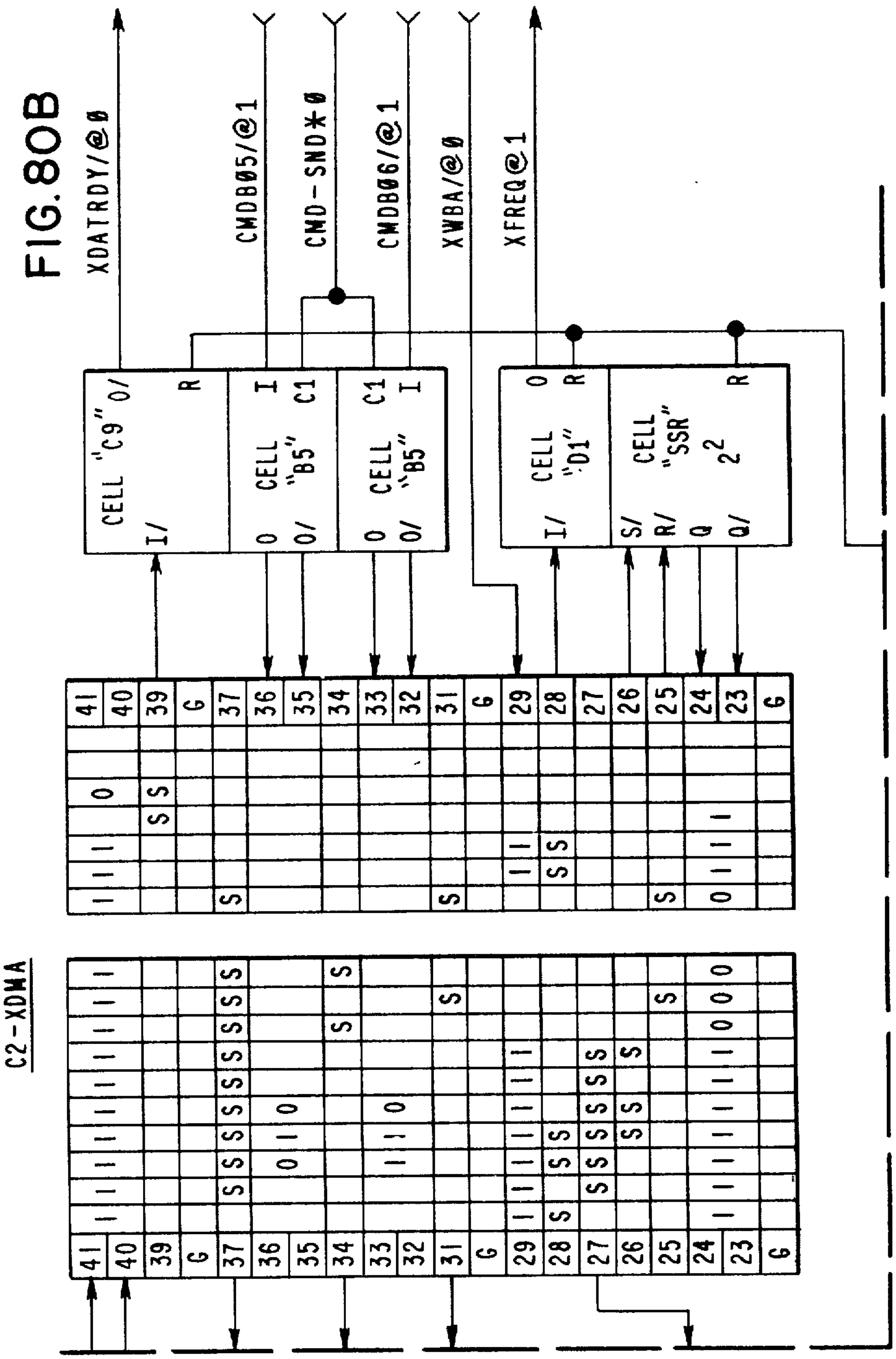
Figure 80C:
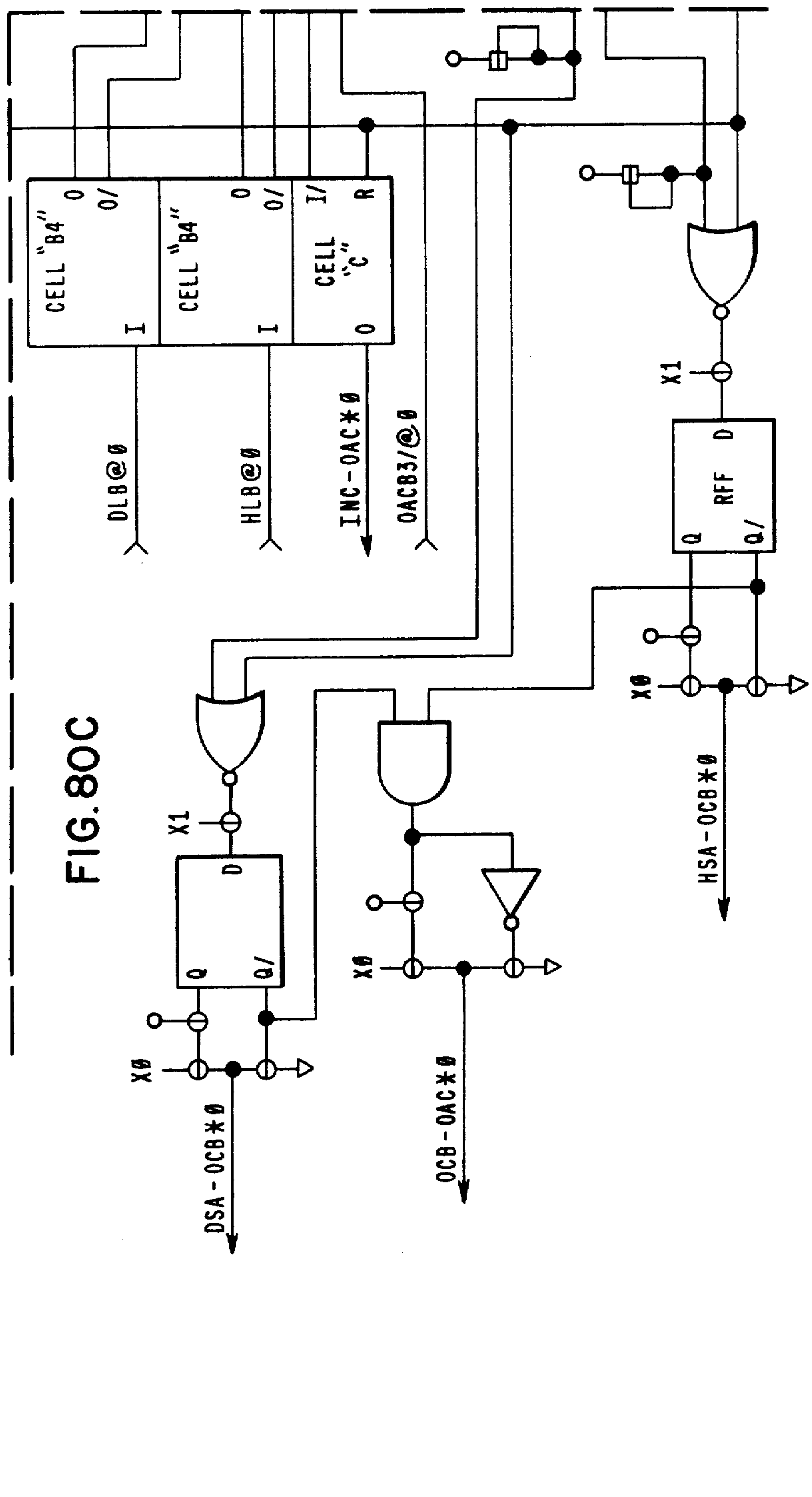
Figure 80D:
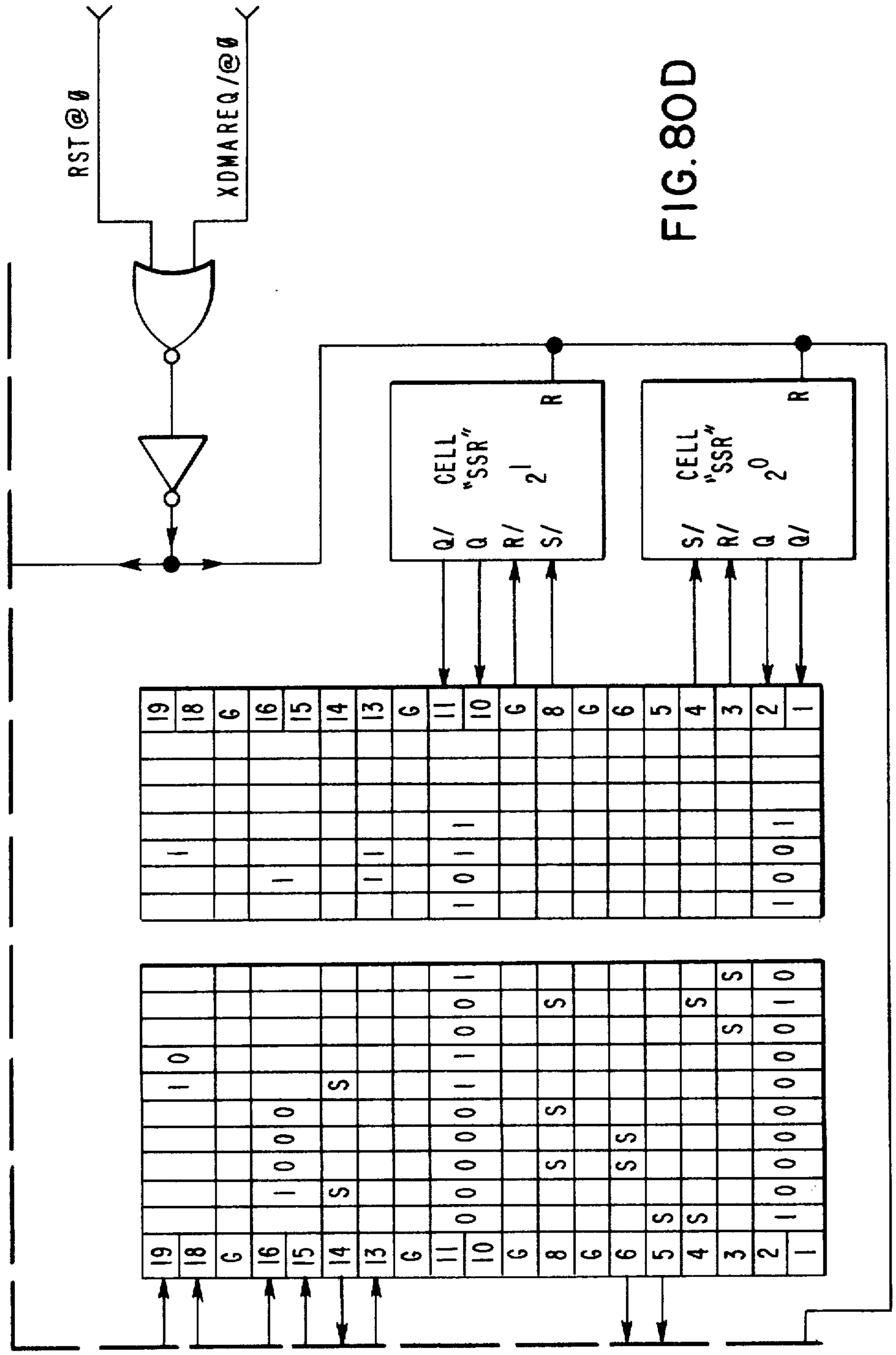
Figure 81A:
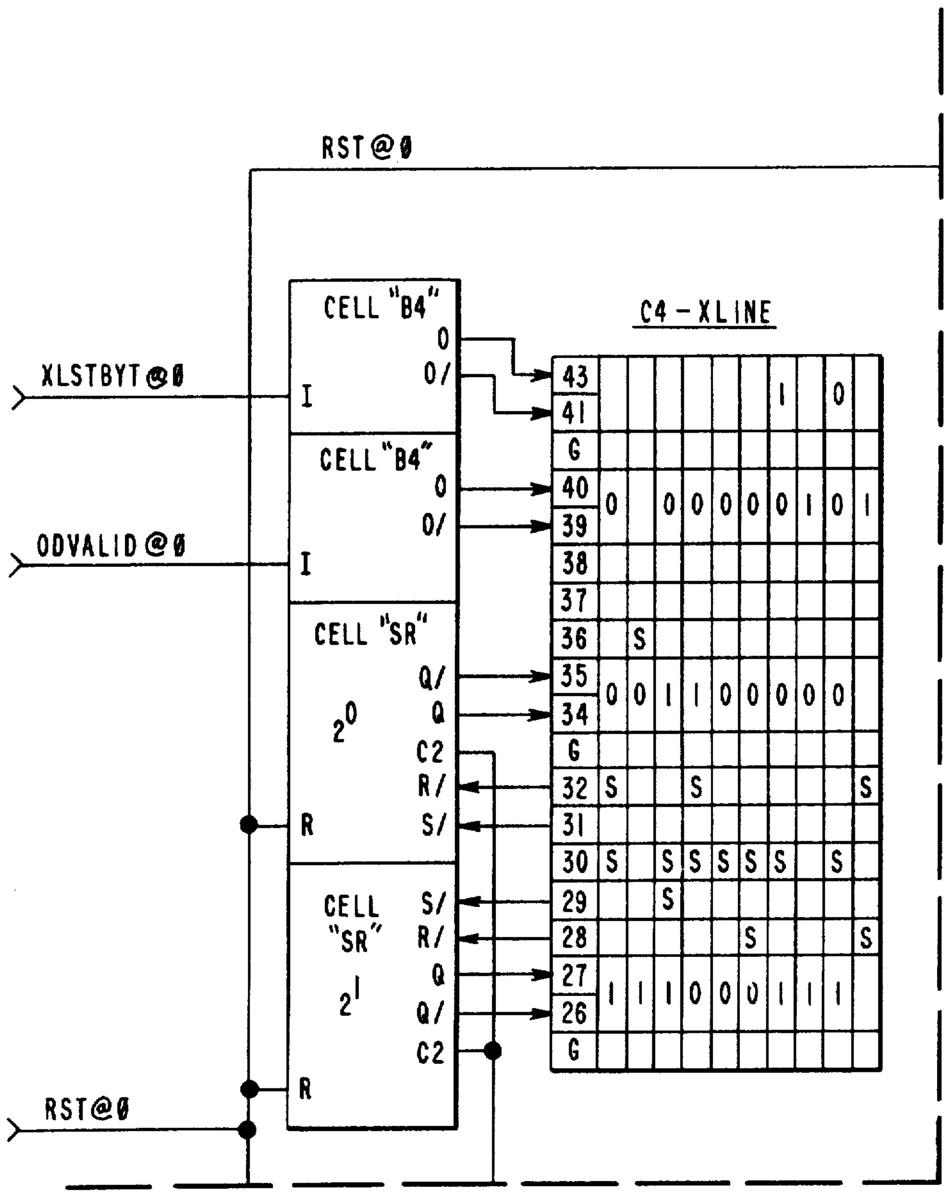
Figure 81B:
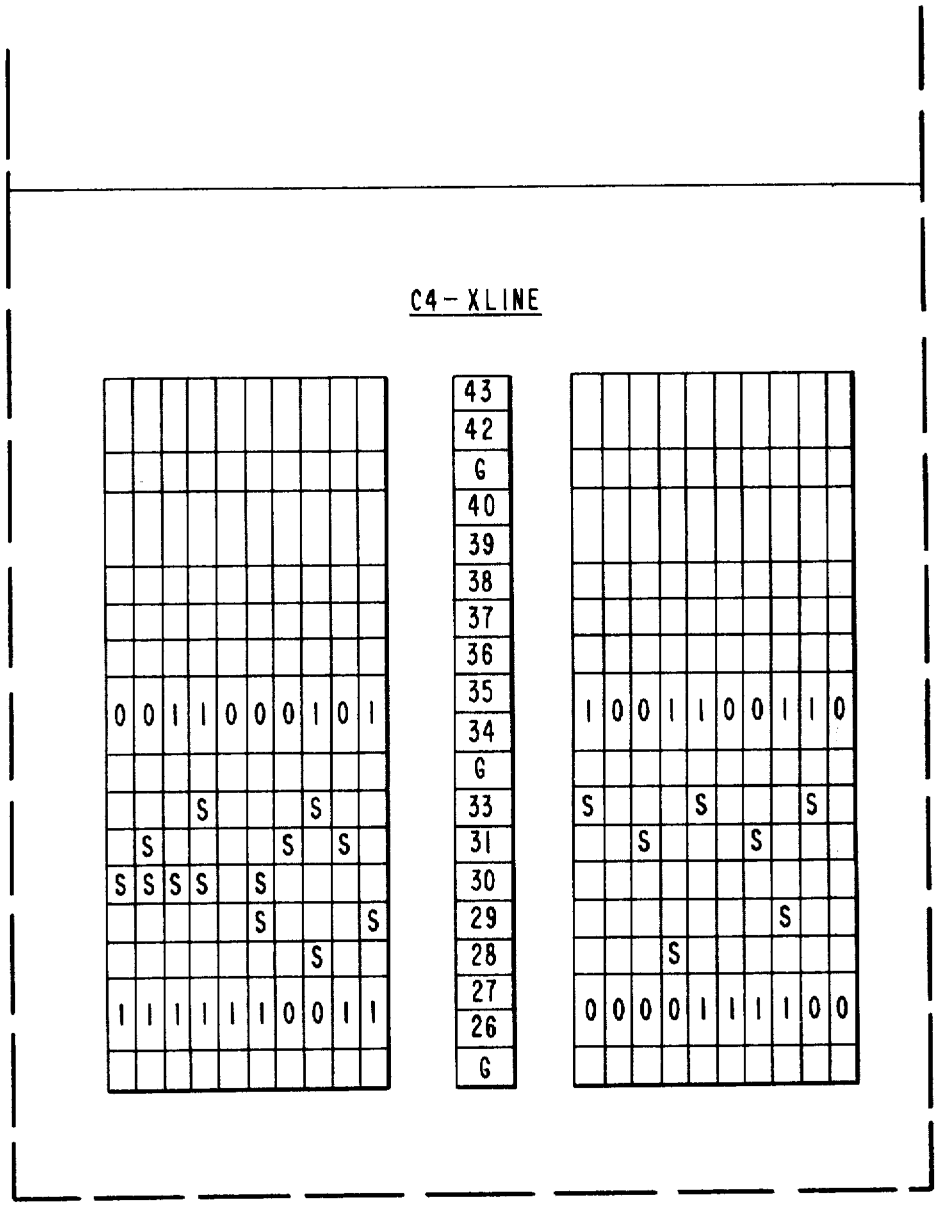
Figure 81C:
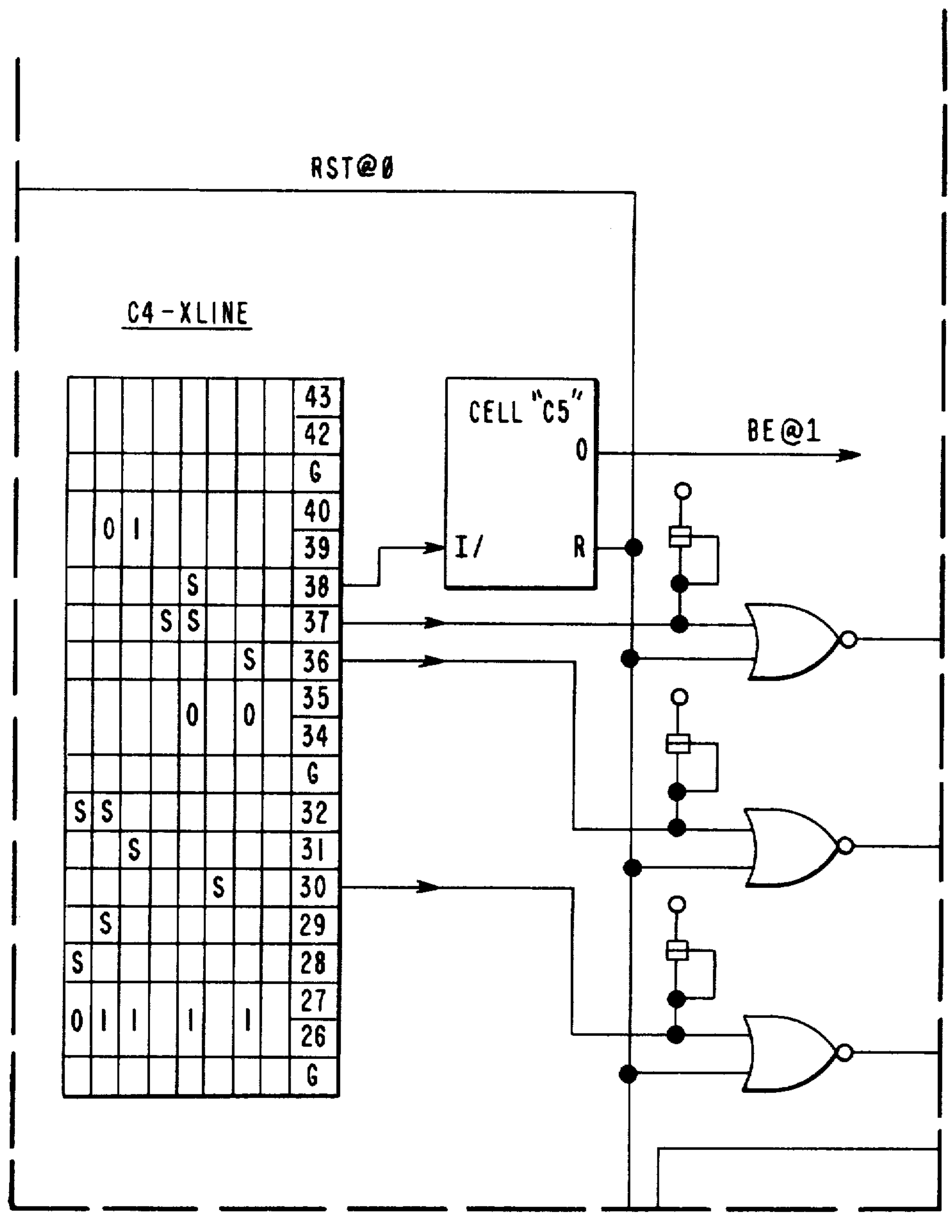
Figure 81E:
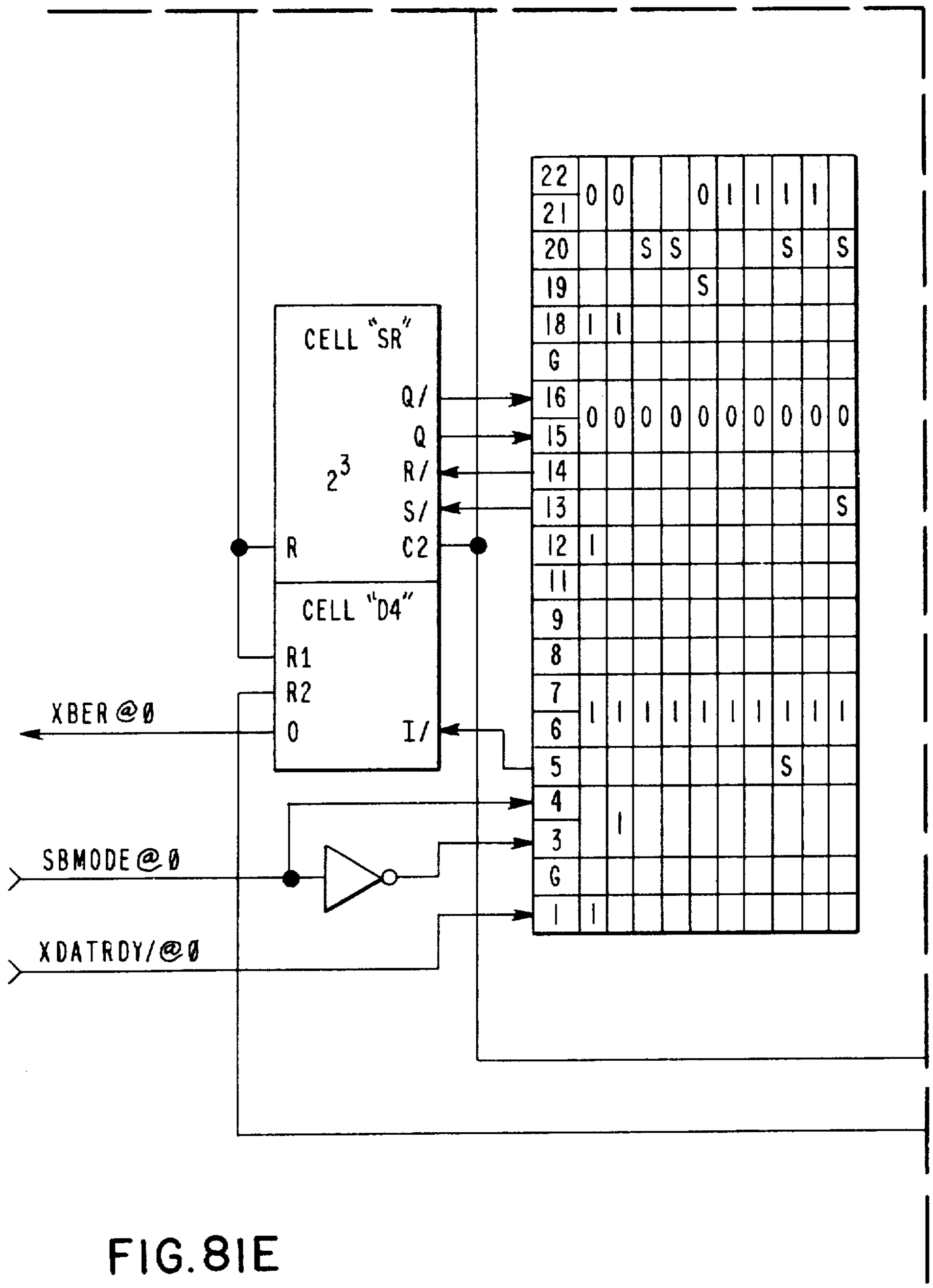
Figure 81F:
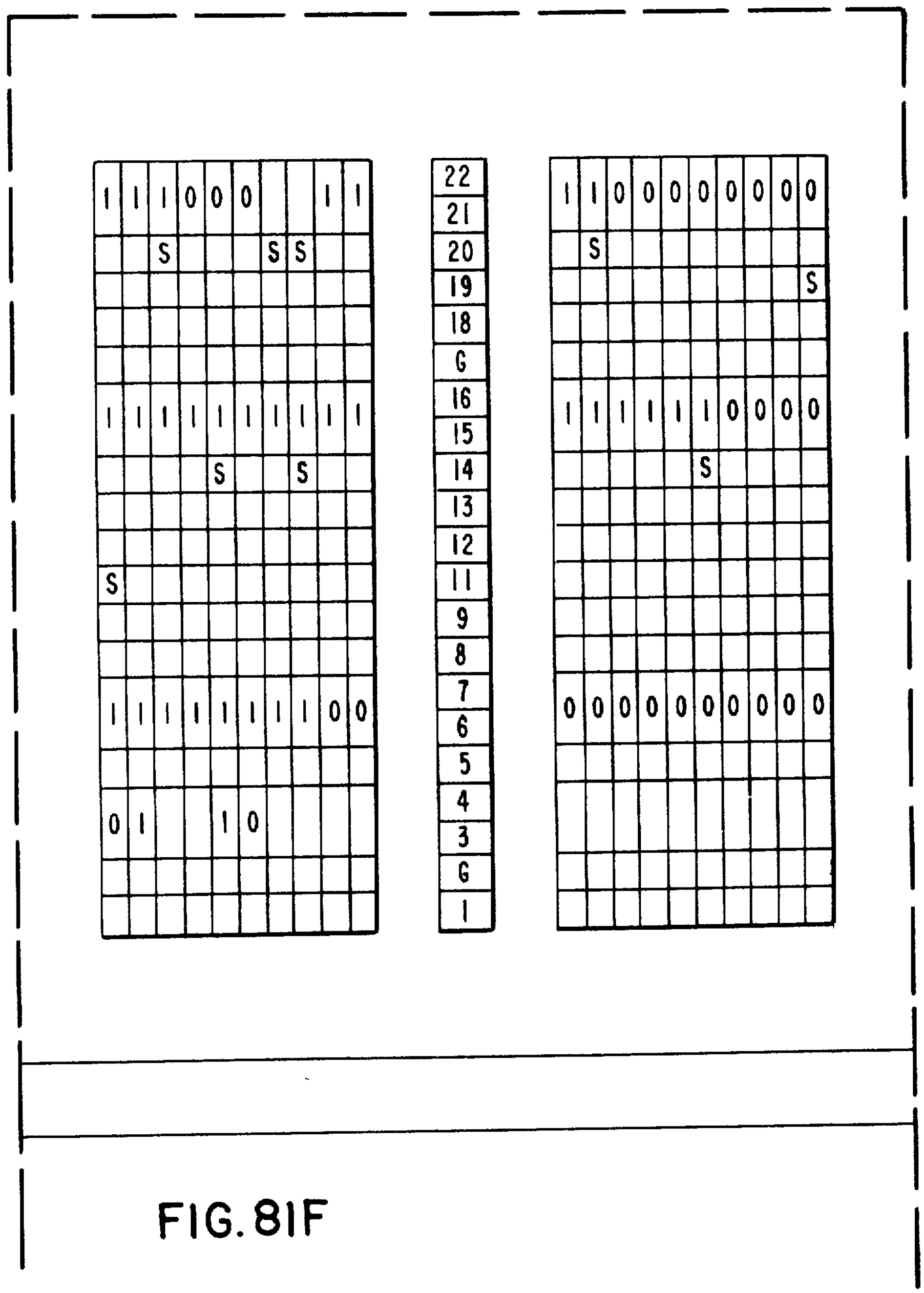
Figure 81G:
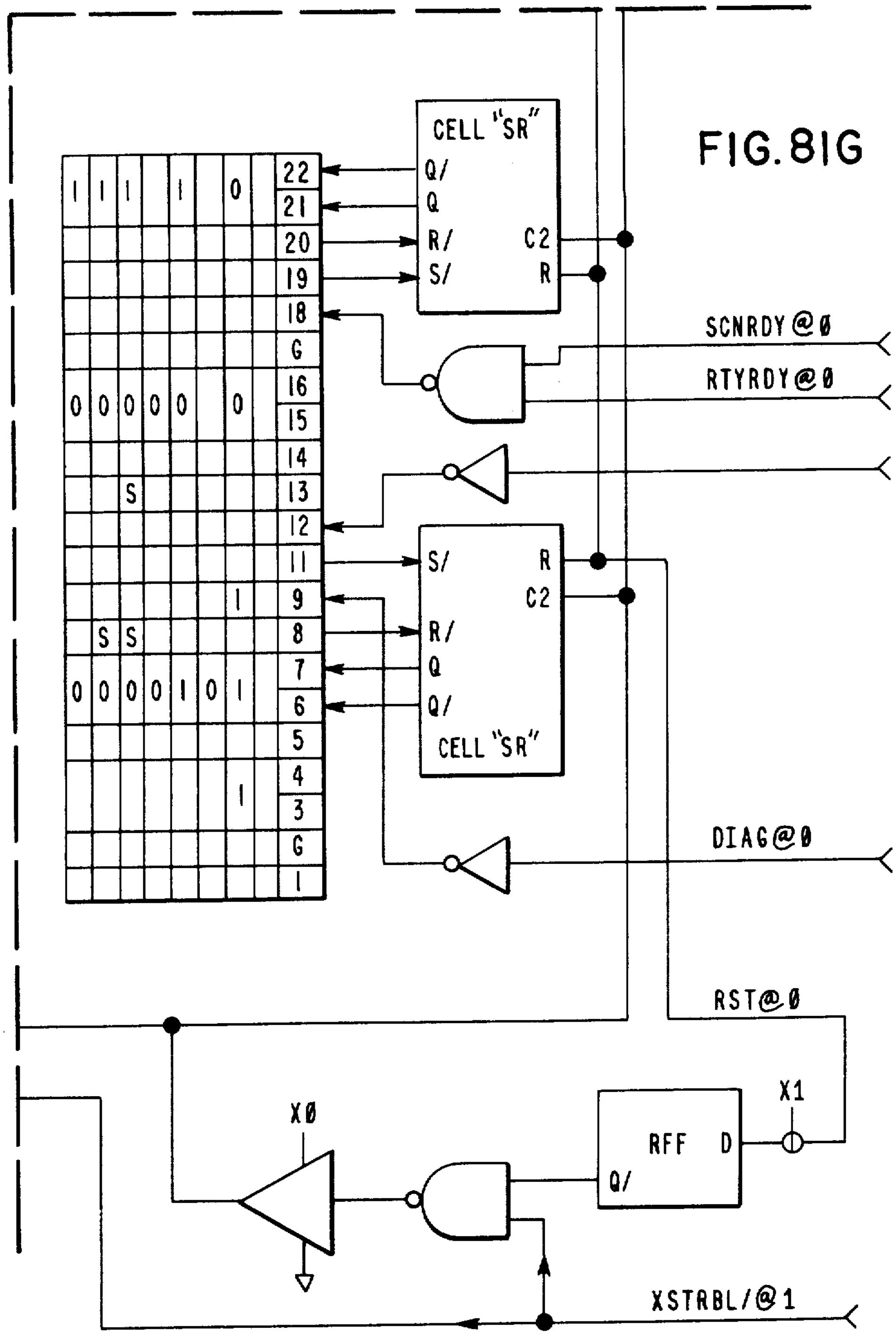

FIG. 69 is a Table explaining the use of the symbols "1", "0", and "S" in FIGS. 79A through 89L.

FIGS. 70 through 78 show in detail the cells A, A1–A3, B, B1–B5, C, C1–C10, D, D1–D4, E, SRA, SR and SSR that appear in FIGS. 79A through 89L. Unless otherwise noted in FIGS. 79A through 89L, the inputs C1 and C2 in these cells receive the signals X1 and X0, respectively. The notation of $2^0$, $2^1$, $2^2$ and so forth in these cells at the PLA's in FIGS. 79A through 89L is binary coded state information for the PLA's.

FIGS. 79A through 79D illustrate the PLA (programmable logic array) "C1-SNDCTRL". C1-SNDCTRL monitors CMD and provides bits to STAT in order to control the transmission of messages over the System Bus.

FIGS. 80A through 80D illustrate the PLA "C2-XDMA". C2-XDMA controls the DMA when data is to be included in a message transmitted on the System Bus.

FIGS. 81A through 81G illustrate the PLA "C4-XLINE". C4-XLINE controls the transmission of messages from the system interface chip.

Figure 82A:
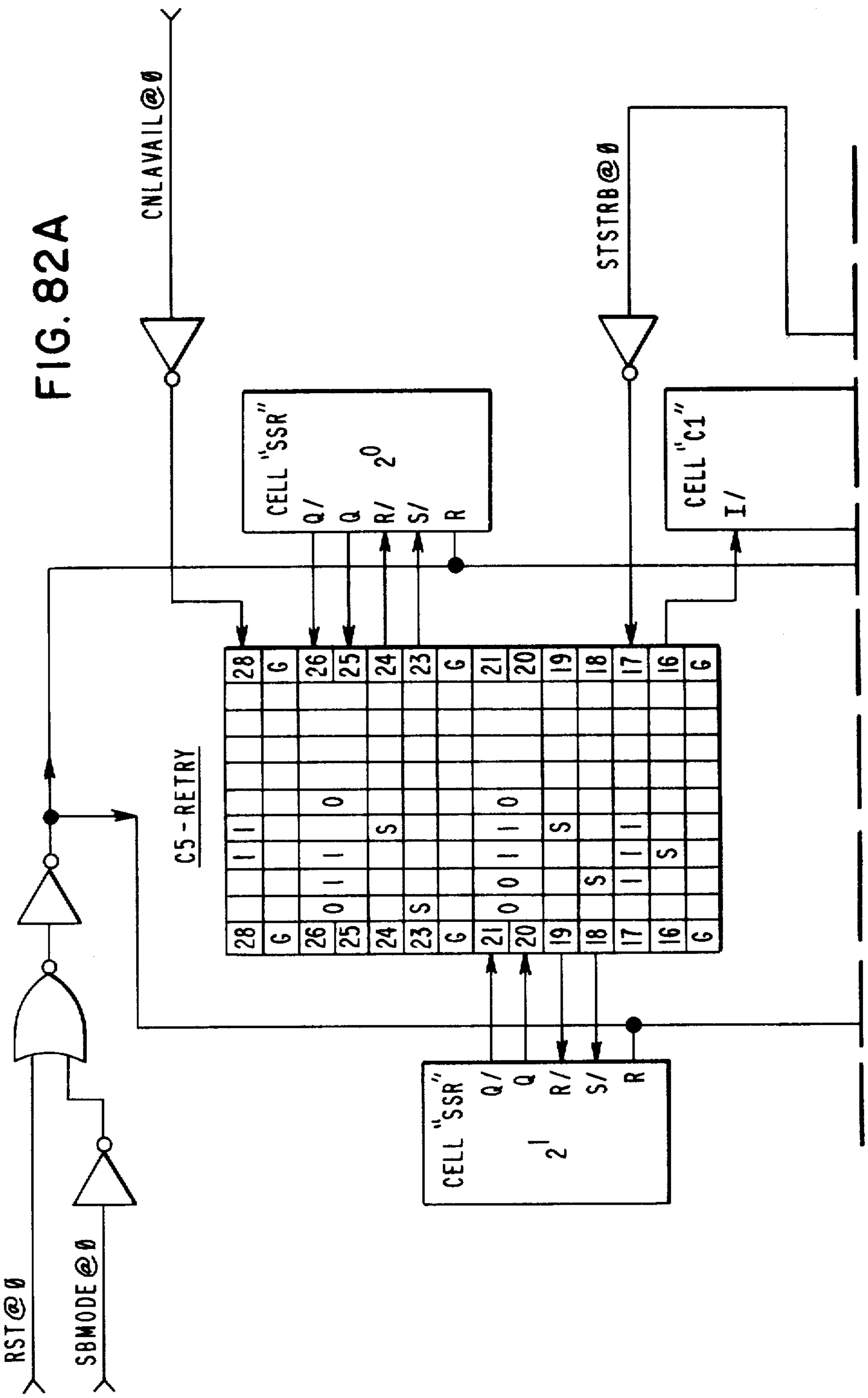
Figure 82B:
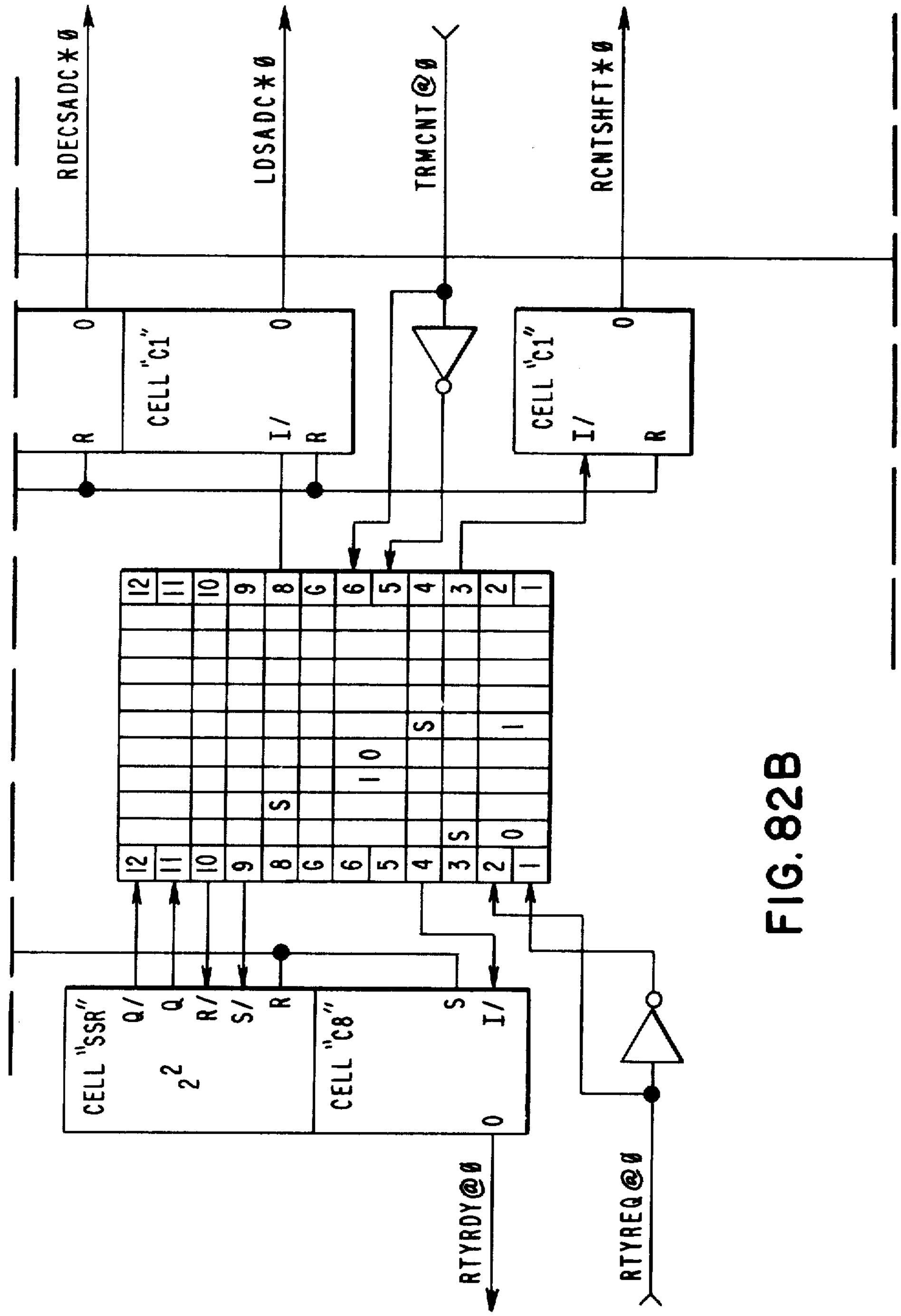

FIGS. 82A through 82C illustrate a PLA "C5-RETRY". C5-RETRY partially controls the retry circuit when the transmission of a message is to be retried.

Figure 83A:
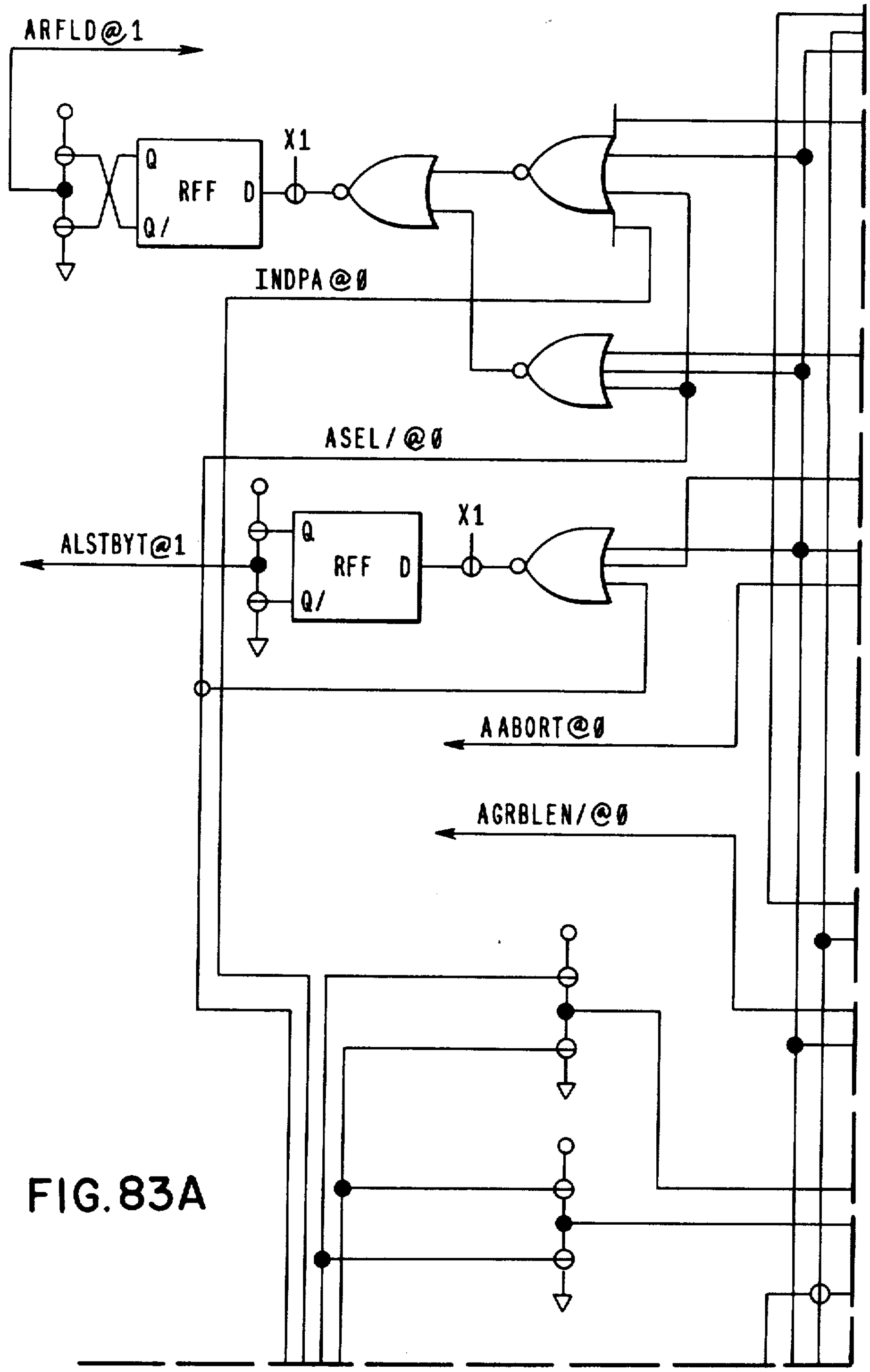
Figure 83B:
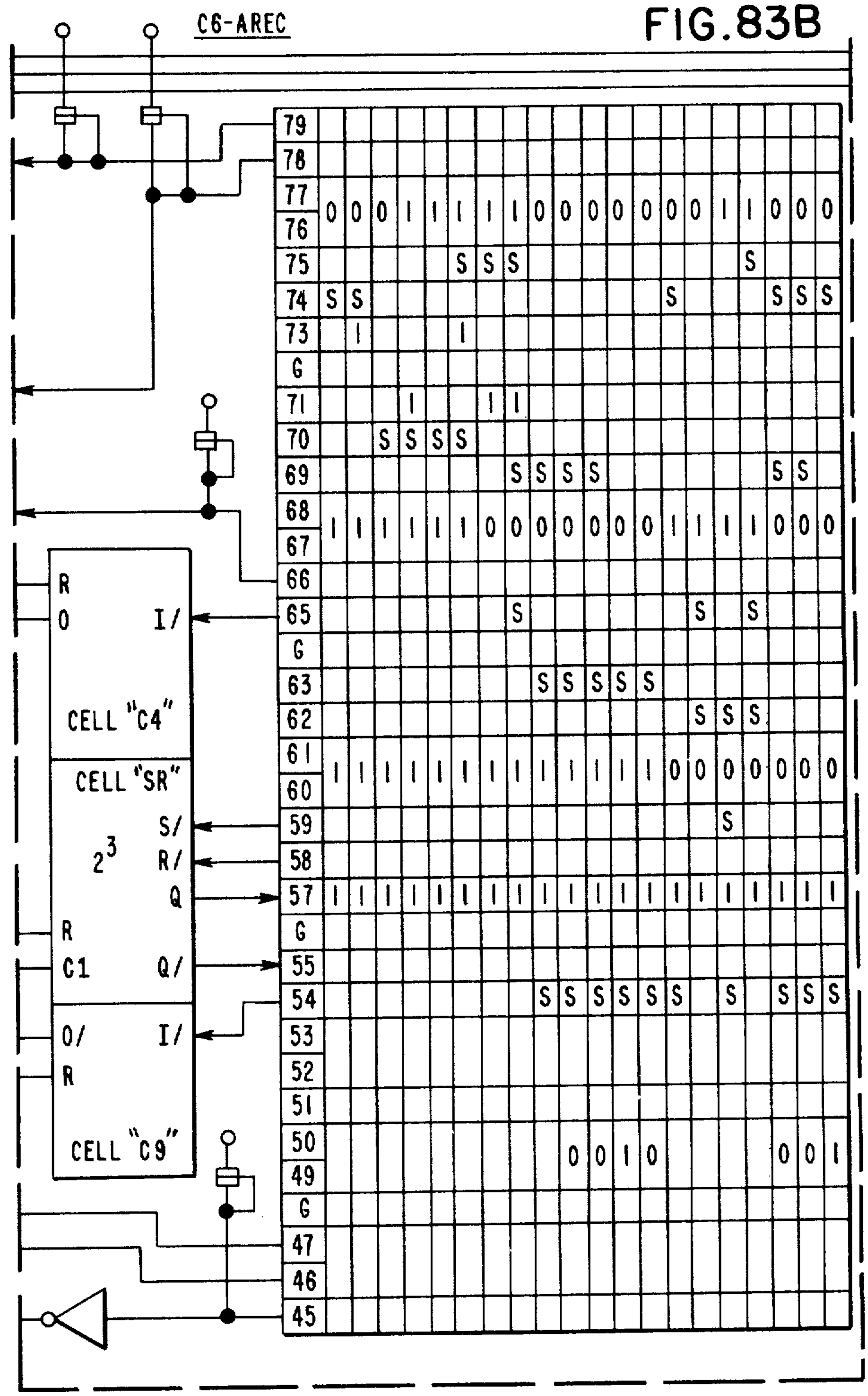
Figure 83F:
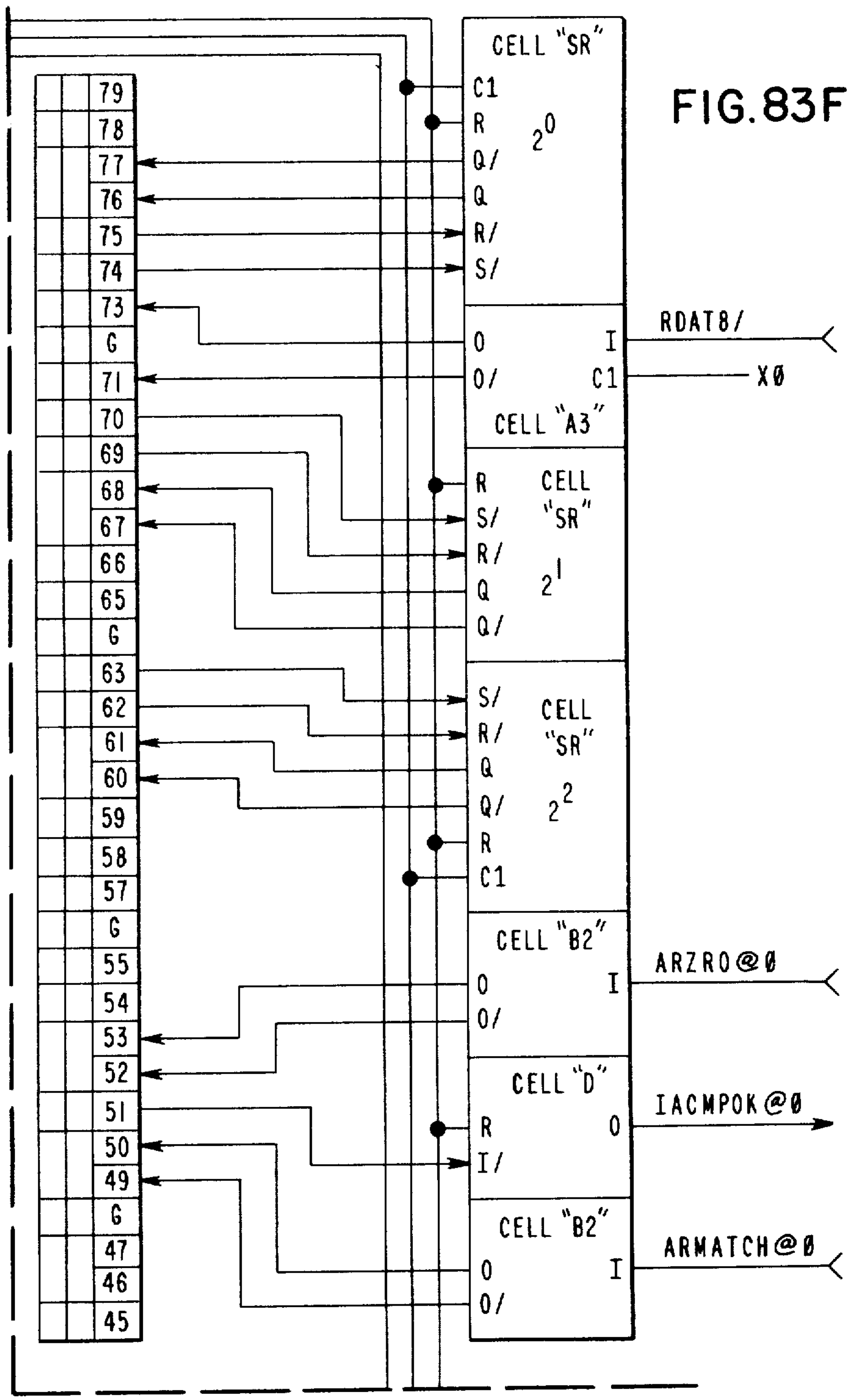
Figure 83G:
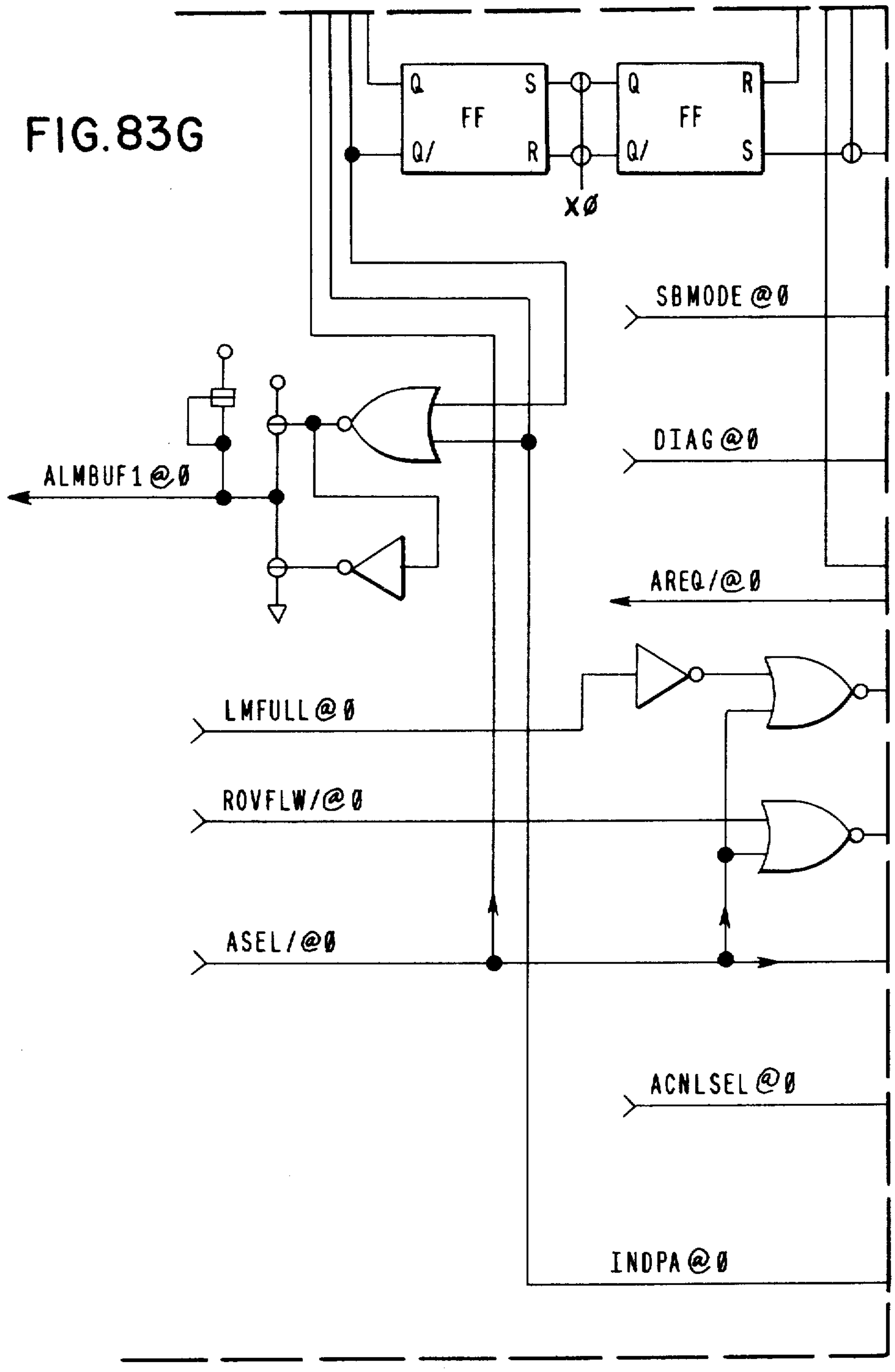
Figure 83H:
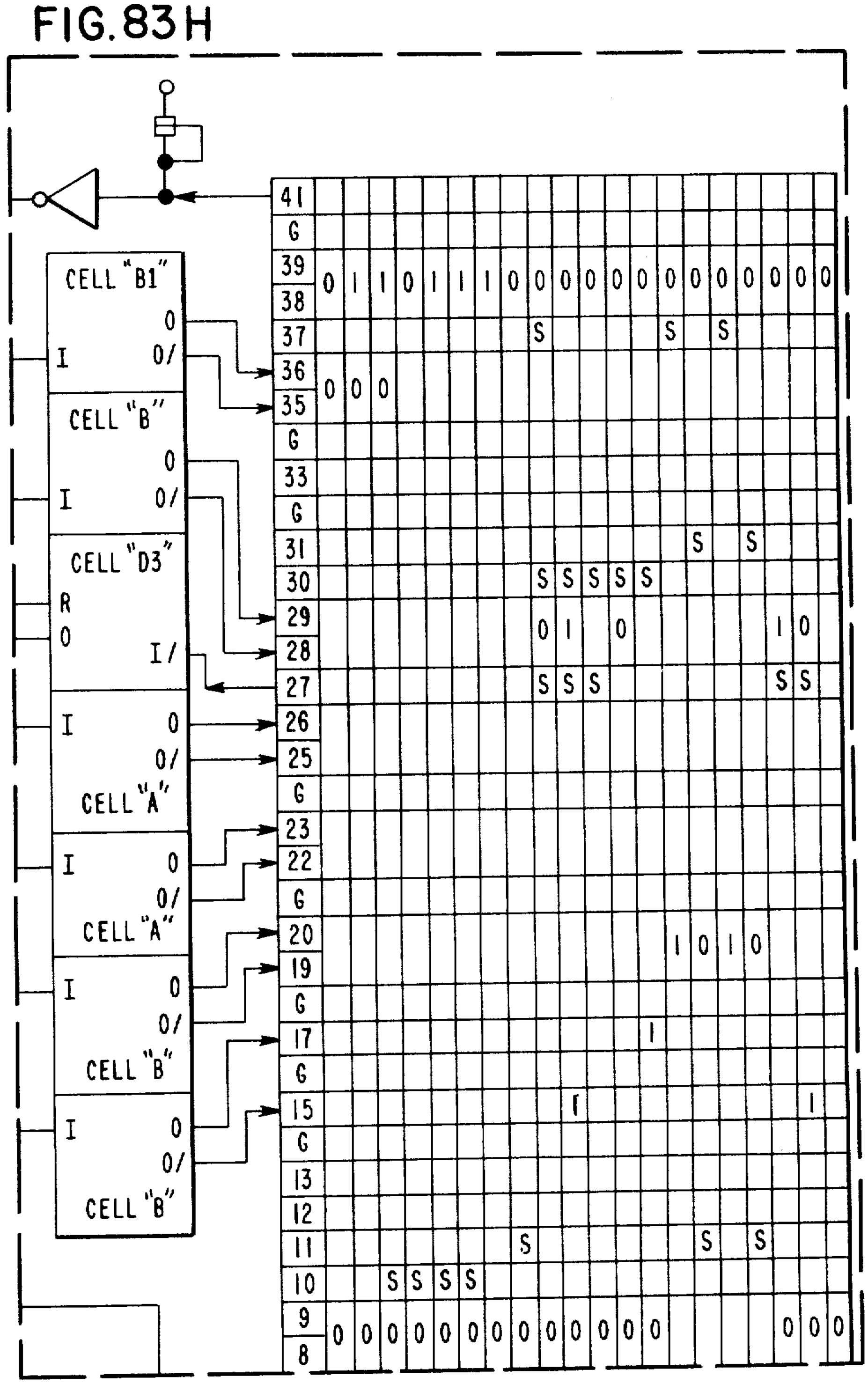
Figure 83L:
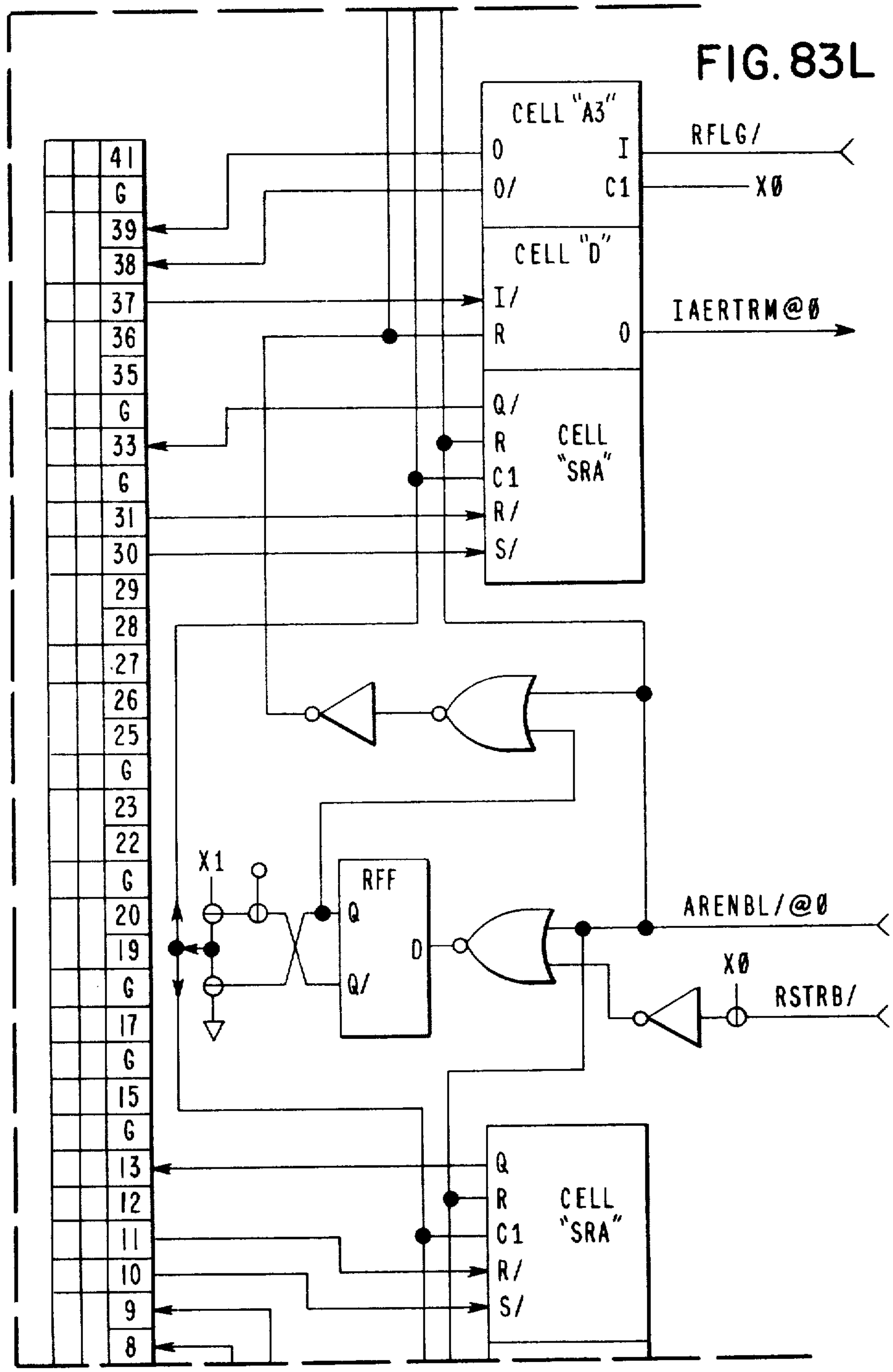
Figure 83M:
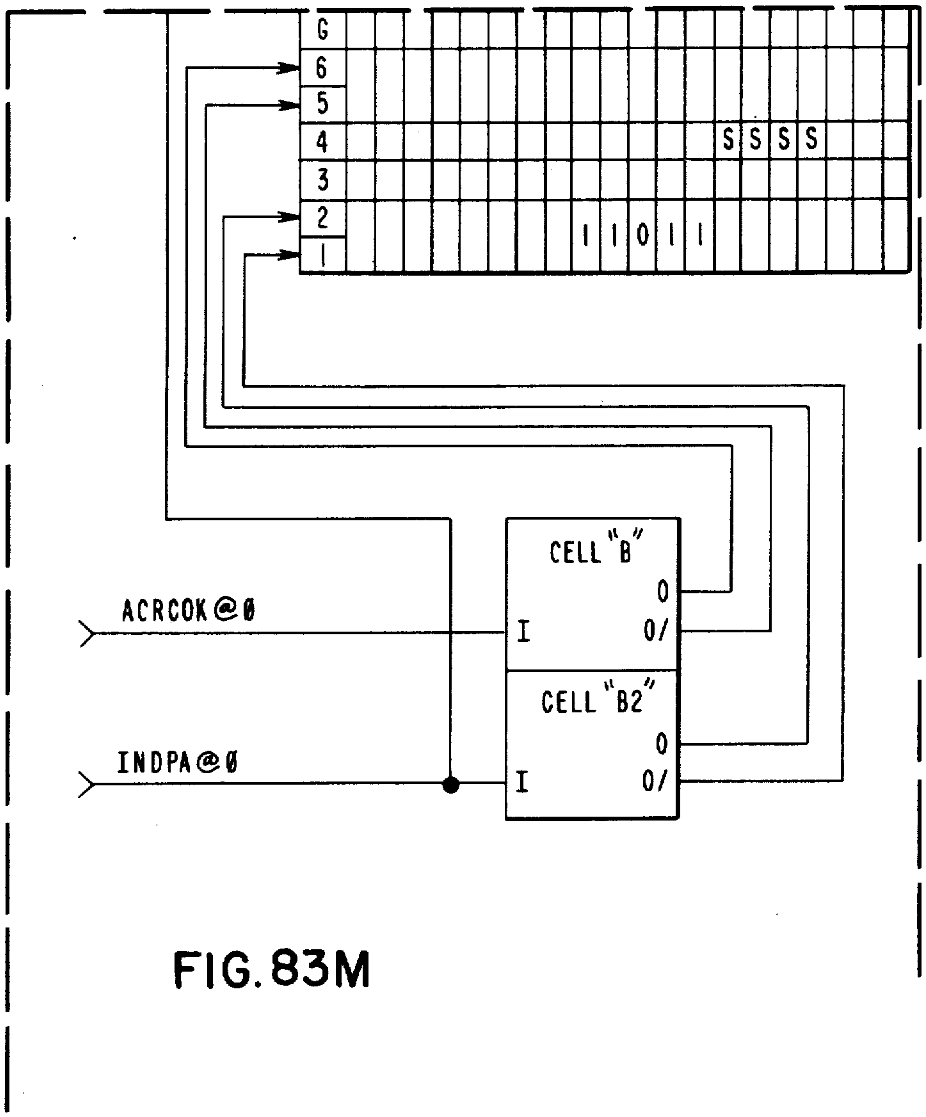
Figure 83N:
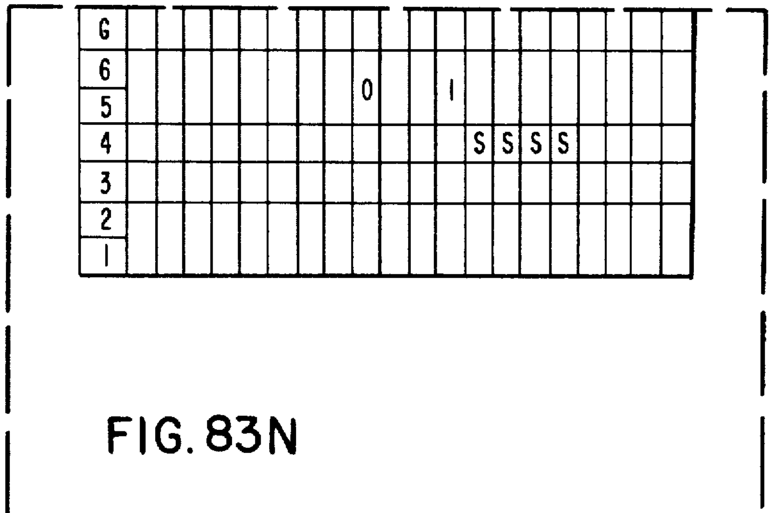
Figure 830:
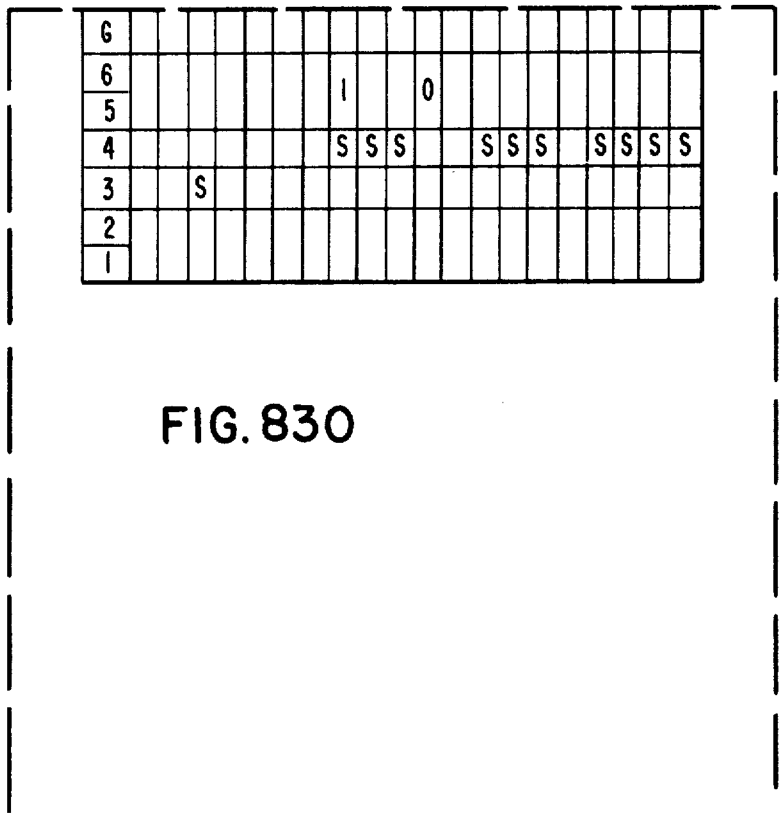

FIGS. 83A through 83Q illustrate the PLA "C6-AREC". C6-AREC is used to control the receipt of messages from Channel A of the System Bus.

Figure 84A:
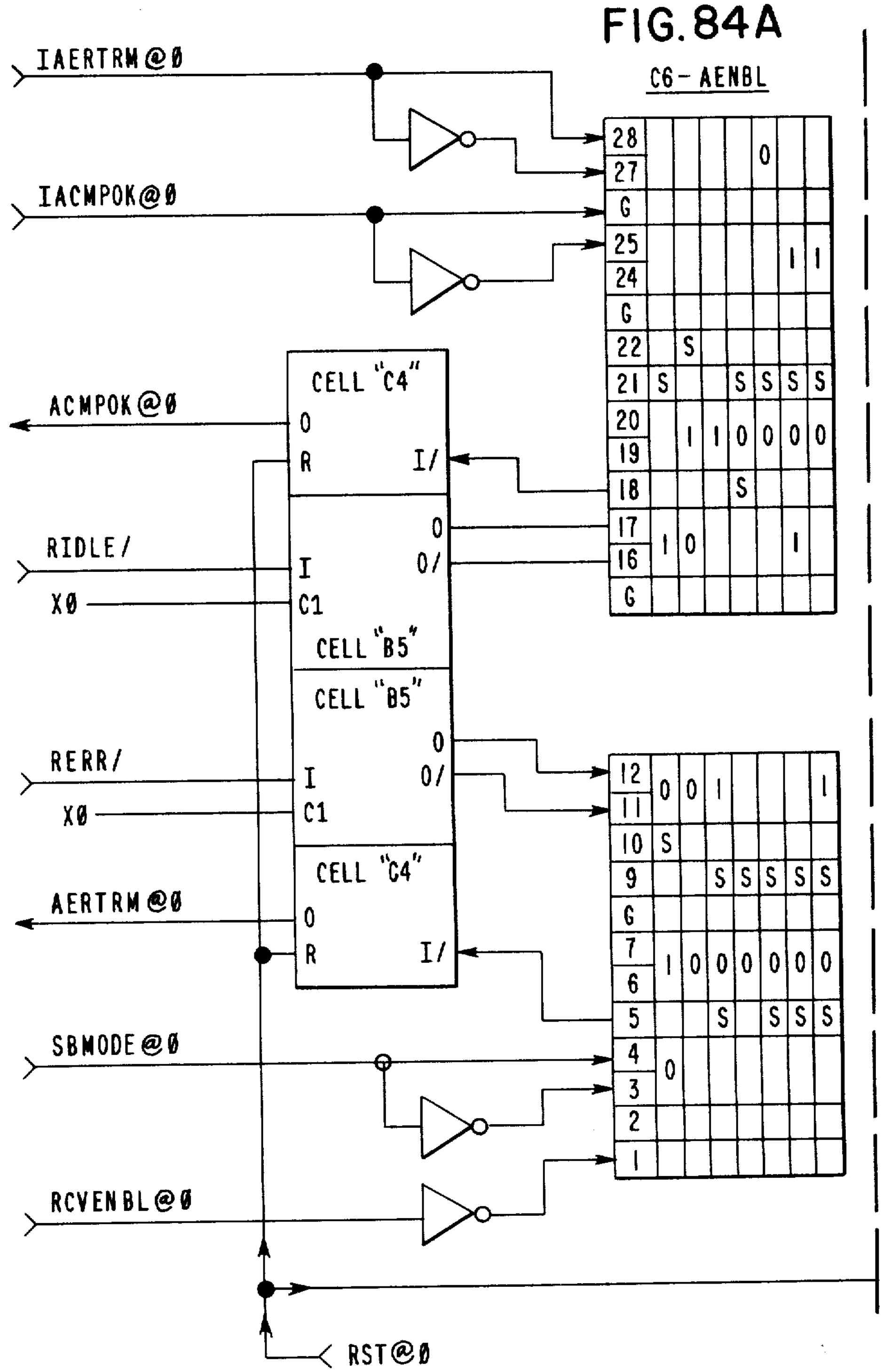

FIGS. 84A and 84B illustrate the PLA "C6-AENBL". C6-AENBL controls the monitoring of Channel A for the receipt of messages.

Figures 85, 85A:
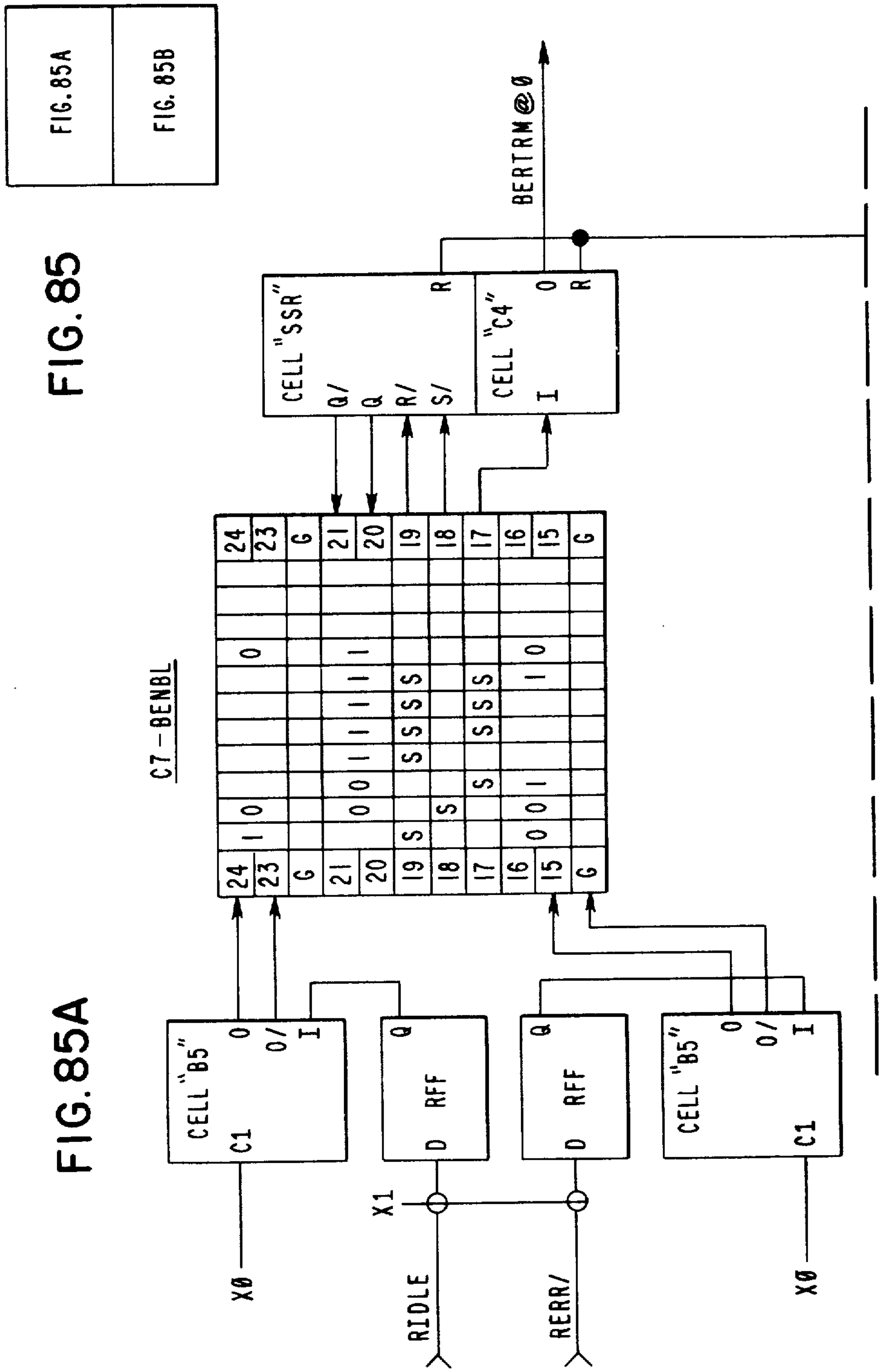
Figure 85B:
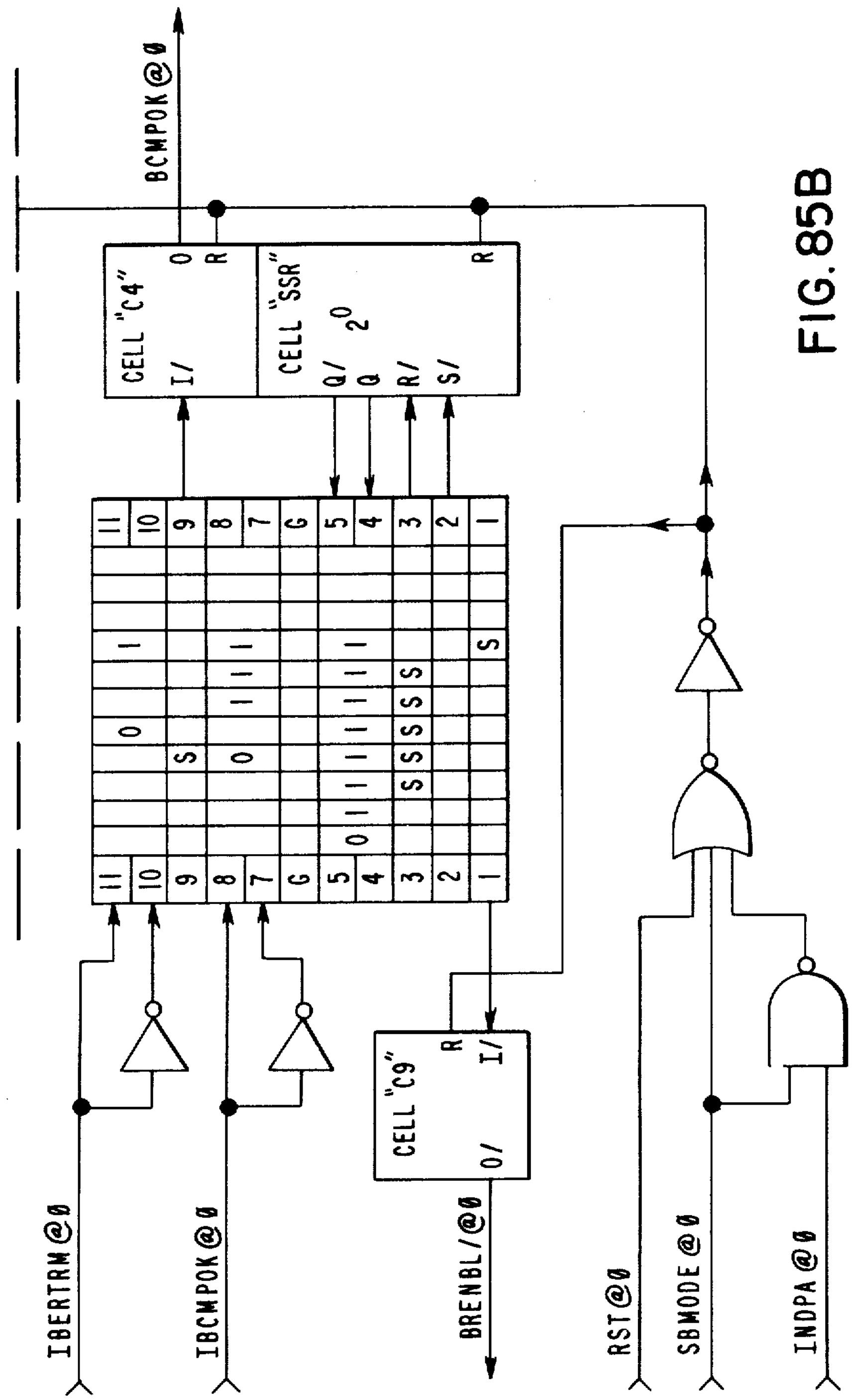
Figure 86A:
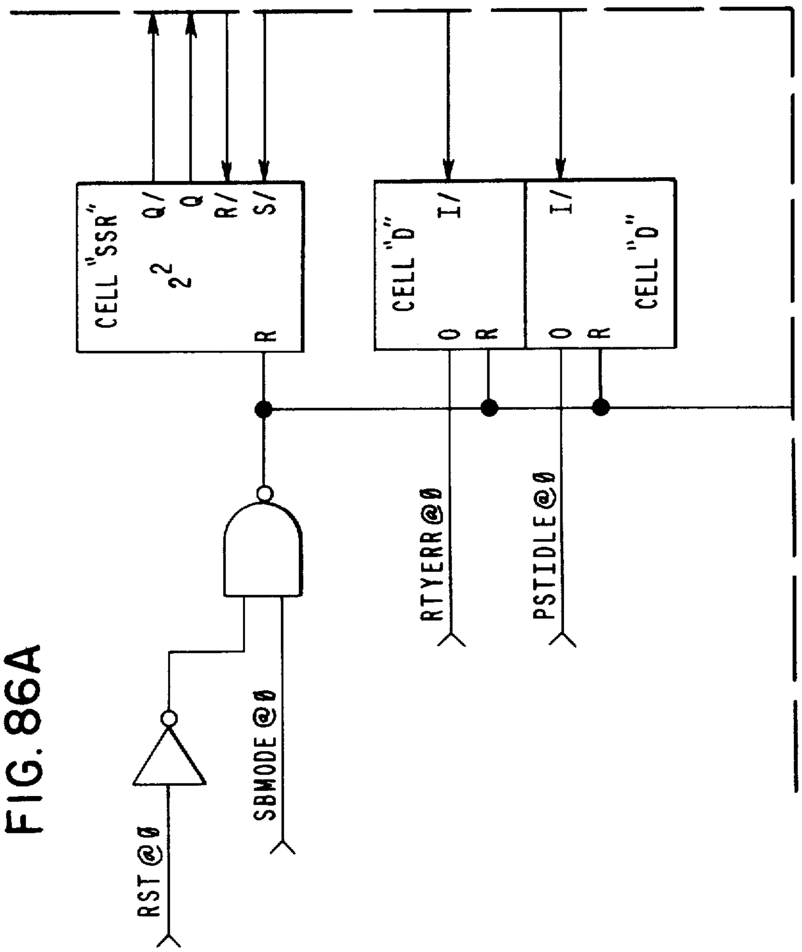
Figure 86:
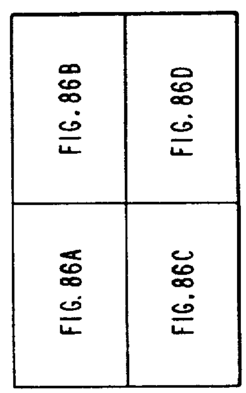
Figure 86B:
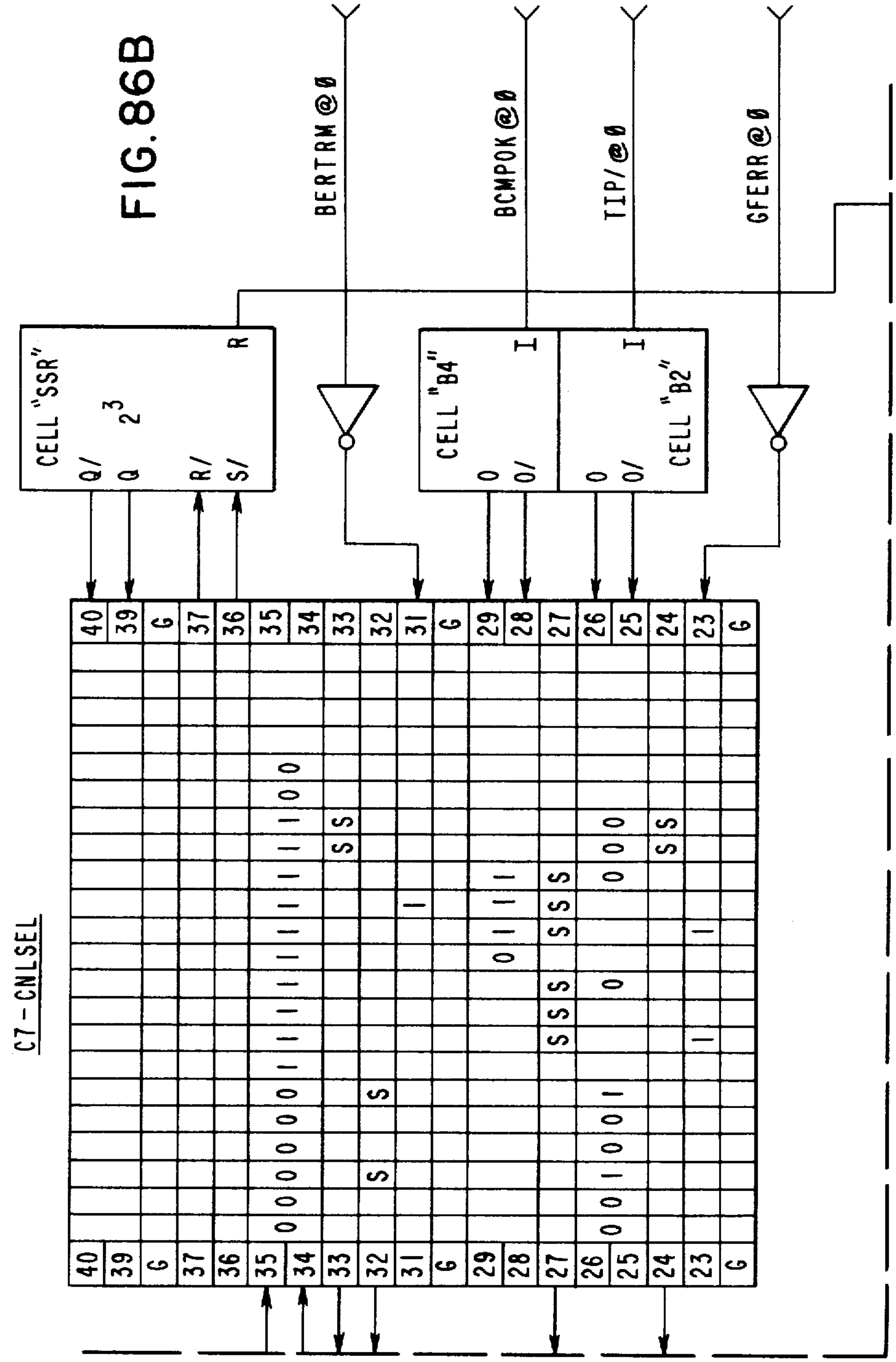
Figure 86C:
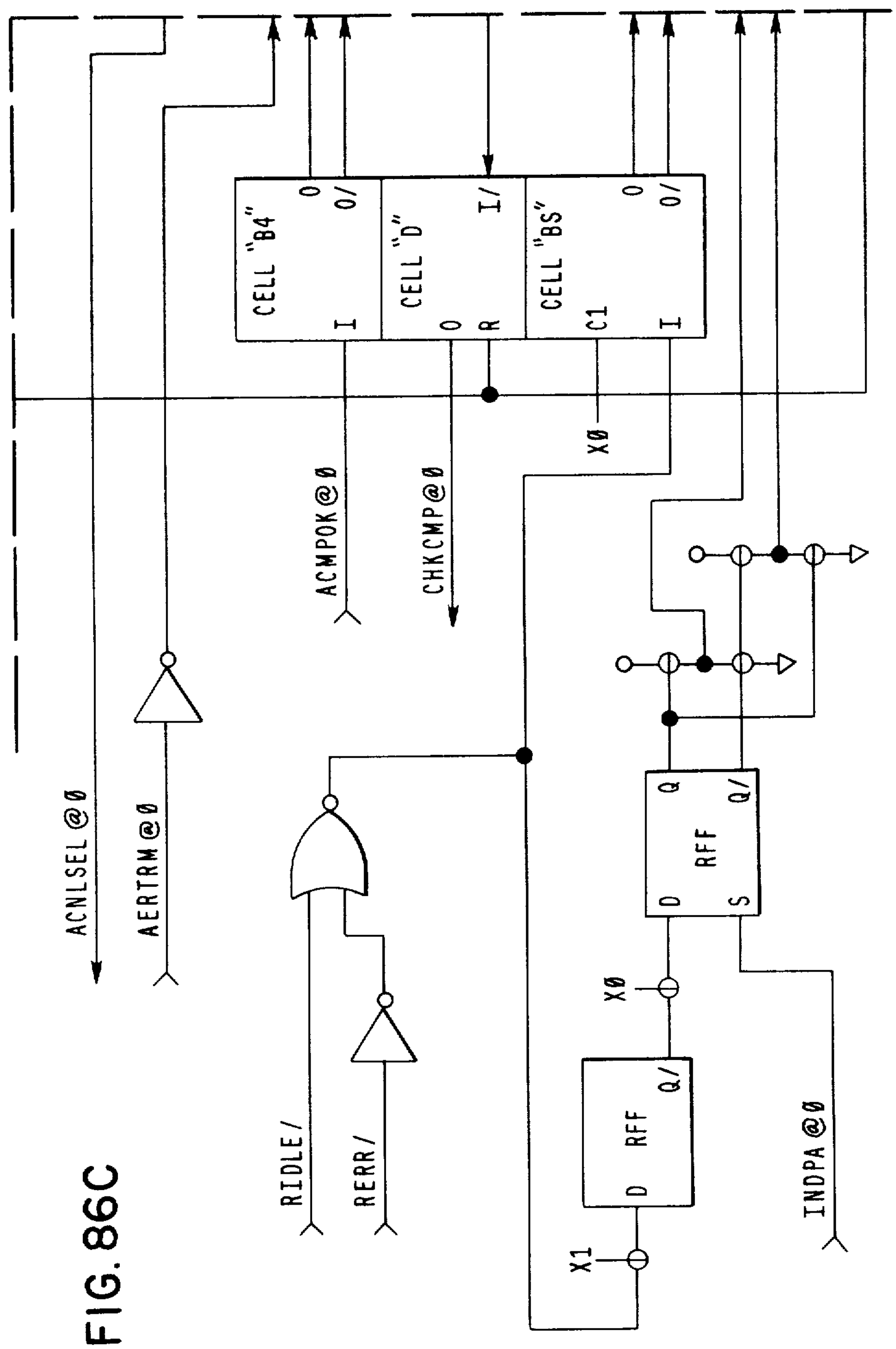
Figure 86D:
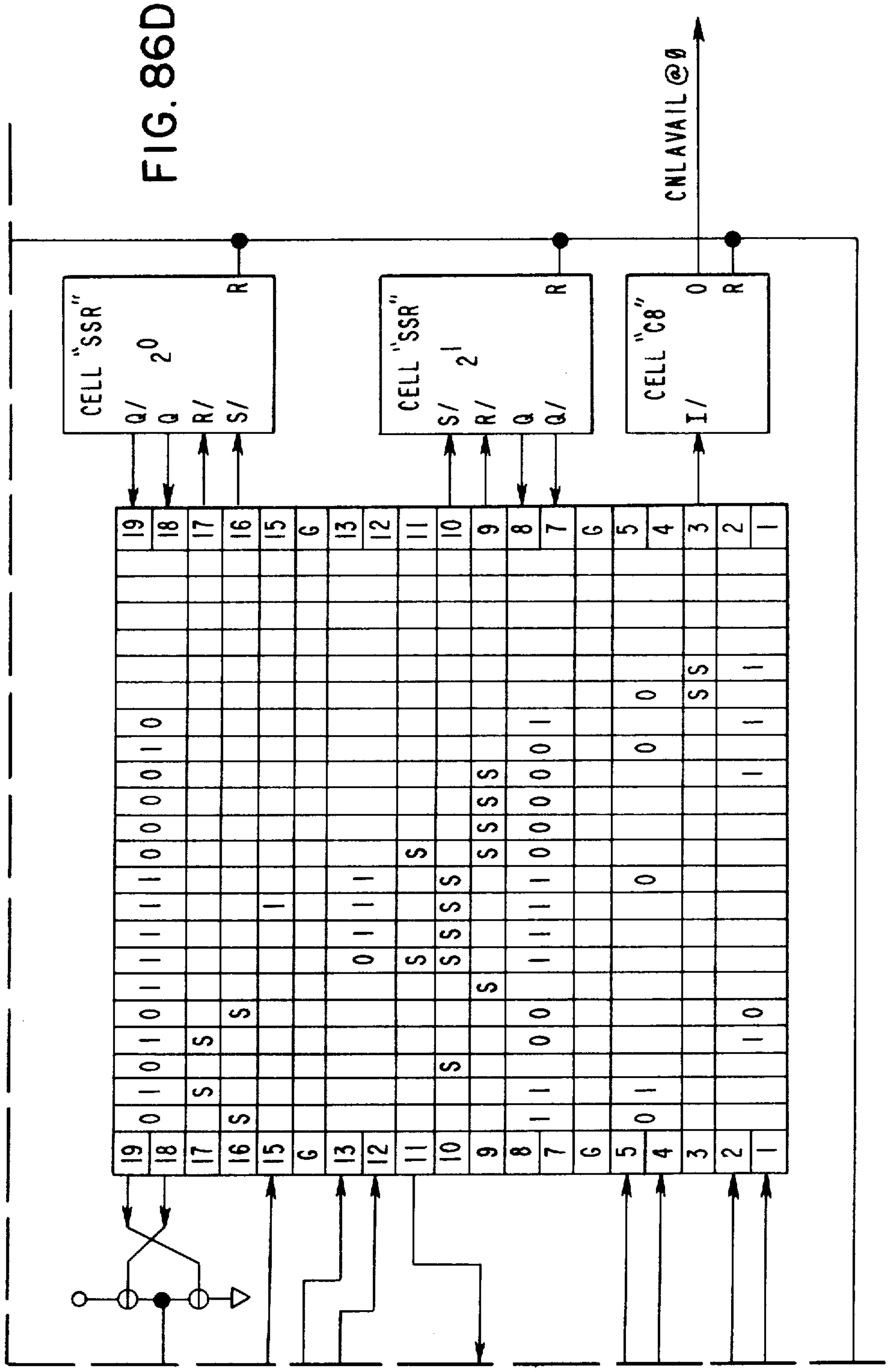
Figure 87A:
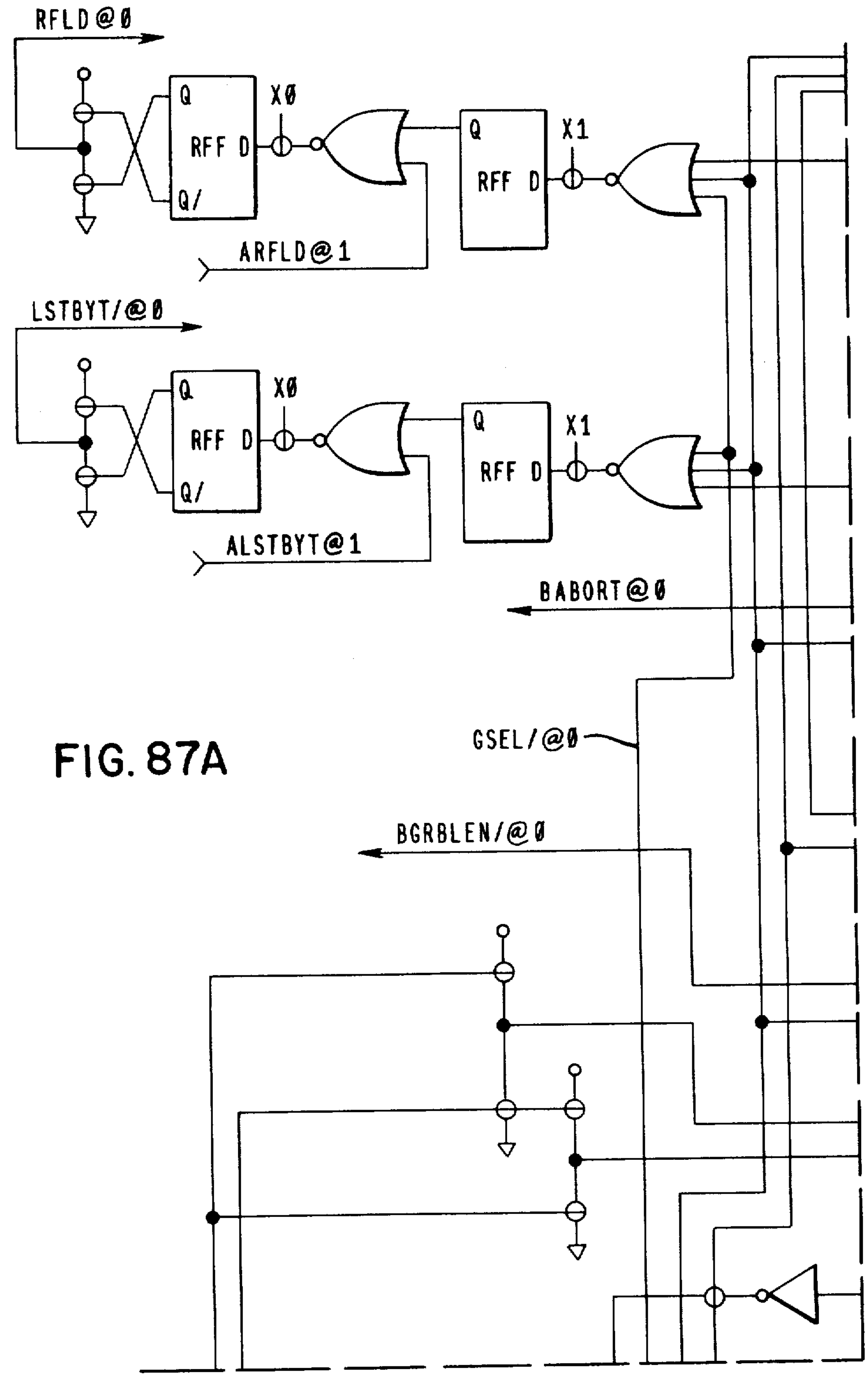
Figure 87B:
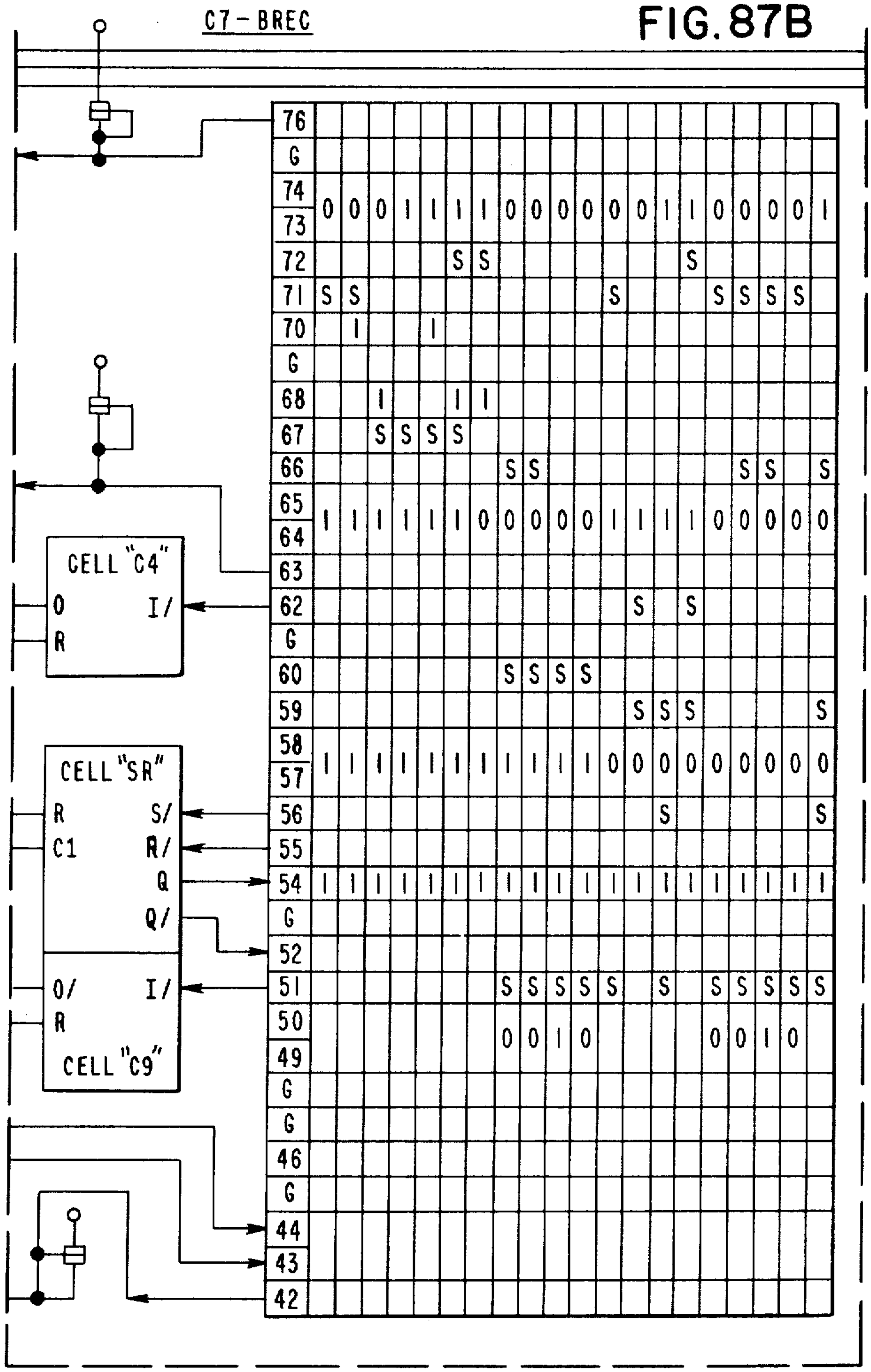
Figure 87D:
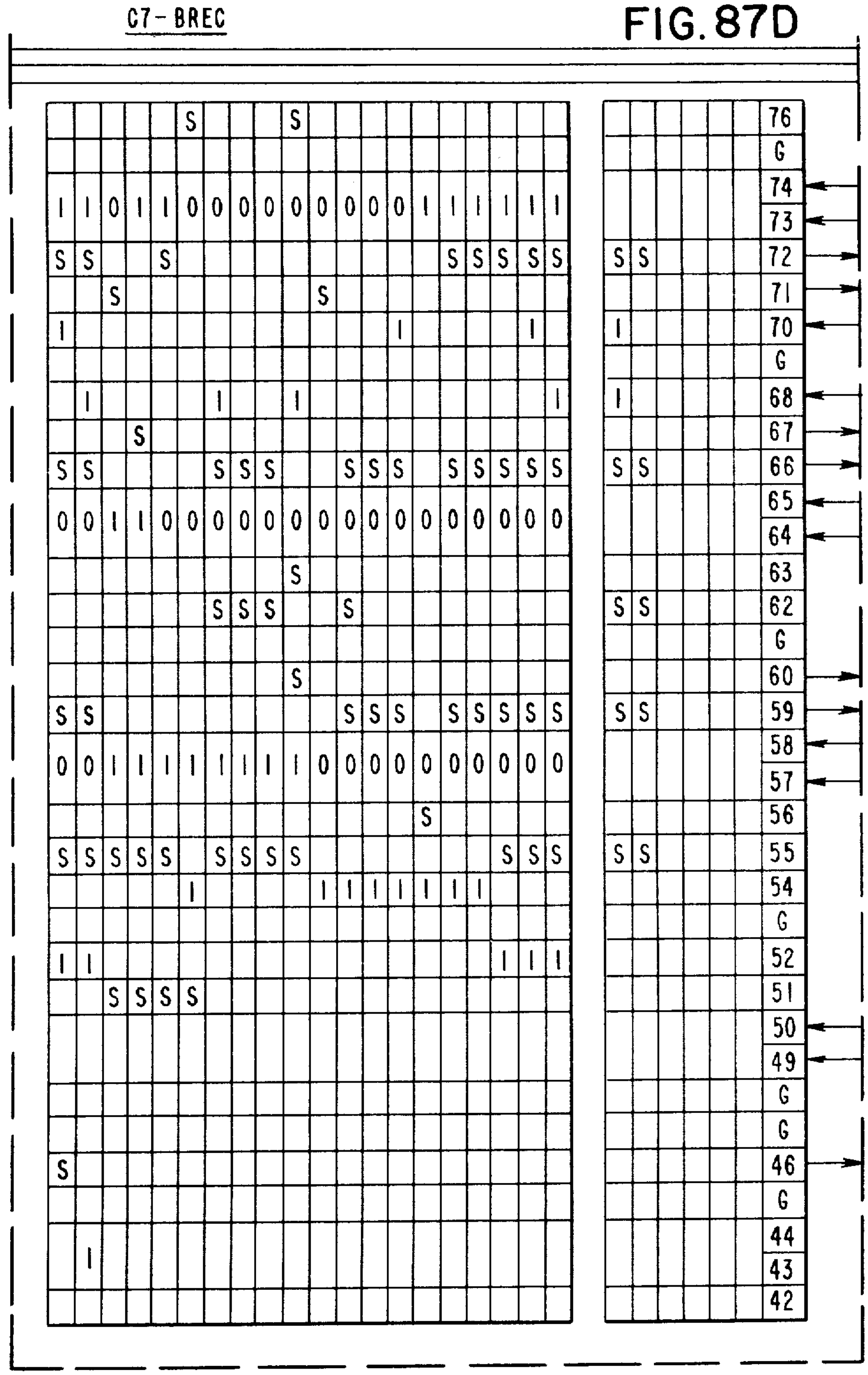
Figure 87E:
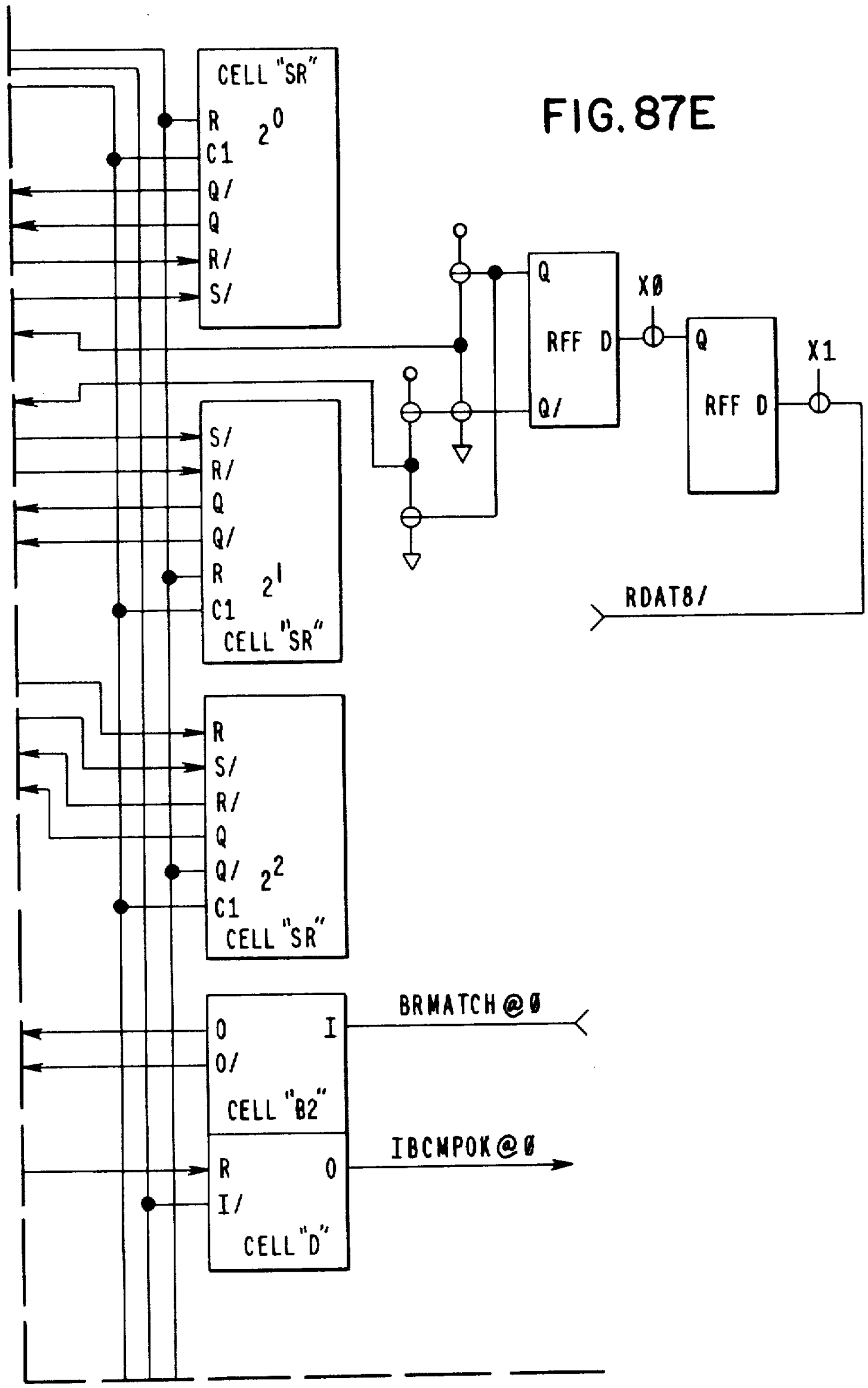
Figure 87F:
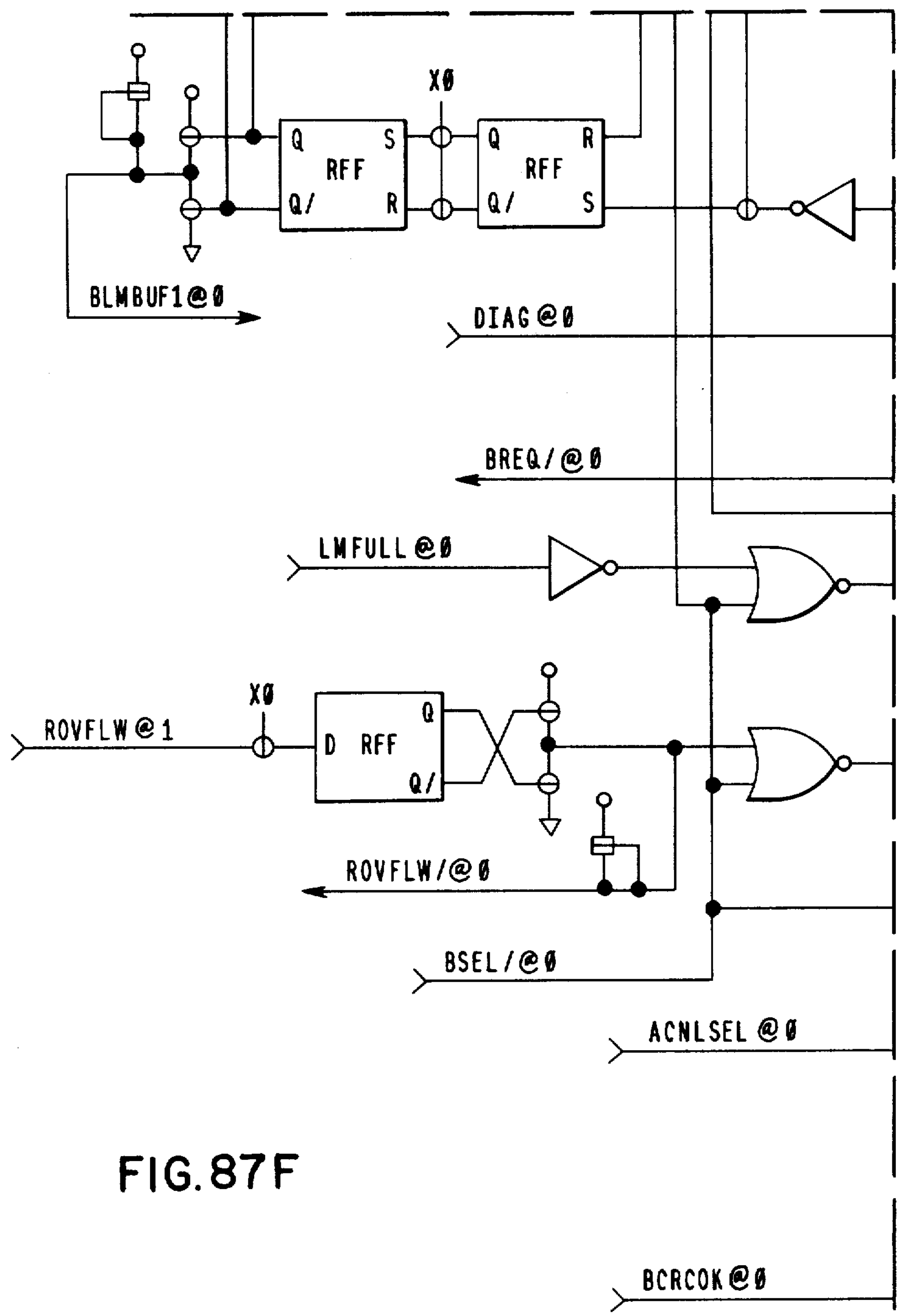
Figure 87G:
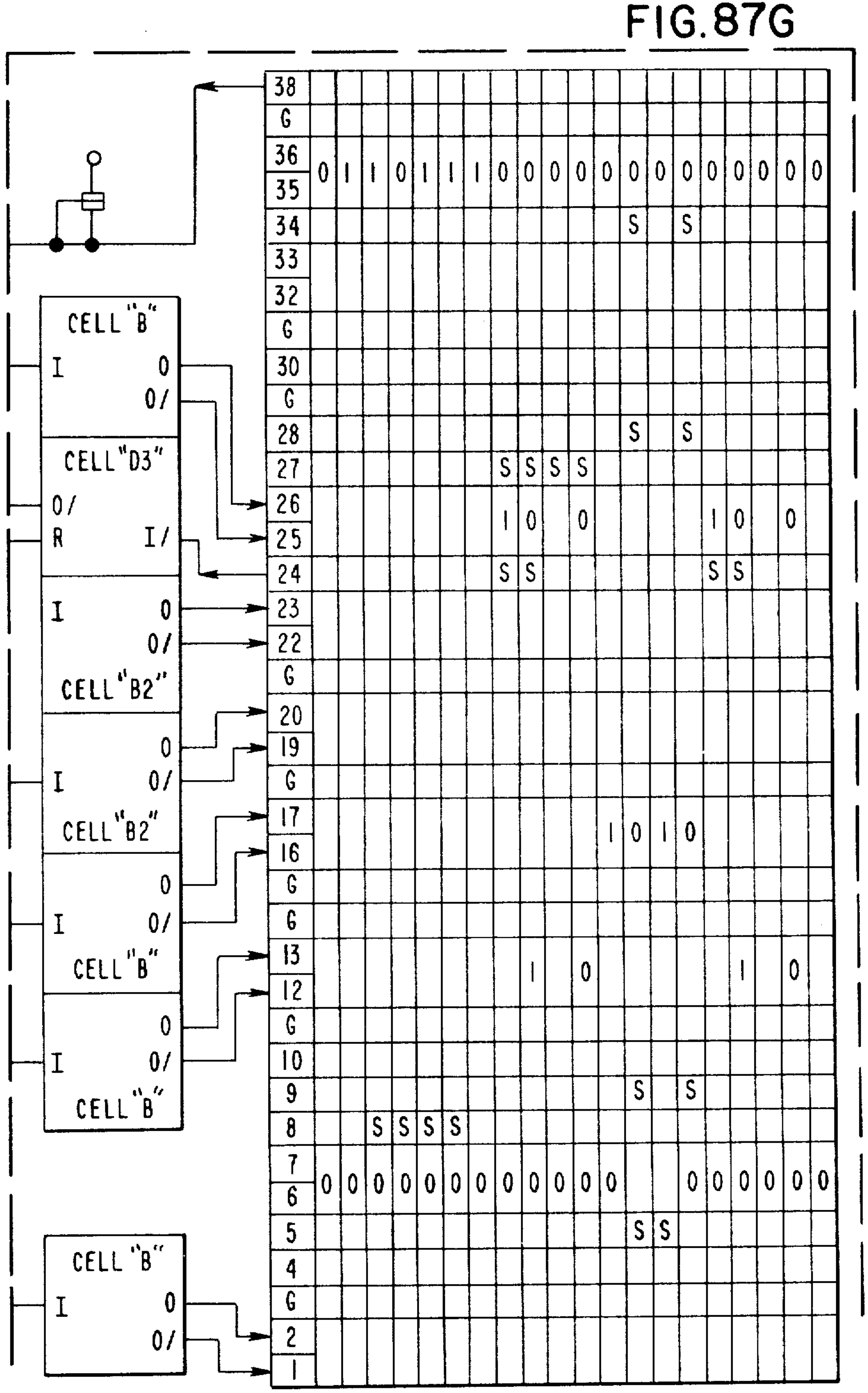
Figure 87I:
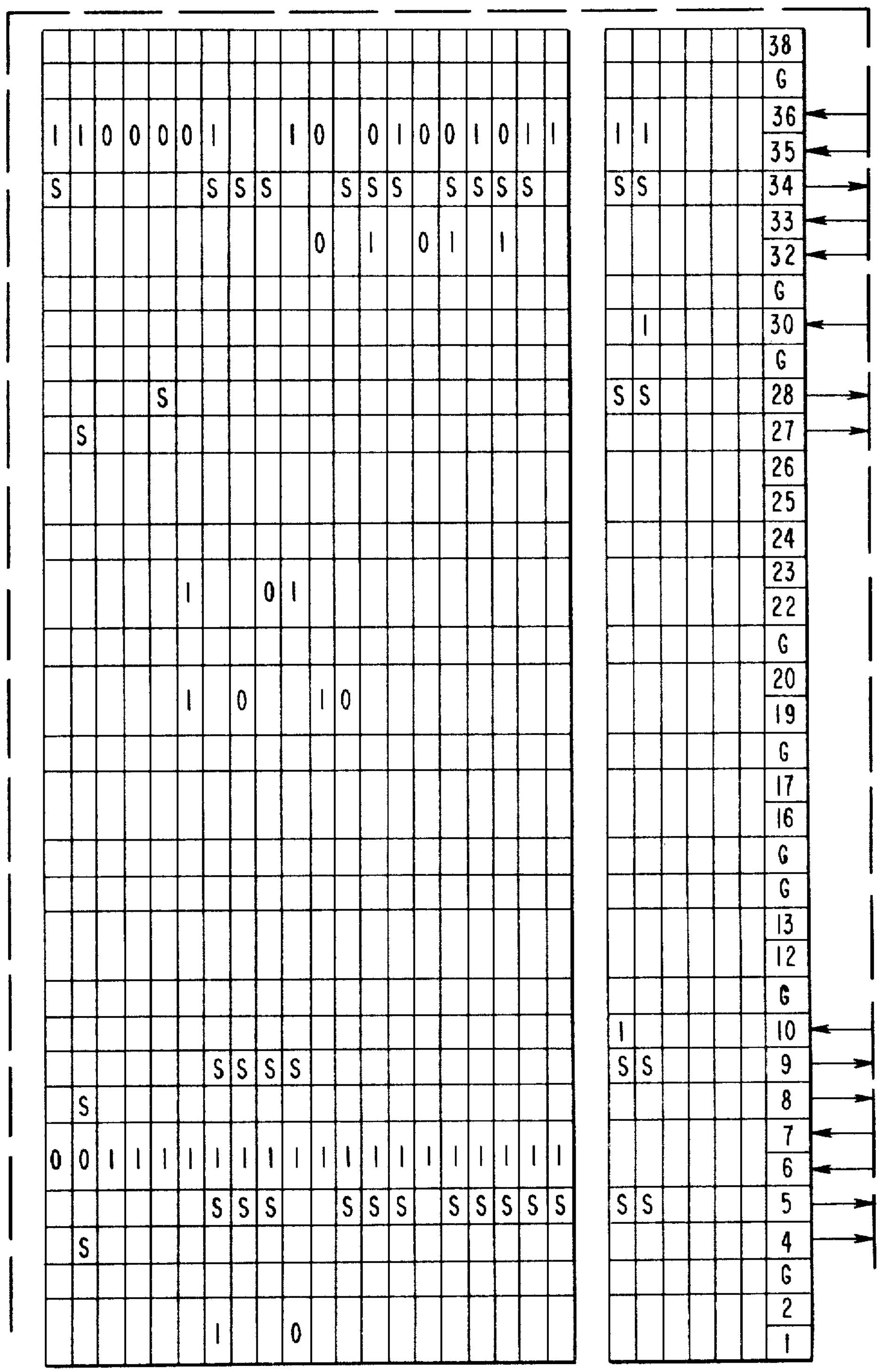
Figure 87J:
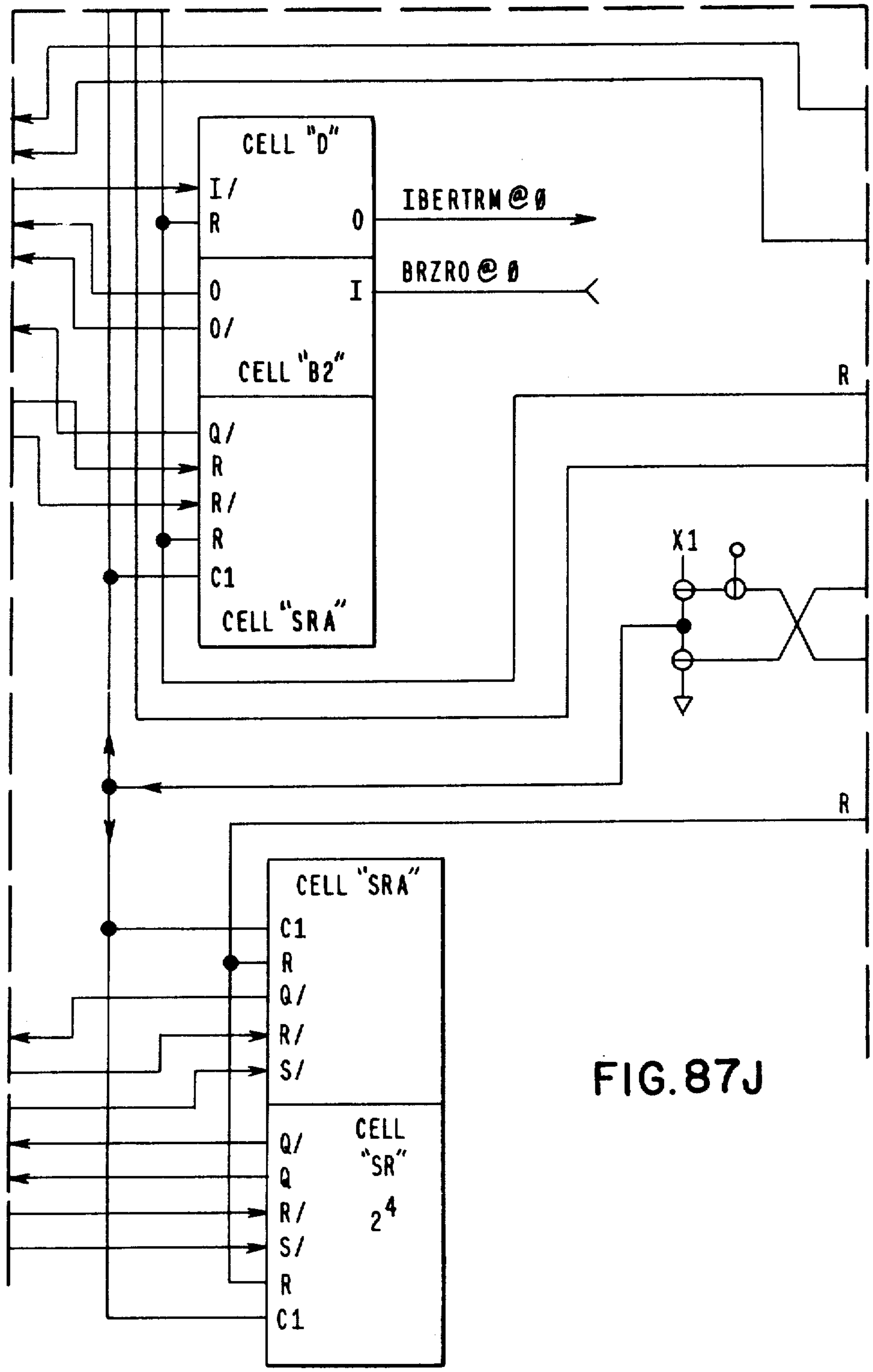
Figure 87K:
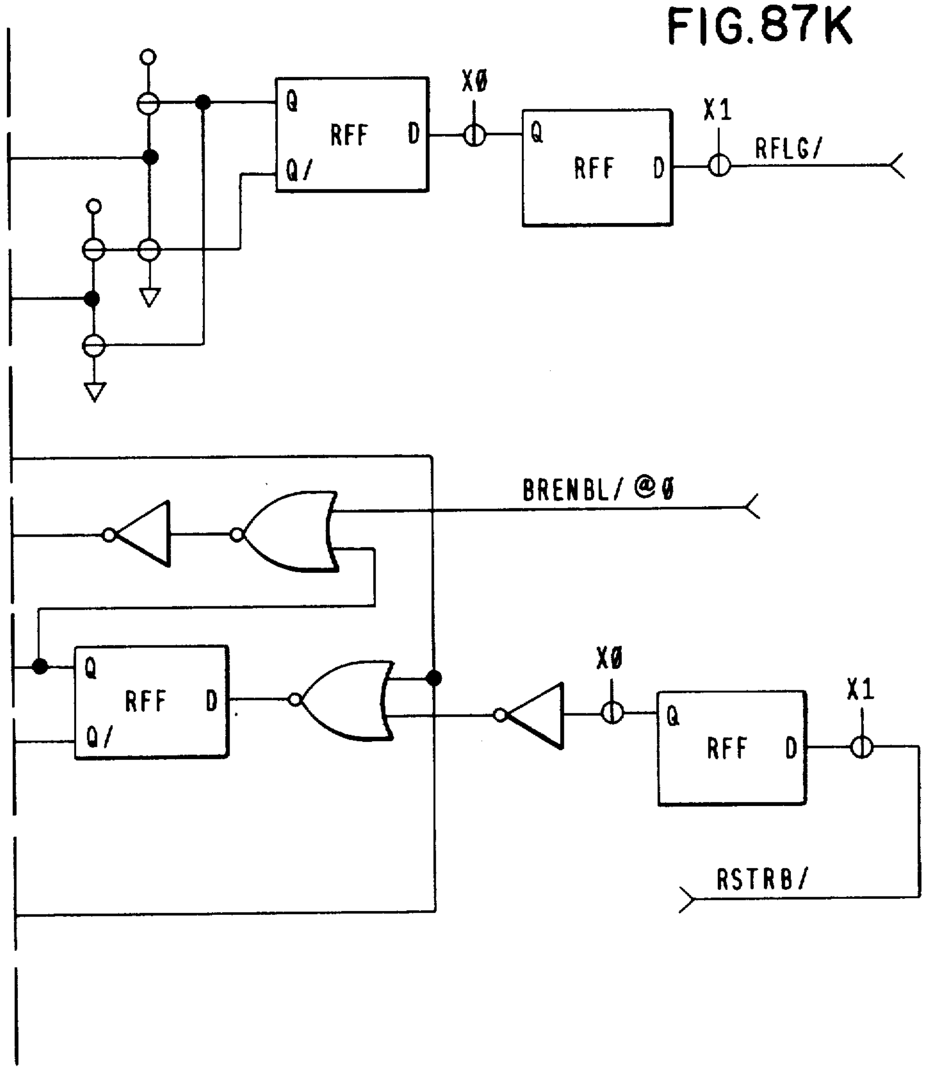
Figure 87:
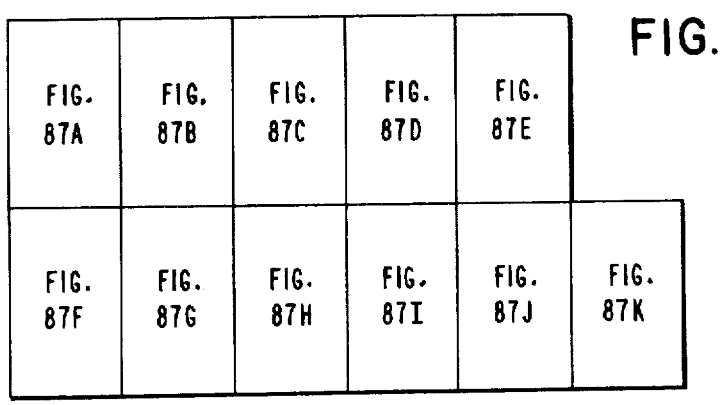
Figure 88A:
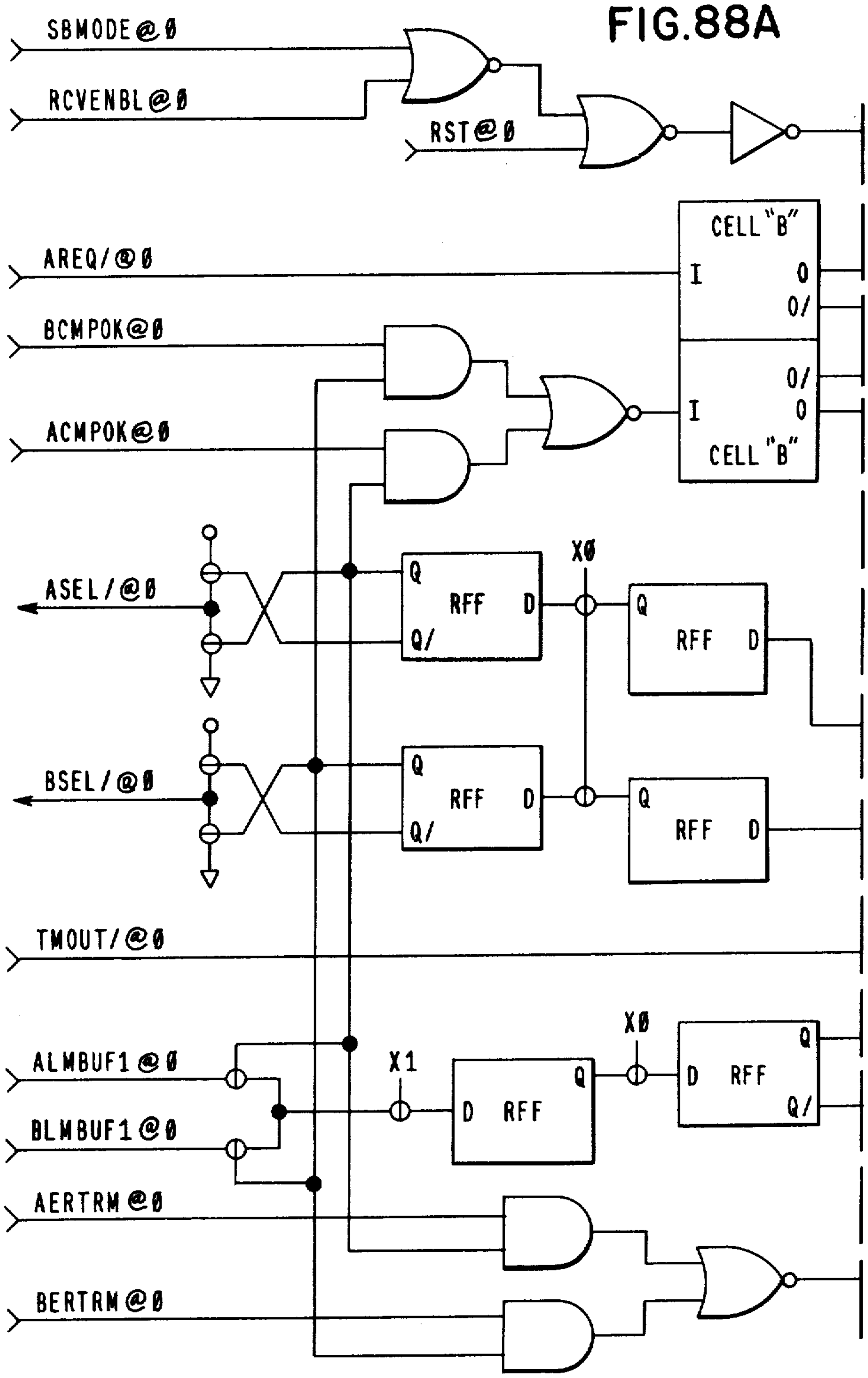
Figure 88B:
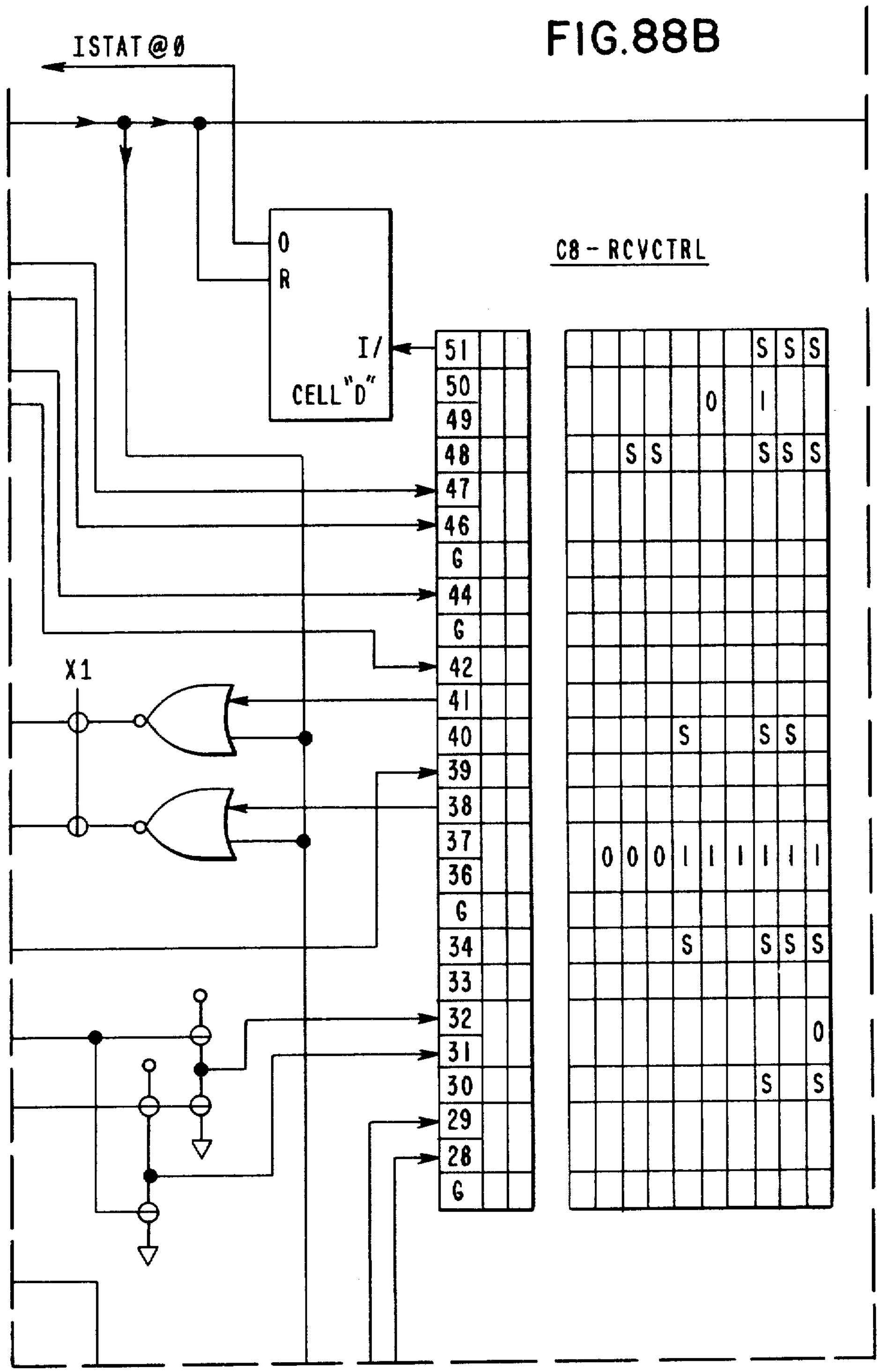
Figure 88C:
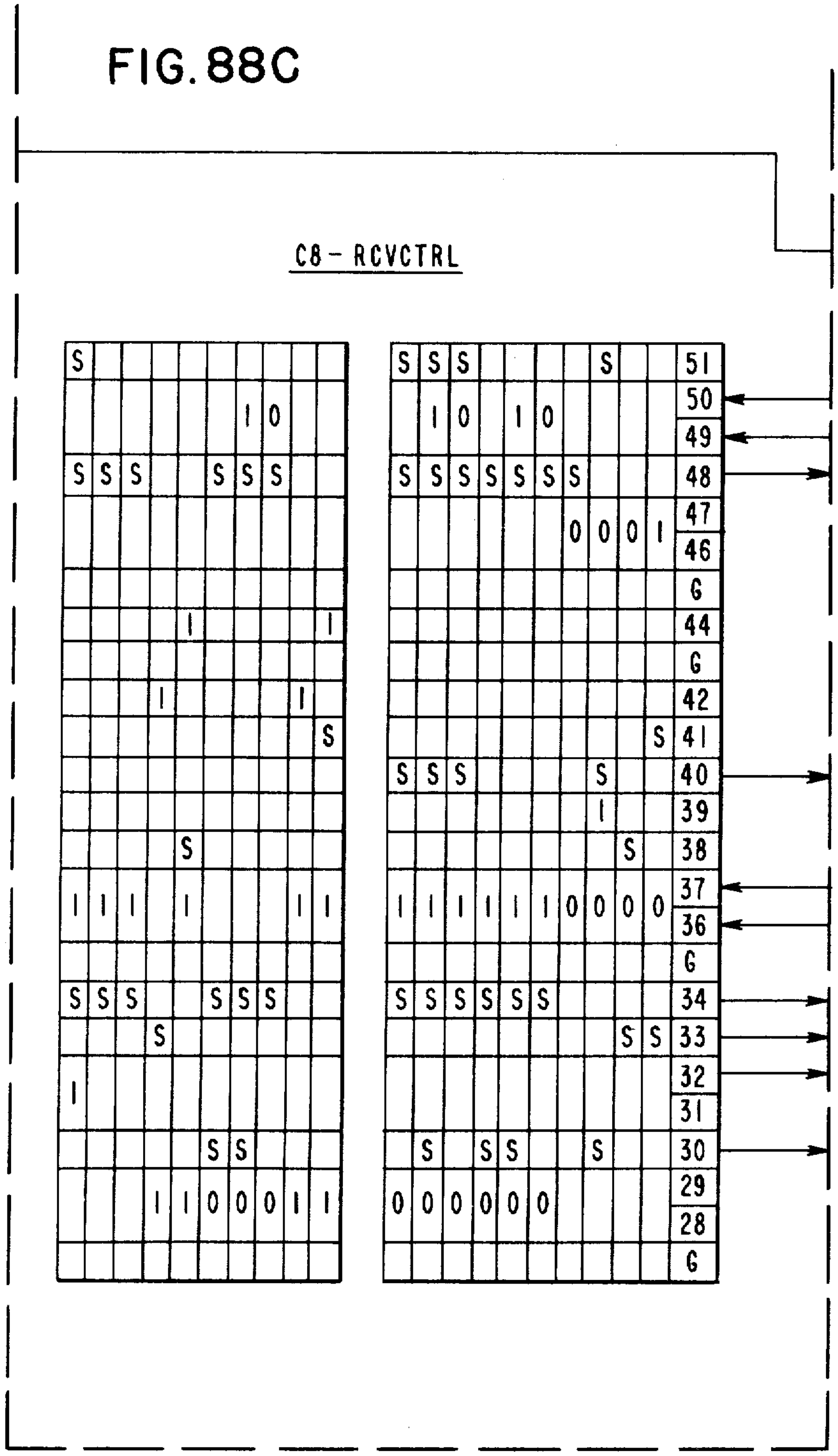
Figures 88, 88D:
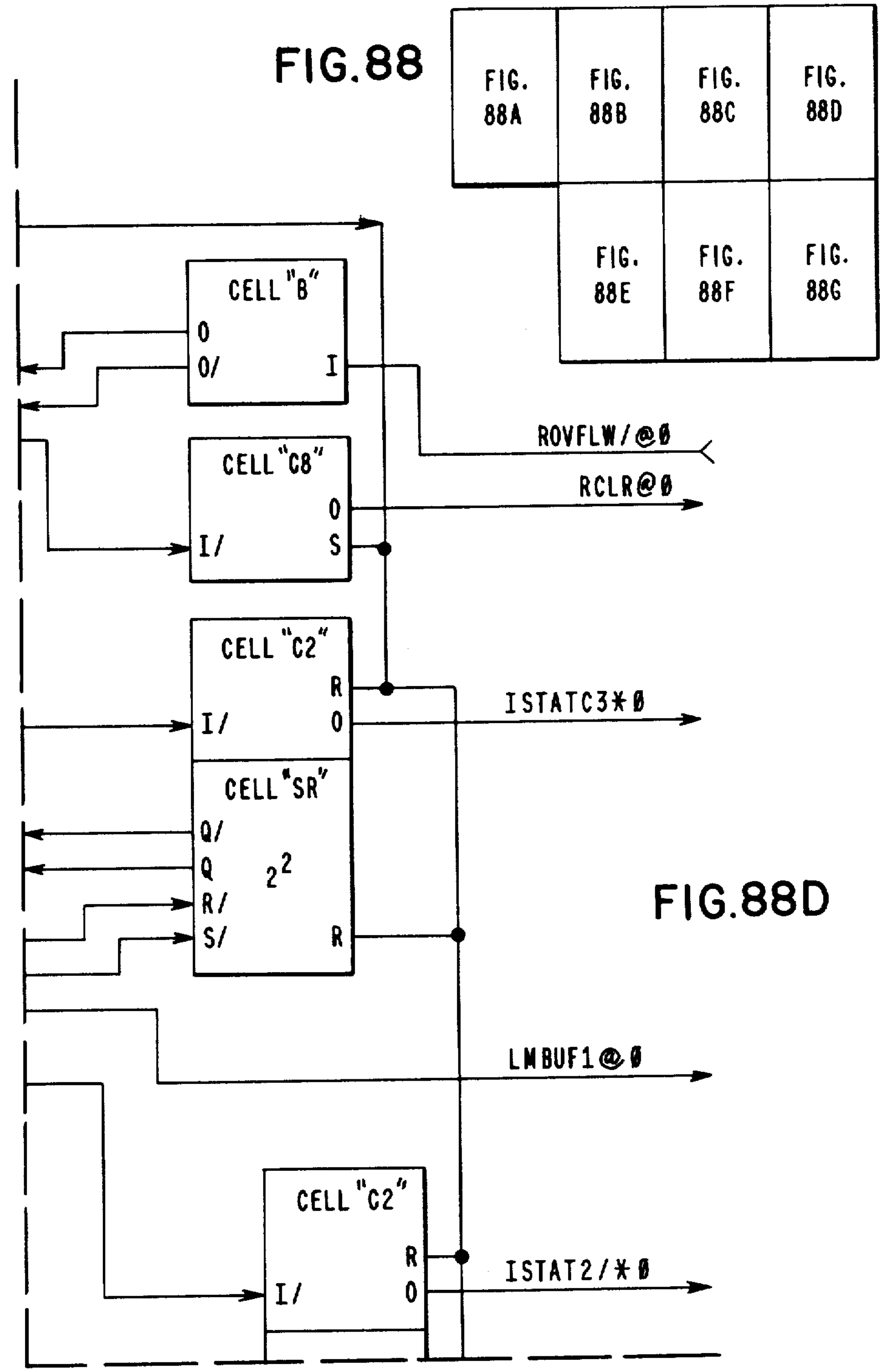
Figure 88E:
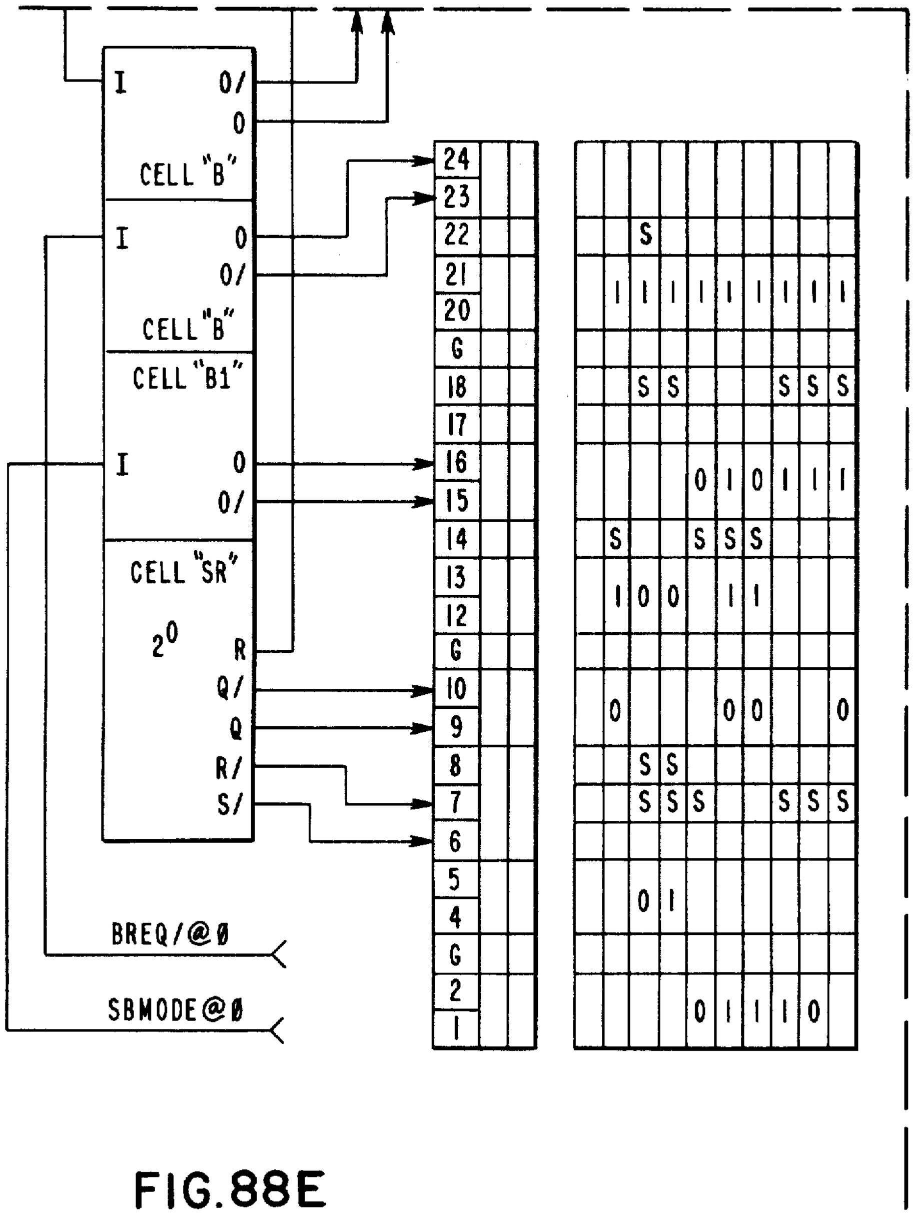
Figure 88F:
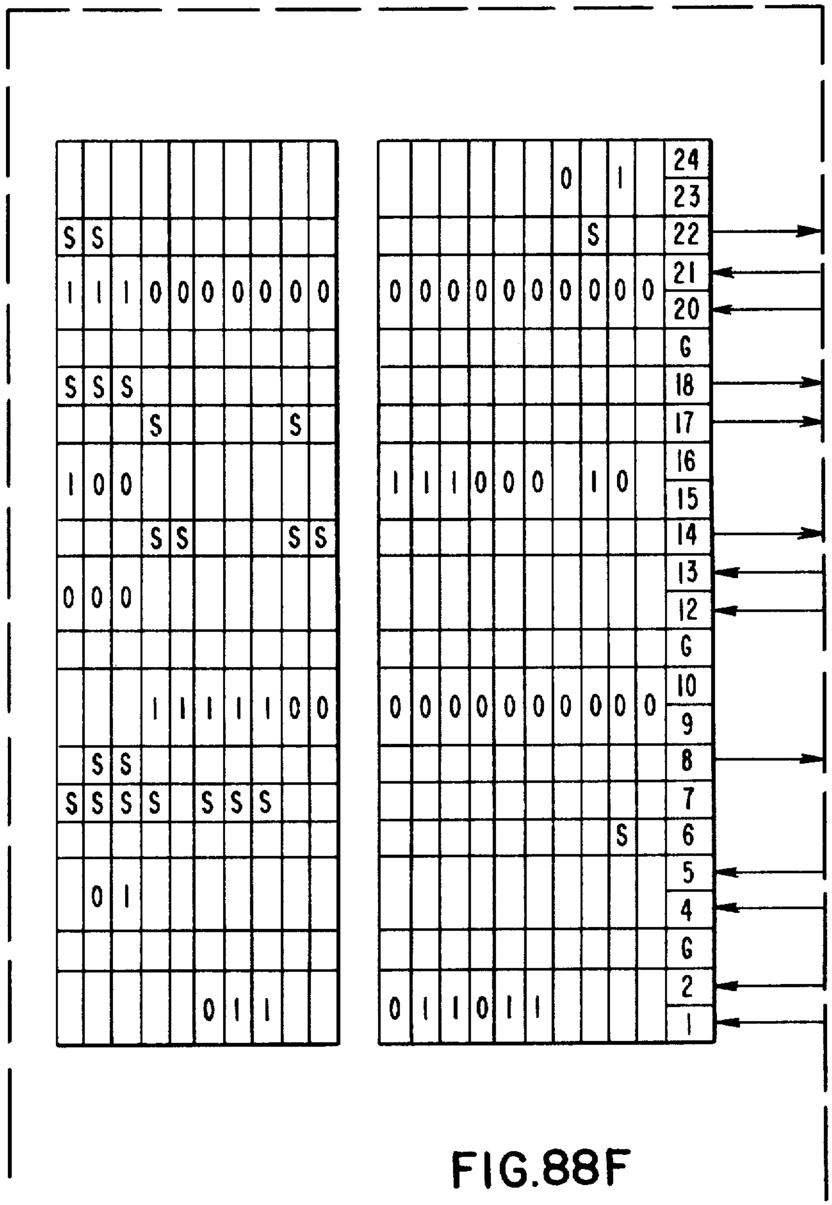
Figure 88G:
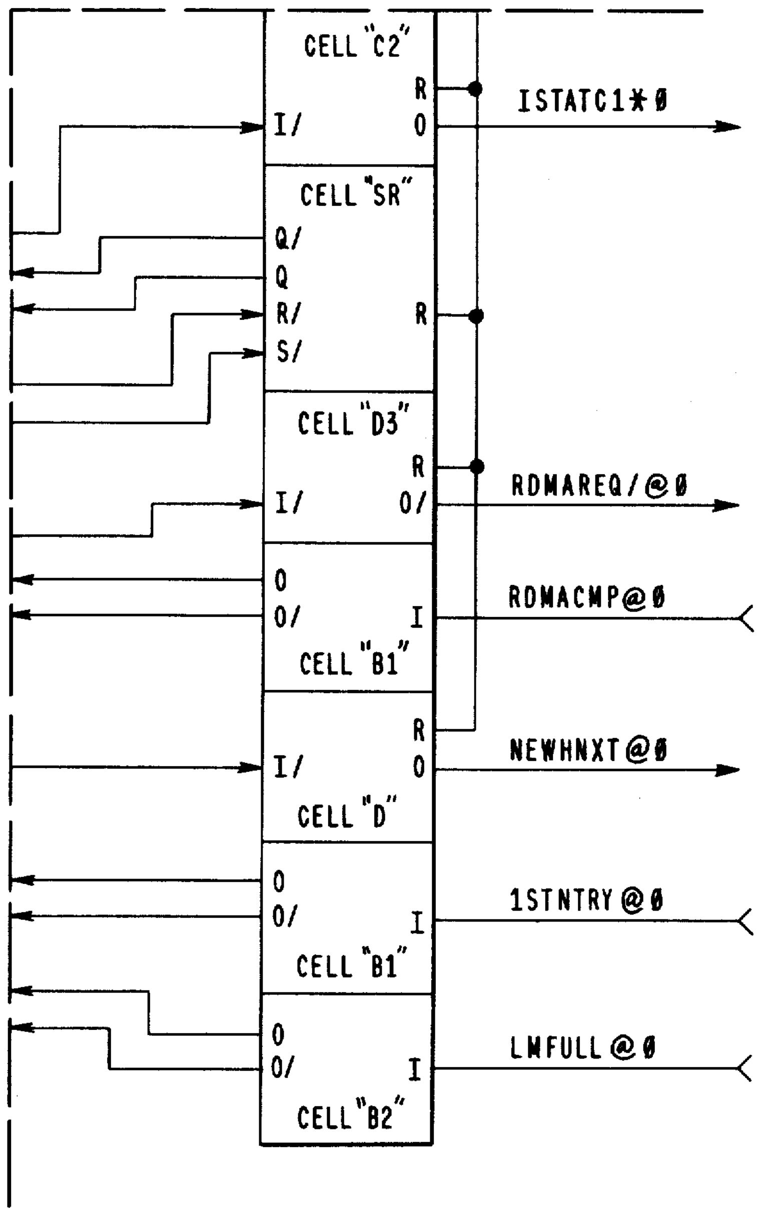

FIGS. 85A and 85B illustrate the PLA "C7-BENBL". C7-BENBL controls the monitoring of Channel B for the receipt of messages.

FIGS. 86A through 86D illustrate the PLA "C7-CNLSEL". C7-CNLSEL controls the monitoring and selection of both Channel A and Channel B for transmission of messages.

FIGS. 87A through 87K illustrate the PLA "C7-BREC". C7-BREC controls the receipt of messages on Channel B of the System Bus.

FIGS. 88A through 88G illustrate the PLA "C8-RCVCTRL". C8-RCVCTRL controls the monitoring of the PLAs C6-AREC and C7-BREC, and selects one of those PLAs for controlling the copying of messages. In addition, C8-RCVCTRL provides status bits to STAT.

FIGS. 89A through 89L illustrate the PLA "C9-RDMA". C9-RDMA controls the DMA for copying message data. It includes the necessary control for the mailbox 350 (FIG. 21).

| SIGNAL, PIN AND COMPONENT LIST | |
|---|---|
| Signal, Pin or Component Name | Signal, Pin or Component Description |
| AABORT@0 | Causes message on Channel A to be aborted (Postamble garbled) |
| AB2 | Buffer for Channel A |
| AB2RD1/@0 thru AB2RD8/@0 | Bits in AB2 buffer |
| ACMPOK@0 | Indicates entire message has been received correctly on Channel A |
| ACNLSEL@0 | Causes selection of Channel A or B |
| ACRCOK@0 | Indicates no CRC error in message on Channel A |
| AERTRM@0 | Indicates error in message received on Channel B |
| AGRBLEN/@0 | Causes byte of message of A channel to be compared with byte from GFIFO |
| ALMBUF1@0 | Indicates whether received message is header-only or header and data |
| ALSTBYT@1 | Indicates last byte of message received on Channel A |
| ARDAT1/@0 thru ARDAT8/@0 | Bits in DMUX for Channel A |
| ARENBL/@0 | Enables C6-AREC (FIGS. 83A-83Q) |
| AREQ/@0 | Indicates request for Channel A to pass data into local memory |
| ARFLD@1 | Causes loading of RFIFO for Channel A |
| ARFLG/@0 | Indicates flag received at Channel A |
| ARMATCH/@0 | Indicates destination address of message matches station address of group address at Channel A |
| ARSTRB/@0 | Indicates byte strobe for Channel A |
| ARZRO@0 | Indicates postamble not garbled at Channel A |
| ASEL/@0 | Indicates selection of Channel A for passing data through DMA into local memory |
| B3 | Buffer for either channel (shared buffer) |
| B3RD1/@0 thru B3RD8/@0 | Bits in B3 buffer |
| B4 | Temporary storage register at input RFIFO |
| B4RD1/@0 thru B4RD8/@0 | Bits in B4 |
| BABORT@0 | Causes message on Channel B to be aborted (postamble garbled) |
| BASE-ICB*0 | Causes reading of BASE register |
| BASE-PMO*1 | Causes reading of BASE register |
| BB2 | Buffer for Channel B |
| BB2RD1/@0 thru BB2RD8/@0 | Bits in BB2 buffer |
| BCMPOK@0 | Indicates entire message has been received correctly on Channel B |
| BCRCOK@0 | Indicates no CRC error in message on Channel B |
| BE@1 | Causes data to be passed from ODAT to IXDAT |
| BERTRM@0 | Indicates error in message received on Channel B |
| BGRBLEN/@0 | Causes byte of message on Channel B to be compared with byte from GFIFO |
| BIN-PMO*0 | Causes loading of register in processor |
| BRDAT1/@0 thru BRDAT8/@0 | Bits in DMUX for Channel B |
| BRENBL/@0 | Enable C-7 BREC PLA (FIGS. 87A-K) |
| BREQ/@0 | Indicates request for Channel B to pass data into local memory |
| BRFLG/@0 | Indicates flag received at Channel A |
| BRMATCH/@0 | Indicates destination address of message matches station address |

-continued

| SIGNAL, PIN AND COMPONENT LIST | |
|---|---|
| Signal, Pin or Component Name | Signal, Pin or Component Description |
| | of group address at Channel B |
| BRSTRB/@0 | Indicates byte strobe for Channel B |
| BRZRO@0 | Indicates postamble not garbled at Channel B |
| BSEL/@0 | Indicates selection of Channel B for passing data through DMA into local memory |
| CARRY | Carry between stages of a register |
| CHKCMP@0 | Indicates when message received correctly |
| CMD | Command (CMD) register 400 (FIG. 23) |
| CMDB01/@1 thru CMDB08/@1 | Output of CMD |
| CMD-CNL*0 | Not used |
| CMD-MASK*0 | Causes loading of group address (MASK) register |
| CMD-REC*0 | Enables receipt of message |
| CMD-SADD*0 | Causes loading of subsystem address (SADD) register |
| CMD-SND*0 | Enables transmission of message |
| CNLAVAIL@0 | Indicates when either channel available for transmission |
| CNLENBL/@0 | Not used |
| CNT | Retry counter (CNT) 620 (FIG. 34) |
| CNTCLR*0 | Causes clearing of CNT |
| D1R9 thru D8r16 | Internal signals of CRC |
| DEA | Data Ending Address (DEA) Register 374 (FIG. 23) |
| DIAG@0 | Not used |
| DLB@0 | Indicates match of DEA and OAC |
| DMUX | Latch and demultiplexer, accomplishes functions of receiver address check circuits 584A and 584B and postamble garble detection circuits 588A and 588B (FIG. 32) |
| DSA | Data Starting Address (DSA) Register 364 (FIG. 23) |
| DSA-OCB*0 | Causes reading of Data Starting Address (DSA) Register |
| DSA-PMO*1 | Causes reading of Data Starting Address (DSA) Register |
| EAR | Corresponds to Ending Address (EAR) Register 370 (FIG. 23) |
| EAR1-RB*0 | Causes reading of byte from Ending Address (EAR) Register |
| EAR2-RB*0 | Causes reading of byte from Ending Address (EAR) Register |
| EAR3-RB*0 | Causes reading of byte from Ending Address (EAR) Register |
| ECDC | Decoder, selects HSA, DSA, BASE, HNXT, HEA, DEA, LMIT or FNXT in response to bits on PM BUS 01/ thru PM BUS 08/ |
| EMTCH/ | Indicates system interface chip addressed for transfer from processor to SIC |
| ENCRC1*1 | Enables reading of first byte of CRC bits |
| ENCRC2*1 | Enables reading of second byte of CRC bits |
| ENCRC2@0 | Enables reading of second byte of CRC bits and is used as status signal |
| EREP/ | Input/output pin, carries signal for enabling transfer of signals between processor and system interface chip via P-M bus |
| FE@1 | Causes flag characters and postamble (zeroes) to be generated |
| FLB@0 | Indicates match of FNXT and Input Address Counter (IAC) |
| FLIP@0 | Not used |
| FNXT | Firmware Next (FNXT) Register |

-continued

SIGNAL, PIN AND COMPONENT LIST

| Signal, Pin or Component Name | Signal, Pin or Component Description |
|---|---|
| | 378 (FIG. 23) |
| GBIRD1/@1 thru GBIRD8/@1 | Byte from Channel A or Channel B to be compared with byte from GFIFO |
| GDAT | Temporary storage register at output of GFIFO, includes compare circuit 580 (FIG. 32) |
| GFDAT1/ thru GFDAT8/ | Output of GFIFO |
| GFERR | Indicates mismatch at compare circuit 580 |
| GFFULL | Indicates GFIFO full |
| GFFULL@1 | Indicates GFIFO full |
| GFIFO | GFIFO 578 (FIG. 32) |
| GFLD/@1 | Causes loading of GFIFO |
| GFMT | Indicates GFIFO empty |
| GFMT@1 | Indicates GFIFO empty |
| GFRD*1 | Causes loading of GDAT |
| GFRD/@0 | Causes reading of GFIFO |
| GMUX | Multiplexer and latch that provides input to GDAT |
| GRBL/@1 | Indicates mismatch of bits in GDAT (compare circuit 580) |
| GRD1*1 | Causes reading of GFIFO |
| GRD10*1 | Causes reading of GFIFO |
| GWRT1*0 | Causes loading of GFIFO |
| GWRT10*0 | Causes loading of GFIFO |
| HEA | Header Ending Address (HEA) Register 372 (FIG. 23) |
| HLB@0 | Indicates match of HEA and OAC |
| HNXT | Hardware Next (HNXT) Register 368 (FIG. 23) |
| HNXT-ICB*0 | Causes reading of HNXT register |
| HNXT-PMO*1 | Causes reading of HNXT register |
| HSA | Header Starting Address (HSA) Register 362 (FIG. 23) |
| HSA-OCB*0 | Causes reading of Header Address (HSA) Register |
| HSA-PMO*1 | Causes reading of Header Address (HSA) Register |
| IAC | Input Address Counter (IAC) 392 (FIG. 23) |
| IAC*1 | Clocks IAC |
| IAC±-ICB*0 | Causes reading of incremented value of IAC |
| IAC-PMO*0 | Causes reading of IAC |
| IACBYT0 thru IACBYT3 | Indicates byte for writing into RWB |
| IACB3@0 | Indicates last byte of addressed word in IAC |
| IACMPQK@0 | Indicates entire message has been received correctly on Channel A |
| IAC01A@1 | Bit 2 of IAC |
| IAC02A@1 | Bit 1 of IAC |
| IAERTRM@0 | Indicates error in message received on Channel A |
| IBCMPQK@0 | Indicates entire message has been received correctly on Channel B |
| IBERTRM@0 | Indicates error in message received on Channel B |
| ICB-EAR*0 | Causes loading of Ending Address (EAR) Register |
| ICB-HNXT*0 | Causes loading of HNXT register |
| ICB-IAC@0 | Causes loading of IAC |
| ICB-TMP*0 | Causes loading of TMP register |
| ICB01/ thru ICB24/ | Path between registers in DMA |
| IDSA | Input Data Starting Address (IDFSA) Register 360 (FIG. 23) |
| IDSA-ICB*0 | Causes reading of word in Input Data Starting Address (IDSA) Register |
| IDSA-PMO*1 | Causes reading of word in Input Data Starting Address (IDSA) |

-continued

SIGNAL, PIN AND COMPONENT LIST

| Signal, Pin or Component Name | Signal, Pin or Component Description |
|---|---|
| | Register |
| INC-IAC*0 | Causes binary incrementing of IAC |
| INC-OAC*0 | Causes incrementing of OAC |
| INDPA@0 | Not used |
| INSTATC1*0 thru ISTATC3*0 | Causes loading of STAT |
| IREQ/@0 | Causes interrupt of processor |
| ISTAT@0 | Not used |
| ISTAT1@0 thru ISTAT3@0 | Bits of Status (STAT) Register |
| IXDAT | Multiplexer, selects flags, postamble zeroes, data or control signals to be placed on IXDAT1/ thru IXDAT8/ |
| IXDAT1/ thru IXDAT8/ | Paths to pins XDAT1/ thru XDAT8/ |
| IXZINSRT/ | Path to pin XZINSRT/ |
| LLW@0 | Indicates match of LMIT and IAC |
| LDSADC*0 | Causes loading of SADC |
| LMFULL@0 | Indicates overflow of local memory (written into when full) |
| LMIT | Mailbox Limit Address (LMIT) Register 376 (FIG. 23) |
| LSTBYT@0 | Indicates last byte of message received |
| MAE/ | Output pin, carries control signal to local memory |
| MASK | Register in address check circuit for storing group address |
| MDEE/ | Input pin, carries control signal from local memory |
| ME@0 | Indicates error in data from local memory |
| MTCHENB@0 | Causes check of destination address with subsystem address |
| NEWHNXT@0 | Indicates when HNXT should be updated upon completion of mailbox entry |
| N1 thru N5 | Internal signals of CRC |
| OAC | Output Address Counter (OAC) 390 (FIG. 23) |
| OAC-PMO*0 | Causes reading of OAC |
| OACBYT0 thru OACBYT3 | Indicates byte for reading from XWB |
| OACB3@0 | Indicates last byte of addressed work in Output Address Counter (OAC) |
| OAC01A@1 | Bit 1 of OAC |
| OAC02A@1 | Bit 2 of OAC |
| OCB-OAC*0 | Causes loading of OAC |
| OCB01/ thru OCB24/ | Path between registers in DMA |
| ODAT | Temporary storage register at output of XFIFO |
| ODAT1/ thru ODAT8/ | Bits in ODAT |
| ODVALID@0 | Indicates data in ODAT valid |
| ONE-SADC*0 | Not used |
| OSTATC1*0 thru OSTATC3*0 | Causes loading of STAT Register |
| OSTAT1@0 thru OSTAT3@0 | Bits of STAT Register |
| PM-BASE*1 | Causes loading of BASE Register |
| PM-CMD*1 | Causes loading of CMD Register |
| PM-DEA*1 | Causes loading of DEA Register |
| PM-DSA*1 | Causes loading of DSA Register |
| PM-FNXT*1 | Causes loading of FNXT Register |
| PM-HEA*1 | Causes loading of HEA Register |
| PM-HSA*1 | Causes loading of HSA |
| PM-ISAA*1 | Causes loading of word in IDSA Register |
| PM-LMIT*1 | Causes loading of LMIT Register |
| PM-UB | Controls pulse width of control signals |
| PM-UT | Controls pulse width of control signals |

-continued

SIGNAL, PIN AND COMPONENT LIST

| Signal, Pin or Component Name | Signal, Pin or Component Description |
|---|---|
| PM-XWB*1 | Causes loading of Transmit Word Buffer (XWB) |
| PMBUS01/ thru PMBUS32/ | Input/output pins, connected to P-M Bus |
| PMBUS01/@0 thru PMBUS08/@0 | Latched signals from P-M Bus |
| PMO01/ thru PMO32/ | Output path to P-M Bus |
| PMRST/ | Input pin, carries signal to reset system interface chip |
| POD | Driver circuit, amplifies PMO01/ thru PMO32/ signals for P-M Bus |
| PORT 1 and 2 | Defines path from processor to SIC |
| PORTX/ | Not used in present invention (used when addressing one of plural SIC's on P-M Bus) |
| PSTIDLE@0 | Indicates when channel of last transmission attempt is idle |
| R1@1 thru R8@1 | Internal signals of CRC |
| RB-IDSA1*0 | Causes loading of byte in IDSA Register |
| RB-IDSA2*0 | Causes loading of byte in IDSA Register |
| RB-IDSA3*0 | Causes loading of byte in IDSA Register |
| RB-RWB*0 | Causes loading of Receive Word Buffer (RWB) |
| RBBUF | Temporary storage register at output of RFIFO |
| RB1/ thru RB8/ | Output of RFIFO |
| RBLST/@0 | Status bit |
| RBMT@0 | Indicates RBBUF empty |
| RBRD@1 | Causes reading of RBBUF |
| RCNTSHFT*0 | Causes shifting (incrementing) of CNT |
| RCVENBL@0 | Not used |
| RDAT1/ thru RDAT8/ | Input pins on System Interface Chip, carries message bytes for either Channel A or Channel B |
| RDECSADC*0 | Causes decrementing of SADC |
| RDMACMP@0 | Indicates DMA operation complete |
| RDMAREQ/@0 | Causes DMA to transfer data to local memory |
| REQX/ | Output pin, carries control signals to processor |
| RERR/ | Input pin, carries signals indicating swamp error on channels |
| RETRY8/@0 | Indicates eighth retry of message |
| RFCLR@0 | Causes clearing of RFIFO |
| RFCLR@1 | Causes clearing of RFIFO |
| RFDAT1/ thru RFDAT8/ | Output of RFIFO |
| RFIFO | RFIFO 590 (FIG. 32) |
| RFIFOLST/ | Status bit |
| RFLD@0 | Causes loading of RFIFO |
| RFLEX/ | Output pin, carries signal for controlling system interface chip use of P-M Bus |
| RFLG/ | Input pin, carries flag signal from deserializer |
| RFRD*0 | Causes loading of RBBUF |
| RFRD/@/ | Causes reading of RFIFO |
| RIDLE/ | Input pin, carries signals indicating if channels are idle |
| ROVFLW/@0 | Indicates overflow of RFIFO |
| ROVFLW@1 | Indicates overflow of RFIFO |
| RQVFLW@1 | Indicates overflow of RFIFO |
| RST@1 | Resets System Interface Chip |
| RSTRB/ | Input pin, carries byte strobe signal from deserializer |
| RTYERR@0 | Indicates error in message and should be retried |
| RTYRDY@0 | Indicates wait interval completed and ready to retry |
| RTYREQ@0 | Causes retry circuit to be activated |

-continued

SIGNAL, PIN AND COMPONENT LIST

| Signal, Pin or Component Name | Signal, Pin or Component Description |
|---|---|
| RWB | Receive word buffer, holds bits from RBBUFF |
| RBW-PMO*1 | Causes reading of Receive Word Buffer (RWB) |
| RWBA@0 | Indicates RWB is available for loading |
| SADC | Counter in Retry Timer, SADC 626 (FIG. 34) |
| SADD | Register in address check circuit for storing unique subsystem address |
| SBMODE@0 | Not used |
| SCN-XSEL*0 | Not used |
| SCNCNL1/@0 thru SCNCNL3/@0 | Not used |
| SCNCNL1@0 thru SCNCNL3/@3 | Not used |
| SCNRDY@0 | Not used |
| SCNTSHFT*0 | Not used |
| SELX/ | Input pin on system interface chip, carries signal for controlling system interface chip use of P-M bus |
| SND-XSEL*0 | Not used |
| SNDDAT1/ thru SNDDAT8/ | Output of XFIFO |
| SNDENBL/@0 | Enables transmission of message |
| SNDLST | Status bit to ODAT |
| SNIREQ*0 | Not used |
| SNIREQ/@0 | Not used |
| SNIREQ@0 | Not used |
| SPMRST@0 | Resets system interface chip |
| SREQ/@1 | Indicates RWB is full |
| STARST*0 | Resets STAT |
| STAT | Status (STAT) Register 402 (FIG. 23) |
| STATD@1 | Indicates STAT is clear |
| STA1-PMO*1 | Causes reading of STAT |
| STA2-PMO*1 | Causes reading of STAT |
| STSTRB@0 | Timing signal for message retry |
| TDECSADC*0 | Not used |
| TIP/@0 | Indicates transmission in progress |
| TMOUT/ | Not used |
| TMP | Temporary storage register |
| TMP-ICB*0 | Causes reading of TMP register |
| TMRENBL/@0 | Not used |
| TRMCNT@0 | Indicates terminal count of SADC |
| TSTRB/ | Input pin, carries clock signal for message retry |
| WBE@1 | Causes loading of XFIFO |
| WRTAG | Register having bits indicating which byte of RWB has been written into |
| WTGRST*0 | Clears control signals from RWB |
| XAC21@1 | Bit 21 of IAC or OAC |
| XAC21@1 | Bit 21 of IAC or OAC |
| XAC22/@1 | Bit 22 of IAC or OAC |
| XAC22@1 | Bit 22 of IAC or OAC |
| XBER@0 | Indicates ODAT underflow (reading when empty) |
| XB1/ thru XB8/ | Output of transmit word buffer |
| XBLD@1 | Causes loading of XFIFO |
| XCLR@1 | Causes clearing of XFIFO and GFIFO |
| XCRC | CRC generate circuit 572 (FIG. 32) |
| XCRCCLR*0 | Causes CRC bits to be cleared |
| XCRCGEN*0 | Causes CRC bits to be generated |
| XD*1 | Causes reading of XFDAT |
| XDATRDY/@0 | Indicates data from DMA ready for transmission |
| XDAT1/ thru XDAT8/ | Output pins on system interface chip |
| XDF*1 | Causes reading of XFDAT |
| XDMAREQ/@0 | Causes DMA to provide data for transmission |
| XFCLR@1 and | Causes clearing of XFIFO and |

-continued

| SIGNAL, PIN AND COMPONENT LIST | |
|---|---|
| Signal, Pin or Component Name | Signal, Pin or Component Description |
| XFCLR@0 | GFIFO |
| XFDAT | Temporary storage register at input of XFIFO |
| XFDATLD*0 | Causes loading of XFDAT |
| XFDAT1/ thru XFDAT8/ | Output of XFDAT |
| XFFULL@0 | Indicates XFIFO full |
| XFIFO | XFIFO 574 (FIG. 32) |
| XFLD/@0 | Causes loading of XFIFO |
| XFMT@0 | Indicates XFIFO empty |
| XFRD*0 | Caused loading of ODAT |
| XFRD/@1 | Causes reading of XFIFO |
| XFREQ@1 | Indicates XWB is empty |
| XLSTBYT@0 | Status bit |
| XMITCMP@0 | Indicates transmission of message complete and successful |
| XRD1*0 | Causes reading of XFIFO |
| XRD10*0 | Causes reading of XFIFO |
| XSEL1@0 thru XSEL3@0 | Not used |
| XSTRBL/@1 | Indicates byte received at serializer and being passed to system interface chip |
| XWB | Transmit word buffer, holds bits from local memory to XFDAT |
| XWBA/@0 | Indicates XWB available for reading |
| XWRT1*1 | Causes loading of XFIFO |
| XWRT10*1 | Causes loading of XFIFO |
| XZINSRT/ | Input/output pin, carries FE@1 to serializer and XSTRBL/@1 from serializer |
| X0 | Input pin, clock |
| X1 | Input pin, clock |
| 1STNTRY@0 | Indicates first entry in mailbox after being empty |
| αBIRD1/@/ thru αBIRD8/@/ | (ABIRD1/@/ thru ABIRD8/@/or BBIRD1/@/ thru BBIRD8/@/) bits in B1 buffer |
| αBIRD1/@0 thru αBIRD8/@0 | (ABIRD1/@0 thru ABIRD8/@0 or BBIRD1/@0 thru BBIRD8/@0) bits in B1 buffer |
| αB1 | (AB1, BB1) buffer for either Channel A or Channel B |
| αCRC | (ACRC, BCRC) CRC check circuits 586A or 586B (FIG. 32) for either A or B |
| αCRCCLR*0 | (ACRCCLR*0, BCRCCLR*0)-Causes clearing of CRC check circuits |
| αCRCGEN*0 | (ACRCGEN*0, BRCGEN*0)-Causes CRC bits to be generated for checking for either ACRC or BCRC |
| αCRCOK@0 | (ACRCOK@0, BCRCOK@0)-Indicates no CRC error for either Channel A or Channel B |
| αRFLG/@0 | (AFLG/@0, BFLG/@0)-Indicates receipt of flag character for either Channel A or Channel B |
| αRSTRB/@0 | (ARSTRB/@0, BRSTRB/@0)-Indicates receipt of byte for either Channel A or Channel B |

In the preceding Signal, Pin and Component List, and in the Pin Assignment Table presented in connection with FIG. 36, the symbol "/" indicates that the given signal or the signals on the given pin are inverted or "barred".

Although the presently preferred embodiments have been described, it should be appreciated that within the purview of the present invention various changes may be made within the scope of the appended claims.

We claim:

1. In a data processing system having a plurality of subsystems, a bus for carrying messages to be received by said subsystems, and a processor and local memory associated in at least one of said subsystems, wherein the messages include control information and wherein at least some of the messages include blocks of data accompanying the control information to be stored in said local memory, the improvement comprising:

a mailbox memory included in said one of said subsystems and having memory locations for storing the control information from messages received by that one of said subsystems apart from the blocks of data stored in said local memory; and means for sequentially accessing the memory locations in said mailbox memory for storing the control information from each received message as an entry in said mailbox memory, including means for pointing to the next entry following the entry of the last received message, so that control information of each received message may be stored in said mailbox memory without interrupting said processor.

2. The data processing system of claim 1, wherein said mailbox memory is within said local memory and its memory locations are a portion of the memory locations of said local memory.

3. The data processing system of claim 1, wherein the memory locations in said mailbox memory are consecutive memory locations in a portion of said local memory.

4. The data processing system of claim 1, wherein said means for pointing comprises an HNXT register for storing the address of the first memory location of the next entry, and wherein said HNXT register is loaded with the address of the memory location that follows the last memory location in each entry after the control information of that entry is stored in said mailbox memory.

5. The data processing system of claim 2, wherein the received messages having accompanying blocks of data have such blocks of data following the control information, and wherein the control information of such received messages includes an address of a memory location in said local memory apart from said mailbox memory at which the blocks of data are to be stored.

6. The data processing system of claim 1, wherein the entries of control information stored in said mailbox memory are stored consecutively by said sequentially accessing means, with the first entry being control information of the earliest received message and the last entry being control information of the last received message, and wherein the improvement further comprises means in said sequentially accessing means for pointing to the first entry in said mailbox memory, so that said processor may access such first entry.

7. A data processing system, comprising:

a plurality of subsystems;

a bus using broadcast packet switching for carrying messages between said subsystems, said messages including control information, with some of said messages including blocks of data accompanying the control information;

a process and a local memory interconnected within each of said subsystems, said local memory having addressable memory locations for storing control information and blocks of data of messages received by its subsystem and to be processed by said processor;

a mailbox section within each said local memory, each said mailbox section having addressable memory locations for storing the control information of messages received by its associated subsystem apart from the blocks of data; and DMA means included in each of said subsystems for sequentially accessing memory locations in said local memory without interrupting said processor of its associated subsystem, said DMA means including mailbox addressing means for sequentially accessing memory locations in said mailbox section so that the control information of each message received by its associated subsystem is stored in the memory locations of said mailbox section, said mailbox addressing means including means for storing the address of the next memory location following the memory locations where the control information of the last received message was stored.

8. The data processing system of claim 7, wherein any message having both control information and blocks of data includes, in the control information, the starting address of the memory locations in the local memory of the subsystem receiving the message where the blocks of data are to be stored.

9. In a data processing system, the improvement comprising:

a plurality of subsystems, each subsystem having a processor connected to a local memory, with said local memory having a plurality of addressable memory locations;

a system bus for linking said subsystems, said data processing system employing broadcast packet switching for carrying a message packet over said system bus transmitted by one of said subsystems and to be received by another of said subsystems, each message packet including header information and at least some of the message packets including associated blocks of data accompanying the header information;

a mailbox occupying a portion of the memory locations within the local memory of each of said subsystems, said mailbox for storing only the header information from any message packet received by its subsystem;

system bus interface means associated with each of said subsystems for coupling its associated subsystem to said system bus, said system bus interface means including DMA means for sequentially accessing memory locations in the local memory of its associated subsystem without interrupting the processor of its subsystem; and mailbox addressing means within said DMA means for sequentially accessing memory locations in said mailbox for storing the header information of a received message packet in said mailbox;

with the message packets having both header information and accompanying blocks of data including, in the header information, a DSA address of a memory location in the local memory apart from said mailbox where the blocks of data are to be stored, with said DMA means storing the blocks of data beginning at such DSA address and with such DSA address stored as part of the header information in said mailbox.

10. The data processing system of claim 9, wherein in any message packet having both header information and blocks of data the header information is separated from the blocks of data by at least a control character.

11. The data processing system of claim 9, wherein the header information of any message packet received by one of said subsystems is stored as an entry in said mailbox of that subsystem, and wherein said mailbox addressing means comprises:

a BASE register for storing an address defining the beginning memory location of the mailbox in the local memory;

a LMIT register for storing an address defining the ending memory location of the mailbox in the local memory;

a FNXT register for storing an address defining the first entry in the mailbox; and a HNXT register for storing an address defining the next entry following the last entry in the mailbox;

said mailbox addressing means sequentially and consecutively accessing each memory location in said mailbox beginning at the address in said HNXT register when header information is to be stored in said mailbox, and the processor sequentially and consecutively accessing said mailbox beginning at the address location in said FNXT register when the processor is to process a message packet stored in the local memory of its subsystem.

12. The data processing system of claim 11, wherein said DMA means further includes an input address counter for providing the address of a memory location in the local memory where the header information is to be stored in the mailbox and compare means for comparing the address in said input address counter with the address in said FNXT register, so that after said mailbox is filled with header information, the header information of the next received message will not be stored at the first entry in said mailbox until the prior header information in the first entry has been accessed by the processor.

13. The data processing system of claim 12, wherein said mailbox addressing means further comprises means for comparing the address in said input address counter with the address in said LMIT register and for changing the address in said input address counter to the address in said BASE register when the addresses in said input address counter and said LMIT register are equal.

14. The data processing system of claim 9:

wherein each message packet is one of:

a header-only message packet having only header information, and a header and data message packet having header information and blocks of data accompanying the header information;

wherein one of said subsystems requesting blocks of data from another one of said subsystems sends a header-only message packet that includes the DSA address of the requested blocks of data in its header information;

wherein the one of said subsystems providing the requested blocks of data sends a header and data message packet to the requesting subsystem with the DSA address in the header information of the header and data message packet; and wherein said DMA means further comprises an input address counter that is loaded with the DSA address in the header information of a header and data message packet, said input address counter sequentially accessing the local memory beginning at the DSA address in order to store the blocks of data in the local memory apart from said mailbox.

15. The data processing system of claim 9, wherein said system bus comprises:

pairs of first and second transmission lines, each pair of first and second transmission lines coupled to one of said subsystems by one said system bus interface means, and a star coupler, said star coupler receiving a message packet transmitted from at least one of said subsystems along one of said first transmission lines and for passing the message packet to all said second transmission lines so that the message packet is received by all of said subsystems, including the one of said subsystems transmitting the message packet.

16. The data processing system of claim 15, wherein plural ones of said subsystems are associated with each pair of first and second transmission lines, each of said subsystems coupled to its associated pair of first and second transmission lines by one said system bus interface, so that each of said first transmission lines carries a message packet transmitted by any one of its associated subsystems to said star coupler, and each of said second transmission lines carries any message packet passed through said star coupler to each of its associated subsystems.

17. In a data processing system of the type having a plurality of subsystems and a bus for interconnecting said subsystems, wherein each of said subsystems includes a processor and a local memory connected to the processor for storing information to be used by the processor, and wherein a message may be transmitted from one of said subsystems and received by another one of said subsystems, the improvement wherein each message is either a header-only message having control information or a header and data message having both control information and blocks of data, and wherein the data processing system further comprises:

a mailbox portion within the local memory in each one of said subsystems, said mailbox for storing consecutive entries representing the control information in consecutive messages received by that one of said subsystems apart from blocks of data received by that one of said subsystems; and mailbox addressing means associated with each one of said subsystems for sequentially accessing address locations in said mailbox portion for storing entries representing control information of header-only messages or header and data messages received by that one of said subsystems independently of the processor in that one of said subsystems, so that the processor in that one of said subsystems is not interrupted in order to store the entries.

18. The data processing system of claim 17, wherein said mailbox addressing means includes means for storing at the beginning of each entry an EEBA+1 address defining the length of the entry.

19. A method for transferring a block of data between two subsystems linked by a system bus in a data processing system employing broadcast switching, each subsystem having a process and a local memory, the method comprising:

providing a header-only message from one of the systems to the other of the subsystems, the header-only message requesting data from the other of the subsystems and having header information that includes a local memory address within the local memory of the one of the subsystems at which the requested data is to be stored;

providing a header and data message from the other of the subsystems to the one of the subsystems, the header and data message having header information that includes the local memory address within the local memory of the one of the subsystems at which the requested data is to be stored, and a data portion that includes the requested data;

storing the header information of the header and data message from the other of the subsystems in a mailbox portion of the local memory of the one of the subsystems, said mailbox portion being apart from the local memory address at which the requested data is to be stored; and storing the requested data in the header and data message in the local memory of the one of the subsystems at the local memory address included in the header information stored in the mailbox portion.

* * * * *